(12) United States Patent
Sydora et al.

(10) Patent No.: US 9,956,548 B2
(45) Date of Patent: May 1, 2018

(54) PREPARATION OF AN OLEFIN OLIGOMERIZATION CATALYST

(75) Inventors: Orson L Sydora, Houston, TX (US); Ronald D Knudsen, Bartlesville, OK (US); Eduardo J. Baralt, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 1720 days.

(21) Appl. No.: 13/323,328

(22) Filed: Dec. 12, 2011

(65) Prior Publication Data

US 2013/0150642 A1 Jun. 13, 2013

(51) Int. Cl.
| | | |
|---|---|---|
| *B01J 31/04* | (2006.01) | |
| *B01J 31/14* | (2006.01) | |
| *B01J 31/18* | (2006.01) | |
| *B01J 31/22* | (2006.01) | |

(52) U.S. Cl.
CPC ............ *B01J 31/04* (2013.01); *B01J 31/143* (2013.01); *B01J 31/181* (2013.01); *B01J 31/2226* (2013.01); *B01J 31/2239* (2013.01); *B01J 2231/20* (2013.01); *B01J 2531/62* (2013.01)

(58) Field of Classification Search
None
See application file for complete search history.

(56) References Cited

U.S. PATENT DOCUMENTS

| | | | |
|---|---|---|---|
| 3,164,620 A | 1/1965 | van der Minne et al. | |
| 3,725,305 A | 4/1973 | Wilkinson | |
| 4,017,429 A | 4/1977 | Steele et al. | |
| 4,853,356 A | 8/1989 | Briggs | |
| 5,591,878 A | 1/1997 | Nelson et al. | |
| 5,689,028 A | 11/1997 | Lashier et al. | |
| 5,856,257 A | 1/1999 | Freeman et al. | |
| 6,133,495 A | 10/2000 | Urata et al. | |
| 6,455,648 B1 | 9/2002 | Freeman et al. | |
| 6,800,702 B2 * | 10/2004 | Wass ........................ | 526/124.3 |
| 7,384,886 B2 | 6/2008 | Knudsen et al. | |

(Continued)

FOREIGN PATENT DOCUMENTS

| | | |
|---|---|---|
| CN | 1422839 | 6/2003 |
| CN | 101100594 A | 1/2008 |

(Continued)

OTHER PUBLICATIONS

Foreign communication from a related counterpart application—International Search Report and Written Opinion, PCT/US2012/065285 dated Feb. 18, 2013, 12 pages.

(Continued)

*Primary Examiner* — Yun Qian
(74) *Attorney, Agent, or Firm* — Conley Rose, P.C.; Rodney B. Carroll; Monte R. Rhodes

(57) ABSTRACT

This disclosure provides for new catalyst systems and new methods for preparing and using the catalyst systems for generating a trimerization product. In an aspect, the new catalyst systems comprise a chromium carboxylate that is prepared by anhydrous metathesis. In another aspect, the catalyst system comprise a chromium carboxylate that is prepared by anhydrous metathesis and a metal pyrrolide compound. The catalyst systems imparts improved performance and/or reduced catalyst system cost to an olefin trimerization process.

53 Claims, 21 Drawing Sheets

(56) References Cited

U.S. PATENT DOCUMENTS

| | | | |
|---|---|---|---|
| 8,049,052 | B2 | 11/2011 | Kreischer et al. |
| 2004/0236163 | A1 | 11/2004 | Ewert et al. |
| 2005/0187391 | A1* | 8/2005 | Knudsen et al. ............ 548/402 |
| 2007/0043181 | A1* | 2/2007 | Knudsen et al. ............ 526/104 |

FOREIGN PATENT DOCUMENTS

| | | |
|---|---|---|
| GB | 1469986 | 4/1977 |
| JP | 62265237 A | 11/1987 |
| JP | 5059314 B2 | 10/2012 |
| JP | 2015507524 A | 3/2015 |
| WO | 2013089962 A1 | 6/2013 |
| WO | 2013089963 A1 | 6/2013 |

OTHER PUBLICATIONS

Foreign communication from a related counterpart application—International Search Report and Written Opinion, PCT/US2012/065289, dated Feb. 18, 2013, 11 pages.

Foreign communication from a related counterpart application—International Preliminary Report on Patentability, PCT/US2012/065289, dated Jun. 17, 2014, 8 pages.

Foreign communication from a related counterpart application—International Preliminary Report on Patentability, PCT/US2012/065285, dated Jun. 17, 2014, 7 pages.

Palacios, E. G., et al., "Infrared spectroscopy of metal carboxylates II. Analysis of Fe(III), Ni and Zn carboxylate solutions," Hydrometallurgy, 2004, pp. 139-148, vol. 72, Elsevier B.V.

Cayton, Roger H., et al., "Multiple Bonds Between Metal Atoms in Ordered Assemblies: Liquid Crystals Containing Mo—Mo Quadruple Bonds," Angew. Chem. Int. Ed. Engl., 1990, pp. 1481-1483, vol. 29, No. 12, VCH Verlagsgesellschaft mbH, Weinheim.

Machine Translation provided by WIPO, CN 101100594, downloaded from Internet on Nov. 12, 2013, 5 pages.

Office Action dated Nov. 26, 2013 (13 pages), U.S. Appl. No. 13/323,191, filed Dec. 12, 2011.

Filing Receipt and Specification for U.S. Patent Application entitled "Preparation of Transition Metal Carboxylates," by Orson L. Sydora, et al., filed Dec. 12, 2011 as U.S. Appl. No. 13/323,191.

Figgis, B. N., et al., "Crystal-Molecular Struction and Magnetic Properties of $Cr_3$ $(CH_3.COO)_6$ O $Cl.5H_2O$," Nature, vol. 205, No. 4972, pp. 694-695, Feb. 13, 1965.

Nakamoto, Kazuo, "Infrared and Raman Spectra of Inorganic and Coordination Compounds", 4th Edition, John Wiley & Sons Inc., 1986, pp. 231-233 plus one page cover and publishing information.

Cannon, Roderick D., et al., "Chemical and Physical Properties of Triangular Bridged Metal Complexes", Progress in Inorganic Chemistry, vol. 36, 1988, John Wiley & Sons, Inc., pp. 195-298.

Group notation revised in periodic table, Chemical and Engineering News, pp. 26-27, Feb. 4, 1985, Science.

Deacon, G. B., et al., "Relationships Between the Carbon-Oxygen Stretching Frequencies of Carboxylato Complexes and the Type of Carboxylate Coordination", Coordination Chemistry Reviews, vol. 33, 1980, pp. 227-250, Elsevier Scientific Publishing Company, Amsterdam.

Eshel, Michal, et al., "Polynuclear Chromium(III) Carboxylates. 1. Synthesis, Structure, and Magnetic Properties of an Octanuclear Complex with a Ring Structure", Inorg. Chem., 2000, vol. 39, No. 7, pp. 1376-1380, American Chemical Society.

Fang, Yiqun, et al., "A new chromium-based catalyst coated with paraffin for ethylene oligomerization and the effect of chromium state on oligomerization selectivity", Applied Catalysis A: General, vol. 235, 2002, pp. 33-38, Elsevier Science B.V.

Farrow, C. L., et al., "PDFfit2 and PDFgui: computer programs for studying nanostructure in crystals", Journal of Physics: Condensed Matter, vol. 19, 2007, pp. 1-7, IOP Publishing Ltd.

Hammersley, A. P., et al., "Two-dimensional detector software: from real detector to idealised image or two-theta scan", High Pressure Research, vol. 14, 1996, pp. 235-248, OPA (Overseas Publishers Association), The Netherlands.

Hart, Rob, et al., "Synthesis and structures of metal carboxylate liquids", National Meeting of the American Chemical Society, Mar. 23, 2009, pp. 1-23, Shepard.

McNaught, Alan D., et al., "Compendium of Chemical Terminology IUPAC Recommendations", Second Edition, 4 pages: cover, title, publishing, and contents information, Blackwell Science, The Royal Society of Chemistry, United Kingdom.

Proffen, TH., et al., "PDFFIT, a program for full profile structural refinement of the atomic pair distribution function", Computer Programs, Journal of Applied Crystallography., vol. 32, 1999, pp. 572-575., International Union of Crystallography.

Qui, Xiangyun, et al., "PDFgetX2: a GUI-driven program to obtain the pair distribution function from X-ray powder diffraction data", Journal of Applied Crystallography, vol. 37, 2004, p. 678, International Union of Crystallography.

Tomberli, B., et al., "Isotopic quantum effects in water structure measured with high energy photon diffraction", J. Phys.: Condens. Matter, vol. 12, pp. 2597-2612, 2000, IOP Publishing Ltd.

Vlachos, Antonis, et al., "A nearly symmetric trinuclear chromium(III) oxo carboxylate assembly: preparation, molecular and crystal structure, and magnetic properties of $[Cr_3O(O_2CPh)_6(MeOH)_3]NO_3) \cdot 2MeOH$", Inorganica Chimica Acta, vol. 357, pp. 3162-3172, 2004, Elsevier B.V.

Eshel, Michal, et al., "Polynuclear chromium(III) carboxylates. 3. Cyclic and cubane type hexachromium acetates," Inorganica Chimica Acta, vol. 329, 2002, pp. 45-50, Elsevier Science B.V.

Specification for patent application entitled "Processes For Preventing Generation of Hydrogen Halides in an Oligmerization Product Recovery System," filed Dec. 29, 1999 as U.S. Appl. No. 09/473,688.

Notice of Allowance dated Sep. 24, 2014 (10 pages), U.S. Appl. No. 13/323,191, filed Dec. 12, 2011.

Filing Receipt and Specification for U.S. Patent Application entitled "Preparation of Transition Metal Carboxylates," by Orson L. Sydora, et al., filed Dec. 18, 2014 as U.S. Appl. No. 14/575,803.

Foreign communication from a related counterpart application—English translation of Japanese Office Action, Japanese Patent Application No. 2014-547253, dated May 31, 2016, 4 pges.

Office Action dated Apr. 12, 2016 (13 pages), U.S. Appl. No. 14/575,803, filed Dec. 18, 2014.

Notice of Allowance dated Nov. 16, 2016 (12 pages), U.S. Appl. No. 14/575,803, filed Dec. 18, 2014.

Taylor, Richard A., et al., "The room temperature structures of anhydrous zinc(II) hexanoate and pentadecanoate," Journal of Molecular Structure, 2006, pp. 113-120, vol. 787, , Elsevier B.V.

* cited by examiner

First Commercial Source Chromium(III) 2-ethylhexanoate

Example 4
Chromium(III) 2-ethylhexanoate

Example 5
Chromium(III) 2-ethylhexanoate

Example 5
Chromium(III) 2-ethylhexanoate

Example 6
Chromium(III) 2-ethylhexanoate

Example 7
Chromium(III) 2-ethylhexanoate

PREPARATION OF AN OLEFIN OLIGOMERIZATION CATALYST

TECHNICAL FIELD OF THE INVENTION

This disclosure relates to a catalyst system, methods for preparing the catalyst system, and methods for using the catalyst system for preparing a trimerization product.

BACKGROUND OF THE INVENTION

The trimerization of ethylene to produce 1-hexene constitutes a commercially significant process for the selective preparation of this alpha olefin, which in turn is useful for preparing a range of polyolefins, usually as a comonomer with ethylene. One widely employed ethylene trimerization catalyst system comprises a chromium carboxylate, a pyrrole compound, and a metal alkyl. For example, one ethylene trimerization catalyst system comprises a tris(2-ethylhexanoate) chromium(III), 2,5-dimethylpyrrole, triethylaluminum, and diethylaluminum chloride.

Typically, any method of preparing an active catalyst system can present challenges with respect to the chromium carboxylate utilized in the ethylene trimerization catalyst system. Batch-to-batch variations in the quality of commercial chromium(III) 2-ethylhexanoate, and the attendant inconsistency in catalytic system performance, have can have significant impacts upon the ethylene trimerization catalyst system productivity and selectivity. Therefore, it would be useful to discover and develop new catalyst systems, new methods for preparing the catalyst systems, and new methods for using the catalyst systems for preparing a trimerization product that might provide greater efficiency and cost effectiveness. In one aspect, new catalyst systems and methods for preparing the catalyst systems are needed that might reduce the amount of expensive activators in a catalyst system, or that might lower the cost or increase the efficiency of preparing chromium compounds used in the catalyst system.

SUMMARY OF THE INVENTION

This disclosure provides for a composition, a process for producing a catalyst system, and/or processes for trimerizing olefins utilizing a catalyst system.

In an aspect, the composition can comprise a chromium (III) $C_3$-$C_{25}$ carboxylate composition that can be characterized as having a KBr pellet infrared spectrum with a $\upsilon_{asym}$ ($CO_2$) infrared absorbance peak within 110 cm$^{-1}$ of the $\upsilon_{sym}$ ($CO_2$) infrared peak and having an infrared absorbance peak height ratio of a $\upsilon_{asym}$ ($CO_2$) infrared absorbance peak at 1516±15 cm$^{-1}$ to infrared absorbance peak located at 700±50 cm$^{-1}$ greater than or equal to 3:1. In another aspect, the composition can comprise a chromium(III) $C_3$-$C_{25}$ carboxylate composition that can be characterized as having a goodness of fit test value, $R^2$, of at least 0.6 when comparing high-energy X-ray diffraction g(r) data points of the chromium(III) carboxylate composition to calculated high energy X-ray diffraction g(r) data points of a theoretical model of mononuclear chromium(III) acetate over an r range from 1.3 Angstroms to 4 Angstroms. In yet another aspect, the composition can comprise a chromium(III) $C_3$-$C_{25}$ carboxylate composition that can be produced by a process comprising contacting under substantially anhydrous and substantially acid-free conditions 1) a chromium(III) precursor having a formula $CrX_3L_l$ where each X independently is a halide, each L independently is a $C_2$-$C_{10}$ ether, a $C_2$-$C_{10}$ thioether, a $C_2$-$C_5$ nitrile, a $C_1$-$C_{30}$ amine, or a $C_3$-$C_{30}$ phosphine, or any combination thereof, and l ranges from 0 to 7, 2) a Group 1 or Group 2 metal $C_3$-$C_{25}$ carboxylate, and 3) a first solvent to form a chromium(III) carboxylate. The catalyst system can further comprise a pyrrole compound, a metal hydrocarbyl compound, and optionally, a halogen containing compound.

In an aspect, the composition can be utilized as a catalyst system. In an aspect, a process to prepare the catalyst system can comprise contacting a chromium(III) $C_3$-$C_{25}$ carboxylate composition, a pyrrole compound, a metal hydrocarbyl compound, and optionally, a halogen containing compound. In some embodiments, the process to prepare the catalyst system can further comprise contacting two or more of the chromium(III) $C_3$-$C_{25}$ carboxylate composition, the pyrrole compound, the metal hydrocarbyl compound, and the optional halogen containing compound in the presence of an unsaturated organic compound. In embodiment, the unsaturated organic compound can comprise a $C_2$ to $C_{20}$ aliphatic hydrocarbon olefin, a $C_6$ to $C_{20}$ arene, or any combination thereof. In some embodiments, the process to prepare the catalyst system can comprise contacting the chromium(III) carboxylate composition, the pyrrole compound, and the metal hydrocarbyl compound simultaneously. In other embodiments, the process to prepare the catalyst system can comprise contacting the pyrrole compound and the metal hydrocarbyl compound (all or a portion thereof) to form a pyrrole/metal hydrocarbyl compound mixture prior to contacting the pyrrole compound with the chromium(III) carboxylate composition.

In an embodiment wherein the catalyst system comprises a halogen containing compound, the halogen containing compound can be, comprise, or consist essentially of, inorganic metal halide, a hydrocarbyl metal halide, a halogenated hydrocarbon, or any combination thereof. In some embodiments, wherein the catalyst system comprises a halogen containing compound, a composition containing the halogen containing compound can comprise, or consist essentially of, (i) an inorganic metal halide, (ii) a hydrocarbyl metal halide, (iii) a mixture of an inorganic metal halide and a non-halide metal hydrocarbyl compound, or (iv) a mixture of a hydrocarbyl metal halide and a non-halide metal hydrocarbyl compound. In an embodiment where the catalyst system comprises a metal halide, the process to prepare a catalyst system can comprise contacting the chromium(III) carboxylate composition with at least one of the pyrrole compound or the metal halide prior to contacting the chromium(III) carboxylate composition with the metal hydrocarbyl compound; alternatively, the method can comprise contacting the metal hydrocarbyl compound with at least one of the pyrrole compound or the metal halide prior to contacting the chromium(III) carboxylate composition with the metal hydrocarbyl compound; or alternatively, the method can comprise contacting the chromium(III) carboxylate composition, the pyrrole compound, or a composition comprising the chromium(III) carboxylate composition and the pyrrole compound with a non-halide metal hydrocarbyl compound prior to contacting the composition containing the metal halide. In another embodiment where the catalyst system comprises a halogen containing compound, the chromium(III) $C_3$-$C_{25}$ carboxylate composition, the pyrrole compound, or a composition comprising the chromium(III) $C_3$-$C_{25}$ carboxylate composition and the pyrrole compound can be contacted with a non-halide metal hydrocarbyl compound prior to contacting a composition containing the halogen containing compound; or alternatively, the chromium(III) $C_3$-$C_{25}$ carboxylate composition and the pyrrole compound are contacted prior to contacting the pyrrole compound or the chromium(III) $C_3$-$C_{25}$ carboxylate composition with the composition containing the halogen containing compound. In an embodiment where the catalyst system comprises a halogen containing compound, the process to prepare the catalyst system can comprise (1) contacting the pyrrole compound, a composition containing the halogen containing compound, and optionally, the chromium(III) $C_3$-$C_{25}$ carboxylate composition to form a mixture and (2) the mixture is contacted with a non-halide metal hydrocarbyl compound. In an embodiment where the catalyst system comprises a halogen containing compound, the process to prepare a catalyst system can comprise (1) contacting the pyrrole compound, the metal hydrocarbyl compound, and optionally the halogen containing compound to form a mixture, and (2) contacting the mixture with the chromium(III) $C_3$-$C_{25}$ carboxylate composition.

In another aspect, the catalyst system can be utilized in a process for trimerizing olefins. In an embodiment, the process for trimerizing olefins with a catalyst system comprising a chromium(III) $C_3$-$C_{25}$ carboxylate composition, a pyrrole compound, a metal hydrocarbyl compound, and optionally, a halogen containing compound, the process can comprise contacting an olefin comprising, or consisting essentially of ethylene, the chromium(III) $C_3$-$C_{25}$ carboxylate composition, the pyrrole compound, the metal hydrocarbyl compound, and the optional halogen containing compound to produce a trimerization product. In an embodiment, the process for trimerizing an olefin can comprise a) contacting the chromium(III) $C_3$-$C_{25}$ carboxylate composition, the pyrrole compound, the metal hydrocarbyl compound, and optionally the halogen containing compound to form the catalyst system, b) contacting the catalyst system with the olefin; and c) producing an olefin trimerization product under trimerization conditions. In another embodiment, the process for trimerizing an olefin can comprise a) contacting the chromium(III) $C_3$-$C_{25}$ carboxylate composition, the pyrrole compound, the metal hydrocarbyl compound, and optionally the halogen containing compound to form the catalyst system, b) contacting the catalyst system with the olefin comprising, or consisting essentially of, ethylene; and c) producing an olefin trimerization product under trimerization conditions wherein the chromium(III) $C_3$-$C_{25}$ carboxylate composition and the metal hydrocarbyl compound are not contacted prior to contacting the olefin; alternatively, wherein the chromium(III) $C_3$-$C_{25}$ carboxylate composition and the metal hydrocarbyl compound are not contacted prior to contacting either the metal hydrocarbyl compound or the chromium(III) $C_3$-$C_{25}$ carboxylate with the olefin; or alternatively, the chromium(III) $C_3$-$C_{25}$ carboxylate composition and the metal hydrocarbyl compound substantially simultaneously contact ethylene. In an embodiment where the olefin comprises ethylene, the trimerization product can be formed under trimerization conditions comprising an ethylene partial pressure ranging from 20 psi to 2500 psi.

DETAILED DESCRIPTION OF THE INVENTION

Figure 1:
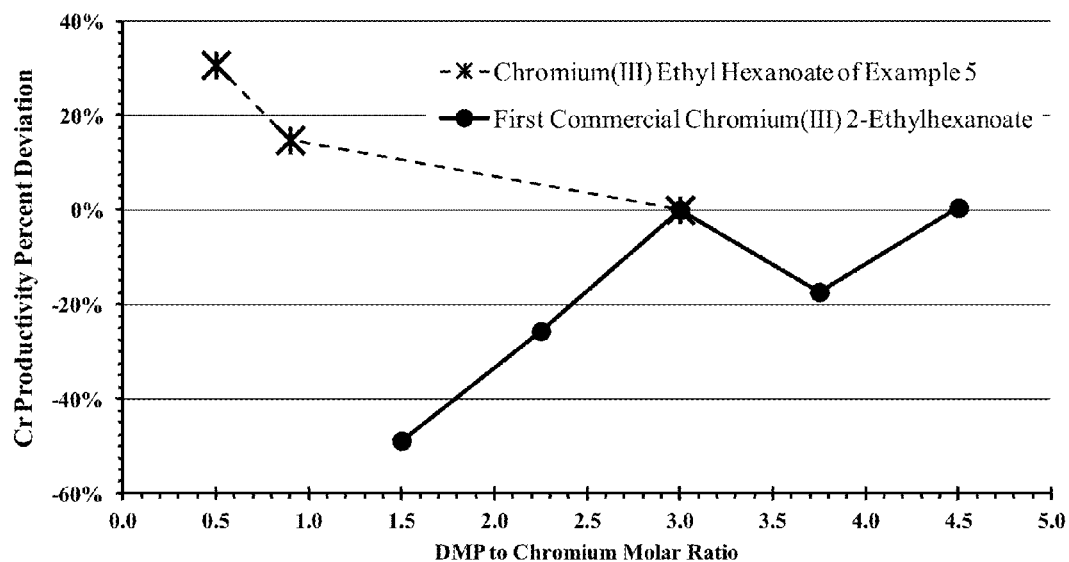
FIG. 1 presents a plot of the percent deviation of the mole percent 2,5-dimethylpyrrole (DMP) from the standard mole percent of DMP, versus the percent difference in the resulting 1-hexene productivity, illustrating the change in ethylene oligomerization catalytic performance of a conventional tris(2-ethylhexanoate)chromium(III) [Cr(EH)$_3$] based catalyst system.

According to various aspects and embodiments of this disclosure, there is provided new chromium carboxylate compositions, new methods of preparing chromium carboxylate compositions, new catalyst systems, methods for preparing new catalyst systems, and methods for use of the new catalyst systems for preparing an olefin oligomerization product. In one aspect, new trimerization catalyst systems described here and prepared according to the various disclosed embodiments can achieve good catalyst system activity while using comparatively smaller amounts of alkyl aluminum and similar activators.

According to the various aspects and embodiments of this disclosure, there are provided: 1) catalyst components and methods that encompass combining a pyrrole and a metal alkyl compound to form a mixture, in which the mixture can contain a metal pyrrolide formed in this contacting step that constitutes a catalyst system component; 2) catalyst components and methods that encompass combining under substantially acid-free and anhydrous conditions, a transition metal precursor and a Group 1 or Group 2 metal carboxylate in an aprotic coordinating solvent, to provide a transition metal carboxylate composition; and 3) catalyst components and methods that encompass the combination of these first two catalyst components and methods, that is, they include combining a pyrrole and a metal alkyl compound to form a mixture that can contain a metal pyrrolide, and combining a transition metal precursor and a Group 1 or Group 2 metal carboxylate in an aprotic coordinating solvent, to provide a transition metal carboxylate composition, both of which constitute catalyst system components.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2$^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Groups of elements of the table are indicated using the numbering scheme indicated in the version of the periodic table of elements published in *Chemical and Engineering News*, 63(5), 27, 1985. In some instances a group of elements can be indicated using a common name assigned to the group; for example alkali metals for Group 1 elements, alkaline earth metals for Group 2 elements, transition metals for Group 3-12 elements, and halogens for Group 17 elements.

Regarding claim transitional terms or phrases, the transitional term "comprising", which is synonymous with "including," "containing," "having," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Absent an indication to the contrary, when describing a compound or composition "consisting essentially of" is not to be construed as "comprising," but is intended to describe the recited component that includes materials which do not significantly alter the composition or method to which the term is applied. For example, a feedstock consisting of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of apply only to the feature class which is utilized and it is possible to have different transitional terms or phrases utilized with different features within a claim. For example, a method can comprise several recited steps (and other non-recited steps) but utilize a catalyst system preparation consisting of specific or alternatively consist of specific steps and/or utilize a catalyst system comprising recited components and other non-recited components.

Within this disclosure, use of "comprising" or an equivalent expression contemplates the use of the phrase "consisting essentially of," "consists essentially of," or equivalent expressions as an alternative embodiments to the open-ended expression. Additionally, use of "comprising" or an equivalent expression or use of "consisting essentially of" in the specification contemplates the use of the phrase "consisting of," "consists of," or equivalent expression as an alternative to the open-ended expression or middle ground expression, respectively. For example, "comprising" should be understood to include "consisting essentially of," and "consisting of" as alternative embodiments for the aspect, features, and/or elements presented in the specification unless specifically indicated otherwise.

The terms "a," "an," and "the" are intended, unless specifically indicated otherwise, to include plural alternatives (e.g., at least one). For instance, the disclosure of "a chromium halide hydrate" is meant to encompass one chromium halide hydrate, or mixtures or combinations of more than one chromium halide hydrate unless otherwise specified.

In this disclosure, the terms first, second, and third, among others, can be utilized to differentiate multiple occurrences of a similar element. For example a process can utilize two or more solvents in one or more steps of a process, or alternatively two different solvents in a mixture. The differentiating term can be applied to any element described herein when necessary to provide a differentiation. It should be understood that the numerical or alphabetical precedence of the differentiating terms do not imply a particular order or preference of the element in a method or compound described herein unless specifically specified otherwise.

In this disclosure, a process can have multiple steps or can include features having a number of different elements (e.g., components in a catalyst system or components in an olefin trimerization oligomerization process, among other features). This steps and/or elements can be designated utilizing the series a), b), c), etc., i), ii), iii), etc., (a), (b), (c), etc., and/or (i), (ii), (iii), etc. (among other designation series) as necessary to provide a designation for each process step and/or element. It should be understood that the numerical or alphabetical precedence of the designations within a designation series does not imply a particular order or preference of the process step in a process described herein, the feature(s) described herein, and/or an element(s) in a feature unless specifically specified otherwise or necessitated by other process steps, elements, and/or element features. Additionally, these designations series are provided to differentiate different process steps and/or elements in a feature and can be utilized as necessary, and without regard to the designation series utilized for a particular step, element, or feature utilized within this description as long as the designation series consistently distinguish different features, different process steps, and/or different elements of a feature.

The term "substantially anhydrous," when referring to a compound, solution, solvent, or general conditions, means that the amount of water is less than or equal to 100 ppm (by weight) based upon the weight of the compound, solution, or solvent. The term "substantially dry," when referring to an atmosphere, means that the atmosphere, regardless of the atmosphere's composition, means that the amount of water in the atmosphere is less than or equal to 100 ppm, by weight.

The term "acid-free" refers to process being carried out without the discrete addition of an acidic or protic compound or substance. For example, "acid-free" means that there has been no addition of a carboxylic acid, mineral or inorganic acid, alcohol, or other protic compounds or substances to the reaction or solution described as "acid-free." The term "acid-free" is not intended to reflect a 0 ppm concentration of $[H_3O]^+$ or 0 ppm concentration of an acidic or protic source, as "acid-free" conditions still can reflect the presence of small amounts of acid that can exist as contaminants in an added component or can arise as a by-product during the course of the reaction or preparation of a reaction solution. For example, the transition metal carboxylate(s) and transition metal carboxylate composition(s) prepared by the disclosed methods can contain measurable amounts of free carboxylic acid, or other protogenic compounds that can arise as contaminants or as by-products during the preparation of such compounds or compositions. The term "substantially acid-free," when referring to a compound, solution, solvent, or general conditions, means that the amount of acid is less than or equal to 1000 ppm (by weight) based upon the weight of the compound, solution, or solvent.

The terms "room temperature" or "ambient temperature" are used herein to describe any temperature from 15° C. to 35° C. wherein no external heat or cooling source is directly applied to the reaction vessel. Accordingly, the terms "room temperature" and "ambient temperature" encompass the individual temperatures and any and all ranges, subranges, and combinations of subranges of temperatures from 15° C. to 35° C. wherein no external heating or cooling source is directly applied to the reaction vessel.

The term "atmospheric pressure" is used herein to describe an earth air pressure wherein no external pressure modifying means is utilized. Generally, unless practiced at extreme earth altitudes, "atmospheric pressure" is about 1 atmosphere (alternatively, about 14.7 psi or about 101 kPa).

The term "aprotic" is used herein to describe a solvent that is non-protogenic under the given conditions. Thus, an "aprotic" compound or solvent is not capable of acting as a proton donor, either strongly or weakly acidic as a Brønsted acid, under the specific conditions. For example, acetonitrile can be an aprotic solvent even though it can be deprotonated in the presence of a strong base such as potassium tert-butoxide.

The terms "simultaneous," "simultaneously contact," "contact simultaneously," and their derivatives when referring to a contact method refers to a contact method wherein the two or more recited compounds, mixtures, streams, and/or compositions are contacted by flowing into a common junction, pot, vessel, or reactor, among others, at the same time. The terms "substantially simultaneously," "substantially simultaneously contact," "contact substantially simultaneously," and their derivatives when referring to a contact method refers to a contact method wherein, during the contact of two or more recited compounds, mixtures, streams, and/or compositions, the two or more recited compounds, mixtures, streams, and/or compositions are contacted such that for some period during the during the contact process the two or more recited compounds, mixtures, streams, and/or compositions flow into a common junction, pot, vessel, or reactor at the same time. It should be noted that the terms "substantially simultaneously," "substantially simultaneously contact," "contact substantially simultaneously," and their derivatives do not mean that the two or more recited compounds, mixtures, streams, and/or compositions are contacted simultaneously over the entire addition of each of the two or more recited compounds, mixtures, streams, and/or compositions. The terms "substantially simultaneously," "substantially simultaneously contact," "contact substantially simultaneously," and it derivatives include scenarios where the flow of one of the (or less than all of the) recited compounds, mixtures, streams, and/or compositions can be initiated into the common junction, pot, vessel, or reactor before the others and/or the flow of one of the (or less than all of the) recited compounds, mixtures, streams, and/or compositions into the common junction, pot, vessel, or reactor can be completed, stopped, or discontinued before the other recited compounds, mixtures, streams, and/or compositions. In any embodiment or aspect described herein, the terms "simultaneously," "simultaneously contact," "contact simultaneously," and their derivatives can be modified by the inclusion of a term providing a quantity of each of the recited compounds, mixtures, streams, and/or compositions which can be contacted simultaneously to indicate scenarios of various degrees of "substantially simultaneously," "substantially simultaneously contact," "contact substantially simultaneously," and their derivatives. For example, at least 20%, 30%, 40%, 50%, 60%, 70%, 75%, 80%, 85%, 90%, 95% of each of the recited compounds, mixtures, streams, and/or compositions can be "simultaneously contacted" or "contacted simultaneously." Generally, the percentages of the recited compounds, mixtures, streams, and/or compositions that can be "simultaneously contacted" or "contacted simultaneously" can be by weight (weight percent), by volume (volume percent), or by mole (mole percent). Unless otherwise specified recited compounds, mixtures, streams, and/or compositions that are "substantially simultaneously," "substantially simultaneously contact," "contact substantially simultaneously," and their derivatives shall mean that at least 50% of each of the recited compounds, mixtures, streams, and/or compositions can be "simultaneously contacted" or "contacted simultaneously."

It should be further noted, that in reference to contact method or process, "simultaneously," "simultaneously contact," "contact simultaneously," "substantially simultaneously contact," "contact substantially simultaneously," and their derivatives is different than a process or method wherein one or more first materials (e.g., compound, mixture, stream, and/or composition) already reside in a pot, vessel, or reactor and one or more other compounds, mixtures, streams, and/or compositions are added to the pot, vessel, or reactor. In this instance the first material in the pot, vessel, or reactor does not flow into the pot, vessel, or reactor concurrently with the other compounds, mixtures, streams, and/or compositions and the material in the pot. Thus, the first material and the other compounds, mixtures, streams, and/or compositions cannot be said to be "simultaneously contacted," "contacted simultaneously," "substantially simultaneously contacted," or "contacted substantially simultaneously."

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

A chemical "group" is described according to how that group is formally derived from a reference or "parent" compound, for example, by the number of hydrogen atoms formally removed from the parent compound to generate the group, even if that group is not literally synthesized in this manner. These groups can be utilized as substituents or coordinated or bonded to metal atoms. By way of example, an "alkyl group" formally can be derived by removing one hydrogen atom from an alkane, while an "alkylene group" formally can be derived by removing two hydrogen atoms from an alkane. Moreover, a more general term can be used to encompass a variety of groups that formally can be derived by removing any number ("one or more") hydrogen atoms from a parent compound, which in this example can be described as an "alkane group," and which encompasses an "alkyl group," an "alkylene group," and materials have three or more hydrogens atoms, as necessary for the situation, removed from the alkane. Throughout, the disclosure that a substituent, ligand, or other chemical moiety can constitute a particular "group" implies that the well-known rules of chemical structure and bonding are followed when that group is employed as described. When describing a group as being "derived by," "derived from," "formed by," or "formed from," such terms are used in a formal sense and are not intended to reflect any specific synthetic methods or procedure, unless specified otherwise or the context requires otherwise. Other identifiers or qualifying terms may be utilized to indicate the presence or absence of a particular substituent, a particular regiochemistry and/or stereochemistry, or the presence or absence of a branched underlying structure or backbone.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. "Substituted" is intended to be non-limiting and include inorganic substituents or organic substituents.

A "carboxylate" is an anionic organic group having the general formula $[ZC(=O)O]^-$ where Z represents any organyl group.

A "nitrile" is an organic compound having the formula $R^1C \equiv N$, wherein $R^1$ is provided herein. Aliphatic nitriles are nitriles which do not contain aromatic groups. Aromatic nitriles are nitriles which have aromatic groups (e.g., benzonitrile).

An "ether" is an organic compound having the formula $R^2$—O—$R^3$ wherein $R^2$ and $R^3$ are provided herein. Aliphatic ethers are ethers which do not have aromatic groups. Aromatic ethers are ethers which have aromatic groups (either containing or not containing the ether oxygen atom). Acyclic ethers are ethers in which the ether oxygen atom is not contained in a ring (but can have a ring, aliphatic or aromatic, as or within $R^2$ and/or $R^3$). Cyclic ethers are ethers wherein the ether oxygen atom is incorporated within a ring (either an aliphatic ring or aromatic ring). Aliphatic cyclic ethers are cyclic ethers wherein the ether oxygen atom is incorporated within an aliphatic ring (e.g., tetrahydrofuran, 2,3-dihydrofuran, pyran, among others). Aromatic cyclic ethers are ethers wherein the ether oxygen atom is incorporated within an aromatic ring or aromatic ring system (e.g., furan, benzofuran, isobenzofuran, among others).

A "thioether" is an organic compound having the formula $R^4$—S—$R^5$ wherein $R^4$ and $R^5$ are provided herein. Aliphatic thioethers are thioethers which do not have aromatic groups. Aromatic thioethers are ethers which have aromatic groups (either containing or not containing the thioether sulfur atom). Acyclic thioethers are thioethers in which the thioether sulfur atom is not contained in a ring (but can have ring, aliphatic or aromatic, as or within $R^4$ and/or $R^5$). Cyclic thioethers are thioethers wherein the thioether sulfur atom is incorporated within a ring (either an aliphatic ring or aromatic ring). Aliphatic cyclic thioethers are cyclic thioethers wherein the thioether sulfur atom is incorporated within an aliphatic ring (e.g., tetrahydrothiophene, thiane, among others). Aromatic cyclic thioethers are thioethers wherein the thioether sulfur atom is incorporated within an aromatic ring or aromatic ring system (e.g., thiophene, benzothiophene, among others).

An "amine" is an organic compound having the formula $NR^6R^7R^8$, $NHR^6R^7$, $NH_2R^6$, or $NH_3$, wherein $R^6$, $R^7$, and $R^8$ are provided herein. Aliphatic amines are amines which do not have aromatic groups. Aromatic amines are amines which have aromatic groups (either containing or not containing the amine nitrogen atom). Acyclic amines are amines in which the amine nitrogen atom is not contained in a ring (but can have a ring, aliphatic or aromatic, as or within $R^6$, $R^7$, and/or $R^8$). Cyclic amines are amines wherein the amine nitrogen atom is incorporated within a ring (either an aliphatic ring or aromatic ring). Aliphatic cyclic amines are cyclic amines wherein the amine nitrogen atom is incorporated within an aliphatic ring (e.g., pyrrolidine, piperidine, among others). Aromatic cyclic amines are amines wherein the amine nitrogen atom is incorporated within an aromatic ring or aromatic ring system (e.g., pyridine, pyrrole, indole, among others).

A "phosphine" is an organic compound having the formula $PR^9R^{10}R^{11}$, $PHR^9R^{10}$, or $PH_2R^9$, wherein $R^9$, $R^{10}$, and $R^{11}$ are provided herein. Aliphatic phosphines are phosphines which do not have aromatic groups. Aromatic phosphines are phosphines which have aromatic groups (either containing or not containing the phosphine phosphorus atom). Acyclic phosphines are phosphines in which the phosphine phosphorus atom is not contained in a ring (but can have a ring, aliphatic or aromatic, as or within $R^9$, $R^{10}$, and/or $R^{11}$). Cyclic phosphines are phosphines wherein the phosphine phosphorus atom is incorporated within a ring (either an aliphatic ring or aromatic ring). Aliphatic cyclic phosphines are cyclic phosphines wherein the phosphine phosphorus atom is incorporated within an aliphatic ring (e.g., phospholane, phosphinane, among others). Aromatic cyclic phosphines are phosphines wherein the phosphine phosphorus atom is incorporated within an aromatic ring or aromatic ring system (e.g., phosphole, among others).

A "phosphite" is an organic compound having the formula $P(OR^{12})(OR^{13})(OR^{14})$ or $PH(O)(OR^{12})(OR^{13})$, wherein $R^{12}$, $R^{13}$, and $R^{14}$ are provided herein. Aliphatic phosphites are phosphites which do not have aromatic groups. Aromatic phosphites are phosphites which have aromatic groups (either containing or not containing the phosphite phosphorus atom). Acyclic phosphites are phosphites in which the phosphite phosphorus atom is not contained in a ring (but can have a ring, aliphatic or aromatic, as or within $R^{12}$, $R^{13}$, and/or $R^{14}$). Cyclic phosphites are phosphites wherein the phosphite phosphorus atom is incorporated within a ring (either an aliphatic ring or aromatic ring). Aliphatic cyclic phosphites are cyclic phosphites wherein the phosphite phosphorus atom is incorporated within an aliphatic ring. Aromatic cyclic phosphites are phosphites wherein the phosphite phosphorus atom is incorporated within an aromatic ring or aromatic ring system.

The term "cyclic" as compared to an "acyclic" when referring to an ether, thioether, amine, phosphine, or phosphite is used to refer to a compound in which the heteroatom O, S, N, or P, respectively, is encompassed within a cyclic structure, which also encompasses the $R^2$ and $R^3$ groups of the ether $R^2$—O—$R^3$, the $R^4$ and $R^5$ groups of the thioether $R^4$—S—$R^5$, any combination of $R^6$, $R^7$, and $R^8$ of the amine $NR^6R^7R^8$ or $NHR^6R^7$, any combination of $R^9$, $R^{10}$, and $R^{11}$ of the phosphine $PR^9R^{10}R^{11}$ or $PHR^9R^{10}$, or any combination of $R^{12}$, $R^{13}$, and $R^{14}$ of the phosphite $P(OR^{12})(OR^{13})(OR^{14})$ or $PH(O)(OR^{12})(OR^{13})$. For example, a "cyclic ether" is an analog of the acyclic ether structure $R^2$—O—$R^3$, in which $R^2$ and $R^3$ are generally as provided above in describing the (acyclic) ether $R^2$—O—$R^3$, except that $R^2$ and $R^3$ are linked or bonded to each other by removing a hydrogen atom from each of $R^2$ and $R^3$ and forming a bond between $R^2$ and $R^3$ where the hydrogen atoms were removed so as to form a cyclic structure that includes the ether oxygen. Tetrahydrofuran (THF) is a prototypical cyclic ether that can be formally derived by removing a hydrogen atom from each $CH_3$ groups of diethyl ether ($CH_3CH_2OCH_2CH_3$) or a hydrogen atom from each $CH_3$ groups of methyl n-propyl ether ($CH_3CH_2CH_2OCH_3$), followed by linking or bonding the two carbons from which the hydrogen atoms are removed. Similarly, the cyclic ether 2-methyloxetane can be formally derived by removing a hydrogen atom from the $CH_3$ group of one ethyl group of ethyl ether and a hydrogen atom from the $CH_2$ of the other ethyl group of diethyl ether ($CH_3CH_2OCH_2CH_3$), followed by a formal linking of the two carbons from which the hydrogen atoms are removed.

The term "organyl group" is used herein in accordance with the definition specified by IUPAC: an organic substituent group, regardless of functional type, having one free valence at a carbon atom. Similarly, an "organylene group" refers to an organic group, regardless of functional type, derived by removing two hydrogen atoms from an organic compound, either two hydrogen atoms from one carbon atom or one hydrogen atom from each of two different carbon atoms. An "organic group" refers to a generalized group formed by removing one or more hydrogen atoms from carbon atoms of an organic compound. Thus, an "organyl group," an "organylene group," and an "organic group" can contain organic functional group(s) and/or atom(s) other than carbon and hydrogen, that is, an organic group that can comprise functional groups and/or atoms in addition to carbon and hydrogen. For instance, non-limiting examples of atoms other than carbon and hydrogen can include, but is not limited to, halogens, oxygen, sulfur, nitrogen, and phosphorus, among other elements. Non-limiting examples of functional groups include ethers, aldehydes, ketones, esters, sulfides, amines, and phosphines, and so forth. In one aspect, the hydrogen atom(s) removed to form the "organyl group," "organylene group," or "organic group" can be attached to a carbon atom belonging to a functional group, for example, an acyl group (—C(O)R), a formyl group (—C(O)H), a carboxy group (—C(O)OH), a hydrocarboxycarbonyl group (—C(O)OR), a cyano group (—C≡N), a carbamoyl group (—C(O)NH$_2$), a N-hydrocarbylcarbamoyl group (—C(O)NHR), or N,N'-dihydrocarbylcarbamoyl group (—C(O)NR$_2$), among other possibilities. In another aspect, the hydrogen atom(s) removed to form the "organyl group," "organylene group," or "organic group" can be attached to a carbon atom not belonging to, and remote from, a functional group, for example, —CH$_2$C(O)CH$_3$, and —CH$_2$NR$_2$, among other groups. An "organyl group," "organylene group," or "organic group" can be aliphatic, inclusive of being cyclic or acyclic, or can be aromatic. "Organyl groups," "organylene groups," and "organic groups" also can encompass heteroatom-containing rings, heteroatom-containing ring systems, heteroaromatic rings, and heteroaromatic ring systems. "Organyl groups," "organylene groups," and "organic groups" can be linear or branched unless otherwise specified. Finally, it is noted that the "organyl group," "organylene group," or "organic group" definitions include "hydrocarbyl group," "hydrocarbylene group," "hydrocarbon group," respectively, and "alkyl group," "alkylene group," and "alkane group," respectively, as members.

The term "organyl group consisting of inert functional groups" refers to an organyl group wherein the organic functional group(s) and/or atom(s) other than carbon and hydrogen present in the functional group are restricted to those functional group(s) and/or atom(s) other than carbon and hydrogen which do not complex with a metal compound and/or are inert under the process conditions defined herein. Thus, the term or variation of the term "organyl groups consisting of inert functional groups" further defines the particular organyl groups that can be present within the organyl group consisting of inert functional groups. Additionally, the term "organyl group consisting of inert functional groups" can refer to the presence of one or more inert functional groups within the organyl group. The term or variation of the term "organyl group consisting of inert functional group" includes the hydrocarbyl group as a member. Similarly, an "organylene group consisting of inert functional groups" refers to an organic group formed by removing two hydrogen atoms from one or two carbon atoms of an organic compound consisting of inert functional groups and an "organic group consisting of inert functional group" refers to a generalized organic group consisting of inert functional groups formed by removing one or more hydrogen atoms from one or more carbon atoms of an organic compound consisting of inert functional groups.

For purposes of this application, an "inert functional group" is a group having a free valence on a heteroatom which does not substantially interfere with the process described herein in which the material having an inert functional group takes part and/or does not complex with the metal compound of the metal complex. The term "does not complex with the metal compound" can include groups that could complex with a metal compound but in particular molecules described herein may not complex with a metal compound due to its positional relationship within a ligand. Thus, the inertness of a particular functional group is not only related to the functional group's inherent inability to complex the metal compound but can also be related to the functional group's position within the metal complex. Non-limiting examples of inert functional groups which do not substantially interfere with processes described herein can include a halide (fluoride, chloride, bromide, and iodide), nitro, hydrocarboxy groups (e.g, alkoxy, and/or aroxy, among others), and/or hydrocarbosulfidyl groups (e.g., RS—), among others.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates that the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include ethyl, phenyl, tolyl, propenyl, and the like. Similarly, a "hydrocarbylene group" refers to a group formed by removing two hydrogen atoms from a hydrocarbon, either two hydrogen atoms from one carbon atom or one hydrogen atom from each of two different carbon atoms. Therefore, in accordance with the terminology used herein, a "hydrocarbon group" refers to a generalized group formed by removing one or more hydrogen atoms (as necessary for the particular group) from a hydrocarbon. A "hydrocarbyl group," "hydrocarbylene group," and "hydrocarbon group" can be acyclic or cyclic groups, and/or can be linear or branched. A "hydrocarbyl group," "hydrocarbylene group," and "hydrocarbon group" can include rings, ring systems, aromatic rings, and aromatic ring systems, which contain only carbon and hydrogen. "Hydrocarbyl groups," "hydrocarbylene groups," and "hydrocarbon groups" include, by way of example, aryl, arylene, arene groups, alkyl, alkylene, alkane group, cycloalkyl, cycloalkylene, cycloalkane groups, aralkyl, aralkylene, and aralkane groups, respectively, among other groups as members.

An aliphatic compound is an acyclic or cyclic, saturated or unsaturated, carbon compound, excluding aromatic compounds. An "aliphatic group" is a generalized group formed by removing one or more hydrogen atoms (as necessary for the particular group) from the carbon atom of an aliphatic compound. Aliphatic compounds and aliphatic groups can contain organic functional group(s) and/or atom(s) other than carbon and hydrogen.

The term "alkane" whenever used in this specification and claims refers to a saturated hydrocarbon compound. Other identifiers can be utilized to indicate the presence of particular groups in the alkane (e.g., halogenated alkane indicates that the presence of one or more halogen atoms replacing an equivalent number of hydrogen atoms in the alkane). The term "alkyl group" is used herein in accordance with the definition specified by IUPAC: a univalent group formed by removing a hydrogen atom from an alkane. Similarly, an "alkylene group" refers to a group formed by removing two hydrogen atoms from an alkane (either two hydrogen atoms from one carbon atom or one hydrogen atom from two different carbon atoms). An "alkane group" is a general term that refers to a group formed by removing one or more hydrogen atoms (as necessary for the particular group) from an alkane. An "alkyl group," "alkylene group," and "alkane group" can be acyclic or cyclic groups, and/or can be linear or branched unless otherwise specified. Primary, secondary, and tertiary alkyl group are derived by removal of a hydrogen atom from a primary, secondary, tertiary carbon atom, respectively, of an alkane. The n-alkyl group derived by removal of a hydrogen atom from a terminal carbon atom of a linear alkane. The groups $RCH_2$ (where R is not H), $R_2CH$ (where R is not H), and $R_3C$ (where R is not H) are primary, secondary, and tertiary alkyl groups, respectively.

A "cycloalkane" is a saturated cyclic hydrocarbon, with or without side chains, for example, cyclobutane. Unsaturated cyclic hydrocarbons having one or more endocyclic double or one triple bond are called cycloalkenes and cycloalkynes, respectively. Cycloalkenes and cycloalkynes having only one, only two, only three, and so forth, endocyclic double or triple bonds can be identified by use of the term "mono," "di," "tri," and so forth, within the name of the cycloalkene or cycloalkyne. Cycloalkenes and cycloalkynes can further identify the position of the endocyclic double or triple bonds. Other identifiers can be utilized to indicate the presence of particular groups in the cycloalkane (e.g., halogenated cycloalkane indicates the presence of one or more halogen atoms replacing an equivalent number of hydrogen atoms in the cycloalkane).

A "cycloalkyl group" is a univalent group derived by removing a hydrogen atom from a ring carbon atom of a cycloalkane. For example, a 1-methylcyclopropyl group and a 2-methylcyclopropyl group are illustrated as follows.

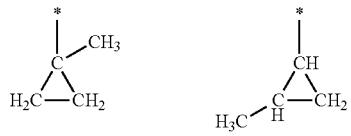

Similarly, a "cycloalkylene group" refers to a group derived by removing two hydrogen atoms from a cycloalkane, at least one of which is a ring carbon. Thus, a "cycloalkylene group" includes both a group derived from a cycloalkane in which two hydrogen atoms are formally removed from the same ring carbon, a group derived from a cycloalkane in which two hydrogen atoms are formally removed from two different ring carbons, and a group derived from a cycloalkane in which a first hydrogen atom is formally removed from a ring carbon and a second hydrogen atom is formally removed from a carbon atom that is not a ring carbon. A "cycloalkane group" refers to a generalized group formed by removing one or more hydrogen atoms (as necessary for the particular group and at least one of which is a ring carbon) from a cycloalkane. It should be noted that according to the definitions provided herein, general cycloalkane groups (including cycloalkyl groups and cycloalkylene groups) include those having zero, one, or more than one hydrocarbyl substituent groups attached to a cycloalkane ring carbon atom (e.g., a methylcyclopropyl group) and is member of the group of hydrocarbon groups. However, when referring to a cycloalkane group having a specified number of cycloalkane ring carbon atoms (e.g., cyclopentane group or cyclohexane group, among others), the base name of the cycloalkane group having a defined number of cycloalkane ring carbon atoms refers to the unsubstituted cycloalkane group (including having no hydrocarbyl groups located on cycloalkane group ring carbon atom). Consequently, a substituted cycloalkane group having a specified number of ring carbon atoms (e.g., substituted cyclopentane or substituted cyclohexane, among others) refers to the respective group having one or more substituent groups (including halogens, hydrocarbyl groups, or hydrocarboxy groups, among other substituent groups) attached to a cycloalkane group ring carbon atom. When the substituted cycloalkane group having a defined number of cycloalkane ring carbon atoms is a member of the group of hydrocarbon groups (or a member of the general group of cycloalkane groups), each substituent of the substituted cycloalkane group having a defined number of cycloalkane ring carbon atoms is limited to hydrocarbyl substituent group. One can readily discern and select general groups, specific groups, and/or individual substituted cycloalkane group(s) having a specific number of ring carbons atoms which can be utilized as member of the hydrocarbon group (or a member of the general group of cycloalkane groups).

The term "olefin" whenever used in this specification and claims refers to compounds that have at least one carbon-carbon double bond that is not part of an aromatic ring or ring system. The term "olefin" includes aliphatic and aromatic, cyclic and cyclic, and/or linear and branched compounds having at least one carbon-carbon double bond that is not part of an aromatic ring or ring system unless specifically stated otherwise. The term "olefin," by itself, does not indicate the presence or absence of heteroatoms and/or the presence or absence of other carbon-carbon double bonds unless explicitly indicated. Olefins having only one, only two, only three, and so forth, carbon-carbon double bonds can be identified by use of the term "mono," "di," "tri," and so forth, within the name of the olefin. The olefins can be further identified by the position of the carbon-carbon double bond(s).

The term "alkene" whenever used in this specification and claims refers to a hydrocarbon olefin that has at least one non-aromatic carbon-carbon double bond. The term "alkene" includes aliphatic or aromatic (an alkene having an aromatic substituent within the compound), cyclic or acyclic, and/or linear and branched compounds having at least one non-aromatic carbon-carbon double bond unless expressly stated otherwise. Alkenes having only one, only two, only three, and so forth, carbon-carbon double bonds can be identified by use of the term "mono," "di," "tri," and so forth, within the name. For example, alkamonoenes, alkadienes, and alkatrienes refer to a linear or branched hydrocarbon olefins having only one carbon-carbon double bond (general formula $C_nH_{2n}$), only two carbon-carbon double bonds (general formula $CnH_{2n-2}$), and only three carbon-carbon double bonds (general formula $C_nH_{2n-4}$), respectively. Alkenes can be further identified by the position of the carbon-carbon double bond(s). Other identifiers can be utilized to indicate the presence or absence of particular groups within an alkene. For example, a haloalkene refers to an alkene having one or more hydrogen atoms replace with a halogen atom.

An "alkenyl group" is a univalent group derived from an alkene by removal of a hydrogen atom from any carbon atom of the alkene. Thus, "alkenyl group" includes groups in which the hydrogen atom is formally removed from a sp2 hybridized (olefinic) carbon atom and groups in which the hydrogen atom is formally removed from any other carbon atom. For example and unless otherwise specified, propen-1-yl (—CH=CHCH$_3$), propen-2-yl[(CH$_3$)C=CH$_2$], and propen-3-yl (—CH$_2$CH=CH$_2$) groups are all encompassed with the term "alkenyl group." Similarly, an "alkenylene group" refers to a group formed by formally removing two hydrogen atoms from an alkene, either two hydrogen atoms from one carbon atom or one hydrogen atom from two different carbon atoms. An "alkene group" refers to a generalized group formed by removing one or more hydrogen atoms (as necessary for the particular group) from an alkene. When the hydrogen atom is removed from a carbon atom participating in a carbon-carbon double bond, the regiochemistry of the carbon from which the hydrogen atom is removed, and regiochemistry of the carbon-carbon double bond can both be specified. Alkenyl groups can also have more than one such multiple bond. The alkene group can also be further identified by the position of the carbon-carbon double bond(s). Other identifiers can be utilized to indicate the presence or absence of particular groups within an alkene group. For example, a haloalkene group refers to an alkene group having one or more hydrogen atoms replaced with a halogen atom.

The term "alkyne" is used in this specification and claims to refer to a hydrocarbon compound that has at least one non-aromatic carbon-carbon triple bond. The term "alkyne" includes aliphatic or aromatic (an alkyne having an aromatic substituent within the compound), cyclic or acyclic, and/or linear and branched compounds having at least one non-aromatic carbon-carbon triple bond unless expressly stated otherwise. Alkynes having only one, only two, only three, and so forth, carbon-carbon triple bonds can be identified by use of the term "mono," "di," "tri," and so forth, within the name. For example, alkamonoynes, alkadiynes, and alkatriynes refer to a linear or branched hydrocarbon olefins having only one carbon-carbon triple bond (general formula $C_nH_{2n-2}$), only two carbon-carbon triple bonds (general formula $C_nH_{2n-6}$), and only three carbon-carbon triple bonds (general formula $C_nH_{2n-10}$), respectively. Alkynes can be further identified by the position of the carbon-carbon triple bond(s). Other identifiers can be utilized to indicate the presence or absence of particular groups within an alkyne. For example, a haloalkyne refers to an alkyne having one or more hydrogen atoms replace with a halogen atom.

An "alkynyl group" is a univalent group derived from an alkyne by removal of a hydrogen atom from any carbon atom of the alkyne. Thus, "alkynyl group" includes groups in which the hydrogen atom is formally removed from a sp hybridized (acetylenic) carbon atom and groups in which the hydrogen atom is formally removed from any other carbon atom. For example and unless otherwise specified, propyn-1-yl (—C≡CCH$_3$) and propyn-1-yl (HC≡CCH$_2$—) groups are all encompassed with the term "alkynyl group." Similarly, an "alkynylene group" refers to a group formed by formally removing two hydrogen atoms from an alkyne, either two hydrogen atoms from one carbon atom if possible or one hydrogen atom from two different carbon atoms. An "alkyne group" refers to a generalized group formed by removing one or more hydrogen atoms (as necessary for the particular group) from an alkyne. Alkynyl groups can also have more than one such multiple bond. The alkyne group can also be further identified by the position of the carbon-carbon triple bond(s). Other identifiers can be utilized to indicate the presence or absence of particular groups within an alkyne group. For example, a haloalkyne group refers to an alkyne group having one or more hydrogen atoms replaced with a halogen atom.

The term "alpha olefin" as used in this specification and claims refers to an olefin that has a double bond between the first and second carbon atom of the longest contiguous chain of carbon atoms. The term "alpha olefin" includes linear and branched alpha olefins unless expressly stated otherwise. In the case of branched alpha olefins, a branch can be at the 2-position (a vinylidene) and/or the 3-position or higher with respect to the olefin double bond. The term "vinylidene" whenever used in this specification and claims refers to an alpha olefin having a branch at the 2-position with respect to the alpha olefin double bond. By itself, the term "alpha olefin" does not indicate the presence or absence of heteroatoms and/or the presence or absence of other carbon-carbon double bonds unless explicitly indicated. The terms "hydrocarbon alpha olefin" or "alpha olefin hydrocarbon" refer to alpha olefin compounds containing only hydrogen and carbon.

The term "linear alpha olefin" as used herein refers to a linear olefin having a double bond between the first and second carbon atom. The term "linear alpha olefin" by itself does not indicate the presence or absence of heteroatoms and/or the presence or absence of other carbon-carbon double bonds, unless explicitly indicated. The terms "linear hydrocarbon alpha olefin" or "linear alpha olefin hydrocarbon" refers to linear alpha olefin compounds containing only hydrogen and carbon.

The term "normal alpha olefin" whenever used in this specification and claims refers to a linear hydrocarbon mono-olefin having a double bond between the first and second carbon atom. It is noted that "normal alpha olefin" is not synonymous with "linear alpha olefin" as the term "linear alpha olefin" can include linear olefinic compounds having a double bond between the first and second carbon atoms and having heteroatoms and/or additional double bonds.

A "heterocyclic compound" is a cyclic compound having at least two different elements as ring member atoms. For example, heterocyclic compounds can comprise rings containing carbon and nitrogen (for example, tetrahydropyrrole and pyrrole, among others), carbon and oxygen (for example, tetrahydrofuran and furan, among others), or carbon and sulfur (for example, tetrahydrothiophene and thiophene, among others). Heterocyclic compounds and heterocyclic groups can be either aliphatic or aromatic.

A "heterocyclyl group" is a univalent group formed by removing a hydrogen atom from a heterocyclic ring or ring system carbon atom of a heterocyclic compound. By specifying that the hydrogen atom is removed from a heterocyclic ring or ring system carbon atom, a "heterocyclyl group" is distinguished from a "cycloheteryl group," in which a hydrogen atom is removed from a heterocyclic ring or ring system heteroatom. For example, a pyrrolidin-2-yl group illustrated below is one example of a "heterocyclyl group," and a pyrrolidin-1-yl group illustrated below is one example of a "cycloheteryl" group."

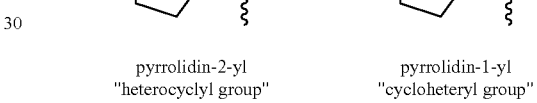

pyrrolidin-2-yl
"heterocyclyl group"

pyrrolidin-1-yl
"cycloheteryl group"

Similarly, a "heterocyclylene group" or more simply, a "heterocyclene group," refers to a group formed by removing two hydrogen atoms from a heterocyclic compound, at least one of which is from a heterocyclic ring or ring system carbon. Thus, in a "heterocyclylene group," at least one hydrogen is removed from a heterocyclic ring or ring system carbon atom, and the other hydrogen atom can be removed from any other carbon atom, including for example, the same heterocyclic ring or ring system carbon atom, a different heterocyclic ring or ring system ring carbon atom, or a non-ring carbon atom. A "heterocyclic group" refers to a generalized group formed by removing one or more hydrogen atoms (as necessary for the particular group and at least one of which is a heterocyclic ring carbon atom) from a heterocyclic compound.

A "cycloheteryl group" is a univalent group formed by removing a hydrogen atom from a heterocyclic ring or ring system heteroatom of a heterocyclic compound, as illustrated herein. By specifying that the hydrogen atom is removed from a heterocyclic ring or ring system heteroatom and not from a ring carbon atom, a "cycloheteryl group" is distinguished from a "heterocyclyl group" in which a hydrogen atom is removed from a heterocyclic ring or ring system carbon atom. Similarly, a "cycloheterylene group" refers to a group formed by removing two hydrogen atoms from an heterocyclic compound, at least one of which is removed from a heterocyclic ring or ring system heteroatom of the heterocyclic compound; the other hydrogen atom can be removed from any other atom, including for example, a heterocyclic ring or ring system ring carbon atom, another heterocyclic ring or ring system heteroatom, or a non-ring atom (carbon or heteroatom). A "cyclohetero group" refers to a generalized group formed by removing one or more hydrogen atoms (as necessary for the particular group and at least one of which is from a heterocyclic ring or ring system heteroatom) from a heterocyclic compound.

An aromatic compound is a compound containing a cyclically conjugated double bond system that follows the Hückel (4n+2) rule and contains (4n+2) pi-electrons, where n is an integer from 1 to 5. Aromatic compounds include "arenes" (hydrocarbon aromatic compounds) and "heteroarenes," also termed "hetarenes" (heteroaromatic compounds formally derived from arenes by replacement of one or more methine (—C=) carbon atoms of the cyclically conjugated double bond system with a trivalent or divalent heteroatoms, in such a way as to maintain the continuous pi-electron system characteristic of an aromatic system and a number of out-of-plane pi-electrons corresponding to the Hückel rule (4n+2). While arene compounds and heteroarene compounds are mutually exclusive members of the group of aromatic compounds, a compound that has both an arene group and a heteroarene group are generally considered a heteroarene compound. Aromatic compounds, arenes, and heteroarenes can be monocyclic (e.g., benzene, toluene, furan, pyridine, methylpyridine) or polycyclic unless otherwise specified. Polycyclic aromatic compounds, arenes, and heteroarenes, include, unless otherwise specified, compounds wherein the aromatic rings can be fused (e.g., naphthalene, benzofuran, and indole), compounds where the aromatic groups can be separate and joined by a bond (e.g., biphenyl or 4-phenylpyridine), or compounds where the aromatic groups are joined by a group containing linking atoms (e.g., carbon—the methylene group in diphenylmethane; oxygen—diphenyl ether; nitrogen—triphenyl amine; among other linking groups). As disclosed herein, the term "substituted" can be used to describe an aromatic group, an arene, or a heteroarene wherein a non-hydrogen moiety formally replaces a hydrogen in the compound, and is intended to be non-limiting.

An "aromatic group" refers to a generalized group formed by removing one or more hydrogen atoms (as necessary for the particular group and at least one of which is an aromatic ring carbon atom) from an aromatic compound. For a univalent "aromatic group," the removed hydrogen atom must be from an aromatic ring carbon. For an "aromatic group" formed by removing more than one hydrogen atom from an aromatic compound, at least one hydrogen atom must be from an aromatic hydrocarbon ring carbon. Additionally, an "aromatic group" can have hydrogen atoms removed from the same ring of an aromatic ring or ring system (e.g., phen-1,4-ylene, pyridin-2,3-ylene, naphth-1,2-ylene, and benzofuran-2,3-ylene), hydrogen atoms removed from two different rings of a ring system (e.g., naphth-1,8-ylene and benzofuran-2,7-ylene), or hydrogen atoms removed from two isolated aromatic rings or ring systems (e.g., bis(phen-4-ylene)methane).

An arene is an aromatic hydrocarbon, with or without side chains (e.g., benzene, toluene, or xylene, among others). An "aryl group" is a group derived from the formal removal of a hydrogen atom from an aromatic ring carbon of an arene. It should be noted that the arene can contain a single aromatic hydrocarbon ring (e.g., benzene, or toluene), contain fused aromatic rings (e.g., naphthalene or anthracene), and contain one or more isolated aromatic rings covalently linked via a bond (e.g., biphenyl) or non-aromatic hydrocarbon group(s) (e.g., diphenylmethane). One example of an "aryl group" is ortho-tolyl (o-tolyl), the structure of which is shown here.

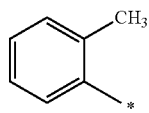

Similarly, an "arylene group" refers to a group formed by removing two hydrogen atoms (at least one of which is from an aromatic ring carbon) from an arene. An "arene group" refers to a generalized group formed by removing one or more hydrogen atoms (as necessary for the particular group and at least one of which is an aromatic ring carbon) from an arene. However, if a group contains separate and distinct arene and heteroarene rings or ring systems (e.g., the phenyl and benzofuran moieties in 7-phenyl-benzofuran) its classification depends upon the particular ring or ring system from which the hydrogen atom was removed, that is, an arene group if the removed hydrogen came from the aromatic hydrocarbon ring or ring system carbon atom (e.g., the 2 carbon atom in the phenyl group of 6-phenylbenzofuran) and a heteroarene group if the removed hydrogen carbon came from a heteroaromatic ring or ring system carbon atom (e.g., the 2 or 7 carbon atom of the benzofuran group or 6-phenylbenzofuran). It should be noted that according the definitions provided herein, general arene groups (including an aryl group and an arylene group) include those having zero, one, or more than one hydrocarbyl substituent groups located on an aromatic hydrocarbon ring or ring system carbon atom (e.g., a toluene group or a xylene group, among others) and is a member of the group of hydrocarbon groups. However, a phenyl group (or phenylene group) and/or a naphthyl group (or naphthylene group) refer to the specific unsubstituted arene groups (including no hydrocarbyl group located on an aromatic hydrocarbon ring or ring system carbon atom). Consequently, a substituted phenyl group or substituted naphthyl group refers to the respective arene group having one or more substituent groups (including halogens, hydrocarbyl groups, or hydrocarboxy groups, among others) located on an aromatic hydrocarbon ring or ring system carbon atom. When the substituted phenyl group and/or substituted naphthyl group is a member of the group of hydrocarbon groups (or a member of the general group of arene groups), each substituent is limited to a hydrocarbyl substituent group. One can readily discern and select general substituted phenyl and/or substituted naphthyl groups, specific substituted phenyl and/or substituted naphthyl groups, and/or individual substituted phenyl or substituted naphthyl groups which can be utilized as a member of the group of hydrocarbon groups (or a member of the general group of arene groups).

A heteroarene is aromatic compound, with or without side chains, having a heteroatom within the aromatic ring or aromatic ring system (e.g., pyridine, indole, or benzofuran, among others). A "heteroaryl group" is a class of "heterocyclyl group" and is a univalent group formed by removing a hydrogen atom from a heteroaromatic ring or ring system carbon atom of a heteroarene compound. By specifying that the hydrogen atom is removed from a ring carbon atom, a "heteroaryl group" is distinguished from an "arylheteryl group," in which a hydrogen atom is removed from a heteroaromatic ring or ring system heteroatom. For example, an indol-2-yl group illustrated below is one example of a "heteroaryl group," and an indol-1-yl group illustrated below is one example of an "arylheteryl group."

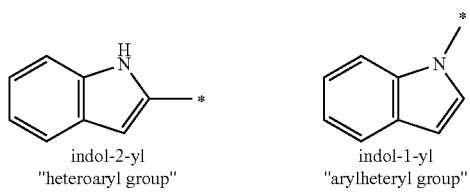

indol-2-yl
"heteroaryl group"

indol-1-yl
"arylheteryl group"

Similarly, a "heteroarylene group" refers to a group formed by removing two hydrogen atoms from a heteroarene compound, at least one of which is from a heteroarene ring or ring system carbon atom. Thus, in a "heteroarylene group," at least one hydrogen is removed from a heteroarene ring or ring system carbon atom, and the other hydrogen atom can be removed from any other carbon atom, including for example, a heteroarene ring or ring system carbon atom, or a non-heteroarene ring or ring system atom. A "heteroarene group" refers to a generalized group formed by removing one or more hydrogen atoms (as necessary for the particular group and at least one of which is a heteroarene ring or ring system carbon atom) from a heteroarene compound. If a hydrogen atom is removed from a heteroaromatic ring or ring system heteroatom and from a heteroaromatic ring or ring system carbon atom or an aromatic hydrocarbon ring or ring system carbon atom, the group is classified as an "arylheterylene group" or an "arylhetero group."

An "arylheteryl group" is a class of "cycloheteryl group" and is a univalent group formed by removing a hydrogen atom from a heteroaromatic ring or ring system heteroatom, as illustrated. By specifying that the hydrogen atom is removed from of a heteroaromatic ring or ring system heteroatom and not from a heteroaromatic ring or ring system carbon atom, an "arylheteryl group" is distinguished from a "heteroaryl group" in which a hydrogen atom is removed from a heteroaromatic ring or a ring system carbon atom. Similarly, an "arylheterylene group" refers to a group formed by removing two hydrogen atoms from a heteroaryl compound, at least one of which is removed from a heteroaromatic ring or ring system heteroatom of the heteroaryl compound; the other hydrogen atom can be removed from any other atom, including for example, a heteroaromatic ring or ring system carbon atom, another heteroaromatic ring or ring system heteroatom, or a non-ring atom (carbon or heteroatom) from a heteroaromatic compound. An "arylhetero group" refers to a generalized group formed by removing one or more hydrogen atoms (as necessary for the particular group and at least one of which is from a heteroaromatic ring or ring system) heteroatom from a heteroarene compound.

An "aralkyl group" is an aryl-substituted alkyl group having a free valance at a non-aromatic carbon atom (e.g., a benzyl group, or a 2-phenyleth-1-yl group, among others). Similarly, an "aralkylene group" is an aryl-substituted alkylene group having two free valencies at a single non-aromatic carbon atom or a free valence at two non-aromatic carbon atoms while an "aralkane group" is a generalized is an aryl-substituted alkane group having one or more free valencies at a non-aromatic carbon atom(s). A "heteroaralkyl group" is a heteroaryl-substituted alkyl group having a free valence at a non-hetero-aromatic ring or ring system carbon atom. Similarly a "heteroaralkylene group" is a heteroaryl-substituted alkylene group having two free valencies at a single non-heteroaromatic ring or ring system carbon atom or a free valence at two non-heteroaromatic ring or ring system carbon atoms while a "heteroaralkane group" is a generalized aryl-substituted alkane group having one or more free valencies at a non-heteroaromatic ring or ring system carbon atom(s). It should be noted that according the definitions provided herein, general aralkane groups include those having zero, one, or more than one hydrocarbyl substituent groups located on an aralkane aromatic hydrocarbon ring or ring system carbon atom and is a member of the group of hydrocarbon groups. However, specific aralkane groups specifying a particular aryl group (e.g., the phenyl group in a benzyl group or a 2-phenylethyl group, among others) refer to the specific unsubstituted aralkane groups (including no hydrocarbyl group located on the aralkane aromatic hydrocarbon ring or ring system carbon atom). Consequently, a substituted aralkane group specifying a particular aryl group refers to a respective aralkane group having one or more substituent groups (including halogens, hydrocarbyl groups, or hydrocarboxy groups, among others). When the substituted aralkane group specifying a particular aryl group is a member of the group of hydrocarbon groups (or a member of the general group of aralkane groups), each substituent is limited to a hydrocarbyl substituent group. One can readily discern and select substituted aralkane groups specifying a particular aryl group which can be utilized as a member of the group of hydrocarbon groups (or a member of the general group of aralkane groups).

A "halide" has its usual meaning; therefore, examples of halides include fluoride, chloride, bromide, and iodide.

An "organoheteryl group" is a univalent group containing carbon, which are thus organic, but which have their free valence at an atom other than carbon. Thus, organoheteryl and organyl groups are complementary and mutually exclusive. Organoheteryl groups can be cyclic or acyclic, and/or aliphatic or aromatic, and thus encompasses aliphatic "cycloheteryl groups" (e.g., pyrrolidin-1-yl or morpholin-1-yl, among others), aromatic "arylheteryl groups" (e.g., pyrrol-1-yl or indol-1-yl, among others), and acyclic groups (e.g., organylthio, trihydrocarbylsilyl, aryloxy, or alkoxy, among others). Similarly, an "organoheterylene group" is a divalent group containing carbon and at least one heteroatom having two free valencies, at least one of which is at a heteroatom. An "organohetero group" is a generalized group containing carbon and at least one heteroatom having one or more free valencies (as necessary for the particular group and at least one of which is at a heteroatom) from an organohetero compound.

If a compound or group contains more than one moiety it is formally a member of the group having the highest naming priority as stipulated by IUPAC. For example 4-phenylpyridine is a heteroaromatic compound and a 4-(phen-2-ylene)pyridin-2-yl group is heteroaromatic group because the highest naming group is the pyridine group and the pyridin-2-yl group respectively.

In some instances, reference can be made to "cyclic groups." Unless otherwise specified, "cyclic groups" include aromatic and aliphatic groups having a ring structure, including homocyclic and heterocyclic groups, and "cyclo" is a prefix used in names to designate a ring structure.

An "organoaluminum compound," any compound that contains an aluminum-carbon bond. Thus, organoaluminum compounds include hydrocarbyl aluminum compounds such as trialkyl-, dialkyl-, or monoalkylaluminum compounds; hydrocarbyl alumoxane compounds, and aluminate compounds which contain an aluminum-organyl bond such as tetrakis(p-tolyl)aluminate salts, among others.

The term "reactor effluent," and it derivatives (e.g., oligomerization reactor effluent) generally refers to all the material which exits the reactor. The term "reactor effluent," and its derivatives, can also be prefaced with other descriptors that limit the portion of the reactor effluent being referenced. For example, while the term "reactor effluent" would refer to all material exiting the reactor (e.g., product and solvent or diluent, among others), the term "olefin reactor effluent" refers to the effluent of the reactor which contains an olefin (i.e., carbon-carbon) double bond.

The term "oligomerization," and its derivatives, refers to processes which produce a mixture of products containing at least 70 weight percent products containing from 2 to 30 monomer units. Similarly, an "oligomer" is a product that contains from 2 to 30 monomer units while an "oligomerization product" includes all product made by the "oligomerization" process including the "oligomers" and products which are not "oligomers" (e.g., product which contain more than 30 monomer units). It should be noted that the monomer units in the "oligomer" or "oligomerization product" do not have to be the same. For example, an "oligomer" or "oligomerization product" of an "oligomerization" process using ethylene and propylene as monomers can contain both ethylene and/or propylene units.

The term "trimerization," and it derivatives, refers to a process which produces a mixture of products containing at least 70 weight percent products containing three and only three monomer units. A "trimer" is a product which contains three and only three monomer units while a "trimerization product" includes all products made by the trimerization process including trimer and product which are not trimer (e.g., dimers, tetramers, and polymer, among others). Generally, an olefin trimerization reduces number of olefinic bonds, i.e., carbon-carbon double bonds, by two when considering the number of olefin bonds in the monomer units and the number of olefin bonds in the trimer. It should be noted that the monomer units in the "trimer" or "trimerization product" do not have be the same. For example, a "trimer" of a "trimerization" process using ethylene and butene as monomers can contain ethylene and/or butene monomer units. That is to say the "trimer" will include $C_6$, $C_8$, $C_{10}$, and $C_{12}$ products. In another example, a "trimer" of a "trimerization" process using ethylene as the monomer can contain ethylene monomer units. It should also be noted that a single molecule can contain two monomer units. For example, dienes such as 1,3-butadiene and 1,4-pentadiene have two monomer units within one molecule It should be noted that within this disclosure, some sub-genera can be members of more than one genus; e.g., a hydrocarbyl metal halide sub-genus can be a member of the metal hydrocarbyl compound genus and a member of the metal halide genus. This could lead to uncertainty in whether a particular genus within a recitation (or which genus within a recitation) a sub-genus belongs. However, within this disclosure, a genus includes all its sub-genera (even if the sub-genus can fall within two or more sub-genera within a recitation) unless a specific feature excludes one or more sub-genera from the genus. For example, a recitation providing for contacting transition metal compound with a metal hydrocarbyl compound includes non-halide metal hydrocarbyl compound and hydrocarbyl metal halides within the metal hydrocarbyl compound genus while a recitation providing for contacting a transition metal compound with a metal hydrocarbyl compound prior to contacting the transition metal compound with a halogen containing compound would exclude the hydrocarbyl metal halide sub-genus within the recited metal hydrocarbyl compound genus. This consideration applies equally to species, sub-species, and individual compounds (or other classification systems) which can fall under more than one genera, sub-genera, species, and/or sub-species.

In an aspect, the present disclosure provides for a composition comprising, or consisting essentially of: a) a transition metal compound; b) a nitrogen containing compound; c) a metal hydrocarbyl compound; and d) optionally, a halogen containing compound. In an embodiment, the present disclosure provides for a composition comprising, or consisting essentially of: a) a transition metal compound; b) a nitrogen containing compound; and c) a metal hydrocarbyl compound; or alternatively, a) a transition metal compound; b) a nitrogen containing compound; c) a metal hydrocarbyl compound; and d) a halogen containing compound. Generally, the nitrogen containing compound, transition metal compound, metal hydrocarbyl compound, and halogen containing compound are independent elements of the composition. As independent elements of a composition, the nitrogen containing compound, the transition metal compound, the metal hydrocarbyl compound, and the halogen containing compound will be independently described herein Aspects and embodiments these independent descriptions can be utilized, without limitation, to further describe the composition.

In an aspect, the composition can be utilized to oligomerize an olefin and can be described as a catalyst system. In an embodiment, the composition can be utilized to trimerize an olefin and can be described as an olefin trimerization catalyst system. The olefins which can be oligomerized (or alternatively, trimerized) are independently described herein. In one aspect, the olefin to be oligomerized can be, comprise, or consist essentially of, ethylene and the catalyst system can be described as an ethylene trimerization catalyst system. In another aspect, the trimerized olefin can be, comprise, or consist essentially of, ethylene and the catalyst system can be described as an ethylene trimerization catalyst system.

In an aspect, the transition metal compound can be, comprise, or consist essentially of, an inorganic transition metal compound. In some aspects, the transition metal compound can comprise, or consist essentially of, a transition metal cation and an inorganic anion. In other aspects, the transition metal compound can be, comprise, or consist essentially of, a transition metal cation and an anion formally derived from an organic compound or moiety (e.g., a carboxylate, alkoxide, or β-dionate, among others). Generally, the transition metal, and the inorganic anion or anion formally derived from an organic compound or moiety are independent elements of the transition metal compound and are described separately herein. The transition metal compound can be described using any combination of the transition metal cation described herein, and the inorganic anion described herein or organic derived anion described herein.

In an aspect, the transition metal compound that can be employed in a trimerization catalyst system of this disclosure can be, comprise, or consist essentially of, a Group 4-11 transition metal compound. In an embodiment, the transition metal compound can be, comprise, or consist essentially of, a Group 5-10 transition metal compound; alternatively, a Group 6-9 transition metal compound. In some embodiments, the transition metal compound can be, comprise, or consist essentially of, a Group 5 transition metal compound; alternatively, a Group 6 transition metal compound; alternatively, a Group 7 transition metal compound; alternatively, a Group 8 transition metal compound; or alternatively, a Group 9 transition metal compound. In other embodiments, the transition metal compound can be, comprise, or consist essentially of, a vanadium compound, a chromium compound, a molybdenum compound, an iron compound, a cobalt compound, a nickel compound, or copper compound; alternatively, a vanadium compound; alternatively, a chromium compound; alternatively, a molybdenum compound; alternatively, an iron compound; alternatively, a cobalt compound; alternatively, a nickel compound; or alternatively, or copper compound.

In another aspect, the transition metal (general or specific) of the transition metal compound may have an oxidation state from +1 to +6 (sometimes written as 1 to 6). In some embodiments, the transition metal (general or specific) of the transition metal compound can have an oxidation state of +2 or +3; or alternatively, the transition metal of the transition metal compound can have an oxidation state of +3. In other embodiments, the transition metal (general or specific) of the transition metal compound can have an oxidation state of +1; alternatively, +2; alternatively, +3; alternatively, +4; alternatively, +5; or alternatively, +6. In should be noted that in some nomenclatures, when referring to a transition metal compound, the oxidation state of the transition metal (general or specific) in the transition metal compound can be indicated by placing the Roman Numeral of the oxidation state in parentheses after the transition metal; for example chromium(III) chloride and chromium(II) chloride represent the chloride compounds of chromium in the +3 and +2 oxidation states, respectively.

In an aspect, suitable inorganic anions include, but are not limited to, a halide, a sulfate, a sulfite, a bisulfite, an oxide, a nitrate, a nitrite, a hydroxide, and a chlorate. In some embodiments, the inorganic anion can be a halide, a sulfate, or a nitrate. In other embodiments, the inorganic anion can be a halide; alternatively, a sulfate; alternatively, a sulfite; alternatively, a bisulfite; alternatively, an oxide; alternatively, a nitrate; alternatively, a nitrite; alternatively, a hydroxide; or alternatively, a chlorate. In an aspect, the halide can be fluoride, chloride, bromide, or iodide; alternatively, fluoride; alternatively, chloride; alternatively, bromide; or alternatively, iodide.

In an embodiment, suitable inorganic transition metal compound (general or specific) can comprise, or consist essentially of, a transition metal halide, a transition metal sulfate, a transition metal sulfite, a transition metal bisulfate, a transition metal nitrate, a transition metal nitrite, a transition metal hydroxide, a transition metal chlorate, or any combination thereof; or alternatively, a transition metal halide, a transition metal sulfate, or a transition metal nitrate. In some embodiments, the transition metal compound (general or specific) can comprise, or consist essentially of, a transition metal halide; alternatively, a transition metal sulfate; alternatively, a transition metal sulfite; alternatively, a transition metal bisulfate; alternatively, a transition metal nitrate; alternatively, a transition metal nitrite; alternatively, a transition metal hydroxide; or alternatively, a transition metal chlorate. In an embodiment, the transition metal halide (general or specific) can comprise, or consist essentially of, a transition metal chloride, a transition metal bromide, or a transition metal iodide; alternatively, a transition metal chloride; alternatively, a transition metal bromide; or alternatively, a transition metal iodide.

In an aspect, suitable anions formally derived from an organic compound can include, but are not limited to, an organoxide, a carboxylate, an amide, and a β-dionate (e.g., acetylacetonate). In some embodiments, the anion formally derived from an organic compound can be, comprise, or consist essentially of, an organoxide; alternatively, a carboxylate; alternatively, an amide; or alternatively, a β-dionate.

In an aspect, the transition metal compound (general or specific) can comprise, or consist essentially of, a transition metal organoxide, a transition metal carboxylate, a transition metal amide compound, or a transition metal β-dionate. In an embodiment, the transition metal compound (general or specific) can comprise, or consist essentially of, a transition metal carboxylate or a transition metal β-dionate. In some embodiments, the transition metal compound (general or specific can comprise, or consist essentially of, a transition metal organoxide; alternatively, a transition metal carboxylate; alternatively, a transition metal amide; or alternatively, a transition metal β-dionate. In an embodiment, the transition metal organoxide can comprise, or consist essentially of, a transition metal hydrocarboxide or a transition metal substituted hydrocarboxide; alternatively, a transition metal hydrocarboxide; or alternatively, a transition metal substituted hydrocarboxide. In another aspect, the transition metal compound utilized in a catalyst system described herein can be, comprise, or consist essentially of, a combination the recited transition metal compounds.

In an embodiment, the organoxide of any transition metal organoxide (general or specific) can be, comprise, or consist essentially of, a $C_1$ to $C_{24}$ organoxide; alternatively, a $C_4$ to $C_{19}$, organoxide; or alternatively, a $C_5$ to $C_{12}$ organoxide.

In an embodiment, the organoxide can be, comprise, or consist essentially of, a hydrocarboxide or a substituted hydrocarboxide; alternatively, a hydrocarboxide; or alternatively, a substituted hydrocarboxide. Generally, the hydrocarboxide group and/or the substituted hydrocarboxide that can be utilized in a transition metal hydrocarboxide and/or transition metal substituted hydrocarboxide can have the same number of carbon atoms of the organoxide that can be utilized as a transition metal organoxide.

In an embodiment, each organoxide of a transition metal organoxide can be, comprise, or consist essentially of, an alkoxide, a substituted alkoxide, a cycloalkoxide, a substituted cycloalkoxide, an aroxide, a substituted aroxide, an aralkoxide, or a substituted aralkoxide; alternatively, an alkoxide, a cycloalkoxide, an aroxide, or an aralkoxide; alternatively, an alkoxide or a substituted alkoxide; alternatively, a cycloalkoxide or a substituted cycloalkoxide; alternatively, an aroxide or a substituted aroxide; or alternatively, an aralkoxide or a substituted aralkoxide. In some embodiments, each organoxide of a transition metal organoxide can be, comprise, or consist essentially of, an alkoxide, a cycloalkoxide, an aroxide, or an aralkoxide. In some embodiments, each organoxide of a transition metal organoxide an alkoxide; alternatively, a substituted alkoxide; alternatively, a cycloalkoxide; alternatively, a substituted cycloalkoxide; alternatively, an aroxide; alternatively, a substituted aroxide; alternatively, an aralkoxide; or alternatively, a substituted aralkoxide. Generally, the alkoxide, substituted alkoxide, cycloalkoxide, substituted cycloalkoxide, aroxide, substituted aroxide, aralkoxide, and/or substituted aralkoxide can have the same number of carbons as its respective organoxide group (or substituted hydrocarboxide group) or hydrocarboxide group.

In an embodiment, each organoxide independently can be a $C_1$ to $C_{24}$ alkoxide (substituted or unsubstituted); alternatively, a $C_1$ to $C_{24}$ alkoxide (substituted or unsubstituted); or alternatively, a $C_5$ to $C_{12}$ alkoxide (substituted or unsubstituted). In some embodiments, each alkoxide of a transition metal hydrocarboxide (general or specific) independently can be a methoxide, an ethoxide, a propoxide, a butoxide, a pentoxide, a hexoxide, a heptoxide, an octaoxide, a nonoxide, a decoxide, an undecoxide, or a dodecoxide; alternatively, butoxide, a pentoxide, a hexoxide, a heptoxide, an octaoxide, a nonoxide, a decoxide, an undecoxide, or a dodecoxide; alternatively, a pentoxide, a hexoxide, a heptoxide, an octaoxide, a nonoxide, a decoxide, an undecoxide, or a dodecoxide. In other embodiments, of a transition metal hydrocarboxide (general or specific) independently can be a methoxide; alternatively, an ethoxide; alternatively, a propoxide; alternatively, a butoxide; alternatively, a pentoxide; alternatively, a hexoxide; alternatively, a heptoxide; alternatively, an octaoxide; alternatively, a nonoxide; alternatively, a decoxide; alternatively, an undecoxide; or alternatively, a dodecoxide. In an embodiment, each substituent of a substituted alkoxide independently can be a halide or hydrocarboxy group; alternatively, a halide; or alternatively a hydrocarboxy group. Substituent halides and hydrocarboxy groups are independently disclosed herein and can be utilized without limitation to further describe the substituted alkoxide group.

In an embodiment, each organoxide independently can be a $C_6$ to $C_{24}$ aryloxide (substituted or unsubstituted); alternatively, a $C_6$ to $C_{19}$ aryloxide (substituted or unsubstituted); or alternatively a $C_6$ to $C_{12}$ aryloxide (substituted or unsubstituted). In some embodiment, each organoxide of a transition metal organoxide (general or specific) independently can be phenoxide or a substituted phenoxide; alternatively, phenoxide; or alternatively, a substituted phenoxide. In an embodiment, each substituted phenoxide independently can be a 2-substituted phenoxide, a 4-substituted phenoxide, a 2,4-substituted phenoxide, a 2,6-disubstituted phenoxide, or a 2,4,6-trisubstituted phenoxide; alternatively, a 2-substituted phenoxide or a 4-substituted phenoxide; alternatively, a 2,4-substituted phenoxide or a 2,6-disubstituted phenoxide; a 2-substituted phenoxide; alternatively, a 4-substituted phenoxide; alternatively, a 2,4-substituted phenoxide; alternatively, a 2,6-disubstituted phenoxide; or alternatively, a 2,4,6-trisubstituted phenoxide. Substituents which can be utilized for the substituted phenoxide are independently disclosed herein and can be utilized without limitation to further describe the substituted phenoxide group.

In an aspect, each amide group of a transition metal amide (general or specific) independently can be a $C_2$ to $C_{24}$ amide. In some embodiments, each amide group of a transition metal amide (general or specific) independently can be a $C_3$ to $C_{19}$. In other embodiments, each amide group of a transition metal amide (general or specific) independently can be a $C_4$ to $C_{12}$ amide.

In an aspect, each β-dionate group of a transition metal β-dionate (general or specific) independently can be a $C_5$ to $C_{24}$ β-dionate group; alternatively, a $C_5$ to $C_{19}$ β-dionate group; or alternatively, a $C_5$ to $C_{12}$ β-dionate group. In an embodiment, the β-diketonate can be, comprise, or consist essentially of, acetylacetonate (alternatively 2,4-pentanedionate), hexafluoroacetylacetone (alternatively, 1,1,1,5,5,5-hexafluoro-2,4-pentanedionate), benzoylacetonate, or 1,3-diphenyl-1,3-propanedionate; alternatively, acetylacetonate; alternatively, hexafluoroacetylacetone; alternatively, benzoylacetonate; or alternatively, 1,3-diphenyl-1,3-propanedionate.

In an aspect, each carboxylate (which can also be referred to as a carboxylate group) of a transition metal carboxylate (general or specific—e.g., chromium carboxylate) independently can be, comprise, or consist essentially of, a $C_2$ to $C_{25}$ carboxylate; alternatively, $C_3$ to $C_{25}$ carboxylate; alternatively, a $C_4$ to $C_{20}$ carboxylate; or alternatively, a $C_5$ to $C_{12}$ carboxylate. In an embodiment, the carboxylate can have from one to four carboxylate moieties; alternatively, two to four carboxylate moieties; alternatively two to three carboxylate moieties. In some embodiments, the carboxylate can have only one carboxylate moiety; alternatively, only two carboxylate moieties; alternatively, only three carboxylate moieties; or alternatively, only four carboxylate moieties.

In an aspect, the carboxylate group can have the general formula $(^-O_2C)_rR^{1c}$. Generally, r and $R^{1c}$ are independently described herein and the carboxylate group having the formula $(^-O_2C)_rR^{1c}$ can be described using any combination of r and $R^{1c}$ described herein.

In an aspect, r of the carboxylate group having the formula $(^-O_2C)_rR^{1c}$ can be an integer from 1 to 4; alternatively, from 2 to 4; or alternatively, from 2 to 3. In some embodiments, r of the carboxylate group having the formula $(^-O_2C)_rR^{1c}$ can be 1; alternatively, 2; alternatively, 3; or alternatively, 4. When r is, 1 the carboxylate group having the formula $(^-O_2C)_rR^{1c}$ is equivalent to the monocarboxylate group having the formula $^-O_2CR^{2c}$ and the aspects and embodiments of $R^{2c}$ for the monocarboxylate group having the formula $^-O_2CR^{2c}$ can be utilized as aspects and embodiments of $R^{1c}$ for the carboxylate group having the formula $(^-O_2C)_rR^{1c}$ when r is 1.

In an embodiment where r is 1, $R^{1c}$ can be a $C_1$ to $C_{24}$ organyl group; alternatively, a $C_2$ to $C_{24}$ organyl group; alternatively, a $C_3$ to $C_{19}$ organyl group; or alternatively, a $C_4$ to $C_{11}$ organyl group. In an embodiment where r is 2, $R^{1c}$ can be a bond or a $C_1$ to $C_{23}$ organylene group; alternatively, a bond; alternatively, a $C_1$ to $C_{23}$ organylene group; alternatively, a $C_3$ to $C_{18}$ organylene group; or alternatively, a $C_4$ to $C_{10}$ organylene group. In an embodiment where r is 3, $R^{1c}$ can be a $C_1$ to $C_{22}$ organic group; alternatively, $C_2$ to $C_{22}$ organic group; alternatively, a $C_3$ to $C_{17}$ organic group; or alternatively, a $C_4$ to $C_9$ organic group. In an embodiment where r is 4, $R^{1c}$ can be a $C_2$ to $C_{21}$ organic group; alternatively, a $C_3$ to $C_{16}$ organic group; or alternatively, a $C_4$ to $C_8$ organic group.

In an embodiment where r is 1, $R^{1c}$ can be a $C_1$ to $C_{24}$ organyl group consisting of inert functional groups; alternatively, $C_2$ to $C_{24}$ organyl group consisting of inert functional groups; alternatively, a $C_3$ to $C_{19}$ organyl group consisting of inert functional groups; or alternatively, a $C_4$ to $C_{11}$ organyl group consisting of inert functional groups. In an embodiment where r is 2, $R^{1c}$ can be a bond or $C_1$ to $C_{23}$ organylene group consisting of inert functional groups; alternatively, a bond; alternatively, a $C_1$ to $C_{23}$ organylene group consisting of inert functional groups; alternatively, a $C_3$ to $C_{18}$ organylene group consisting of inert functional groups; or alternatively, a $C_4$ to $C_{10}$ organylene group consisting of inert functional groups. In an embodiment where r is 3, $R^{1c}$ can be a $C_1$ to $C_{22}$ organic group consisting of inert functional groups; alternatively, $C_2$ to $C_{22}$ organic group consisting of inert functional groups; alternatively, a $C_3$ to $C_{17}$ organic group consisting of inert functional groups; or alternatively, a $C_4$ to $C_9$ organic group consisting of inert functional groups. In an embodiment where r is 4, $R^{1c}$ can be a $C_2$ to $C_{21}$ organic group consisting of inert functional groups; alternatively, a $C_3$ to $C_{16}$ organic group consisting of inert functional groups; or alternatively, a $C_4$ to $C_8$ organic group consisting of inert functional groups.

In an embodiment where r is 1, $R^{1c}$ can be a hydrocarbyl group or a substituted hydrocarbyl group; alternatively, a hydrocarbyl group; or alternatively, a substituted hydrocarbyl group. Generally, the hydrocarbyl group and/or substituted hydrocarbyl group which can be utilized as $R^{1c}$ can have the same number of carbon atoms as any organyl group which can be utilized as $R^{1c}$. In an embodiment where r is 2, $R^{1c}$ can be a bond, hydrocarbylene group, or a substituted hydrocarbylene group; alternatively, a bond or a hydrocarbylene group; alternatively, a bond or a substituted hydrocarbylene group; alternatively, a bond; alternatively, a hydrocarbylene group; or alternatively, a substituted hydrocarbylene group. Generally, the hydrocarbylene group and/or substituted hydrocarbylene group which can be utilized as $R^{1c}$ can have the same number of carbon atoms as any organylene group which can be utilized as $R^{1c}$. In an embodiment where r is 3, $R^{1c}$ can be a hydrocarbon group or a substituted hydrocarbon group; alternatively, a hydrocarbon group; or alternatively, a substituted hydrocarbon group. Generally, the hydrocarbon group and/or substituted hydrocarbon group which can be utilized as $R^{1c}$ can have the same number of carbon atoms as any organic group which can be utilized as $R^{1c}$. In an embodiment where r is 4, $R^{1c}$ can be a hydrocarbon group or a substituted hydrocarbon group; alternatively, a hydrocarbon group; or alternatively, a substituted hydrocarbon group. Generally, the hydrocarbon group and/or substituted hydrocarbon group which can be utilized as $R^{1c}$ can have the same number of carbon atoms as any organic group which can be utilized as $R^{1c}$. In an embodiment, each substituent of a substituted hydrocarbyl group, substituted hydrocarbylene group, and/or substituted hydrocarbon group independently can be a halide, a hydrocarbyl group, or a hydrocarboxy group; alternatively, a halide or a hydrocarbyl group; alternatively, a halide or a hydrocarboxy group; alternatively, a hydrocarbyl group or a hydrocarboxy group; alternatively, a halide; alternatively, a hydrocarbyl group; or alternatively, a hydrocarboxy group. Halide, hydrocarbyl group, and hydrocarboxy group substituents (also referred to as non-hydrogen substituents or non-hydrogen substituent groups) are independently disclosed herein. These substituent groups can be utilized without limitation to further describe any substituted hydrocarbyl group, substituted hydrocarbylene group, and/or substituted hydrocarbon group that can be utilized as $R^{1c}$.

In an embodiment where r of the carboxylate group having the formula $(^-O_2C)_rR^{1c}$ is 3 and/or 4, $R^{1c}$ can be an alkane group, a substituted alkane group, an alkene group, a substituted alkene group, a cycloalkane group, a substituted cycloalkane group, a cycloalkene group, a substituted cycloalkene group, an arene group, a substituted arene group, an aralkane group, or a substituted aralkane group; or alternatively, an alkane group, an alkene group, a cycloalkane group, a cycloalkene group, an arene group, or an aralkane group. In some embodiments, $R^{1c}$ of the carboxylate group having the formula $(^-O_2C)_rR^{1c}$ can be an alkane group or a substituted alkane group; alternatively, an alkene group or a substituted alkene group; alternatively, a cycloalkane group or a substituted cycloalkane group; alternatively, a cycloalkene group or a substituted cycloalkene group; alternatively, an arene group or a substituted arene group; or alternatively, an aralkane group or a substituted aralkane group. In other embodiments, $R^{1c}$ of the carboxylate group having the formula $(^-O_2C)_rR^{1c}$ can be an alkane group; alternatively, a substituted alkane group; alternatively, an alkene group; alternatively, a substituted alkene group; alternatively, a cycloalkane group; alternatively, a substituted cycloalkane group; alternatively, a cycloalkene group; alternatively, a substituted cycloalkene group; alternatively, an arene group; alternatively, a substituted arene group; alternatively, an aralkane group; or alternatively, a substituted aralkane group. Generally, the alkane group, substituted alkane group, alkene group, substituted alkene group, cycloalkane group, substituted cycloalkane group, cycloalkene group, substituted cycloalkene group, arene group, substituted arene group, aralkane group, or substituted aralkane group can have the same number of carbon atoms as described for the organic and hydrocarbon groups which can be utilized as $R^{1c}$ of the carboxylate group having the formula $(^-O_2C)_rR^{1c}$ where r is 3 and/or 4.

In an aspect where r of the carboxylate group having the formula $(^-O_2C)_rR^{1c}$ is 3, r can be a $C_1$ to $C_{22}$ alkane group (substituted and/or unsubstituted); alternatively, $C_2$ to $C_{22}$ alkane group (substituted or unsubstituted); alternatively, a $C_3$ to $C_{17}$ alkane group (substituted and/or unsubstituted); or alternatively, a $C_4$ to $C_9$ alkane group (substituted and/or unsubstituted). In an aspect where r of the carboxylate group having the formula $(^-O_2C)_rR^{1c}$ is 4, $R^{1c}$ can be a $C_2$ to $C_{21}$ alkane group (substituted and/or unsubstituted); alternatively, a $C_3$ to $C_{16}$ alkane group (substituted and/or unsubstituted); or alternatively, a $C_4$ to $C_8$ alkane group (substituted and/or unsubstituted). In some embodiments, where r of the carboxylate group having the formula $(^-O_2C)_rR^{1c}$ is 3 and/or 4, $R^{1c}$ can be an ethane group, a propane group, a butane group, a pentane group, a hexane group, a heptane group, an octane group, a nonane group, a decane group, a undecane group, a dodecane group, a tridecane group, a tetradecane group, a pentadecane group, a hexadecane group, a heptadecane group, an octadecane group, or a nonadecane group. In other embodiments where r of the carboxylate group having the formula $(^-O_2C)_rR^{1c}$ is 3 and/or 4, $R^{1c}$ can be a butane group, a pentane group, a hexane group, a heptane group, an octane group, a nonane group, a decane group, or undecane group. In other embodiments where r of the carboxylate group having the formula $(^-O_2C)_rR^{1c}$ is 3 and/or 4, $R^{1c}$ can be a butane group, a pentane group, a hexane group, a heptane group, or an octane group. In an embodiment, any of the alkane groups (general or specific) which can be utilized $R^{1c}$ of the carboxylate having the formula $^-O_2CR^2$ can be substituted. In an embodiment, each substituent of a substituted alkane group (general or specific) which can be utilized as $R^{1c}$ independently can be a halide or hydrocarboxy group; alternatively, a halide; or alternatively a hydrocarboxy group. Halide substituents and hydrocarboxy substituent groups are independently disclosed herein and can be utilized without limitation to further describe a substituted alkane group (general or specific) which can be utilized as $R^{1c}$.

In an aspect where r of the carboxylate group having the formula $(^-O_2C)_rR^{1c}$ is 3, r can be a $C_1$ to $C_{22}$ alkene group (substituted or unsubstituted); alternatively, $C_2$ to $C_{22}$ alkene group (substituted or unsubstituted); alternatively, a $C_3$ to $C_{17}$ alkene group (substituted or unsubstituted); or alternatively, a $C_4$ to $C_9$ alkene group (substituted or unsubstituted). In an aspect where r of the carboxylate group having the formula $(^-O_2C)_rR^{1c}$ is 4, $R^{1c}$ can be a $C_2$ to $C_{21}$ alkene group (substituted or unsubstituted); alternatively, a $C_3$ to $C_{16}$ alkene group (substituted or unsubstituted); or alternatively, a $C_4$ to $C_8$ alkane group (substituted or unsubstituted). In other embodiments where r of the carboxylate group having the formula $(^-O_2C)_rR^{1c}$ is 3 and/or 4, $R^{1c}$ can be a butene group, a pentene group, a hexene group, a heptene group, an octene group, a nonene group, a decene group, or undecene group. In other embodiments where r of the carboxylate group having the formula $(^-O_2C)_rR^{1c}$ is 3 and/or 4, $R^{1c}$ can be a butene group, a pentene group, a hexene group, a heptene group, or an octene group. In an embodiment, each substituent of a substituted alkene group which can be utilized as $R^{1c}$ independently can be a halide or hydrocarboxy group; alternatively, a halide; or alternatively a hydrocarboxy group. Halide substituent and hydrocarboxy substituent groups are independently disclosed herein and can be utilized without limitation to further describe a substituted alkene group which can be utilized as $R^{1c}$.

In an aspect where r of the carboxylate group having the formula $(^-O_2C)_rR^{1c}$ is 3 and/or 4, $R^{1c}$ can be a $C_3$-$C_{21}$ cycloalkane group (substituted or unsubstituted); alternatively, a $C_5$-$C_{16}$ cycloalkane group (substituted or unsubstituted); or alternatively, a $C_5$-$C_{10}$ cycloalkane group (substituted or unsubstituted). In an embodiment where r of the carboxylate group having the formula $(^-O_2C)_rR^{1c}$ is 3 and/or 4, $R^{1c}$ can be a cyclopentane group, a substituted cyclopentane group, a cyclohexane group, a substituted cyclohexane group, a cycloheptane group, or a substituted cycloheptane group; alternatively, a cyclopentane group, a substituted cyclopentane group, a cyclohexane group, or a substituted cyclohexane group; alternatively, cyclopentane group or a substituted cyclopentane group; or alternatively, a cyclohexane group or a substituted cyclohexane group. In some embodiments where r of the carboxylate group having the formula $(^-O_2C)_rR^{1c}$ is 3 and/or 4, $R^{1c}$ can be a cyclopentane group, or a cyclohexane group. In yet other embodiments where r of the carboxylate group having the formula $(^-O_2C)_rR^{1c}$ is 3 and/or 4, $R^{1c}$ can be a cyclopentane group; alternatively, a substituted cyclopentane group; alternatively, a cyclohexane group; or alternatively, a substituted cyclohexane group. In an embodiment, each substituent of a substituted cycloalkane group (general or specific) which can be utilized as $R^{1c}$ independently can be a halide, a hydrocarbyl group, or a hydrocarboxy group; alternatively, a halide or a hydrocarbyl group; alternatively, a halide or a hydrocarboxy group; alternatively, a hydrocarbyl group or a hydrocarboxy group; alternatively, a halide; alternatively, a hydrocarbyl group; or alternatively, a hydrocarboxy group.

In an aspect where r of the carboxylate group having the formula $(^-O_2C)_rR^{1c}$ is 3 and/or 4, $R^{1c}$ can be a $C_3$-$C_{21}$ cycloalkene group (substituted or unsubstituted); alternatively, a $C_5$-$C_{16}$ cycloalkene group (substituted or unsubstituted); or alternatively, a $C_5$-$C_{10}$ cycloalkene group (substituted or unsubstituted). In an embodiment where r of the carboxylate group having the formula $(^-O_2C)_rR^{1c}$ is 3 and/or 4, $R^{1c}$ can be a cyclopentene group, a substituted cyclopentene group, a cyclohexene group, a substituted cyclohexene group, a cycloheptene group, or a substituted cycloheptene group; alternatively, a cyclopentene group, a substituted cyclopentene group, a cyclohexene group, or a substituted cyclohexene group; alternatively, cyclopentene group or a substituted cyclopentene group; or alternatively, a cyclohexene group or a substituted cyclohexene group. In some embodiments where r of the carboxylate group having the formula $(^-O_2C)_rR^{1c}$ is 3 and/or 4, $R^{1c}$ can be a cyclopentene group, or a cyclohexene group. In yet other embodiments where r of the carboxylate group having the formula $(^-O_2C)_rR^{1c}$ is 3 and/or 4, $R^{1c}$ can be a cyclopentene group; alternatively, a substituted cyclopentene group; alternatively, a cyclohexene group; or alternatively, a substituted cyclohexene group. In an embodiment, each substituent of a substituted cycloalkene group (general or specific) which can be utilized as $R^{1c}$ independently can be a halide, a hydrocarbyl group, or a hydrocarboxy group; alternatively, a halide or a hydrocarbyl group; alternatively, a halide or a hydrocarboxy group; alternatively, a hydrocarbyl group or a hydrocarboxy group; alternatively, a halide; alternatively, a hydrocarbyl group; or alternatively, a hydrocarboxy group.

In an aspect where r of the carboxylate group having the formula $(^-O_2C)_rR^{1c}$ is 3 and/or 4, $R^{1c}$ can be a $C_6$-$C_{21}$ benzene group (substituted or unsubstituted), or a $C_{10}$-$C_{21}$ naphthalene group (substituted or unsubstituted); alternatively, a $C_6$-$C_{21}$ benzene group (substituted or unsubstituted); or alternatively, a $C_{10}$-$C_{21}$ naphthalene group (substituted or unsubstituted). In another aspect r of the carboxylate group having the formula $(^-O_2C)_rR^{1c}$ is 3 and/or 4, $R^{1c}$ can be a $C_6$-$C_{16}$ benzene group (substituted or unsubstituted), or a $C_{10}$-$C_{16}$ naphthalene group (substituted or unsubstituted); alternatively, a $C_6$-$C_{16}$ benzene group (substituted or unsubstituted); or alternatively, a $C_{10}$-$C_{16}$ naphthalene group (substituted or unsubstituted). In another aspect r of the carboxylate group having the formula $(^-O_2C)_rR^{1c}$ is 3 and/or 4, $R^{1c}$ can be a $C_6$-$C_{10}$ benzene group (substituted or unsubstituted). In an embodiment, each substituent of a substituted benzene group (general or specific) or substituted naphthalene which can be utilized as $R^{1c}$ independently can be a halide, a hydrocarbyl group, or a hydrocarboxy group; alternatively, a halide or a hydrocarbyl group; alternatively, a halide or a hydrocarboxy group; alternatively, a hydrocarbyl group or a hydrocarboxy group; alternatively, a halide; alternatively, a hydrocarbyl group; or alternatively, a hydrocarboxy group.

In an aspect where r of the carboxylate group having the formula $(^-O_2C)_rR^{1c}$ is 3 and/or 4, $R^{1c}$ can be a $C_7$-$C_{21}$ phenylmethane group (substituted or unsubstituted); alternatively, $C_7$-$C_{16}$ phenylmethane group (substituted or unsubstituted); alternatively, a $C_7$-$C_{10}$ phenylmethane group (substituted or unsubstituted). In an embodiment, each substituent of a substituted phenylmethane group (general or specific) which can be utilized as $R^{1c}$ independently can be a halide, a hydrocarbyl group, or a hydrocarboxy group; alternatively, a halide or a hydrocarbyl group; alternatively, a halide or a hydrocarboxy group; alternatively, a hydrocarbyl group or a hydrocarboxy group; alternatively, a halide; alternatively, a hydrocarbyl group; or alternatively, a hydrocarboxy group.

Halides, hydrocarbyl group substituents, and hydrocarboxy group substituents (also referred to as non-hydrogen substituents or non-hydrogen substituent groups) are independently disclosed herein. These substituent groups can be utilized without limitation to further describe any substituted hydrocarbon group (general or specific), substituted alkane group (general or specific), substituted alkene group (general or specific), substituted cycloalkane group (general or specific), substituted cycloalkene group (general or specific), substituted arene group (general or specific), substituted aralkane group (general or specific) which can be utilized as $R^{1c}$ of the carboxylate group having the formula $(^-O_2C)_rR^{1c}$ described herein.

In an aspect where r of the carboxylate group having the formula $(^-O_2C)_rR^{1c}$ is 2, $R^{1c}$ of the carboxylate group having the formula $(^-O_2C)_rR^{1c}$ any general or specific organic group, organic group consisting of inert functional groups, hydrocarbon group, alkane group, substituted alkane group, alkene group, substituted alkene group, cycloalkane group, substituted cycloalkane group, cycloalkene group, substituted cycloalkene group, arene group, substituted arene group, aralkane group, or substituted aralkane group can be referred to by replacing -ic of organic, -on of hydrocarbon, -ane of general or specific alkane (including aralkane), -e of a general or specific alkene (including cycloalkene), or -ene of a general or specific arene by the suffix -ylene. For example, when r is 2, the general organic group and hydrocarbon group would become an organylene group and hydrocarbylene group (respectively), the general alkane and cycloalkane groups would become alkylene and cycloalkylene (respectively), the specific methane group and ethane groups would become a methylene group and ethylene group (respectively), the general alkene group would become an alkenylene group, the specific ethene group would become an ethenylene group, the general arene group would become an arylene group, and the general aralkane group would become a aralkylene group. Similarly, in an aspect where r of the carboxylate group having the formula $(^-O_2C)_rR^{1c}$ is 1, $R^{1c}$ of the carboxylate group having the formula $(^-O_2C)_rR^{1c}$ any general or specific organic group, organic group consisting of inert functional groups, hydrocarbon group, alkane group, substituted alkane group, alkene group, substituted alkene group, cycloalkane group, substituted cycloalkane group, cycloalkene group, substituted cycloalkene group, arene group, substituted arene group, aralkane group, or substituted aralkane group can be referred to by replacing -ic of organic, -on of hydrocarbon, -ane of general or specific alkane (including aralkane), -e of a general or specific alkene (including cycloalkene), or -ene of a general or specific arene by the suffix -yl. For example, when r is 1, the general organic group and hydrocarbon group would become an organylene group and hydrocarbylene group (respectively), the general alkane and cycloalkane groups would become alkyl and cycloalkyl (respectively), the specific methane group and ethane groups would become a methyl group and ethyl group (respectively), the general alkene group would become an alkenyl group, the specific ethene group would become an ethenyl group, the general arene group would become an aryl group, and the general aralkane group would become an aralkyl group. Extension of these naming conventions to other general or specific groups, along with common name change between general to specific groups (e.g., benzene group to phenylene group or phenyl group, among others) are readily apparent.

In a non-limiting embodiment where the carboxylate has more than one carboxylate moiety, each carboxylate independently can be, comprise, or consist essentially of, oxalate, malonate (1,3-propanedioate), succinate (1,4-butanedioate), glutarate (1,5-pentanedioate), adipate (1,6-hexanedioate), pimelate (1,7-heptanedioate), suberate (1,8-octanedioate), maleate, fumarate, acetylenedicarboxylate, phthalate (1,2-benzene dicarboxylate), isophthalate (1,3-benzene dicarboxylate), terephthalate (1,4-benzene dicarboxylate), phenylene diacetate; citrate, or any combination thereof; alternatively, malonate (1,3-propanedioate), succinate (1,4-butanedioate), glutarate (1,5-pentanedioate), adipate (1,6-hexanedioate), pimelate (1,7-heptanedioate), suberate (1,8-octanedioate), maleate, fumarate, acetylenedicarboxylate, phthalate (1,2-benzene dicarboxylate), isophthalate (1,3-benzene dicarboxylate), terephthalate (1,4-benzene dicarboxylate), phenylene diacetate, or any combination thereof; alternatively, malonate (1,3-propanedioate), succinate (1,4-butanedioate), glutarate (1,5-pentanedioate), adipate (1,6-hexanedioate), pimelate (1,7-heptanedioate), suberate (1,8-octanedioate), or any combination thereof; alternatively, maleate, fumarate, or any combination thereof; alternatively, acetylenedicarboxylate; alternatively, phthalate (1,2-benzene dicarboxylate), isophthalate (1,3-benzene dicarboxylate), terephthalate (1,4-benzene dicarboxylate), or any combination thereof; or alternatively, phenylene diacetate. In other non-limiting embodiments where the carboxylate has more than one carboxylate moiety, each carboxylate independently can be, comprise, or consist essentially of, oxalate; alternatively, malonate (1,3-propanedioate); alternatively, succinate (1,4-butanedioate); alternatively, glutarate (1,5-pentanedioate); alternatively, adipate (1,6-hexanedioate); alternatively, pimelate (1,7-heptanedioate); alternatively, suberate (1,8-octanedioate); alternatively, maleate; alternatively, fumarate; alternatively, acetylenedicarboxylate; alternatively, phthalate (1,2-benzene dicarboxylate); alternatively, isophthalate (1,3-benzene dicarboxylate); alternatively, terephthalate (1,4-benzene dicarboxylate); alternatively, phenylene diacetate; or alternatively citrate.

In an aspect and in any embodiment, the carboxylate group can be, comprise, or consist essentially of, a monocarboxylate having the formula $^-O_2CR^{2c}$. In an embodiment of a carboxylate having the formula $^-O_2CR^{2c}$, $R^{2c}$ can be a organyl group; alternatively, organyl consisting of inert functional groups; alternatively, hydrocarbyl group, or substituted hydrocarbyl group; alternatively, a hydrocarbyl group; or alternatively, a substituted hydrocarbyl group. Generally, $R^{2c}$ (whether organyl, organyl consisting of inert functional groups, hydrocarbyl, and/or substitute hydrocarbyl) can be a $C_1$ to $C_{24}$ group; alternatively, a $C_2$ to $C_{24}$ group; alternatively, a $C_3$ to $C_{19}$ group; or alternatively, a $C_4$ to $C_{11}$ group. In some embodiments, the hydrocarbyl group (substituted or un substituted) can be an alkyl group, an alkenyl group, a cycloalkyl group, an cycloalkenyl group, an aryl group, or an aralkyl group; alternatively, an alkyl group, a cycloalkyl group, an aryl group, or an aralkyl group; alternatively, an alkyl group, an aryl group, or an aralkyl group; alternatively, an alkyl group or and aryl group; alternatively, an alkyl group; alternatively, an alkenyl group; alternatively, a cycloalkyl group; alternatively, an cycloalkenyl group; alternatively, an aryl group; or alternatively, or an aralkyl group.

In an embodiment, $R^{2c}$ of the carboxylate having the formula $^-O_2CR^{2c}$ can be an alkyl group, a substituted alkyl group, an alkenyl group, a substituted alkenyl group, a cycloalkyl group, a substituted cycloalkyl group, a cycloalkenyl group, a substituted cycloalkenyl group, an aryl group, a substituted aryl group, an aralkyl group, or a substituted aralkyl group; or alternatively, an alkyl group, an alkenyl group, a cycloalkyl group, an cycloalkenyl group, an aryl group, or an aralkyl group. In some embodiments, $R^{2c}$ of the carboxylate having the formula $^-O_2CR^{2c}$ can be an alkyl group or a substituted alkyl group; alternatively, a alkenyl group or a substituted alkenyl group; alternatively, a cycloalkyl group or a substituted cycloalkyl group; alternatively, a cycloalkenyl group or a substituted cycloalkenyl group; alternatively, an aryl group or a substituted aryl group; or alternatively, an aralkyl group or a substituted aralkyl. In other embodiments, $R^{2c}$ of the carboxylate having the formula $^-O_2CR^{2c}$ can be an alkyl group; alternatively, a substituted alkyl group; alternatively, alkenyl group; alternatively, a substituted alkenyl group; alternatively, a cycloalkyl group; alternatively, a substituted cycloalkyl group; alternatively, a cycloalkenyl group; alternatively, a substituted cycloalkenyl group; alternatively, an aryl group; alternatively, a substituted aryl group; alternatively, an aralkyl group; or alternatively, a substituted aralkyl group. Generally, the alkyl group, substituted alkyl group, alkenyl group, substituted alkenyl group, cycloalkyl group, substituted cycloalkyl group, cycloalkenyl group, substituted cycloalkenyl group, aryl group, substituted aryl group, aralkyl group, or substituted aralkyl group can have the same number of carbon atoms as described for the organic groups, organic groups consisting of inert functional groups, and hydrocarbon groups (substituted or unsubstituted) which can be utilized as $R^{2c}$ within the carboxylate having the formula $^-O_2CR^2$.

In an embodiment, the alkyl group (substituted or unsubstituted) which can be utilized as $R^{2c}$ of the carboxylate having the formula $^-O_2CR^{2c}$ can be a $C_1$-$C_{24}$ alkyl group (substituted or unsubstituted); alternatively, a $C_2$-$C_{24}$ alkyl group (substituted or unsubstituted); alternatively, a $C_3$-$C_{19}$ alkyl group (substituted or unsubstituted); or alternatively, a $C_4$-$C_{11}$ alkyl group (substituted or unsubstituted). In an embodiment, $R^{2c}$ of the carboxylate having the formula $^-O_2CR^{2c}$ can be a butyl group, an pentyl group, a hexyl group, a heptyl group, an octyl group, a nonyl group, a decyl group, or undecyl group. In some embodiments, $R^{2c}$ of the carboxylate having the formula $^-O_2CR^{2c}$ can be a butyl group; alternatively, a pentyl group; alternatively, a hexyl group; alternatively, a heptyl group; alternatively, an octyl group; alternatively, a nonyl group; alternatively, a decyl group; or alternatively, a undecyl group. In an embodiment, any of the alkyl groups (general or specific) which can be utilized as $R^{2c}$ of the carboxylate having the formula $^-O_2CR^{2c}$ can be substituted. In an embodiment, each substituent of a substituted alkyl group (general or specific) which can be utilized as $R^{2c}$ independently can be a halide or hydrocarboxy group; alternatively, a halide; or alternatively a hydrocarboxy group. Halide substituents and hydrocarboxy substituent groups are independently disclosed herein and can be utilized without limitation to further describe a substituted alkyl group (general or specific) which can be utilized as $R^{2c}$.

In an embodiment, $R^{2c}$ of the carboxylate having the formula $^-O_2CR^{2c}$ can be an n-butyl group, a sec-butyl group, a iso-butyl group, a t-butyl group, a n-pentyl group, a pent-3-yl group, an iso-amyl group, a neo-pentyl group, an n-hexyl group, a hexan-2-yl group, a hexan-3-yl group, a 2-methylpentan-1-yl group, 2-ethylbutan-1-yl group, a 2-methylpentan-2-yl group, a 2,3-dimethylbutan-1-yl group, a 2,3-dimethylbutan-2-yl group, an n-heptyl group, a heptan-2-yl group, a heptan-3-yl group, a heptan-4-yl group, a 2-methylhexan-1-yl group, a 2-ethylpentan-1-yl group, a 2-methylhexan-2-yl group, a 2,3-dimethylpentan-1-yl group, a 2,3-dimethylpentan-2-yl group, a 2,3,3-trimethylpentan-1-yl group, a 2,3,3-trimethylpentan-2-yl group, a n-octyl group, an octan-2-yl group, an octan-3-yl group, an octan-4-yl group, a 2-methylheptan-1-yl group, a 2-ethylhexan-1-yl group, a 2-methylheptan-2-yl group, a n-nonyl group, a nonan-2-yl group, a nonan-3-yl group, a nonan-4-yl group, a nonan-5-yl group, a n-decyl group, a decan-2-yl group, a decan-3-yl group, a decan-4-yl group, a decan-5-yl group, or an n-undecyl group. In other embodiments, $R^{2c}$ of the carboxylate having the formula $^-O_2CR^{2c}$ can be an n-propyl group; alternatively, an isopropyl group; alternatively, an n-butyl group; alternatively, a sec-butyl group; alternatively, a iso-butyl group; alternatively, a t-butyl group; alternatively, a n-pentyl group; alternatively, a pent-3-yl group; alternatively, an iso-amyl group; alternatively, a neo-pentyl group; alternatively, an n-hexyl group; alternatively, a hexan-2-yl group; alternatively, a hexan-3-yl group; alternatively, a 2-methylpentan-1-yl group; alternatively, 2-ethylbutan-1-yl group; alternatively, a 2-methylpentan-2-yl group; alternatively, a 2,3-dimethylbutan-1-yl group; alternatively, a 2,3-dimethylbutan-2-yl group; alternatively, an n-heptyl group; alternatively, a heptan-2-yl group; alternatively, a heptan-3-yl group; alternatively, a heptan-4-yl group; alternatively, a 2-methylhexan-1-yl group; alternatively, a 2-ethylpentan-1-yl group; alternatively, a 2-methylhexan-2-yl group; alternatively, a 2,3-dimethylpentan-1-yl group; alternatively, a 2,3-dimethylpentan-2-yl group; alternatively, a 2,3,3-trimethylpentan-1-yl group; alternatively, a 2,3,3-trimethylpentan-2-yl group; alternatively, a n-octyl group; alternatively, an octan-2-yl group; alternatively, an octan-3-yl group; alternatively, an octan-4-yl group; alternatively, a 2-methylheptan-1-yl group; alternatively, a 2-ethylhexan-1-yl group; alternatively, a 2-methylheptan-2-yl group; alternatively, a n-nonyl group; alternatively, a nonan-2-yl group; alternatively, a nonan-3-yl group; alternatively, a nonan-4-yl group; alternatively, a nonan-5-yl group; alternatively, a n-decyl group; alternatively, a decan-2-yl group; alternatively, a decan-3-yl group; alternatively, a decan-4-yl group; alternatively, a decan-5-yl group; or alternatively, an n-undecyl group. In an embodiment, any of the alkyl groups which can be utilized $R^{2c}$ of the carboxylate having the formula $^-O_2CR^{2c}$ can be substituted. In an embodiment, each substituent of a substituted alkyl group (general or specific) which can be utilized as $R^{2c}$ independently can be a halide or hydrocarboxy group; alternatively, a halide; or alternatively a hydrocarboxy group. Halide substituents and hydrocarboxy substituent groups are independently disclosed herein and can be utilized without limitation to further describe a substituted alkyl group (general or specific) which can be utilized as $R^{2c}$.

In an embodiment, the alkenyl group (substituted or unsubstituted) which can be utilized as $R^{2c}$ of the carboxylate having the formula $^-O_2CR^{2c}$ can be a $C_2$-$C_{24}$ alkenyl group (substituted or unsubstituted); alternatively, a $C_3$-$C_{19}$ alkenyl group (substituted or unsubstituted); or alternatively, a $C_4$-$C_{11}$ alkenyl group (substituted or unsubstituted). In an embodiment, $R^{2c}$ of the carboxylate having the formula $^-O_2CR^{2c}$ can be a propenyl group, a butenyl group, a pentenyl group, a hexenyl group, a heptenyl group, an octenyl group, a nonenyl group, a decenyl group, a undecenyl group, a dodecenyl group, a tridecenyl group, a tetradecenyl group, a pentadecenyl group, a hexadecenyl group, a heptadecenyl group, an octadecenyl group, or a nonadecenyl group; alternatively, a butenyl group, an pentenyl group, a hexenyl group, a heptenyl group, an octenyl group, a nonenyl group, a decenyl group, or undecenyl group. In some embodiments, $R^{2c}$ of the carboxylate having the formula $^-O_2CR^{2c}$ can be an ethenyl group; alternatively, a propenyl group; alternatively, a butenyl group; alternatively, a pentenyl group; alternatively, a hexenyl group; alternatively, a heptenyl group; alternatively, an octenyl group; alternatively, a nonenyl group; alternatively, a decenyl group; or alternatively, a undecenyl group. In an embodiment, any of the alkenyl groups (general or specific) which can be utilized as $R^{2c}$ of the carboxylate having the formula $^-O_2CR^{2c}$ can be substituted. In an embodiment, each substituent of a substituted alkenyl group (general or specific) which can be utilized as $R^{2c}$ independently can be a halide or hydrocarboxy group; alternatively, a halide; or alternatively a hydrocarboxy group. Halide substituents and hydrocarboxy substituent groups are independently disclosed herein and can be utilized without limitation to further describe a substituted alkenyl group (general or specific) which can be utilized as $R^{2c}$.

In an embodiment, the cycloalkyl group (substituted or unsubstituted) which can be utilized as $R^{2c}$ of the carboxylate having the formula $^-O_2CR^{2c}$ can be a $C_3$-$C_{24}$ cycloalkyl group (substituted or unsubstituted); alternatively, a $C_3$-$C_{19}$ cycloalkyl group (substituted or unsubstituted); or alternatively, a $C_4$-$C_{11}$ cycloalkyl group (substituted or unsubstituted). In an embodiment, $R^{2c}$ of the carboxylate having the formula $^-O_2CR^{2c}$ can be a cyclopentyl group, a substituted cyclopentyl group, a cyclohexyl group, or a substituted cyclohexyl group. In some embodiments, $R^{2c}$ of the carboxylate having the formula $^-O_2CR^{2c}$ can be a cyclopentyl group or a substituted cyclopentyl group; alternatively, a cyclohexyl group or a substituted cyclohexyl group. In some embodiments, $R^{2c}$ of the carboxylate having the formula $^-O_2CR^{2c}$ can be a cyclopentyl group or a cyclohexyl group. In other embodiments, $R^{2c}$ of the carboxylate having the formula $^-O_2CR^{2c}$ can be a cyclopentyl group; alternatively, a substituted cyclopentyl group; alternatively, a cyclohexyl group; or alternatively, a substituted cyclohexyl group. In an embodiment, each substituent of a substituted cycloalkyl group (general or specific) which can be utilized as $R^{2c}$ independently can be a halide, a hydrocarbyl group, or a hydrocarboxy group; alternatively, a halide or a hydrocarbyl group; alternatively, a halide or a hydrocarboxy group; alternatively, a hydrocarbyl group or a hydrocarboxy group; alternatively, a halide; alternatively, a hydrocarbyl group; or alternatively, a hydrocarboxy group.

In an aspect, the aryl group (substituted or unsubstituted) which can be utilized as $R^{2c}$ of the carboxylate having the formula $^-O_2CR^{2c}$ can be a $C_6$-$C_{24}$ aryl group (substituted or unsubstituted); alternatively, a $C_6$-$C_{19}$ aryl group (substituted or unsubstituted); or alternatively, a $C_6$-$C_{11}$ aryl group (substituted or unsubstituted). In an embodiment, $R^{2c}$ of the carboxylate having the formula $^-O_2CR^{2c}$ can be a phenyl group, a substituted phenyl group, a naphthyl group, or a substituted naphthyl group; or alternatively, a phenyl group or a substituted phenyl group; alternatively, a naphthyl group or a substituted naphthyl group. In some embodiments, $R^{2c}$ of the carboxylate having the formula $^-O_2CR^{2c}$ can be a phenyl group or a naphthyl group. In other embodiments, $R^{2c}$ of the carboxylate having the formula $^-O_2CR^{2c}$ can be a phenyl group; alternatively, a substituted phenyl group; alternatively, a naphthyl group; or alternatively, a substituted naphthyl group. In an embodiment, the $R^{2c}$ substituted phenyl group can be a 2-substituted phenyl group, a 3-substituted phenyl group, a 4-substituted phenyl group, a 2,4-disubstituted phenyl group, a 2,6-disubstituted phenyl group, 3,5-disubstituted phenyl group, or a 2,4,6-trisubstituted phenyl group. In other embodiments, the $R^{2c}$ substituted phenyl group can be a 2-substituted phenyl group, a 4-substituted phenyl group, a 2,4-disubstituted phenyl group, or a 2,6-disubstituted phenyl group; alternatively, a 3-substituted phenyl group or a 3,5-disubstituted phenyl group; alternatively, a 2-substituted phenyl group or a 4-substituted phenyl group; alternatively, a 2,4-disubstituted phenyl group or a 2,6-disubstituted phenyl group; alternatively, a 2-substituted phenyl group; alternatively, a 3-substituted phenyl group; alternatively, a 4-substituted phenyl group; alternatively, a 2,4-disubstituted phenyl group; alternatively, a 2,6-disubstituted phenyl group; alternatively, 3,5-disubstituted phenyl group; or alternatively, a 2,4,6-trisubstituted phenyl group. In an embodiment, each substituent of an aryl group (general or specific), substituted phenyl group (general or specific), or substituted naphthyl group (general or specific) which can be utilized as $R^{2c}$ independently can be a halide, a hydrocarbyl group, or a hydrocarboxy group; alternatively, a halide or a hydrocarbyl group; alternatively, a halide or a hydrocarboxy group; alternatively, a hydrocarbyl group or a hydrocarboxy group; alternatively, a halide; alternatively, a hydrocarbyl group; or alternatively, a hydrocarboxy group.

In an aspect, the aralkyl group (substituted or unsubstituted) which can be utilized as $R^{2c}$ of the carboxylate having the formula $^-O_2CR^{2c}$ can be a $C_7$-$C_{24}$ aralkyl group (substituted or unsubstituted); alternatively, a $C_7$-$C_{19}$ aralkyl group (substituted or unsubstituted); or alternatively, a $C_7$-$C_{11}$ aralkyl group (substituted or unsubstituted). In an embodiment, $R^{2c}$ of the carboxylate having the formula $^-O_2CR^{2c}$ can be a benzyl group or a substituted benzyl group. In an embodiment, $R^{2c}$ of the carboxylate having the formula $^-O_2CR^{2c}$ can be a benzyl group; or alternatively, a substituted benzyl group. In an embodiment, each substituent of an aralkyl group (general or specific) which can be utilized as $R^{2c}$ independently can be a halide, a hydrocarbyl group, or a hydrocarboxy group; alternatively, a halide or a hydrocarbyl group; alternatively, a halide or a hydrocarboxy group; alternatively, a hydrocarbyl group or a hydrocarboxy group; alternatively, a halide; alternatively, a hydrocarbyl group; or alternatively, a hydrocarboxy group.

Halides, hydrocarbyl group substituents, and hydrocarboxy group substituents (also referred to as non-hydrogen substituents or non-hydrogen substituent groups) are independently disclosed herein. These substituent groups can be utilized without limitation to further describe any substituted hydrocarbyl group (general or specific), substituted alkyl group (general or specific), substituted alkenyl group (general or specific), substituted cycloalkyl group (general or specific), substituted cycloalkenyl group (general or specific), substituted aryl group (general or specific), substituted aralkyl group (general or specific) described herein.

In an embodiment, the substituted $R^{2c}$ phenyl group can be a tolyl group, a xylyl group, or a trimethylphenyl group; alternatively, a tolyl group; alternatively, a xylene group; or alternatively, a trimethylphenyl group. In some embodiments, the $R^{2c}$ tolyl group can be an ortho-tolyl group, a meta-tolyl group, or a para-tolyl group; alternatively, an ortho-tolyl group; alternatively, a meta-tolyl group; or alternatively, a para-tolyl group In an embodiment, the $R^{2c}$ xylyl group can be a 2,3-dimethylphenyl group, a 2,4-dimethylphenyl group, a 2,5-dimethylphenyl group, a 2,6-dimethylphenyl group, a 3,4-dimethylphenyl group, or a 3,5-dimethylphenyl group; alternatively, a 2,4-dimethylphenyl group or a 2,6-dimethylphenyl group; alternatively, a 2,3-dimethylphenyl group; alternatively, a 2,4-dimethylphenyl group; alternatively, a 2,5-dimethylphenyl group; alternatively, a 2,6-dimethylphenyl group; alternatively, a 3,4-dimethylphenyl group; or alternatively, a 3,5-dimethyl group.

In an aspect, each monocarboxylate of a transition metal carboxylate (general or specific) independently can be, comprise, or consist essentially of, acetate, a propionate, a butyrate, a pentanoate, a hexanoate, a heptanoate, an octanoate, a nonanoate, a decanoate, an undecanoate, a dodecanoate, a tridecanoate, a tetradecanoate, a pentadecanoate, a hexadecanoate, a heptadecanoate, an octadecanoate, or any combination thereof alternatively, a propionate, a butyrate, a pentanoate, a hexanoate, a heptanoate, an octanoate, a nonanoate, a decanoate, an undecanoate, a dodecanoate, a tridecanoate, a tetradecanoate, a pentadecanoate, a hexadecanoate, a heptadecanoate, an octadecanoate, or any combination thereof; or alternatively, a pentanoate, a hexanoate, a heptanoate, an octanoate, a nonanoate, a decanoate, an undecanoate, a dodecanoate, or any combination thereof. In some embodiments, each monocarboxylate of a transition metal carboxylate (general or specific) independently can be, comprise, or consist essentially of, acetate, propionate, n-butyrate, isobutyrate, valerate (n-pentanoate), neo-pentanoate, capronate (n-hexanoate), n-heptanoate, caprylate (n-octanoate), 2-ethylhexanoate, n-nonanoate, caprate (n-decanoate), n-undecanoate, laurate (n-dodecanoate), stearate (n-octadecanoate), or any combination thereof alternatively, propionate, n-butyrate, isobutyrate, valerate (n-pentanoate), neo-pentanoate, capronate (n-hexanoate), n-heptanoate, caprylate (n-octanoate), 2-ethylhexanoate, n-nonanoate, caprate (n-decanoate), n-undecanoate, laurate (n-dodecanoate), stearate (n-octadecanoate), or any combination thereof alternatively, valerate (n-pentanoate), neo-pentanoate, capronate (n-hexanoate), n-heptanoate, caprylate (n-octanoate), 2-ethylhexanoate, n-nonanoate, caprate (n-decanoate), n-undecanoate, laurate (n-dodecanoate), or any combination thereof or alternatively, valerate (n-pentanoate), caprylate (n-octanoate), or 2-ethylhexanoate. In some embodiments, each monocarboxylate of a transition metal carboxylate (general or specific) independently can be, comprise, or consist essentially of, acetate; alternatively, a propionate; alternatively, a butyrate; alternatively, n-butyrate; alternatively, isobutyrate; alternatively, a pentanoate; alternatively, valerate (n-pentanoate); alternatively, neo-pentanoate; alternatively, a hexanoate; alternatively, capronate (n-hexanoate); alternatively, a heptanoate; alternatively, an octanoate; alternatively, caprylate (n-octanoate); alternatively, 2-ethylhexanoate; alternatively, a nonanoate; alternatively, a decanoate; alternatively, caprate (n-decanoate); alternatively, an undecanoate; alternatively, a dodecanoate; alternatively, laurate (n-dodecanoate); alternatively, a tridecanoate; alternatively, a tetradecanoate; alternatively, a pentadecanoate; alternatively, a hexadecanoate; alternatively, a heptadecanoate; alternatively, an octadecanoate; or alternatively, stearate(n-octadecanoate).

In an aspect, each monocarboxylate of a transition metal carboxylate (general or specific) independently can be, comprise, or consist essentially of, benzoate, a substituted benzoate, a naphthoate, or a substituted naphthoate. In some embodiments, each monocarboxylate group independently can be, comprise, or consist essentially of, benzoate or a substituted benzoate; alternatively, a naphthoate or a substituted naphthoate. In other embodiments, each monocarboxylate of a transition metal carboxylate (general or specific) independently can be, comprise, or consist essentially of, benzoate or naphthoate. In yet other embodiments, each monocarboxylate of a transition metal carboxylate (general or specific) independently can be, comprise, or consist essentially of, benzoate; alternatively, a substituted benzoate; alternatively, naphthoate; or alternatively, a substituted naphthoate. In some embodiments, each monocarboxylate of a transition metal carboxylate (general or specific) independently can be, comprise, or consist essentially of, a methyl benzoate, a dimethyl benzoate, a trimethylbenzoate, or any combination thereof alternatively, a methyl benzoate; alternatively, a dimethyl benzoate; or alternatively, a trimethylbenzoate. In an embodiment, the methylbenzoate can be, comprise, or consist essentially of, 2-methylbenzoate, 3-methylbenzoate, 4-methylbenzoate or any combination thereof alternatively, 2-methylbenzoate, 4-methylbenzoate, or any combination thereof alternatively, 2-methylbenzoate; alternatively, 3-methylbenzoate; or alternatively, 4-methylbenzoate. In an embodiment, the dimethylbenzoate can be, comprise, or consist essentially of, 2,3-dimethylbenzoate, 2,4-dimethylbenzoate, 2,5-dimethylbenzoate, 2,6-dimethylbenzoate, 3,4-dimethylbenzoate, 3,5-dimethylbenzoate, or any combination thereof; alternatively, 2,4-dimethylbenzoate 2,6-dimethylbenzoate, or any combination thereof; alternatively, 2,3-dimethylbenzoate; alternatively, 2,4-dimethylbenzoate; alternatively, 2,5-dimethylbenzoate; alternatively, 2,6-dimethylbenzoate; alternatively, 3,4-dimethylbenzoate; or alternatively, 3,5-dimethylbenzoate. In an embodiment, the trimethylbenzoate can be, comprise, or consist essentially of, 2,4,6-trimethylbenzoate. In an embodiment, each monocarboxylate of a transition metal carboxylate (general or specific) independently can be, comprise, or consist essentially of, phenylacetic acid, a substituted phenylacetic acid, or any combination thereof; alternatively, phenylacetic acid; or alternatively, a substituted phenyl acetic acid.

Generally, the transition metal that can be utilized in the catalyst system, a method of preparing the catalyst system, and/or a method of oligomerizing an olefin described herein can comprise, or consist essentially of, any combination of transition metal cation described herein, and the inorganic anion described herein or organic derived anion described herein. Some, non-limiting, exemplary transition metal compounds are provided herein. One will appreciate that the provided exemplary transition metal compounds are not exhaustive of all transition metal compounds that can be envisioned from the present disclosure.

Generally, the transition metal compound that can be utilized in the catalyst system, a method of preparing the catalyst system, and/or a method of oligomerizing (or trimerizing) an olefin described herein can comprise, or consist essentially of, or consist of, any combination of transition metal cation described herein, and anion (the inorganic or organic derived anion) described herein. Some non-limiting, transition metal compound that can be utilized in the catalyst system, a method of preparing the catalyst system, and/or a method of oligomerizing (or trimerizing) an olefin are provided herein. One will appreciate that the provided transition metal compounds are not exhaustive of all transition metal compounds that can be utilized in the catalyst system, a method of preparing the catalyst system, and/or a method of oligomerizing (or trimerizing) an olefin. Other transition metal compounds are readily apparent from the present disclosure.

In an aspect, the transition metal compound that can be utilized in the catalyst system, a method of preparing the catalyst system, and/or a method of oligomerizing (or trimerizing) an olefin described herein can comprise, or consist essentially of, or consist of, a chromium compound. In this aspect, the chromium compound can have a chromium oxidation state of 0 to 6. In some embodiments, the chromium within the chromium compound can have an oxidation state of +2 or +3 (i.e., a chromium(II) or chromium(III) compound). In other embodiments, the chromium within the chromium compound can have an oxidation state of +2 (i.e., a chromium(II) compound); or alternatively, have an oxidation state of +3 (i.e., a chromium(III) compound).

In an embodiment, chromium(II) compounds that can be utilized in the catalyst system, a method of preparing the catalyst system, and/or a method of oligomerizing (or trimerizing) an olefin described herein can comprise, consist essentially of, or consist of, chromium(II) nitrate, chromium(II) sulfate, chromium(II) fluoride, chromium(II) chloride, chromium(II) bromide, or chromium(II) iodide. In an embodiment, chromium(III) compounds that can be utilized in the catalyst system, a method of preparing the catalyst system, and/or a method of oligomerizing (or trimerizing) an olefin described herein can comprise, consist essentially of, or consist of, chromium(III) nitrate, chromium(III) sulfate, chromium(III) fluoride, chromium(III) chloride, chromium(III) bromide, or chromium(III) iodide. In some embodiments, the chromium compounds that can be utilized in the catalyst system, a method of preparing the catalyst system, and/or a method of oligomerizing (or trimerizing) an olefin described herein can comprise, consist essentially of, or consist of, chromium(II) nitrate; alternatively, chromium(II) sulfate; alternatively, chromium(II) fluoride; alternatively, chromium(II) chloride; alternatively, chromium(II) bromide; alternatively, chromium(II) iodide; alternatively, chromium(III) nitrate; alternatively, chromium(III) sulfate; alternatively, chromium(III) fluoride; alternatively, chromium(III) chloride; alternatively, chromium(III) bromide; or alternatively, chromium(III) iodide.

In an embodiment, chromium compounds that can be utilized in the catalyst system, a method of preparing the catalyst system, and/or a method of oligomerizing (or trimerizing) an olefin described herein can comprise, consist essentially of, or consist of, a chromium(II) organoxide, a chromium(II) carboxylate, a chromium(II) beta-dionate, a chromium(III) organoxide, a chromium(III) carboxylate, or a chromium(III) beta-dionate; alternatively, a chromium(II)

organoxide or a chromium(III) organoxide; alternatively, a chromium(II) carboxylate or a chromium(III) carboxylate; alternatively, a chromium(II) beta-dionate or a chromium (III) beta-dionate; alternatively, a chromium(II) organoxide; alternatively, a chromium(II) carboxylate; alternatively, a chromium(II) beta-dionate; alternatively, a chromium(III) organoxide; alternatively, a chromium(III) carboxylate; or alternatively, a chromium(III) beta-dionate. In an embodiment, the organoxide, beta-dionate, and/or carboxylate of any chromium(II) or chromium(III) organoxide, beta-dionate, and/or carboxylate can have any number of carbon atoms as described herein for an organoxide, beta-dionate, and/or carboxylate.

Chromium carboxylates can be particularly useful transition metal compounds that can be utilized in the catalyst system, a process to preparing the catalyst system, and/or a process for oligomerizing (or trimerizing) an olefin. Thus, in one aspect, the catalyst system, a method of preparing the catalyst system, and/or a method of oligomerizing (or trimerizing) an olefin s according to this disclosure can utilize chromium carboxylate compositions comprising, consisting essentially of, or consisting of a chromium(II) carboxylate or a chromium(III) carboxylate; alternatively, a chromium(II) carboxylate; or alternatively, a chromium(III) carboxylate. Carboxylates are independently described herein and can be utilized without limitation to further describe the chromium (II) carboxylate(s) and/or chromium(III) carboxylates which can be utilized in the catalyst system, a method of preparing the catalyst system, and/or a method of oligomerizing (or trimerizing) an olefin described herein.

In a non-limiting embodiment, a chromium(III) carboxylate composition that can be utilized in the catalyst system, a method of preparing the catalyst system, and/or a method of oligomerizing (or trimerizing) an olefin can comprise, consist essentially of, or consist of, chromium(III) $C_3$ to $C_{25}$ monocarboxylate. In a non-limiting embodiment, a chromium(III) carboxylate composition that can be utilized in a catalyst system, a method of preparing a catalyst system, and/or a method of oligomerizing (or trimerizing) an olefin can comprise, consist essentially of, or consist of, a chromium(III) $C_3$ to $C_{25}$ monocarboxylate.

In an aspect the chromium carboxylate which can be utilized as the transition metal compound can be, comprise, or consist essentially of, a chromium carboxylate prepared by any process described herein.

In a non-limiting embodiment, a chromium(III) carboxylate composition that can be utilized in a catalyst system, a method of preparing a catalyst system, and/or a method of oligomerizing (or trimerizing) an olefin can comprise, consist essentially of, or consist of, chromium(III) propionate, chromium(III) n-butyrate, chromium(III) isobutyrate, chromium(III) valerate (n-pentanoate), chromium(III) neo-pentanoate, chromium(III) capronate (n-hexanoate), chromium (III) n-heptanoate, chromium(III) caprylate (n-octanoate), chromium(III) 2-ethylhexanoate, chromium(III) n-nonanoate, chromium(III) caprate (n-decanoate), chromium(III) n-undecanoate, chromium(III) laurate (n-dodecanoate), chromium(III) stearate (n-octadecanoate), or any combination thereof; alternatively, chromium(III) valerate (n-pentanoate), chromium(III) neo-pentanoate, chromium(III) capronate (n-hexanoate), chromium(III) n-heptanoate, chromium(III) caprylate (n-octanoate), chromium(III) 2-ethylhexanoate, chromium(III) n-nonanoate, chromium(III) caprate (n-decanoate), chromium(III) n-undecanoate, chromium(III) or laurate (n-dodecanoate), or any combination thereof; or alternatively, chromium(III) valerate (n-pentanoate), chromium(III) caprylate (n-octanoate), chromium(III) or 2-ethylhexanoate. In some embodiments, the carboxylate of the chromium carboxylate composition can be, comprise, or consist essentially of, chromium(III) 2-ethylhexanoate. Other chromium carboxylate compositions (chromium(II) and/or chromium(III)) that can be utilized in the catalyst system, a method of preparing the catalyst system, and/or a method of oligomerizing (or trimerizing) an olefin are readily apparent from the present disclosure and are fully contemplated.

Related U.S. patent application Ser. No. 13/323,191 filed on Dec. 12, 2011. describes chromium carboxylate compositions having a different compositional makeup than the commercially available chromium carboxylate compositions. U.S. patent application Ser. No. 13/323,191 filed on Dec. 12, 2011. is hereby incorporated by reference for all purposes. As disclosed in documents referenced herein, chromium carboxylates (and other transition metal carboxylates) are known to contain one or more structures containing more than one chromium atom. Any of these compounds can have an impact on the catalyst system utilized in the olefin oligomerization (or trimerization) processes described herein. It is believed that difference in the compositional makeup of the chromium carboxylate composition can have an impact on the olefin oligomerization (or trimerization) processes using a catalyst composition containing a chromium carboxylate composition. In one aspect (and without being limited to theory), it is believed that these new chromium carboxylate compositions can contain significant quantities of a mononuclear transition metal carboxylate.

It has been unexpectedly discovered that these new chromium carboxylate compositions can have an impact on the performance of the catalyst system in an olefin oligomerization (or trimerization) process. For example, differences between the commercially available chromium carboxylate compositions and the new chromium carboxylate compositions described herein (and in U.S. patent application Ser. No. 13/323,191 filed on Dec. 12, 2011. can have an impact on the catalyst system component ratios that provide the optimum product selectivity, product purity, and/or productivity. Information related to the impact that the composition makeup of the chromium carboxylate composition can have on an olefin oligomerization (or trimerization) processes are provided herein.

Figure 3:
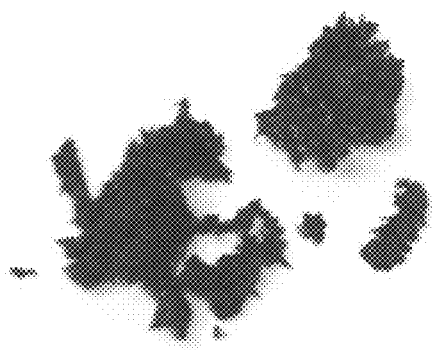
FIG. 3 is a picture of an isolated transition metal carboxylate (chromium(III) 2-ethylhexanoate) of the present disclosure.
Figure 4:
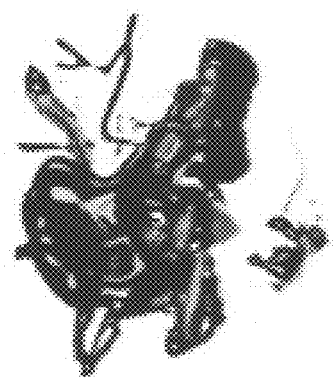
FIG. 4 is a picture of an isolated commercially available transition metal carboxylate (chromium(III) 2-ethylhexanoate).
Figure 5:
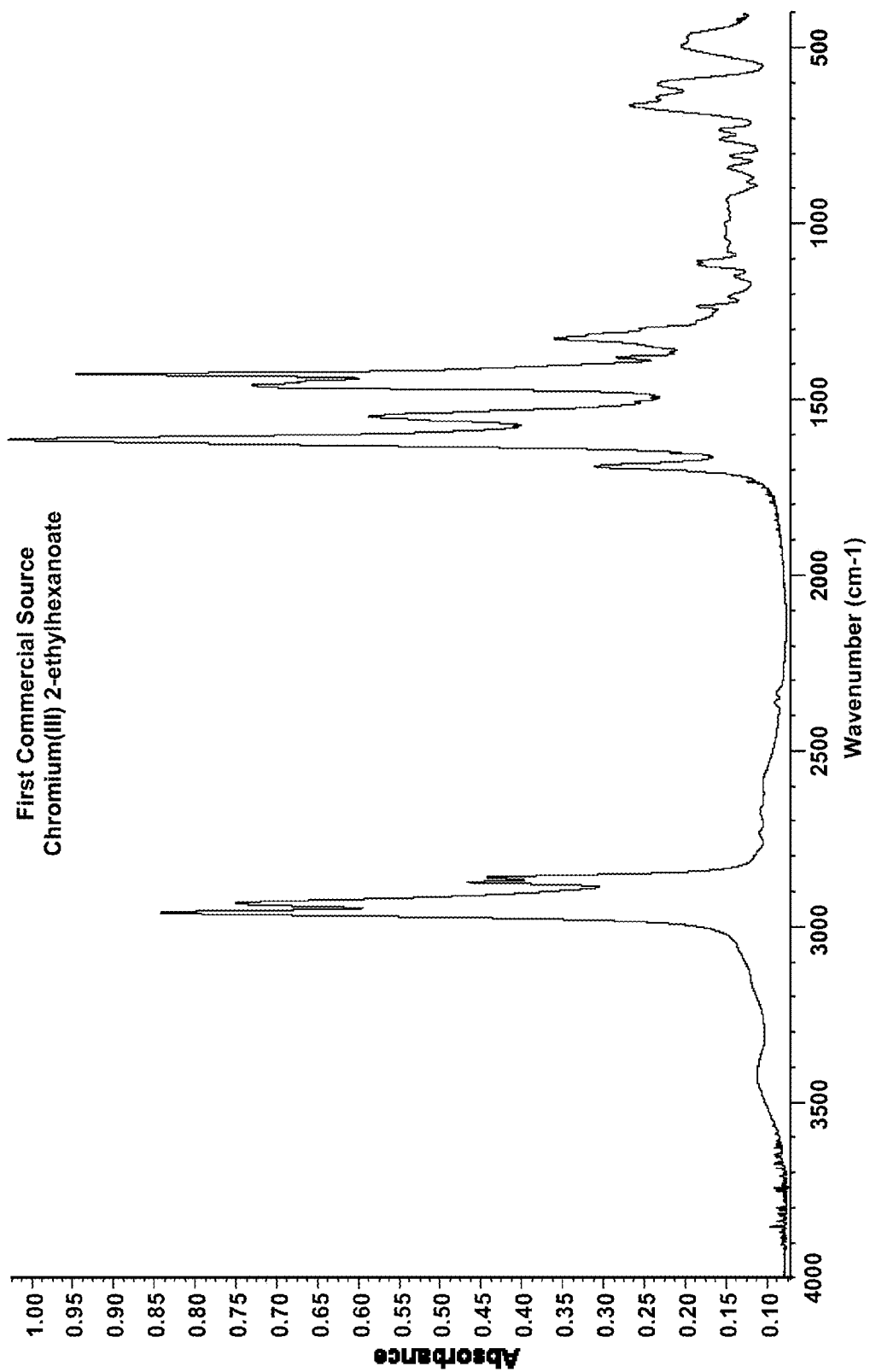
FIG. 5 provides an IR spectrum for a first commercially available chromium(III) 2-ethylhexanoate composition.

It can be observed that the isolated transition metal carboxylate compositions in U.S. patent application Ser. No. 13/323,191 filed on Dec. 12, 2011. (and the present disclosure) can appear more crystalline in nature than the amorphous mass isolated from commercially available transition metal carboxylate compositions. For example, compare the isolated chromium(III) 2-ethylhexanoate of the present disclosure using a sodium 2-ethylhexanoate to $CrCl_3(THF)_3$ molar ratio of approximately 3.3 (FIG. 3) to an isolated commercially available chromium(III) 2-ethylhexanoate (FIG. 4). However, even after attempting several different crystallization methods, this new transition metal carboxylate composition does not form crystals which would allow the elucidation of their structure by traditional X-ray crystallography methods. Consequently, the new transition metal carboxylate compositions need to be distinguished from the present commercially available transition metal carboxylate compositions utilizing one or a combination of more than one other analytical technique.

One technique that can be utilized to distinguish the chromium carboxylate compositions described herein from other chromium carboxylate compositions can be infrared spectroscopy. Another technique which can be utilized to distinguish the chromium carboxylate compositions described herein from other chromium carboxylate compositions can be high energy X-ray diffraction. Particular features associated with infrared spectroscopy and high energy X-ray diffraction are independently described herein and any one or more of these features can be used either individually or in any combination to describe the chromium carboxylate compositions described herein.

Spectroscopic analysis of the chromium carboxylate compositions, particularly infrared (IR) absorption spectroscopy, can provide useful characterization information related to the compositions. Aspects of the IR spectra of carboxylate compositions are provided in K. Nakamoto, *Infrared and Raman Spectra of Inorganic and Coordination Compounds*, 4$^{th}$ Ed., J. Wiley & Sons, New York, c. 1986, pp. 231-233. Additionally, Cannon and White (Cannon, R. D and White R. P, *Progress in Inorganic Chemistry; Volume* 36, 1988, pp. 195-298) and Deacon and Phillips (G. B. Deacon and R. J. Phillips, *Coordination Chemistry Reviews*, 33 (1980), pp. 227-250) provide further information regarding the coordination of the carboxylate anion with transition metal and the IR spectra of transition metal carboxylates. Vlachos et al. (A. Vlachos, Psycharis, C. P. Raptopoula, N. Lalioti, Y. Sanakis, G. Diamantopoulos, M. Fardis, M. Karayanni, G. Papavassiliou, and A. Terzis, *Inorganic Chimica Acta*, 357 (2004), pp. 3162-3172), herein referred to as Vlachos, provides IR information about trinuclear chromium(III) oxo carboxylates. The entirety of Cannon and White, Deacon and Phillips, and Vlachos are each incorporated herein by reference for all purposes.

These articles indicate, without being limited to theory, that the $\upsilon_{asym}$ ($CO_2$) IR peak locations for transition metal compounds in which the oxygen atoms of the carboxylate group bridge two transition metal atoms differ from those wherein the oxygen atoms of the carboxylate group are both bound to the same transition metal atom. Additionally, without being limited to theory, the separation between the $\upsilon_{asym}$ ($CO_2$) IR peak(s) and the $\upsilon_{sym}$ ($CO_2$) IR peak of transition metal carboxylate compounds in which the oxygen atoms of the carboxylate group bridge two transition metal atoms and those wherein the oxygen atoms of the carboxylate group are both bound to the same transition metal atom varies in a discernable manner. In particular, the $\upsilon_{asym}$ ($CO_2$) IR peak location for transition metal compounds in which the oxygen atoms of the carboxylate group bond to the same transition metal atom occurs at lower wavenumber than the $\upsilon_{asym}$ ($CO_2$) IR peak locations for transition metal compounds in which the oxygen atoms of the carboxylate group bond bridge to two transition metal atoms. Additionally, the separation between the $\upsilon_{asym}$ ($CO_2$) IR peak(s) and the $\upsilon_{sym}$ ($CO_2$) IR peak of the transition metal compounds in which the oxygen atoms of the carboxylate group bond to the same transition metal atom occurs is smaller than that of the transition metal compounds in which the oxygen atoms of the carboxylate group bond bridge to two transition metal atoms.

These articles also point out that transition metal carboxylate compositions contain species wherein multiple transition metals are bound to a single oxygen atoms. One such species which can be present, without being limited to theory, is the triangular bridged metal complexes having a $MO_3$ unit described in Cannon and White and that the $MO_3$ unit (where M is the transition metal) has a $\upsilon_{asym}$ ($MO_3$) IR peak in the range of 750 cm$^{-1}$ to 500 cm$^{-1}$. For chromium triangular bridged complexes, the $\upsilon_{sym}$ ($CrO_3$) IR peak appears around 750 cm$^{-1}$ to 650 cm$^{-1}$.

Figure 6:
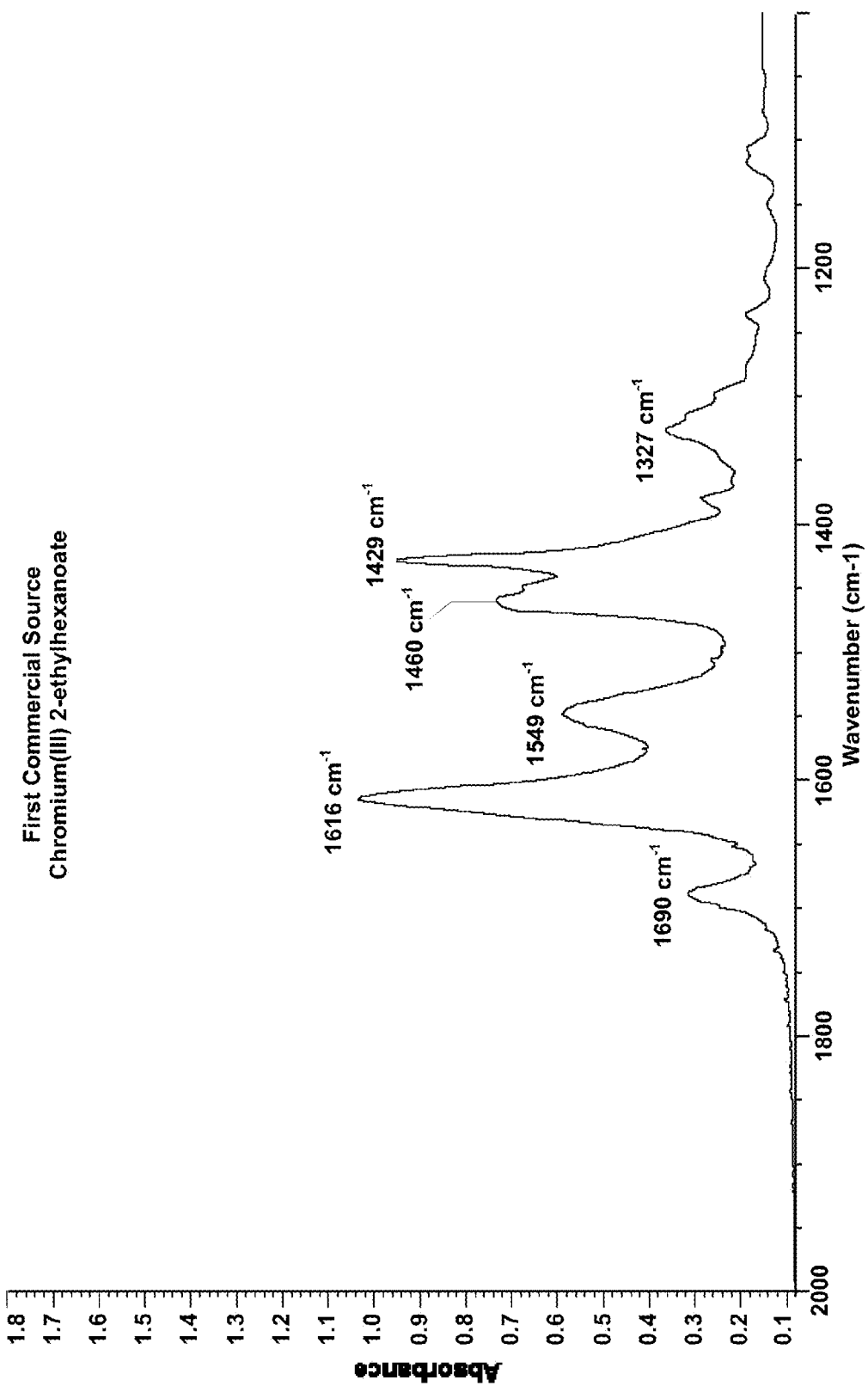
FIG. 6 provides an expanded section, 2000 cm$^{-1}$ to 1000 cm$^{-1}$, of the IR spectrum for the first commercially available chromium(III) 2-ethylhexanoate composition.
Figure 7:
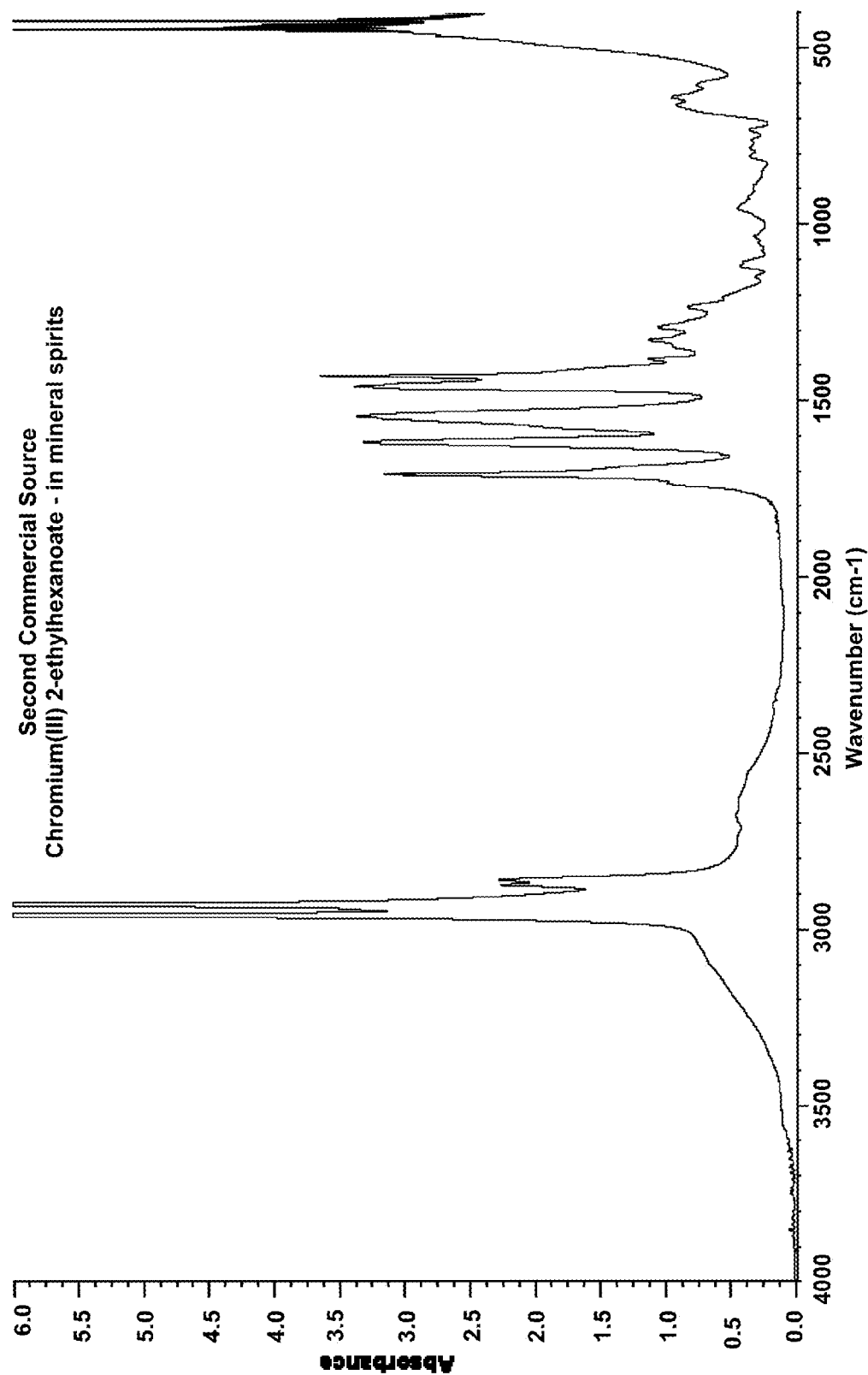
FIG. 7 provides an IR spectrum for a second commercially available chromium(III) 2-ethylhexanoate composition.
Figure 8:
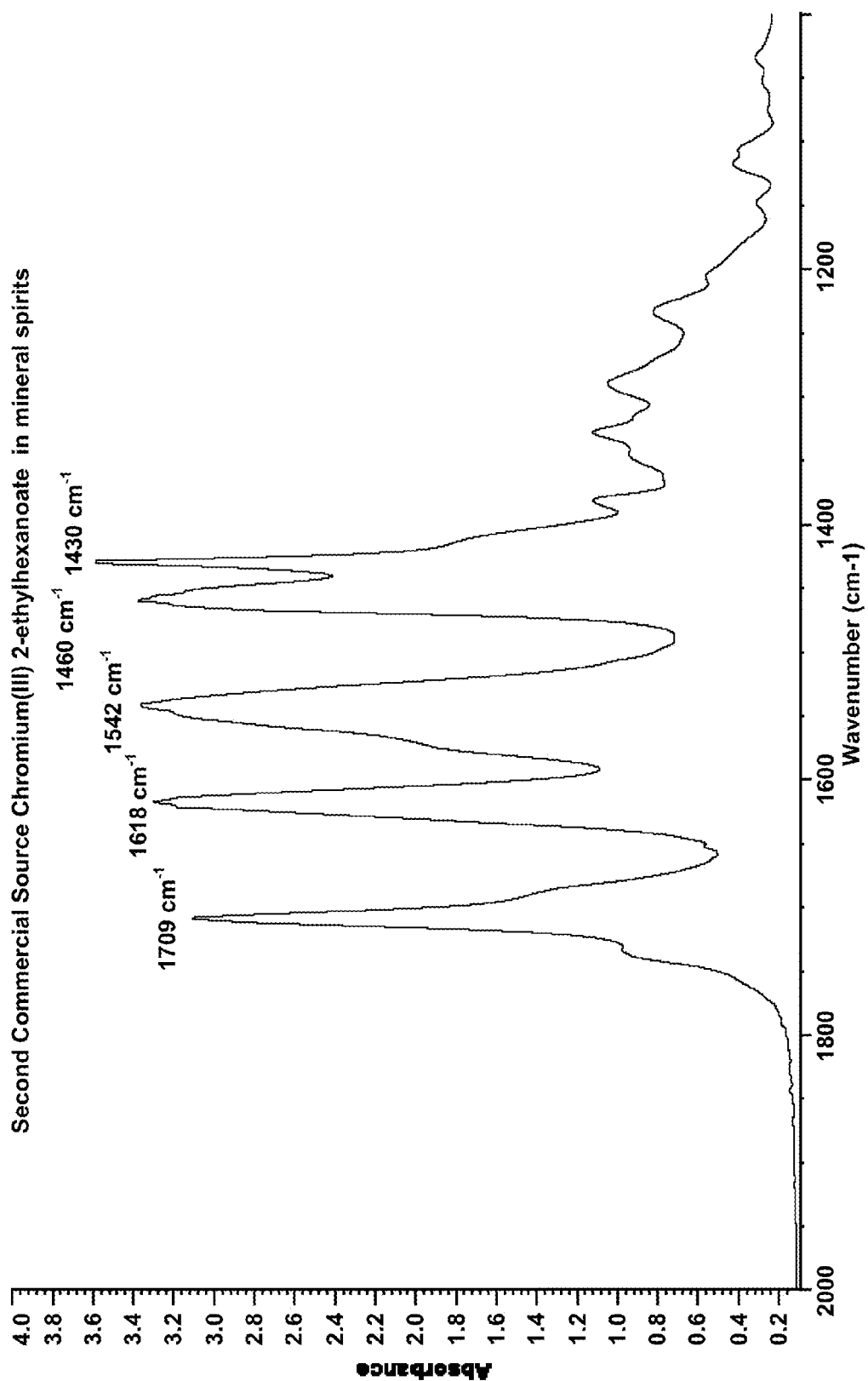
FIG. 8 provides an expanded section, 2000 cm$^{-1}$ to 1000 cm$^{-1}$, of the IR spectrum for the second commercially available chromium(III) 2-ethylhexanoate composition.

FIG. 6 and FIG. 8 provide the 2000 cm$^{-1}$ to 1000 cm$^{-1}$ portion of the IR spectrum for two commercially available chromium(III) 2-ethylhexanoate compositions. Each of these IR spectra show $\upsilon_{asym}$ ($CO_2$) IR peaks at 1616±20 cm$^{-1}$ and 1549±15 cm$^{-1}$ respectively and a $\upsilon_{sym}$ ($CO_2$) IR peak 1429±15 cm$^{-1}$. FIG. 10, FIG. 12, FIG. 14, and FIG. 16 provide the 2000 cm$^{-1}$ to 1000 cm$^{-1}$ portion of the IR spectrum for four chromium(III) 2-ethylhexanoate compositions described herein. Each of these IR spectra show the presence of a $\upsilon_{asym}$ ($CO_2$) IR peaks at 1516±15 cm$^{-1}$, a $\upsilon_{sym}$ ($CO_2$) IR peak 1429±15 cm$^{-1}$, and significantly diminished $\upsilon_{asym}$ ($CO_2$) IR peaks (if the peaks are even present) at 1616±20 cm$^{-1}$ and 1549±15 cm$^{-1}$. These IR spectra show that the chromium carboxylate compositions described herein are significantly different from the chromium carboxylate compositions which are presently commercially available.

In an embodiment, any chromium carboxylate composition (general or specific) described herein or any chromium carboxylate composition (general or specific) prepared by any process(es) described herein can have a $\upsilon_{asym}$ ($CO_2$) IR peak within 110 cm$^{-1}$ of the $\upsilon_{sym}$ ($CO_2$) IR peak. In an embodiment, any chromium carboxylate composition (general or specific) described herein or any chromium carboxylate composition (general or specific) prepared by any process(es) described herein can have a $\upsilon_{asym}$ ($CO_2$) IR peak within 105 cm$^{-1}$ of the $\upsilon_{sym}$ ($CO_2$) IR peak; alternatively, can have a $\upsilon_{asym}$ ($CO_2$) IR peak within 100 cm$^{-1}$ of the $\upsilon_{sym}$ ($CO_2$) IR peak; alternatively, can have a $\upsilon_{asym}$ ($CO_2$) IR peak within 95 cm$^{-1}$ of the $\upsilon_{sym}$ ($CO_2$) IR peak; or alternatively, can have a $\upsilon_{asym}$ ($CO_2$) IR peak within 90 cm$^{-1}$ of the $\upsilon_{sym}$ ($CO_2$) IR peak. In another aspect, the $\upsilon_{asym}$ ($CO_2$) IR peak within 110 cm$^{-1}$ of the $\upsilon_{sym}$ ($CO_2$) IR peak (or within any other range disclosed herein) can have the largest absorbance peak height of all $\upsilon_{asym}$ ($CO_2$) peaks of the transition metal carboxylate composition.

In other aspect, a chromium carboxylate composition (general or specific) described herein or any chromium carboxylate composition (general or specific) prepared by any process(es) described herein can have an IR absorbance peak height ratio of $\upsilon_{asym}$ ($CO_2$) IR peak within 110 cm$^{-1}$ of the $\upsilon_{sym}$ ($CO_2$) IR peak (or within any other range disclosed herein) to $\upsilon_{sym}$ ($CO_2$) IR peak of greater than or equal to 0.5:1; alternatively, greater than or equal to 0.75:1; alternatively, greater than or equal to 1:1; alternatively, greater than or equal to 1.25:1; alternatively, greater than or equal to 1.5:1; or alternatively, greater than or equal to 1.75:1. In another aspect, a chromium composition (general or specific) described herein or any chromium carboxylate composition (general or specific) prepared by any process(es) described herein can have an IR absorbance peak height ratio of $\upsilon_{asym}$ ($CO_2$) IR peak within 110 cm$^{-1}$ of the $\upsilon_{sym}$ ($CO_2$) IR peak (or within any other range disclosed herein) to $\upsilon_{sym}$ ($CO_2$) IR peak ranging from 0.5:1 to 100:1; alternatively, greater than or equal to 0.75:1 to 80:1; alternatively, greater than or equal to 1:1 to 60:1; alternatively, greater than or equal to 1.25:1 to 40:1; alternatively, greater than or equal to 1.5:1 to 3:1; or alternatively, greater than or equal to 1.75:1 to 20:1.

In a non-limiting embodiment, a chromium carboxylate composition (general or specific) described herein or a chromium carboxylate composition (general or specific) prepared by any process(es) described herein can have an IR absorbance peak height ratio of the $\upsilon_{asym}$ ($CO_2$) IR peak within 110 cm$^{-1}$ of the $\upsilon_{sym}$ ($CO_2$) IR peak (or within any other range disclosed herein) to a non-chromium bound carboxylate ($CO_2$) IR peak greater than or equal to 5:1; alternatively, greater than or equal to 6:1; alternatively, greater than or equal to 7:1; alternatively, greater than or equal to 8:1; alternatively, greater than or equal to 9:1; or alternatively, greater than or equal to 10:1. In other non-limiting embodiments, a chromium carboxylate composition described herein (general or specific) described herein or a chromium carboxylate composition (general or specific) prepared by any process(es) described herein can have an IR absorbance peak height ratio of the $\upsilon_{asym}$ ($CO_2$) IR peak within 110 $cm^{-1}$ of the $\upsilon_{sym}$ ($CO_2$) IR peak (or within any other range disclosed herein) to a non-chromium bound carboxylate ($CO_2$) IR peak ranging from 5:1 to 100:1; alternatively, ranging from 6:1 to 90:1; alternatively, ranging from 7:1 to 80:1; alternatively, ranging from 8:1 to 60:1; alternatively, ranging from 9:1 to 50:1; or alternatively, ranging from 10:1 to 40:1.

In a non-limiting embodiment, a chromium carboxylate composition described herein (general or specific) or a chromium carboxylate composition (general or specific) prepared by any process(es) described herein, can have an IR absorbance peak height ratio of the $\upsilon_{sym}$ ($CO_2$) IR peak to a non-chromium bound carboxylate ($CO_2$) IR peak greater than or equal to 3.5:1; alternatively, greater than or equal to 3.75:1; alternatively, greater than or equal to 4; alternatively, greater than or equal to 4.25:1; alternatively, greater than or equal to 4.5:1; or alternatively, greater than or equal to 4.75:1. In other non-limiting embodiments, Alternatively, a chromium carboxylate composition (general or specific) described herein or a chromium carboxylate composition (general or specific) prepared by any process(es) described herein can have an IR absorbance peak height ratio of the $\upsilon_{sym}$ ($CO_2$) IR peak (or within any other range disclosed herein) to a non-chromium bound carboxylate ($CO_2$) IR peak ranging from 3.5:1 to 100:1; alternatively, ranging from 3.75:1 to 90:1; alternatively, ranging from 4:1 to 80:1; alternatively, ranging from 4.25:1 to 60:1; alternatively, ranging from 4.5:1 to 50:1; or alternatively, ranging from 4.75:1 to 40:1.

In a non-limiting embodiment, a chromium carboxylate composition (general or specific) described herein or a chromium carboxylate composition (general or specific) prepared by any process(es) described herein can have can have an IR absorbance peak height ratio of the $\upsilon_{sym}$ ($CO_2$) IR peak located outside of 150 $cm^{-1}$ of the $\upsilon_{sym}$ ($CO_2$) IR peak to the IR absorbance peak height of the $\upsilon_{asym}$ ($CO_2$) IR peak located within 110 $cm^{-1}$ of the $\upsilon_{sym}$ ($CO_2$) IR peak (or within any other range disclosed herein) can less than or equal to 0.9:1; alternatively, greater than or equal to 0.85:1; alternatively, greater than or equal to 0.8:1; alternatively, greater than or equal to 0.75:1; alternatively, greater than or equal to 0.7:1; or alternatively, greater than or equal to 0.65:1.

In a non-limiting embodiment, a chromium carboxylate composition (general or specific) described herein or a chromium carboxylate composition (general or specific) prepared by any process(es) described herein can have an IR absorbance peak height ratio of the $\upsilon_{asym}$ ($CO_2$) IR peak within 110 $cm^{-1}$ of the $\upsilon_{sym}$ ($CO_2$) IR peak (or within any other range disclosed herein) to a $\upsilon_{asym}$ ($CrO_3$) IR peak greater than or equal to 1.5:1; alternatively, greater than or equal to 3:1; alternatively, greater than or equal to 5:1; alternatively, greater than or equal to 6:1; or alternatively, greater than or equal to 7:1. In other non-limiting embodiments, a chromium carboxylate composition (general or specific) described herein or any chromium carboxylate composition (general or specific) prepared by any process(es) described herein can have an IR absorbance peak height ratio of the $\upsilon_{asym}$ ($CO_2$) IR peak within 110 $cm^{-1}$ of the $\upsilon_{sym}$ ($CO_2$) IR peak (or within any other range disclosed herein) to a $\upsilon_{asym}$ ($CrO_3$) IR peak ranging from 1.5:1 to 100:1; alternatively, ranging from 3:1 to 90:1; alternatively, ranging from 5:1 to 80:1; alternatively, ranging from 6:1 to 60:1; or alternatively, ranging from 7:1 to 50:1.

In an embodiment, any chromium carboxylate composition (general or specific) described herein or any chromium carboxylate composition (general or specific) prepared by any process(es) described herein can have a $\upsilon_{asym}$ ($CO_2$) IR peak at 1516±15 $cm^{-1}$. In any chromium carboxylate composition (general or specific) described herein or any chromium carboxylate composition (general or specific) prepared by any process(es) described herein aspect and/or embodiment, the largest absorbance IR peak height attributable to the chromium carboxylate can be the $\upsilon_{asym}$ ($CO_2$) IR peak at 1516±15 $cm^{-1}$. In some embodiments, any chromium carboxylate composition (general or specific) described herein or any chromium carboxylate composition (general or specific) prepared by any process(es) described herein can have an IR absorbance peak height ratio of the IR peak at 1516±15 $cm^{-1}$ to the IR peak at 1429±15 $cm^{-1}$ of greater than or equal to 0.5:1; alternatively, greater than or equal to 0.75:1; alternatively, greater than or equal to 1:1; alternatively, greater than or equal to 1.25:1; alternatively, greater than or equal to 1.5:1; alternatively, greater than or equal to 1.55:1; alternatively, greater than or equal to 1.6:1; alternatively, greater than or equal to 1.65:1; alternatively, greater than or equal to 1.7:1; or alternatively, greater than or equal to 1.75:1. In other embodiments, any chromium carboxylate composition (general or specific) described herein or any chromium carboxylate composition (general or specific) prepared by any process(es) described herein can have an IR absorbance peak height ratio of the IR peak at 1516±15 $cm^{-1}$ to the IR peak at 1429±15 $cm^{-1}$ ranging from 0.5:1 to 100:1; alternatively, greater than or equal to 0.75:1 to 80:1; alternatively, greater than or equal to 1:1 to 60:1; alternatively, greater than or equal to 1.25:1 to 40:1; alternatively, greater than or equal to 1.5:1 to 3:1; or alternatively, greater than or equal to 1.75:1 to 20:1.

In a non-limiting embodiment, any chromium carboxylate composition (general or specific) described herein or any chromium carboxylate composition (general or specific) prepared by any process(es) described herein can have a IR peak height ratio of the $\upsilon_{asym}$ ($CO_2$) IR peak located at 1516±15 $cm^{-1}$ to the $\upsilon_{sym}$ ($CO_2$) IR peak located at 1616±20 $cm^{-1}$ greater than or equal to 1:1; alternatively, greater than or equal to 1.5:1; alternatively, greater than or equal to 2:1; alternatively, greater than or equal to 2.5:1; or alternatively, greater than or equal to 3:1. In some non-limiting embodiments, any chromium carboxylate composition (general or specific) described herein or any chromium carboxylate composition (general or specific) prepared by any process(es) described herein can have a IR peak height ratio of the $\upsilon_{asym}$ ($CO_2$) IR peak located at 1516±15 $cm^{-1}$ to the $\upsilon_{sym}$ ($CO_2$) IR peak located at 1616±20 $cm^{-1}$ ranging from 1:1 to 100:1; alternatively, ranging from 1.5:1 to 80:1; alternatively, ranging from 2:1 to 60:1; alternatively, ranging from 2.5:1 to 50:1; or alternatively, ranging from 3:1 to 40:1.

In a non-limiting embodiment, any chromium carboxylate composition (general or specific) described herein or any chromium carboxylate composition (general or specific) prepared by any process(es) described herein can have an IR peak height ratio of the $\upsilon_{sym}$ ($CO_2$) IR peak located at 1516±15 $cm^{-1}$ to the non-chromium ($CO_2$) bound IR peak located at 1685±20 $cm^{-1}$ greater than or equal to 5:1; alternatively, greater than or equal to 6:1; alternatively, greater than or equal to 7:1; alternatively, greater than or equal to 8:1; alternatively, greater than or equal to 9:1; or alternatively, greater than or equal to 10:1. In other non-limiting embodiments, any chromium carboxylate composition (general or specific) described herein or any chromium carboxylate composition (general or specific) prepared by any process(es) described herein can have an IR peak height ratio of the $\upsilon_{asym}$ ($CO_2$) IR peak located at 1516±15 $cm^{-1}$ to the non-chromium ($CO_2$) bound IR peak located at 1685±20 $cm^{-1}$ ranging from 5:1 to 100:1; alternatively, ranging from 6:1 to 90:1; alternatively, ranging from 7:1 to 80:1; alternatively, ranging from 8:1 to 60:1; alternatively, ranging from 9:1 to 50:1; or alternatively, ranging from 10:1 to 40:1.

In a non-limiting embodiment, any chromium carboxylate composition (general or specific) described herein or any chromium carboxylate composition (general or specific) prepared by any process(es) described herein can have an IR peak height ratio of the $\upsilon_{sym}$ ($CO_2$) IR peak located at 1429±15 $cm^{-1}$ to the non-chromium ($CO_2$) bound IR peak located at 1685±20 $cm^{-1}$ greater than or equal to 3.5:1; alternatively, greater than or equal to 3.75:1; alternatively, greater than or equal to 4:1; alternatively, greater than or equal to 4.25:1; alternatively, greater than or equal to 4.5:1; or alternatively, greater than or equal to 4.75:1. In other non-limiting embodiments, any chromium carboxylate composition (general or specific) described herein or any chromium carboxylate composition (general or specific) prepared by any process(es) described herein can have an IR peak height ratio of the $\upsilon_{sym}$ ($CO_2$) IR peak located at 1429±15 $cm^{-1}$ to the non-chromium ($CO_2$) bound IR peak located at 1685±20 $cm^{-1}$ ranging from 3.5:1 to 100:1; alternatively, ranging from 3.75:1 to 90:1; alternatively, ranging from 4:1 to 80:1; alternatively, ranging from 4.25:1 to 60:1; alternatively, ranging from 4.5:1 to 50:1; or alternatively, ranging from 4.75:1 to 40:1.

In a non-limiting embodiment, any chromium carboxylate composition (general or specific) described herein or any chromium carboxylate composition (general or specific) prepared by any process(es) described herein can have an IR absorbance peak height ratio of the $\upsilon_{sym}$ ($CO_2$) IR peak located at 1616±20 $cm^{-1}$ to the IR absorbance peak height of the $\upsilon_{asym}$ ($CO_2$) IR peak located at 1429±15 $cm^{-1}$ can be less than or equal to 0.9:1; alternatively, greater than or equal to 0.85:1; alternatively, less than or equal to 0.8:1; alternatively, less than or equal to 0.75:1; alternatively, less than or equal to 0.7:1; or alternatively, less than or equal to 0.65:1.

In a non-limiting embodiment, any chromium carboxylate composition (general or specific) described herein or any chromium carboxylate composition (general or specific) prepared by any process(es) described herein can have an IR absorbance peak height ratio of an IR peak located at 695±20 $cm^{-1}$ to the IR absorbance peak height of the $\upsilon_{asym}$ ($CO_2$) IR peak located at 1429±15 $cm^{-1}$ can be less than or equal to 1:1; alternatively, less than or equal to 0.8:1; alternatively, less than or equal to 0.6:1; alternatively, less than or equal to 0.4:1; alternatively, less than or equal to 0.3:1; alternatively, less than or equal to 0.25:1; alternatively, less than or equal to 0.2:1; alternatively, less than or equal to 0.18:1; or alternatively, less than or equal to 0.16:1.

In a non-limiting embodiment, any chromium carboxylate composition (general or specific) described herein or any chromium carboxylate composition (general or specific) prepared by any process(es) described herein can have an IR absorbance peak height ratio of an IR peak located at 695±20 $cm^{-1}$ to the IR absorbance peak height of the $\upsilon_{asym}$ ($CO_2$) IR peak located at 1429±15 $cm^{-1}$ can be less than or equal to 1:1; alternatively, less than or equal to 0.8:1; alternatively, less than or equal to 0.6:1; alternatively, less than or equal to 0.4:1; alternatively, less than or equal to 0.3:1; alternatively, less than or equal to 0.25:1; alternatively, less than or equal to 0.2:1; alternatively, less than or equal to 0.18:1; or alternatively, less than or equal to 0.16:1.

In a non-limiting embodiment, any chromium carboxylate composition (general or specific) described herein or any chromium carboxylate composition (general or specific) prepared by any process(es) described herein can have an IR peak height ratio of the $\upsilon_{asym}$ ($CO_2$) IR peak at 1516±15 $cm^{-1}$ to IR peak located at 700±50 $cm^{-1}$ greater than or equal to 1.5:1; alternatively, greater than or equal to 3:1; alternatively, greater than or equal to 5:1; alternatively, greater than or equal to 6:1; or alternatively, greater than or equal to 7:1. In other non-limiting embodiments, any chromium carboxylate composition (general or specific) described herein or any chromium carboxylate composition (general or specific) prepared by any process(es) described herein can have an IR peak height ratio of the $\upsilon_{sym}$ ($CO_2$) IR peak located at 1429±15 $cm^{-1}$ to the non-chromium ($CO_2$) bound IR peak located at 700±50 $cm^{-1}$ ranging from 1.5:1 to 100:1; alternatively, ranging from 3:1 to 90:1; alternatively, ranging from 5:1 to 80:1; alternatively, ranging from 6:1 to 60:1; or alternatively, ranging from 7:1 to 50:1

In an embodiment, these IR peak related features can be determined by subjecting the chromium carboxylate composition contained in KBr (KBr pellet) to infrared analysis. Alternatively, if the chromium carboxylate composition is not suitable for analysis in a KBr pellet, the IR analysis can be performed by placing the transition metal carboxylate composition in a solvent or a dispersing agent that is IR transparent in the necessary IR peak regions (e.g., a mineral oil such as Nujol, among others). Additionally, the IR peak height ratio features can be based upon the raw peak heights or baseline corrected peak heights.

Generally, X-ray crystallography can be utilized to characterize the materials which form well defined crystals. However, in some instances, materials which one having ordinary skill in the art would believe to form well defined crystals do not form crystals which are suitable for traditional X-ray crystallography. For example, commercially available chromium(III) 2-ethylhexanoate forms an amorphous mass which is not suitable for traditional X-ray crystallography (see FIG. 4). Similarly, the chromium(III) 2-ethylhexanoate prepared using the methods described herein can form an amorphous mass (see FIG. 3); the produced chromium(III) 2-ethylhexanoate was a green tacky solid, showed no evidence of crystallinity, and was not suitable for traditional X-ray crystallography. In some of these instances, high energy X-ray diffraction can be utilized to provide structural information about the material. The high energy X-ray diffraction data for these materials can be compared to high energy X-ray diffraction data of other materials or to calculated high energy diffraction data of theoretical models of materials to determine the material's structure and/or whether or not the material is similar to other known materials.

In some embodiments, any chromium carboxylate composition (general or specific) described herein or any chromium carboxylate composition prepared by any process(es) described herein can be analyzed by high energy X-ray diffraction to determine the structure or structures of the chromium carboxylate molecule(s) present in the chromium carboxylate composition and/or compared to calculated high energy diffraction data of theoretical models of materials believed to be present in the chromium carboxylate composition. For example, "Synthesis and structural studies of metal (Cr, Zn and Bi) carboxylate liquids" R. T. Hart Jr., N.

A. Eckert, J. K. Ngala, A. F. Polley, C. J. Benmore, A. Clark, S. Macha, Presentation CATL 20, The 237th ACS National Meeting, Salt Lake City, Utah, Mar. 23, 2009, compared high energy X-ray diffraction g(r) data points of an aqueous metathesis process and displacement process produced chromium(III) carboxylate to the theoretical high energy X-ray diffraction g(r) data points of models of $Cr_3O(O_2CCH_3)_6$, $Cr_8(OH)_8(O_2CCH_3)_{12}$, and $Cr_{12}O(O_2CCH_3)_6$, constructed from data presented in M. Eshel, et al., *Inorg. Chem.*, 2000, 39, pp 1376, and M. Eshel, et al., *Inorg Chim. Acta*, 2002, 329, pp 45. The entirety of Hart Jr. et al. and M. Eshel et al. are incorporated herein by reference.

Without being limited to theory, it is believed that the chromium carboxylate composition(s) described herein or prepared according to any process(es) disclosed herein can contain substantial quantities of mononuclear chromium carboxylate. To test this hypothesis, one can compare the high energy X-ray diffraction g(r) data points for any chromium composition described herein or any chromium carboxylate composition prepared according to any process(es) disclosed herein to the high energy X-ray diffraction g(r) data points for the authentic mononuclear chromium carboxylate. In many instances pure and/or authentic sample of mononuclear chromium carboxylates are not available. In these instances, the high energy X-ray diffraction g(r) data points for any chromium carboxylate composition described herein or any chromium carboxylate composition prepared according to any process(es) disclosed herein can be compared to a calculated high energy X-ray diffraction g(r) data pints of a theoretical model of the chromium carboxylate. The model of the mononuclear chromium carboxylate can be produced utilizing any number of methods available to those skilled in the art. In one example, the model of a mononuclear chromium(III) carboxylate can be obtained by using Spartan 08 with optimizations that assume a high spin Cr(III) center with quartet ground spin state by obtaining initial geometries via PM3 geometry optimizations with conformational searching and further geometry optimization utilized DFT B3LYP with the LACVP basis set with an effective core potential on Cr and 6-31 g** on H, C, O. In another example, the model of the mononuclear chromium carboxylate can be obtained using a heuristic method similar to the one described herein for chromium(III) carboxylates. The high energy X-ray diffraction g(r) data points calculated for the mononuclear chromium carboxylate model can be calculated using methods and/or programs available to those skilled in the art. For example, the PDFFit library of functions and routines as implemented in PDFgui—version 1.0—C. L. Farrow, P. Juhás, J. W. Liu, D. Bryndin, E. S. Božin, J. Bloch, Th. Proffen and S. J. L. Billinge, PDFfit2 and PDFgui: computer programs for studying nanostructure in crystals, *J. Phys.: Condens. Matter* 19, 335219 (2007)) and can be utilized to calculate the high energy X-ray diffraction d(r) data points for a mononuclear chromium carboxylate model which can then be converted to high energy X-ray diffraction g(r) data points.

The comparison of the high energy X-ray diffraction g(r) data points for chromium carboxylate composition described herein or prepared according to the process(es) disclosed herein to the high energy X-ray diffraction g(r) data points for the authentic mononuclear chromium carboxylate or a calculated high energy X-ray diffraction g(r) data points of a theoretical model of the mononuclear chromium carboxylate can be made using techniques known and used by those skilled in the art. One method for comparing the high energy X-ray diffraction g(r) data points for chromium carboxylate compositions described herein or prepared according to the process(es) disclosed herein to the high energy X-ray diffraction g(r) data points for the authentic mononuclear chromium carboxylate or a calculated high energy X-ray diffraction g(r) data points of a theoretical model(s) of the mononuclear chromium carboxylate can be to perform a goodness of fit test. The closer the goodness of fit test value, $R^2$, is to 1, the more likely the chromium composition contains a significant quantity of mononuclear chromium carboxylate.

It should be noted that when the comparison is made using a calculated high energy X-ray diffraction g(r) data points of a theoretical model of the mononuclear chromium carboxylate, one does not necessarily expect a goodness of fit $R^2$ test value very close to 1 because the comparison is made to a theoretical model of the mononuclear chromium carboxylate and as such is not the actual structure for the mononuclear chromium carboxylate. While not wishing to be bound by theory, it is believed that, even if any of the herein described chromium carboxylate compositions or any of the chromium carboxylate compositions produced by any process(es) described herein is a pure mononuclear chromium carboxylate, the goodness of fit $R^2$ test value would unlikely be 1 because there could likely be differences between the structure of the theoretical model of the mononuclear chromium carboxylate and the actual pure mononuclear chromium carboxylate. The difference between these structures could result in differences in the measured high energy X-ray diffraction g(r) data points and the calculated high energy X-ray diffraction g(r) data points. Consequently, the goodness of fit test value, $R^2$, would not be expected to be 1. However, the goodness of fit test value, $R^2$, still has value since the high energy X-ray diffraction g(r) data points for chromium carboxylate compositions having significant quantities of mononuclear chromium carboxylate will have a goodness of fit test value, $R^2$, closer to 1 than a chromium carboxylate composition which has significant quantities of dinuclear, trinuclear, or higher polynuclear chromium carboxylate species.

Depending upon the number of carbon atoms in the carboxylate of the chromium carboxylate, it can be impractical or difficult to prepare a theoretical model of the mononuclear chromium carboxylate. Reviewing theoretical structures of mononuclear chromium carboxylates, it can be apparent that the chromium atom, the two oxygen atoms of the carboxylate group chelated with the transition metal, the carboxylate group carbon and oxygen atoms, and the carbon atom attached to the carboxylate group can be relatively fixed in space because they do not have free rotation about any bond that could change its distance from the other atoms. Consequently, one could expect that there could not be large variations in the respective bond distances and bond angles between these atoms as a function of the carboxylate of the chromium carboxylate. Without any further substituents, these atoms could form chromium acetate. Consequently, in an embodiment, any chromium carboxylate composition described herein or any chromium carboxylate composition produced by any process described herein can be compared to mononuclear chromium acetate. If any chromium carboxylate composition described herein or any chromium carboxylate composition produced by any process(es) described herein contains significant quantities of mononuclear chromium carboxylate, one could expect that the high energy X-ray diffraction g(r) data points of a mononuclear chromium carboxylate composition could be compared to the high energy X-ray diffraction g(r) data points of an authentic chromium acetate or the calculated high energy X-ray diffraction g(r) data points of a theoretical model of mononuclear chromium acetate. Without being limited to theory, the comparison between any chromium carboxylate composition described herein or any chromium carboxylate composition produced by any process(es) described herein could be expected to be fairly similar to the high energy X-ray diffraction g(r) data points of authentic chromium acetate or a calculated high energy X-ray diffraction g(r) data points of a theoretical model of the mononuclear chromium acetate. In particular, the comparison could be expected to be reasonable up to and including r values of 4 Å where the contributions from intermolecular interactions and contributions of the non-hydrogen atoms of the carboxylate group beyond the carbon atom attached to the carboxylate (C=O) carbon atom could be expected to be small.

Regarding the goodness of fit test value, $R^2$, the goodness of fit test value can be calculated using the equation $R^2=1-(SS_{err}/SS_{tot})$. Within the equation $R^2=1-(SS_{err}/SS_{tot})$, $SS_{err}$ is the summation of the squares of the residual between the high energy X-ray diffraction g(r) data points of the chromium carboxylate composition and either a) the high energy X-ray diffraction g(r) data points for the actual mononuclear chromium carboxylate or b) the calculated high energy X-ray diffraction g(r) data points for a theoretical model of the mononuclear chromium carboxylate. Within the equation $R^2=1-(SS_{err}/SS_{tot})$, $SS_{tot}$ is the summation of the squares of the differences between the high energy X-ray diffraction g(r) data points of the chromium carboxylate composition and the mean of the high energy X-ray diffraction g(r) data points of the chromium carboxylate composition. In order for the goodness of fit test value to have reasonable meaning, the test should be performed using a reasonable number of high energy X-ray diffraction g(r) data points. Herein, the goodness of fit test value can be calculated using high energy X-ray diffraction g(r) data points separated by 0.01 Angstroms over the r value range to which the goodness of fit test value is to be calculated. Typically, the high energy X-ray diffraction g(r) data points can be at exact hundredths of an Angstrom r values. However, the high energy X-ray diffraction g(r) data points can be based upon any set of g(r) data points separated by r values of 0.01 Angstroms. Additionally, to provide the best basis for the goodness of fit test value (and to avoid interpolation of the g(r) data points), the high energy X-ray diffraction g(r) data points of the chromium carboxylate composition and the high energy X-ray diffraction g(r) data points for the actual mononuclear chromium carboxylate or the calculated high energy X-ray diffraction g(r) data for a theoretical model of the mononuclear chromium carboxylate should located at the same r values.

In an embodiment, the goodness of fit test value can be based on the application of the goodness of fit over a range of r values of the high energy X-ray diffraction g(r) data points of the chromium carboxylate composition and the high energy X-ray diffraction g(r) data points for the actual mononuclear chromium carboxylate or the calculated high energy X-ray diffraction g(r) data points for a theoretical model of the mononuclear chromium carboxylate. In some embodiments, the minimum r value for the range of values for the goodness of fit test value for the comparison of the high energy X-ray diffraction g(r) data points of the chromium carboxylate composition and the high energy X-ray diffraction g(r) data points for the actual mononuclear chromium carboxylate or the calculated high energy X-ray diffraction g(r) data points for a theoretical model of the mononuclear chromium carboxylate can be 1.2 angstroms; alternatively, 1.25 angstroms; alternatively, 1.3 angstroms; alternatively, 1.35 angstroms; or alternatively, 1.4 angstroms. In some embodiments, the maximum r value for the range of values for the goodness of fit test value for the comparison of the high energy X-ray diffraction g(r) data points of the chromium carboxylate composition and the high energy X-ray diffraction g(r) data points for the actual mononuclear chromium carboxylate or the calculated high energy X-ray diffraction g(r) data points for a theoretical model of the mononuclear chromium carboxylate can be 4 angstroms; alternatively, 3.9 angstroms; alternatively, 3.8 angstroms; alternatively, 3.7 angstroms; or alternatively, 3.6 angstroms; alternatively, 3.5 angstroms; alternatively, 3.4 angstroms; alternatively, 3.3 angstroms; alternatively, 3.2 angstroms; alternatively, 3.1 angstroms; or alternatively, 3.0 angstroms. In an embodiment, the goodness of fit test value can be based upon the application of the goodness of fit test for the comparison of the high energy X-ray diffraction g(r) data points of the chromium carboxylate composition and the high energy X-ray diffraction g(r) data points for the actual mononuclear chromium carboxylate or the calculated high energy X-ray diffraction g(r) data points for a theoretical model of the mononuclear chromium carboxylate over an r value range that ranges from any minimum r value described herein to any maximum r value described herein. In some non-limiting embodiments, the goodness of fit test value can based upon the application of the goodness of fit test for the comparison of the high energy X-ray diffraction g(r) data points of the chromium carboxylate composition and the high energy X-ray diffraction g(r) data points for the actual mononuclear chromium carboxylate or the calculated high energy X-ray diffraction g(r) data points for a theoretical model of the mononuclear chromium carboxylate over a r value range of 1.3 Angstroms to 4 Angstroms; or alternatively, the goodness of fit test value is based upon the application of the goodness of fit test over a r value range of 1.3 Angstroms to 3.2 Angstroms; alternatively, 1.3 Angstroms to 3.3 Angstroms; alternatively, 1.3 Angstroms to 3.4 Angstroms; alternatively, 1.3 Angstroms to 3.5 Angstroms; alternatively, 1.3 Angstroms to 3.6 Angstroms; alternatively, 1.3 Angstroms to 3.7 Angstroms; alternatively, 1.3 Angstroms to 3.8 Angstroms; alternatively, 1.3 Angstroms to 3.9 Angstroms; alternatively, 1.3 Angstroms to 4.0 Angstroms.

The r values of these ranges can seem arbitrary. However, the selection of the maximum r value of the ranges can be based upon supposition, without being limited to theory, that intermolecular contributions and effects of bond rotation beyond the carbon atom attached to the carboxylate (C=O) carbon atom cannot be accurately accounted for when using a calculated high energy X-ray diffraction of chromium carboxylate theoretical model. Thus the longer r value can be selected to exclude these difficult to model characteristics. The lower limit of the r value of these ranges can be based upon the supposition, without being limited to theory, that the more important and/or more meaningful atom to atom distances can have an average atom to atom distance of at least 1.2 to 1.3 angstroms. Additionally, the only bond distances shorter than 1.2 Angstroms are then carbon-hydrogen bonds which contribute less than 1 percent to the scattering intensity and are not generally considered in the data handling and modeling. Thus, the lower limit of the shorter r value can be selected to include the contributions from the shortest important and/or meaningful atom to atom distances.

In an embodiment, the goodness of fit test can be performed between the high energy X-ray diffraction g(r) data points for any chromium carboxylate composition described herein and/or any chromium carboxylate composition prepared according to any process(es) disclosed herein, and the high energy X-ray diffraction g(r) data points for an authentic mononuclear chromium carboxylate. In another embodiment, the goodness of fit test can be performed between the high energy X-ray diffraction g(r) data points for any chromium carboxylate composition described herein and/or any chromium carboxylate composition prepared according to any process(es) disclosed herein, and the high energy X-ray diffraction g(r) data points for a theoretical model of the mononuclear chromium carboxylate. In an embodiment, the goodness of fit test value, $R^2$, can be based upon the high energy X-ray diffraction g(r) data points over any range of r disclosed herein. In an embodiment, $R^2$ for the goodness of fit test (over any range of r disclosed herein) between the high energy X-ray diffraction g(r) data points for any chromium carboxylate composition described herein and/or any chromium carboxylate composition prepared according to any process(es) disclosed herein, and the high energy X-ray diffraction g(r) data points for an authentic mononuclear chromium carboxylate or a calculated high energy X-ray diffraction g(r) of a theoretical model of the mononuclear chromium carboxylate can be at least 0.55; alternatively, at least 0.60; alternatively, at least 0.625; alternatively, at least 0.65; alternatively, at least 0.675; alternatively, at least 0.70; alternatively, at least 0.725; alternatively, at least 0.75; alternatively, at least 0.775; alternatively, at least 0.80; alternatively, at least 0.825; alternatively, at least 0.85; alternatively, at least 0.875; or alternatively, at least 0.90. In another embodiment, $R^2$ for the goodness of fit test (over any range of r disclosed herein) between the high energy X-ray diffraction g(r) data points for any chromium carboxylate composition described herein and/or any chromium carboxylate composition prepared according to any process(es) disclosed herein, and the high energy X-ray diffraction g(r) data points for an authentic mononuclear chromium carboxylate or a calculated high energy X-ray diffraction g(r) of a theoretical model of the mononuclear chromium carboxylate can range from 0.55 to 1; alternatively, range from 0.60 to 1; alternatively, range from 0.625 to 1; alternatively, range from 0.65 to 1; alternatively, range from 0.675 to 1; alternatively, range from 0.70 to 1; alternatively, range from 0.725 to 1; alternatively, range from 0.75 to 1; alternatively, range from 0.775 to 1; alternatively, range from 0.80 to 1; alternatively, range from 0.825 to 1; alternatively, range from 0.85 to 1; alternatively, range from 0.875 to 1; or alternatively, range from 0.90 to 1.

In a non-limiting embodiment, the high energy X-ray diffraction g(r) data points for any chromium(III) carboxylate composition described herein or any chromium(III) carboxylate composition prepared according to any process described herein can be compared to the high energy X-ray diffraction g(r) data points of an authentic mononuclear chromium(III) carboxylate using the goodness of fit test. In another non-limiting embodiment, the high energy X-ray diffraction g(r) data points for any chromium(III) carboxylate composition described herein or any chromium(III) carboxylate composition prepared according to any process described herein can be compared to a calculated high energy X-ray diffraction g(r) data points of a theoretical model of the mononuclear chromium(III) carboxylate using the goodness of fit test. In other non-limiting embodiments, the high energy X-ray diffraction g(r) data points for any chromium(III) carboxylate composition described herein or any chromium(III) carboxylate composition prepared according to any process described herein can be compared to the high energy X-ray diffraction g(r) data points of authentic mononuclear chromium(III) acetate using the goodness of fit test. In another non-limiting embodiment, the high energy X-ray diffraction g(r) data points for any chromium(III) carboxylate composition described herein or any chromium(III) carboxylate composition prepared according to any process described herein can be compared to a calculated high energy X-ray diffraction g(r) data points of a theoretical model of mononuclear chromium(III) acetate using the goodness of fit test. In any embodiment or aspect described herein, the goodness of fit test value, $R^2$, for the goodness of fit test (over any range of r disclosed herein) between the high energy X-ray diffraction g(r) data points of any chromium(III) carboxylate composition described herein and/or any chromium(III) carboxylate composition prepared according to any process(es) disclosed herein and the high energy X-ray diffraction g(r) data points for an authentic mononuclear chromium(III) carboxylate, the high energy X-ray diffraction g(r) data points for an authentic mononuclear chromium(III) acetate, a calculated high energy X-ray diffraction g(r) of a theoretical model of the mononuclear chromium(III) carboxylate, or a calculated high energy X-ray diffraction g(r) of a theoretical model of the mononuclear chromium(III) acetate can be at least 0.55; alternatively, at least 0.60; alternatively, at least 0.625; alternatively, at least 0.65; alternatively, at least 0.675; alternatively, at least 0.70; alternatively, at least 0.725; alternatively, at least 0.75; alternatively, at least 0.775; alternatively, at least 0.80; alternatively, at least 0.825; alternatively, at least 0.85; alternatively, at least 0.875; or alternatively, at least 0.90. In any embodiment or aspect described herein, the goodness of fit test value, $R^2$, for the goodness of fit test (over any range of r disclosed herein) between the high energy X-ray diffraction g(r) data points of any chromium(III) carboxylate composition described herein and/or any chromium(III) carboxylate composition prepared according to any process(es) disclosed herein and the high energy X-ray diffraction g(r) data points for an authentic mononuclear chromium(III) carboxylate, the high energy X-ray diffraction g(r) data points for an authentic mononuclear chromium(III) acetate, a calculated high energy X-ray diffraction g(r) of a theoretical model of the mononuclear chromium(III) carboxylate, or a calculated high energy X-ray diffraction g(r) of a theoretical model of the mononuclear chromium(III) acetate can range from 0.55 to 1; alternatively, range from 0.60 to 1; alternatively, range from 0.625 to 1; alternatively, range from 0.65 to 1; alternatively, range from 0.675 to 1; alternatively, range from 0.70 to 1; alternatively, range from 0.725 to 1; alternatively, range from 0.75 to 1; alternatively, range from 0.775 to 1; alternatively, range from 0.80 to 1; alternatively, range from 0.825 to 1; alternatively, range from 0.85 to 1; alternatively, range from 0.875 to 1; or alternatively, range from 0.90 to 1.

In some non-limiting embodiments, any chromium(III) carboxylate composition described herein or any chromium (III) carboxylate composition produced by any process(es) described herein, can be characterized using singly, or in any combination, any characterizing embodiment described herein; for example the presence or absence of an infrared peak disclosed herein, any infrared peak height feature disclosed herein, any infrared peak wavelength separation described herein, any infrared peak height ratio disclosed herein, the presence or absence of any high energy X-ray diffraction peak described herein, and/or any goodness of fit $R^2$ test value disclosed herein, among other. Each of these characterizing elements is disclosed herein and can be utilized without limitation to describe the chromium(III) carboxylate composition(s) of the present disclosure.

In an embodiment, the chromium carboxylate composition can comprise, consist essentially of, or consist of, a chromium carboxylate composition prepared by any chromium carboxylate composition preparation process described herein. In some embodiments, the chromium carboxylate composition can be, comprise, or consist essentially of, a chromium(III) carboxylate composition prepared by any chromium(III) carboxylate composition preparation process described herein.

In various aspects and embodiments, the composition (or catalyst systems) described herein utilize a nitrogen-containing compound. Generally, the nitrogen containing compound can be, comprise, or consist essentially of, any organic compound having a nitrogen atom. In an embodiment, the nitrogen containing compound can be, comprise, or consist essentially of, an amine, an amide, a nitrile or any combination thereof; alternatively, an amine; alternatively, and amide; or alternatively, a nitrile.

In an embodiment, the amine which can be utilized as the nitrogen containing compound can be, comprise, or consist essentially of, a non-metallic metal containing compound; or alternatively, a metallic amine. In an aspect, the amine (metallic or non-metallic) which can be utilized as the nitrogen containing compound can be, comprise, or consist essentially of a pyrrole compound. In an embodiment, the pyrrole compound can be, comprise, or consist essentially of a non-metallic pyrrole compound; alternatively, metal pyrrolide. In some embodiments, the amide which can be utilized as the nitrogen containing compound can be, comprise, or consist essentially of a non-metallic amide; or alternatively a metallic amide.

Amines that can be utilized as the nitrogen containing compound can be, comprise, or consist essentially of, a $C_1$ to $C_{60}$ amines; alternatively, a $C_1$-$C_{45}$ amine; alternatively, a $C_1$-$C_{30}$ amine; alternatively, a $C_1$-$C_{20}$ amines; or alternatively, a $C_1$-$C_{15}$ amine. In an embodiment, the amine which can be utilized as the nitrogen containing compound can be, comprise, or consist essentially of, monohydrocarbylamine, a dihydrocarbylamine, a trihydrocarbyl amine, or any combination thereof; alternatively, a monohydrocarbylamine, a dihydrocarbylamine, or any combination thereof; alternatively, monohydrocarbylamine; alternatively, a dihydrocarbylamine; or alternatively, a trihydrocarbyl amine. In other embodiments, the amine which can be utilized as the nitrogen containing compound can be, comprise, or consist essentially of, an aliphatic amine, an aromatic amine, or any combination thereof; alternatively, an aliphatic amine; or alternatively, an aromatic amine. In an embodiment, the amine (aliphatic or aromatic) which can be utilized as the nitrogen containing compound can be, comprise, or consist essentially of a cyclic amine, an acyclic amine, or any combination thereof; alternatively, a cyclic amine; or alternatively, an acyclic amine. In some embodiments, the amine which can be utilized as the nitrogen containing compound can be, comprise, or consist essentially of, an amine having the formula $NR^6R^7R^8$, $NHR^6R^7$, $NH_2R^6$, or any combination thereof where $R^6$, $R^7$, and $R^8$ independently are hydrocarbyl groups. In other embodiments, the amine which can be utilized as the nitrogen containing compound can be, comprise, or consist essentially of, an amine having the formula $NR^6R^7R^8$; alternatively, the formula $NHR^6R^7$; or alternatively, the formula $NH_2R^6$. Hydrocarbyl groups are generally disclosed within the present disclosure (e.g. as a selection for $R^{2c}$, for the monocarboxylate having the formula $^-O_2CR^{2c}$ and/or as a selection for $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$, and as substituent groups, among other places). The aspects and embodiments of the hydrocarbyl groups described herein (either explicitly specified or implicitly recognized by those skilled in the art), can be utilized without limitation as the hydrocarbyl groups which can be utilized to further describe the N-hydrocarbylamides which can be utilized as the nitrogen containing compound. Additionally, these hydrocarbyl groups can be utilized without limitation as the hydrocarbyl groups which can be utilized to further describe the monohydrocarbylamines, a dihydrocarbylamines, and/or a trihydrocarbyl amines which can be utilized as the nitrogen containing compound. Additionally, these hydrocarbyl groups can be utilized without limitation as $R^6$, $R^7$, and $R^8$ for the amines having the formula $NR^6R^7R^8$, $NHR^6R^7$, and/or $NH_2R^6$ which can be utilized as the nitrogen containing compound.

Monohydrocarbylamines, dihydrocarbylamines, a trihydrocarbyl amines, amines having the formula $NR^6R^7R^8$, amines having the formula $NHR^6R^7$, amines having the formula $NH_2R^6$ are described herein as potential neutral ligands and/or as potential agent in a process to quench, deactivate, and/or kill a catalyst system. These amines can be utilized without limitation as the nitrogen containing compound in any composition (or catalyst system) described herein. In some other embodiments, the amine that can be utilized as the nitrogen containing compound can be, comprise, or consist essentially of, ammonia.

Amides that can be utilized as the nitrogen containing compound can be, comprise, or consist essentially of, $C_2$ to $C_{30}$ amides; alternatively, $C_2$-$C_{25}$ amides; alternatively, $C_2$-$C_{15}$ amides; or alternatively, $C_2$-$C_{10}$ amides. In an embodiment, the amine which can be utilized as the nitrogen containing compound can be, comprise, or consist essentially of, an N-hydrocarbylamide. In some embodiments, the amide which can be utilized as the nitrogen containing compound can be, comprise, or consist essentially of, an aliphatic amide, an aromatic amide, or any combination thereof; alternatively, an aliphatic amide; or alternatively, an aromatic amide. In an embodiment, the amide which can be utilized as the nitrogen containing compound can be, comprise, or consist essentially of a cyclic amide or an acyclic amide; alternatively, a cyclic amide; or alternatively, an acyclic amide. In some embodiments, the amide which can be utilized as the nitrogen containing compound can be, comprise, or consist essentially of, an amide having the formula $R^{15}C(=O)NH_2$, $R^{15}C(=O)NHR^{16}$, or any combination thereof; alternatively, $R^{15}C(=O)NH_2$; or alternatively, $R^{15}C(=O)NHR^{16}$. In an embodiment, $R^{15}$ and $R^{16}$ independently are hydrocarbyl groups. Hydrocarbyl groups are generally disclosed within the present disclosure (e.g. as a selection for $R^{2c}$ for the monocarboxylate having the formula $^-O_2CR^{2c}$, and/or as a selection for $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$, among other places). The aspects and embodiments of these hydrocarbyl groups described herein (either explicitly specified or implicitly recognized by those skilled in the art), can be utilized without limitation as the hydrocarbyl groups which can be utilized to further describe the N-hydrocarbylamides which can be utilized as the nitrogen containing compound. Additionally, these hydrocarbyl substituent groups can be utilized without limitation as $R^{15}$ and $R^{16}$ for the amides having the formula $R^{15}C(=O)R^{16}$ which can be utilized as the nitrogen containing compound.

In an embodiment, the amide which can be utilized as the nitrogen containing compound can be, comprise, or consist essentially of, acetamide, a N-hydrocarbyl-acetamide, a N-methylhydrocarbyl-amide, or any combination thereof; alternatively, a N-hydrocarbylacetamide, a N-methylhydrocarbyl-amide, or any combination thereof; alternatively, acetamide; alternatively, a N-hydrocarbyl-acetamide; or alternatively, a N-methylhydrocarbylamide. In some embodiments, the amide which can be utilized as the nitrogen containing compound can be, comprise, or consist essentially of, acetamide, N-methyl-propanamide, N-methylbutanamide, N-methylpentanamide, N-methylhexanamide, succinamide, maleamide, N-methylbenzamide, N-methyltoluamide, N-methylxylamide, imidazole-2-carbonamide, β-lactam, δ-lactam, ε-caprolactam, or any combination thereof; alternatively, N-methylpropanamide, N-methylbutanamide, N-methylpentanamide, N-methylhexanamide, or any combination thereof; alternatively, succinamide, maleamide, or any combination thereof; alternatively, N-methylbenzamide, N-methyltoluamide, N-methylxylamide, or any combination thereof; β-lactam, δ-lactam, ε-caprolactam, or any combination thereof; alternatively, N-methylpropanamide; alternatively, N-methylbutanamide; alternatively, N-methylpentanamide; alternatively, N-methylhexanamide; alternatively, succinamide; alternatively, maleamide; alternatively, N-methylbenzamide; alternatively, N-methyltoluamide; alternatively, N-methylxylamide; alternatively, imidazole-2-carbonamide; alternatively, β-lactam; alternatively, δ-lactam; or alternatively, ε-caprolactam.

Nitriles that can be utilized as the nitrogen containing compound can be, comprise, or consist essentially of, a $C_2$-$C_{20}$ nitrile; alternatively, a $C_2$-$C_{15}$ nitrile; alternatively, a $C_2$-$C_{10}$ nitrile; or alternatively, a $C_2$-$C_5$ nitrile. In an embodiment, the nitrile which can be utilized as the nitrogen containing compound can be, comprise, or consist essentially of, an aliphatic nitrile, an aromatic nitrile, or any combination thereof; alternatively, an aliphatic nitrile; or alternatively, an aromatic nitrile. In an embodiment, the nitrile which can be utilized as the nitrogen containing compound can be, comprise, or consist essentially of a cyclic nitrile or an acyclic nitrile; alternatively, a cyclic nitrile; or alternatively, an acyclic nitrile. In an embodiment, the nitrile which can be utilized as the nitrogen containing compound can be, comprise, or consist essentially of, an amide having the formula $R^1C\equiv N$.

Nitriles are disclosed herein as a potential neutral ligand (or as a nitrile coordinating compound) for a chromium precursor utilized in producing a chromium carboxylate. These nitriles (general or specific) can be utilized without limitation as the nitrogen containing compound.

In an aspect, the nitrogen containing compound can be, comprise, or consist essentially of, a pyrrole compound (a specific type of amine). Generally, a pyrrole compound is a compound containing a pyrrole ring and as utilized herein a pyrrole compound includes, unless otherwise specified, any compound that has a pyrrole ring. Thus, a pyrrole compound includes pyrrole, indole, tetrahydroindole, carbazole, and any substituted analogs thereof unless otherwise specified. In an aspect, the pyrrole compound can be, comprise, or consist essentially of, a metallic pyrrole compound, non-metallic pyrrole compound, or any combination thereof; alternatively, a non-metallic pyrrole compound; or alternatively, a metallic pyrrole compound.

In an aspect, the pyrrole compound (either metallic or non-metallic) can be, comprise, or consist essentially of, a $C_4$-$C_{60}$ pyrrole compound; alternatively, a $C_4$-$C_{45}$ pyrrole compound; alternatively, a $C_4$-$C_{30}$ pyrrole compound; alternatively, a $C_4$-$C_{20}$ pyrrole compound; or alternatively, a $C_4$-$C_{15}$ pyrrole compound. It should be noted that the indications of the number of carbon atoms in the pyrrole compound does not exclude the presence of other elements (beyond hydrogen, carbon, and the pyrrole nitrogen) within the pyrrole compound (e.g., a metal of a metal pyrrolides, halides, oxygen, and other nitrogen atoms) unless indicated otherwise.

In an aspect, the pyrrole compound can have Structure P1.

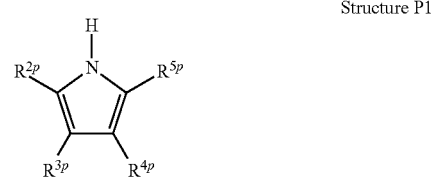

Structure P1

In Structure P1, $R^{2p}$, $R^{3p}$, $R^{4p}$, and $R^{5p}$ independently can be a hydrogen atom or a substituent group. In an embodiment where the pyrrole compound has Structure P1, $R^{3p}$, $R^{4p}$, and $R^{5p}$ can be hydrogen and $R^{2p}$ can be any non-hydrogen substituent described herein; or alternatively, $R^{2p}$, $R^{4p}$, and $R^{5p}$ can be hydrogen and $R^{3p}$ can be any non-hydrogen substituent described herein. In an embodiment where the pyrrole compound has Structure P1, $R^{3p}$ and $R^{4p}$ can be hydrogen and $R^{2p}$ and $R^{5p}$ independently can be any non-hydrogen substituent described herein; alternatively, $R^{2p}$ and $R^{5p}$ can be hydrogen and $R^{3p}$ and $R^{4p}$ independently can be any non-hydrogen substituent described herein; or alternatively, $R^{2p}$ and $R^{4p}$ can be hydrogen and $R^{3p}$ and $R^{5p}$ independently can be any non-hydrogen substituent described herein. In an embodiment where the pyrrole has Structure P1, $R^{5p}$ can be hydrogen and $R^{2p}$, $R^{3p}$, and $R^{4p}$ independently can be any non-hydrogen substituent described herein; or alternatively, $R^{4p}$ can be hydrogen and $R^{2p}$, $R^{3p}$, and $R^{5p}$ can be any non-hydrogen substituent described herein. In other embodiments, $R^{2p}$, $R^{3p}$, $R^{4p}$, and $R^{5p}$ independently can be any non-hydrogen substituent described herein.

In an embodiment, the pyrrole compound which can be utilized as a neutral ligand can have Structure P2, Structure P3, Structure P4, Structure P5, or a combination thereof; alternatively, Structure P2, Structure P3, Structure P4, or any combination thereof; alternatively, Structure P2; alternatively, Structure P3; alternatively, Structure P4; or alternatively, Structure P5.

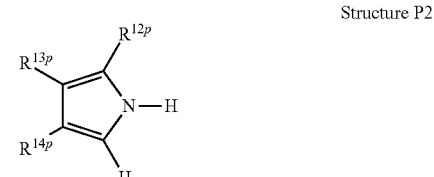

Structure P2

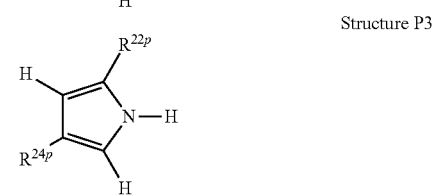

Structure P3

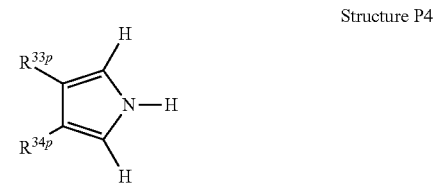

Structure P4

-continued

Structure P5

[Chemical structure of pyrrole with substituents $R^{42p}$ and $R^{45p}$, with H atoms shown and N—H]

In pyrrole Structures P2, P3, P4, and P5, $R^{12p}$, $R^{13p}$, $R^{14p}$, $R^{22p}$, $R^{24p}$, $R^{33p}$, $R^{34p}$, $R^{42p}$, and $R^{45p}$ independently can be any non-hydrogen substituent described herein.

In an embodiment, each non-hydrogen substituent groups which can be utilized as $R^{2p}$, $R^{3p}$, $R^{4p}$, and $R^{5p}$ of the pyrrole compound having Structure P1 or utilized as $R^{12p}$, $R^{13p}$, $R^{14p}$, $R^{22p}$, $R^{24p}$, $R^{33p}$, $R^{34p}$, $R^{42p}$, and $R^{45p}$ of the pyrrole compounds having Structures P2, P3, P4, and/or P5 independently can be a halide, a organoxy group, or an organyl group; alternatively, a halide or an organoxy group; alternatively, a halide or an organyl group; alternatively, a organoxy group or an organyl group; alternatively, a halide; alternatively, a organoxy group; or alternatively, an organyl group. In an embodiment, each non-hydrogen substituent groups which can be utilized as $R^{2p}$, $R^{3p}$, $R^{4p}$, and $R^{5p}$ of the pyrrole compound having Structure P1 or utilized as $R^{12p}$, $R^{13p}$, $R^{14p}$, $R^{22p}$, $R^{24p}$, $R^{33p}$, $R^{34p}$, $R^{42p}$, and $R^{45p}$ of the pyrrole compounds having Structures P2, P3, P4, and/or P5 independently can be a halide, a organoxy group consisting of inert functional groups, or an organyl group consisting of inert functional groups; alternatively, a halide or an organoxy group consisting of inert functional groups; alternatively, a halide or an organyl group consisting of inert functional groups; alternatively, a organoxy group consisting of inert functional groups or an organyl group consisting of inert functional groups; alternatively, a halide; alternatively, a organoxy group consisting of inert functional groups; or alternatively, an organyl group consisting of inert functional groups. In an embodiment, each non-hydrogen substituent groups which can be utilized as $R^{2p}$, $R^{3p}$, $R^{4p}$, and $R^{5p}$ of the pyrrole compound having Structure P1 or utilized as $R^{12p}$, $R^{13p}$, $R^{14p}$, $R^{22p}$, $R^{24p}$, $R^{33p}$, $R^{34p}$, $R^{42p}$, and $R^{45p}$ of the pyrrole compounds having Structures P2, P3, P4, and/or P5 independently can be a halide, a hydrocarboxy group, or a hydrocarbyl group; alternatively, a halide or a hydrocarboxy group; alternatively, a halide or a hydrocarbyl group; alternatively, a hydrocarboxy group or a hydrocarbyl group; alternatively, a halide; alternatively, a hydrocarboxy group; or alternatively, a hydrocarbyl group.

In an aspect or any embodiment described herein, each organyl group which can be utilized as a non-hydrogen substituent group of the pyrrole compound having Structure P1, P2, P3, P4, and/or P5 independently can be a $C_1$-$C_{30}$ organyl group; alternatively, a $C_1$-$C_{18}$ organyl group; alternatively, a $C_1$-$C_{10}$ organyl group; or alternatively, a $C_1$-$C_5$ organyl group. In an aspect or any embodiment described herein, each organoxy group which can be utilized as a non-hydrogen substituent group of the pyrrole compound having Structure P1, P2, P3, P4, and/or P5 independently can be a $C_1$-$C_{30}$ organoxy group; alternatively, a $C_1$-$C_{18}$ organoxy group; alternatively, a $C_1$-$C_{10}$ organoxy group; or alternatively, a $C_1$-$C_5$ organoxy group. In an aspect or any embodiment described herein, each organyl group consisting of inert functional groups which can be utilized as a non-hydrogen substituent group of the pyrrole compound having Structure P1, P2, P3, P4, and/or P5 independently can be a $C_1$-$C_{30}$ organyl group consisting of inert functional groups; alternatively, a $C_1$-$C_{18}$ organyl group consisting of inert functional groups; alternatively, a $C_1$-$C_{10}$ organyl group consisting of inert functional groups; or alternatively, a $C_1$-$C_5$ organyl group consisting of inert functional groups. In an aspect or any embodiment described herein, each organoxy group consisting of inert functional groups which can be utilized as a non-hydrogen substituent group of the pyrrole compound having Structure P1, P2, P3, P4, and/or P5 independently can be a $C_1$-$C_{30}$ organoxy group consisting of inert functional groups; alternatively, a $C_1$-$C_{18}$ organoxy group consisting of inert functional groups; alternatively, a $C_1$-$C_{10}$ organoxy group consisting of inert functional groups; or alternatively, a $C_1$-$C_5$ organoxy group consisting of inert functional groups. In an aspect or any embodiment described herein, each hydrocarbyl group which can be utilized as a non-hydrogen substituent group of the pyrrole compound having Structure P1, P2, P3, P4, and/or P5 independently can be a $C_1$-$C_{30}$ hydrocarbyl group; alternatively, a $C_1$-$C_{18}$ hydrocarbyl group; alternatively, a $C_1$-$C_{10}$ hydrocarbyl group; or alternatively, a $C_1$-$C_5$ hydrocarbyl group. In an aspect or any embodiment described herein, each hydrocarboxy group which can be utilized as a non-hydrogen substituent group of the pyrrole compound having Structure P1, P2, P3, P4, and/or P5 independently can be a $C_1$-$C_{30}$ hydrocarboxy group; alternatively, a $C_1$-$C_{18}$ hydrocarboxy group; alternatively, a $C_1$-$C_{10}$ hydrocarboxy group; or alternatively, a $C_1$-$C_5$ hydrocarboxy group.

In an aspect or any embodiment described herein, each halide which can be utilized as a non-hydrogen substituent group of the pyrrole compound having Structure P1, P2, P3, P4, and/or P5 independently can be fluoride, chloride, bromide, or iodide. In an aspect or any embodiment described herein, each halide which can be utilized as a non-hydrogen substituent group of the pyrrole compound having Structure P1, P2, P3, P4, and/or P5 independently can be fluoride; alternatively, chloride; alternatively, bromide; or alternatively, iodide.

In an embodiment, each non-hydrogen substituent group which can be utilized as a non-hydrogen substituent group of the pyrrole compound having Structure P1, P2, P3, P4, and/or P5 independently can be an alkyl group, a substituted alkyl group, a cycloalkyl group, a substituted cycloalkyl group, an aryl group, a substituted aryl group, an aralkyl group, or a substituted aralkyl group; alternatively, an alkyl group, a cycloalkyl group, an aryl group, or an aralkyl group; alternatively, an alkyl group or a substituted alkyl group; alternatively, a cycloalkyl group or a substituted cycloalkyl group; alternatively, an aryl group or a substituted aryl group; or alternatively, an aralkyl group or a substituted aralkyl group. In other embodiments, each non-hydrogen substituent group which can be utilized as a non-hydrogen substituent group of the pyrrole compound having Structure P1, P2, P3, P4, and/or P5 independently can be an alkyl group; alternatively, a substituted alkyl group; alternatively, a cycloalkyl group; alternatively, a substituted cycloalkyl group; alternatively, an aryl group; alternatively, a substituted aryl group; alternatively, an aralkyl group; or alternatively, a substituted aralkyl group. Generally, the alkyl group, substituted alkyl group, cycloalkyl group, substituted cycloalkyl group, aromatic group, substituted aromatic group, aryl group, substituted aryl group, aralkyl group, substituted aralkyl group, and/or silyl group which can be utilized as a non-hydrogen substituent group of the pyrrole compound having Structure P1, P2, P3, P4, and/or P5 can have the same number of carbons as its respective organyl group, organyl group consisting of inert functional groups, or hydrocarbyl group which can be utilized as a non-hydrogen substituent group of the pyrrole compound having Structure P1, P2, P3, P4, and/or P5 disclosed herein.

In an embodiment, the alkyl group (substituted or unsubstituted) which can be utilized as a non-hydrogen substituent group of the pyrrole compound having Structure P1, P2, P3, P4, and/or P5 independently can be a $C_1$-$C_{20}$ alkyl group (substituted or unsubstituted); alternatively, a $C_1$-$C_{10}$ alkyl group (substituted or unsubstituted); or alternatively, a $C_1$-$C_5$ alkyl group (substituted or unsubstituted). In some embodiments, each non-hydrogen substituent group which can be utilized as a non-hydrogen substituent group of the pyrrole compound having Structure P1, P2, P3, P4, and/or P5 independently can be a methyl group, an ethyl group, a propyl group, a butyl group, a pentyl group, a hexyl group, a heptyl group, an octyl group, a nonyl group, or a decyl group. In some embodiments, each alkyl group which can be utilized as a non-hydrogen substituent group of the pyrrole compound having Structure P1, P2, P3, P4, and/or P5 independently can be a methyl group, an ethyl group, a n-propyl group, an iso-propyl group, a n-butyl group, an iso-butyl group, a sec-butyl group, a tert-butyl group, a n-pentyl group, an iso-pentyl group, a sec-pentyl group, or a neopentyl group; alternatively, a methyl group, an ethyl group, an iso-propyl group, a tert-butyl group, or a neopentyl group; alternatively, a methyl group; alternatively, an ethyl group; alternatively, a n-propyl group; alternatively, an iso-propyl group; alternatively, a tert-butyl group; or alternatively, a neopentyl group. In an embodiment, any of these alkyl groups can be substituted to form a substituted alkyl group. In an embodiment, each substituent of a substituted alkyl group independently can be a halide or hydrocarboxy group; alternatively, a halide; or alternatively a hydrocarboxy group. Substituent halides and hydrocarboxy groups are independently disclosed herein and can be utilized without limitation to further describe the substituted alkyl group which can be utilized as a non-hydrogen substituent group of the pyrrole compound having Structure P1, P2, P3, P4, and/or P5.

In an embodiment, the cycloalkyl group (substituted or unsubstituted) which can be utilized as a non-hydrogen substituent group of the pyrrole compound having Structure P1, P2, P3, P4, and/or P5 independently can be a $C_4$-$C_{20}$ cycloalkyl group (substituted or unsubstituted); alternatively, a $C_4$-$C_{15}$ cycloalkyl group (substituted or unsubstituted); or alternatively, a $C_4$-$C_{10}$ cycloalkyl group (substituted or unsubstituted). In some embodiments, each non-hydrogen substituent group which can be utilized as a non-hydrogen substituent group of the pyrrole compound having Structure P1, P2, P3, P4, and/or P5 independently can be a cyclopentyl group, a substituted cyclopentyl group, a cyclohexyl group, or a substituted cyclohexyl group. In other embodiments, each non-hydrogen substituent group which can be utilized as a non-hydrogen substituent group of the pyrrole compound having Structure P1, P2, P3, P4, and/or P5 independently can be a cyclopentyl group or a substituted cyclopentyl group; or alternatively, a cyclohexyl group or a substituted cyclohexyl group. In further embodiments, each non-hydrogen substituent group which can be utilized as a non-hydrogen substituent group of the pyrrole compound having Structure P1, P2, P3, P4, and/or P5 independently can be a cyclopentyl group; alternatively, a substituted cyclopentyl group; alternatively, a cyclohexyl group; or alternatively, a substituted cyclohexyl group. Substituents which can be utilized for the substituted cycloalkyl groups are independently disclosed herein and can be utilized without limitation to further describe the substituted cycloalkyl group which can be utilized as a non-hydrogen substituent group of the pyrrole compound having Structure P1, P2, P3, P4, and/or P5.

In some embodiments, the aryl group (substituted or unsubstituted) which can be utilized as a non-hydrogen substituent group of the pyrrole compound having Structure P1, P2, P3, P4, and/or P5 independently can be a $C_6$-$C_{20}$ aryl group (substituted or unsubstituted); alternatively, a $C_6$-$C_{15}$ aryl group (substituted or unsubstituted); or alternatively, a $C_6$-$C_{10}$ aryl group (substituted or unsubstituted). In some embodiments, each non-hydrogen substituent group which can be utilized as a non-hydrogen substituent group of the pyrrole compound having Structure P1, P2, P3, P4, and/or P5 independently can be a phenyl group, a substituted phenyl group, a naphthyl group, or a substituted naphthyl group. In an embodiment, each non-hydrogen substituent group which can be utilized as a non-hydrogen substituent group of the pyrrole compound having Structure P1, P2, P3, P4, and/or P5 independently can be a phenyl group or a substituted phenyl group; alternatively, a naphthyl group or a substituted naphthyl group; alternatively, a phenyl group or a naphthyl group; or alternatively, a substituted phenyl group or a substituted naphthyl group. Substituents which can be utilized for the substituted phenyl groups or substituted naphthyl groups are independently disclosed herein and can be utilized without limitation to further describe the substituted phenyl groups or substituted naphthyl groups which can be utilized as a non-hydrogen substituent group of the pyrrole compound having Structure P1, P2, P3, P4, and/or P5.

In an embodiment, each substituted phenyl group which can be utilized as a non-hydrogen substituent group of the pyrrole compound having Structure P1, P2, P3, P4, and/or P5 independently can be a 2-substituted phenyl group, a 3-substituted phenyl group, a 4-substituted phenyl group, a 2,4-disubstituted phenyl group, a 2,6-disubstituted phenyl group, 3,5-disubstituted phenyl group, or a 2,4,6-trisubstituted phenyl group. In other embodiments, each substituted phenyl group which can be utilized as a non-hydrogen substituent group of the pyrrole compound having Structure P1, P2, P3, P4, and/or P5 independently can be a 2-substituted phenyl group, a 4-substituted phenyl group, a 2,4-disubstituted phenyl group, or a 2,6-disubstituted phenyl group; alternatively, a 3-substituted phenyl group or a 3,5-disubstituted phenyl group; alternatively, a 2-substituted phenyl group or a 4-substituted phenyl group; alternatively, a 2,4-disubstituted phenyl group or a 2,6-disubstituted phenyl group; alternatively, a 2-substituted phenyl group; alternatively, a 3-substituted phenyl group; alternatively, a 4-substituted phenyl group; alternatively, a 2,4-disubstituted phenyl group; alternatively, a 2,6-disubstituted phenyl group; alternatively, 3,5-disubstituted phenyl group; or alternatively, a 2,4,6-trisubstituted phenyl group. Substituents which can be utilized for these specific substituted phenyl groups are independently disclosed herein and can be utilized without limitation to further describe these substituted phenyl groups which can be utilized as a non-hydrogen substituent group of the pyrrole compound having Structure P1, P2, P3, P4, and/or P5.

In an embodiment, the aralkyl group (substituted or unsubstituted) which can be utilized as a non-hydrogen substituent group of the pyrrole compound having Structure P1, P2, P3, P4, and/or P5 independently can be a $C_7$-$C_{20}$ aralkyl group (substituted or unsubstituted); alternatively, a $C_7$-$C_{15}$ aralkyl group (substituted or unsubstituted); or alternatively, a $C_7$-$C_{10}$ aralkyl group (substituted or unsubstituted). In some embodiments, each non-hydrogen substituent group which can be utilized as a non-hydrogen substituent group of the pyrrole compound having Structure P1, P2, P3, P4, and/or P5 independently can be a benzyl group or a substituted benzyl group; alternatively, a benzyl group, or alternatively, a substituted benzyl group. In an embodiment, the benzyl group can be a 2-substituted benzyl group, a 4-substituted benzyl group, a 2,4-substituted benzyl group, a 2,6-disubstituted benzyl group, or a 2,4,6-trisubstituted benzyl group; alternatively, a 2-substituted benzyl group or a 4-substituted benzyl group; alternatively, a 2,4-substituted benzyl group or a 2,6-disubstituted benzyl group; a 2-substituted benzyl group; alternatively, a 4-substituted benzyl group; alternatively, a 2,4-substituted benzyl group; alternatively, a 2,6-disubstituted benzyl group; or alternatively, a 2,4,6-trisubstituted benzyl group. Substituents which can be utilized for the substituted aralkyl groups are independently disclosed herein and can be utilized without limitation to further describe the substituted aralkyl groups which can be utilized as a non-hydrogen substituent group of the pyrrole compound having Structure P1, P2, P3, P4, and/or P5.

In an embodiment, each non-hydrogen substituent group which can be utilized as a non-hydrogen substituent group of the pyrrole compound having Structure P1, P2, P3, P4, and/or P5 independently can be an alkoxy group, a substituted alkoxy group, a cycloalkoxy group, a substituted cycloalkoxy group, an aroxy group, a substituted aroxy group, an aralkoxy group, or a substituted aralkoxy group; alternatively, an alkoxy group, a cycloalkoxy group, an aroxy group, or an aralkoxy group; alternatively, an alkoxy group or a substituted alkoxy group; alternatively, a cycloalkoxy group or a substituted cycloalkoxy group; alternatively, an aroxy group or a substituted aroxy group; or alternatively, an aralkoxy group or a substituted aralkoxy group. In other embodiments, each non-hydrogen substituent group which can be utilized as a non-hydrogen substituent group of the pyrrole compound having Structure P1, P2, P3, P4, and/or P5 independently can be alkoxy group; alternatively, a substituted alkoxy group; alternatively, a cycloalkoxy group; alternatively, a substituted cycloalkoxy group; alternatively, an aroxy group; alternatively, a substituted aroxy group; alternatively, an aralkoxy group; or alternatively, a substituted aralkoxy group. Generally, the alkoxy group, substituted alkoxy group, cycloalkoxy group, substituted cycloalkoxy group, aromatic group, substituted aromatic group, aroxy group, substituted aroxy group, aralkoxy group, and/or substituted aralkoxy group which can be utilized as a non-hydrogen substituent group of the pyrrole compound having Structure P1, P2, P3, P4, and/or P5 can have the same number of carbons as the organoxy group, organoxy group consisting of inert functional groups, or hydrocarboxy group which can be utilized as a non-hydrogen substituent group of the pyrrole compound having Structure P1, P2, P3, P4, and/or P5 disclosed herein. Substituent group are independently described herein and can be utilized without limitation to further describe the substituted alkoxy group, cycloalkoxy group, substituted cycloalkoxy group, aromatic group, substituted aromatic group, aroxy group, substituted aroxy group, aralkoxy group, and/or substituted aralkoxy group which can be utilized as a non-hydrogen substituent group of the pyrrole compound having Structure P1, P2, P3, P4, and/or P5.

In an embodiment, each non-hydrogen substituent group which can be utilized as a non-hydrogen substituent group of the pyrrole compound having Structure P1, P2, P3, P4, and/or P5 independently can be a methoxy group, an ethoxy group, a propoxy group, a butoxy group, a pentoxy group, a hexoxy group, a heptoxy group, or an octoxy group; or alternatively, a methoxy group, an ethoxy group, a propoxy group, a butoxy group, or a pentoxy group. In an embodiment, each non-hydrogen substituent group which can be utilized as a non-hydrogen substituent group of the pyrrole compound having Structure P1, P2, P3, P4, and/or P5 independently can be a methoxy group, an ethoxy group, a n-propoxy group, an iso-propoxy group, an n-butoxy group, an iso-butoxy group, a tert-butoxy group, an n-pentoxy group, an neo-pentoxy group, an n-hexoxy group, an n-heptoxy group, an n-octoxy group; or alternatively, a methoxy group, an ethoxy group, a n-propoxy group, an iso-propoxy group, an n-butoxy group, an iso-butoxy group, a tert-butoxy group, an n-pentoxy group, or an neo-pentoxy group. In an embodiment, each non-hydrogen substituent group which can be utilized as a non-hydrogen substituent group of the pyrrole compound having Structure P1, P2, P3, P4, and/or P5 independently can be a methoxy group; alternatively, an ethoxy group; alternatively, a n-propoxy group; alternatively, an iso-propoxy group; alternatively, an n-butoxy group; alternatively, an iso-butoxy group; alternatively, a tert-butoxy group; alternatively, an n-pentoxy group; alternatively, an neo-pentoxy group; alternatively, an n-hexoxy group; alternatively, an n-heptoxy group; or alternatively, an n-octoxy group.

In an embodiment, each non-hydrogen substituent group which can be utilized as a non-hydrogen substituent group of the pyrrole compound having Structure P1, P2, P3, P4, and/or P5 independently can be an cyclobutoxy group, a substituted cyclobutoxy group, a cyclopentoxy group, a substituted cyclopentoxy group, a cyclohexoxy group, a substituted cyclohexoxy group, a cycloheptoxy group, a substituted cycloheptoxy group, a cyclooctoxy group, or a substituted cyclooctoxy group. In some embodiments, each non-hydrogen substituent group which can be utilized as a non-hydrogen substituent group of the pyrrole compound having Structure P1, P2, P3, P4, and/or P5 independently can be a cyclopentoxy group, a substituted cyclopentoxy group, a cyclohexoxy group, or a substituted cyclohexoxy group. In other embodiments, each non-hydrogen substituent group which can be utilized as a non-hydrogen substituent group of the pyrrole compound having Structure P1, P2, P3, P4, and/or P5 independently can be a cyclobutoxy group or a substituted cyclobutoxy group; alternatively, a cyclopentoxy group or a substituted cyclopentoxy group; alternatively, a cyclohexoxy group or a substituted cyclohexoxy group; alternatively, a cycloheptoxy group or a substituted cycloheptoxy group; or alternatively, a cyclooctoxy group or a substituted cyclooctoxy group. In further embodiments, each non-hydrogen substituent group which can be utilized as a non-hydrogen substituent group of the pyrrole compound having Structure P1, P2, P3, P4, and/or P5 independently can be a cyclopentoxy group; alternatively, a substituted cyclopentoxy group; alternatively, a cyclohexoxy group; or alternatively, a substituted cyclohexoxy group. Substituents which can be utilized for the substituted cycloalkoxy groups are independently disclosed herein and can be utilized without limitation to further describe the substituted cycloalkoxy group which can be utilized as a non-hydrogen substituent group of the pyrrole compound having Structure P1, P2, P3, P4, and/or P5.

In an aspect, each non-hydrogen substituent group which can be utilized as a non-hydrogen substituent group of the pyrrole compound having Structure P1, P2, P3, P4, and/or P5 independently can be a phenoxy group or a substituted phenoxy group; or alternatively, a phenoxy group. In an embodiment, the substituted phenoxy group which can be utilized as a non-hydrogen substituent group of the pyrrole compound having Structure P1, P2, P3, P4, and/or P5 independently can be a 2-substituted phenoxy group, a 4-substituted phenoxy group, a 2,4-substituted phenoxy group, a 2,6-disubstituted phenoxy group, or a 2,4,6-trisubstituted phenoxy group; alternatively, a 2-substituted phenoxy group or a 4-substituted phenoxy group; alternatively, a 2,4-substituted phenoxy group or a 2,6-disubstituted phenoxy group; a 2-substituted phenoxy group; alternatively, a 4-substituted phenoxy group; alternatively, a 2,4-substituted phenoxy group; alternatively, a 2,6-disubstituted phenoxy group; or alternatively, a 2,4,6-trisubstituted phenoxy group. Substituents which can be utilized for the substituted cycloalkoxy groups are independently disclosed herein and can be utilized without limitation to further describe the substituted phenoxy group which can be utilized as a non-hydrogen substituent group of the pyrrole compound having Structure P1, P2, P3, P4, and/or P5.

In an aspect, each non-hydrogen substituent group which can be utilized as a non-hydrogen substituent group of the pyrrole compound having Structure P1, P2, P3, P4, and/or P5 independently can be a benzoxy group or a substituted benzoxy group; alternatively a substituted benzoxy group. In an embodiment, the substituted benzoxy group which can be utilized as a non-hydrogen substituent group of the pyrrole compound having Structure P1, P2, P3, P4, and/or P5 independently can be a 2-substituted benzoxy group, a 4-substituted benzoxy group, a 2,4-substituted benzoxy group, a 2,6-disubstituted benzoxy group, or a 2,4,6-trisubstituted benzoxy group; alternatively, a 2-substituted benzoxy group or a 4-substituted benzoxy group; alternatively, a 2,4-substituted benzoxy group or a 2,6-disubstituted benzoxy group; a 2-substituted benzoxy group; alternatively, a 4-substituted benzoxy group; alternatively, a 2,4-substituted benzoxy group; alternatively, a 2,6-disubstituted benzoxy group; or alternatively, a 2,4,6-trisubstituted benzoxy group. Substituents which can be utilized for the substituted cycloalkoxy groups are independently disclosed herein and can be utilized without limitation to further describe the substituted benzoxy group which can be utilized as a non-hydrogen substituent group of the pyrrole compound having Structure P1, P2, P3, P4, and/or P5.

General substituent groups are independently described herein. These groups can be utilized without limitation to further describe a substituted non-hydrogen substituent group which can be utilized as $R^{2p}$, $R^{3p}$, $R^{4p}$, and $R^{5p}$ of the pyrrole compound having Structure P1 and/or utilized as $R^{12p}$, $R^{13p}$, $R^{14p}$, $R^{22p}$, $R^{24p}$, $R^{33p}$, $R^{34p}$, $R^{42p}$, and $R^{45p}$ of the pyrrole compounds having Formulas P2, P3, P4, and/or P5.

In an aspect, the pyrrole compound can have the Structure P1 comprising $R^{2p}$ and $R^{5p}$ organyl groups (alternatively, group consisting of inert functional groups; or alternatively, hydrocarbyl groups or substituted hydrocarbyl groups) where at least one of $R^{2p}$ and $R^{5p}$ is attached to the pyrrole ring such that the carbon atom attached to the pyrrole ring is a secondary carbon atom (e.g., 2-methyl-5-ethylpyrrole, among others); or alternatively, where $R^{2p}$ and $R^{5p}$ are attached to the pyrrole ring such that the carbon atoms attached to the pyrrole ring are secondary carbon atoms (e.g., 2,5-diethylpyrrole, among others). In another aspect the pyrrole compound can have the Structure P5 where $R^{42p}$ and $R^{45p}$ are organyl groups (alternatively, organyl groups consisting of inert functional groups; or alternatively, hydrocarbyl groups (substituted or unsubstituted)) where at least one of $R^{42p}$ and $R^{45p}$ is attached to the pyrrole ring such that the carbon atom attached to the pyrrole ring is a secondary carbon atom; or alternatively, where $R^{2p}$ and $R^{5p}$ are attached to the pyrrole ring such that the carbon atoms attached to the pyrrole ring are secondary carbon atoms. Organyl (alternatively, organyl groups consisting of inert functional groups; or hydrocarbyl groups (substituted or unsubstituted)) which can be utilized as $R^{2p}$ and $R^{5p}$ of the pyrrole compound having the Structure P1 and/or $R^{42p}$ and $R^{45p}$ of the pyrrole compound having the Structure P5 are independently described herein. The organyl groups (alternatively, organyl groups consisting of inert functional groups; or alternatively, hydrocarbyl groups (substituted or unsubstituted)) which when attached to the pyrrole ring would provide a group where the carbon atom attached to the pyrrole ring is a secondary carbon atom are readily apparent from this disclosure. These organyl groups (alternatively, organyl groups consisting of inert functional groups; or alternatively, hydrocarbyl groups (substituted or unsubstituted)) can be utilized without limitation to further describe any pyrrole compound having Structure P1 where at least one (or both) of $R^{2p}$ and $R^{5p}$ organyl groups (alternatively, group consisting of inert functional groups; or alternatively, hydrocarbyl group or substituted hydrocarbyl groups) and/or having Structure P5 where $R^{42p}$ and $R^{45p}$ at least one (or both) of $R^{2p}$ and $R^{5p}$ organyl groups (alternatively, organyl groups consisting of inert functional groups; or alternatively, hydrocarbyl groups (substituted or unsubstituted)) is (are) attached to the pyrrole ring such that the carbon atom attached to the pyrrole ring is a secondary carbon atom. In some non-limiting embodiments, each group, which when attached to the pyrrole ring can provide a carbon atom attached to pyrrole ring which is a secondary carbon atom, independently can be an ethyl group, an n-propyl group, an n-butyl group, an n-pentyl group, an n-hexyl group, an n-heptyl group, or an n-octyl group; alternatively, an ethyl group, an n-propyl group, an n-butyl group, or an n-pentyl group; alternatively, an ethyl group, an n-propyl group, an n-butyl group, or an n-pentyl group; alternatively, an ethyl group; alternatively, an n-propyl group; alternatively, an n-butyl group; alternatively, an n-pentyl group; alternatively, an n-hexyl group; alternatively, an n-heptyl group; or alternatively, an n-octyl group.

In an aspect, the pyrrole compound can have a hydrogen atom located on at least one pyrrole ring carbon atom adjacent to the nitrogen atom of the pyrrole ring and a bulky group located on a pyrrole ring carbon atom adjacent to any pyrrole ring carbon atom bearing the hydrogen atom adjacent to the nitrogen atom of the pyrrole ring; alternatively, has a hydrogen atom located on each pyrrole ring carbon atom adjacent to the nitrogen atom of the pyrrole ring and bulky group located on each pyrrole ring carbon atom adjacent to the pyrrole ring carbon atoms bearing the hydrogen atom adjacent to the nitrogen atom of the pyrrole ring. In an embodiment, the pyrrole compound can have Structure P2 where $R^{14p}$ can be any bulky group described herein and $R^{12p}$ and $R^{13p}$ can be any non-hydrogen substituent group described herein. In another embodiment, the pyrrole compound can have Structure P3 where $R^{24p}$ can be any bulky group described herein and $R^{22p}$ can be any non-hydrogen substituent group described herein. In yet another embodiment, the pyrrole compound can have Structure P4 where $R^{33p}$ and $R^{34p}$ can be any bulky group described herein.

In an embodiment, the bulky substituent can be described as a group wherein the carbon atom of group that is attached to the pyrrole ring carbon atom is a tertiary or quaternary carbon atom or one wherein the carbon atom of the group that is adjacent to the carbon atom attached to pyrrole ring carbon atom is a tertiary or quaternary carbon atom; alternatively one wherein the carbon atom of the group that is attached to the pyrrole ring carbon atom is a tertiary or quaternary carbon atom; or alternatively one wherein the carbon atom of the group that is adjacent to the carbon atom attached to pyrrole ring carbon atom is a tertiary or quaternary carbon atom. In some embodiments, the bulky substituent can be described as one wherein the carbon atom of group that is attached to the pyrrole ring carbon atom is a tertiary carbon atom or one wherein the carbon atom of the group that is adjacent to the carbon atom attached to pyrrole ring carbon atom is a tertiary carbon atom; alternatively one wherein the carbon atom of group that is attached to the pyrrole ring carbon atom is a tertiary carbon atom; or alternatively one wherein the carbon atom of the group that is adjacent to the carbon atom attached to pyrrole ring carbon atom is a tertiary carbon atom. In other embodiments, the bulky substituent can be described as one wherein the carbon atom of group that is attached to the pyrrole ring carbon atom is a quaternary carbon atom or one wherein the carbon atom of the group that is adjacent to the carbon atom attached to pyrrole ring carbon atom is a quaternary carbon atom; alternatively one wherein the carbon atom of group that is attached to the pyrrole ring carbon atom is a quaternary carbon atom; or alternatively one wherein the carbon atom of the group that is adjacent to the carbon atom attached to pyrrole ring carbon atom is a quaternary carbon atom.

In an embodiment, the bulky substituent can be described as one wherein the carbon atom of group that is attached to the pyrrole ring carbon atom is attached to 3 or 4 carbon atoms or one wherein the carbon atom of the group that is adjacent to the carbon atom attached to pyrrole ring carbon atom is attached to 3 or 4 carbon atoms; alternatively one wherein the carbon atom of group that is attached to the pyrrole ring carbon atom is attached to 3 or 4 carbon atoms; or alternatively, one wherein the carbon atom of the group that is adjacent to the carbon atom attached to pyrrole ring carbon atom is attached to 3 or 4 carbon atoms. In some embodiments, the bulky substituent can be described as one wherein the carbon atom of group that is attached to the pyrrole ring carbon atom is attached to 3 carbon atoms or one wherein the carbon atom of the group that is adjacent to the carbon atom attached to pyrrole ring carbon atom is attached to 3 carbon atoms; alternatively one wherein the carbon atom of group that is attached to the pyrrole ring carbon atom is attached to 3 carbon atoms; or alternatively one wherein the carbon atom of the group that is adjacent to the carbon atom attached to pyrrole ring carbon atom is attached to 3 carbon atoms. In other embodiments, the bulky substituent can be described as one wherein the carbon atom of group that is attached to the pyrrole ring carbon atom is attached to 4 carbon atoms or one wherein the carbon atom of the group that is adjacent to the carbon atom attached to pyrrole ring carbon atom is attached to 4 carbon atoms; alternatively one wherein the carbon atom of group that is attached to the pyrrole ring carbon atom is attached to 4 carbon atoms; or alternatively one wherein the carbon atom of the group that is adjacent to the carbon atom attached to pyrrole ring carbon atom is attached to 4 carbon atoms.

For illustration purposes, Structure E1 is used to illustrate the carbon atom attached to the pyrrole ring and the carbon atom adjacent to the carbon atom attached to the pyrrole ring carbon atom.

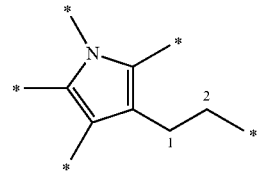

Structure E1

Using Structure E1, the carbon atom labeled 1 within the group attached to the pyrrole ring represents the carbon atom attached to the pyrrole ring carbon atom while the carbon atom labeled 2 within the group attached to the pyrrole ring represents the carbon atom adjacent to the carbon atom attached to the pyrrole ring carbon atom.

In an embodiment, each bulky substituent can be an organyl group; alternatively, an organyl group consisting of inert functional groups; a hydrocarbyl group or a substituted hydrocarbyl group; a hydrocarbyl group; or a substituted hydrocarbyl group. Generally, the bulky organyl group, bulky organyl group consisting of inert functional groups, and/or the bulky hydrocarbyl group (substituted or unsubstituted) can have the same number of carbon atoms as the general non-hydrogen organyl group, organyl group consisting of inert functional groups, or hydrocarbyl group (substituted or unsubstituted) which can be utilized as a non-hydrogen substituent group of the pyrrole compound having Structure P1, P2, P3, P4, and/or P5. In some embodiments, each bulky substituent independently can be an alkyl group, a substituted alkyl group, a cycloalkyl group, a substituted cycloalkyl group, an aryl group, a substituted aryl group, an aralkyl group, or a substituted aralkyl group; alternatively, an alkyl group or a substituted alkyl group; alternatively, a cycloalkyl group or a substituted cycloalkyl group; alternatively, an aryl group or a substituted aryl group; alternatively, an aralkyl group or a substituted aralkyl group; alternatively, an alkyl group; alternatively, a substituted alkyl group; alternatively, a cycloalkyl group; alternatively, a substituted cycloalkyl group; alternatively, an aryl group; alternatively, a substituted aryl group; alternatively, an aralkyl group; or alternatively, a substituted aralkyl group. Generally, the bulky alkyl group (substituted or unsubstituted), bulky cycloalkyl group (substituted or unsubstituted), bulky aryl group (substituted or unsubstituted), and/or bulky aralkyl group (substituted or unsubstituted) can have the same number of carbon atoms as the general alkyl group (substituted or unsubstituted), cycloalkyl group (substituted or unsubstituted), aryl group (substituted or unsubstituted), and/or aralkyl group (substituted or unsubstituted) which can be utilized as a non-hydrogen substituent group of the pyrrole compound having Structure P1, P2, P3, P4, and/or P5.

In an embodiment, each bulky substituent independently can be a propan-2-yl group, a butan-2-yl, a 2-methylpropan-1-yl group, a 2-methylpropan-2-yl group, a pentan-2-yl group, a pentan-3-yl group, a 2-methylbutan-1-yl group, a 2-methylbutan-2-yl group, a 3-methylbutan-2-yl group, 2,2-dimethylpropan-1-yl group, a hexan-2-yl group, a hexan-3- yl group, a 2-methylpentan-1-yl group, 2-ethylbutan-1-yl group, a 2-methylpentan-2-yl group, a 2,3-dimethylbutan-1-yl group, a 2,3-dimethylbutan-2-yl group, a heptan-2-yl group, a heptan-3-yl group, a heptan-4-yl group, a 2-methylhexan-1-yl group, a 2-ethylpentan-1-yl group, a 2-methylhexan-2-yl group, a 2,3-dimethylpentan-1-yl group, a 2,3-dimethylpentan-2-yl group, a 2,3,3-trimethylpentan-1-yl group, a 2,3,3-trimethylpentan-2-yl group, an octan-2-yl group, an octan-3-yl group, an octan-4-yl group, a 2-methylheptan-1-yl group, a 2-ethylhexan-1-yl group, a 2-methylheptan-2-yl group, a nonan-2-yl group, a nonan-3-yl group, a nonan-4-yl group, a nonan-5-yl group, a decan-2-yl group, a decan-3-yl group, a decan-4-yl group, or a decan-5-yl group. In some embodiments, each bulky substituent independently can be a propan-2-yl group, a butan-2-yl, a 2-methylpropan-1-yl group, a 2-methylpropan-2-yl group, a pentan-2-yl group, a pentan-3-yl group, a 2-methylbutan-1-yl group, a 2-methylbutan-2-yl group, a 3-methylbutan-2-yl group, 2,2-dimethylpropan-1-yl group; alternatively, propan-2-yl group, a 2-methylpropan-2-yl group, or a 2,2-dimethylpropan-1-yl group. In other embodiments, each bulky substituent independently can be a propan-2-yl group; alternatively, a butan-2-yl; alternatively, a 2-methylpropan-1-yl group; alternatively, a 2-methylpropan-2-yl group; alternatively, a pentan-2-yl group; alternatively, a pentan-3-yl group; alternatively, a 2-methylbutan-1-yl group; alternatively, a 2-methylbutan-2-yl group; alternatively, a 3-methylbutan-2-yl group; alternatively, 2,2-dimethylpropan-1-yl group.

In an embodiment, each bulky substituent independently can be a phenyl group or a substituted phenyl group; alternatively, a phenyl group; or alternatively, a substituted phenyl group. In some embodiments, each substituted phenyl group which can be utilized as a bulky substituent can be a 2-methylphenyl group, a 3-methylphenyl group, a 4-methylphenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, or a 2,4,6-tripheneyl group. In other embodiments, each substituted phenyl group which can be utilized as a bulky substituent can be a 2-methylphenyl group, a 2,4-dimethylphenyl group, a 2,6-dimethylphenyl group, a 3,5-dimethylphenyl group, or a 2,4,6-tripheneyl group. In yet other embodiments, each substituted phenyl group which can be utilized as a bulky substituent can be a 2-methylphenyl group; alternatively, a 3-methylphenyl group; alternatively, a 4-methylphenyl group; alternatively, a 2,3-dimethylphenyl group; alternatively, a 2,4-dimethylphenyl group; alternatively, a 2,5-dimethylphenyl group; alternatively, a 2,6-dimethylphenyl group; alternatively, a 3,4-dimethylphenyl group; alternatively, a 3,5-dimethylphenyl group; or alternatively, a 2,4,6-tripheneyl group.

In an embodiment, the pyrrole compound can be, comprise, or consist essentially of, pyrrole, a 2-substituted pyrrole, a 3-substituted pyrrole, a 2,5-disubstituted pyrrole, a 2,4-disubstituted pyrrole, a 3,4-disubstituted pyrrole, a 2,3,5-trisubstituted pyrrole, a 2,3,4,5-tetrasubstituted pyrrole, or any combination thereof. In some embodiments, the pyrrole compound can be, comprise, or consist essentially of, pyrrole, a 2-substituted pyrrole, a 3-substituted pyrrole, or any combination thereof; alternatively, a 2,5-disubstituted pyrrole, a 2,3,5-trisubstituted pyrrole, a 2,3,4,5-tetrasubstituted pyrrole, or any combination thereof; or alternatively, a 2,4-disubstituted pyrrole, a 3,4-disubstituted pyrrole, or any combination thereof. In other embodiments, the pyrrole compound can be a 2-substituted pyrrole; alternatively, a 3-substituted pyrrole; alternatively, a 2,5-disubstituted pyrrole; alternatively, a 2,4-disubstituted pyrrole; alternatively, a 3,4-disubstituted pyrrole; alternatively, a 2,3,5-trisubstituted pyrrole; or alternatively, a 2,3,4,5-tetrasubstituted pyrrole. Non-hydrogen substituents are generally described herein and can be utilized without limitation to further describe substituted pyrroles which can be utilized as the pyrrole compound.

In an embodiment, the pyrrole compound can be, comprise, or consist essentially of, pyrrole, a 2-alkylpyrrole, a 3-alkylpyrrole, a 2,5-dialkylpyrrole, a 2,4-dialkylpyrrole, a 3,4-dialkylpyrrole, a 2,3,5-triialkylpyrrole, a 2,3,4,5-tetraalkylpyrrole, or any combination thereof. In some embodiments, the pyrrole compound can be, comprise, or consist essentially of, pyrrole, a 2-alkylpyrrole, a 3-alkylpyrrole, or any combination thereof; alternatively, a 2,5-dialkylpyrrole, a 2,3,5-triialkylpyrrole, a 2,3,4,5-tetraalkylpyrrole, or any combination thereof; or alternatively, a 2,4-dialkylpyrrole, a 3,4-dialkylpyrrole, or any combination thereof. In other embodiments, the pyrrole compound can be, comprise, or consist essentially of, a 2-alkylpyrrole; alternatively, a 3-alkylpyrrole; alternatively, a 2,5-dialkylpyrrole; alternatively, a 2,4-dialkylpyrrole; alternatively, a 3,4-dialkylpyrrole; alternatively, a 2,3,5-triialkylpyrrole; or alternatively, a 2,3,4,5-tetraalkylpyrrole. Alkyl substituents which can be utilized as a non-hydrogen alkyl substituent are generally described herein and can be utilized without limitation to further describe alkylpyrroles which can be utilized as the pyrrole compound.

In an embodiment, the pyrrole compound can be, comprise, or consist essentially of, pyrrole, a 2-alkoxy pyrrole, a 3-alkoxy pyrrole, a 2,3-dialkoxypyrrole, a 2,4-dialkoxypyrrole, a 2,5-dialkoxypyrrole, 3,4-dialkoxypyrrole, or any combination thereof. In other embodiments, the pyrrole compound can be, comprise, or consist essentially of, a 2-alkoxy pyrrole; alternatively, a 3-alkoxy pyrrole; alternatively, a 2,3-dialkoxypyrrole; alternatively, a 2,4-dialkoxypyrrole; alternatively, a 2,5-dialkoxypyrrole; or alternatively, 3,4-dialkoxypyrrole. Alkoxy substituents which can be utilized as a non-hydrogen alkyl substituent are generally described herein and can be utilized without limitation to further describe alkoxypyrroles which can be utilized as the pyrrole compound.

In an embodiment, the pyrrole compound can be, comprise, or consist essentially of, pyrrole, 2-methylpyrrole, 2-ethylpyrrole, 2-propylpyrrole, 2-butylpyrrole, 3-methylpyrrole, 3-ethylpyrrole, 3-propylpyrrole, 3-butylpyrrole, 2,5-dimethylpyrrole, 2-methyl-5-ethylpyrrole, 2,5-diethylpyrrrole, 2,5-dipropylpyrrole, 2,5-dibutylpyrrole, 2,4-dimethylpyrrole, 2,4-diethylpyrrrole, 2,4-dipropylpyrrole, 2,4-dibutylpyrrole, 3,4-dimethylpyrrole, 3,4-diethylpyrrrole, 3,4-dipropylpyrrole, 3,4-dibutylpyrrole, 2,3,4-trimethylpyrrole, 3-ethyl-2,4-dimethylpyrrole, 2,3,5-trimethylpyrrole, 2,3,4,5-tetramethylpyrrole, 2,3,4,5-tetraethylpyrrole, or any combination thereof; alternatively, pyrrole 2,5-bis(trifluoromethyl)pyrrole, 2,4-bis(trifluoromethyl)pyrrole, or 3,4-bis(trifluoromethyl)pyrrole, or any combination thereof; or alternatively, pyrrole, 2-methoxypyrrole, 2-ethoxypyrrole, 2-propoxypyrrole, 2-butoxypyrrole, 3-methoxypyrrole, 3-ethoxypyrrole, 3-propoxypyrrole, 3-butoxypyrrole, 2,5-bis(methoxy)pyrrole, 2,4-bis(methoxy)pyrrole, 3,4-bis(methoxy)pyrrole, or any combination thereof.

In an embodiment, the pyrrole compound can be, comprise, or consist essentially of, 2-methyl-5-ethylpyrrole, 2,5-diethylpyrrrole, 2,5-di-n-propylpyrrole, 2,5-di-n-butylpyrrole, 2,5-n-pentylpyrrole, 2,5-n-hexylpyrrole, 2,5-di-n-heptylpyrrole, 2,5-di-n-octylpyrrole, 2,3,5-triethylpyrrole, 2,3,5-tri-n-butylpyrrrole, 2,3,5-tri-n-hexylpyrrrole, 2,3, 4,5-tetraethylpyrrole, 2,3,4,5-tetra-n-butylpyrrole, 2,3,4,5-tetra-n-hexylpyrrole, or any combination thereof; 2,5-diethylpyrrrole, 2,5-di-n-propylpyrrole, 2,5-di-n-butylpyrrole, 2,5-n-pentylpyrrole, 2,5-n-hexylpyrrole, 2,5-di-n-heptylpyrrole, 2,5-di-n-octylpyrrole or any combination thereof; 2,5-diethylpyrrrole, 2,5-di-n-propylpyrrole, 2,5-di-n-butylpyrrole, 2,5-n-pentylpyrrole, or any combination thereof; alternatively, 2,3,5-triethylpyrrrole, 2,3,5-tri-n-butylpyrrrole, 2,3,5-tri-n-hexylpyrrrole, or any combination thereof; or alternatively, 2,3,4,5-tetraethylpyrrole, 2,3,4,5-tetra-n-butylpyrrole, 2,3,4,5-tetra-n-hexylpyrrole, or any combination thereof. In an embodiment, the pyrrole compound can be, comprise, or consist essentially of, pyrrole; alternatively, 2-methylpyrrole; alternatively, 2-ethylpyrrole; alternatively, 2-propylpyrrole; alternatively, 2-butylpyrrole; alternatively, 3-methylpyrrole; alternatively, 3-ethylpyrrole; alternatively, 3-propylpyrrole; alternatively, 3-butylpyrrole; alternatively, 2,5-dimethylpyrrole; alternatively, 2-methyl-5-ethylpyrrole; alternatively, 2,5-diethylpyrrrole; alternatively, 2,5-dipropylpyrrole; alternatively, 2,5-dibutylpyrrole; alternatively, 2,5-di-n-propylpyrrole; alternatively, 2,5-di-n-butylpyrrole; alternatively, 2,5-n-pentylpyrrole; alternatively, 2,5-n-hexylpyrrole; alternatively, 2,5-diheptylpyrrole; alternatively, 2,5-dioctylpyrrole; alternatively, 2,4-dimethylpyrrole; alternatively, 2,4-diethylpyrrrole; alternatively, 2,4-dipropylpyrrole; alternatively, 2,4-dibutylpyrrole; alternatively, 3,4-dimethylpyrrole; alternatively, 3,4-diethylpyrrrole; alternatively, 3,4-dipropylpyrrole; alternatively, 3,4-dibutylpyrrole; alternatively, 2,3, 4-trimethylpyrrole; alternatively, 3-ethyl-2,4-dimethylpyrrole; alternatively, 2,3,5-trimethylpyrrole; alternatively, 2,3, 5-triethylpyrrrole; alternatively, 2,3,5-tri-n-butylpyrrrole; alternatively, 2,3,5-tri-n-hexylpyrrrole; alternatively, 2,3,4, 5-tetramethylpyrrole; alternatively, 2,3,4,5-tetraethylpyrrole; alternatively, 2,3,4,5-tetraethylpyrrole; alternatively, 2,3,4,5-tetra-n-butylpyrrole; alternatively, 2,3,4,5-tetra-n-hexylpyrrole; alternatively, 2,5-bis(trifluoromethyl) pyrrole; alternatively, 2,4-bis(trifluoromethyl) pyrrole; alternatively, 3,4-bis(trifluoromethyl) pyrrole; alternatively, 2-methoxypyrrole; alternatively, 2-ethoxypyrrole; alternatively, 2-propoxypyrrole; alternatively, 2-butoxypyrrole; alternatively, 3-methoxypyrrole; alternatively, 3-ethoxypyrrole; alternatively, 3-propoxypyrrole; alternatively, 3-butoxypyrrole; alternatively, 2,5-bis(methoxy)pyrrole; alternatively, 2,4-bis(methoxy)pyrrole; or alternatively, 3,4-bis(methoxy) pyrrole. In yet other embodiments, the pyrrole compound can be, comprise, or consist essentially of, 2,5-bis(2',2',2'-trifluoroethyl)pyrrole; or alternatively, 2,5-bis(2'-methoxymethyl) pyrrole.

In a non-limiting example, the pyrrole compound can be, comprise, or consist essentially of, 2-methyl-4-isopropylpyrrole, 2-ethyl-4-isopropylpyrrole, 2-methyl-4-sec-butylpyrrole, 2-ethyl-4-sec-butylpyrrole, 2-methyl-4-isobutylpyrrole, 2-ethyl-4-isobutylpyrrole, 2-methyl-4-t-butylpyrrole, 2-ethyl-4-t-butylpyrrole, 2-methyl-4-neo-pentylpyrrole, or 2-ethyl-4-neopentylpyrrole. In some non-limiting examples, the pyrrole compound can be, comprise, or consist essentially of, 2-methyl-4-isopropylpyrrole, 2-ethyl-4-isopropylpyrrole, 2-methyl-4-t-butylpyrrole, 2-ethyl-4-t-butylpyrrole, 2-methyl-4-neo-pentylpyrrole, or 2-ethyl-4-neopentylpyrrole. In other non-limiting examples, the pyrrole compound can be, comprise, or consist essentially of, 2-methyl-4-isopropylpyrrole; alternatively, 2-ethyl-4-isopropylpyrrole; alternatively, 2-methyl-4-sec-butylpyrrole; alternatively, 2-ethyl-4-sec-butylpyrrole; alternatively, 2-methyl-4-isobutylpyrrole; alternatively, 2-ethyl-4-isobutylpyrrole; alternatively, 2-methyl-4-t-butylpyrrole; alternatively, 2-ethyl-4-t-butylpyrrole; alternatively, 2-methyl-4-neo-pentylpyrrole; or alternatively, 2-ethyl-4-neopentylpyrrole. In another non-limiting example, the pyrrole compound can be, comprise, or consist essentially of, 3,4-diisopropylpyrrole, 3,4-di-sec-butylpyrrole, 3,4-diisobutylpyrrole, 3,4-di-t-butylpyrrole, or 3,4-di-neo-pentylpropylpyrrole. In yet another embodiment, the pyrrole compound can be, comprise, or consist essentially of, 3,4-diisopropylpyrrole: alternatively, 3,4-di-sec-butylpyrrole; alternatively, 3,4-diisobutylpyrrole; alternatively, 3,4-di-t-butylpyrrole; or alternatively, 3,4-di-neo-pentylpropylpyrrole.

According to an aspect, the nitrogen containing compound can be, comprise, or consist essentially of, a metallic nitrogen containing compound (e.g. metallic amine, metallic pyrrole, and/or a metallic amide). In an embodiment, the metallic nitrogen containing compound can be, comprise, or consist essentially of, a metallic amine, a metallic, a metallic amide, or any combination thereof; alternatively, a metallic amine; or alternatively, a metallic amide. In some embodiments, the metallic nitrogen containing compound can be, comprise, or consist essentially of, a metallic pyrrole compound.

In an embodiment, the metal of the metallic nitrogen containing compound can be a Group 1 metal, a Group 2 metal, or a Group 13 metal; alternatively, a Group 1 metal; alternatively, a Group 2 metal; or alternatively, a Group 13 metal. In some embodiments, the metal of the metallic nitrogen containing compound can be lithium, sodium, potassium, magnesium, calcium, or aluminum; alternatively, lithium, sodium, or potassium; alternatively, magnesium or calcium; alternatively, lithium; alternatively, sodium; alternatively, potassium; alternatively, magnesium; alternatively, calcium; or alternatively, aluminum. In an aspect, the nitrogen containing compound of the Group 1, Group 2, or group 13 metallic nitrogen containing compound can be, comprise, or consist essentially of, any amine and/or amide (general or specific) disclosed herein.

In an aspect, the metallic nitrogen containing compound can be, comprise, or consist essentially of, a metallic amine having the formula $M^C NR^6 R^7$, $M^D NHR^6$, or any combination thereof; alternatively, $M^C NR^6 R^7$; or alternatively, $M^D NHR^6$. Generally, $M^C$ and $M^D$ can be any metal of the metallic nitrogen containing compound disclosed herein and $R^6$ and $R^7$ can be any amine $R^6$ and $R^7$ group disclosed herein.

In an aspect, the metallic nitrogen containing compound can be, comprise, or consist essentially of, a metallic amide having the formula $R^{15}C(=O)NH_2$, $R^{15}C(=O)NHR^{16}$, or any combination thereof; alternatively, $R^{15}C(=O)NHM^E$; or alternatively, $R^{15}C(=O)NR^{16}M^F$. Generally, $M^E$ and $M^F$ can be any metal of the metallic nitrogen containing compound disclosed herein and $R^{15}$ and $R^{16}$ can be any amide $R^{15}$ and $R^{16}$ group disclosed herein.

According to an aspect, the pyrrole compound can be, comprise, or consist essentially of, a metal pyrrolide. Generally, the metal component of the metal pyrrolide and the pyrrole component of the metal pyrrolide are independent elements of the metal pyrrolide. As such, the metal pyrrolide can be described utilizing any combination of the metal components described herein and the pyrrole components describe herein. In some embodiments, the metal pyrrolide can be, comprise, or consist essentially of, a metal pyrrolide produced by any process of contacting a pyrrole compound and a metal compound described herein.

In an aspect, the metal pyrrolide can be, comprise, or consist essentially of, a Group 1, Group 2, or Group 13 metal pyrrolide; alternatively, a Group 1 metal pyrrolide; alternatively, a Group 2 metal pyrrolide; or alternatively, a Group 13 metal pyrrolide. In some embodiments, the metal pyrrolide can be, comprise, or consist essentially of, a lithium pyrrolide, a sodium pyrrolide, a potassium pyrrolide, a magnesium pyrrolide, a calcium pyrrolide, or an aluminum pyrrolide; alternatively, a lithium pyrrolide, a sodium pyrrolide, a potassium pyrrolide; alternatively, a magnesium pyrrolide, a calcium pyrrolide; alternatively, a lithium pyrrolide; alternatively, a sodium pyrrolide; alternatively, a potassium pyrrolide; alternatively, a magnesium pyrrolide; alternatively, a calcium pyrrolide; or alternatively, an aluminum pyrrolide. In an aspect, the pyrrole component of the general of specific Group 1, Group 2, or Group 13 metal pyrrolide can be, comprise, or consist essentially of, derived from any pyrrole compound disclosed herein.

In an embodiment, the metal pyrrolide can be, comprise, or consist essentially of, a metal pyrrolide of any pyrrole compound having Structure P1; alternatively, any pyrrole compound having Structure P2, Structure P3, Structure P4, Structure P5, or any combination thereof; alternatively, any pyrrole compound having Structure P2; alternatively, any pyrrole compound having Structure P3; alternatively, any pyrrole compound having Structure P4; or alternatively, any pyrrole compound having, Structure P5.

In an aspect, the metal pyrrolide can have Structure MP1. In an embodiment, the metal pyrrolide can have Structure MP2, Structure MP3, Structure MP4, Structure MP5, or any combination thereof. In some embodiments, the metal pyrrolide can have Structure MP2; alternatively, Structure MP3; alternatively, Structure MP4; or alternatively, Structure MP5, or any combination thereof.

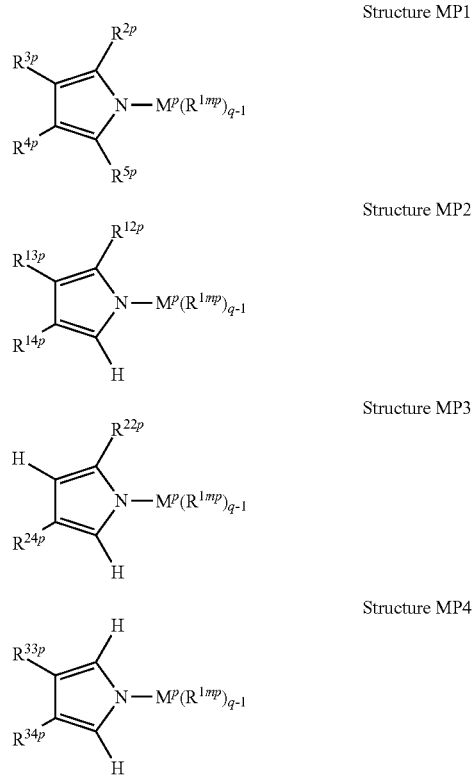

Structure MP1

Structure MP2

Structure MP3

Structure MP4

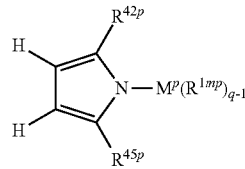

Structure MP5

Generally, $R^{2p}$, $R^{3p}$, $R^{4p}$, $R^{5p}$, $R^{12p}$, $R^{13p}$, $R^{14p}$, $R^{22p}$, $R^{24p}$, $R^{33p}$, $R^{34p}$, $R^{42p}$, $R^{45p}$, $M^p$, $R^{1mp}$, and q of the metal pyrrolides having Structures MP1, MP2, MP3, MP4, and/or MP5 are independent elements of the metal pyrrolide. As such, the metal pyrrolide having Structures MP1, MP2, MP3, MP4, and/or MP5 can be described utilizing any combination of aspects and/or embodiments of $R^{2p}$, $R^{3p}$, $R^{4p}$, $R^{5p}$, $R^{12p}$, $R^{13p}$, $R^{14p}$, $R^{22p}$, $R^{24p}$, $R^{33p}$, $R^{34p}$, $R^{42p}$, $R^{45p}$, $M^p$, $R^{1mp}$, and q described herein.

$R^{2p}$, $R^{3p}$, $R^{4p}$, $R^{5p}$, $R^{12p}$, $R^{13p}$, $R^{14p}$, $R^{22p}$, $R^{24p}$, $R^{33p}$, $R^{34p}$, $R^{42p}$, and $R^{45p}$ have been described as non-hydrogen substitutes for the pyrrole compounds having Structure P1, Structure P2, Structure P3, Structure P4, and/or Structure P5. These non-hydrogen substituent groups can be utilized without limitation to further describe the metal pyrrolide having Structure MP1, Structure MP2, Structure MP3, Structure MP4, and/or Structure MP5.

In an aspect, $M^p$ can be a Group 1, a Group 2, or a Group 13 metal and q is the oxidation state of the metal. In an embodiment, $M^p$ can be a Group 1 metal and q is 1 (q−1=0); alternatively, $M^p$ can be a Group 2 metal and q is 2 (q−1=1); or alternatively, $M^p$ can be a Group 13 metal and q is 3 (q−1=2). In some embodiments, $M^p$ can be lithium and q is 1, $M^p$ can be sodium and q is 1, $M^p$ can be potassium and q is 1, $M^p$ can be magnesium and q is 2, $M^p$ can be calcium and q is 2, or $M^p$ can be aluminum and q is 3. In other embodiments, $M^p$ can be lithium and q is 1; alternatively, $M^p$ can be sodium and q is 1; alternatively, $M^p$ can be potassium and q is 1; alternatively, $M^p$ can be magnesium and q is 2; alternatively, $M^p$ can be calcium and q is 2; or alternatively, $M^p$ can be aluminum and q is 3.

In an aspect, each $R^{1mp}$ (when present), independently can be a hydrogen, a hydrocarbyl group, or a hydrocarboxy group; alternatively, a hydrogen or hydrocarbyl group; alternatively, a hydrogen or hydrocarboxy group; alternatively, a hydrocarbyl group; alternatively, a hydrocarboxy group; or alternatively, a hydrogen. In an embodiment, any hydrocarbyl group that can be utilized as $R^{1mp}$ (when present), can be a $C_1$-$C_{20}$ hydrocarbyl group; alternatively, a $C_1$-$C_{10}$ hydrocarbyl group; or alternatively, a $C_1$-$C_5$ hydrocarbyl group. In an embodiment, any hydrocarboxy group that can be utilized as $R^{1mp}$ (when present), can be a $C_1$-$C_{20}$ hydrocarboxy group; alternatively, a $C_1$-$C_{10}$ hydrocarboxy group; or alternatively, a $C_1$-$C_5$ hydrocarboxy group.

In an embodiment, each $R^{1mp}$ hydrocarbyl group (when present) independently can be an alkyl group, a cycloalkyl group, an aryl group, or an aralkyl group. In some embodiments, each $R^{1mp}$ hydrocarbyl group (when present) independently can be an alkyl group; alternatively, a cycloalkyl group; alternatively, an aryl group; or alternatively, an aralkyl group. Alkyl groups, cycloalkyl groups, aryl groups, and aralkyl groups are independently described herein as potential non-hydrogen substituents for pyrrole compounds. These non-hydrogen pyrrole alkyl group, cycloalkyl group, aryl group, and aralkyl group substituents can be utilized, without limitation, as an $R^{1mp}$ alkyl group, cycloalkyl group, aryl group, and/or aralkyl group of a metal pyrrolide having Structure MP1, Structure MP2, Structure MP3, Structure MP4, and/or Structure MP5.

In an embodiment, each $R^{1mp}$ hydrocarboxy group (when present) independently can be an alkoxy group, a cycloalkoxy group, an aroxy group, or an aralkoxy group. In some embodiments, each $R^{1mp}$ hydrocarboxy group (when present) independently can be an alkoxy group; alternatively, a cycloalkoxy group; alternatively, an aroxy group; or alternatively, an aralkoxy group. Alkoxy groups, cycloalkoxy groups, aroxy groups, and aralkoxy groups are independently described herein as potential non-hydrogen substituents for pyrrole compounds. These non-hydrogen pyrrole alkoxy group, cycloalkoxy group, aroxy group, and/or aralkoxy group substituents can be utilized, without limitation, as an $R^{1mp}$ alkoxy group, a cycloalkoxy group, an aroxy group, and/or an aralkoxy group of a metal pyrrolide having Structure MP1, Structure MP2, Structure MP3, Structure MP4, and/or Structure MP5.

In a non-limiting embodiment, the metal pyrrolide can be, comprise, or consist essentially of, a Group 2 hydride pyrrolide, a Group 2 alkyl pyrrolide, or a combination thereof; alternatively, Group 2 hydride pyrrolide; or alternatively, a Group 2 alkyl pyrrolide. In some non-limiting embodiments, the metal pyrrolide can be, comprise, or consist essentially of, a magnesium hydride pyrrolide, an alkyl magnesium pyrrolide, a calcium hydride pyrrolide, an alkyl calcium pyrrolide, or any combination thereof; alternatively, a magnesium hydride pyrrolide, an alkyl magnesium pyrrolide, or any combination thereof; alternatively, a calcium hydride pyrrolide, an alkyl calcium pyrrolide, or any combination thereof; alternatively, a magnesium hydride pyrrolide; alternatively, an alkyl magnesium pyrrolide; alternatively, a calcium hydride pyrrolide; or alternatively, an alkyl calcium pyrrolide. Alkyl groups are independently described herein as potential non-hydrogen substituents for pyrrole compounds and these non-hydrogen pyrrole alkyl groups can be utilized, without limitation to further a describe a Group 2 alkyl pyrrolide, alkyl magnesium pyrrolide, and/or an alkyl calcium pyrrolide.

In a non-limiting embodiment, the metal pyrrolide can be, comprise, or consist essentially of, a Group 3 dihydride pyrrolide, a Group 3 hydrocarbyl hydride pyrrolide, a Group 3 dihydrocarbyl pyrrolide, or a combination thereof; alternatively, a Group 3 dihydride pyrrolide; alternatively, a Group 3 hydrocarbyl hydride pyrrolide; or alternatively, a Group 3 dihydrocarbyl pyrrolide. Hydrocarbyl groups are independently described herein as potential non-hydrogen substituents for pyrrole compounds and these non-hydrogen pyrrole hydrocarbyl groups can be utilized, without limitation, to further a describe a Group 3 hydrocarbyl hydride pyrrolide and/or a Group 3 dihydrocarbyl pyrrolide.

In an aspect, the metal pyrrolide can be, comprise, or consist essentially of, an aluminum pyrrolide. In an embodiment, the aluminum pyrrolide can have Structure AP1. In some embodiments, the aluminum pyrrolide can have Structure AP2, Structure AP3, Structure AP4, Structure A5, or any combination thereof. In other embodiments, aluminum pyrrolide can have Structure A2; alternatively, Structure A3; alternatively, Structure A4; or alternatively, Structure A5, or any combination thereof.

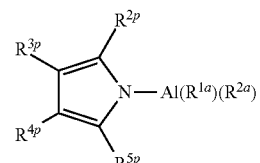

Structure AP1

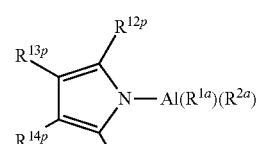

Structure AP2

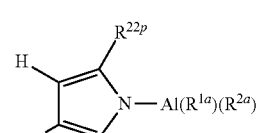

Structure AP3

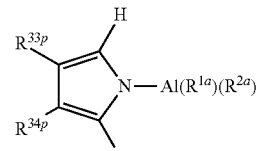

Structure AP4

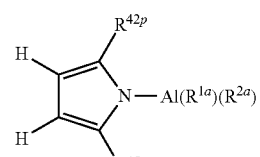

Structure AP5

Generally, $R^{2p}$, $R^{3p}$, $R^{4p}$, $R^{5p}$, $R^{12p}$, $R^{13p}$, $R^{14p}$, $R^{22p}$, $R^{24p}$, $R^{33p}$, $R^{34p}$, $R^{42p}$, $R^{45p}$, $R^{1a}$, and $R^{2a}$, of the aluminum pyrrolides having Structures AP1, AP2, AP3, AP4, and/or AP5 are independent elements of the aluminum pyrrolide. As such, the aluminum pyrrolide having Structures AP1, AP2, AP3, A4, and/or AP5 can be described utilizing any combination of aspects and/or embodiments of $R^{2p}$, $R^{3p}$, $R^{4p}$, $R^{5p}$, $R^{12p}$, $R^{13p}$, $R^{14p}$, $R^{22p}$, $R^{24p}$, $R^{33p}$, $R^{34p}$, $R^{42p}$, $R^{45p}$, $R^{1a}$, and $R^{2a}$ described herein.

$R^{2p}$, $R^{3p}$, $R^{4p}$, $R^{5p}$, $R^{12p}$, $R^{13p}$, $R^{14p}$, $R^{22p}$, $R^{24p}$, $R^{33p}$, $R^{34p}$, $R^{42p}$, and $R^{45p}$ have been described as non-hydrogen substitutes for the pyrrole compounds having Structure P1, Structure P2, Structure P3, Structure P4, and/or Structure P5. These non-hydrogen substituent groups can be utilized without limitation to further describe the aluminum pyrrolide having Structure AP1, Structure AP2, Structure AP3, Structure AP4, and/or Structure AP5.

In an aspect, $R^{1a}$ and $R^{2a}$ independently can be a hydrogen or a hydrocarbyl group; alternatively, a hydrogen; or alternatively, a hydrocarbyl group. In an embodiment, any hydrocarbyl group that can be utilized as $R^{1mp}$ (when present), can be a $C_1$-$C_{20}$ hydrocarbyl group; alternatively, a $C_1$-$C_{10}$ hydrocarbyl group; or alternatively, a $C_1$-$C_5$ hydrocarbyl group. In an embodiment, an $R^{1a}$ hydrocarbyl group and/or an $R^{2a}$ hydrocarbyl group independently can be an alkyl group, a cycloalkyl group, an aryl group, or an aralkyl group; alternatively an alkyl group; alternatively, a cycloalkyl group; alternatively, an aryl group; or alternatively, an aralkyl group. Alkyl groups, cycloalkyl groups, aryl groups, and aralkyl groups are independently described herein as potential non-hydrogen substituents for pyrrole compounds. These non-hydrogen pyrrole alkyl group, cycloalkyl group, aryl group, and aralkyl group substituents can be utilized, without limitation, as $R^{1a}$ and/or $R^{2a}$ of an aluminum pyrrolide having Structure AP1, Structure AP2, Structure AP3, Structure AP4, and/or Structure AP5.

In a non-limiting embodiment, the metal pyrrolide can be, comprise, or consist essentially of, an aluminum dihydride pyrrolide, an alkylaluminum hydride pyrrolide, a dialkylaluminum pyrrolide, or any combination thereof; alternatively, an aluminum dihydride pyrrolide; alternatively, an alkylaluminum hydride pyrrolide; or alternatively, a dialkylaluminum pyrrolide. Generally, the alkyl group(s) of an alkylaluminum hydride pyrrolide and/or a dialkylaluminum pyrrolide independently can be any alkyl group disclosed herein for aluminum pyrrolide having Structure AP1, Structure AP2, Structure AP3, Structure AP4, and/or Structure AP5.

In an aspect the metal pyrrolide can be, comprise, or consist essentially of, dimethylaluminum pyrrolide, diethylaluminum pyrrolide, a dipropylaluminum pyrrolide, a dibutylaluminum pyrrolide, a dihexylaluminum pyrrolide, a dioctylaluminum pyrrolide, or any combination thereof. In an embodiment, the metal pyrrolide can be, comprise, or consist essentially of, dimethylaluminum pyrrolide, diethylaluminum pyrrolide, di-n-propylaluminum pyrrolide, di-n-butylaluminum pyrrolide, di-isobutylaluminum pyrrolide, di-n-hexylaluminum pyrrolide, di-n-octylaluminum pyrrolide, or any combination thereof; alternatively, diethylaluminum pyrrolide, di-n-butylaluminum pyrrolide, or di-isobutylaluminum pyrrolide; alternatively, dimethylaluminum pyrrolide; alternatively, diethylaluminum pyrrolide; alternatively, di-n-propylaluminum pyrrolide; alternatively, di-n-butylaluminum pyrrolide; alternatively, di-isobutylaluminum pyrrolide; alternatively, di-n-hexylaluminum pyrrolide; or alternatively, di-octylaluminum pyrrolide. Generally, the pyrrolide of these dialkylaluminum dihydride pyrrolides can be, comprise, or consist essentially of, the pyrrolide of any pyrrole compound disclosed herein.

In an aspect, the metal pyrrolide can be, comprise, or consist essentially of, a metal pyrrolide produced by any process for producing a metal pyrrolide described herein. In an embodiment wherein the metal pyrrolide can be, comprise, or consist essentially of, an aluminum pyrrolide, the aluminum pyrrolide can be, comprise, or consist essentially of, an aluminum pyrrolide produced by any process of producing an aluminum pyrrolide described herein.

Generally, the metal hydrocarbyl compound which can be utilized in the catalyst system can be a metal compound having a metal atom bonded to a carbon atom of a hydrocarbyl group. In an embodiment, the metal hydrocarbyl compound can be, comprise, or consist essentially of, any heteroleptic or homoleptic metal hydrocarbyl compound. In an embodiment, the metal hydrocarbyl can be, comprise, consist essentially of, or consist of, a non-halide metal hydrocarbyl, a metal hydrocarbyl halide, or any combination thereof; alternatively, a non-halide metal hydrocarbyl; or alternatively, a metal hydrocarbyl halide. Generally, each halide of any metal hydrocarbyl halide independently can be fluoride, chloride, bromide, or iodide; alternatively, chloride, bromide, or iodide; alternatively, fluoride; alternatively, chloride; alternatively bromide; or alternatively iodide. Generally, each hydrocarbyl group of any metal hydrocarbyl (non-halide metal alkyl and/or metal alkyl halide) can be a $C_1$ to $C_{20}$ hydrocarbyl group; alternatively, a $C_1$ to $C_{10}$ hydrocarbyl group; or alternatively, a $C_1$ to $C_6$ hydrocarbyl group.

Generally, each hydrocarbyl of any metal hydrocarbyl compound independently can be an alkyl group, a cycloalkyl group, an aryl group, or an aralkyl group; alternatively, an alkyl group; alternatively, a cycloalkyl group; alternatively, an aryl group; or alternatively, an aralkyl group. In some embodiments, the metal hydrocarbyl can be a metal alkyl and can comprise, consist essentially of, or consist of, a non-halide metal alkyl, a metal alkyl halide, or any combination thereof; alternatively, a non-halide metal alkyl; or alternatively, a metal alkyl hydrocarbyl halide.

In an embodiment, the metal of the metal hydrocarbyl (or metal alkyl, among other metal hydrocarbyls) can comprise, consist essentially of, or consist of, a Group 1, 2, 11, 12, 13, or 14 metal; or alternatively, a Group 13 or 14 metal; or alternatively, a Group 13 metal. In some embodiments, the metal of the metal hydrocarbyl (non-halide metal hydrocarbyl or metal hydrocarbyl halide, or non-halide metal alkyl or metal alkyl halide) can be lithium, sodium, potassium, rubidium, cesium, beryllium, magnesium, calcium, strontium, barium, zinc, cadmium, boron, aluminum, or tin; alternatively, lithium, sodium, potassium, magnesium, calcium, zinc, boron, aluminum, or tin; alternatively, lithium, sodium, or potassium; alternatively, magnesium, calcium; alternatively, lithium; alternatively, sodium; alternatively, potassium; alternatively, magnesium; alternatively, calcium; alternatively, zinc; alternatively, boron; alternatively, aluminum; or alternatively, tin.

In an aspect, the metal alkyl can comprise, consist essentially of, or consist of, a Group 1 metal alkyl, a Group 2 metal alkyl hydride, a Group 2 metal alkyl halide, a Group 2 metal dialkyl, a Group 12 metal dialkyl, a Group 13 metal alkyl dihydride, a Group 13 metal dialkyl hydride, a Group 13 metal alkyl dihalide, a Group 13 metal dialkyl halide, a Group 13 metal trialkyl, a Group 14 metal dialkyl, a Group 14 metal dialkyl dihalide, a Group 14 metal tetraalkyl, or any combination thereof; alternatively, a Group 1 metal alkyl, a Group 2 metal alkyl hydride, a Group 2 metal alkyl halide, a Group 2 metal dialkyl, or any combination thereof; alternatively, a Group 13 metal alkyl dihydride, a Group 13 metal dialkyl hydride, a Group 13 metal alkyl dihalide, a Group 13 metal dialkyl halide, a Group 13 metal trialkyl, or any combination thereof; or alternatively, a Group 14 metal dialkyl, a Group 14 metal dialkyl dihalide, a Group 14 metal tetraalkyl. In an embodiment, the metal alkyl can comprise, consist essentially of, or consist of, a Group 1 metal alkyl, a Group 2 metal alkyl hydride, a Group 2 metal dialkyl, a Group 12 metal dialkyl, a Group 13 metal alkyl dihydride, a Group 13 metal dialkyl hydride, a Group 13 metal trialkyl, a Group 14 metal dialkyl, a Group 14 metal tetraalkyl, or any combination thereof; alternatively, a Group 1 metal alkyl, a Group 2 metal alkyl hydride, a Group 2 metal dialkyl, or any combination thereof; or alternatively, a Group 13 metal alkyl dihydride, a Group 13 metal dialkyl hydride, a Group 13 metal trialkyl, or any combination thereof. In some embodiments, the metal alkyl can comprise, consist essentially of, or consist of, a Group 1 metal alkyl, a Group 2 metal dialkyl, a Group 12 metal dialkyl, a Group 13 metal trialkyl, a Group 14 metal dialkyl, or a Group 14 metal tetraalkyl; alternatively, a Group 1 metal alkyl or a Group 2 metal dialkyl; or alternatively, a Group 14 metal dialkyl, or a Group 14 metal tetraalkyl. In other embodiments, the metal alkyl can comprise, consist essentially of, or consist of, a Group 13 metal alkyl dihalide, a Group 13 metal dialkyl halide, a Group 13 metal trialkyl, or any combination thereof. In yet other embodiments, the metal alkyl can comprise, consist essentially of, or consist of, a Group 1 metal alkyl; alternatively, a Group 2 metal alkyl hydride; alternatively, a Group 2 metal alkyl halide; alternatively, a Group 2 metal dialkyl; alternatively, a Group 12 metal dialkyl; alternatively, a Group 13 metal alkyl dihydride; alternatively, a Group 13 metal dialkyl hydride; alternatively, a Group 13 metal alkyl dihalide; alternatively, a Group 13 metal dialkyl halide; alternatively, a Group 13 metal trialkyl; alternatively, a Group 14 metal dialkyl; alternatively, a Group 14 metal dialkyl dihalide; or alternatively, a Group 14 metal tetraalkyl.

It should be noted that hydrocarbyl metal compounds include compounds which can contain a halogen atom and compounds which do not contain a halogen atom. When the hydrocarbyl metal compound contains a halogen atom, the hydrocarbyl metal compound can be referred to as a hydrocarbyl metal halide. When the hydrocarbyl metal compound does not contain a halogen atom, the hydrocarbyl metal compound can be referred to as a non-halide hydrocarbyl compound.

When the hydrocarbyl metal compound contains a halogen atom (e.g., a metal hydrocarbyl halide or a metal alkyl halide), the hydrocarbyl metal compound can also serve as the halogen containing compound (described further herein). In some embodiments wherein the hydrocarbyl metal compound contains a halogen atom (e.g., a metal hydrocarbyl halide or a metal alkyl halide), the hydrocarbyl metal compound can represent all or a portion of the halogen containing compound; alternatively, all of the halogen containing compound; or alternatively, a portion of the halogen containing compound.

In a non-limiting embodiment, the metal alkyl can comprise, consist essentially of, or consist of, a lithium alkyl, a sodium alkyl, a magnesium dialkyl, a zinc dialkyl, a boron trialkyl, an aluminum trialkyl, or any combination thereof; or alternatively, a lithium alkyl, a sodium alkyl, a magnesium dialkyl, or any combination thereof. In another non-limiting embodiment, the metal alkyl can comprise, consist essentially of, or consist of, a lithium alkyl; alternatively, a sodium alkyl; alternatively, a magnesium dialkyl; alternatively, a zinc dialkyl; alternatively, a boron trialkyl; or alternatively, an aluminum trialkyl.

In some embodiments, the metal hydrocarbyl (non-halide metal hydrocarbyl or metal hydrocarbyl halide, or non-halide metal alkyl or metal alkyl halide) can comprise, consist essentially of, or consist of, a lithium hydrocarbyl, a sodium hydrocarbyl, a magnesium hydrocarbyl, a boron hydrocarbyl, a zinc hydrocarbyl, or an aluminum hydrocarbyl. In other embodiments, the metal hydrocarbyl (non-halide metal hydrocarbyl or metal hydrocarbyl halide, or non-halide metal alkyl or metal alkyl halide) can comprise, consist essentially of, or consist of, a lithium alkyl, a sodium alkyl, a magnesium alkyl, a boron alkyl, a zinc alkyl, or an aluminum alkyl. In some embodiments, the metal hydrocarbyl (non-halide metal hydrocarbyl or metal hydrocarbyl halide, or non-halide metal alkyl or metal alkyl halide) can comprise, consist essentially of, or consist of, an aluminum hydrocarbyl. In some non-limiting embodiments the aluminum hydrocarbyl can be, comprise, or consist essentially of, an aluminum alkyl.

In an aspect, the metal hydrocarbyl can comprise, consist essentially of, or consist of, a trihydrocarbylaluminum compound, a dihydrocarbylaluminum halide compound, a hydrocarbylaluminum dihalide compound, a dihydrocarbylaluminum hydride compound, a hydrocarbylaluminum dihydride compound, a dihydrocarbylaluminum hydrocarboxide compound, a hydrocarbylaluminum dihydrocarboxide compound, a hydrocarbyl aluminum sesquihalide compound, a hydrocarbylaluminum sesquihydrocarboxide compound, an aluminoxane, or any combination thereof; alternatively, a trihydrocarbylaluminum, a dihydrocarbylaluminum hydride, a hydrocarbylaluminum dihydride, a dihydrocarbylaluminum alkoxide, a hydrocarbylaluminum dialkoxide, or any combination thereof; or alternatively, a trihydrocarbylaluminum, a dihydrocarbylaluminum hydride, a hydrocarbylaluminum dihydride, or any combination thereof. In some embodiments, the metal hydrocarbyl can comprise, consist essentially of, or consist of, a trihydrocarbylaluminum compound, dihydrocarbylaluminum halide compound, a hydrocarbylaluminum dihalide compound, a hydrocarbyl aluminum sesquihalide compound, or any combination thereof; alternatively, a trihydrocarbylaluminum compound, dihydrocarbylaluminum halide compound, or any combination thereof; alternatively, a trihydrocarbylaluminum compound; alternatively, a dihydrocarbylaluminum halide compound; alternatively, a hydrocarbylaluminum dihalide compound; alternatively, a dihydrocarbylaluminum hydride compound; alternatively, a hydrocarbylaluminum dihydride compound; alternatively, a dihydrocarbylaluminum hydrocarboxide compound; alternatively, a hydrocarbylaluminum dihydrocarboxide compound; alternatively, a hydrocarbylaluminum sesquihalide compound; alternatively, a hydrocarbylaluminum sesquihydrocarboxide compound; or alternatively, an aluminoxane. Applicable hydrocarbyl groups and halides for the metal hydrocarbyl, metal hydrocarbyl halides, and/or metal hydrocarbyl hydrocarboxides are described herein and can be utilized to further describe the suitable metal hydrocarbyls.

Generally, each hydrocarboxide group of any metal hydrocarbyl having a hydrocarboxide group can be a $C_1$ to $C_{20}$ hydrocarboxide group; alternatively, a $C_1$ to $C_{10}$ hydrocarboxide group; or alternatively, a $C_1$ to $C_6$ hydrocarboxide group. In an embodiment, each hydrocarboxide independently can be an alkoxide group, a cycloalkoxide group, an aroxide group, or an aralkoxide group; alternatively, an alkoxide group; alternatively, a cycloalkoxide group; alternatively, an aroxide group; or alternatively, an aralkoxide group. Generally, the alkoxide group, a cycloalkoxide group, an aroxide group, and/or an aralkoxide group can have the same number of carbon atoms as the hydrocarboxide group.

When the metal hydrocarbyl can be, comprise, or consist essentially of, a metal alkyl, each alkyl group of any metal alkyl described herein (e.g., alkyl aluminum compound or alkylaluminum halide, among others) independently can be a $C_1$ to $C_{20}$ alkyl group; alternatively, a $C_1$ to $C_{10}$ alkyl group; or alternatively, a $C_1$ to $C_6$ alkyl group. In an embodiment, each alkyl group(s) of any metal alkyl described herein independently can be a methyl group, an ethyl group, a propyl group, a butyl group, a pentyl group, a hexyl group, a heptyl group, or an octyl group; alternatively, a methyl group, a ethyl group, a butyl group, a hexyl group, or an octyl group. In some embodiments, each alkyl group of any metal alkyl described herein independently can be a methyl group, an ethyl group, an n-propyl group, an n-butyl group, an iso-butyl group, an n-hexyl group, or an n-octyl group; alternatively, a methyl group, an ethyl group, a n-butyl group, or an iso-butyl group; alternatively, a methyl group; alternatively, an ethyl group; alternatively, an n-propyl group; alternatively, an n-butyl group; alternatively, an iso-butyl group; alternatively, a n-hexyl group; or alternatively, an n-octyl group.

Generally, each alkoxide group of any metal alkyl including an alkoxide group described herein independently can be a $C_1$ to $C_{20}$ alkoxide group; alternatively, a $C_1$ to $C_{10}$ alkoxide group; or alternatively, a $C_1$ to $C_6$ alkoxide group. In an embodiment, each alkoxide group of any metal alkyl including an alkoxide group described herein independently can be a methoxide group, an ethoxide group, a propoxide group, a butoxide group, a pentoxide group, a hexoxide group, a heptoxide group, or an octoxide group; alternatively, a methoxide group, an ethoxide group, a butoxide group, a hexoxide group, or an octoxide group. In some embodiments, each alkoxide group of any metal alkyl including an alkoxide group described herein independently can be a methoxide group, an ethoxide group, an n-propoxide group, an n-butoxide group, an iso-butoxide group, an n-hexoxide group, or an n-octoxide group; alternatively, a methoxide group, an ethoxide group, a n-butoxide group, or an iso-butoxide group; alternatively, a methoxide group; alternatively, an ethoxide group; alternatively, an n-propoxide group; alternatively, an n-butoxide group; alternatively, an iso-butoxide group; alternatively, an n-hexoxide group; or alternatively, an n-octoxide group.

In a non-limiting embodiment, the metal alkyl can comprise, consist essentially of, or consist of methyl lithium, ethyl lithium, n-butyl lithium, sec-butyl lithium, tert-butyl lithium, diethyl magnesium, diethyl zinc, or any combination thereof; alternatively methyl lithium, ethyl lithium, n-butyl lithium, sec-butyl lithium, tert-butyl lithium, or any combination thereof; alternatively, methyl lithium; alternatively, ethyl lithium; alternatively, n-butyl lithium; alternatively, sec-butyl lithium; alternatively, tert-butyl lithium; alternatively, diethyl magnesium; or alternatively, diethyl zinc.

In some aspects and embodiments according to this disclosure, the metal hydrocarbyl can be, comprise, or consist essentially of, a non-hydrolyzed hydrocarbyl aluminum compound. In an embodiment, the non-hydrolyzed hydrocarbyl aluminum compound can be, comprise, or consist essentially of, a trihydrocarbylaluminum compound, a hydrocarbylaluminum halide, or and hydrocarbylaluminum alkoxide.

In an aspect, the metal alkyl can comprise, consist essentially of, or consist of, a trialkylaluminum, a dialkylaluminum halide, an alkylaluminum dihalide, a dialkylaluminum hydride, an alkylaluminum dihydride, a dialkylaluminum alkoxide, an alkylaluminum dialkoxide, an alkylaluminum sesquihalide, an alkylaluminum sesquialkoxide, or any combination thereof; alternatively, a trialkylaluminum, a dialkylaluminum hydride, an alkylaluminum dihydride, a dialkylaluminum alkoxide, an alkylaluminum dialkoxide, or any combination thereof; alternatively, a trialkylaluminum, a dialkylaluminum hydride, an alkylaluminum dihydride, or any combination thereof; alternatively, a trialkylaluminum, a dialkylaluminum halide, an alkylaluminum dihalide, an alkylaluminum sesquihalide, or any combination thereof; alternatively, a trialkylaluminum, a dialkylaluminum halide, an alkylaluminum dihalide, or any combination thereof; alternatively, a trialkylaluminum, a dialkylaluminum halide, or any combination thereof; alternatively, a trialkylaluminum; alternatively, a dialkylaluminum halide; alternatively, an alkylaluminum dihalide; alternatively, a dialkylaluminum hydride; alternatively, an alkylaluminum dihydride; alternatively, a dialkylaluminum alkyloxy; alternatively, an alkylaluminum dialkoxide; alternatively, an alkylaluminum sesquihalide; or alternatively, an alkylaluminum sesquialkoxide. Alkyl groups, alkoxide groups, and halides are disclosed herein and can be utilized without limitation to further describe the metal alkyl, metal alkyl halides, and/or metal alkoxides which can be utilized to further describe the metal alkyls.

In a non-limiting embodiment, the trialkylaluminum which can be utilized in any aspect or any embodiment disclosed herein can comprise, consist essentially of, or consist of, trimethylaluminum, triethylaluminum, tripropylaluminum, tri-n-butylaluminum, tri-isobutylaluminum, tri-n-hexylaluminum, tri-n-octylaluminum, or any combination thereof; alternatively, triethylaluminum, tri-n-butylaluminum, tri-isobutylaluminum, tri-n-hexylaluminum, or any combination thereof; alternatively, trimethyl-aluminum; alternatively, triethylaluminum; alternatively, tripropylaluminum; alternatively, tri-n-butyl-aluminum; alternatively, tri-isobutylaluminum; alternatively, tri-n-hexylaluminum; or alternatively, tri-n-octylaluminum. In a non-limiting embodiment, the alkylaluminum halides can comprise, consist essentially of, or consist of, diethylaluminum chloride, diethylaluminum bromide, ethylaluminum dichloride, ethylaluminum sesquichloride, or any combination thereof; alternatively diethylaluminum chloride, ethylaluminum dichloride, ethylaluminum sesquichloride, or any combination thereof; alternatively, diethylaluminum chloride; alternatively, diethylaluminum bromide; alternatively, ethylaluminum dichloride; or alternatively, ethylaluminum sesquichloride. In a non-limiting embodiment, metal alkyl compound can comprise, consist essentially of, or consist of, a mixture of a trimethylaluminum (TMA), triethylaluminum (TEA), ethylaluminum dichloride, tripropylaluminum, diethylaluminum ethoxide, tributylaluminum, disobutylaluminum hydride, triisobutylaluminum, diethylaluminum chloride (DEAC), or any combination thereof.

In an aspect, the metal alkyl compound can comprise, consist essentially of, or consist of, a mixture of a trialkylaluminum compound and an alkylaluminum halide. The trialkylaluminum compound of the mixture can comprise, consist essentially of, or consist of, any trialkylaluminum compound described herein. The alkylaluminum halide compound of the mixture can be, comprise, or consist essentially of, any alkylaluminum compound described herein. In some embodiments, the mixture of the trialkylaluminum compound and the alkylaluminum halide can comprise, consist essentially of, or consist of, a mixture of triethylaluminum and diethylaluminum chloride, a mixture of triethylaluminum and ethylaluminum dichloride, or a mixture of triethylaluminum and ethylaluminum sesquichloride. In an embodiment, the metal alkyl component of the trimerization catalyst system can comprise, consist essentially of, or consist of, a mixture of triethylaluminum and diethylaluminum chloride.

In an aspect, the metal hydrocarbyl can comprise, consist essentially of, or consist of an alumoxane. In an embodiment, the aluminoxane can have a repeating unit of Formula I.

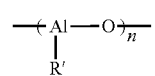

Formula I

Generally, R' can be any hydrocarbyl group disclosed herein. In some embodiments, R' can be an alkyl group. Alkyl groups are generally disclosed herein for a metal alkyl and these alkyl group can be utilized, without limitation to describe an alumoxane having the repeating unit of formula I wherein R' can be an alkyl group. In some embodiments, R' can be a linear or branched alkyl group; alternatively a linear alkyl group; alternatively, a branched alkyl group; or alternatively, a mixture of linear and branched alkyl groups.

Generally, n of Formula I is greater than 1; or alternatively greater than 2. In an embodiment, n can range from 2 to 15; or alternatively, range from 3 to 10.

In a non-limiting embodiment, the aluminoxane can comprise, consist essentially of, or consist of, methylaluminoxane, ethylaluminoxane, modified methylaluminoxane, n-propylaluminoxane, iso-propylaluminoxane, n-butylaluminoxane, sec-butylaluminoxane, iso-butylaluminoxane, t-butylaluminoxane, 1-pentylaluminoxane, 2-pentylaluminoxane, 3-pentylaluminoxane, iso-pentyl-aluminoxane, neopentylaluminoxane, or any combination thereof. In some non-limiting embodiments, the aluminoxane can comprise, consist essentially of, or consist of, methylaluminoxane, modified methylaluminoxane, isobutyl aluminoxane, t-butylaluminoxane, or any combination thereof. In other non-limiting embodiments, the aluminoxane can comprise, consist essentially of, or consist of, methylaluminoxane; alternatively, ethylaluminoxane; alternatively, modified methylaluminoxane; alternatively, n-propylaluminoxane; alternatively, iso-propylaluminoxane; alternatively, n-butylaluminoxane; alternatively, sec-butylaluminoxane; alternatively, iso-butylaluminoxane; alternatively, t-butylaluminoxane; alternatively, 1-pentylaluminoxane; alternatively, 2-pentylaluminoxane; alternatively, 3-pentylaluminoxane; alternatively, iso-pentylaluminoxane; or alternatively, neopentylaluminoxane.

While not intending to be bound by theory, it is believed that a halogen containing compound can improve the product purity and selectivity of an oligomerization process utilizing a catalyst system described herein. As used herein, the terms "halogen containing" and "halide containing" are used interchangeably. In an aspect, the halogen containing compound can be, comprise, or consist essentially of, a metal halide, a non-metal halide, or any combination thereof; alternatively, a metal halide; or alternatively, a non-metal halide. In some embodiments, the metal halide can be, comprise, or consist essentially of, an inorganic metal halide, a hydrocarbyl metal halide, or any combination thereof; alternatively, an inorganic metal halide; or alternatively, a hydrocarbyl metal halide. In this aspect and in any disclosed embodiment, the halogen containing compound (metal halide or non-metal halide, and/or inorganic metal halide or hydrocarbyl metal halide) can be, comprise, or consist essentially of, a Group 3, a Group 4, a Group 5, a Group 6 excluding Cr, a Group 13, a Group 14, or a Group 15 halogen containing compound.

In an embodiment, the halogen containing compound can comprise, or consist essentially of, a Group 3 metal halide, a Group 4 metal halide, a Group 5 metal halide, a Group 6 excluding Cr metal halide, a Group 13 metal halide, a Group 14 metal halide, a Group 15 metal halide, or any combination thereof; alternatively, a Group 3 metal halide, a Group 4 metal halide, a Group 5 metal halide, a Group 6 excluding Cr metal halide, or any combination thereof; or alternatively, a Group 13 metal halide, a Group 14 metal halide, a Group 15 metal halide, or any combination thereof. In some embodiments, the halogen containing compound can comprise, or consist essentially of, a Group 3 metal halide; alternatively, a Group 4 metal halide; alternatively, a Group 5 metal halide; alternatively, a Group 6 excluding Cr metal halide; alternatively, a Group 13 metal halide; alternatively, a Group 14 metal halide; or alternatively, a Group 15 metal halide. In yet other embodiments, the halogen containing compound can comprise or consist essentially of, a halogenated hydrocarbon.

Generally, the group number (metal or non-metal) and halogen (among other feature of the halogen containing compound) are independent elements of the halogen containing compound and are independently described herein. The halogen containing compound can be described using any combination of the group number(s) (metal or non-metal) and halogen(s) described herein.

In an embodiment, the non-metal halide can be, comprise, or consist essentially of, a Group 13 non-metal halide, a Group 14 non-metal halide, a Group 15 non-metal halide, or any combination thereof; alternatively, a Group 13 non-metal halide; alternatively, a Group 14 non-metal halide; or alternatively, a Group 15 non-metal halide. In some embodiments, the non-metal halide can be, comprise, or consist of, a boron halide, a silicon halide, a phosphorus halide, a halogenated hydrocarbon, or any combination thereof; alternatively, a boron halide; alternatively, a silicon halide; alternatively, a phosphorus halide; or alternatively, a halogenated hydrocarbon. In an embodiment, the boron halide compound can be, comprise, or consist essentially of, a boron trihalide, a hydrocarbyl boron dihalide, a dihydrocarbyl boron monohalide, or any combination thereof; alternatively, a boron trihalide; alternatively, a hydrocarbyl boron dihalide; or alternatively a dihydrocarbyl boron halide. In an embodiment, the silicon halide can be, comprise, or consist essentially of, a silicon tetrahalide, a hydrocarbyl silicon trihalide, a dihydrocarbyl silicon dihalide, a trihydrocarbyl silicon monohalide, or any combination thereof; alternatively, a silicon tetrahalide; alternatively, a hydrocarbyl silicon trihalide; alternatively, a dihydrocarbyl silicon dihalide; or alternatively a trihydrocarbyl silicon monohalide. In an embodiment, the phosphorus halide can be, comprise, or consist essentially of, a phosphorus pentahalide, a phosphorus trihalide, a hydrocarbyl phosphorus dihalide, a dihydrocarbyl phosphorus monohalide, or any combination thereof; alternatively, a phosphorus pentahalide, a phosphorus trihalide, or any combination thereof; alternatively, phosphorus pentahalide; alternatively, a phosphorus trihalide; alternatively, a hydrocarbyl phosphorus dihalide; or alternatively, a dihydrocarbyl phosphorus monohalide. Generally, the halide(s) (or halogen) and hydrocarbyl group(s) (or hydrocarbon of the halogenated hydrocarbon) are independent elements of the boron halide, silicon halide, phosphorus halide, or halogenated hydrocarbon which can be utilized as the halogenated compound. The halides (or halogens) and hydrocarbyl groups are independently described herein and can be utilized in any combination to further describe the boron halide, silicon halide, phosphorus halide, halogenated hydrocarbon which can be utilized as the halogen containing compound.

In an embodiment, the metal halide compound which can be utilized as the halogen containing compound can be, comprise, or consist essentially of, an inorganic metal halide, a hydrocarbyl metal halide, or any combination thereof; alternatively, a inorganic metal halide; or alternatively, a hydrocarbyl metal halide. In some embodiments, the metal halide can be, comprise, or consist essentially of, a Group 3 metal halide, a Group 4 metal halide, a Group 5 metal halide, a Group 6 excluding Cr metal halide, a Group 13 metal halide, a Group 14 metal halide, a Group 15 metal halide, or any combination thereof; alternatively, a Group 3 metal halide; alternatively, a Group 4 metal halide; alternatively, a Group 5 metal halide; alternatively, a Group 6 excluding Cr metal halide; alternatively, a Group 13 metal halide; alternatively, a Group 14 meta halide; or alternatively, a Group 15 metal halide. In an embodiment, the metal halide compound which can be utilized as the halogen containing compound can comprise, or consist essentially of, an inorganic Group 3 metal halide, an inorganic Group 4 metal halide, an inorganic Group 5 metal halide, an inorganic Group 6 excluding Cr metal halide, an inorganic Group 13 metal halide, an inorganic Group 14 metal halide, an inorganic Group 15 metal halide, or any combination thereof; alternatively, an inorganic Group 3 metal halide; alternatively, an inorganic Group 4 metal halide; alternatively, an inorganic Group 5 metal halide; alternatively, an inorganic Group 6 excluding Cr metal halide; alternatively, an inorganic Group 13 metal halide; alternatively, an inorganic Group 14 metal halide; or alternatively, an inorganic Group 15 metal halide. In an embodiment, the metal halide compound which can be utilized as the halogen containing compound can comprise, or consist essentially of, a hydrocarbyl Group 3 metal halide, a hydrocarbyl Group 4 metal halide, a hydrocarbyl Group 5 metal halide, a hydrocarbyl Group 6 excluding Cr metal halide, a hydrocarbyl Group 13 metal halide, a hydrocarbyl Group 14 metal halide, a hydrocarbyl Group 15 metal halide, or any combination thereof; alternatively, a hydrocarbyl Group 3 metal halide; alternatively, a hydrocarbyl Group 4 metal halide; alternatively, a hydrocarbyl Group 5 metal halide; alternatively, a hydrocarbyl Group 6 excluding Cr metal halide; alternatively, a hydrocarbyl Group 13 metal halide; alternatively, a hydrocarbyl Group 14 metal halide; or alternatively, a hydrocarbyl Group 15 metal halide. Generally, the halide(s) (or halogen(s)) of the inorganic metal halides and the halide(s) (or halogen(s)) and hydrocarbyl group(s) of the hydrocarbyl metal halides are independent elements of the inorganic metal halide and/or hydrocarbyl metal halides which can be utilized as the halogen containing compound. The halides (or halogens) and hydrocarbyl groups are independently described herein and can be utilized in any combination to further describe the inorganic metal halide and/or hydrocarbyl metal halides which can be utilized as the halogen containing compound.

It should be noted that when the halogen containing compound comprises, or consists essentially of, a hydrocarbyl metal halide, the halogen containing compound (i.e., the hydrocarbyl metal halide) can also serve as the hydrocarbyl metal compound. In some embodiments wherein the halogen containing compound comprises, or consists essentially of, a hydrocarbyl metal halide, the halogen containing compound (i.e., the hydrocarbyl metal halide) can represent all or a portion of the hydrocarbyl metal compound; alternatively, all of the hydrocarbyl metal compound; or alternatively, a portion of the hydrocarbyl metal compound.

In an aspect or any embodiment, the metal of any general or specific inorganic metal halide or hydrocarbyl metal halide that can be utilized as the halogen containing compound can be, comprise, or consist essentially of, scandium, yttrium, lanthanum, titanium, zirconium, hafnium, vanadium, niobium, molybdenum, tungsten, aluminum, gallium, germanium, tin, arsenic, antimony, or bismuth; or alternatively, scandium, yttrium, lanthanum, titanium, zirconium, hafnium, molybdenum, tungsten, aluminum, gallium, germanium, tin, arsenic, antimony, or bismuth. In some embodiments, the metal of any general or specific inorganic metal halide or hydrocarbyl metal halide that can be utilized as the halogen containing compound can be, comprise, or consist essentially of, scandium, yttrium, lanthanum, titanium, zirconium, hafnium, molybdenum, or tungsten; or alternatively, aluminum, gallium, germanium, tin, antimony, or bismuth. In other embodiments, the metal of any general or specific inorganic metal halide or hydrocarbyl metal halide that can be utilized as the halogen containing compound can be, comprise, or consist essentially of, scandium, yttrium, or lanthanum; alternatively, titanium, zirconium, or hafnium; alternatively, vanadium, or niobium; alternatively, molybdenum or tungsten; alternatively, aluminum or gallium; alternatively, germanium or tin; or alternatively, antimony, or bismuth. In yet other embodiments, the metal of any general or specific inorganic metal halide or hydrocarbyl metal halide can be, comprise, or consist essentially of, scandium; alternatively, yttrium; alternatively, lanthanum; alternatively, titanium; alternatively, zirconium; alternatively, hafnium; alternatively, vanadium; alternatively, niobium; alternatively, molybdenum; alternatively, tungsten; alternatively, aluminum; alternatively, gallium; alternatively, germanium; alternatively, tin; alternatively, arsenic; alternatively, antimony; or alternatively, bismuth.

In an aspect, each halogen (or halide) of the halogen containing compound (regardless of whether it is a inorganic metal halide, hydrocarbyl metal halide, or non-metal halide independently can be fluoride, chloride, bromide, or iodide; alternatively, fluoride; alternatively, chloride; alternatively, bromide; or alternatively, iodide. Consequently, the halogen containing compound can be a fluorine (or fluoride) containing compound, a chlorine (or chloride) containing compound, a bromine (or bromide) containing compound, or an iodine (or iodide) containing compound. In an embodiment, the halogen containing compound can be a fluorine (or fluoride) containing compound; alternatively, a chlorine (or chloride) containing compound; alternatively, a bromine (or bromide) containing compound; or alternatively, an iodine (or iodide) containing compound.

In an exemplary embodiment, the halogen containing compound can comprise, or consist essentially of any general or specific inorganic metal fluoride, hydrocarbyl metal fluoride, non-metal fluoride, inorganic metal chloride, hydrocarbyl metal chloride, non-metal chloride, inorganic metal bromide, hydrocarbyl metal bromide, non-metal bromide, inorganic metal iodide, hydrocarbyl metal iodide, non-metal iodide, or any combination thereof; alternatively, inorganic metal fluoride, inorganic metal chloride, inorganic metal bromide, inorganic metal iodide, or any combination thereof; alternatively, hydrocarbyl metal fluoride, hydrocarbyl metal chloride, hydrocarbyl metal bromide, hydrocarbyl metal iodide, or any combination thereof; or alternatively, non-metal fluoride, non-metal chloride, non-metal bromide, non-metal iodide, or any combination thereof. In some embodiments, the halogen containing compound can be, comprise, or consist essentially of, any general or specific inorganic metal chloride, hydrocarbyl metal chloride, non-metal chloride, or any combination thereof; alternatively, inorganic metal chloride; alternatively, hydrocarbyl metal chloride; or alternatively, non-metal chloride.

In an embodiment, the hydrocarbyl group of any hydrocarbyl metal halide (e.g., a hydrocarbyl aluminum halide or a hydrocarbyl tin halide, among others disclosed herein) or any hydrocarbyl non-metal halide (e.g., hydrocarbyl boron halide, hydrocarbyl silicon halide, hydrocarbyl phosphorus halide, among others disclosed herein) can be a $C_1$ to $C_{20}$ hydrocarbyl group; alternatively, a $C_1$ to $C_{10}$ hydrocarbyl group; or alternatively, a $C_1$ to $C_6$ hydrocarbyl group. Hydrocarbyl groups (general and specific) are generally described herein as embodiments $R^{2c}$, substituent groups for pyrrole compounds, and substituent groups in various embodiments described herein, among other aspects and embodiments. These hydrocarbyl group descriptions (general and specific) can be utilized without limitation to further describe a hydrocarbyl metal halide or a hydrocarbyl non-metal halide which can be utilized as halogen containing compound. In some non-limiting, the hydrocarbyl group of hydrocarbyl metal halide (e.g., a hydrocarbyl aluminum halide or a hydrocarbyl tin halide, among others disclosed herein or any hydrocarbyl non-metal halide (e.g., hydrocarbyl boron halide, hydrocarbyl silicon halide, hydrocarbyl phosphorus halide, among others disclosed herein) can be an alkyl group, a cycloalkyl group, an aryl group, or an aralkyl group; alternatively, an alkyl group; alternatively, a cycloalkyl group; alternatively, an aryl group; or alternatively, an aralkyl group.

In a non-limiting example, the metal halide that can be utilized as the halogen containing compound can comprise, or consist essentially of, or consist of, scandium trichloride, yttrium trichloride, lanthanum trichloride, titanium tetrachloride, zirconium tetrachloride, hafnium tetrachloride, molybdenum pentachloride, tungsten hexachloride, aluminum chloride, aluminum tribromide, aluminum fluoride, gallium trichloride, germanium tetrachloride, tin tetrachloride, antimony trichloride, antimony pentachloride, bismuth trichloride, or any combination thereof. In some non-limiting embodiments, the metal halide that can be utilized as the halogen containing compound can comprise, or consist essentially of, or consist of, scandium trichloride, yttrium trichloride, lanthanum trichloride, or any combination thereof; alternatively, titanium tetrachloride, zirconium tetrachloride, hafnium tetrachloride, or any combination thereof; alternatively, molybdenum pentachloride, tungsten hexachloride, or any combination thereof; alternatively, aluminum chloride, aluminum tribromide, aluminum fluoride, gallium trichloride, or any combination thereof; alternatively, germanium tetrachloride, tin tetrachloride, or any combination thereof; or alternatively, antimony trichloride, antimony pentachloride, bismuth trichloride, or any combination thereof. In other non-limiting embodiments, the metal halide that can be utilized as the halogen containing compound can comprise, or consist essentially of, or consist of, scandium trichloride; alternatively, yttrium trichloride; alternatively, lanthanum trichloride; alternatively, titanium tetrachloride; alternatively, zirconium tetrachloride; alternatively, hafnium tetrachloride; alternatively, molybdenum pentachloride; alternatively, tungsten hexachloride; alternatively, aluminum chloride; alternatively, aluminum tribromide; alternatively, aluminum fluoride; alternatively, gallium trichloride; alternatively, germanium tetrachloride; alternatively, tin tetrachloride; alternatively, antimony trichloride; alternatively, antimony pentachloride; alternatively, bismuth trichloride.

In a non-limiting example, the boron halide, silicon halide, or phosphorus halide that can be utilized as the halogen containing compound can comprise, or consist essentially of, or consist of, boron trichloride, boron tribromide, silicon tetrachloride, silicon tetrabromide, phosphorus trichloride, phosphorus tribromide, phosphorus pentachloride, or any combination thereof. In some non-limiting embodiments, the halogen containing compound can comprise, or consist essentially of, or consist of, boron trichloride, boron tribromide, or any combination thereof; alternatively, silicon tetrachloride, silicon tetrabromide, or any combination thereof; or alternatively, phosphorus trichloride, phosphorus tribromide, phosphorus pentachloride, or any combination thereof. In other non-limiting embodiments, the halogen containing compound can comprise, or consist essentially of, or consist of, boron trichloride; alternatively, boron tribromide; alternatively, silicon tetrachloride; alternatively, silicon tetrabromide; alternatively, phosphorus trichloride; alternatively, phosphorus tribromide; or alternatively, phosphorus pentachloride.

In an embodiment, the hydrocarbyl metal halide that can be utilized as the halogen containing compound can be, comprise, or consist essentially of, a hydrocarbylaluminum halide or a hydrocarbyltin halide; alternatively a hydrocarbylaluminum halide; or alternatively, a hydrocarbyltin halide. In another exemplary embodiment, the hydrocarbyl metal halide that can be utilized as the halogen containing compound can be, comprise, or consist essentially of, a hydrocarbylaluminum dihalide, a dihydrocarbylaluminum halide, a hydrocarbylaluminum sesquihalide, a hydrocarbyltin trihalide, a dihydrocarbyltin dihalide, a trihydrocarbyltin halide, or any combination thereof. In yet another embodiment, the hydrocarbyl metal halide that can be utilized as the halogen containing compound can be, comprise, or consist essentially of, a hydrocarbylaluminum dihalide, a dihydrocarbylaluminum halide, a hydrocarbylaluminum sesquihalide, or any combination thereof; or alternatively, a hydrocarbyltin trihalide, a dihydrocarbyltin dihalide, a trihydrocarbyltin halide, or any combination thereof. In a further embodiment, the hydrocarbyl metal halide that can be utilized as the halogen containing compound can be, comprise, or consist essentially of, a hydrocarbylaluminum dihalide; alternatively, a dihydrocarbylaluminum halide; alternatively, a hydrocarbylaluminum sesquihalide; alternatively, a hydrocarbyltin trihalide; alternatively, a dihydrocarbyltin dihalide; or alternatively, a trihydrocarbyltin halide. Hydrocarbyl groups have been described herein and can be utilized without limitation to describe the hydrocarbyl groups of a hydrocarbylaluminum halide and/or a hydrocarbyltin halide which can be utilized as the halogen containing compound.

In an aspect, the hydrocarbyl metal halide that can be utilized as the halogen containing compound can be, comprise, or consist essentially of, an alkyl metal halide. In an embodiment, the alkyl metal halide that can be utilized as the halogen containing compound can be, comprise, or consist essentially of, an alkylaluminum halide or an alkyltin halide; alternatively an alkylaluminum halide; or alternatively, an alkyltin halide. In some embodiments, the alkyl aluminum halide that can be utilized as the halogen containing compound can be, comprise, or consist essentially of, an alkylaluminum chloride; alternatively, an alkylaluminum bromide; or alternatively, and alkylaluminum iodide. In other embodiments, the alkyl tin halide that can be utilized as the halogen containing compound can be, comprise, or consist essentially of, an alkyltin chloride; alternatively, an alkyltin bromide; or alternatively, an alkyltin iodide. In another embodiment, the alkyl metal halide that can be utilized as the halogen containing compound can comprise, or consist essentially of, an alkylaluminum dihalide, a dialkylaluminum halide, an alkylaluminum sesquihalide, an alkyltin trihalide, a dialkyltin dihalide, a trialkyltin halide, or any combination thereof. In some embodiments, the alkyl metal halide that can be utilized as the halogen containing compound can comprise, or consist essentially of, an alkylaluminum dihalide, a dialkylaluminum halide, an alkylaluminum sesquihalide, or any combination thereof; or alternatively, an alkyltin trihalide, a dialkyltin dihalide, a trialkyltin halide, or any combination thereof. In further non-limiting embodiments, the alkyl metal halide that can be utilized as the halogen containing compound can comprise, or consist essentially of, an alkylaluminum dihalide; alternatively, a dialkylaluminum halide; alternatively, an alkylaluminum sesquihalide; alternatively, an alkyltin trihalide; alternatively, a dialkyltin dihalide; or alternatively, a trialkyltin halide. Specific alkylaluminum halides are disclosed herein (e.g., as potential alkylaluminum compounds) and can be utilized without limitation as the halogen containing compound.

In a non-limiting embodiment, the halogen containing compound can be boron trifluoride, an alkyl boron fluoride, boron trichloride, an alkyl boron chloride, boron tribromide, an alkyl boron bromide, boron triiodide, an alkyl boron iodide, silicon tetrafluoride, an alkyl silicon fluoride, silicon tetrachloride, an alkyl silicon chloride, silicon tetrabromide, an alkyl silicon bromide, silicon tetraiodide, an alkyl silicon iodide, a phosphorus fluoride (tri or penta), an alkyl phosphorus fluoride, a phosphorus chloride (tri or penta), an alkyl phosphorus chloride, a phosphorus tribromide (tri or penta), an alkyl phosphorus bromide, a phosphorus triiodide (tri or penta), or an alkyl phosphorus iodide. In some non-limiting embodiments, the halogen containing compound can be, comprise, or consist essentially of, boron trifluoride, boron trichloride boron tribromide, boron triiodide, silicon tetrafluoride, silicon tetrachloride, silicon tetrabromide, silicon tetraiodide, a phosphorus fluoride (tri or penta), a phosphorus chloride (tri or penta), a phosphorus tribromide (tri or penta), or a phosphorus triiodide (tri or penta); alternatively, boron trifluoride, boron trichloride boron tribromide, boron triiodide; alternatively, silicon tetrafluoride, silicon tetrachloride, silicon tetrabromide, silicon tetraiodide; or alternatively, a phosphorus fluoride (tri or penta), a phosphorus chloride (tri or penta), a phosphorus bromide (tri or penta), or a phosphorus iodide (tri or penta). In other non-limiting embodiments, the halogen containing compound can be, comprise, or consist essentially of, boron trifluoride, an alkyl boron fluoride, boron trichloride, an alkyl boron chloride, boron tribromide, an alkyl boron bromide, boron triiodide, or an alkyl boron iodide; alternatively, silicon tetrafluoride, an alkyl silicon fluoride, silicon tetrachloride, an alkyl silicon chloride, silicon tetrabromide, an alkyl silicon bromide, silicon tetraiodide, or an alkyl silicon iodide; or alternatively, a phosphorus fluoride (tri or penta), an alkyl phosphorus fluoride, a phosphorus chloride (tri or penta), an alkyl phosphorus chloride, a phosphorus tribromide (tri or penta), an alkyl phosphorus bromide, a phosphorus triiodide (tri or penta), or an alkyl phosphorus iodide; alternatively, boron trifluoride or an alkyl boron fluoride; alternatively, boron trichloride or an alkyl boron chloride; alternatively, boron tribromide or an alkyl boron bromide; alternatively, boron triiodide or an alkyl boron iodide; alternatively, silicon tetrafluoride or an alkyl silicon fluoride; alternatively, silicon tetrachloride or an alkyl silicon chloride; alternatively, silicon tetrabromide or an alkyl silicon bromide; alternatively, silicon tetraiodide or an alkyl silicon iodide; alternatively, a phosphorus fluoride (tri or penta) or an alkyl phosphorus fluoride; alternatively, a phosphorus chloride (tri or penta) or an alkyl phosphorus chloride; alternatively, a phosphorus tribromide (tri or penta) or an alkyl phosphorus bromide; or alternatively, a phosphorus triiodide (tri or penta) or an alkyl phosphorus iodide.

In a non-limiting alkyl metal halide aspect or alkyl non-metal halide aspect, each alkyl group (if there is more than one) of any alkyl metal halide (general or specific) or alkyl non-metal halide (general or specific) which can be utilized as the halogen containing compound can be a $C_1$ to $C_{20}$ alkyl group; alternatively, a $C_1$ to $C_{10}$ alkyl group; or alternatively, a $C_1$ to $C_6$ alkyl group. In an embodiment, each alkyl group (if there is more than one) of any alkyl metal halide (general or specific) or alkyl non-metal halide (general or specific) which can be utilized as the halogen containing compound can be methyl group, an ethyl group, a propyl group, a butyl group, a pentyl group, a hexyl group, a heptyl group, an octyl group, a nonyl group, or a decyl group; alternatively, a methyl group, an ethyl group, a propyl group, a butyl group, a pentyl group, or a hexyl group. In some embodiments, each alkyl group (if there is more than one) of any alkyl metal halide (general or specific) or alkyl non-metal halide (general or specific) which can be utilized as the halogen containing compound can be methyl group, an ethyl group, a propyl group, an n-butyl group, an iso-butyl group, a sec-butyl group, a tert-butyl group, an n-hexyl group, or an n-octyl group; alternatively, a methyl group, an ethyl group, a propyl group, an n-butyl group, an iso-butyl group, a sec-butyl group, a tert-butyl group, or an n-hexyl group; alternatively, a methyl group; alternatively, an ethyl group; alternatively, a propyl group; alternatively, an n-butyl group; alternatively, an iso-butyl group; alternatively, a sec-butyl group; alternatively, a tert-butyl group; or alternatively, an n-hexyl group.

In a non-limiting embodiment, the alkyl silane halide can comprise, consist essentially of, or consist of, methyl trichlorosilane, dimethyl dichlorosilane, trimethyl chlorosilane, or any combination thereof. In some non-limiting embodiments, the alkyl silane halide can comprise, consist essentially of, or consist of, methyl trichlorosilane; alternatively, dimethyl dichlorosilane; or alternatively, trimethyl chlorosilane.

Hydrocarbyl metal halides and alkyl metal halides are described herein as potential hydrocarbyl metal compounds and metal alkyls. In an embodiment, these hydrocarbyl metal halides and/or alkyl metal halides can be utilized without limitation as the metal halide. In another non-limiting embodiment, hydrocarbyl metal halides can comprise, consist essentially of, or consist of, trityl hexachloroantimonate.

In an aspect, the halogen containing compound can comprise, consist essentially of, or consist of, a $C_1$-$C_{15}$ organic halide; alternatively, a $C_1$ to $C_{10}$ organic halide; or alternatively, a $C_1$ to $C_8$ organic halide. In an embodiment, the halogen containing compound can comprise, consist essentially of, or consist of, an organic fluoride, an organic chloride, an organic bromide, an organic iodide. In some embodiments, organic halide that can be utilized as the halogen containing compound can comprise, consist essentially of, or consist of, an organic chloride; alternatively, an organic bromide; or alternatively, an organic iodide. Generally, the organic fluoride, organic chloride, organic bromide, or organic iodide can have the same carbon number range as any general organic halide describe herein.

In an aspect, the halogen containing compound can comprise, consist essentially of, or consist of, a $C_1$-$C_{15}$ halogenated hydrocarbon; alternatively, a $C_1$ to $C_{10}$ halogenated hydrocarbon; or alternatively, a $C_1$ to $C_8$ halogenated hydrocarbon. In an embodiment, the halogen containing compound can comprise, consist essentially of, or consist of, a fluorinated hydrocarbon, a chlorinated hydrocarbon, a brominated hydrocarbon, an iodinated hydrocarbon, or any combination thereof. In some embodiments, the halogen containing compound can comprise, consist essentially of, or consist of, a fluorinated hydrocarbon; alternatively, a chlorinated hydrocarbon; alternatively, a brominated hydrocarbon; or alternatively, an iodinated hydrocarbon. Generally, a fluorinated hydrocarbon, a chlorinated hydrocarbon, a brominated hydrocarbon, and/or an iodinated hydrocarbon can have the same carbon number range as any general halogenated hydrocarbon described herein.

In a non-limiting embodiment, the halogen containing compound can comprise, consist essentially of, or consist of, carbon tetrachloride, carbon tetrabromide, chloroform, bromoform, dichloromethane, dibromoethane, diiodomethane, chloromethane, bromomethane, iodomethane, dichloroethane, tetrachloroethane, trichloroacetone, hexachloroacetone, hexachlorocyclohexane, 1,3,5-trichlorobenzene, hexachlorobenzene, trityl chloride, benzyl chloride, benzyl bromide, benzyl iodide, chlorobenzene, bromobenzene, iodobenzene, hexafluorobenzene, or any combination thereof.

In an aspect, the catalyst system can have a molar ratio of metal of the transition metal compound to metal of the metal hydrocarbyl compound (also referred to as the transition metal:metal hydrocarbyl metal molar ratio) ranging from 1:1 to 1:150; alternatively, from 1:1 to 1:100; alternatively, from 1:2 to 1:50; alternatively, from 1:5 to 1:40; or alternatively, from 1:9 to 1:25. In another aspect, the catalyst system can have a transition metal:metal hydrocarbyl metal molar ratio ranging from 1:2 to 1:18; alternatively, from 1:5 to 1:17; alternatively, from 1:8 to 1:16.5; alternatively, from 1:9 to 1:16; or alternatively from 1:9.5 to 1:15.5. When less general references to the metal of the transition metal compound and/or metal of the metal hydrocarbyl compound are utilized, the more specific references to the metal of the transition metal compound and/or the metal of the metal hydrocarbyl compound can replace the general references to the metal of the transition metal compound and/or the metal of metal hydrocarbyl compound in the transition metal:metal hydrocarbyl metal molar ratio. In a non-limiting embodiment wherein the transition metal compound is a chromium compound (e.g. a chromium(III) carboxylate composition) and the metal hydrocarbyl compound is an alkylaluminum compound (e.g. triethylaluminum, diethylaluminum chloride, or a mixture thereof), the catalyst system can have a chromium:aluminum molar ratio ranging from 1:1 to 1:150; alternatively, from 1:1 to 1:100; alternatively, from 1:2 to 1:50; alternatively, from 1:5 to 1:40; alternatively, from 1:9 to 1:25; alternatively, ranging from 1:2 to 1:18; alternatively, from 1:5 to 1:17; alternatively, from 1:8 to 1:16.5; alternatively, from 1:9 to 1:16; or alternatively from 1:9.5 to 1:15.5. In another non-limiting embodiment wherein the transition metal compound is a chromium compound (e.g. a chromium (III) carboxylate composition) and the metal alkyl is an alkylaluminum compound (e.g. triethylaluminum, diethylaluminum chloride, or a mixture thereof), the catalyst system can have a chromium:aluminum molar ratio ranging from 1:1 to 1:150; alternatively, 1:1 to 1:100; alternatively, 1:9 to 1:25; alternatively, ranging from 1:2 to 1:18; alternatively, from 1:5 to 1:17; alternatively, from 1:8 to 1:16.5; alternatively, from 1:9 to 1:16; or alternatively from 1:9.5 to 1:15.5.

In an aspect, the catalyst system can have a molar ratio of nitrogen of the nitrogen containing compound to transition metal of the transition metal compound (also referred to as a nitrogen:transition metal molar ratio) ranging from 0.3:1 to 10:1; alternatively, from 0.3:1 to 7.5:1; alternatively, from 0.3:1 to 5:1. In another aspect, the catalyst system can have nitrogen:transition metal molar ratio ranging from 1:1 to 4:1; alternatively from 1.5:1 to 3.7:1; alternatively from 1.5:1 to 2.5:1; alternatively from 2:1 to 3.7:1; alternatively from 2.5:1 to 3.5:1; or alternatively from 2.9:1 to 3.1:1. In yet another aspect, the catalyst system can have nitrogen:transition metal molar ratio ranging from 0.3:1 to 4.0:1; alternatively, from 0.3:1 to 3:1; alternatively, from 0.3:1 to 2:1; alternatively, from 0.3:1 to 1.5:1; alternatively, from 0.3:1 to 1.3:1; alternatively, from 0.3:1 to 1.2:1; alternatively, from 0.3:1 to 0.9:1; or alternatively, 0.3:1 to 0.8:1. When less general references to the nitrogen containing compound and/or the transition metal containing compound are utilized, the more specific nitrogen containing compound and/or transition metal compound references can replace the general references to the nitrogen containing compound and/or transition metal compound in nitrogen:transition metal molar ratio. In a non-limiting embodiment wherein the transition metal compound is a chromium compound (e.g. a chromium(III) carboxylate composition) and the nitrogen containing compound is a pyrrole compound (e.g. a non-metal pyrrole compound, a metal pyrrole compound, a 2,5-disubstited pyrrole, among other pyrrole compounds disclosed herein), the pyrrole compound nitrogen:chromium molar ratio can range from 0.3:1 to 10:1; alternatively, from 0.3:1 to 7.5:1; alternatively, from 0.3:1 to 5:1; alternatively, 1:1 to 4:1; alternatively, from 1.5:1 to 3.7:1; alternatively, from 1.5:1 to 2.5:1; alternatively, from 2:1 to 3.7:1; alternatively, from 2.5:1 to 3.5:1; or alternatively, from 2.9:1 to 3.1:1; alternatively, from 2.9:1 to 3.1:1; alternatively, 0.3:1 to 4.0:1; alternatively, from 0.3:1 to 3:1; alternatively, from 0.3:1 to 2:1; alternatively, from 0.3:1 to 1.5:1; alternatively, from 0.3:1 to 1.3:1; alternatively, from 0.3:1 to 1.2:1; alternatively, from 0.3:1 to 0.9:1; or alternatively, 0.3:1 to 0.8:1.

In aspects wherein the olefin trimerization catalyst system contains a halogen containing compound (inorganic metal halide, hydrocarbyl metal halide, and/or organic halide) the halide to transition metal of the transition metal compound molar ratio (also referred to as halide:transition metal molar ratio) can be at least 0.001:1; alternatively, at least 0.05:1; alternatively, at least 0.1; alternatively, 0.25; alternatively, at least 0.5:1; or alternatively, at least 0.75:1. In other aspects wherein the olefin trimerization catalyst system contains a halogen containing compound (inorganic metal halide, hydrocarbyl metal halide, and/or organic halide) the halide:transition metal molar ratio can be less than equal to 1,000:1; alternatively, 500:1; alternatively, 250:1; alternatively, 100:1; alternatively, 75:1; alternatively, 50:1; or alternatively, 25:1. In an aspect, the halide:transition metal molar ratio can range from any minimum halide:transition metal molar ratio described herein to any maximum halide:transition metal molar ratio molar ratio described herein. In some non-limiting embodiments, the halide:transition metal molar ratio can range from 0.1:1 to 100:1; alternatively, range from 0.25:1 to 75:1; alternatively, range from 0.5:1 to 50:1; or alternatively, range from 0.75:1 to 25:1. Other ranges for the halide:transition metal molar ratios are readily apparent from the present disclosure. When a particular halide(s) (e.g., chloride) and/or transition metal of the transition metal compound (e.g., chromium) is specified, the ratio can be provide in terms of the specified halide(s) and/or transition metal (e.g., a halide:chromium molar ratio, a chloride:transition metal molar ratio, or a chloride:chromium molar ratio, among others).

In a non-limiting embodiment, the catalyst system can comprise a) a chromium(III) $C_3$-$C_{25}$ carboxylate where the $C_3$-$C_{25}$ carboxylate comprises a propionate, a butyrate, a pentanoate, a hexanoate, a heptanoate, an octanoate, a nonanoate, a decanoate, an undecanoate, a dodecanoate, a tridecanoate, a tetradecanoate, a pentadecanoate, a hexadecanoate, a heptadecanoate, an octadecanoate, or any combination thereof and the chromium(III) $C_3$-$C_{25}$ carboxylate can be i) characterized as having a KBr pellet infrared spectrum with a $\upsilon_{asym}$ ($CO_2$) infrared absorbance peak within 110 cm$^{-1}$ of the $\upsilon_{sym}$ ($CO_2$) infrared peak and having an infrared absorbance peak height ratio of a $\upsilon_{asym}$ ($CO_2$) infrared absorbance peak at 1516±15 cm$^{-1}$ to infrared absorbance peak located at 700±50 cm$^{-1}$ greater than or equal to 3:1, ii) characterized as having a goodness of fit test value, $R^2$, of at least 0.6 when comparing high-energy X-ray diffraction g(r) data points of the chromium(III) $C_3$-$C_{25}$ carboxylate composition to calculated high energy X-ray diffraction g(r) data points of a theoretical model of mononuclear chromium(III) acetate over an r range from 1.3 Angstroms to 4 Angstroms, or iii) produced by a process comprising contacting under substantially anhydrous and substantially acid-free conditions 1) a chromium(III) precursor having a formula $CrX_3L_l$ where each X independently is a halide, each L independently is a $C_2$-$C_{10}$ ether, a $C_2$-$C_{10}$ thioether, a $C_2$-$C_5$ nitrile, a $C_1$-$C_{30}$ amine, or a $C_3$-$C_{30}$ phosphine, or any combination thereof, and l ranges from 0 to 7, 2) a Group 1 or Group 2 metal $C_3$-$C_{25}$ carboxylate, and 3) a first solvent to form a chromium(III) carboxylate; b) a pyrrole compound comprising 2,5-dimethylpyrrole, 2-methyl-5-ethylpyrrole, 2,5-diethylpyrrrole, 2,5-dipropylpyrrole, 2,5-dibutylpyrrole, 2,4-dimethylpyrrole, 2,4-diethylpyrrrole, 2,4-dipropylpyrrole, 2,4-dibutylpyrrole, 3,4-dimethylpyrrole, 3,4-diethylpyrrrole, 3,4-dipropylpyrrole, 3,4-dibutylpyrrole, 2,3,4-trimethylpyrrole 3-ethyl-2,4-dimethylpyrrole, 2,3,5-trimethylpyrrole, 2,3,4,5-tetramethylpyrrole, 2,3,4,5-tetraethylpyrrole, or any combination thereof; c) a metal hydrocarbyl compound comprising a trialkylaluminium, a dialkyl aluminum halide, an alkyl metal dihalide, an alkyl aluminum sesquichloride, or any combination thereof; d) the chromium to aluminum molar ratio ranges from 1:1 to 1:100; and e) the pyrrole compound to chromium molar ratio ranges from 0.3:1 to 10:1. In another non-limiting embodiment, the catalyst system can comprise a) a chromium (III) $C_3$-$C_{25}$ carboxylate of the chromium(III) $C_3$-$C_{25}$ carboxylate where the $C_3$-$C_{25}$ carboxylate comprises a propionate, a butyrate, a pentanoate, a hexanoate, a heptanoate, an octanoate, a nonanoate, a decanoate, an undecanoate, a dodecanoate, a tridecanoate, a tetradecanoate, a pentadecanoate, a hexadecanoate, a heptadecanoate, an octadecanoate, or any combination thereof and the chromium (III) $C_3$-$C_{25}$ carboxylate can be i) characterized as having a KBr pellet infrared spectrum with a $\upsilon_{asym}$ ($CO_2$) infrared absorbance peak within 110 $cm^{-1}$ of the $\upsilon_{sym}$ ($CO_2$) infrared peak and having an infrared absorbance peak height ratio of a $\upsilon_{asym}$ ($CO_2$) infrared absorbance peak at 1516±15 $cm^{-1}$ to infrared absorbance peak located at 700±50 $cm^{-1}$ greater than or equal to 3:1, ii) characterized as having a goodness of fit test value, $R^2$, of at least 0.6 when comparing high-energy X-ray diffraction g(r) data points of the chromium(III) $C_3$-$C_{25}$ carboxylate composition to calculated high energy X-ray diffraction g(r) data points of a theoretical model of mononuclear chromium(III) acetate over an r range from 1.3 Angstroms to 4 Angstroms, or iii) produced by a process comprising contacting under substantially anhydrous and substantially acid-free conditions 1) a chromium(III) precursor having a formula $CrX_3L_l$ where each X independently is a halide, each L independently is a $C_2$-$C_{10}$ ether, a $C_2$-$C_{10}$ thioether, a $C_2$-$C_5$ nitrile, a $C_1$-$C_{30}$ amine, or a $C_3$-$C_{30}$ phosphine, or any combination thereof, and l ranges from 0 to 7, 2) a Group 1 or Group 2 metal $C_3$-$C_{25}$ carboxylate, and 3) a first solvent to form a chromium(III) carboxylate; b) a pyrrole compound comprising 2,5-dimethylpyrrole, 2-methyl-5-ethylpyrrole, 2,5-diethylpyrrrole, 2,5-dipropylpyrrole, 2,5-dibutylpyrrole, 2,4-dimethylpyrrole, 2,4-diethylpyrrrole, 2,4-dipropylpyrrole, 2,4-dibutylpyrrole, 3,4-dimethylpyrrole, 3,4-diethylpyrrrole, 3,4-dipropylpyrrole, 3,4-dibutylpyrrole, 2,3,4-trimethylpyrrole 3-ethyl-2,4-dimethylpyrrole, 2,3,5-trimethylpyrrole, 2,3,4,5-tetramethylpyrrole, 2,3,4,5-tetraethylpyrrole, or any combination thereof; c) a metal hydrocarbyl compound comprising a trialkylaluminium, a dialkyl aluminum halide, an alkyl metal dihalide, an alkyl aluminum sesquichloride, or any combination thereof; d) the chromium to aluminum molar ratio ranges from 1:5 to 1:17; and e) the pyrrole compound to chromium molar ratio ranges from 0.3:1 to 2:1. Other catalyst system compositions are readily apparent and contemplated from the present disclosure.

Generally, the catalyst system can be prepared in any manner which can produce an active catalyst system. In some embodiments, the catalyst system can be prepared prior to contacting the catalyst system with the olefin(s) to be trimerized. In other embodiments, at least one of catalyst system components (the transition metal compound, the nitrogen containing compound, the metal hydrocarbyl compound, or the optional halogen containing compound) can contact the olefin(s) to be trimerized prior to at least one other catalyst system component contacting the olefin(s) to be trimerized. Generally, the components of the catalyst system are independently described herein and can be utilized without limitation to further describe the process(es) to prepare the catalyst system.

In an aspect, the process of preparing the catalyst system can comprise contacting two or more of a) a transition metal compound (e.g., a chromium(III) $C_3$-$C_{25}$ carboxylate composition, among others described herein), b) the nitrogen containing compound (e.g., pyrrole compound, among others described herein), c) a metal hydrocarbyl compound (e.g., a non-halide metal hydrocarbyl compound, a hydrocarbyl metal halide, or any combination thereof), and d) an optional halogen containing compound (e.g. an inorganic metal halide, a hydrocarbyl metal halide, a combination of a inorganic halide and a non-halide metal hydrocarbyl, or a combination of a hydrocarbyl metal halide and a non-halide metal hydrocarbyl, or an organic halide, among others described herein) in the presence of an unsaturated organic compound. In an embodiment, the transition metal compound (or mixtures comprising the transition metal compound) and the nitrogen containing compound (or mixtures comprising the nitrogen containing compound) can be contacted in the presence of an unsaturated organic compound; alternatively, the transition metal compound (or mixtures comprising the transition metal compound), and the metal hydrocarbyl compound (or mixtures comprising the metal hydrocarbyl compound) can be contacted in the presence of an unsaturated organic compound; or alternatively, the transition metal compound (or mixtures comprising the transition metal compound), the nitrogen containing compound (or mixtures comprising the nitrogen containing compound), and the metal hydrocarbyl compound (or mixtures comprising the metal hydrocarbyl compound) can be contacted in the presence of an unsaturated organic compound. In some embodiments, the unsaturated organic compound can be a component of a composition comprising the transition metal compound, a composition comprising the nitrogen containing compound, a composition comprising the metal hydrocarbyl compound, a composition comprising the halogen containing compound, or any combination thereof; alternatively, a composition comprising the transition metal compound; alternatively, a composition comprising the nitrogen containing compound; alternatively, a composition comprising the metal hydrocarbyl compound; or alternatively, a composition comprising the halogen containing compound. The unsaturated organic compound is independently disclosed herein and any aspect or embodiment of the unsaturated organic compound thereof can be utilized to further described a process of preparing the catalyst system can comprising contacting two or more components of the catalyst system in the presence of an unsaturated organic compound.

In an aspect, the process for preparing the catalyst system can be conducted in a manner wherein at least one catalyst system component (the transition metal compound, the nitrogen containing compound, the metal hydrocarbyl compound, or the optional halogen containing compound) can be contacted with at least one of the other components of the catalyst system in the presence of an unsaturated organic compound. In an aspect, the process for preparing the catalyst system can be conducted in a manner wherein each catalyst system component (the transition metal compound, the nitrogen containing compound, the metal hydrocarbyl compound, and when utilized the optional halogen containing compound) and an unsaturated organic compound can be contacted substantially simultaneously (alternatively, contacted simultaneously; or alternatively, any contacted simultaneously percentage described herein); alternatively, each catalyst system component (the transition metal compound, the nitrogen containing compound, the metal hydrocarbyl compound, and when utilized the optional halogen containing compound) can be contacted substantially simultaneously (alternatively, contacted simultaneously; or alternatively, any contacted simultaneously percentage described herein) with an unsaturated organic compound; or alternatively, each catalyst system component (the transition metal compound, the nitrogen containing compound, the metal hydrocarbyl compound, and when utilized the optional halogen containing compound) can be substantially simultaneously (alternatively, contacted simultaneously; or alternatively, any contacted simultaneously percentage described herein) added to an unsaturated organic compound. In yet another aspect, the process of preparing the catalyst system can be conducted in a manner wherein at least one catalyst system component (the transition metal compound, the nitrogen containing compound, the metal hydrocarbyl compound, or the optional halogen containing compound) can be contacted with the unsaturated organic compound prior to contacting at least one other catalyst system component with an unsaturated organic compound.

In relation to aspects and embodiments wherein the transition metal compound and the metal hydrocarbyl compound are contacted in the presence of the unsaturated organic compound, wherein the transition metal compound contacts the unsaturated organic compound prior to the transition metal compound and the hydrocarbyl compound being contacted, or wherein the metal hydrocarbyl compound contacts the unsaturated organic compound prior to the transition metal compound and the hydrocarbyl compound being contacted, these conditions can be implemented for the initial contact of the catalyst system components and any subsequent separate addition of the catalyst system components during the catalyst system preparation process.

In a non-limiting embodiment wherein the transition metal compound is a chromium(III) $C_3$-$C_{25}$ carboxylate composition, the nitrogen containing compound is a pyrrole compound, and the metal hydrocarbyl compound is an hydrocarbyl aluminum compound (e.g. a trihydrocarbylaluminum, a hydrocarbylaluminum halide, or any combination thereof), the process for preparing the catalyst system can be conducted in a manner wherein the chromium(III) $C_3$-$C_{25}$ carboxylate composition, the pyrrole compound, and the hydrocarbylaluminum compound can be contacted substantially simultaneously (alternatively, contacted simultaneously; or alternatively, any contacted simultaneously percentage described herein) in the presence of the unsaturated organic compound; alternatively, wherein the chromium(III) $C_3$-$C_{25}$ carboxylate composition, the pyrrole compound, the hydrocarbylaluminum compound, and the unsaturated organic compound can be contacted substantially simultaneously (alternatively, contacted simultaneously; or alternatively, any contacted simultaneously percentage described herein); alternatively, wherein the chromium(III) $C_3$-$C_{25}$ carboxylate composition, the pyrrole compound, and the hydrocarbylaluminum compound can be contacted substantially simultaneously (alternatively, contacted simultaneously; or alternatively, any contacted simultaneously percentage described herein) with an unsaturated organic compound; or alternatively, wherein the chromium(III) $C_3$-$C_{25}$ carboxylate composition, the pyrrole compound, and the hydrocarbylaluminum compound can be substantially simultaneously (alternatively, contacted simultaneously; or alternatively, any contacted simultaneously percentage described herein) added to the unsaturated organic compound. In a non-limiting embodiment, wherein the transition metal compound is a chromium(III) $C_3$-$C_{25}$ carboxylate composition, the nitrogen containing compound is a pyrrole compound, the metal hydrocarbyl compound is an non-halide aluminum hydrocarbyl compound (e.g. a trihydrocarbylaluminum, among others) and the halogen containing compound is a Group 3, Group 4, Group 5, Group 6 excluding Cr, Group 13, or Group 14, metal halide compound, or a Group 13, Group 14, or Group 15 non-metal halide, the process for preparing the catalyst system can be conducted in a manner wherein the chromium(III) $C_3$-$C_{25}$ carboxylate composition, the pyrrole compound, the non-halide aluminum hydrocarbyl compound, and the halogen containing compound can be contacted substantially simultaneously (alternatively, contacted simultaneously; or alternatively, any contacted simultaneously percentage described herein) in the presence of the unsaturated organic compound; alternatively, wherein the chromium(III) $C_3$-$C_{25}$ carboxylate composition, the pyrrole compound, the non-halide aluminum hydrocarbyl compound, the halogen containing compound and the unsaturated organic compound can be contacted substantially simultaneously (alternatively, contacted simultaneously; alternatively, any contacted simultaneously percentage described herein); alternatively, wherein the chromium(III) $C_3$-$C_{25}$ carboxylate composition, the pyrrole compound, the non-halide aluminum hydrocarbyl compound, and the halogen containing compound can be contacted substantially simultaneously (alternatively, contacted simultaneously; or alternatively, any contacted simultaneously percentage described herein) with an unsaturated organic compound; or alternatively, wherein the chromium (III) $C_3$-$C_{25}$ carboxylate composition, the pyrrole compound, the non-halide aluminum hydrocarbyl compound, and the halogen containing compound can be substantially simultaneously (alternatively, contacted simultaneously; or alternatively, any contacted simultaneously percentage described herein) added to an unsaturated organic compound.

In an aspect, the process of preparing the catalyst system can be conducted in a manner wherein the transition metal compound and the metal hydrocarbyl compound are contacted in the presence of an unsaturated organic compound. In an embodiment, the process for preparing the catalyst system can be conducted in an manner wherein the transition metal compound and the metal hydrocarbyl compound are not contacted prior to contacting the unsaturated organic compound; alternatively, the transition metal compound does not contact the unsaturated organic compound prior to the metal hydrocarbyl contacting the unsaturated organic compound; or alternatively, the metal hydrocarbyl compound does not contact the unsaturated organic compound prior to the transition metal compound contacting the unsaturated organic compound. In some embodiments, the process of preparing the catalyst system can be conducted in a manner wherein the transition metal compound can be contacted with the unsaturated organic compound and the metal hydrocarbyl compound can be contacted with the unsaturated organic compound prior to the transition metal compound and the hydrocarbyl compound being contacted.

Within these aspects and embodiments where the transition metal compound and the metal hydrocarbyl compound contact each other in the presence of the unsaturated organic compound and any other applicable aspects and embodiments, the transition metal compound (whether or not it has been previously been contacted with the unsaturated organic compound) can be added to the metal hydrocarbyl compound (whether or not it has been previously been contacted with the unsaturated organic compound); alternatively, the metal hydrocarbyl compound (whether or not it has been previously been contacted with the unsaturated organic compound) can be added to the transition metal compound (whether or not it has been previously been contacted with the unsaturated organic compound); or alternatively, the transition metal compound (whether or not it has been previously been contacted with the unsaturated organic compound) and the metal hydrocarbyl compound (whether or not it has been previously been contacted with the unsaturated organic compound) can be contacted substantially simultaneously (alternatively, contacted simultaneously; or alternatively, any contacted simultaneously percentage described herein). In other embodiments, the process for preparing the catalyst system can be conducted in an manner wherein the unsaturated organic compound, the transition metal compound, and the metal hydrocarbyl compound can be contacted substantially simultaneously (alternatively, contacted simultaneously; or alternatively, any contacted simultaneously percentage described herein); alternatively, conducted in a manner wherein the transition metal compound and the metal hydrocarbyl compound can be contacted substantially simultaneously (alternatively, contacted simultaneously; or alternatively, any contacted simultaneously percentage described herein) with the unsaturated organic compound; or alternatively, conducted in a manner wherein the transition metal compound and the metal hydrocarbyl compound can be substantially simultaneously (alternatively, contacted simultaneously; or alternatively, any contacted simultaneously percentage described herein) added to the unsaturated organic compound.

In any aspect or embodiment wherein the process of preparing a catalyst system can be conducted in an manner wherein the transition metal compound and the metal hydrocarbyl compound contact each other in the presence of the unsaturated organic compound, the transition metal compound can be contacted with any other component of the catalyst system (to form a mixture comprising the transition metal compound) prior to contacting the transition metal compound and the metal hydrocarbyl compound; alternatively, the metal hydrocarbyl compound can be contacted with any other component of the catalyst system (to form a mixture comprising the metal hydrocarbyl compound) prior to the contacting the transition metal compound and the metal hydrocarbyl compound; or alternatively, the transition metal compound can be contacted with any other component of the catalyst system (to form a mixture comprising the transition metal compound) and the metal hydrocarbyl compound can be contacted with any other component of the catalyst system (to form a mixture comprising the metal hydrocarbyl compound) prior to the contact of the transition metal compound and the metal hydrocarbyl compound. Mixtures comprising the transition metal compound and the methods for preparing the mixtures comprising the transition metal compound are described herein and can be utilized in any manner consistent with any process of preparing the catalyst system including a feature that the transition metal compound and the metal hydrocarbyl compound contact each other in the presence of the unsaturated organic compound. Mixtures comprising the metal hydrocarbyl compound and the methods for preparing the mixtures comprising the metal hydrocarbyl compound mixtures are described herein and can be utilized in any manner consistent with any process of preparing the catalyst system aspect or embodiment including a feature that the transition metal compound and the metal hydrocarbyl compound contact each other in the presence of the olefin to be trimerized.

In an aspect, the process of preparing the catalyst system can comprise contacting substantially simultaneously (alternatively, contacted simultaneously; or alternatively, any contacted simultaneously percentage described herein) the components of the catalyst system. In an embodiment, the components of the catalyst system can be contacted substantially simultaneously (alternatively, contacted simultaneously; or alternatively, any contacted simultaneously percentage described herein) with a previously prepared catalyst system. In a non-limiting example, the process of preparing the catalyst system can comprise contacting substantially simultaneously (alternatively, contacted simultaneously; or alternatively, any contacted simultaneously percentage described herein) a) a transition metal compound (e.g., a chromium(III) $C_3$-$C_{25}$ carboxylate composition, among others described herein), b) a nitrogen containing compound (e.g., pyrrole compound, among others described herein), and c) a metal hydrocarbyl compound (e.g., a non-halide metal hydrocarbyl compound, a hydrocarbyl metal halide, or any combination thereof). In another non-limiting example, the process of preparing the catalyst system can comprise contacting substantially simultaneously (alternatively, contacted simultaneously; or alternatively, any contacted simultaneously percentage described herein) a) a transition metal compound (e.g., a chromium (III) $C_3$-$C_{25}$ carboxylate composition, among others described herein), b) a nitrogen containing compound (e.g., a pyrrole compound, among others described herein), c) a non-halide metal hydrocarbyl compound (e.g. a trialkylaluminum, among others described herein), and d) a halogen containing compound (e.g. an inorganic metal halide, a hydrocarbyl metal halide, a combination of a inorganic halide and a non-halide metal hydrocarbyl, or a combination of a hydrocarbyl metal halide and a non-halide metal hydrocarbyl, or an organic halide, among others described herein). In some substantially simultaneous contact embodiments (alternatively, contacted simultaneously embodiments; or alternatively, any contacted simultaneously percentage embodiments described herein), at least a portion of (alternatively, a portion of; or alternatively, all of) a non-halide metal hydrocarbyl compound can be contact with the transition metal compound and/or the nitrogen containing compound before the substantially simultaneous contact (alternatively, simultaneously contacted; or alternatively, any simultaneously contacted percentage described herein) with a metal hydrocarbyl compound (e.g., the remaining non-halide metal hydrocarbyl compound, a hydrocarbyl metal halide, or any combination thereof). In some substantially simultaneous contact embodiments (alternatively, contacted simultaneously embodiments; or alternatively, any contacted simultaneously percentage embodiments described herein), at least a portion of (alternatively, a portion of; or alternatively, all of) a non-halide metal hydrocarbyl compound can be contact with the transition metal compound and/or the nitrogen containing compound before the substantially simultaneous contact (alternatively, simultaneously contacted; or alternatively, any simultaneously contacted percentage described herein) a metal hydrocarbyl compound (e.g., the remaining non-halide metal hydrocarbyl compound, a hydrocarbyl metal halide, or any combination thereof) and a halide containing compound (e.g. an inorganic metal halide, a hydrocarbyl metal halide, a combination of a inorganic halide and a non-halide metal hydrocarbyl, or a combination of a hydrocarbyl metal halide and a non-halide metal hydrocarbyl, among others described herein). Generally, these substantially simultaneous (alternatively, contacted simultaneously; or alternatively, any contacted simultaneously percentage described herein) processes can produce the catalyst system; or alternatively, can produce the catalyst under conditions capable of forming the catalyst system.

In any substantially simultaneous contacted embodiment (alternatively, contacted simultaneously embodiment; or alternatively, any contacted simultaneously percentage embodiment described herein), the components of the catalyst system can be substantially simultaneously contacted (alternatively, simultaneously contacted; or alternatively, any simultaneously contacted percentage described herein) in the presence of an unsaturated organic compound. In some substantially simultaneous contact embodiments (alternatively, simultaneously contacted; or alternatively, any simultaneously contacted percentage described herein), an unsaturated organic compound can be a separate stream substantially simultaneously contacted (alternatively, simultaneously contacted; or alternatively, any simultaneously contacted percentage described herein) with the components of the catalyst system. In other substantially simultaneous contact embodiments (alternatively, simultaneously contacted embodiments; or alternatively, any simultaneously contacted percentage embodiments described herein), the unsaturated organic compound can be contained in a mixture with one of the components (or in multiple mixtures comprising a component) of the catalyst system. In yet other substantially simultaneous contact embodiments (alternatively, simultaneously contacted embodiments; or alternatively, any simultaneously contacted percentage embodiments described herein), the components of the catalyst system can be substantially simultaneous contacted (alternatively, simultaneously contacted; or alternatively, any simultaneously contacted percentage described herein) with a composition comprising, or consisting essentially of, the unsaturated organic compound.

In an aspect, the process of preparing the catalyst system can comprise contacting the nitrogen containing compound (e.g., a pyrrole compound, among others described herein), the metal hydrocarbyl compound (e.g., a non-halide metal hydrocarbyl compound, a hydrocarbyl metal halide, or any combination thereof), and (when present) the optional halogen containing compound (e.g. an inorganic metal halide, a hydrocarbyl metal halide, a combination of a inorganic halide and a non-halide metal hydrocarbyl, or a combination of a hydrocarbyl metal halide and a non-halide metal hydrocarbyl, or an organic halide, among others described herein) to form a mixture and contacting the mixture with transition metal compound (e.g., a chromium(III) $C_3$-$C_{25}$ carboxylate composition, among others described herein) to produce the catalyst system. In an embodiment, the process of preparing the catalyst system can comprise i) contacting the nitrogen containing compound and the metal hydrocarbyl compound to form a nitrogen containing compound/metal hydrocarbyl compound mixture and ii) contacting the transition metal compound with the nitrogen containing compound/metal hydrocarbyl compound mixture to produce the catalyst system; or alternatively, i) contacting the nitrogen containing compound, the metal hydrocarbyl compound, and the halogen containing compound to form a nitrogen containing compound/metal hydrocarbyl compound/halogen containing compound mixture and ii) contacting the transition metal compound with the nitrogen containing compound/metal hydrocarbyl compound/halogen containing compound mixture to produce the catalyst system. In some embodiments, the process of preparing the catalyst system can comprise i) contacting at least a portion of (alternatively, a portion of; or alternatively, all of) a non-halide metal hydrocarbyl compound with the transition metal compound to form a transition metal compound/non-halide metal hydrocarbyl compound mixture and ii) contacting the transition metal compound/non-halide metal hydrocarbyl compound mixture with the nitrogen containing compound/metal hydrocarbyl compound mixture (or the nitrogen containing compound/metal hydrocarbyl compound/halogen containing compound mixture) to produce the catalyst system. In other embodiments, the process of preparing the catalyst system can comprise i) contacting at least a portion of (alternatively, a portion of or alternatively, all of) a non-halide metal hydrocarbyl compound with the nitrogen containing compound to form a nitrogen containing compound/non-halide metal hydrocarbyl compound mixture and ii) contacting the nitrogen containing compound/non-halide metal hydrocarbyl compound mixture with the metal hydrocarbyl compound (or the metal hydrocarbyl compound and the halogen containing compound) to form the nitrogen containing compound/metal hydrocarbyl compound mixture (or the nitrogen containing compound/metal hydrocarbyl compound/halogen containing compound mixture) to produce the catalyst system. In yet another embodiment, the process of preparing the catalyst system can comprise i) contacting a portion of a non-halide metal hydrocarbyl compound with the nitrogen containing compound to form a nitrogen containing compound/non-halide metal hydrocarbyl compound mixture and ii) contacting the nitrogen containing compound/non-halide metal hydrocarbyl compound mixture with the metal hydrocarbyl compound (or the metal hydrocarbyl compound and the halogen containing compound) to form the nitrogen containing compound/metal hydrocarbyl compound mixture (or the nitrogen containing compound/metal hydrocarbyl compound/halogen containing compound mixture), iii) contacting a portion of a non-halide metal hydrocarbyl compound with the transition metal compound to form a transition metal compound/non-halide metal hydrocarbyl compound mixture, and iv) contacting the transition metal compound/non-halide metal hydrocarbyl compound mixture with the nitrogen containing compound/metal hydrocarbyl compound mixture (or the nitrogen containing compound/metal hydrocarbyl compound/halogen containing compound mixture) to produce the catalyst system.

In an embodiment, the nitrogen containing compound/metal hydrocarbyl compound mixture (or the nitrogen containing compound/metal hydrocarbyl compound/halogen containing compound mixture) can be added to the transition metal compound; alternatively, the transition metal compound can be added to the nitrogen containing compound/metal hydrocarbyl compound mixture (or the nitrogen containing compound/metal hydrocarbyl compound/halogen containing compound mixture); or alternatively, the nitrogen containing compound/metal hydrocarbyl compound mixture (or the nitrogen containing compound/metal hydrocarbyl compound/halogen containing compound mixture) and the transition metal compound can be substantially simultaneously contacted (alternatively, contacted simultaneously; or alternatively, any contacted simultaneously percentage described herein). In another embodiment, the nitrogen containing compound/metal hydrocarbyl compound mixture (or the nitrogen containing compound/metal hydrocarbyl compound/halogen containing compound mixture) can be added to the transition metal compound/non-halide metal hydrocarbyl compound mixture; alternatively, the transition metal compound/non-halide metal hydrocarbyl compound mixture can be added to the nitrogen containing compound/metal hydrocarbyl compound mixture (or the nitrogen containing compound/metal hydrocarbyl compound/halogen containing compound mixture); or alternatively, the nitrogen containing compound/metal hydrocarbyl compound mixture (or the nitrogen containing compound/metal hydrocarbyl compound/halogen containing compound mixture) and the transition metal compound/non-halide metal hydrocarbyl mixture can be substantially simultaneously contacted (alternatively, contacted simultaneously; or alternatively, any contacted simultaneously percentage described herein). In yet another embodiment, the nitrogen containing compound/non-halide metal hydrocarbyl compound/metal hydrocarbyl compound mixture (or the nitrogen containing compound/non-halide metal hydrocarbyl compound/metal hydrocarbyl compound/halogen containing compound mixture) can be added to the transition metal compound; alternatively, the transition metal compound can be added to the nitrogen containing compound/non-halide metal hydrocarbyl compound/metal hydrocarbyl compound mixture (or the nitrogen containing compound/non-halide metal hydrocarbyl compound/metal hydrocarbyl compound/halogen containing compound mixture); or alternatively, the nitrogen containing compound/non-halide metal hydrocarbyl compound/metal hydrocarbyl compound mixture (or the nitrogen containing compound/non-halide metal hydrocarbyl compound/metal hydrocarbyl compound/halogen containing compound mixture) and the transition metal compound can be substantially simultaneously contacted (alternatively, contacted simultaneously; or alternatively, any contacted simultaneously percentage described herein). In a further embodiment, the nitrogen containing compound/metal hydrocarbyl compound mixture (or the nitrogen containing compound/metal hydrocarbyl compound/halogen containing compound mixture) can be added to the transition metal compound/non-halide metal hydrocarbyl compound mixture; alternatively, the transition metal compound/non-halide metal hydrocarbyl compound mixture can be added to the nitrogen containing compound/metal hydrocarbyl compound mixture (or the nitrogen containing compound/metal hydrocarbyl compound/halogen containing compound mixture); or alternatively, the nitrogen containing compound/metal hydrocarbyl compound mixture (or the nitrogen containing compound/metal hydrocarbyl compound/halogen containing compound mixture) and the transition metal compound/non-halide metal hydrocarbyl compound mixture can be substantially simultaneously contacted (alternatively, contacted simultaneously; or alternatively, any contacted simultaneously percentage described herein). In yet a further embodiment, the nitrogen containing compound/non-halide metal hydrocarbyl compound/metal hydrocarbyl compound mixture (or the nitrogen containing compound/non-halide metal hydrocarbyl compound/metal hydrocarbyl compound/halogen containing compound mixture) can be added to the transition metal compound/non-halide metal hydrocarbyl compound mixture; alternatively, the transition metal compound/non-halide metal hydrocarbyl compound mixture can be added to the nitrogen containing compound/non-halide metal hydrocarbyl compound/metal hydrocarbyl compound mixture (or the nitrogen containing compound/non-halide metal hydrocarbyl compound/metal hydrocarbyl compound/halogen containing compound mixture); or alternatively, the nitrogen containing compound/non-halide metal hydrocarbyl compound/metal hydrocarbyl compound mixture (or the nitrogen containing compound/non-halide metal hydrocarbyl compound/metal hydrocarbyl compound/halogen containing compound mixture) and the transition metal compound/non-halide metal hydrocarbyl compound mixture can be substantially simultaneously contacted (alternatively, contacted simultaneously; or alternatively, any contacted simultaneously percentage described herein).

In an aspect, the process of preparing the catalyst system can comprise contacting the transition metal compound (e.g., a chromium(III) $C_3$-$C_{25}$ carboxylate composition, among others described herein), and the nitrogen containing compound (e.g., a pyrrole compound, among others described herein) to form a transition metal compound/nitrogen containing compound mixture and contacting the transition metal compound/nitrogen containing compound mixture with the metal hydrocarbyl compound (e.g., a non-halide metal hydrocarbyl compound, a hydrocarbyl metal halide, or any combination thereof) to produce the catalyst system. In an embodiment, the transition metal compound and the nitrogen containing compound can be contacted prior to the transition metal compound contacting the metal hydrocarbyl compound. In another aspect, the process of preparing the catalyst system can comprise contacting a transition metal compound (e.g., a chromium(III) $C_3$-$C_{25}$ carboxylate composition, among others described herein), a nitrogen containing compound (e.g., a pyrrole compound, among others described herein), and a non-halide metal hydrocarbyl compound (e.g., a trialkylaluminum compound, among others) to form a transition metal compound/nitrogen containing compound/non-halide metal hydrocarbyl compound mixture and contacting the transition metal compound/nitrogen containing compound/non-halide metal hydrocarbyl compound mixture with the metal hydrocarbyl compound (e.g., a non-halide metal hydrocarbyl compound, a hydrocarbyl metal halide, or any combination thereof) to produce the catalyst system. In an embodiment, the transition metal compound/nitrogen containing compound mixture (or the transition metal compound/nitrogen containing compound/non-halide metal hydrocarbyl compound mixture) can be added to the metal hydrocarbyl compound; alternatively, the metal hydrocarbyl compound can be added to the transition metal compound/nitrogen containing compound mixture (or the transition metal compound/nitrogen containing compound/non-halide metal hydrocarbyl compound mixture); or alternatively, the metal hydrocarbyl compound and the transition metal compound/nitrogen containing compound mixture (or the transition metal compound/nitrogen containing compound/non-halide metal hydrocarbyl compound mixture) can be substantially simultaneously contacted (alternatively, contacted simultaneously; or alternatively, any contacted simultaneously percentage described herein).

In an aspect, the process of preparing the catalyst system can comprise contacting a transition metal compound (e.g., a chromium(III) $C_3$-$C_{25}$ carboxylate composition, among others described herein), a nitrogen containing compound (e.g., a pyrrole compound, among others described herein), and a halogen containing compound (e.g. an inorganic metal halide, a hydrocarbyl metal halide, a combination of an inorganic halide and a non-halide metal hydrocarbyl, or a combination of a hydrocarbyl metal halide and a non-halide metal hydrocarbyl, among others described herein) to form a transition metal compound/nitrogen containing compound/halogen containing compound mixture and contacting the transition metal compound/nitrogen containing compound/halogen containing compound mixture with the metal hydrocarbyl compound (e.g., a non-halide metal hydrocarbyl compound, a hydrocarbyl metal halide, or any combination thereof) to produce the catalyst system. In an embodiment, the transition metal compound, the nitrogen containing compound, and the halogen containing compound can be contacted prior to the transition metal compound contacting the metal hydrocarbyl compound. In another aspect, the process of preparing the catalyst system can comprise contacting a transition metal compound (e.g., a chromium(III) $C_3$-$C_{25}$ carboxylate composition, among others described herein), a nitrogen containing compound (e.g., a pyrrole compound, among others described herein), a non-halide metal hydrocarbyl compound (e.g., a trialkylaluminum compound, among others), and a halogen containing compound (e.g. an inorganic metal halide, a hydrocarbyl metal halide, a combination of an inorganic halide and a non-halide metal hydrocarbyl, or a combination of a hydrocarbyl metal halide and a non-halide metal hydrocarbyl, among others described herein) to form a transition metal compound/nitrogen containing compound/non-halide metal hydrocarbyl compound/halogen containing compound mixture and contacting the transition metal compound/nitrogen containing compound/non-halide metal hydrocarbyl compound/halogen containing compound mixture with the metal hydrocarbyl compound (e.g., a non-halide metal hydrocarbyl compound, a hydrocarbyl metal halide, or any combination thereof) to produce the catalyst system. In an embodiment, the transition metal compound/nitrogen containing compound/halogen containing compound mixture (or the transition metal compound/nitrogen containing compound/non-halide metal hydrocarbyl compound/halogen containing compound mixture) can be added to the metal hydrocarbyl compound; alternatively, the metal hydrocarbyl compound can be added to the transition metal compound/nitrogen containing compound/halogen containing compound mixture (or the transition metal compound/nitrogen containing compound/non-halide metal hydrocarbyl compound/halogen containing compound mixture); or alternatively, the transition metal compound/nitrogen containing compound/halogen containing compound mixture (or the transition metal compound/nitrogen containing compound/non-halide metal hydrocarbyl compound/halogen containing compound mixture) can be substantially simultaneously contacted (alternatively, contacted simultaneously; or alternatively, any contacted simultaneously percentage described herein) with the metal hydrocarbyl compound.

In any aspect or embodiment calling for a nitrogen containing compound/metal hydrocarbyl compound/halogen containing compound mixture (or a nitrogen containing compound/non-halide metal hydrocarbyl compound/metal hydrocarbyl compound/halogen containing compound mixture), the nitrogen containing compound (or the nitrogen containing compound/non-halide metal hydrocarbyl compound mixture), the metal hydrocarbyl compound, and the halogen containing compound can be contacted in any manner consistent with the particular process to produce the nitrogen containing compound/metal hydrocarbyl compound/halogen containing compound mixture (or a nitrogen containing compound/non-halide metal hydrocarbyl/metal hydrocarbyl compound/halogen containing compound mixture) and/or the particular process for trimerizing an olefin. In a non-limiting embodiment, a nitrogen containing compound (or a nitrogen containing compound/non-halide metal hydrocarbyl compound mixture), a metal hydrocarbyl compound, and a halogen containing compound can be contacted substantially simultaneously (alternatively, contacted simultaneously; or alternatively, any contacted simultaneously percentage described herein). In another non-limiting embodiment, a nitrogen containing compound/metal hydrocarbyl compound mixture (or a nitrogen containing compound/non-halide metal hydrocarbyl/metal hydrocarbyl compound mixture) can be added to a halogen containing compound; alternatively, a halogen containing compound can be added to a nitrogen containing compound/metal hydrocarbyl compound mixture (or a nitrogen containing compound/non-halide metal hydrocarbyl/metal hydrocarbyl compound mixture); or alternatively, nitrogen containing compound/metal hydrocarbyl compound mixture (or a nitrogen containing compound/non-halide metal hydrocarbyl/metal hydrocarbyl compound mixture) and a halogen containing compound can be contacted substantially simultaneously (alternatively, contacted simultaneously; or alternatively, any contacted simultaneously percentage described herein). In yet another non-limiting embodiment, a nitrogen containing compound/halogen containing compound mixture (or a nitrogen containing compound/non-halide metal hydrocarbyl/halogen containing compound mixture) can be added to a metal hydrocarbyl compound; alternatively, a metal hydrocarbyl compound can be added to a nitrogen containing compound/halogen containing compound mixture (or a nitrogen containing compound/non-halide metal hydrocarbyl/halogen containing compound mixture); or alternatively, nitrogen containing compound/halogen containing compound mixture (or a nitrogen containing compound/non-halide metal hydrocarbyl/halogen containing compound mixture) and a metal hydrocarbyl compound can be contacted substantially simultaneously (alternatively, contacted simultaneously; or alternatively, any contacted simultaneously percentage described herein). In a further non-limiting embodiment, a metal hydrocarbyl/halogen containing compound mixture can be added to a nitrogen containing compound (or a nitrogen containing compound/non-halide metal hydrocarbyl mixture); alternatively, a nitrogen containing compound (or a nitrogen containing compound/non-halide metal hydrocarbyl mixture) can be added to a metal hydrocarbyl/halogen containing compound mixture; or alternatively, nitrogen containing compound (or a nitrogen containing compound/non-halide metal hydrocarbyl mixture) and a metal hydrocarbyl/halogen containing compound mixture can be contacted substantially simultaneously (alternatively, contacted simultaneously; or alternatively, any contacted simultaneously percentage described herein).

In any aspect or embodiment calling for a transition metal compound/nitrogen containing compound/halogen containing compound mixture (or a transition metal compound/nitrogen containing compound/non-halide metal hydrocarbyl compound/halogen containing compound mixture), the transition metal compound, the nitrogen containing compound, and the halogen containing compound (or the transition metal compound, the nitrogen containing compound, the non-halide metal hydrocarbyl compound, and the halogen containing compound mixture) can be contacted in any manner consistent with the particular process to produce the transition metal compound/nitrogen containing compound/halogen containing compound mixture (or a transition metal compound/nitrogen containing compound/non-halide metal hydrocarbyl compound/halogen containing compound mixture) and/or the particular process for trimerizing an olefin. In a non-limiting embodiment, a transition metal compound, a nitrogen containing compound, and a halogen containing compound can be contacted substantially simultaneously (alternatively, contacted simultaneously; or alternatively, any contacted simultaneously percentage described herein). In another non-limiting embodiment, a transition metal compound/non-halide metal hydrocarbyl mixture, a nitrogen containing compound, and a halogen containing compound can be contacted substantially simultaneously (alternatively, contacted simultaneously; or alternatively, any contacted simultaneously percentage described herein); alternatively, a transition metal compound, a nitrogen containing compound/non-halide metal hydrocarbyl mixture, and a halogen containing compound can be contacted substantially simultaneously (alternatively, contacted simultaneously; or alternatively, any contacted simultaneously percentage described herein); or alternatively, a transition metal compound/non-halide metal hydrocarbyl mixture, a nitrogen containing compound/non-halide metal hydrocarbyl mixture, and a halogen containing compound can be contacted substantially simultaneously (alternatively, contacted simultaneously; or alternatively, any contacted simultaneously percentage described herein). In yet another non-limiting embodiments, a transition metal compound/nitrogen containing compound mixture (or a transition metal compound/nitrogen containing compound/non-halide metal hydrocarbyl compound mixture) can be added to a halogen containing compound; alternatively, a halogen containing compound can be added to a transition metal compound/nitrogen containing compound mixture (or a transition metal compound/nitrogen containing compound/non-halide metal hydrocarbyl compound mixture); or alternatively, a transition metal compound/nitrogen containing compound mixture (or a transition metal compound/nitrogen containing compound/non-halide metal hydrocarbyl compound mixture) and a halogen containing compound can be contacted substantially simultaneously (alternatively, contacted simultaneously; or alternatively, any contacted simultaneously percentage described herein). In some non-limiting embodiments, a transition metal compound/halogen containing compound mixture (or a transition metal compound/non-halide metal hydrocarbyl compound/halogen containing compound mixture) can be added to a nitrogen containing compound; alternatively, a nitrogen containing compound can be added to a transition metal compound/halogen containing compound mixture (or a transition metal compound/non-halide metal hydrocarbyl compound/halogen containing compound mixture); or alternatively, a transition metal compound/halogen containing compound mixture (or a transition metal compound/non-halide metal hydrocarbyl compound/halogen containing compound mixture) and a nitrogen containing compound can be contacted substantially simultaneously (alternatively, contacted simultaneously; or alternatively, any contacted simultaneously percentage described herein). In other non-limiting embodiments, a transition metal compound/halogen containing compound mixture (or a transition metal compound/non-halide metal hydrocarbyl compound/halogen containing compound mixture) can be added to a nitrogen containing compound/non-halide metal hydrocarbyl compound mixture; alternatively, a nitrogen containing compound/non-halide metal hydrocarbyl compound mixture can be added to a transition metal compound/halogen containing compound mixture (or a transition metal compound/non-halide metal hydrocarbyl compound/halogen containing compound mixture); or alternatively, a transition metal compound/halogen containing compound mixture (or a transition metal compound/non-halide metal hydrocarbyl compound/halogen containing compound mixture) and a nitrogen containing compound/non-halide metal hydrocarbyl compound mixture can be contacted substantially simultaneously (alternatively, contacted simultaneously; or alternatively, any contacted simultaneously percentage described herein). In some non-limiting embodiments, a nitrogen containing compound/halogen containing compound mixture (or a nitrogen containing compound/non-halide metal hydrocarbyl compound/halogen containing compound mixture) can be added to a transition metal compound; alternatively, a transition metal compound can be added to a nitrogen containing compound/halogen containing compound mixture (or a nitrogen containing compound/non-halide metal hydrocarbyl compound/halogen containing compound mixture); or alternatively, a nitrogen containing compound/halogen containing compound mixture (or a nitrogen containing compound/non-halide metal hydrocarbyl compound/halogen containing compound mixture) and a transition metal compound can be contacted substantially simultaneously (alternatively, contacted simultaneously; or alternatively, any contacted simultaneously percentage described herein). In other non-limiting embodiments, a nitrogen containing compound/halogen containing compound mixture (or a nitrogen containing compound/non-halide metal hydrocarbyl compound/halogen containing compound mixture) can be added to a transition metal compound/non-halide metal hydrocarbyl compound mixture; alternatively, a transition metal compound/non-halide metal hydrocarbyl compound mixture can be added to a nitrogen containing compound/halogen containing compound mixture (or a nitrogen containing compound/non-halide metal hydrocarbyl compound/halogen containing compound mixture); or alternatively, a nitrogen containing compound/halogen containing compound mixture (or a nitrogen containing compound/non-halide metal hydrocarbyl compound/halogen containing compound mixture) and a transition metal compound/non-halide metal hydrocarbyl compound mixture can be contacted substantially simultaneously (alternatively, contacted simultaneously; or alternatively, any contacted simultaneously percentage described herein).

In any aspect or embodiment calling for a transition metal compound/nitrogen containing compound/non-halide metal hydrocarbyl compound mixture, the transition metal compound, the nitrogen containing compound, and the non-halide metal hydrocarbyl compound can be contacted in any manner consistent with the particular process to produce the transition metal compound/nitrogen containing compound/non-halide metal hydrocarbyl compound mixture and/or the particular process for trimerizing an olefin. In a non-limiting embodiment, the transition metal compound, the nitrogen containing compound, and the non-halide metal hydrocarbyl compound can be contacted substantially simultaneously (alternatively, contacted simultaneously; or alternatively, any contacted simultaneously percentage described herein). In another non-limiting embodiment, a transition metal compound/non-halide metal hydrocarbyl compound mixture can be added to a nitrogen containing compound; alternatively, a nitrogen containing compound can be added to a transition metal compound/non-halide metal hydrocarbyl compound mixture; or alternatively, a transition metal compound/non-halide metal hydrocarbyl compound mixture and a nitrogen containing compound can be contacted substantially simultaneously (alternatively, contacted simultaneously; or alternatively, any contacted simultaneously percentage described herein). In yet another non-limiting embodiment, a transition metal compound can be added to a nitrogen containing compound/non-halide metal hydrocarbyl compound mixture; alternatively, a nitrogen containing compound/non-halide metal hydrocarbyl compound mixture can be added to a transition metal compound; or alternatively, a transition metal compound and a nitrogen containing compound/non-halide metal hydrocarbyl compound mixture can be contacted substantially simultaneously (alternatively, contacted simultaneously; or alternatively, any contacted simultaneously percentage described herein). In a further non-limiting embodiment, a transition metal compound/non-halide metal hydrocarbyl compound mixture can be added to a nitrogen containing compound/non-halide metal hydrocarbyl compound mixture; alternatively, a nitrogen containing compound/non-halide metal hydrocarbyl compound mixture can be added to a transition metal compound/non-halide metal hydrocarbyl compound mixture; or alternatively, a transition metal compound/non-halide metal hydrocarbyl compound mixture and a nitrogen containing compound/non-halide metal hydrocarbyl compound mixture can be contacted substantially simultaneously (alternatively, contacted simultaneously; or alternatively, any contacted simultaneously percentage described herein). In yet a further non-limiting embodiment, a transition metal compound/nitrogen containing compound mixture can be added to non-halide metal hydrocarbyl compound; alternatively, a non-halide metal hydrocarbyl compound can be added to a transition metal compound/nitrogen containing compound mixture; or alternatively, a transition metal compound/nitrogen containing compound mixture and anon-halide metal hydrocarbyl compound can be contacted substantially simultaneously (alternatively, contacted simultaneously; or alternatively, any contacted simultaneously percentage described herein).

In any aspect or embodiment calling for a nitrogen containing compound/metal hydrocarbyl mixture (or a nitrogen containing compound/non-halide metal hydrocarbyl/metal hydrocarbyl compound mixture), the nitrogen containing compound (or the nitrogen containing compound/non-halide metal hydrocarbyl compound mixture) and the metal hydrocarbyl compound can be contacted in any manner consistent with the particular process to produce the nitrogen containing compound/metal hydrocarbyl mixture (or a nitrogen containing compound/non-halide metal hydrocarbyl/metal hydrocarbyl compound mixture) and/or the particular process for trimerizing an olefin. In a non-limiting embodiment, the nitrogen containing compound (or a nitrogen containing compound/non-halide metal hydrocarbyl compound mixture) and the metal hydrocarbyl compound can be contacted substantially simultaneously (alternatively, contacted simultaneously; or alternatively, any contacted simultaneously percentage described herein); alternatively, the nitrogen containing compound (or a nitrogen containing compound/non-halide metal hydrocarbyl compound mixture) can be added to the metal hydrocarbyl compound; or alternatively, the metal hydrocarbyl compound can be added to the nitrogen containing compound (or a nitrogen containing compound/non-halide metal hydrocarbyl compound mixture).

In any aspect or embodiment calling for a nitrogen containing compound/halogen containing compound mixture (or a nitrogen containing compound/non-halide metal hydrocarbyl/halogen containing compound mixture), the nitrogen containing compound (or the nitrogen containing compound/non-halide metal hydrocarbyl compound mixture) and the halogen containing compound can be contacted in any manner consistent with the particular process to produce the nitrogen containing compound/halogen containing compound mixture (or a nitrogen containing compound/non-halide metal hydrocarbyl/halogen containing compound mixture) and/or the particular process for trimerizing an olefin. In a non-limiting embodiment, a nitrogen containing compound (or a nitrogen containing compound/non-halide metal hydrocarbyl compound mixture) can be added to a halogen containing compound; alternatively, a halogen containing compound can be added to a nitrogen containing compound (or a nitrogen containing compound/non-halide metal hydrocarbyl compound mixture); or alternatively, a nitrogen containing compound (or a nitrogen containing compound/non-halide metal hydrocarbyl compound mixture) and a halogen containing compound can be contacted substantially simultaneously (alternatively, contacted simultaneously; or alternatively, any contacted simultaneously percentage described herein).

In any aspect or embodiment calling for a transition metal compound/nitrogen containing compound mixture, the transition metal compound and nitrogen containing compound can be contacted in any manner consistent with the particular process to produce the transition metal compound/nitrogen containing compound mixture and/or the particular process for trimerizing an olefin. In a non-limiting embodiment, a transition metal compound can be added to a nitrogen containing compound; alternatively, a nitrogen containing compound can be added to a transition metal compound; or alternatively, a transition metal compound and a nitrogen containing compound can be contacted substantially simultaneously (alternatively, contacted simultaneously; or alternatively, any contacted simultaneously percentage described herein).

In any aspect or embodiment calling for a transition metal compound/halogen containing compound mixture (or a transition metal compound/non-halide metal hydrocarbyl compound/halogen containing compound mixture), a transition metal compound (or a transition metal compound/non-halide metal hydrocarbyl compound mixture) and a halogen containing compound can be contacted in any manner consistent with the particular process to produce the transition metal compound/halogen containing compound mixture (or the transition metal compound/non-halide metal hydrocarbyl compound/halogen containing compound mixture and/or the particular process for trimerizing an olefin. In a non-limiting embodiment, a transition metal compound (or a transition metal compound/non-halide metal hydrocarbyl compound mixture) can be added to a halogen containing compound; alternatively, a halogen containing compound can be added to a transition metal compound (or a transition metal compound/non-halide metal hydrocarbyl compound mixture); or alternatively, a transition metal compound (or a transition metal compound/non-halide metal hydrocarbyl compound mixture) and a halogen containing compound can be contacted substantially simultaneously (alternatively, contacted simultaneously; or alternatively, any contacted simultaneously percentage described herein).

In any aspect or embodiment calling for a metal hydrocarbyl compound/halogen containing compound mixture, the metal hydrocarbyl compound and halogen containing compound can be contacted in any manner consistent with the particular process to produce the metal hydrocarbyl compound/halogen containing compound mixture and/or the particular process for trimerizing an olefin. In a non-limiting embodiment, a metal hydrocarbyl compound can be added to a halogen containing compound; alternatively, a halogen containing compound can be added to a metal hydrocarbyl compound; or alternatively, a metal hydrocarbyl compound and a halogen containing compound can be contacted substantially simultaneously (alternatively, contacted simultaneously; or alternatively, any contacted simultaneously percentage described herein).

In any aspect or embodiment calling for a transition metal compound/non-halide metal hydrocarbyl compound mixture, the transition metal compound and non-halide metal hydrocarbyl compound can be contacted in any manner consistent with the particular process to produce the transition metal compound/non-halide metal hydrocarbyl compound mixture and/or the particular process for trimerizing an olefin. In a non-limiting embodiment, a transition metal compound can be added to a non-halide metal hydrocarbyl compound; alternatively, a non-halide metal hydrocarbyl compound can be added to a transition metal compound; or alternatively, a transition metal compound and a non-halide metal hydrocarbyl compound can be contacted substantially simultaneously (alternatively, contacted simultaneously; or alternatively, any contacted simultaneously percentage described herein).

In any aspect or embodiment calling for a nitrogen containing compound/non-halide metal hydrocarbyl compound mixture, the nitrogen containing compound and non-halide metal hydrocarbyl compound can be contacted in any manner consistent with the particular process to produce the nitrogen containing compound/non-halide metal hydrocarbyl compound mixture and/or the particular process for trimerizing an olefin. In a non-limiting embodiment, a nitrogen containing compound can be added to a non-halide metal hydrocarbyl compound; alternatively, a non-halide metal hydrocarbyl compound can be added to a nitrogen containing compound; or alternatively, a nitrogen containing compound and a non-halide metal hydrocarbyl compound can be contacted substantially simultaneously (alternatively, contacted simultaneously; or alternatively, any contacted simultaneously percentage described herein).

In any aspect or embodiment wherein a portion of the non-halide metal hydrocarbyl compound is contacted with the transition metal compound and a portion of the non-halide metal hydrocarbyl compound is contacted with the nitrogen-containing compound, the sum of the portions of the non-halide metal hydrocarbyl compound can be less than the total non-halide metal hydrocarbyl compound of the metal hydrocarbyl compound; or alternatively can be all of the non-halide metal hydrocarbyl compound of the metal hydrocarbyl compound. In any aspect or embodiment wherein the sum of the portions of the non-halide metal hydrocarbyl compound is less than the total non-halide metal hydrocarbyl compound, a further contact with a metal hydrocarbyl compound can refer to comprising the remaining non-halide metal hydrocarbyl compound and any other component of the metal hydrocarbyl compound described herein (e.g., hydrocarbyl metal halide, among others).

Generally, it should be understood that any catalyst system component or catalyst system component mixture described herein can comprise the recited element(s) and as such can contain additional components which are consistent with a particular process to prepare the catalyst system unless specifically recited otherwise. In an embodiment, any catalyst system component or catalyst system component mixture described herein can comprise the recited element(s) of the catalyst system component or catalyst system component mixture and solvent and as such can contain additional components which are consistent with the features of the particular process to prepare the catalyst system unless specifically recited otherwise. In some embodiments, any catalyst system component or catalyst system component mixture described herein can consist essentially of the recited element(s) and a solvent. In other embodiments, any catalyst system component or catalyst system component mixture described herein can consist essentially of the recited element(s).

In some embodiments, the transition metal compound, the nitrogen containing compound, the metal hydrocarbyl compound, and/or the optional halogen containing compound can be contacted in the presence of a solvent. In some embodiments, the solvent can be, comprise, or consist essentially of, a hydrocarbon solvent or a halogenated hydrocarbon solvent (which can serve as at least a portion of, a portion of, or all of, the optional halogenated compound); alternatively a hydrocarbon solvent; or alternatively a halogenated hydrocarbon solvent. In an embodiment, the solvent can be, comprise, or consist essentially of, a saturated hydrocarbon solvent, a saturated halogenated solvent, an unsaturated hydrocarbon solvent, an unsaturated halogenated solvent, or any combination thereof; alternatively, a saturated hydrocarbon solvent, a saturated halogenated solvent, or any combination thereof; alternatively, an unsaturated hydrocarbon solvent, an unsaturated halogenated solvent, or any combination thereof; alternatively, a saturated hydrocarbon solvent; alternatively, a saturated halogenated solvent; alternatively, an unsaturated hydrocarbon solvent; or alternatively, an unsaturated halogenated solvent. In some embodiments, the unsaturated hydrocarbon solvent (halogenated or not) can be aliphatic or aromatic; alternatively, aliphatic; or alternatively, aromatic. Solvents are described herein and can be utilized in any aspect or embodiment described herein that is consistent with features and elements of a particular process to prepare a catalyst system or a particular process for trimerizing an olefin.

In some aspects and embodiments, the process of preparing the catalyst system can comprise contacting a transition metal compound (e.g., a chromium(III) carboxylate $C_3$-$C_{25}$ carboxylate composition, among others described herein) and a nitrogen containing compound (e.g., a pyrrole compound, among others described herein) to form a transition metal compound/nitrogen containing compound mixture. In an embodiment, a composition comprising the transition metal compound and/or a composition comprising the nitrogen containing compound mixture can further comprise a non-halide metal hydrocarbyl compound (e.g. a trialkylaluminum, among others described herein), a halogen containing compound (e.g. an inorganic metal halide, a hydrocarbyl metal halide, and/or an organic halide, among others described herein), and/or an unsaturated organic compound when the transition metal compound and the nitrogen containing compound are contacted to form the transition metal compound/nitrogen containing compound mixture. In some embodiments, the transition metal compound/nitrogen containing compound mixture can be formed prior to contacting the transition metal compound and the nitrogen containing compound with the metal hydrocarbyl compound and/or the optional halogen containing compound. In other embodiments, the transition metal compound/nitrogen containing compound mixture can be formed prior to contacting the transition metal compound and the nitrogen containing compound with the halogen containing compound. In yet other embodiments, at least a portion of (alternatively, a portion of; or alternatively, all of) a non-halide metal hydrocarbyl compound can be contacted with the transition metal compound and/or the nitrogen containing compound prior to forming the transition metal compound/nitrogen containing compound mixture (regardless of the presence of absence of the remaining metal hydrocarbyl compound and/or the optional halogen containing compound; or alternatively, contacted with the transition metal compound/nitrogen containing compound mixture. In an embodiment, the transition metal compound/nitrogen containing compound mixture (regardless of the presence or absence of at least a portion of, a portion of, or all of, the non-halide metal hydrocarbyl compound) can be formed in the presence of an unsaturated organic compound. In some embodiments, the unsaturated organic compound can be in a mixture (or can be contacted with) the transition metal compound (regardless of the presence or absence of at least a portion of, a portion of, or all of, the non-halide metal hydrocarbyl compound) or the nitrogen containing compound (regardless of the presence or absence of at least a portion of, a portion of, or all of, the non-halide metal hydrocarbyl compound) prior to forming the transition metal compound/nitrogen containing compound mixture. In other embodiments, the unsaturated organic compound can be in a mixture (or can be contacted with) the transition metal compound (regardless of the presence or absence of at least a portion of, a portion of, or all of, the non-halide metal hydrocarbyl compound) and nitrogen containing compound (regardless of the presence or absence of at least a portion of, a portion of, or all of, the non-halide metal hydrocarbyl compound) prior to forming the transition metal compound/nitrogen containing compound mixture. In yet other embodiments, the transition metal compound (regardless of the presence or absence of at least a portion of, a portion of, or all of, the non-halide metal hydrocarbyl compound) and the nitrogen containing compound (regardless of the presence or absence of at least a portion of, a portion of, or all of, the non-halide metal hydrocarbyl compound) can be substantially simultaneously contacted with a composition comprising, or consisting essentially of, the unsaturated organic compound (regardless of the presence or absence of all or at least a portion of, a portion of, or all of, the non-halide metal hydrocarbyl compound).

In any transition metal compound/nitrogen containing compound mixture formation aspect or embodiment, the nitrogen containing compound (e.g., a pyrrole compound among others) and the transition metal compound (e.g., a chromium(III) carboxylate $C_3$-$C_{25}$ carboxylate composition, among others described herein) can be contacted (independent of contact method) at a constant nitrogen of the nitrogen containing compound to transition metal of the transition metal compound molar ratio (also referred to as a constant nitrogen:transition metal molar ratio) to form the transition metal compound/nitrogen containing compound mixture. In a transition metal compound/nitrogen containing compound mixture embodiments, the nitrogen containing compound (e.g., a pyrrole compound among others) and the transition metal compound (e.g., a chromium(III) carboxylate $C_3$-$C_{25}$ carboxylate composition, among others described herein) can be contacted (independent of contact method) at a variable nitrogen of the containing compound to transition metal of the transition metal compound molar ratio (also referred to as a variable nitrogen:transition metal molar ratio) to form the transition metal compound/nitrogen containing compound mixture.

In a variable nitrogen:transition metal molar ratio embodiment, the variable nitrogen to transition metal molar ratio can be an about decreasing nitrogen:transition metal molar ratio; or alternatively, a decreasing nitrogen to transition metal molar ratio. In some variable nitrogen:transition metal molar ratio embodiments, the variable nitrogen:transition metal molar ratio can be one wherein the initial nitrogen: transition metal molar ratio at the start of the nitrogen containing compound and transition metal compound addition is greater than the ending nitrogen:transition metal molar ratio at the end of the nitrogen containing compound and transition metal compound addition.

In some variable nitrogen:transition metal molar ratio embodiments, the variable nitrogen:transition metal molar ratio can be one wherein the initial nitrogen:transition metal molar ratio at the start of the nitrogen containing compound and transition metal compound addition is greater than the final nitrogen containing compound:transition metal compound molar ratio and the ending nitrogen:transition metal molar ratio at the end of the nitrogen containing compound and transition metal compound addition is less than the final nitrogen containing compound:transition metal compound molar ratio; or alternatively, wherein the initial nitrogen: transition metal molar ratio at the start of the nitrogen containing compound and transition metal compound addition is about twice the final nitrogen containing compound: transition metal compound molar ratio and the ending nitrogen:transition metal molar ratio at the end of the nitrogen containing compound and transition metal compound addition is about 0. In other variable nitrogen:transition metal molar ratio embodiments, the variable nitrogen:transition metal molar ratio can be one wherein the initial nitrogen: transition metal molar ratio for the first half of the nitrogen containing compound and transition metal compound addition is greater than the final nitrogen:transition metal molar ratio and the ending nitrogen:transition metal molar ratio for the second half of the nitrogen containing compound and transition metal compound addition is less than the final nitrogen:transition metal compound molar ratio; or alternatively, wherein the initial nitrogen:transition metal molar ratio for the first half of the nitrogen containing compound and transition metal compound addition is about twice the final nitrogen:transition metal molar ratio and the ending nitrogen:transition metal molar ratio for the second half of the nitrogen containing compound and transition metal compound addition is about 0.

Generally, the nitrogen:transition metal molar ratios are independently described herein and can be utilized without limitation to further describe embodiments and aspects relating to the formation of a transition metal compound/nitrogen containing compound mixture (e.g., as the final nitrogen:transition metal molar ratio). In any embodiment, wherein the nitrogen containing compound and transition metal compound addition is described as being over a portion (e.g., one half) of the addition, the nitrogen containing compound and transition metal compound addition can be performed wherein the nitrogen:transition metal molar ratio is an average nitrogen containing compound:transition metal compound molar ratio over the portion of the nitrogen containing compound and transition metal compound addition.

When specific transition metal compounds and/or nitrogen containing compounds are recited, the transition metal compound/nitrogen containing compound mixture can be referred to using the respective recited material; e.g. when then transition metal compound is a chromium(III) carboxylate $C_3$-$C_{25}$ carboxylate composition and the nitrogen containing compound is a pyrrole compound the transition metal compound/nitrogen containing compound mixture can be referred to as a chromium carboxylate/pyrrole mixture.

In any aspect or embodiment wherein the transition metal compound contacts a metal halide compound, the transition metal compound (either as a single component or a mixture comprising a transition metal compound) can be contacted with at least a portion of (alternatively, a portion of or alternatively, all of) a non-halide metal hydrocarbyl compound prior to contacting the metal halide compound. In an aspect or embodiment wherein the nitrogen containing compound contacts a metal halide compound (either as a single component or a mixture comprising a metal halide compound), the nitrogen containing compound can be contacted with at least a portion of (alternatively, a portion of; or alternatively, all of) the non-halide metal hydrocarbyl compound) prior to contacting the metal halide compound. In another aspect or embodiment wherein a transition metal compound/nitrogen containing compound mixture contacts a metal halide compound, the transition metal compound/nitrogen containing compound mixture can be contacted with at least a portion of (alternatively, a portion of; or alternatively, all of) the non-halide metal hydrocarbyl compound) prior to contacting the metal halide compound.

In some aspects, a transition metal compound can be contacted with at least one of 1) the nitrogen containing compound or 2) the halogen containing compound prior to the transition metal compound contacting the metal hydrocarbyl compound. In an embodiment, a transition metal compound can be contacted with a nitrogen containing compound prior to contacting the transition metal compound with a metal hydrocarbyl compound; alternatively, a transition metal compound can be contacted with a halogen containing compound prior to contacting the transition metal compound with a metal hydrocarbyl compound; alternatively, a transition metal compound can be contacted with a metal halide prior to contacting the transition metal compound with a metal hydrocarbyl compound; alternatively, a transition metal compound can be contacted with a nitrogen containing compound and a halogen containing compound prior to contacting the transition metal compound with a metal hydrocarbyl compound. In other aspects, a metal hydrocarbyl compound can be contacted with at least one of 1) the pyrrole compound or 2) the halogen containing compound prior to the metal hydrocarbyl compound contacting the transition metal compound. In some embodiments, a metal hydrocarbyl compound can be contacted with a nitrogen containing compound prior to contacting the metal hydrocarbyl compound with a transition metal compound; alternatively, a metal hydrocarbyl compound can be contacted with a halogen containing compound prior to contacting the metal hydrocarbyl compound with a transition metal compound; alternatively, a metal hydrocarbyl compound can be contacted with a metal halide prior to contacting the metal hydrocarbyl compound with a transition metal compound; alternatively, a metal hydrocarbyl compound can be contacted with a nitrogen containing compound and a halogen containing compound prior to contacting the metal hydrocarbyl metal compound with a transition metal compound.

It should be noted that while process(es) of preparing the catalyst systems have been presented in terms of contacting the compounds utilized as components of the catalyst system, any one or more of the compounds can be replaced with a composition comprising the compound with the realization that the composition containing the compound does not contain a material which would contradict a feature of the particular process to prepare the catalyst system.

Without being limited by theory, it is believed that the presence of an unsaturated organic compound can stabilize the catalyst system before it is contacted with the olefin to be trimerized. When the preparation of the of the catalyst system utilizes an unsaturated organic compound, the molar ratio of the moles of unsaturated organic compound to moles of transition metal in the transition metal compound (also referred to as the unsaturated organic compound to transition metal molar ratio) can be at least 1:1; alternatively, at least 5:1; alternatively, at least 10:1; or alternatively, at least 20:1. In some embodiments wherein an unsaturated organic compound is utilized in the preparation of the catalyst system, the unsaturated organic compound to transition metal molar ratio can be up to 10,000:1; alternatively, up to 6,000:1; alternatively, up to 3,000:1; alternatively, up to 1,500:1; or alternatively, up to 1,000:1. In an aspect wherein an unsaturated organic compound is utilized in the preparation of the catalyst system, the unsaturated organic compound to transition metal molar ratio can range from any minimum unsaturated organic compound to transition metal molar ratio disclosed herein to any maximum unsaturated organic compound to transition molar ratio disclosed herein. In some non-limiting embodiments wherein a unsaturated organic compound is utilized in the preparation of the catalyst system, the unsaturated organic compound to transition metal molar ratio can range from 1:1 to 10,000:1; alternatively, range from 20:1 to 10,000:1; alternatively, range from 5:1 to 6,000:1; alternatively, range from 10:1 to 3,000:1; or alternatively, 20:1 to 1,000:1. Other ranges for the unsaturated organic compound to transition metal molar ratio s are readily apparent from the present disclosure. When a particular unsaturated organic compound genus, species, or individual (e.g., the species of aromatic hydrocarbons), and/or transition metal of the transition metal compound genus, species, or individual (e.g., chromium) is specified, the ratio can be provided in terms of the specified unsaturated organic compound and specified transition metal (e.g., a aromatic hydrocarbon:chromium molar ratio).

The catalyst system components (or the unsaturated organic compound—by itself or in combination with one or more catalyst system components—and the catalyst system components) can be contacted under any conditions sufficient to provide an active catalyst system. In an aspect, the catalyst system components (or the unsaturated organic compound—by itself or in combination with one or more catalyst system components—and the catalyst system components) can be contacted at a temperature ranging from −50° C. and about 100° C.; alternatively, ranging from −25° C. and about 80° C.; alternatively, ranging from −10° C. and about 70° C.; alternatively, ranging from 0° C. and 60° C.; or alternatively, 5° C. and 35° C. In an aspect, the catalyst system components (or the unsaturated organic compound—by itself or in combination with one or more catalyst system components—and the catalyst system components) can be contacted at any pressure that can allow thorough contacting. In an aspect, the catalyst system components (or the unsaturated organic compound—by itself or in combination with one or more catalyst system components—and the catalyst system components) can be contacted at a pressure which can maintain the catalyst system in a liquid form. In some embodiments, the catalyst system can be prepared in an inert atmosphere. In some embodiments, the inert atmosphere can be nitrogen or argon; alternatively, nitrogen. In some embodiments, the inert atmosphere can have less than 500 ppm (by weight) water; alternatively, less than 250 ppm water; alternatively, less than 100 ppm water; alternatively, less than 75 ppm water; alternatively, less than 50 ppm water; alternatively, less than 25 ppm water; or alternatively, less than 10 ppm water. In addition to the discussion herein, U.S. Pat. Nos. 6,133,495 and 7,384,886 provides additional catalyst systems and methods for preparing catalyst systems. U.S. Pat. Nos.

6,133,495 and 7,384,886 are each hereby incorporated by reference in its entirety for all purposes.

In various aspects and embodiments, two or more components of the catalyst system (e.g., the chromium(III) carboxylate composition, the pyrrole compound, the metal hydrocarbyl compound, and optionally the halogen containing compound) can be contacted in the presence of an unsaturated organic compound. Generally, the unsaturation in the unsaturated organic compound can be in the form of an aliphatic carbon-carbon double bond, an aliphatic carbon-carbon triple bond, and/or an aromatic carbon-carbon double bond; alternatively, an aliphatic carbon-carbon double bond and/or an aliphatic carbon-carbon triple bond; alternatively, an aliphatic carbon-carbon double bond and/or a aromatic carbon-carbon double bond; alternatively, an aliphatic carbon-carbon triple bond; or alternatively, an aromatic carbon-carbon double bond. In some embodiments, the unsaturated organic compound can be, comprise, or consist essentially of, a $C_2$ to $C_{70}$ unsaturated organic compound; alternatively, a $C_2$ to $C_{40}$ unsaturated organic compound; alternatively, a $C_2$ to $C_{20}$ unsaturated organic compound; or alternatively, a $C_2$ to $C_{15}$ unsaturated organic compound. In other embodiments, the unsaturated organic compound can be, comprise, or consist essentially of, a $C_2$ to $C_{70}$ unsaturated hydrocarbon; alternatively, a $C_2$ to $C_{40}$ unsaturated hydrocarbon; alternatively, a $C_2$ to $C_{20}$ unsaturated hydrocarbon; or alternatively, a $C_2$ to $C_{15}$ unsaturated hydrocarbon.

In an embodiment, the unsaturated organic compound can be, comprise, or consist essentially of, an unsaturated hydrocarbon. Generally, the unsaturated organic compound which can be utilized as the unsaturated organic compound can have the same number of carbon atoms as the unsaturated organic compound described herein. In some embodiments, the unsaturated hydrocarbon (regardless of carbon number) can be, comprise, or consist essentially of, an unsaturated aliphatic hydrocarbon, an arene (an aromatic hydrocarbon), or any combination thereof; alternatively, an unsaturated aliphatic hydrocarbon; or alternatively, an arene. In some embodiments, the unsaturated aliphatic hydrocarbon which can be utilized as the unsaturated hydrocarbon can have the same number of carbon atoms as the unsaturated organic compound described herein. In some embodiments, the arene which can be utilized as the unsaturated hydrocarbon can be, comprise, or consist essentially of, a $C_6$ to $C_{70}$ arene; alternatively, a $C_6$ to $C_{40}$ arene; alternatively, a $C_6$ to $C_{20}$ arene; or alternatively, a $C_6$ to $C_{15}$ arene.

In an aspect, the unsaturated aliphatic hydrocarbon which can be utilized as the unsaturated organic compound can be, comprise, or consist essentially of, an aliphatic hydrocarbon monoolefin, an aliphatic hydrocarbon diolefin, an aliphatic hydrocarbon triolefin, or an aliphatic hydrocarbon olefin having four or more carbon-carbon double bonds; alternatively, an aliphatic hydrocarbon monoolefin; alternatively, an aliphatic hydrocarbon diolefin; alternatively, an aliphatic hydrocarbon triolefin; or alternatively, an aliphatic hydrocarbon olefin having four or more carbon-carbon double bonds. In some embodiments, the unsaturated aliphatic hydrocarbon can be, comprise, or consist essentially of, the olefin(s) which being trimerized. In other embodiments, the unsaturated aliphatic hydrocarbon can be, comprise, or consist essentially of, an olefin(s) different from the olefin(s) being trimerized. In an embodiment, the unsaturated aliphatic hydrocarbon can be, comprise, or consist essentially of, a product of the olefin trimerization. In another embodiment, the unsaturated aliphatic hydrocarbon can be, comprise, or consist essentially of, olefin(s) different than a product of the olefin trimerization. In an embodiment, the unsaturated aliphatic hydrocarbon can be, comprise, or consist essentially of, ethylene, propylene, a butene, a pentene, a hexene, a heptene, an octene, a nonene, a decene, a undecene, a dodecene, a tridecene, a tetradecene, a pentadecene, a hexadecene, a heptadecene, an octadecene, or an combination thereof; alternatively, ethylene, propylene, a butene, a pentene, a hexene, a heptene, an octene, a nonene, a decene or any combination thereof; alternatively, ethylene, a butene, a hexene, an octene, a decene or any combination thereof; or alternatively, a decene, a dodecene, a tetradecene, a hexadecene, an octadecene, or an combination thereof. In other embodiments, the unsaturated aliphatic hydrocarbon can be, comprise, or consist essentially of, ethylene; alternatively, propylene; alternatively, a butene; alternatively, a pentene; alternatively, a hexene; alternatively, a heptene; alternatively, an octene; alternatively, a decene; alternatively, a dodecene; alternatively, a tetradecene; alternatively, a hexadecene; or alternatively, an octadecene.

In an aspect, the arene which can be utilized as the unsaturated organic compound can be, comprise, or consist essentially of, benzene, toluene, a xylene, ethylbenzene, isopropylbenzene, 1,3,5-trimethylbenzene, hexamethylbenzene, or any combination thereof. In an embodiment, the arene which can be utilized as the unsaturated organic compound can be, comprise, or consist essentially of, toluene, a xylene, ethylbenzene, isopropylbenzene, 1,3,5-trimethylbenzene, hexamethylbenzene, or any combination thereof; alternatively, toluene, a xylene, ethylbenzene, isopropylbenzene, or any combination thereof. In some embodiments, the arene which can be utilized as the unsaturated organic compound can be, comprise, or consist essentially of benzene; alternatively, toluene; alternatively, a xylene; alternatively, ethylbenzene; alternatively, isopropylbenzene; alternatively, 1,3,5-trimethylbenzene; or alternatively, hexamethylbenzene.

Generally, the catalyst system compositions described herein can be utilized within a process for trimerizing an olefin with a catalyst system to produce a trimerization product. In some embodiments, the process to trimerize an olefin with a catalyst system can comprise contacting an olefin and a catalyst system to produce an olefin trimerization product; alternatively, contacting an olefin, a transition metal compound, a nitrogen containing compound, and a metal hydrocarbyl compound to produce a trimerization product; or alternatively contacting an olefin, a transition metal compound, a nitrogen containing compound, a metal hydrocarbyl compound, and an optional halogen containing compound to produce a trimerization product. In some embodiments, the catalyst system composition can be prepared prior to contacting the catalyst system and the olefin. In other embodiments, at least one catalyst system component (the transition metal compound, the nitrogen containing compound, the metal hydrocarbyl compound, or the optional halogen containing compound) can be contacted with the olefin prior to contacting at least one other catalyst system component with the olefin. In other embodiments, the catalyst system utilized in the process for trimerizing an olefin can be prepared utilizing a particular contact order or contact method for the catalyst system component. In yet other embodiments, the ratio of any particular catalyst system components can have any catalyst system component ratio described herein. In some embodiments, the trimerization product can be produced under conditions capable of trimerizing the olefin (also referred to as trimerization conditions). In other embodiments, the process to trimerize an olefin can be further described by features of the trimerization product. In other embodiments, the process to trimerize an olefin can comprise additional steps (e.g., steps for preparing the catalyst system or steps of contacting the catalyst system components and the olefin, catalyst system deactivation step(s), trimerization product or trimer isolation step(s), and/or trimerization product or trimer purification step(s), among others). Generally, the olefin(s), the catalyst system composition, or the components of the catalyst system (e.g., the transition metal compound, the nitrogen containing compound, a metal hydrocarbyl compound, and an optional halogen containing compound), ratios of the catalyst system components, the methods of preparing the catalyst system or contacting the catalyst system components with the olefin, the conditions capable of trimerizing the olefin, features of the trimerization product, and further steps of the process for trimerizing an olefin, among other features are independent feature of the process for trimerizing an olefin. These and other olefin trimerization process features are independently described herein and can be utilized in any combination that is consistent with a particular feature(s) and element(s) of a particular process for trimerizing an olefin.

Generally, the olefin which can be trimerized can comprise, or consist essentially of, a $C_2$ to $C_{30}$ olefin; alternatively, a $C_2$ to $C_{16}$ olefin; or alternatively, a $C_2$ to $C_{10}$ olefin. In an embodiment, the olefin can be, comprise, or consist essentially of, an alpha olefin; alternatively, a linear alpha olefin; or alternatively, a normal alpha olefin. In an embodiment, the olefin can comprise, or consist essentially of, ethylene, propylene, or a combination thereof; alternatively, ethylene; or alternatively, propylene.

When the olefin comprises, or consists essentially of ethylene, the olefin trimerization process can be an ethylene trimerization process. When the process is an ethylene trimerization process, the trimerization product can comprise hexene; or alternatively, can comprise 1-hexene.

In an non-limiting, a process to trimerize an olefin with a catalyst system can comprise contacting an olefin comprising (or consisting essentially of) ethylene and a catalyst system to produce an olefin trimerization product comprising 1-hexene; alternatively, contacting an olefin comprising (or consisting essentially) of ethylene, a transition metal compound, a nitrogen containing compound, and a metal hydrocarbyl compound to produce a trimerization product comprising 1-hexene; or alternatively contacting an olefin comprising (or consisting essentially of) ethylene, a transition metal compound, a nitrogen containing compound, a metal hydrocarbyl compound, and an optional halogen containing compound to produce a trimerization product comprising 1-hexene. In some embodiments, the catalyst system composition can be prepared prior to contacting the catalyst system and the olefin comprising (or consisting essentially of) ethylene. In other embodiments, at least one catalyst system component (the transition metal compound, the nitrogen containing compound, the metal hydrocarbyl compound, or the optional halogen containing compound) can be contacted with the olefin comprising (or consisting essentially of) ethylene prior to contacting at least one other catalyst system component with the olefin comprising (or consisting essentially of) ethylene. In other embodiments, the catalyst system utilized in the process for trimerizing an olefin comprising (or consisting essentially of) ethylene can be prepared utilizing a particular contact order or contact method for the catalyst system component. In yet other embodiments, the ratio of any particular catalyst system components can have any catalyst system component ratio described herein. In some embodiments, the trimerization product comprising 1-hexene can be produced under conditions capable of trimerizing the olefin comprising (or consisting essentially of) ethylene. In other embodiments, the process to trimerize an olefin comprising (or consisting essentially of) ethylene can be further described by features of the trimerization product comprising 1-hexene. In other embodiments, the process to trimerize an olefin comprising (or consisting essentially of) ethylene can comprise additional steps (e.g., steps for preparing the catalyst system or steps of contacting the catalyst system components and the olefin comprising (or consisting essentially of) ethylene, step(s) for catalyst system deactivation, step(s) for isolating the trimerization product comprising or trimer (e.g., 1-hexene), and/or step(s) for purifying the trimerization product comprising trimer (e.g., 1-hexene), among others). Generally, the catalyst system composition, or the components of the catalyst system (e.g., the transition metal compound, the nitrogen containing compound, a metal hydrocarbyl compound, and an optional halogen containing compound), ratios of the catalyst system components, the methods of preparing the catalyst system or contacting the catalyst system components with the olefin comprising (or consisting essentially of) ethylene, the conditions capable of trimerizing the olefin comprising (or consisting essentially of) ethylene, features of the trimerization product comprising 1-hexene, and further steps of the process for trimerizing an olefin comprising (or consisting essentially of) ethylene, among other features are independent features of the process for trimerizing an olefin comprising (or consisting essentially of) ethylene. These and other olefin trimerization process features are independently described herein and can be utilized in any combination that is consistent with a particular feature(s) and element(s) of a particular process for trimerizing an olefin comprising (or consisting essentially of) ethylene.

The components of the catalyst system (the transition metal compound, the nitrogen containing compound, the metal hydrocarbyl compound, and the option halogen containing compound) which can be utilized in the process for trimerizing an olefin are each independently described herein. Aspects and embodiments of these independently described catalyst system components can be utilized in any combination to further describe the process for trimerizing an olefin. In a non limiting embodiment, the catalyst system can comprise a transition metal compound, a nitrogen containing compound and a metal hydrocarbyl compound wherein the transition metal compound can be, comprise, or consist essentially of, a chromium(III) $C_3$-$C_{25}$ carboxylate composition, the nitrogen containing compound can be, comprise, or consist essentially of, a pyrrole compound, and the metal hydrocarbyl compound can be, comprise, or consist essentially of, an alkylaluminum compound. In another non-limiting embodiment, the catalyst system can comprise a transition metal compound, a nitrogen containing compound, a metal hydrocarbyl compound, and a halogen containing compound wherein the transition metal compound can be, comprise, or consist essentially of, a chromium(III) $C_3$-$C_{25}$ carboxylate composition, the nitrogen containing compound can be, comprise, or consist essentially of, a pyrrole compound, the metal hydrocarbyl compound can be, comprise, or consist essentially of, a non-halide alkylaluminum compound, and the halogen containing compound can be, comprise, or consist essentially, of a Group 3, Group 4, Group 5, Group 6 excluding Cr, Group 13, Group 14, or Group 15 metal halide; alternatively, the transition metal compound can be, comprise, or consist essentially of, a chromium(III) $C_3$-$C_{25}$ carboxylate composition, the nitrogen containing compound can be, comprise, or consist essentially of, a pyrrole compound, the metal hydrocarbyl compound can be, comprise, or consist essentially of, a non-halide alkylaluminum compound, and the halide compound can be, comprise, or consist essentially of, a Group 3, Group 4, Group 5, Group 6 excluding Cr, Group 13, Group 14, or Group 15 inorganic metal halide; alternatively, the transition metal compound can be, comprise, or consist essentially of, a chromium(III) $C_3$-$C_{25}$ carboxylate composition, the nitrogen containing compound can be, comprise, or consist essentially of, a pyrrole compound, the metal hydrocarbyl compound can be, comprise, or consist essentially of, a non-halide alkylaluminum compound, and the halogen containing compound can be, comprise, or consist essentially of, an alkylaluminum halide. Other combinations or particular transition metal compounds, nitrogen containing compounds, metal hydrocarbyl compounds, and optional halogen containing compound are readily apparent from the present disclosure.

Generally, specific chromium(III) $C_3$-$C_{25}$ carboxylate compositions, pyrrole compounds, non-halide alkylaluminum compounds, Group 3, Group 4, Group 5, Group 6 excluding Cr, Group 13, Group 14, or Group 15 metal halides, Group 3, Group 4, Group 5, Group 6 excluding Cr, Group 13, Group 14, or Group 15 inorganic metal halides, and alkyl aluminum halides which can be utilized in the catalyst system are each independently described herein. Aspects and embodiments of these independently described catalyst system components can be utilized in any combination to further describe the process for trimerizing an olefin.

In a non-limiting example, the chromium(III) $C_3$-$C_{25}$ carboxylate composition which can be utilized in the catalyst system in the process for trimerizing an olefin can be, comprise, or consist essentially of, one that is i) characterized as having a KBr pellet infrared spectrum with a $\upsilon_{asym}$ ($CO_2$) infrared absorbance peak within 110 $cm^{-1}$ of the $\upsilon_{sym}$ ($CO_2$) infrared peak and having an infrared absorbance peak height ratio of a $\upsilon_{asym}$ ($CO_2$) infrared absorbance peak at 1516±15 $cm^{-1}$ to infrared absorbance peak located at 700±50 $cm^{-1}$ greater than or equal to 3:1, ii) characterized as having a goodness of fit test value, $R^2$, of at least 0.6 when comparing high-energy X-ray diffraction g(r) data points of the chromium(III) $C_3$-$C_{25}$ carboxylate composition to calculated high energy X-ray diffraction g(r) data points of a theoretical model of mononuclear chromium(III) acetate over an r range from 1.3 Angstroms to 4 Angstroms, or iii) produced by a process comprising contacting under substantially anhydrous and substantially acid-free conditions 1) a chromium(III) precursor having a formula $CrX_3L_l$ where each X independently is a halide, each L independently is a $C_2$-$C_{10}$ ether, a $C_2$-$C_{10}$ thioether, a $C_2$-$C_5$ nitrile, a $C_1$-$C_{30}$ amine, or a $C_3$-$C_{30}$ phosphine, or any combination thereof, and l ranges from 0 to 7, 2) a Group 1 or Group 2 metal $C_3$-$C_{25}$ carboxylate, and 3) a first solvent to form a chromium(III) carboxylate; alternatively, characterized as having a KBr pellet infrared spectrum with a $\upsilon_{asym}$ ($CO_2$) infrared absorbance peak within 110 $cm^{-1}$ of the $\upsilon_{sym}$ ($CO_2$) infrared peak and having an infrared absorbance peak height ratio of a $\upsilon_{asym}$ ($CO_2$) infrared absorbance peak at 1516±15 $cm^{-1}$ to infrared absorbance peak located at 700±50 $cm^{-1}$ greater than or equal to 3:1; alternatively, characterized as having a goodness of fit test value, $R^2$, of at least 0.6 when comparing high-energy X-ray diffraction g(r) data points of the chromium(III) $C_3$-$C_{25}$ carboxylate composition to calculated high energy X-ray diffraction g(r) data points of a theoretical model of mononuclear chromium(III) acetate over an r range from 1.3 Angstroms to 4 Angstroms; or alternatively, produced by a process comprising contacting under substantially anhydrous and substantially acid-free conditions 1) a chromium(III) precursor having a formula $CrX_3L_l$ where each X independently is a halide, each L independently is a $C_2$-$C_{10}$ ether, a $C_2$-$C_{10}$ thioether, a $C_2$-$C_5$ nitrile, a $C_1$-$C_{30}$ amine, or a $C_3$-$C_{30}$ phosphine, or any combination thereof, and l ranges from 0 to 7, 2) a Group 1 or Group 2 metal $C_3$-$C_{25}$ carboxylate, and 3) a first solvent to form a chromium(III) carboxylate. In some non-limiting embodiments, the $C_3$-$C_{25}$ carboxylate of the chromium(III) $C_3$-$C_{25}$ carboxylate can have a formula $(^-O_2C)_rR^{1c}$ where r is an integer from 1 to 4 and $R^{1c}$ is a hydrocarbon group or a substituted hydrocarbon group; or have a formula $^-O_2CR^{2c}$ where $R^{2c}$ is a hydrocarbyl group or a substituted hydrocarbyl group. In other non-limiting embodiments, the $C_3$-$C_{25}$ carboxylate of the chromium(III) $C_3$-$C_{25}$ carboxylate can be, comprise, or consist essentially of, a propionate, a butyrate, a pentanoate, a hexanoate, a heptanoate, an octanoate, a nonanoate, a decanoate, an undecanoate, a dodecanoate, a tridecanoate, a tetradecanoate, a pentadecanoate, a hexadecanoate, a heptadecanoate, an octadecanoate, or any combination thereof; alternatively, 2-ethylhexanoate. Other transition metal compounds and chromium(III) $C_3$-$C_{25}$ carboxylates which can be utilized as the transition metal compound in the catalyst system in the process for trimerizing an olefin are readily apparent from the present disclosure.

In a non-limiting example, the pyrrole compound which can be utilized in the catalyst system in the process for trimerizing an olefin can have the formula P1

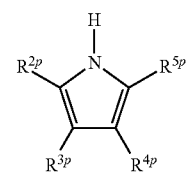

P1 where $R^{2p}$, $R^{3p}$, $R^{4p}$, and $R^{5p}$ independently are hydrogen atoms or $C_1$-$C_{30}$ organyl groups; alternatively, have the formula P5

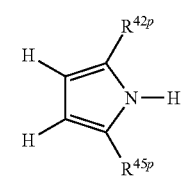

P5 where $R^{42p}$ and $R^{4p}$ independently are $C_1$-$C_{18}$ hydrocarbyl groups; or alternatively, have the formula AP1

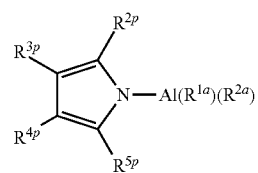

AP1 where $R^{2p}$, $R^{3p}$, $R^{4p}$, and $R^{5p}$ independently can be hydrogen atoms or $C_1$-$C_{30}$ organyl groups and $R^{1a}$ and $R^{2a}$ can be a hydrogen or a $C_1$-$C_{20}$ hydrocarbyl group. In another non-limiting embodiment, the pyrrole compound which can be utilized in the catalyst system in the process for trimerizing an olefin can be, comprise, or consist essentially of, 2,5-dimethylpyrrole, 2-methyl-5-ethylpyrrole, 2,5-diethylpyrrole, 2,5-dipropylpyrrole, 2,5-dibutylpyrrole, 2,4-dimethylpyrrole, 2,4-diethylpyrrrole, 2,4-dipropylpyrrole, 2,4-dibutylpyrrole, 3,4-dimethylpyrrole, 3,4-diethylpyrrrole, 3,4-dipropylpyrrole, 3,4-dibutylpyrrole, 2,3,4-trimethylpyrrole, 3-ethyl-2,4-dimethylpyrrole, 2,3,5-trimethylpyrrole; 2,3,4,5-tetramethylpyrrole, 2,3,4,5-tetraethylpyrrole, or any combination thereof; or alternatively, 2,5-dimethylpyrrole. Other nitrogen containing compounds and pyrrole compounds which can be utilized as the nitrogen containing compound in the catalyst system in the process for trimerizing an olefin are readily apparent from the present disclosure.

In a non-limiting embodiment, the alkylaluminum compound which can be utilized in the catalyst system in the process for trimerizing an olefin can be, comprise, or consist essentially of, a trialkylaluminum, an alkylaluminum halide, or any combination thereof; alternatively, a trialkylalumium, a dialkylaluminum halide, an alkylaluminum dihalide, an alkylaluminum sesquichloride, or any combination thereof; alternatively, a trialkylalumium; alternatively, a dialkylaluminum halide; alternatively, an alkylaluminum dihalide; or alternatively, an alkylaluminum sesquihalide. In another embodiment, the alkylaluminum compound can be, comprise, or consist essentially of, a trialkylaluminum, an alkylaluminum chloride, or combination thereof; alternatively, a trialkylalumium, a dialkylaluminum chloride, an alkylaluminum dichloride, an alkylaluminum sesquichloride, or any combination thereof; alternatively, a trialkylalumium; alternatively, a dialkylaluminum chloride; alternatively, an alkylaluminum dichloride; alternatively, an alkylaluminum sesquichloride; or alternatively, a mixture of triethylaluminum and diethylaluminum chloride. Other metal hydrocarbyl compounds and alkylaluminum compounds which can be utilized as the metal hydrocarbyl compound in the catalyst system in the process for trimerizing an olefin are readily apparent from the present disclosure.

In a non-limiting embodiment, the non-halide alkylaluminum compound which can be utilized in the catalyst system in the process for trimerizing an olefin can be, comprise, or consist essentially of, a trialkylaluminum, a dialkylaluminum hydride, an alkylaluminum dihydride, a dialkylaluminum alkoxide, an alkylaluminum dialkoxide, or any combination thereof; alternatively, alternatively, a trialkylaluminum, a dialkylaluminum hydride, an alkylaluminum dihydride, or any combination thereof; or alternatively, a trialkyl aluminum. In a non-limiting embodiment, the halogen containing compound which can be utilized in the catalyst system in the process for trimerizing an olefin can be, comprise, or consist essentially of, a Group 3, Group 4, Group 5, Group 6 excluding Cr, Group 13, or Group 14 inorganic metal halide, a hydrocarbyl aluminum halide, a halogenated hydrocarbon, or any combination thereof; alternatively, a Group 3, Group 4, Group 5, Group 6 excluding Cr, Group 13, or Group 14 inorganic metal halide; alternatively, a hydrocarbyl aluminum halide; or alternatively, a halogenated hydrocarbon. In a non-limiting embodiment, a composition comprising a halogen containing compound can be, comprise, or consist essentially of, (i) a Group 3, Group 4, Group 5, Group 6 excluding Cr, Group 13, or Group 14 inorganic metal halide, (ii) a hydrocarbylaluminum halide, (iii) a mixture of a Group 3, Group 4, Group 5, Group 6 excluding Cr, Group 13, or Group 14 inorganic metal halide and a non-halide aluminum hydrocarbyl compound, or (iv) a mixture of a hydrocarbyl aluminum halide and a non-halide aluminum hydrocarbyl compound; alternatively, a Group 3, Group 4, Group 5, Group 6 excluding Cr, Group 13, or Group 14 inorganic metal halide; alternatively, a hydrocarbyl aluminum halide; alternatively, a mixture of a Group 3, Group 4, Group 5, Group 6 excluding Cr, Group 13, or Group 14 inorganic metal halide and a non-halide aluminum hydrocarbyl compound; or alternatively, a mixture of a hydrocarbyl aluminum halide and a non-halide aluminum hydrocarbyl compound. Other non-halide alkylaluminum compounds, halogen containing compounds, and compositions comprising a halogen containing compound which can be utilized in the catalyst system in the process for trimerizing an olefin are readily apparent from the present disclosure.

Ratios of the components of the catalyst system which can be utilized in the process for trimerizing an olefin are each independently described herein. These independently described catalyst system component ratios can be utilized in any combination to further describe the catalyst system utilized in the process for trimerizing an olefin. In some non-limiting embodiments wherein the transition metal compound can be, comprise, consist essentially of, or consist of, a chromium(III) $C_3$-$C_{25}$ carboxylate composition, the metal hydrocarbyl compound can be, comprise, or consist essentially of, a hydrocarbylaluminum compound, the catalyst system can have a chromium:aluminum molar ratio (more generally, a transition metal:metal hydrocarbyl metal molar ratio) ranging from 1:1 to 1:150; alternatively, 1:9 to 1:25; alternatively, 1:2 to 1:18; or alternatively, from 1:5 to 1:17. In some non-limiting embodiments wherein the transition metal compound can be, comprise, consist essentially of, or consist of, a chromium(III) $C_3$-$C_{25}$ carboxylate composition, the nitrogen containing compound can be, comprise, or consist essentially of, a pyrrole compound, the catalyst system can have a pyrrole compound nitrogen:chromium molar ratio (or more generally nitrogen:transition metal molar ratio) ranging from 0.3:1 to 10:1; alternatively, from 0.3:1 to 5:1; alternatively, from 1.5:1 to 2.5:1; alternatively, 2.5:1 to 3.5:1; alternatively, 0.3:1 to 1.2:1; alternatively, from 0.3:1 to 0.9:1; or alternatively, 0.3:1 to 0.8:1. In some non-limiting embodiments wherein the catalyst system includes a halogen containing compound and the transition metal compound is a chromium(III) $C_3$-$C_{25}$ carboxylate composition, the catalyst system can have a halide:chromium molar ratio ranging from 0.1:1 to 100:1; alternatively, from 0.5:1 to 50:1; or alternatively, from 0.75:1 to 25:1. Other chromium:aluminum molar ratios, transition metal:metal hydrocarbyl metal molar ratios, pyrrole compound nitrogen:chromium molar ratios, and nitrogen:transition metal molar ratios, in addition to other ratios which can be utilized to further describe the catalyst system utilized in the process for trimerizing an olefin are readily apparent from the present disclosure.

Methods for preparing the catalyst system prior to contact with the olefin to be trimerized which can be utilized in the process for trimerizing an olefin are independently described herein and can be utilized without limitation to further describe the process for trimerizing an olefin. These catalyst system preparation processes can be utilized without limitation to further describe the process for trimerizing an olefin. In some non-limiting embodiments wherein the transition metal compound can be, comprise, or consist essentially of, a chromium(III) $C_3$-$C_{25}$ carboxylate composition, the nitrogen containing compound can be, comprise, or consist essentially of, a pyrrole compound, and the metal hydrocarbyl compound can be, comprise, or consist essentially of, an alkylaluminum compound (e.g., a trialkylaluminum, a dialkylaluminum halide, an alkylaluminum dihalide, or any combination thereof) and the catalyst system preparation processes utilizes an unsaturated organic compound, the process to prepare the catalyst system within the process for trimerizing an olefin can comprise 1) contacting the pyrrole compound with the alkylaluminum compound to form a pyrrole compound/alkylaluminum compound mixture and 2) contacting the chromium(III) $C_3$-$C_{25}$ carboxylate composition and the pyrrole compound/alkylaluminum compound mixture in the presence of an unsaturated organic compound to form the catalyst system; alternatively, contacting substantially simultaneously the chromium(III) $C_3$-$C_{25}$ carboxylate composition, the pyrrole compound and the alkylaluminum compound in the presence of an unsaturated organic compound to for the catalyst system; or alternatively, 1) contacting a pyrrole compound and a non-halide alkylaluminum compound to form a pyrrole-metal hydrocarbyl compound (e.g., having Structure AP1, AP2, AP3, AP4, or AP5), 2) contacting the pyrrole-metal hydrocarbyl compound with the chromium(III) $C_3$-$C_{25}$ carboxylate composition in the presence of an unsaturated organic compound to form a chromium(III) $C_3$-$C_{25}$ carboxylate composition/pyrrole-metal hydrocarbyl compound mixture, and 3) contacting the chromium(III) $C_3$-$C_{25}$ carboxylate composition/pyrrole-metal hydrocarbyl compound mixture with the alkylaluminum compound to form the catalyst system. In a non-limiting embodiment, wherein the transition metal compound can be, comprise, or consist essentially of, a chromium(III) $C_3$-$C_{25}$ carboxylate composition, the nitrogen containing compound can be, comprise, or consist essentially of, a pyrrole compound, the non-halide metal hydrocarbyl compound can be, comprise, or consist essentially of, an alkylaluminum compound (e.g., a trialkylaluminum), and the halogen containing compound can be, comprise, or consist essentially of, a Group 3, Group 4, Group 5, Group 6 excluding Cr, Group 13, or Group 14, metal halide compound, or a Group 13, Group 14, or Group 15 non-metal halide and the catalyst system preparation processes utilizes an unsaturated organic compound, the process to prepare the catalyst system within the process for trimerizing an olefin can comprise contacting a chromium (III) $C_3$-$C_{25}$ carboxylate composition with at least one of a pyrrole compound or a halogen containing compound prior to contacting the chromium(III) $C_3$-$C_{25}$ carboxylate composition with the alkylaluminum compound in the presence of an unsaturated organic compound; alternatively, 1) contacting the chromium(III) $C_3$-$C_{25}$ carboxylate composition, pyrrole compound, and the halogen containing compound to form a chromium(III) $C_3$-$C_{25}$ carboxylate composition/pyrrole compound/halogen containing compound mixture, and 2) contacting the alkylaluminum compound with the chromium(III) $C_3$-$C_{25}$ carboxylate composition/pyrrole compound/halogen containing compound mixture in the presence of an unsaturated organic compound; alternatively, contacting the chromium(III) $C_3$-$C_{25}$ carboxylate composition, pyrrole compound, and the halogen containing compound prior to contacting the chromium(III) $C_3$-$C_{25}$ carboxylate composition with the alkylaluminum compound in the presence of an unsaturated organic compound; alternatively, comprise contacting an alkyl aluminum compound with at least one of a pyrrole compound or a halogen containing compound prior to contacting the alkylaluminum compound with the chromium(III) $C_3$-$C_{25}$ carboxylate composition; alternatively, 1) contacting the alkylaluminum compound, pyrrole compound, and the halogen containing compound to form a pyrrole compound/alkylaluminum compound/halogen containing compound mixture, and 2) contacting the pyrrole compound/alkylaluminum compound/halogen containing compound mixture with the chromium(III) $C_3$-$C_{25}$ carboxylate composition in the presence of an unsaturated organic compound; or alternatively, contacting the alkylaluminum compound, pyrrole compound, and the halogen containing compound prior to contacting the chromium(III) $C_3$-$C_{25}$ carboxylate composition with the alkylaluminum compound in the presence of an unsaturated organic compound; alternatively, 1) contacting the pyrrole containing compound and the halogen containing compound to form a pyrrole containing compound/halogen containing compound mixture, 2) contacting pyrrole containing compound/halogen containing compound mixture with the chromium(III) $C_3$-$C_{25}$ carboxylate composition to form a chromium(III) $C_3$-$C_{25}$ carboxylate composition/pyrrole containing compound/halogen containing compound mixture, and 3) contacting the chromium(III) $C_3$-$C_{25}$ carboxylate composition/pyrrole containing compound/halogen containing compound mixture with the alkylaluminum compound in the presence of an unsaturated organic compound; alternatively, 1) contacting a chromium(III) $C_3$-$C_{25}$ carboxylate composition and a pyrrole containing compound to form a chromium(III) $C_3$-$C_{25}$ carboxylate composition/pyrrole containing compound mixture, and 2) contacting the chromium(III) $C_3$-$C_{25}$ carboxylate composition/pyrrole containing compound mixture with an alkylaluminum compound/halogen containing compound mixture in the presence of an unsaturated organic compound; alternatively, and 3) contacting the chromium(III) $C_3$-$C_{25}$ carboxylate composition/pyrrole containing compound mixture with the alkylaluminum compound/halogen containing compound mixture in the presence of an unsaturated organic compound; or alternatively, forming an a chromium(III) $C_3$-$C_{25}$ carboxylate composition/pyrrole containing compound mixture prior to contacting the a chromium(III) $C_3$-$C_{25}$ carboxylate composition/pyrrole containing compound mixture with an alkylaluminum compound/halogen containing compound mixture in the presence of an unsaturated organic compound. Other methods of preparing the catalyst system and catalyst system component contact orders which can be utilized within a process for trimerizing an olefin wherein the catalyst system is prepared prior to contact with the olefin to be trimerized are readily apparent from the present disclosure. Additionally, the catalyst system components can be combined or contacted in any catalyst system component ratio described herein.

In an aspect, the process for trimerizing an olefin can be conducted in a manner wherein at least one catalyst system component (the transition metal compound, the nitrogen containing compound, the metal hydrocarbyl compound, or the optional halogen containing compound) can be contacted with at least one of the other components of the catalyst system in the presence of the olefin to be trimerized. In another aspect, the process for trimerizing an olefin can be conducted in a manner wherein each catalyst system component (the transition metal compound, the nitrogen containing compound, the metal hydrocarbyl compound, and when utilized the optional halogen containing compound) and an olefin to be trimerized can be contacted substantially simultaneously (alternatively, contacted simultaneously; or alternatively, any contacted simultaneously percentage described herein); alternatively, each catalyst system component (the transition metal compound, the nitrogen containing compound, the metal hydrocarbyl compound, and when utilized the optional halogen containing compound) can be contacted substantially simultaneously (alternatively, contacted simultaneously; or alternatively, any contacted simultaneously percentage described herein) with an olefin to be trimerized; or alternatively, each catalyst system component (the transition metal compound, the nitrogen containing compound, the metal hydrocarbyl compound, and when utilized the optional halogen containing compound) can be substantially simultaneously (alternatively, contacted simultaneously; or alternatively, any contacted simultaneously percentage described herein) added to an olefin to be trimerized. In yet another aspect, the process for trimerizing the olefin can be conducted in a manner wherein at least one catalyst system component (the transition metal compound, the nitrogen containing compound, the metal hydrocarbyl compound, or the optional halogen containing compound) can be contacted with the olefin to be trimerized prior to contacting at least one other catalyst system component with the olefin to be trimerized.

In an aspect, the process for trimerizing an olefin can be conducted in a manner wherein the transition metal compound and the metal hydrocarbyl compound are contacted in the presence of an unsaturated organic compound. In an embodiment, the process for trimerizing an olefin can be conducted in an manner wherein the transition metal compound and the metal hydrocarbyl compound are not contacted prior to contacting the olefin to be trimerized; alternatively, conducted in a manner wherein the transition metal compound does not contact the olefin to be trimerized prior to the metal hydrocarbyl contacting the olefin to be trimerized; or alternatively, conducted in a manner wherein the metal hydrocarbyl compound does not contact the olefin to be trimerized prior to the transition metal compound contacting the olefin to be trimerized. In some embodiments, the process for trimerizing an olefin can be conducted in a manner wherein the transition metal compound can be contacted with the olefin to be trimerized and the metal hydrocarbyl compound can be contacted with the olefin to be trimerized prior to the transition metal compound and the hydrocarbyl compound being contacted.

Within these aspects and embodiments where the transition metal complex and the metal hydrocarbyl compound contact each other in the presence of the olefin to be trimerized and any other applicable aspects and embodiments, the transition metal compound (whether or not it has been previously been contacted with the olefin to be trimerized) can be added to the metal hydrocarbyl compound (whether or not it has been previously been contacted with the olefin to be trimerized); alternatively, the metal hydrocarbyl compound (whether or not it has been previously been contacted with the olefin to be trimerized) can be added to the transition metal compound (whether or not it has been previously been contacted with the olefin to be trimerized); or alternatively, the transition metal compound (whether or not it has been previously been contacted with the olefin to be trimerized) and the metal hydrocarbyl compound (whether or not it has been previously been contacted with the olefin to be trimerized) can be contacted substantially simultaneously (alternatively, contacted simultaneously; or alternatively, any contacted simultaneously percentage described herein). In other embodiments, the process for trimerizing an olefin can be conducted in an manner wherein the olefin to be trimerized, the transition metal compound, and the metal hydrocarbyl compound can be contacted substantially simultaneously (alternatively, contacted simultaneously; alternatively, any contacted simultaneously percentage described herein); alternatively, can be conducted in a manner wherein the transition metal compound and the metal hydrocarbyl compound can be contacted substantially simultaneously (alternatively, contacted simultaneously; or alternatively, any contacted simultaneously percentage described herein) with the olefin to be trimerized; or alternatively, can be conducted in a manner wherein the transition metal compound and the metal hydrocarbyl compound can be substantially simultaneously (alternatively, contacted simultaneously; or alternatively, any contacted simultaneously percentage described herein) added to the olefin to be trimerized.

In relation to aspects and embodiments wherein the transition metal compound and the metal hydrocarbyl compound are contacted in the presence of the olefin, wherein the transition metal compound contacts the olefin prior to the transition metal compound and the hydrocarbyl compound being contacted, or wherein the metal hydrocarbyl compound contacts the olefin prior to the transition metal compound and the hydrocarbyl compound being contacted, these conditions can be implemented for the initial contact of the olefin and/or catalyst system components and any subsequent separate addition of the olefin and/or catalyst system components during the olefin trimerization. However, in aspects and embodiments wherein the process for trimerizing an olefin includes steps for recovering and recycling the catalyst system, these particular olefin trimerization process contact features do not necessarily apply. Consequently, a process for trimerization of an olefin operating under a feature wherein the transition metal compound and the metal hydrocarbyl compound are contacted in the presence of the olefin, a feature wherein the transition metal compound contacts the olefin prior to the transition metal compound and the hydrocarbyl compound being contacted, or a feature wherein the metal hydrocarbyl compound contacts the olefin prior to the transition metal compound and the hydrocarbyl compound being contacted does not exclude the possibility of recycling all or a portion of a recovered catalyst system within the process to trimerize an olefin.

In any aspect or embodiment wherein the process for trimerizing an olefin can be conducted in an manner wherein the transition metal compound and the metal hydrocarbyl compound contact each other in the presence of the olefin to be trimerized, the transition metal compound can be contacted with any other component of the catalyst system (to form a mixture comprising the transition metal compound) prior to contacting the transition metal compound and the metal hydrocarbyl compound; alternatively, the metal hydrocarbyl compound can be contacted with any other component of the catalyst system (to form a mixture comprising the metal hydrocarbyl compound) prior to the contacting the transition metal compound and the metal hydrocarbyl compound; or alternatively, the transition metal compound can be contacted with any other component of the catalyst system (to form a mixture comprising the transition metal compound) and the metal hydrocarbyl compound can be contacted with any other component of the catalyst system (to form a mixture comprising the metal hydrocarbyl compound) prior to the contact of the transition metal compound and the metal hydrocarbyl compound. Mixtures comprising the transition metal compound and the methods for preparing the mixtures comprising the transition metal compound are described herein within the process(es) for preparing the catalyst system and these mixtures and methods can be utilized in any manner consistent with any process for trimerizing an olefin aspect or embodiment including a feature that the transition metal compound and the metal hydrocarbyl compound contact each other in the presence of the olefin to be trimerized. Mixtures comprising the metal hydrocarbyl compound and the methods for preparing the mixtures comprising the metal hydrocarbyl compound mixtures are described herein within the process(es) for preparing the catalyst system and these mixtures and methods can be utilized in any manner consistent with any process for trimerizing an olefin aspect or embodiment including a feature that the transition metal compound and the metal hydrocarbyl compound contact each other in the presence of the olefin to be trimerized.

In a non-limiting embodiment, the process for trimerizing an olefin can comprise contacting a nitrogen containing compound/metal hydrocarbyl compound mixture (or a nitrogen containing compound/metal hydrocarbyl compound/halogen containing compound mixture), the olefin, and a transition metal compound to produce a trimerization product. In some embodiments, the olefin, the transition metal compound and the nitrogen containing compound/metal hydrocarbyl compound mixture (or a nitrogen containing compound/metal hydrocarbyl compound/halogen containing compound mixture) can be contacted substantially simultaneously (alternatively, contacted simultaneously; or alternatively, any contacted simultaneous percentage described herein); e.g., substantially simultaneously (alternatively, contacted simultaneously; or alternatively, any contacted simultaneously percentage described herein) added to a reactor, or a solvent, among other options. In some embodiments, the olefin and the transition metal compound can be substantially simultaneously (alternatively, simultaneously; or alternatively, any simultaneous percentage described herein) added to the nitrogen containing compound/metal hydrocarbyl compound mixture (or a nitrogen containing compound/metal hydrocarbyl compound/halogen containing compound mixture); alternatively, the transition metal compound and the nitrogen containing compound/metal hydrocarbyl compound mixture (or a nitrogen containing compound/metal hydrocarbyl compound/halogen containing compound mixture) can be substantially simultaneously (alternatively, simultaneously; or alternatively, any simultaneous percentage described herein) added to the olefin; or alternatively, the olefin and the nitrogen containing compound/metal hydrocarbyl compound mixture (or a nitrogen containing compound/metal hydrocarbyl compound/halogen containing compound mixture) can be substantially simultaneously (alternatively, simultaneously; or alternatively, any simultaneous percentage described herein) added to the transition metal compound. In other embodiments, the olefin and the transition metal compound can be contacted sequentially (in any order) with the nitrogen containing compound/metal hydrocarbyl compound mixture (or a nitrogen containing compound/metal hydrocarbyl compound/halogen containing compound mixture); or alternatively, the olefin and the transition metal compound can be added sequentially (in any order) to the nitrogen containing compound/metal hydrocarbyl compound mixture (or a nitrogen containing compound/metal hydrocarbyl compound/halogen containing compound mixture).

In a non-limiting embodiment, the process for trimerizing an olefin can comprise 1) contacting a nitrogen containing compound/metal hydrocarbyl compound mixture (or a nitrogen containing compound/metal hydrocarbyl compound/halogen containing compound mixture) with the olefin to form a nitrogen containing compound/metal hydrocarbyl compound/olefin mixture (or a nitrogen containing compound/metal hydrocarbyl compound/halogen containing compound/olefin mixture), and 2) contacting the transition metal compound with the nitrogen containing compound/metal hydrocarbyl compound/olefin mixture (or the nitrogen containing compound/metal hydrocarbyl compound/halogen containing compound/olefin mixture) to produce a trimerization product. In an embodiment, the nitrogen containing compound/metal hydrocarbyl compound mixture (or a nitrogen containing compound/metal hydrocarbyl compound/halogen containing compound mixture) can be added to the olefin; alternatively, the olefin can be added to the nitrogen containing compound/metal hydrocarbyl compound mixture (or a nitrogen containing compound/metal hydrocarbyl compound/halogen containing compound mixture). In some embodiments, the nitrogen containing compound/metal hydrocarbyl compound mixture (or a nitrogen containing compound/metal hydrocarbyl compound/halogen containing compound mixture) and the olefin can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In some embodiments, the transition metal compound can be added to the nitrogen containing compound/metal hydrocarbyl compound/olefin mixture (or a nitrogen containing compound/metal hydrocarbyl compound/halogen containing compound/olefin mixture); alternatively, the nitrogen containing compound/metal hydrocarbyl compound/olefin mixture (or a nitrogen containing compound/metal hydrocarbyl compound/halogen containing compound/olefin mixture) can be added to the transition metal compound. In other embodiments, the transition metal compound and the nitrogen containing compound/metal hydrocarbyl compound/olefin mixture (or a nitrogen containing compound/metal hydrocarbyl compound/halogen containing compound/olefin mixture) can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options.

In a non-limiting embodiment, the process for trimerizing an olefin can comprise 1) contacting a transition metal compound with the olefin to form a transition metal compound/olefin mixture, and 2) contacting a nitrogen containing compound/metal hydrocarbyl compound mixture (or a nitrogen containing compound/metal hydrocarbyl compound/halogen containing compound mixture) with the transition metal compound/olefin mixture to produce a trimerization product. In an embodiment, the transition metal compound can be added to the olefin; alternatively, the olefin can be added to the transition metal compound. In some embodiments, the transition metal compound and the olefin can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In some embodiments, the transition metal compound/olefin mixture can be added to the nitrogen containing compound/metal hydrocarbyl compound mixture (or a nitrogen containing compound/metal hydrocarbyl compound/halogen containing compound mixture); alternatively, the nitrogen containing compound/metal hydrocarbyl compound mixture (or a nitrogen containing compound/metal hydrocarbyl compound/halogen containing compound mixture) can be added to the transition metal compound/olefin mixture. In other embodiments, the transition metal compound/olefin mixture and the nitrogen containing compound/metal hydrocarbyl compound mixture (or a nitrogen containing compound/ metal hydrocarbyl compound/halogen containing compound mixture) can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options.

In a non-limiting embodiment, the process for trimerizing an olefin can comprise contacting a transition metal compound/nitrogen containing compound mixture (or a transition metal compound/nitrogen containing compound/halogen containing compound mixture), the olefin, and a metal hydrocarbyl compound to produce a trimerization product. In some embodiments, the olefin, the metal hydrocarbyl compound and the transition metal compound/nitrogen containing compound mixture (or the transition metal compound/nitrogen containing compound/halogen containing compound mixture) can be contacted substantially simultaneously (alternatively, contacted simultaneously; or alternatively, any contacted simultaneously percentage described herein); e.g., substantially simultaneously (alternatively, contacted simultaneously; or alternatively, any contacted simultaneously percentage described herein) added to a reactor, or a solvent, among other options. In some embodiments, the olefin and the metal hydrocarbyl compound can be substantially simultaneously (alternatively, simultaneously; or alternatively, any simultaneous percentage described herein) added to the transition metal compound/ nitrogen containing compound mixture (or the transition metal compound/nitrogen containing compound/halogen containing compound mixture); alternatively, the metal hydrocarbyl compound and the transition metal compound/ nitrogen containing compound mixture (or the transition metal compound/nitrogen containing compound/halogen containing compound mixture) can be substantially simultaneously (alternatively, simultaneously; or alternatively, any simultaneous percentage described herein) added to the olefin; or alternatively, the olefin and the transition metal compound/nitrogen containing compound mixture (or the transition metal compound/nitrogen containing compound/ halogen containing compound mixture) can be substantially simultaneously (alternatively, simultaneously; or alternatively, any simultaneous percentage described herein) added to the metal hydrocarbyl compound. In other embodiments, the olefin and the metal hydrocarbyl compound can be contacted sequentially (in any order) with the transition metal compound/nitrogen containing compound mixture (or the transition metal compound/nitrogen containing compound/halogen containing compound mixture); or alternatively, the olefin and the metal hydrocarbyl compound can be added sequentially (in any order) to the transition metal compound/nitrogen containing compound mixture (or the transition metal compound/nitrogen containing compound/ halogen containing compound mixture).

In a non-limiting embodiment, the process for trimerizing an olefin can comprise 1) contacting a transition metal compound/nitrogen containing compound mixture (or a transition metal compound/nitrogen containing compound/ halogen containing compound mixture) with the olefin to form a transition metal compound/nitrogen containing compound/olefin mixture (or a transition metal compound/nitrogen containing compound/halogen containing compound/ olefin mixture), and 2) contacting a metal hydrocarbyl compound with the transition metal compound/nitrogen containing compound/olefin mixture (or the transition metal compound/nitrogen containing compound/halogen containing compound/olefin mixture) to produce a trimerization product. In some embodiments, the transition metal compound/nitrogen containing compound mixture (or the transition metal compound/nitrogen containing compound/halogen containing compound mixture) can be added to the olefin; alternatively, the olefin can be added to the transition metal compound/nitrogen containing compound mixture (or the transition metal compound/nitrogen containing compound/halogen containing compound mixture). In other embodiments, the transition metal compound/nitrogen containing compound mixture (or the transition metal compound/nitrogen containing compound/halogen containing compound mixture) and the olefin can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In some embodiments, the metal hydrocarbyl compound can be added to the transition metal compound/nitrogen containing compound/olefin mixture (or the transition metal compound/nitrogen containing compound/halogen containing compound/olefin mixture); alternatively, the transition metal compound/nitrogen containing compound/olefin mixture (or the transition metal compound/nitrogen containing compound/halogen containing compound/olefin mixture) can be added to the metal hydrocarbyl compound. In other embodiments, the metal hydrocarbyl compound and the transition metal compound/ nitrogen containing compound/olefin mixture (or the transition metal compound/nitrogen containing compound/halogen containing compound/olefin mixture) can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options.

In a non-limiting embodiment, the process for trimerizing an olefin can comprise 1) contacting the metal hydrocarbyl compound with the olefin to form a metal hydrocarbyl compound/olefin mixture, and 2) contacting the metal hydrocarbyl compound/olefin mixture with a transition metal compound/nitrogen containing compound mixture (or a transition metal compound/nitrogen containing compound/ halogen containing compound mixture) to produce a trimerization product. In an embodiment, the metal hydrocarbyl compound can be added to the olefin; or alternatively, the olefin can be added to the metal hydrocarbyl compound. In some embodiments, the metal hydrocarbyl compound and the olefin can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In an embodiment, the metal hydrocarbyl compound/olefin mixture can be added to the transition metal compound/nitrogen containing compound mixture (or the transition metal compound/nitrogen containing compound/halogen containing compound mixture); or alternatively, the transition metal compound/nitrogen containing compound mixture (or the transition metal compound/nitrogen containing compound/halogen containing compound mixture) can be added to the metal hydrocarbyl compound/olefin mixture. In other embodiments, the metal hydrocarbyl compound/olefin mixture and the transition metal compound/nitrogen containing compound mixture (or the transition metal compound/nitrogen containing compound/halogen containing compound mixture) can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options.

In a non-limiting embodiment, the process for trimerizing an olefin can comprise contacting a nitrogen containing compound, a metal hydrocarbyl compound, the olefin, and a transition metal compound (or a transition metal compound/halogen containing compound mixture) to produce a trimerization product. In some embodiments, the nitrogen containing compound, the metal hydrocarbyl compound, and the olefin can be added to the transition metal compound (or the transition metal compound/halogen containing compound mixture); or alternatively, the nitrogen containing compound, the metal hydrocarbyl compound, and the olefin, can be substantially simultaneously (alternatively, simultaneously; or alternatively, any simultaneous percentage described herein) added to the transition metal compound (or the transition metal compound/halogen containing compound mixture). In other embodiments, the nitrogen containing compound, the metal hydrocarbyl compound, and the olefin can be contacted sequentially (in any order) with the transition metal compound (or the transition metal compound/halogen containing compound mixture); or alternatively, the nitrogen containing compound, the metal hydrocarbyl compound, and the olefin can be added sequentially (in any order) to the transition metal compound (or the transition metal compound/halogen containing compound mixture).

In a non-limiting embodiment, the process for trimerizing an olefin can comprise 1) contacting a transition metal compound (or a transition metal compound/halogen containing compound mixture) with the olefin to form a transition metal compound/olefin mixture (or a transition metal compound/halogen containing compound mixture/olefin mixture), and 2) contacting the transition metal compound/olefin mixture (or the transition metal compound/halogen containing compound mixture/olefin mixture) with a nitrogen containing compound and a metal hydrocarbyl compound to produce a trimerization product; or alternatively, 1) contacting a transition metal compound (or a transition metal compound/halogen containing compound mixture) with the olefin to form a transition metal compound/olefin mixture (or a transition metal compound/halogen containing compound mixture/olefin mixture), and 2) contacting the transition metal compound/olefin mixture (or the transition metal compound/halogen containing compound mixture/olefin mixture) with a nitrogen containing compound/metal hydrocarbyl compound mixture to produce a trimerization product. In some embodiments, the transition metal compound (or the transition metal compound/halogen containing compound mixture) can be added to the olefin; alternatively, the olefin can be added to the transition metal compound (or the transition metal compound/halogen containing compound mixture). In other embodiments, the transition metal compound (or the transition metal compound/halogen containing compound mixture) and the olefin can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In some embodiments, the nitrogen containing compound, the metal hydrocarbyl compound, and the transition metal compound/olefin mixture (or a transition metal compound/halogen containing compound mixture/olefin mixture) can be contacted substantially simultaneously (alternatively, contacted simultaneously; or alternatively, any contacted simultaneously percentage described herein); e.g., substantially simultaneously (alternatively, contacted simultaneously; or alternatively, any contacted simultaneously percentage described herein) added to a reactor, or a solvent, among other options. In other embodiments the nitrogen containing compound and the metal hydrocarbyl compound can be substantially simultaneously (alternatively, simultaneously; or alternatively, any simultaneous percentage described herein) added to the transition metal compound/olefin mixture (or the transition metal compound/halogen containing compound mixture/olefin mixture). In yet other embodiments, the nitrogen containing compound and the metal hydrocarbyl compound can be contacted sequentially (in any order) with the transition metal compound/olefin mixture (or the transition metal compound/halogen containing compound mixture/olefin mixture); or alternatively, the nitrogen containing compound and the metal hydrocarbyl compound can be added sequentially (in any order) to the transition metal compound/olefin mixture (or the transition metal compound/halogen containing compound mixture/olefin mixture). In some embodiments, the transition metal compound/olefin mixture (or the transition metal compound/halogen containing compound mixture/olefin mixture) can be added to the nitrogen containing compound/metal hydrocarbyl compound mixture; or alternatively, the nitrogen containing compound/metal hydrocarbyl compound mixture can be added to the transition metal compound/olefin mixture (or the transition metal compound/halogen containing compound mixture/olefin mixture). In other embodiments, the transition metal compound/olefin mixture (or the transition metal compound/halogen containing compound mixture/olefin mixture) and the nitrogen containing compound/metal hydrocarbyl compound mixture can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options.

In a non-limiting embodiment, the process for trimerizing an olefin can comprise 1) contacting a nitrogen containing compound and the olefin to form a nitrogen containing compound/olefin mixture, and 2) contacting the nitrogen containing compound/olefin mixture, a metal hydrocarbyl compound, and a transition metal compound (or a transition metal compound/halogen containing compound mixture) to produce a trimerization product. In some embodiments, the nitrogen containing compound can be added to the olefin; alternatively, the olefin can be added to the nitrogen containing compound. In other embodiments, the nitrogen containing compound and the olefin can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In some embodiments, the transition metal compound (or the transition metal compound/halogen containing compound mixture), the metal hydrocarbyl compound, and the nitrogen containing compound/olefin mixture can be contacted substantially simultaneously (alternatively, contacted simultaneously; or alternatively, any contacted simultaneously percentage described herein); e.g., substantially simultaneously (alternatively, contacted simultaneously; or alternatively, any contacted simultaneously percentage described herein) added to a reactor, or a solvent, among other options. In other embodiments the transition metal compound (or the transition metal compound/halogen containing compound mixture) and the metal hydrocarbyl compound can be substantially simultaneously (alternatively, simultaneously; or alternatively, any simultaneous percentage described herein) added to the nitrogen containing compound/olefin mixture. In yet other embodiments, the transition metal compound (or the transition metal compound/halogen containing compound mixture) and the metal hydrocarbyl compound can be contacted sequentially (in any order) with the nitrogen containing compound/olefin mixture; or alternatively, the transition metal compound (or the transition metal compound/halogen containing compound mixture) and the metal hydrocarbyl compound can be added sequentially (in any order) to the nitrogen containing compound/olefin mixture.

In a non-limiting embodiment, the process for trimerizing an olefin can comprise 1) contacting a metal hydrocarbyl compound and the olefin to form a metal hydrocarbyl compound/olefin mixture, and 2) contacting the metal hydrocarbyl compound/olefin mixture, a nitrogen containing compound, and a transition metal hydrocarbyl compound (or a transition metal hydrocarbyl compound/halogen containing compound mixture) to produce a trimerization product. In some embodiments, the metal hydrocarbyl compound can be added to the olefin; alternatively, the olefin can be added to the metal hydrocarbyl compound. In other embodiments, the metal hydrocarbyl compound and the olefin can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In some embodiments, the transition metal compound (or the transition metal compound/halogen containing compound mixture), the nitrogen containing compound, and the metal hydrocarbyl compound/olefin mixture can be contacted substantially simultaneously (alternatively, contacted simultaneously; or alternatively, any contacted simultaneously percentage described herein); e.g., substantially simultaneously (alternatively, contacted simultaneously; or alternatively, any contacted simultaneously percentage described herein) added to a reactor, or a solvent, among other options. In other embodiments the transition metal compound (or the transition metal compound/halogen containing compound mixture) and the nitrogen containing compound can be substantially simultaneously (alternatively, simultaneously; or alternatively, any simultaneous percentage described herein) added to the metal hydrocarbyl compound/olefin mixture. In yet other embodiments, the transition metal compound (or the transition metal compound/halogen containing compound mixture) and the nitrogen containing compound can be contacted sequentially (in any order) with the metal hydrocarbyl compound/olefin mixture; or alternatively, the transition metal compound (or the transition metal compound/halogen containing compound mixture) and the nitrogen containing compound can be added sequentially (in any order) to the metal hydrocarbyl compound/olefin mixture.

In a non-limiting embodiment, the process for trimerizing an olefin can comprise contacting a nitrogen containing compound/metal hydrocarbyl compound/olefin mixture with a transition metal compound (or a transition metal compound/halogen containing compound mixture) to produce a trimerization product. In an embodiment, the nitrogen containing compound/metal hydrocarbyl compound/olefin mixture can be formed by contacting a nitrogen containing compound, a metal hydrocarbyl compound, and the olefin to form a nitrogen containing compound/metal hydrocarbyl compound/olefin mixture; alternatively, 1) contacting a nitrogen containing compound and the olefin to form a nitrogen containing compound/olefin mixture, and 2) contacting the nitrogen containing compound/olefin mixture and a metal hydrocarbyl compound to form a nitrogen containing compound/metal hydrocarbyl compound/olefin mixture; alternatively, 1) contacting a metal hydrocarbyl compound and the olefin to form a metal hydrocarbyl compound/olefin mixture, and 2) contacting the metal hydrocarbyl compound/olefin mixture and a nitrogen containing compound to form a nitrogen containing compound/metal hydrocarbyl compound/olefin mixture; or alternatively, contacting a nitrogen containing compound/metal hydrocarbyl compound mixture with an olefin to form the nitrogen containing compound/metal hydrocarbyl compound/olefin mixture. Methods of contacting the nitrogen containing compound and the olefin are described herein within other olefin and catalyst system component contact methods and can be utilized without limitation within the present method(s). Methods of contacting the metal hydrocarbyl compound and the olefin are described herein within other olefin and catalyst system component contact methods and can be utilized without limitation within the present method(s). In an embodiment, the nitrogen containing compound/metal hydrocarbyl compound/olefin mixture can be formed by contacting the nitrogen containing compound, the halogen containing compound, and the olefin substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In some embodiments, the nitrogen containing compound/metal hydrocarbyl compound/olefin mixture can be formed by adding the metal hydrocarbyl compound to the nitrogen containing compound/olefin mixture; or alternatively, adding the nitrogen containing compound/olefin mixture to the metal hydrocarbyl compound. In other embodiments, the nitrogen containing compound/metal hydrocarbyl compound/olefin mixture can be formed by contacting the metal hydrocarbyl compound and the nitrogen containing compound/olefin mixture substantially simultaneously (alternatively, simultaneously; or alternatively, any simultaneous percentage described herein); e.g., substantially simultaneously (alternatively, simultaneously; or alternatively, any simultaneous percentage described herein) added to a reactor, or a solvent, among other options. In some embodiments, the nitrogen containing compound/metal hydrocarbyl compound/olefin mixture can be formed by adding the nitrogen containing compound to the metal hydrocarbyl compound/olefin mixture; or alternatively, adding the metal hydrocarbyl compound/olefin mixture to the nitrogen containing compound. In other embodiments, the nitrogen containing compound/metal hydrocarbyl compound/olefin mixture can be formed by contacting the nitrogen containing compound and the metal hydrocarbyl compound/olefin mixture substantially simultaneously (alternatively, simultaneously; or alternatively, any simultaneous percentage described herein); e.g., substantially simultaneously (alternatively, simultaneously; or alternatively, any simultaneous percentage described herein) added to a reactor, or a solvent, among other options. In some embodiments, the nitrogen containing compound/metal hydrocarbyl compound/olefin mixture can be formed by adding the olefin to the nitrogen containing compound/metal hydrocarbyl compound mixture; or alternatively, adding the nitrogen containing compound/metal hydrocarbyl compound mixture to the olefin. In other embodiments, the nitrogen containing compound/metal hydrocarbyl compound/olefin mixture can be formed by contacting the olefin and the nitrogen containing compound/metal hydrocarbyl compound mixture substantially simultaneously (alternatively, simultaneously; or alternatively, any simultaneous percentage described herein); e.g., substantially simultaneously (alternatively, simultaneously; or alternatively, any simultaneous percentage described herein) added to a reactor, or a solvent, among other options. In an embodiment, the transition metal compound (or the transition metal compound/halogen containing compound mixture) can be added to the nitrogen containing compound/metal hydrocarbyl compound/olefin mixture; or alternatively, the nitrogen containing compound/metal hydrocarbyl compound/olefin mixture can be added to the transition metal compound (or the transition metal compound/halogen containing compound mixture). In some embodiments, the transition metal compound (or the transition metal compound/halogen containing compound mixture) and the nitrogen containing compound/metal hydrocarbyl compound/olefin mixture can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options.

In a non-limiting embodiment, the process for trimerizing an olefin can comprise contacting a transition metal compound, a nitrogen containing compound, the olefin, and a metal hydrocarbyl compound (or a metal hydrocarbyl compound/halogen containing compound mixture) to produce a trimerization product. In some embodiments, the transition metal compound, the nitrogen containing compound, and the olefin can be added to the metal hydrocarbyl compound (or the metal hydrocarbyl compound/halogen containing compound mixture); or alternatively, the transition metal compound, the nitrogen containing compound, and the olefin, can be substantially simultaneously (alternatively, contacted simultaneously; or alternatively, any contacted simultaneously percentage described herein) added to the metal hydrocarbyl compound (or the metal hydrocarbyl compound/halogen containing compound mixture). In other embodiments, the transition metal compound, the nitrogen containing compound, and the olefin can be contacted sequentially (in any order) with the metal hydrocarbyl compound (or the metal hydrocarbyl compound/halogen containing compound mixture); or alternatively, the transition metal compound, the nitrogen containing compound, and the olefin can be added sequentially (in any order) to the metal hydrocarbyl compound (or the metal hydrocarbyl compound/halogen containing compound mixture).

In a non-limiting embodiment, the process for trimerizing an olefin can comprise 1) contacting a transition metal compound and the olefin to form a transition metal compound/olefin mixture, and 2) contacting the transition metal compound/olefin mixture, a metal hydrocarbyl compound, and a transition metal compound (or a transition metal compound/halogen containing compound mixture) to produce a trimerization product. Methods of contacting the transition metal compound and the olefin are described herein within other olefin and catalyst system component contact methods and can be utilized without limitation within the present method. In some embodiments, the metal hydrocarbyl compound (or the metal compound/halogen containing compound mixture), the nitrogen containing compound, and the transition metal compound/olefin mixture can be contacted substantially simultaneously (alternatively, contacted simultaneously; or alternatively, any contacted simultaneously percentage described herein); e.g., substantially simultaneously (alternatively, contacted simultaneously; or alternatively, any contacted simultaneously percentage described herein) added to a reactor, or a solvent, among other options. In other embodiments the metal hydrocarbyl compound (or the metal hydrocarbyl compound/halogen containing compound mixture) and the nitrogen containing compound can be substantially simultaneously (alternatively, simultaneously; or alternatively, any simultaneous percentage described herein) added to the transition metal compound/olefin mixture. In yet other embodiments, the metal hydrocarbyl compound (or the metal hydrocarbyl compound/halogen containing compound mixture) and the nitrogen containing compound can be contacted sequentially (in any order) with the transition metal compound/olefin mixture; or alternatively, the metal hydrocarbyl compound (or the metal hydrocarbyl compound/halogen containing compound mixture) and the nitrogen containing compound can be added sequentially (in any order) to the transition metal compound/olefin mixture.

In a non-limiting embodiment, the process for trimerizing an olefin can comprise 1) contacting a nitrogen containing compound and the olefin to form a nitrogen containing compound/olefin mixture, and 2) contacting the nitrogen containing compound/olefin mixture, a transition metal compound, and a metal hydrocarbyl compound (or a metal hydrocarbyl compound/halogen containing compound mixture) to produce a trimerization product. Methods of contacting the nitrogen containing compound and the olefin are described herein within other olefin and catalyst system component contact methods and can be utilized without limitation within the present method. In some embodiments, the metal hydrocarbyl compound (or the metal compound/halogen containing compound mixture), the transition metal compound, and the nitrogen containing compound/olefin mixture can be contacted substantially simultaneously (alternatively, contacted simultaneously; or alternatively, any contacted simultaneously percentage described herein); e.g., substantially simultaneously (alternatively, contacted simultaneously; or alternatively, any contacted simultaneously percentage described herein) added to a reactor, or a solvent, among other options. In other embodiments the metal hydrocarbyl compound (or the metal hydrocarbyl compound/halogen containing compound mixture) and the transition metal compound can be substantially simultaneously (alternatively, simultaneously; or alternatively, any simultaneous percentage described herein) added to the nitrogen containing compound/olefin mixture. In yet other embodiments, the metal hydrocarbyl compound (or the metal hydrocarbyl compound/halogen containing compound mixture) and the transition metal compound can be contacted sequentially (in any order) with the nitrogen containing compound/olefin mixture; or alternatively, the metal hydrocarbyl compound (or the metal hydrocarbyl compound/halogen containing compound mixture) and the transition hydrocarbyl compound can be added sequentially (in any order) to the nitrogen containing compound/olefin mixture.

In a non-limiting embodiment, the process for trimerizing an olefin can comprise contacting a transition metal compound/nitrogen containing compound/olefin mixture with a metal hydrocarbyl compound (or a metal hydrocarbyl compound/halogen containing compound mixture) to produce a trimerization product. In an embodiment, the transition metal compound/nitrogen containing compound/olefin mixture can be formed by contacting a transition metal compound, a nitrogen containing compound, and an olefin to form a transition metal compound/nitrogen containing compound/olefin mixture; alternatively, 1) contacting a transition metal compound and the olefin to form a transition metal compound/olefin mixture, and 2) contacting the transition metal compound/olefin mixture and a nitrogen containing compound to form a transition metal compound/nitrogen containing compound/olefin mixture; alternatively, 1) contacting a nitrogen containing compound and the olefin to form a nitrogen containing compound/olefin mixture, and 2) contacting the nitrogen containing compound/olefin mixture and a transition metal compound to form a transition metal compound/nitrogen containing compound/olefin mixture; or alternatively, contacting a transition metal compound/nitrogen containing compound mixture with an olefin to form a transition metal compound/nitrogen containing compound/olefin mixture. Methods of contacting the transition metal compound and the olefin are described herein within other olefin and catalyst system component contact methods and can be utilized without limitation within the present method(s). Methods of contacting the nitrogen containing compound and the olefin are described herein within other olefin and catalyst system component contact methods and can be utilized without limitation within the present method(s). In some embodiments, the nitrogen containing compound can be added to the transition metal compound/olefin mixture. In other embodiments, the nitrogen containing compound and the transition metal compound/olefin mixture can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In some embodiments, the transition metal compound can be added to the nitrogen containing compound/olefin mixture. In other embodiments, the transition metal compound and the nitrogen containing compound/olefin mixture can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In yet other embodiments, the transition metal compound, the nitrogen containing compound, and the olefin can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In an embodiment, the metal hydrocarbyl compound (or the metal hydrocarbyl compound/halogen containing compound mixture) can be added to the transition metal compound/nitrogen containing compound/olefin mixture; alternatively, the transition metal compound/nitrogen containing compound/olefin mixture can be added to the metal hydrocarbyl compound (or the metal hydrocarbyl compound/halogen containing compound mixture). In some embodiments, the metal hydrocarbyl compound (or the metal hydrocarbyl compound/halogen containing compound mixture) and the transition metal/nitrogen containing compound/olefin mixture can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options.

In a non-limiting embodiment, the process for trimerizing an olefin can comprise contacting a metal hydrocarbyl compound, the olefin, and a transition metal compound/nitrogen containing compound mixture to produce a trimerization product. In an embodiment, the metal hydrocarbyl compound and the olefin can be added to the transition metal compound/nitrogen containing compound mixture; or alternatively, the metal hydrocarbyl compound and the olefin can be substantially simultaneously (alternatively, contacted simultaneously; or alternatively, any contacted simultaneously percentage described herein) added to the transition metal compound/nitrogen containing compound mixture. In some embodiments, the metal hydrocarbyl compound, the olefin, and the transition metal compound/nitrogen containing compound mixture can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options In a non-limiting embodiment, the process for trimerizing an olefin can comprise 1) contacting a metal hydrocarbyl compound and an olefin to form a metal hydrocarbyl compound/olefin mixture, and 2) contacting the metal hydrocarbyl compound/olefin mixture and a transition metal compound/nitrogen containing compound mixture to produce a trimerization product. Methods of contacting the metal hydrocarbyl compound and the olefin are described herein within other olefin and catalyst system component contact methods and can be utilized without limitation within the present method(s). In an embodiment, the metal hydrocarbyl compound/olefin mixture can be added to the transition metal compound/nitrogen containing compound mixture. In some embodiments, the transition metal compound/nitrogen containing compound mixture can be added to the metal hydrocarbyl compound/olefin mixture. In other embodiments, the transition metal compound/nitrogen containing compound mixture and the metal hydrocarbyl compound/olefin mixture can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options.

In a non-limiting embodiment, the process for trimerizing an olefin can comprise contacting a metal hydrocarbyl compound, a halogen containing compound, the olefin, and a transition metal compound/nitrogen containing compound mixture to produce a trimerization product. In an embodiment, the metal hydrocarbyl compound, the halogen containing compound, and the olefin can be added to the transition metal compound/nitrogen containing compound mixture; or alternatively, the metal hydrocarbyl compound, the halogen containing compound, and the olefin can be substantially simultaneously (alternatively, contacted simultaneously; or alternatively, any contacted simultaneously percentage described herein) added to the transition metal compound/nitrogen containing compound mixture. In some embodiments, the metal hydrocarbyl compound, the halogen containing compound, the olefin, and the transition metal compound/nitrogen containing compound mixture can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options In a non-limiting embodiment, the process for trimerizing an olefin can comprise contacting a metal hydrocarbyl compound/halogen containing compound/olefin mixture and a transition metal containing compound/nitrogen containing compound mixture to produce a trimerization product. In an embodiment, the metal hydrocarbyl compound/halogen containing compound/olefin mixture can be formed by contacting a metal hydrocarbyl compound, a halogen containing compound, and an olefin; alternatively, 1) contacting the metal hydrocarbyl compound and the olefin to form a metal hydrocarbyl compound/olefin mixture, and 2) contacting the metal hydrocarbyl compound/olefin mixture and the halogen containing compound; alternatively, 1) contacting the halogen containing compound and the olefin to form a halogen containing compound/olefin mixture, and 2) contacting the halogen containing compound/olefin mixture and the metal hydrocarbyl compound; or alternatively, contacting a metal hydrocarbyl compound/halogen containing compound mixture and the olefin. In some embodiments, the metal hydrocarbyl compound/halogen containing compound/olefin mixture can be formed by contacting the metal hydrocarbyl compound, the halogen containing compound, and the olefin substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. Methods of contacting the metal hydrocarbyl compound and the olefin are described herein within other olefin and catalyst system component contact methods and can be utilized without limitation within the present method(s). In an embodiment, the halogen containing compound can be added to the olefin; alternatively, the olefin can be added to the halogen containing compound; or alternatively, the halogen containing compound and the olefin can be contacted substantially simultaneously (alternatively, contacted simultaneously; or alternatively, any contacted simultaneously percentage described herein). In an embodiment, the metal hydrocarbyl compound/halogen containing compound/olefin mixture can be added to the transition metal compound/nitrogen containing compound mixture. In some embodiments, the transition metal compound/nitrogen containing compound mixture can be added to the metal hydrocarbyl compound/halogen containing compound/olefin mixture. In other embodiments, the transition metal compound/nitrogen containing compound mixture and metal hydrocarbyl compound/halogen containing compound/olefin mixture can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options.

In a non-limiting embodiment, the process for trimerizing an olefin can comprise contacting a transition metal compound, the olefin, and a nitrogen containing compound/metal hydrocarbyl compound mixture to produce a trimerization product. In some embodiments, the transition metal compound and the olefin can be added to the nitrogen containing compound/metal hydrocarbyl compound mixture; or alternatively, the transition metal compound and the olefin can be substantially simultaneously (alternatively, contacted simultaneously; or alternatively, any contacted simultaneously percentage described herein) added to the nitrogen containing compound/metal hydrocarbyl compound mixture. In other embodiments, the transition metal compound and the olefin can be contacted sequentially (in any order) with the nitrogen containing compound/metal hydrocarbyl compound mixture; or alternatively, the transition metal compound and the olefin can be added sequentially (in any order) to the nitrogen containing compound/metal hydrocarbyl compound mixture.

In a non-limiting embodiment, the process for trimerizing an olefin can comprise contacting a transition metal compound, a halogen containing compound, the olefin, and a nitrogen containing compound/metal hydrocarbyl compound mixture to produce a trimerization product. In some embodiments, the transition metal compound, the halogen containing compound, and the olefin can be added to the nitrogen containing compound/metal hydrocarbyl compound mixture; or alternatively, the transition metal compound, the halogen containing compound, and the olefin can be substantially simultaneously (alternatively, contacted simultaneously; or alternatively, any contacted simultaneously percentage described herein) added to the nitrogen containing compound/metal hydrocarbyl compound mixture. In other embodiments, the transition metal compound, the halogen containing compound, and the olefin can be contacted sequentially (in any order) with the nitrogen containing compound/metal hydrocarbyl compound mixture; or alternatively, the transition metal compound, the halogen containing compound, and the olefin can be added sequentially (in any order) to the nitrogen containing compound/metal hydrocarbyl compound mixture.

In a non-limiting embodiment, the process for trimerizing an olefin can comprise contacting a transition metal compound/halogen containing compound/olefin mixture and a nitrogen containing compound/metal hydrocarbyl compound mixture to produce a trimerization product. In an embodiment, the transition metal compound/halogen containing compound/olefin mixture can be formed by contacting a transition metal compound, a halogen containing compound, and an olefin; alternatively, 1) contacting a transition metal compound and an olefin to form a transition metal compound/olefin mixture, and 2) contacting the transition metal compound/olefin mixture and a halogen containing compound; alternatively, 1) contacting a halogen containing compound and an olefin to form a halogen containing compound/olefin mixture, and 2) contacting the halogen containing compound/olefin mixture and a metal hydrocarbyl compound; or alternatively, contacting a transition metal compound/halogen containing compound and an olefin. In some embodiments, the transition metal compound/halogen containing compound/olefin mixture can be formed contacting a transition metal compound, a halogen containing compound, and an olefin substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. Methods of contacting the transition metal compound and the olefin are described herein within other olefin and catalyst system component contact methods and can be utilized without limitation within the present method(s). Methods of contacting the halogen containing compound and the olefin are described herein within other olefin and catalyst system component contact methods and can be utilized without limitation within the present method(s). In an embodiment, the transition metal compound/halogen containing compound/olefin mixture can be added to the nitrogen containing compound/metal hydrocarbyl compound mixture. In some embodiments, the nitrogen containing compound/metal hydrocarbyl compound mixture can be added to the transition metal compound/halogen containing compound/olefin mixture. In other embodiments, the nitrogen containing compound/metal hydrocarbyl compound mixture and the transition metal compound/halogen containing compound/olefin mixture can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options.

In a non-limiting embodiment, the process for trimerizing an olefin can comprise contacting a transition metal compound, a nitrogen containing compound, the olefin, and metal hydrocarbyl compound mixture to produce a trimerization product. In some embodiments, the transition metal compound, the nitrogen containing compound, and the olefin can be added to the metal hydrocarbyl compound; or alternatively, the transition metal compound, the nitrogen containing compound, and the olefin can be substantially simultaneously (alternatively, contacted simultaneously; or alternatively, any contacted simultaneously percentage described herein) added to the metal hydrocarbyl compound. In other embodiments, the transition metal compound, the nitrogen containing compound, and the olefin can be contacted sequentially (in any order) with the metal hydrocarbyl compound mixture; or alternatively, the transition metal compound, the nitrogen containing compound, and the olefin can be added sequentially (in any order) to the metal hydrocarbyl compound.

In a non-limiting embodiment, the process for trimerizing an olefin can comprise contacting a transition metal compound/nitrogen containing compound mixture, an olefin, and a metal hydrocarbyl compound to produce a trimerization product; alternatively, contacting a transition metal compound/olefin mixture, a nitrogen containing compound, and a metal hydrocarbyl compound to produce a trimerization product; or alternatively, contacting a nitrogen containing compound/olefin mixture, a transition metal compound, and a metal hydrocarbyl compound to produce a trimerization product. Methods of contacting the transition metal compound and the olefin to form a transition metal compound/olefin mixture are described herein within other olefin and catalyst system component contact methods and can be utilized without limitation within the present method(s). Methods of contacting the nitrogen containing compound and the olefin to form a nitrogen containing compound/olefin mixture are described herein within other olefin and catalyst system component contact methods and can be utilized without limitation within the present method(s). In an embodiment, the transition metal compound/nitrogen containing compound mixture and the olefin can be substantially simultaneously (alternatively, simultaneously; or alternatively, any simultaneous percentage described herein) added to the metal hydrocarbyl compound; alternatively, the transition metal compound/nitrogen containing compound mixture and the metal hydrocarbyl compound can be substantially simultaneously (alternatively, simultaneously; or alternatively, any simultaneous percentage described herein) added to the olefin; or alternatively, the metal hydrocarbyl compound and the olefin can be substantially simultaneously (alternatively, simultaneously; or alternatively, any simultaneous percentage described herein) added to the transition metal compound/nitrogen containing compound mixture. In some embodiments, the transition metal compound/nitrogen containing compound mixture, the olefin, and the metal hydrocarbyl compound can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In an embodiment, the transition metal compound/olefin mixture and the nitrogen containing compound can be substantially simultaneously (alternatively, simultaneously; or alternatively, any simultaneous percentage described herein) added to the metal hydrocarbyl compound; alternatively, the transition metal compound/olefin mixture and the metal hydrocarbyl compound can be substantially simultaneously (alternatively, simultaneously; or alternatively, any simultaneous percentage described herein) added to the nitrogen containing compound; or alternatively, the metal hydrocarbyl compound and the nitrogen containing compound can be substantially simultaneously (alternatively, simultaneously; or alternatively, any simultaneous percentage described herein) added to the transition metal compound/olefin mixture. In some embodiments, the transition metal compound/olefin mixture and the nitrogen containing compound can be sequentially added to (in any order) the metal hydrocarbyl compound; alternatively, the transition metal compound/olefin mixture and the metal hydrocarbyl compound can be sequentially added to (in any order) the nitrogen containing compound; or alternatively, the metal hydrocarbyl compound and the nitrogen containing compound can be sequentially added to (in any order) the transition metal compound/olefin mixture. In other embodiments, the transition metal compound/olefin mixture, the nitrogen containing compound, and the metal hydrocarbyl compound can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In an embodiment, the nitrogen containing compound/olefin mixture and the transition metal compound can be substantially simultaneously (alternatively, simultaneously; or alternatively, any simultaneous percentage described herein) added to the metal hydrocarbyl compound; alternatively, the nitrogen containing compound/olefin mixture and the metal hydrocarbyl compound can be substantially simultaneously (alternatively, simultaneously; or alternatively, any simultaneous percentage described herein) added to the transition metal compound; or alternatively, the metal hydrocarbyl compound and the transition metal compound can be substantially simultaneously (alternatively, simultaneously; or alternatively, any simultaneous percentage described herein) added to the nitrogen containing compound/olefin mixture. In some embodiments, the nitrogen containing compound/olefin mixture, the transition metal compound, and the metal hydrocarbyl compound can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options.

In a non-limiting embodiment, the process for trimerizing an olefin can comprise contacting a transition metal compound, a nitrogen containing compound, a halogen containing compound, the olefin, and metal hydrocarbyl compound mixture to produce a trimerization product. In some embodiments, the transition metal compound, the nitrogen containing compound, the halogen containing compound, and the olefin can be added to the metal hydrocarbyl compound; or alternatively, the transition metal compound, the nitrogen containing compound, the halogen containing compound, and the olefin can be substantially simultaneously (alternatively, contacted simultaneously; or alternatively, any contacted simultaneously percentage described herein) added to the metal hydrocarbyl compound. In other embodiments, the transition metal compound, the nitrogen containing compound, the halogen containing compound, and the olefin can be contacted sequentially (in any order) with the metal hydrocarbyl compound; or alternatively, the transition metal compound, the nitrogen containing compound, the halogen containing compound, and the olefin can be added sequentially (in any order) to the metal hydrocarbyl compound.

In a non-limiting embodiment, the process for trimerizing an olefin can comprise contacting a transition metal compound/nitrogen containing compound/halogen containing compound mixture, the olefin, and a metal hydrocarbyl compound to produce a trimerization product; alternatively, contacting a transition metal compound/nitrogen containing compound/olefin mixture, a halogen containing compound, and a metal hydrocarbyl compound to produce a trimerization product; alternatively, contacting a transition metal compound/halogen containing compound/olefin mixture, a nitrogen containing compound, and a metal hydrocarbyl compound to produce a trimerization product; or alternatively, contacting a nitrogen containing compound/halogen containing compound/olefin mixture, a transition metal compound, and a metal hydrocarbyl compound to produce a trimerization product. Methods of forming a transition metal compound/nitrogen containing compound/halogen containing compound mixture are described herein within other olefin and catalyst system component contact methods and can be utilized without limitation within the present method(s). Methods of forming a transition metal compound/nitrogen containing compound/olefin mixture are described herein within other olefin and catalyst system component contact methods and can be utilized without limitation within the present method(s). Methods of forming a transition metal compound/halogen containing compound/olefin mixture are described herein within other olefin and catalyst system component contact methods and can be utilized without limitation within the present method(s).

In an embodiment, the nitrogen containing compound/halogen containing compound/olefin mixture can be formed by contacting a nitrogen containing compound, a halogen containing compound, and an olefin to form a nitrogen containing compound/halogen containing compound/olefin mixture; alternatively, contacting a nitrogen containing compound and an olefin to form a nitrogen containing compound/olefin mixture, and 2) contacting the nitrogen containing compound/olefin mixture and a halogen containing compound to form a nitrogen containing compound/halogen containing compound/olefin mixture; alternatively, 1) contacting a halogen containing compound and an olefin to form a halogen containing compound/olefin mixture, and 2) contacting the halogen containing compound/olefin mixture and a nitrogen containing compound to form a nitrogen containing compound/halogen containing compound/olefin mixture; or alternatively, contacting a nitrogen containing compound/halogen containing compound mixture and an olefin to form a nitrogen containing compound/halogen containing compound/olefin mixture. In an embodiment, the nitrogen containing compound/halogen containing compound/olefin mixture can be formed by contacting the nitrogen containing compound, the halogen containing compound, and the olefin substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In some embodiments, the nitrogen containing compound/halogen containing compound/olefin mixture can be formed by adding the nitrogen containing compound/olefin mixture to the halogen containing compound; alternatively, adding the halogen containing compound to the nitrogen containing compound/olefin mixture; or alternatively contacting substantially simultaneously (alternatively, contacted simultaneously; or alternatively, any contacted simultaneously percentage described herein) the nitrogen containing compound/olefin mixture and the halogen containing compound (e.g., substantially simultaneously, alternatively, simultaneously, or alternatively, any simultaneous percentage described herein, added to a reactor, or a solvent, among other options). In some embodiments, the nitrogen containing compound/halogen containing compound/olefin mixture can be formed by adding the halogen containing compound/olefin mixture to the nitrogen containing compound; alternatively, adding the nitrogen containing compound to the halogen containing compound/olefin mixture; or alternatively contacting substantially simultaneously (alternatively, contacted simultaneously; or alternatively, any contacted simultaneously percentage described herein) the halogen containing compound/olefin mixture and the nitrogen containing compound (e.g., substantially simultaneously, alternatively, simultaneously, or alternatively, any simultaneous percentage described herein, added to a reactor, or a solvent, among other options). In some embodiments, the nitrogen containing compound/halogen containing compound/olefin mixture can be formed by adding the nitrogen containing compound/halogen containing compound mixture to the olefin; alternatively, adding the olefin to the nitrogen containing compound/halogen containing compound mixture; or alternatively contacting substantially simultaneously (alternatively, contacted simultaneously; or alternatively, any contacted simultaneously percentage described herein) the nitrogen containing compound/halogen containing compound mixture and the olefin (e.g., substantially simultaneously, alternatively, simultaneously, or alternatively, any simultaneous percentage described herein, added to a reactor, or a solvent, among other options). Methods of contacting the nitrogen containing compound and the olefin to form a nitrogen containing compound/olefin mixture are described herein within other olefin and catalyst system component contact methods and can be utilized without limitation within the present method(s). Methods of contacting the halogen containing compound and the olefin to form a halogen containing compound/olefin mixture are described herein within other olefin and catalyst system component contact methods and can be utilized without limitation within the present method(s).

In an embodiment, the transition metal compound/nitrogen containing compound/halogen containing compound mixture and the olefin can be substantially simultaneously (alternatively, simultaneously; or alternatively, any simultaneous percentage described herein) added to the metal hydrocarbyl compound; alternatively, the transition metal compound/nitrogen containing compound/halogen containing compound mixture and the metal hydrocarbyl compound can be substantially simultaneously (alternatively, simultaneously; or alternatively, any simultaneous percentage described herein) added to the olefin; or alternatively, the metal hydrocarbyl compound and the olefin can be substantially simultaneously (alternatively, simultaneously; or alternatively, any simultaneous percentage described herein) added to the transition metal compound/nitrogen containing compound/halogen containing compound mixture. In some embodiments, the transition metal compound/nitrogen containing compound/halogen containing compound mixture, the olefin, and the metal hydrocarbyl compound can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In an embodiment, the transition metal compound/nitrogen containing compound/olefin mixture and the halogen containing compound can be substantially simultaneously (alternatively, simultaneously; or alternatively, any simultaneous percentage described herein) added to the metal hydrocarbyl compound; alternatively, the transition metal compound/ nitrogen containing compound/olefin mixture and the metal hydrocarbyl compound can be substantially simultaneously (alternatively, simultaneously; or alternatively, any simultaneous percentage described herein) added to the halogen containing compound; or alternatively, the metal hydrocarbyl compound and the halogen containing compound can be substantially simultaneously (alternatively, simultaneously; or alternatively, any simultaneous percentage described herein) added to the transition metal compound/nitrogen containing compound/olefin mixture. In some embodiments, the transition metal compound/nitrogen containing compound/olefin mixture and the halogen containing compound can be sequentially added to (in any order) the metal hydrocarbyl compound; alternatively, the transition metal compound/nitrogen containing compound/olefin mixture and the metal hydrocarbyl compound can be sequentially added to (in any order) the halogen containing compound; or alternatively, the metal hydrocarbyl compound and the halogen containing compound can be sequentially added to (in any order) the transition metal compound/nitrogen containing compound/olefin mixture. In other embodiments, the transition metal compound/nitrogen containing compound/ olefin mixture, the halogen containing compound, and the metal hydrocarbyl compound can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In an embodiment, the transition metal compound/halogen containing compound/olefin mixture and the nitrogen containing compound can be substantially simultaneously (alternatively, simultaneously; or alternatively, any simultaneous percentage described herein) added to the metal hydrocarbyl compound; alternatively, the transition metal compound/halogen containing compound/olefin mixture and the metal hydrocarbyl compound can be substantially simultaneously (alternatively, simultaneously; or alternatively, any simultaneous percentage described herein) added to the nitrogen containing compound; or alternatively, the metal hydrocarbyl compound and the nitrogen containing compound can be substantially simultaneously (alternatively, simultaneously; or alternatively, any simultaneous percentage described herein) added to the transition metal compound/halogen containing compound/olefin mixture. In some embodiments, the transition metal compound/halogen containing compound/olefin mixture, the nitrogen containing compound, and the metal hydrocarbyl compound can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In an embodiment, the nitrogen containing compound/halogen containing compound/olefin mixture and the transition metal compound can be substantially simultaneously (alternatively, simultaneously; or alternatively, any simultaneous percentage described herein) added to the metal hydrocarbyl compound; alternatively, the nitrogen containing compound/ halogen containing compound/olefin mixture and the metal hydrocarbyl compound can be substantially simultaneously (alternatively, simultaneously; or alternatively, any simultaneous percentage described herein) added to the transition metal compound; or alternatively, the metal hydrocarbyl compound and the transition metal compound can be substantially simultaneously (alternatively, simultaneously; or alternatively, any simultaneous percentage described herein) added to the nitrogen containing compound/halogen containing compound/olefin mixture. In some embodiments, the nitrogen containing compound/halogen containing compound/olefin mixture, the transition metal compound, and the metal hydrocarbyl compound can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options.

In a non-limiting embodiment, the process for trimerizing an olefin can comprise contacting a transition metal compound/nitrogen containing compound mixture, a halogen containing compound/olefin mixture, and a metal hydrocarbyl compound to produce a trimerization product; alternatively, contacting a transition metal compound/halogen containing compound mixture, a nitrogen containing compound/olefin mixture, and a metal hydrocarbyl compound to produce a trimerization product; or alternatively, contacting a transition metal compound/olefin mixture, a nitrogen containing compound/halogen containing compound mixture, and a metal hydrocarbyl compound to produce a trimerization product. Methods of forming a halogen containing compound/olefin mixture are described herein within other olefin and catalyst system component contact methods and can be utilized without limitation within the present method(s). Methods of forming a nitrogen containing compound/olefin mixture are described herein within other olefin and catalyst system component contact methods and can be utilized without limitation within the present method(s). Methods of forming a transition metal compound/olefin mixture are described herein within other olefin and catalyst system component contact methods and can be utilized without limitation within the present method(s).

In an embodiment, the transition metal compound/nitrogen containing compound mixture and halogen containing compound/olefin mixture can be substantially simultaneously (alternatively, simultaneously; or alternatively, any simultaneous percentage described herein) added to the metal hydrocarbyl compound; alternatively, the transition metal compound/nitrogen containing compound mixture and metal hydrocarbyl compound can be substantially simultaneously (alternatively, simultaneously; or alternatively, any simultaneous percentage described herein) added to the halogen containing compound/olefin mixture; or alternatively, the metal hydrocarbyl compound and the halogen containing compound mixture can be substantially simultaneously (alternatively, simultaneously; or alternatively, any simultaneous percentage described herein) added to the transition metal compound/nitrogen containing compound mixture. In some embodiments, the transition metal compound/nitrogen containing compound mixture, halogen containing compound/olefin mixture, and the metal hydrocarbyl compound can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In an embodiment, the transition metal compound/halogen containing compound mixture and nitrogen containing compound/olefin mixture can be substantially simultaneously (alternatively, simultaneously; or alternatively, any simultaneous percentage described herein) added to the metal hydrocarbyl compound; alternatively, the transition metal compound/halogen containing compound mixture and metal hydrocarbyl compound can be substantially simultaneously (alternatively, simultaneously; or alternatively, any simultaneous percentage described herein) added to the nitrogen containing compound/olefin mixture; or alternatively, the metal hydrocarbyl compound and the nitrogen containing compound/olefin mixture can be substantially simultaneously (alternatively, simultaneously; or alternatively, any simultaneous percentage described herein) added to the transition metal compound/halogen containing compound mixture. In some embodiments, the transition metal compound/halogen containing compound mixture, the nitrogen containing compound/olefin mixture, and the metal hydrocarbyl compound can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In an embodiment, the transition metal compound/olefin mixture and nitrogen containing compound/halogen containing compound mixture can be substantially simultaneously (alternatively, simultaneously; or alternatively, any simultaneous percentage described herein) added to the metal hydrocarbyl compound; alternatively, the transition metal compound/olefin mixture and metal hydrocarbyl compound can be substantially simultaneously (alternatively, simultaneously; or alternatively, any simultaneous percentage described herein) added to the nitrogen containing compound/halogen containing compound mixture; or alternatively, the metal hydrocarbyl compound and the nitrogen containing compound/halogen containing compound mixture can be substantially simultaneously (alternatively, simultaneously; or alternatively, any simultaneous percentage described herein) added to the transition metal compound/olefin mixture. In some embodiments, the transition metal compound/olefin mixture and nitrogen containing compound/halogen containing compound mixture can be sequentially added to (in any order) the metal hydrocarbyl compound; alternatively, the transition metal compound/olefin mixture and metal hydrocarbyl compound can be sequentially added to (in any order) the nitrogen containing compound/halogen containing compound mixture; or alternatively, the metal hydrocarbyl compound and the nitrogen containing compound/halogen containing compound mixture can be sequentially added to (in any order) the transition metal compound/olefin mixture. In other embodiments, the transition metal compound/olefin mixture, the nitrogen containing compound/halogen containing compound mixture, and the metal hydrocarbyl compound can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options.

In a non-limiting embodiment, the process for trimerizing an olefin can comprise contacting a nitrogen containing compound, a metal hydrocarbyl compound, the olefin, and a transition metal compound to produce a trimerization product. In some embodiments, the nitrogen containing compound, the metal hydrocarbyl compound and the olefin can be added to the transition metal compound; or alternatively, the nitrogen containing compound, the metal hydrocarbyl compound and the olefin can be substantially simultaneously (alternatively, contacted simultaneously; or alternatively, any contacted simultaneously percentage described herein) added to the transition metal compound. In other embodiments, the nitrogen containing compound, the metal hydrocarbyl compound and the olefin can be contacted sequentially (in any order) with the transition metal compound; or alternatively, the nitrogen containing compound, the metal hydrocarbyl compound and the olefin can be added sequentially (in any order) to the transition metal compound.

In a non-limiting embodiment, the process for trimerizing an olefin can comprise contacting a nitrogen containing compound/metal hydrocarbyl compound mixture, an olefin, and a transition metal compound to produce a trimerization product; alternatively, contacting a nitrogen containing compound/olefin mixture, a metal hydrocarbyl compound, and a transition metal compound to produce a trimerization product; or alternatively, contacting a metal hydrocarbyl compound/olefin mixture, a nitrogen containing compound, and a transition metal compound to produce a trimerization product. Methods of contacting the nitrogen containing compound and the olefin to form a nitrogen containing compound/olefin mixture are described herein within other olefin and catalyst system component contact methods and can be utilized without limitation within the present method(s). Methods of contacting the metal hydrocarbyl compound and the olefin to form a metal hydrocarbyl compound/olefin mixture are described herein within other olefin and catalyst system component contact methods and can be utilized without limitation within the present method(s). In an embodiment, the nitrogen containing compound/metal hydrocarbyl compound mixture and the olefin can be substantially simultaneously (alternatively, simultaneously; or alternatively, any simultaneous percentage described herein) added to the transition metal compound; alternatively, the nitrogen containing compound/metal hydrocarbyl compound mixture and the transition metal compound can be substantially simultaneously (alternatively, simultaneously; or alternatively, any simultaneous percentage described herein) added to the olefin; or alternatively, the transition metal compound and the olefin can be substantially simultaneously (alternatively, simultaneously; or alternatively, any simultaneous percentage described herein) added to the nitrogen containing compound/metal hydrocarbyl compound mixture. In some embodiments, the nitrogen containing compound/metal hydrocarbyl compound mixture, the olefin, and the transition metal compound can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In an embodiment, the nitrogen containing compound/olefin mixture and the metal hydrocarbyl compound can be substantially simultaneously (alternatively, simultaneously; or alternatively, any simultaneous percentage described herein) added to the transition metal compound; alternatively, the nitrogen containing compound/olefin mixture and the transition metal compound can be substantially simultaneously (alternatively, simultaneously; or alternatively, any simultaneous percentage described herein) added to the metal hydrocarbyl compound; or alternatively, the transition metal compound and the metal hydrocarbyl compound can be substantially simultaneously (alternatively, simultaneously; or alternatively, any simultaneous percentage described herein) added to the nitrogen containing compound/olefin mixture. In other embodiments, the nitrogen containing compound/olefin mixture, the metal hydrocarbyl compound, and the transition metal compound can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In an embodiment, the metal hydrocarbyl compound/olefin mixture and the nitrogen containing compound can be substantially simultaneously (alternatively, simultaneously; or alternatively, any simultaneous percentage described herein) added to the transition metal compound; alternatively, the metal hydrocarbyl compound/olefin mixture and the transition metal compound can be substantially simultaneously (alternatively, simultaneously; or alternatively, any simultaneous percentage described herein) added to the nitrogen containing compound; or alternatively, the transition metal compound and the nitrogen containing compound can be substantially simultaneously (alternatively, simultaneously; or alternatively, any simultaneous percentage described herein) added to the metal hydrocarbyl compound/olefin mixture. In an embodiment, the metal hydrocarbyl compound/olefin mixture and the nitrogen containing compound can be sequentially added to (in any order) the transition metal compound; alternatively, the metal hydrocarbyl compound/olefin mixture and the transition metal compound can be sequentially added to (in any order) the nitrogen containing compound; or alternatively, the transition metal compound and the nitrogen containing compound can be sequentially added to (in any order) the metal hydrocarbyl compound/olefin mixture. In some embodiments, the metal hydrocarbyl compound/olefin mixture, the nitrogen containing compound, and the transition metal compound can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options.

In a non-limiting embodiment, the process for trimerizing an olefin can comprise contacting a nitrogen containing compound, a metal hydrocarbyl compound, a halogen containing compound, the olefin, and a transition metal compound to produce a trimerization product. In some embodiments, the nitrogen containing compound, the metal hydrocarbyl compound, the halogen containing compound, and the olefin can be added to the transition metal compound the nitrogen containing compound; or alternatively, the nitrogen containing compound, the metal hydrocarbyl compound, the halogen containing compound, and the olefin can be substantially simultaneously (alternatively, contacted simultaneously; or alternatively, any contacted simultaneously percentage described herein) added to the transition metal compound. In other embodiments, the nitrogen containing compound, the metal hydrocarbyl compound, the halogen containing compound, and the olefin can be contacted sequentially (in any order) with the transition metal compound; or alternatively, the nitrogen containing compound, the metal hydrocarbyl compound, the halogen containing compound, and the olefin can be added sequentially (in any order) to the transition metal compound.

In a non-limiting embodiment, the process for trimerizing an olefin can comprise contacting a nitrogen containing compound/metal hydrocarbyl compound/halogen containing compound mixture, the olefin, and a transition metal compound to produce a trimerization product; alternatively, contacting a nitrogen containing compound/metal hydrocarbyl compound/olefin mixture, a halogen containing compound, and a transition metal compound to produce a trimerization product; alternatively, contacting a nitrogen containing compound/halogen containing compound/olefin mixture, a metal hydrocarbyl compound, and a transition metal compound to produce a trimerization product; or alternatively, contacting a metal hydrocarbyl compound/halogen containing compound/olefin mixture, a nitrogen containing compound, and a transition metal compound to produce a trimerization product. Methods of forming a nitrogen containing compound/metal hydrocarbyl compound/halogen containing compound mixture are described herein within other olefin and catalyst system component contact methods and can be utilized without limitation within the present method(s). Methods of forming a nitrogen containing compound/metal hydrocarbyl compound/olefin mixture are described herein within other olefin and catalyst system component contact methods and can be utilized without limitation within the present method(s). Methods of forming a nitrogen containing compound/halogen containing compound/olefin mixture are described herein within other olefin and catalyst system component contact methods and can be utilized without limitation within the present method(s). Methods of forming a metal hydrocarbyl compound/halogen containing compound/olefin mixture are described herein within other olefin and catalyst system component contact methods and can be utilized without limitation within the present method(s).

In an embodiment, the nitrogen containing compound/metal hydrocarbyl compound/halogen containing compound mixture and the olefin can be substantially simultaneously (alternatively, simultaneously; or alternatively, any simultaneous percentage described herein) added to the transition metal compound; alternatively, the nitrogen containing compound/metal hydrocarbyl compound/halogen containing compound mixture and the transition metal compound can be substantially simultaneously (alternatively, simultaneously; or alternatively, any simultaneous percentage described herein) added to the olefin; or alternatively, the transition metal compound and the olefin can be substantially simultaneously (alternatively, simultaneously; or alternatively, any simultaneous percentage described herein) added to the nitrogen containing compound/metal hydrocarbyl compound/halogen containing compound mixture. In some embodiments, the nitrogen containing compound/metal hydrocarbyl compound/halogen containing compound mixture, the olefin, and the transition metal compound can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In an embodiment, the nitrogen containing compound/metal hydrocarbyl compound/olefin mixture and the halogen containing compound can be substantially simultaneously (alternatively, simultaneously; or alternatively, any simultaneous percentage described herein) added to the transition metal compound; alternatively, the nitrogen containing compound/metal hydrocarbyl compound/olefin mixture and the transition metal compound can be substantially simultaneously (alternatively, simultaneously; or alternatively, any simultaneous percentage described herein) added to the halogen containing compound; or alternatively, the transition metal compound and the halogen containing compound can be substantially simultaneously (alternatively, simultaneously; or alternatively, any simultaneous percentage described herein) added to the nitrogen containing compound/metal hydrocarbyl compound/olefin mixture. In some embodiments, the nitrogen containing compound/metal hydrocarbyl compound/olefin mixture and the halogen containing compound can be sequentially added to (in any order) the transition metal compound; alternatively, the nitrogen containing compound/metal hydrocarbyl compound/olefin mixture and the transition metal compound can be sequentially added to (in any order) the halogen containing compound; or alternatively, the transition metal compound and the halogen containing compound can be sequentially added to (in any order) the nitrogen containing compound/metal hydrocarbyl compound/olefin mixture. In other embodiments, the nitrogen containing compound/metal hydrocarbyl compound/olefin mixture, the halogen containing compound, and the transition metal compound can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In an embodiment, the nitrogen containing compound/halogen containing compound/olefin mixture and the metal hydrocarbyl compound can be substantially simultaneously (alternatively, simultaneously; or alternatively, any simultaneous percentage described herein) added to the transition metal compound; alternatively, the nitrogen containing compound/halogen containing compound/olefin mixture and the transition metal compound can be substantially simultaneously (alternatively, simultaneously; or alternatively, any simultaneous percentage described herein) added to the metal hydrocarbyl compound; or alternatively, the transition metal compound and the metal hydrocarbyl compound can be substantially simultaneously (alternatively, simultaneously; or alternatively, any simultaneous percentage described herein) added to the nitrogen containing compound/halogen containing compound/olefin mixture. In some embodiments, the nitrogen containing compound/halogen containing compound/olefin mixture, the metal hydrocarbyl compound, and the transition metal compound can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In an embodiment, the metal hydrocarbyl compound/halogen containing compound/olefin mixture and the nitrogen containing compound can be substantially simultaneously (alternatively, simultaneously; or alternatively, any simultaneous percentage described herein) added to the transition metal compound; alternatively, the metal hydrocarbyl compound/halogen containing compound/olefin mixture and the transition metal compound can be substantially simultaneously (alternatively, simultaneously; or alternatively, any simultaneous percentage described herein) added to the nitrogen containing compound; or alternatively, the transition metal compound and the nitrogen containing compound can be substantially simultaneously (alternatively, simultaneously; or alternatively, any simultaneous percentage described herein) added to the metal hydrocarbyl compound/halogen containing compound/olefin mixture. In some embodiments, the metal hydrocarbyl compound/halogen containing compound/olefin mixture and the nitrogen containing compound can be sequentially added to (in any order) the transition metal compound; alternatively, the metal hydrocarbyl compound/halogen containing compound/olefin mixture and the transition metal compound can be sequentially added to (in any order) the nitrogen containing compound; or alternatively, the transition metal compound and the nitrogen containing compound can be sequentially added to (in any order) the metal hydrocarbyl compound/halogen containing compound/olefin mixture. In other embodiments, the metal hydrocarbyl compound/halogen containing compound/olefin mixture, the nitrogen containing compound, and the transition metal compound can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options.

In a non-limiting embodiment, the process for trimerizing an olefin can comprise contacting a nitrogen containing compound/metal hydrocarbyl compound mixture, a halogen containing compound/olefin mixture, and a transition metal compound to produce a trimerization product; alternatively, contacting a nitrogen containing compound/halogen containing compound mixture, a metal hydrocarbyl compound/olefin mixture, and a transition metal compound to produce a trimerization product; or alternatively, contacting a nitrogen containing compound/olefin mixture, a metal hydrocarbyl compound/halogen containing compound mixture, and a transition metal compound to produce a trimerization product. Methods of forming a halogen containing compound/ olefin mixture are described herein within other olefin and catalyst system component contact methods and can be utilized without limitation within the present method(s). Methods of forming a metal hydrocarbyl compound/olefin mixture are described herein within other olefin and catalyst system component contact methods and can be utilized without limitation within the present method(s). Methods of forming a nitrogen containing compound/olefin mixture are described herein within other olefin and catalyst system component contact methods and can be utilized without limitation within the present method(s).

In an embodiment, the nitrogen containing compound/ metal hydrocarbyl compound mixture and halogen containing compound/olefin mixture can be substantially simultaneously (alternatively, simultaneously; or alternatively, any simultaneous percentage described herein) added to the transition metal compound; alternatively, the nitrogen containing compound/metal hydrocarbyl compound mixture and transition metal compound can be substantially simultaneously (alternatively, simultaneously; or alternatively, any simultaneous percentage described herein) added to the halogen containing compound/olefin mixture; or alternatively, the transition metal compound and the halogen containing compound mixture can be substantially simultaneously (alternatively, simultaneously; or alternatively, any simultaneous percentage described herein) added to the nitrogen containing compound/metal hydrocarbyl compound mixture. In some embodiments, the nitrogen containing compound/metal hydrocarbyl compound mixture, halogen containing compound/olefin mixture, and the transition metal compound can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In an embodiment, the nitrogen containing compound/halogen containing compound mixture and metal hydrocarbyl compound/olefin mixture can be substantially simultaneously (alternatively, simultaneously; or alternatively, any simultaneous percentage described herein) added to the transition metal compound; alternatively, the nitrogen containing compound/halogen containing compound mixture and transition metal compound can be substantially simultaneously (alternatively, simultaneously; or alternatively, any simultaneous percentage described herein) added to the metal hydrocarbyl compound/olefin mixture; or alternatively, the transition metal compound and the metal hydrocarbyl compound/olefin mixture can be substantially simultaneously (alternatively, simultaneously; or alternatively, any simultaneous percentage described herein) added to the nitrogen containing compound/halogen containing compound mixture. In some embodiments, the nitrogen containing compound/halogen containing compound mixture and metal hydrocarbyl compound/olefin mixture can be sequentially added to (in any order) the transition metal compound; alternatively, the nitrogen containing compound/halogen containing compound mixture and transition metal compound can be sequentially added to (in any order) the metal hydrocarbyl compound/olefin mixture; or alternatively, the transition metal compound and the metal hydrocarbyl compound/olefin mixture can be sequentially added to (in any order) the nitrogen containing compound/halogen containing compound mixture. In other embodiments, the nitrogen containing compound/halogen containing compound mixture, the metal hydrocarbyl compound/olefin mixture, and the transition metal compound can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options. In an embodiment, the nitrogen containing compound/olefin mixture and metal hydrocarbyl compound/halogen containing compound mixture can be substantially simultaneously (alternatively, simultaneously; or alternatively, any simultaneous percentage described herein) added to the transition metal compound; alternatively, the nitrogen containing compound/olefin mixture and transition metal compound can be substantially simultaneously (alternatively, simultaneously; or alternatively, any simultaneous percentage described herein) added to the metal hydrocarbyl compound/halogen containing compound mixture; or alternatively, the transition metal compound and the metal hydrocarbyl compound/halogen containing compound mixture can be substantially simultaneously (alternatively, simultaneously; or alternatively, any simultaneous percentage described herein) added to the nitrogen containing compound/olefin mixture. In other embodiments, the nitrogen containing compound/olefin mixture, the metal hydrocarbyl compound/halogen containing compound mixture, and the transition metal compound can be contacted substantially simultaneously (alternatively, contacted simultaneously; or alternatively, any contacted simultaneously percentage described herein); e.g., substantially simultaneously (alternatively, simultaneously; or alternatively, any simultaneous percentage described herein) added to a reactor, or a solvent, among other options.

In another non-limiting embodiment, the process for trimerizing an olefin can comprise contacting independently and substantially simultaneously (alternatively, contacted simultaneously; or alternatively, any contacted simultaneously percentage described herein) a transition metal compound, a nitrogen containing compound, a metal hydrocarbyl compound, and the olefin to produce a trimerization product. In some embodiments, the process for trimerizing an olefin can comprise introducing independently and substantially simultaneously (alternatively, contacted simultaneously; or alternatively, any contacted simultaneously percentage described herein) the transition metal compound, the nitrogen containing compound, the metal hydrocarbyl compound, and the olefin into a reactor to f produce the trimerization product. In some embodiments, the transition metal compound, the nitrogen containing compound, the metal hydrocarbyl compound, and the olefin can be introduced into the reactor continuously.

In yet another non-limiting embodiment, the process for trimerizing an olefin can comprise contacting a transition metal compound, a nitrogen containing compound, and a metal hydrocarbyl compound independently and substantially simultaneously (alternatively, contacted simultaneously; or alternatively, any contacted simultaneously percentage described herein) with the olefin to form the trimerization product. In some embodiments, the transition metal compound, nitrogen containing compound, and the metal hydrocarbyl compound can be introduced independently and substantially simultaneously (alternatively, contacted simultaneously; or alternatively, any contacted simultaneously percentage described herein) into a reactor containing the olefin. In some embodiments, the transition metal compound, the nitrogen containing compound, and the metal hydrocarbyl compound can be introduced into the reactor continuously.

In another non-limiting embodiment, the process for trimerizing an olefin can comprise contacting independently and substantially simultaneously (alternatively, contacted simultaneously; or alternatively, any contacted simultaneously percentage described herein) a transition metal compound, a nitrogen containing compound, a metal hydrocarbyl compound, a halogen containing compound, and the olefin to produce a trimerization product. In some embodiments, the process for trimerizing an olefin can comprise introducing independently and substantially simultaneously (alternatively, contacted simultaneously; or alternatively, any contacted simultaneously percentage described herein) the transition metal compound, the nitrogen containing compound, the metal hydrocarbyl compound, the halogen containing compound, and the olefin into a reactor to produce the trimerization product. In some embodiments, the transition metal compound, the nitrogen containing compound, the metal hydrocarbyl compound, the halogen containing compound, and the olefin can be introduced into the reactor continuously.

In yet another non-limiting embodiment, the process for trimerizing an olefin can comprise contacting a transition metal compound, a nitrogen containing compound, a metal hydrocarbyl compound and a halogen containing compound independently and substantially simultaneously (alternatively, contacted simultaneously; or alternatively, any contacted simultaneously percentage described herein) with the olefin to form the trimerization product. In some embodiments, the transition metal compound, nitrogen containing compound, the metal hydrocarbyl compound, and the halogen containing compound can be introduced independently and substantially simultaneously (alternatively, contacted simultaneously; or alternatively, any contacted simultaneously percentage described herein) into a reactor containing the olefin. In some embodiments, the transition metal compound, the nitrogen containing compound, the metal hydrocarbyl compound, and the halogen containing compound can be introduced into the reactor continuously.

Various aspects and embodiments of the process for trimerizing an olefin can utilize a transition metal compound/halogen containing compound mixture, a metal hydrocarbyl compound/halogen containing compound mixture, a nitrogen containing compound/metal hydrocarbyl compound mixture, a nitrogen containing compound/halogen containing compound mixture, a transition metal compound/nitrogen containing compound mixture, a transition metal compound/nitrogen containing compound/halogen containing compound mixture, a nitrogen containing compound/metal hydrocarbyl compound mixture, and/or a nitrogen containing compound/metal hydrocarbyl compound/halogen containing compound mixture. Methods for preparing the mixtures are described herein within the process(es) for preparing the catalyst system and these mixtures and methods can be utilized in any manner consistent with any process for trimerizing an olefin.

In an embodiment, a catalyst system component, a catalyst system component mixture, a catalyst system component/olefin mixture, or catalyst system component mixture/olefin mixture to which other catalyst system components can be added (either sequentially, substantially simultaneously, simultaneously, or any simultaneously percentage described herein) can also include a solvent. In such instances, the catalyst system component, the catalyst system component mixture, the catalyst system component/olefin mixture, or the catalyst system component mixture/olefin mixture to which the other catalyst system components can be added (either sequentially, substantially simultaneously, simultaneously, or any simultaneously percentage described herein) can comprise, or consist essentially, of the catalyst system component, the catalyst system component mixture, the catalyst system component/olefin mixture, or the catalyst system component mixture/olefin mixture to which the other catalyst system components can be added (either sequentially; alternatively, substantially simultaneously; alternatively, simultaneously; or alternatively, any simultaneously percentage described herein) and the solvent.

Generally, it should be understood that any olefin trimerization component or olefin trimerization component mixture described herein can comprise the recited element(s) of the olefin trimerization component or olefin trimerization component mixture and as such can contain additional components which are consistent with a particular process for trimerizing an olefin unless specifically recited otherwise. In an embodiment, any olefin trimerization component or olefin trimerization component mixture described herein can comprise the recited element(s) of the olefin trimerization component or olefin trimerization component mixture and an oligomerization solvent and as such can contain additional components which are consistent with the features of a particular process for trimerizing an olefin unless specifically recited otherwise. In some embodiments, any olefin trimerization component or olefin trimerization component mixture described herein can consist essentially of the recited element(s) of the olefin trimerization component or olefin trimerization component mixture and an oligomerization solvent. In other embodiments, any olefin trimerization component or olefin trimerization component mixture described herein can consist essentially of the recited element(s).

In a non-limiting process for trimerizing an olefin embodiment, the olefin can be, comprise, or consist essentially of, ethylene (by which the process can be a process for trimerizing ethylene or an ethylene trimerization process), the transition metal compound can be, comprise, or consist essentially of, a chromium(III) $C_3$-$C_{25}$ carboxylate composition, the nitrogen containing compound can be, comprise, or consist essentially of, a pyrrole compound, the metal hydrocarbyl compound can be, comprise, or consist essentially of, an alkylaluminum compound, and the optional halogen containing compound can be, comprise, or consist essentially of, an alkylaluminum halide or a Group 3, Group 4, Group 5, Group 6 excluding Cr, Group 13, Group 14, or Group 15 inorganic halide. In another non-limiting process for trimerizing an olefin embodiment, the olefin can be, comprise, or consist essentially of, ethylene (by which the process can be a process for trimerizing ethylene or an ethylene trimerization process), the transition metal compound can be, comprise, or consist essentially of, a chromium(III) $C_3$-$C_{25}$ carboxylate composition, the nitrogen containing compound can be, comprise, or consist essentially of, a pyrrole compound, the metal hydrocarbyl compound can be, comprise, or consist essentially of, an alkylaluminum compound (e.g., a trialkylaluminum, an alkylaluminum dihalide, a dialkylaluminum halide, an alkylaluminum sesquihalide, or any combination thereof). In yet another non-limiting process for trimerizing an olefin embodiment, the olefin can be, comprise, or consist essentially of, ethylene (by which the process can be a process for trimerizing ethylene or an ethylene trimerization process), the transition metal compound can be, comprise, or consist essentially of, a chromium(III) $C_3$-$C_{25}$ carboxylate composition, the nitrogen containing compound can be, comprise, or consist essentially of, a pyrrole compound, the metal hydrocarbyl compound can be, comprise, or consist essentially of, a non-halide metal hydrocarbyl compound (e.g., a trialkylaluminum), and the halogen containing compound can be, comprise, or consist essentially of, a Group 3, Group 4, Group 5, Group 6 excluding Cr, Group 13, or Group 14, metal halide compound, or a Group 13, Group 14, or Group 15 non-metal halide. In another non-limiting process for trimerizing an olefin embodiment, the olefin can be, comprise, or consist essentially of, ethylene (by which the process can be a process for trimerizing ethylene or an ethylene trimerization process), the transition metal compound can be, comprise, or consist essentially of, a chromium(III) $C_3$-$C_{25}$ carboxylate composition, the nitrogen containing compound can be, comprise, or consist essentially of, a pyrrole compound, the metal hydrocarbyl compound can be, comprise, or consist essentially of, a non-halide metal hydrocarbyl compound (e.g., a trialkylaluminum), and the halogen containing compound can be, comprise, or consist essentially of, an alkylaluminum halide (e.g., an alkylaluminum dihalide, a dialkylaluminum halide, an alkylaluminum sesquihalide, or any combination thereof). It should be noted that the present disclosure discloses other olefins, transition metal compounds, nitrogen containing compounds, metal hydrocarbyl compounds, and halogen containing compounds. These independently described olefins, transition metal compounds, nitrogen containing compounds, metal hydrocarbyl compounds, and halogen containing compounds are readily apparent from embodiment and aspects within the present disclosure and utilized in any combination to describe other contemplated processes for trimerizing an olefin.

The process for trimerizing an olefin can be performed utilizing the catalyst system(s) described herein, using solution, slurry, and/or gas phase reaction techniques, and/or using conventional equipment and contacting processes. Contacting of the olefin with the catalyst system can be effected by any manner known in the art. One convenient method is to disperse the catalyst system in an organic medium and/or stir or agitate the mixture to maintain a dispersed catalyst system in the organic medium throughout the trimerization process. Other known contacting methods can also be employed.

In an aspect, the process for trimerizing an olefin can utilize an organic medium. In aspects wherein an organic medium is utilized, the catalyst system can be soluble (alternatively, partially soluble; or alternatively, insoluble) in the organic medium. In other aspects, a liquid trimerization product can be miscible (alternatively, partially miscible; or alternatively, immiscible) in the organic medium. In yet other aspects, a solid trimerization product can be soluble (alternatively, partially soluble; or alternatively, insoluble) in the organic medium.

In a non-limiting aspect, a continuous-feed autoclave reactor having a suitable stirring mechanism or agitation method (e.g., a mechanical stirrer and/or inert gas sparging, among other options) and/or a method for controlling the trimerization temperature (e.g., internal heat transfer coil and/or external heat exchange jacket, among other options). In another non-limiting embodiment, the process for trimerizing an olefin can be performed in a loop reactor having mechanical stirring (e.g., a circulating pump, among other options) and/or a method for controlling the trimerization temperature can be utilized (e.g., internal heat transfer coil and/or external heat exchange jacket, among other options). In another non-limiting embodiment, the process for trimerizing an olefin can be performed in a tubular reaction under plugged flow conditions having a method for controlling the trimerization temperature (e.g., external heat exchange jacket, among other options) and/or utilizing conditions wherein the dispersed catalyst system can be maintained by utilizing conditions capable creating and/or maintaining turbulent flow conditions.

In an aspect, the organic medium can be, comprise, or consist essentially of, a hydrocarbon or a halogenated hydrocarbon; alternatively, a hydrocarbon; or alternatively, a halogenated hydrocarbon. In some embodiments, organic medium (hydrocarbon and/or halogenated hydrocarbon) can be non-olefinic; or alternatively, olefinic. In other embodiments, the organic medium (hydrocarbon and/or halogenated hydrocarbon) can be, comprise, or consist essentially of, an aliphatic hydrocarbon, an aliphatic halogenated hydrocarbon, an aromatic hydrocarbon, a halogenated aromatic hydrocarbon, or any combination thereof; alternatively, an aliphatic hydrocarbon, an aliphatic halogenated hydrocarbon, or any combination thereof; alternatively, an aromatic hydrocarbon, a halogenated aromatic hydrocarbon, or any combination thereof; alternatively, an aliphatic hydrocarbon; alternatively, an aliphatic halogenated hydrocarbon; alternatively, an aromatic hydrocarbon; or alternatively, a halogenated aromatic hydrocarbon. In an embodiment, an aliphatic organic medium (hydrocarbon or halogenated hydrocarbon) can be olefinic or non-olefinic; alternatively, olefinic; or alternatively, non-olefinic. In an embodiment, an aromatic organic medium (aromatic hydrocarbon or halogenated aromatic hydrocarbon) can be olefinic (e.g. styrene) or non-olefinic; alternatively, olefinic; or alternatively, non-olefinic. Aliphatic hydrocarbons and/or halogenated aliphatic hydrocarbons are independently disclosed herein as potential solvents for various aspects and embodiments disclosed herein. These aliphatic hydrocarbon solvents and/or halogenated aliphatic hydrocarbon solvents can be utilized without limitation as the organic medium. Aromatic hydrocarbons and/or halogenated aromatic hydrocarbons are independently disclosed herein as potential solvents for various aspects and embodiments disclosed herein and/or as potential unsaturated organic compounds which can be utilized in the preparation of the catalyst system. These aromatic hydrocarbons and/or halogenated aromatic compound can be utilized without limitation as the organic medium. Olefinic compounds are disclosed herein as potential unsaturated organic compounds which can be utilized in the preparation of the catalyst system and/or as an olefin which can be trimerized. These unsaturated organic compounds and/or trimerizable olefins can be utilized without limitation as the organic medium. It should be noted that when any general or specific aliphatic hydrocarbon solvents and/or halogenated aliphatic hydrocarbon solvents, unsaturated organic compound, and/or trimerizable olefin is utilized as the organic medium, that fact that the general or specific compound was disclosed as a solvent, unsaturated organic compound, or trimerizable does not imply that the utilized compound has any function other than that ascribed the organic medium.

The trimerization product can be produced under conditions capable of forming a trimerization product. It should be noted that the conditions capable or forming a trimerization product can be different (or can be the same as) the conditions under which the catalyst system contacts the olefin or the various components in the olefin trimerization process are contacted. In an embodiment, the conditions capable of forming a trimerization product can include, either individually or in any combination, a trimerization temperature, a trimerization pressure, an olefin partial pressure, trimerization catalyst system concentration, and/or a trimerization reaction time. In another aspect, the process to trimerize an olefin can be characterized by, either individually or in any combination, an olefin conversion percentage, a catalyst system productivity, a trimer selectivity, a purity of a particular fraction within the trimerization product, and/or a quantity of polymer formed.

In an aspect, a condition capable of producing trimerization product can comprise a trimerization temperature of at least −20° C.; alternatively, at least 0° C.; alternatively, at least 20° C.; alternatively, at least 40° C.; alternatively, at least 60° C.; or alternatively, at least 80° C. In some embodiments, a condition capable of producing trimerization product can comprise a trimerization temperature ranging from −20° C. to 250° C.; alternatively, ranging from −10° C. to 250° C.; alternatively, ranging from 0° C. to 225° C.; alternatively, ranging from 20° C. to 200° C.; alternatively, ranging from 40° C. to 200° C.; alternatively, ranging from 60° C. to 180° C.; or alternatively, ranging from 80° C. to 160° C.

In an aspect, a condition capable of producing a trimerization product can comprise a trimerization pressure. In an embodiment, a condition capable of producing a trimerization product can comprise a trimerization pressure ranging from atmospheric pressure to 3500 psig (24.1 mPa); alternatively, ranging from atmospheric pressure to 3000 psig (20.7 mPa); alternatively, ranging from atmospheric pressure to 2000 psig (13.8 mPa); alternatively, ranging from atmospheric pressure to 1600 psig (6.9 mPa); or alternatively, ranging from about atmospheric pressure to 1000 psig (11.0 mPa). In another aspect, the trimerization pressure can range from 25 psig (345 kPa) to 3500 psig (24.1 mPa); 50 psig (345 kPa) to 3000 psig (20.7 mPa); alternatively, 50 psig (345 kPa) to 2500 psig (17.2 mPa); alternatively from 100 psig (689 kPa) to 2000 psig (13.8 mPa); alternatively, from 200 psig (1.4 mPa) to 1600 psig (6.9 mPa); or alternatively from 300 (2.1 mPa) to 1000 psig (6.9 mPa). When the olefin can be a gas at the temperature capable of producing the trimerization product, a condition capable of producing a trimerization product can be an olefin partial pressure (e.g., an ethylene partial pressure) ranging from 20 psi (138 kPa) to 3000 psi (20.7 mPa); alternatively, ranging from 50 psi (345 kPa) to 2500 psi (17.2 mPa); alternatively, ranging from 100 psi (689 kPa) to 2000(13.8 mPa); alternatively, ranging from 200 psi (1.4 mPa) to 1600 psi (11.0 mPa); or alternatively, ranging from 300 psi (2.1 mPa) to 1000 psi (6.9 mPa).

In an aspect, a condition capable of producing a trimerization product can comprise a catalyst system concentration. In an embodiment, the catalyst system concentration can be at least $1\times10^{-7}$ moles transition metal (e.g., chromium) per liter of trimerization solution; alternatively, at least $1\times10^{-6}$ moles transition metal per liter of trimerization solution; alternatively, at least $1\times10^{-5}$ moles transition metal per liter of trimerization solution. In some embodiments, the catalyst system concentration can range from $1\times10^{-7}$ to 0.5 moles transition metal per liter of trimerization solution; alternatively, $1\times10^{-6}$ to 0.2 moles transition metal per liter of trimerization solution; or alternatively $1\times10^{-5}$ to 0.05 moles transition metal per liter of trimerization solution.

In an aspect, a condition capable of producing a trimerization product can be a trimerization reaction time. In an embodiment, the trimerization reaction time can be at least 5 minutes; alternatively, at least 10 minutes; or alternatively at least 15 minutes. In some embodiments, the trimerization reaction time can range from 5 minutes to 120 minutes; alternatively, range from 10 minutes to 90 minutes; or alternatively, range from 15 minutes to 60 minutes. In some aspects, the trimerization process can be practiced in a continuous loop reactor. In such instance, and unlike batch reactors or plugged flow continuous reactors, the time which some molecules can spend in the reactor can be significantly different than the time other molecules spend in the reactor. In such instances, the trimerization reaction times disclosed herein can refer to an average reaction time.

In an aspect, hydrogen can be present during the trimerization. Without being limited by theory, it is believe that the presence of hydrogen can accelerate the trimerization, increase catalyst system activity, increase catalyst system productivity, and/or reduce the amount of polymer formed during the trimerization. In an embodiment, the hydrogen partial pressure can range from 2 psi (13.8 kPa) to 200 psi (1.4 mPa); alternatively, 5 psi (34.5 kPa) to 150 psi (1.0 mPa); or alternatively, 10 psi (68.9 kPa) to 100 psi (689 kPa).

In an aspect, the process for trimerizing an olefin can be characterized by the amount of olefin converted into a trimerization product (also referred to as olefin conversion). In an embodiment, the olefin conversion can be at least 20 wt. %; alternatively, 30 wt. %; or alternatively, 40 wt. %. In some embodiments, the olefin conversion can range from 20 wt. % to 90 wt. %; alternatively, range from 30 wt. % to 80 wt. %; or alternatively, 40 wt. % to 75 wt. %.

In an aspect, the process for trimerizing an olefin can be characterized by a catalyst system productivity. Generally, the catalyst system productivity refers to the grams of trimer produced per g of transition metal in transition metal compound within the quantity of catalyst system utilized (referred to herein as g trimer per g transition metal). In some embodiments, the catalyst system productivity can be at least 10,000 grams trimer per gram transition metal; alternatively, at least 15,000 grams trimer per gram transition metal; alternatively, at least 20,000 g trimer per g transition metal; or alternatively, at least 25,000 g trimer per g transition metal. In other embodiments, the catalyst system productivity can range from 10,000 to 500,000 g trimer per g transition metal; alternatively, range from 15,000 to 400,000 g trimer per g transition metal; alternatively, range from 20,000 to 300,000 g trimer per g transition metal; or alternatively, range from 25,000 to 250,000 g trimer per g transition metal. When the olefin is ethylene and the transition metal compound is a chromium compound, these conversions can be stated as g $C_6$ per g Cr.

In an aspect, the process for trimerizing an olefin can be characterized by a selectivity to product containing three and only three olefin units (referred to as trimer selectivity). Generally, trimer selectivity is stated in units of wt. % as it relates the quantity of the trimer produced per total trimerization product. It should be noted that trimerization selectivity can depend upon the trimerization solvent utilized (if utilized). When an olefin which can be trimerized, albeit at a slower rate than the olefin being trimerized, is utilized as the trimerization solvent (e.g. 1-hexene when trimerizing ethylene), the trimer selectivity can be lower than when a non-olefinic solvent is utilized in the process to trimerize an olefin. In these instances the trimer selectivity can be can be at least 70 wt. %; alternatively, at least 75 wt. %; alternatively, at least 80 wt. %; alternatively, at least 85 wt. % alternatively, at least 90 wt. %. In other similar instances, the trimer selectivity can range from 70 wt. % to 99.8 wt. %; alternatively, 75 wt. % to 99.5 wt. %; alternatively, 80 wt. % to 99 wt. %; or alternatively, 85 wt. % to 98 wt. %. In an embodiment, wherein a non-olefinic trimerization solvent is utilized, the trimer selectivity can be at least 80 wt. %; alternatively, at least 85 wt. %; alternatively, at least 87.5 wt. %; or alternatively, at least 90 wt. %. In some embodiment, wherein a non-olefinic trimerization solvent is utilized, the trimer selectivity can range from 80 wt. % to 99.8 wt. %; alternatively, 85 wt. % to 99.5 wt. %; alternatively, 87.5 wt. % to 99 wt. %; or alternatively, 90 wt. % to 98 wt. %.

In another aspect, the process for trimerizing an olefin can be characterized by a quantity of a particular product within a particular fraction of the trimerization product (also referred to as purity). In an embodiment where the olefin comprises, or consists essentially of ethylene, the trimerization product having 6 carbon atoms can comprise at least 98 wt. % 1-hexene; alternatively, at least 98.25 wt. % 1-hexene; alternatively, at least 98.5 wt. % 1-hexene; alternatively, at least 98.75 wt. % 1-hexene; alternatively, at least 99 wt. % 1-hexene; or alternatively, at least 99.25 wt. % 1-hexene. In another embodiment, where the olefin comprises, or consists essentially of ethylene, the trimerization product having 6 carbon atoms can comprise from 98 wt. % to 99.95 wt. % 1-hexene; alternatively, 98.25 wt. % to 99.95 wt. % 1-hexene; alternatively, 98.5 wt. % to 99.9 wt. % 1-hexene; alternatively, from 98.75 wt. % to 99.9 wt. % 1-hexene; alternatively, from 99 wt. % to 99.85 wt. % 1-hexene; alternatively, 1-hexene; or alternatively, at least 99.25 wt. % to 99.85 wt. % 1-hexene.

In another aspect, the process for trimerizing an olefin can be characterized by a quantity of in the trimerization product. Generally, the amount of polymer can be reported as a weight percent of the trimerization product. In an embodiment, the process for trimerizing an olefin can produce less than 1 wt. % polymer; alternatively, less than 0.75 wt. % polymer; alternatively, less than 0.5 wt. % polymer; alternatively, less than 0.4 wt. % polymer; alternatively, less than 0.3 wt. % polymer; alternatively, less than 0.2 wt. % polymer; or alternatively, less than 0.1 wt. % polymer.

When a sufficient quantity of trimer has formed, the reactor effluent comprising the organic medium, the trimerization product (comprising trimer, non-trimer products, polymer, and organic medium), and catalyst system can be treated to quench, deactivate, and/or kill the catalyst system. In an embodiment, the catalyst system can be quenched, deactivated, and/or killed prior to separating the trimer and/or organic medium from the reactor effluent. Generally, the catalyst system can be quenched, deactivated, and/or killed to (1) inhibit production of undesirable solids (e.g., polymer) and/or (2) inhibit product purity degradation due to isomerization in the trimerization product separation process. In addition to the discussion herein, U.S. Pat. No. 5,689,028, published U.S. patent application 2004/0236163 A1, published US patent application 2010/0113851 A1, and U.S. patent application Ser. No. 09/473,688 filed on Dec. 29, 1999 provides additional discuss regarding process to quench, deactivate, and/or kill the catalyst system. U.S. Pat. No. 5,689,028, published U.S. patent application 2004/0236163 A1, published US patent application 2010/0113851 A1, and U.S. patent application Ser. No. 09/473,688 filed on Dec. 29, 1999 are each hereby incorporated by reference in its entirety for all purposes.

In an aspect, the catalyst system can be deactivated and/or killed by adding an alcohol to the reactor effluent. In an embodiment, the alcohol can be added to the reactor effluent at an alcohol to metal of the metal hydrocarbyl compound (including metal hydrocarbyl compound which can be designated as a halogen containing compound) molar ratio (also referred to as an alcohol to metal molar ratio) up to 100:1; alternatively, up to 50:1; alternatively, up to 25:1; alternatively, up to 10:1; or alternatively, up to 5:1. In an embodiment, the alcohol can be added to the reactor effluent at an alcohol to metal molar ratio ranging from 0.01:1 to 100:1; alternatively, ranging from 0.1:1 to 50:1; or alternatively, ranging from 0.5:1 to 25:1; alternatively, ranging from 0.75:1 to 5:1; alternatively, ranging from 1:1 to 4:1; or alternatively, from 2:1 to 3:1. Alcohols which can be utilized to deactivate and/or kill the catalyst system are disclosed herein. These independently disclosed alcohols can be utilized without limitation to further describe the method of deactivation and/or killing the catalyst system.

In another aspect, catalyst system can be quenched by adding a quenching agent comprising an amine; or alternatively, a combination of an amine and an alcohol. Generally, the quenching agent can be added in any amount that can quench the catalyst system. In an embodiment, the amine (regardless of whether the quenching agent comprises and amine or an amine and an alcohol) can be added to the reactor effluent at an amine to metal of the metal hydrocarbyl compound (including metal hydrocarbyl compound which can be designated as a halogen containing compound) molar ratio (also referred to as an amine to metal molar ratio) up to 100:1; alternatively, up to 50:1; alternatively, up to 25:1; alternatively, up to 10:1; or alternatively, up to 5:1. In an embodiment, the amine (regardless of whether the quenching agent comprises and amine or an amine and an alcohol) can be added to the reactor effluent at an amine to metal molar ratio ranging from 0.01:1 to 100:1; alternatively, ranging from 0.1:1 to 50:1; or alternatively, ranging from 0.5:1 to 25:1; or alternatively, ranging from 0.75:1 to 5:1. When the quenching agent comprises an amine and an alcohol, the alcohol can be added to the reactor effluent at an alcohol to metal molar ratio up to 100:1; alternatively, up to 50:1; alternatively, up to 25:1; alternatively, up to 10:1; or alternatively, up to 5:1. In another embodiment where the quenching agent comprises an amine and an alcohol, the alcohol can be added to the reactor effluent at an alcohol to metal molar ratio ranging from 0.01:1 to 100:1; alternatively, ranging from 0.1:1 to 50:1; or alternatively, ranging from 0.5:1 to 25:1; alternatively, ranging from 0.75:1 to 5:1; alternatively, ranging from 1:1 to 4:1; or alternatively, from 2:1 to 3:1. Amines and alcohols which can be utilized in the quenching agent are independently disclosed herein. These independently disclosed amines and alcohols can be utilized without limitation to further describe the method of quenching the catalyst system.

In yet another aspect, the catalyst system can be deactivated and/or killed in a process comprising 1) contacting the reactor effluent (comprising the trimerization product (trimer, non-trimer products, and polymer) and organic medium) with a kill agent to at least partially deactivate the catalyst system, 2) separating the reactor effluent into one or more streams comprising a trimer and the organic medium that can be substantially devoid of the at least partially deactivated catalyst, and a second stream comprising the partially deactivated catalyst, and 3) contacting the second stream with a quench agent. The step of contacting the kill agent with the reactor effluent can be performed to reduce the catalytic activity of the catalyst system and/or reduce the catalyst system's activity for isomerizing the trimer during its separation from the reactor effluent. The step of quenching the second stream can be performed to reduce or eliminate the pyrophoric nature of the partially deactivated catalyst system. In an embodiment, the kill agent can be contacted with the reactor effluent at a kill agent to metal of the metal hydrocarbyl compound (including metal hydrocarbyl compound which can be designated as a halogen containing compound) equivalent ratio (also referred to as an kill agent to metal equivalent molar ratio) ranging from 0.75:1 to 1.25:1; alternatively, ranging from 0.9:1 to 1.2:1; or alternatively, about 1:1. In an embodiment, the quench agent can be contacted with the second stream comprising the partially deactivated catalyst at a quench agent to metal of the metal hydrocarbyl compound (including metal hydrocarbyl compound which can be designated as a halogen containing compound) equivalent ratio (also referred to as an quench agent to metal equivalent molar ratio) of up to up to 25:1; alternatively, up to 10:1; or alternatively, up to 5:1. In some embodiments, the quench agent can be contacted with the second stream comprising the partially deactivated catalyst at a quench agent to metal equivalent molar ratio ranging from 0.5 to 25:1; alternatively, ranging from 0.5:1 to 10:1; alternatively, ranging from 0.5:1 to 5:1; alternatively, ranging from 0.5:1 to 3:1; alternatively, ranging from 0.5:1 to 1.5:1; alternatively, ranging from 0.7:1 to 1.2:1; alternatively, ranging from 0.8:1 to 1.1:1; or alternatively, about 1:1. In an embodiment, the kill agent and the quench agent independently can be, comprise, or consist essentially of, an alcohol, and amine, or any combination thereof; alternatively, an alcohol; or alternatively, an amine. Amines and alcohols which can be utilized as the kill agent and alcohols which can be utilized as the quench agent are independently disclosed herein. These independently disclosed amines and alcohols can be utilized without limitation to further describe the method of quenching the catalyst system.

Generally, the alcohol which can be utilized in a process to quench, deactivate, and/or kill the catalyst system can be any alcohol which is soluble in the reactor effluent stream (or the second stream comprising the partially deactivated catalyst system. As used herein, the term "alcohol" includes monoalcohols, diols, and polyols. The alcohol can be selected by boiling point, molecular weight, or by its inability to azeotrope with olefin and/or trimer product. In some embodiments of the invention, the alcohol can have a boiling point different from the trimer product in the reactor effluent. In a non-limiting embodiment, the alcohol can be, comprise, or consist essentially of, a $C_4$ to $C_{30}$ alcohol; alternatively, a $C_4$ to $C_{20}$ alcohol; or alternatively, a $C_4$ to $C_{12}$ alcohol.

In another non-limiting embodiment, the alcohol can be, comprise, or consist essentially of, a monool, a diol, or a polyol, or any combination thereof; alternatively, a monool; alternatively, a diol; or alternatively, a polyol. Generally, the monool, diol, or polyol can have same number of carbon atoms as disclosed herein for the general alcohol. In an embodiment, the monool can be, comprise, or consist essentially of, a butanol, a pentanol, a hexanol, a heptanol, an octanol, a nonanol, a decanol, an undecanol, or a dodecanol, or any combination thereof. In other embodiments, the monool can be, comprise, or consist essentially of, 1-hexanol, 2-hexanol, 3-hexanol, 2-ethyl-hexanol, 1-heptanol, 2-heptanol, 3-heptanol, 4-heptanol, 2-methyl-3-heptanol, 1-octanol, 2-octanol, 3-octanol, 4-octanol, 7-methyl-2-decanol, 1-decanol, 2-decanol, 3-decanol, 4-decanol, 5-decanol, 2-ethyl-1-decanol, or any combination thereof. In an embodiment, the monool can be, comprise, or consist essentially of, 2-ethyl-1-hexanol. In an embodiment, the diol can be, comprise, or consist essentially of ethylene glycol, propylene glycol, or any combination thereof; alternatively, ethylene glycol; or alternatively, propylene glycol. In an embodiment, the polyol can be, comprise, or consist essentially of, glycerol.

Generally, the amine which can be utilized in a process to quench, deactivate, and/or kill the catalyst system can be, comprise, or consist essentially of, any amine. As used herein, the term "amine" includes monoamines, diamines, and polyamines. In some embodiments, the amine can be, comprise, or consist essentially of, an aliphatic amine, an aromatic amine, or any combination thereof; alternatively, an aliphatic amine; or alternatively, an aromatic amine. The amine can be selected by boiling point, molecular weight, or by its inability to azeotrope with olefin and/or trimer product. In some embodiments of the invention, the amine can have a boiling point different from the trimer product in the reactor effluent. In a non-limiting embodiment, the amine can be, comprise, or consist essentially of, a $C_2$ to $C_{40}$ amine; alternatively, a $C_4$ to $C_{30}$ amine; or alternatively, a $C_4$ to $C_{20}$ amine.

In an aspect, the amine which can be utilized in a process to quench, deactivate, and/or kill the catalyst system can be, comprise, or consist essentially of, an aliphatic amine, an aromatic amine, or any combination thereof; alternatively, an aliphatic amine; or alternatively, an aromatic amine. In an embodiment, the amine (aliphatic or aromatic) can be cyclic or acyclic; alternatively, cyclic; or alternatively acyclic. In an embodiments, the amine (aliphatic or aromatic, cyclic or acyclic) can be, comprise, or consist essentially of, a monohydrocarbylamine, a dihydrocarbylamine, a trihydrocarbyl amine, or any combination thereof; alternatively, a monohydrocarbylamine, a dihydrocarbylamine, or any combination thereof; alternatively, monohydrocarbylamine; alternatively, a dihydrocarbylamine; or alternatively, a trihydrocarbyl amine Hydrocarbyl groups are generally disclosed within the present disclosure (e.g. as a selection for $R^{2c}$ for the monocarboxylate having the formula $^-O_2CR^{2c}$, and/or as a selection for $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$, among other places). These hydrocarbyl groups can be utilized without limitation as the hydrocarbyl groups which can be utilized to further describe the monohydrocarbylamines, a dihydrocarbylamines, and/or a trihydrocarbyl amines which can be utilized in a process to quench, deactivate, and/or kill the catalyst system.

In an embodiment, aliphatic amines which can be utilized in a process to quench, deactivate, and/or kill the catalyst system can be, comprise, or consist essentially of, ethylamine, isopropylamine, cyclohexylamine, diethylamine, diisopropylamine, dibutylamine, dicyclohexylamine, pyrrolidine, piperidine, triethylamine, triisopropylamine, tributylamine, or any combination thereof; alternatively, ethylamine, isopropylamine, cyclohexylamine, or any combination thereof; alternatively, diethylamine, diisopropylamine, dibutylamine, dicyclohexylamine, pyrrolidine, piperidine, or any combination thereof; alternatively, diethylamine, diisopropylamine, dibutylamine, dicyclohexylamine, or any combination thereof; alternatively, pyrrolidine, piperidine, or any combination thereof; alternatively, triethylamine, triisopropylamine, tributylamine, or any combination thereof; alternatively, ethylamine; alternatively, isopropylamine; alternatively, cyclohexylamine; alternatively, diethylamine; alternatively, diisopropylamine; alternatively, dibutylamine; alternatively, dicyclohexylamine; alternatively, pyrrolidine; alternatively, piperidine; alternatively, triethylamine; alternatively, triisopropylamine; alternatively, tributylamine; alternatively, pyrrolidine; alternatively, piperidine; or alternatively morpholine. In an embodiment, aromatic amines which can be utilized in a process to quench, deactivate, and/or kill the catalyst system can be, comprise, or consist essentially of, aniline, tolylamine, xylylamine, benzylamine, naphthylamine, diphenylamine, ditolylamine, dibenzylamine, bis(trimethylsilyl)amine, pyridine, dimethylpyridine, imidazole, indoline, indole, quinoline, pyrrole, pyrazole, 2,5-dimethylpyrrole, 3,4-dimethylpyrrole, 3,4-dichloropyrrole, 2,3,4,5-tetrachloropyrrole, or any combination thereof;

alternatively, aniline, tolylamine, xylylamine, benzylamine, naphthylamine, or any combination thereof; alternatively, diphenylamine, ditolylamine, dibenzylamine, bis(trimethylsilyl)amine, or any combination thereof; alternatively, pyridine, dimethylpyridine, imidazole, indoline, indole, quinoline, pyrazole, pyrrole, 2,5-dimethylpyrrole, 3,4-dimethylpyrrole, 3,4-dichloropyrrole, 2,3,4,5-tetrachloropyrrole, or any combination thereof; alternatively, pyridine, dimethylpyridine, imidazole, indoline, indole, quinoline, pyrrole, or any combination thereof; alternatively, aniline; alternatively, tolylamine; alternatively, xylylamine; alternatively, benzylamine; alternatively, naphthylamine; alternatively, diphenylamine; alternatively, ditolylamine; alternatively, dibenzylamine; alternatively, bis (trimethylsilyl)amine; alternatively, pyridine; alternatively, dimethylpyridine; alternatively, imidazole; alternatively, indoline; alternatively, indole; alternatively, quinoline; alternatively, pyrazole; alternatively, pyrrole; alternatively, 2,5-dimethylpyrrole; alternatively, 3,4-dimethylpyrrole; alternatively, 3,4-dichloropyrrole; or alternatively, 2,3,4,5-tetrachloropyrrole.

The trimer product can be separated from the reactor effluent reactor effluent comprising the organic medium, the trimerization product (comprising trimer, non-trimer products, polymer, and organic medium), and quenched, deactivated, and/or killed catalyst system by any convenient process. In an non limiting embodiment, distillation using one or more distillation towers can be utilized. U.S. Pat. Nos. 5,750,816, 7,157,612, 7,476,775, published US patent application 2004/0236163 A1 and published US patent application 2010-0113851 provide processes which can be utilized to separate the trimer from the reactor effluent. U.S. Pat. Nos. 5,750,816, 7,157,612, 7,476,775, published US patent application 2004/0236163 A1 and published US patent application 2010-0113851 are each hereby incorporated by reference in its entirety for all purposes.

In an aspect, this disclosure provides synthetic methods for preparing chromium carboxylate compositions. In an aspect the disclosed synthetic methods eliminate the requirement for reaction of chromium acetate or other carboxylate complexes with a carboxylic acid. Specifically, this disclosure encompasses a synthetic route to a desired chromium carboxylate composition, in which a Group 1 or Group 2 carboxylate and a chromium precursor are combined in a solvent. In an aspect, but not as a limitation, the method(s) of this disclosure can be utilized to produce chromium(III) carboxylates, according to Equation 1.

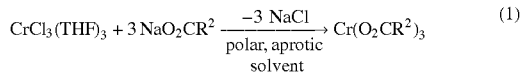

$$CrCl_3(THF)_3 + 3 NaO_2CR^2 \xrightarrow[\text{polar, aprotic solvent}]{-3 \text{ NaCl}} Cr(O_2CR^2)_3 \quad (1)$$

In an embodiment, this process can produce by-products (e.g., sodium chloride as illustrated in Equation 1) which can be separated from the desired chromium carboxylate (e.g., a chromium(III) carboxylate as illustrated in Eq. 1).

In an aspect, this disclosure provides for a chromium carboxylate composition. In an embodiment, the chromium carboxylate composition can be, comprise, or consist essentially of, the product of any process to produce a chromium carboxylate composition described herein. In another embodiment, the chromium carboxylate composition can be described as having particular spectroscopic features. In some embodiments, the chromium carboxylate composition can have particular infrared spectrum features. In other embodiments, the chromium carboxylate composition can have particular high energy X-ray diffraction spectral features. In yet other embodiments, the chromium carboxylate composition can have a high-energy X-ray diffraction spectrum which compares favorably to a calculated high-energy X-ray diffraction spectrum of a theoretical model of a chromium metal carboxylate.

In an aspect, the present disclosure describes a process for preparing a chromium carboxylate composition comprising: contacting 1) a chromium precursor, 2) a Group 1 or Group 2 metal carboxylate, and 3) a solvent to form a chromium carboxylate. In an embodiment, the chromium carboxylate can be formed under conditions capable of forming a chromium carboxylate. In some embodiments, the chromium, Group 1 or Group 2 metal carboxylate, and solvent can be contacted under particular contact conditions. In some embodiments, a solution comprising the chromium carboxylate can be formed. Generally, the chromium precursor, the Group 1 or Group 2 metal carboxylate, the solvent, the step(s) of contacting, the contact conditions, and the condition(s) capable of forming the chromium carboxylate, among other features of the process to prepare the chromium carboxylate composition (e.g., isolation and/or purification step or methods, among others) are independent elements of the process to produce a chromium carboxylate composition. Any herein described aspects and/or embodiments, of the chromium precursor described herein, the Group 1 or Group 2 metal carboxylate described herein, the solvent described herein, the step(s) of contacting described herein, the contact conditions described herein, the condition(s) capable of forming the chromium carboxylate described herein, and other features of the process to prepare the chromium carboxylate composition (e.g., isolation and/or purification step or methods, among others) described herein can be utilized to further describe the process to produce the chromium carboxylate composition.

In a non-limiting aspect, the chromium carboxylate (or chromium carboxylate composition) can have particular properties. These properties are independently described herein and can be utilized to further describe the product produced by the process for preparing the chromium carboxylate composition.

In an aspect, the present disclosure describes a process for preparing a chromium(III) carboxylate composition comprising: contacting 1) a chromium(III) precursor, 2) a Group 1 or Group 2 metal carboxylate, and 3) a solvent to form a chromium(III) carboxylate. In an embodiment, the chromium(III) carboxylate can be formed under conditions capable of forming a chromium(III) carboxylate. In some embodiments, the chromium(III) precursor, Group 1 or Group 2 metal carboxylate, and solvent can be contacted under particular contact conditions. In some embodiments, a solution comprising the chromium(III) carboxylate can be formed. Generally, the chromium(III) precursor, the Group 1 or Group 2 metal carboxylate, the solvent, the step(s) of contacting, the contact conditions, the contact conditions, and the condition(s) capable of forming the chromium(III) carboxylate, among other features of the process to prepare the chromium(III) carboxylate composition (e.g., isolation and/or purification step or methods, among others) are independent elements of the process to produce a chromium (III) carboxylate composition. Any aspects or any embodiments of the chromium(III) precursor described herein, the Group 1 or Group 2 metal carboxylate described herein, the solvent described herein, the step(s) of contacting described herein, the contact conditions described herein, the condition(s) capable of forming the chromium(III) carboxylate described herein, and other features of the process to prepare the chromium(III) carboxylate composition (e.g., isolation and/or purification step or methods, among others) described herein can be utilized to further describe the process to produce the chromium(III) carboxylate composition.

In a non-limiting aspect, the chromium(III) carboxylate (or chromium(III) carboxylate composition) can have particular properties. These properties are independently described herein and can be utilized to further describe the process for preparing the chromium(III) carboxylate composition.

In accordance with an aspect of this disclosure, the method for making a chromium carboxylate composition utilizes a chromium precursor. Generally, the chromium precursor comprises a transition metal complex which can be neutral, cationic or anionic. When the chromium complex is neutral the chromium complex is the transition metal precursor. When the chromium complex is cationic, the chromium precursor comprises an appropriate number of chromium complexes and anionic species to provide a neutral chromium precursor. When the chromium complex is anionic, the chromium precursor comprises an appropriate number of chromium complexes and cationic species to provide a neutral chromium precursor Minimally, the chromium precursor and/or chromium complex comprises chromium. In an embodiment, the chromium precursor and/or the chromium complex comprises, consists essentially of, or consists of, chromium and an anionic ligand. In another embodiment, the chromium precursor and/or the chromium complex can comprise, consists essentially of, or consists of, chromium and a neutral ligand. In an embodiment, the chromium precursor can comprise an anionic chromium complex; or alternatively, a cationic chromium complex. In other embodiments, the chromium precursor can comprise, consists essentially of, or consists of, a cationic chromium complex and at least one anionic specie; alternatively, an anionic chromium complex and at least one cationic specie. In an embodiment, the chromium complex (anionic, cationic, or neutral) can comprise, consists essentially of, or consists of, chromium, an anionic ligand, and a neutral ligand. In some embodiments, the chromium complex (anionic, cationic, or neutral) can comprise, consist essentially of, or consist of, at least one chromium and at least one anionic ligand; alternatively, at least one chromium and at least one neutral ligand; or alternatively, at least one chromium, at least one anionic ligand, and at least one neutral ligand.

In an aspect, the chromium precursor can have the formula $[(Cr_{y1}X_{x1}L_l)^m]_q[C^c]_{m1}[A^a]_{m2}$. Generally, within the chromium precursors, chromium can have an oxidation state of x, y1 represents the number of chromium atoms having the oxidation state of x, X represents an anionic ligand having a charge of y, x1 represents the number of anionic ligands having a charge of y, L represents a neutral ligand, l represents the number of neutral ligands, $Cr_{y1}X_{x1}L_l$ represents a chromium complex having charge m, q represents the number of chromium complexes having charge m, C represents a cationic species having charge c, m1 represents the number of cationic species having charge c, A represents an anionic species having charge a, and m2 represents the number of anionic species having charge a. The chromium atom having an oxidation state of x, the number of chromium atoms (y1) having an oxidation state of x, the anionic ligand (X) having a charge of y, the number of anionic ligands (x1) having a charge of y, the neutral ligand (L), the number of neutral ligands (l), the charge (m) on the chromium complex $(Cr_{y1}X_{x1}L_l)$, the number (q) of chromium complexes $(Cr_{y1}X_{x1}L_l)$, the cationic species (C) having charge c, the number of cationic species having charge c (m1), the anionic species (A) having charge a, and the number of anionic species having charge a (m2) are independently described herein. These independent descriptions can be utilized in any compatible manner and/or combination to further describe the chromium precursor having the formula $[(Cr_{y1}X_{x1}L_l)^m]_q[C^c]_{m1}[A^a]_{m2}$. Depending upon the particular values of x (the oxidation state of the chromium atom(s)), y1 (the number of chromium atoms having an oxidation state of x), y (the charge on the anionic ligand, X), x1 (the number of anionic ligands having a charge of y), l (the number of neutral ligands, L), m (the charge on the chromium complex, $Cr_{y1}X_{x1}L_l$, q (the number of chromium complexes, $Cr_{y1}X_{x1}L_l$), c (the charge on the cationic species, C), m1 (the number of cationic species, C), a (the charge on the anionic species, A), and m2 (the number of anionic species, A), there can be other viable general formulas for the chromium precursor. These other chromium precursor formulas are provided herein and can be utilized as the chromium precursor in any applicable aspect and/or embodiment described herein.

In an embodiment, the chromium precursor can have the formula $[(Cr_{y1}X_{x1}L_l)^m]_q[C^c]_{m1}[A^a]_{m2}$, $[(Cr_{y1}X_{x1}L_l)^m]_q[C^c]_{m1}$, $[(Cr_{y1}X_{x1}L_l)^m]_q[A^a]_{m2}$, $[(CrL_l)^m]_q[A^a]_{m2}$, $Cr_{y1}X_{x1}L_l$, $[(CrX_xL_l)^m]_q[C^c]_{m1}[A^a]_{m2}$, $[(CrX_xL_l)^m]_q[C^c]_{m1}$, $[(CrX_xL_l)^m]_q[A^a]_{m2}$, $CrX_xL_l$, $[(Cr_{y1}X_{x1})^m]_q[C^c]_{m1}[A^a]_{m2}$, $[(Cr_{y1}X_{x1})^m]_q[C^c]_{m1}$, $[(Cr_{y1}X_{x1})^m]_q[A^a]_{m2}$, $Cr_{y1}X_{x1}$, $[(CrX_x)^m]_q[C^c]_{m1}[A^a]_{m2}$, $[(CrX_x)^m]_q[C^c]_{m1}$, $[(CrX_x)^m]_q[A^a]_{m2}$, or $CrX_x$. In some embodiments, the chromium precursor can have the formula $[(Cr_{y1}X_{x1}L_l)^m]_q[C^c]_{m1}[A^a]_{m2}$, $[(Cr_{y1}X_{x1}L_l)^m]_q[C^c]_{m1}$, $[(Cr_{y1}X_{x1}L_l)^m]_q[A^a]_{m2}$, $[(CrL_l)^m]_q[A^a]_{m2}$, $Cr_{y1}X_{x1}L_l$, $[(CrX_xL_l)^m]_q[C^c]_{m1}[A^a]_{m2}$, $[(CrX_xL_l)^m]_q[C^c]_{m1}$, $[(CrX_xL_l)^m]_q[A^a]_{m2}$, or $CrX_xL_l$, alternatively, $(Cr_{y1}X_{x1})^m]_q[C^c]_{m1}[A^a]_{m2}$, $[(Cr_{y1}X_{x1})^m]_q[C^c]_{m1}$, $[(Cr_{y1}X_{x1})^m]_q[A^a]_{m2}$, $Cr_{y1}X_{x1}$, $[(CrX_x)^m]_q[C^c]_{m1}[A^a]_{m2}$, $[(CrX_x)^m]_q[C^c]_{m1}$, $[(CrX_x)^m]_q[A^a]_{m2}$, or $CrX_x$; alternatively, $[(Cr_{y1}X_{x1}L_l)^m]_q[C^c]_{m1}[A^a]_{m2}$, $[(Cr_{y1}X_{x1}L_l)^m]_q[C^c]_{m1}$, $[(Cr_{y1}X_{x1}L_l)^m]_q[A^a]_{m2}$, $[(CrL_l)^m]_q[A^a]_{m2}$, or $Cr_{y1}X_{x1}L_l$; alternatively, $[(CrX_xL_l)^m]_q[C^c]_{m1}[A^a]_{m2}$, $[(CrX_xL_l)^m]_q[C^c]_{m1}$, $[(CrX_xL_l)^m]_q[A^a]_{m2}$, or $CrX_xL_l$, alternatively, $(Cr_{y1}X_{x1})^m]_q[C^c]_{m1}[A^a]_{m2}$, $[(Cr_{y1}X_{x1})^m]_q[C^c]_{m1}$, $[(Cr_{y1}X_{x1})^m]_q[A^a]_{m2}$, $Cr_{y1}X_{x1}$, or alternatively, $[(CrX_x)^m]_q[C^c]_{m1}[A^a]_{m2}$, $[(CrX_x)^m]_q[C^c]_{m1}$, $[(CrX_x)^m]_q[A^a]_{m2}$, or $CrX_x$. In other embodiments, the chromium precursor can have the formula $[(Cr_{y1}X_{x1}L_l)^m]_q[C^c]_{m1}[A^{1a}]_{m2}$, $[(Cr_{y1}X_{x1}L_l)^m]_q[C^c]_{m1}$, $[(Cr_{y1}X_{x1}L_l)^m]_q[A^a]_{m2}$, $[(CrL_l)^m]_q[A^a]_{m2}$, $Cr_{y1}X_{x1}L_l$, $[(Cr_{y1}X_{x1})^m]_q[C^c]_{m1}[A^a]_{m2}$, $[(Cr_{y1}X_{x1})^m]_q[C^c]_{m1}$, $[(Cr_{y1}X_{x1})^m]_q[A^a]_{m2}$, or $Cr_{y1}X_{x1}$; or alternatively, $[(CrX_xL_l)^m]_q[C^c]_{m1}[A^a]_{m2}$, $[(CrX_xL_l)^m]_q[C^c]_{m1}$, $[(CrX_xL_l)^m]_q[A^a]_{m2}$, $CrX_xL_l$, $[(CrX_x)^m]_q[C^c]_{m1}[A^a]_{m2}$, $[(CrX_x)^m]_q[C^c]_{m1}$, $[(CrX_x)^m]_q[A^a]_{m2}$, or $CrX_x$. In yet other embodiments, the chromium precursor can have the formula $[(Cr_{y1}X_{x1}L_l)^m]q[C^c]_{m1}[A^a]_{m2}$; alternatively, $[(Cr_{y1}X_{x1}L_l)^m]_q[C^c]_{m1}$; alternatively, $[(Cr_{y1}X_{x1}L_l)^m]_q[A^a]_{m2}$; alternatively, $[(CrL_l)^m]_q[A^a]_{m2}$; alternatively, $Cr_{y1}X_{x1}L_l$; alternatively, $[(CrX_xL_l)^m]_q[C^c]_{m1}[A^a]_{m2}$; alternatively, $[(CrX_xL_l)^m]_q[C^c]_{m1}$; alternatively, $[(CrX_xL_l)^m]_q[A^a]_{m2}$; alternatively, $CrX_xL_l$; alternatively, $[(Cr_{y1}X_{x1})^m]_q[C^c]_{m1}[A^a]_{m2}$; alternatively, $[(Cr_{y1}X_{x1})^m]_q[C^c]_{m1}$; alternatively, $[(Cr_{y1}X_{x1})^m]_q[A^a]_{m2}$; alternatively, $Cr_{y1}X_{x1}$; alternatively, $[(CrX_x)^m]_q[C^c]_{m1}[A^a]_{m2}$; alternatively, $[(CrX_x)^m]_q[C^c]_{m1}$; alternatively, $[(CrX_x)^m]_q[A^a]_{m2}$; or alternatively, $CrX_x$.

Generally, the chromium oxidation state, n, of the chromium precursor can have any positive oxidation state that chromium can have. In an aspect, the chromium of the chromium precursor can have an oxidation state from 1 to 6.

In some embodiments the chromium of the chromium precursor can have an oxidation state of 2 or 3; alternatively, 2; or alternatively, 3. In should be noted that the chromium oxidation state can be designated as a Roman numeral within parenthesis following the chromium designation (e.g., chromium having an oxidation state of 3 can be designated by chromium(III)). In some non-limiting embodiments, the chromium of the chromium precursor can comprise, consist essentially of, or consist of chromium(II) or chromium(III); alternatively, chromium(II); or alternatively, chromium(III).

The number of chromium atoms, y1, in the chromium precursor (or chromium complex) is a function of the oxidation state of the chromium atom(s), the charge of the anionic ligand the number of anionic ligands, the charge of the anionic ligand(s), and the charge on the chromium complex. Generally, the number of chromium atoms, y1, in the chromium precursor (or chromium complex) can be an integer ranging from 1 to 3; alternatively, 1; alternatively, 2; or alternatively, 3.

When the chromium complex of the chromium precursor is anionic or cationic (e.g., having the formula $[(Cr_{y1}X_{x1}L_l)^m]_q[C^c]_{m1}[A^a]_{m2}$, $[(Cr_{y1}X_{x1}L_l)^m]_q[C^c]_{m1}$, $[(Cr_{y1}X_{x1}L_l)^m]_q[A^a]_{m2}$, $[(CrL_l)^m]_q[A^a]_{m2}$, $[(CrX_xL_l)^m]_q[C^c]_{m1}[A^a]_{m2}$, $[(CrX_xL_l)^m]_q[C^c]_{m1}$, $[(CrX_xL_l)^m]_q[A^a]_{m2}$, $[(Cr_{y1}X_{x1})^m]_q[C^c]_{m1}[A^a]_{m2}$, $[(Cr_{y1}X_{x1})^m]_q[C^c]_{m1}$, $[(Cr_{y1}X_{x1})^m]_q[A^a]_{m2}$, $[(CrX_x)^m]_q[C^c]_{m1}[A^a]_{m2}$, $[(CrX_x)^m]_q[C^c]_{m1}$, and/or $[(CrX_x)^m]_q[A^a]_{m2}$, among others described herein where m≠0), the number of chromium atoms (y1) having the oxidation state x, the number of anionic ligands (A) having charge y, and the charge on the anionic or cationic chromium complex can be related by the equation m=(y*x1)+(x*y1). When the chromium complex of the chromium precursor is neutral (e.g., having the formula $Cr_{y1}X_{x1}L_l$, $CrX_xL_l$, $Cr_{y1}X_{x1}$, and/or $CrX_x$, among others where m=0), the number of chromium atoms (y1) having the oxidation state x and the number of anionic ligands (A) having charge y can be related by the equation x*y1=|y*x1|. In some embodiments when the chromium complex of the chromium precursor is neutral (e.g., having the formula $Cr_{y1}X_{x1}L_l$, $CrX_xL_l$, $Cr_{y1}X_{x1}$, and/or $CrX_x$, among others where m=0), the number of chromium atoms, y1, can be related to the chromium oxidation state (x) and the anionic ligand (A) charge (y) by the relationship that y1=|y| divided by the greatest common divisor of x and |y|.

In an aspect, each anionic ligand, X, can independently be a halide, nitrate, nitrite, sulfate, sulfite, bisulfate, phosphate, chlorate, cyano, cyanate, thiocyanate, or isothiocyanate. In an embodiment, the each anionic ligand can independently be a halide, nitrate, sulfate, phosphate; or alternatively, halide or nitrate. In some embodiments, the anionic ligand, X, can be a halide; alternatively, nitrate; alternatively, nitrite; alternatively, sulfate; alternatively, sulfite; alternatively, bisulfate; alternatively, phosphate; alternatively, chlorate; alternatively, cyano; alternatively, cyanate; alternatively, thiocyanate; or alternatively, isothiocyanate. In an embodiment each halide independently can be fluoride, chloride, bromide, or iodide; alternatively, fluoride; alternatively, chloride; alternatively, bromide; or alternatively, iodide. In an embodiment, each halate independently can be fluorate, chlorate, bromate, or iodate; alternatively, fluorate; alternatively, chlorate; alternatively, bromate; or alternatively, iodate. In a further embodiment, the chromium precursor can comprise any combination of these ligands. In some embodiments, each anionic ligand can independently be a monoanionic ligand.

Generally, when the chromium precursor (general or specific) comprises at least one anionic ligand, the charge, y, of each anionic ligand, X, independently can be an integer ranging from −1 to −3. In an embodiment, the charge, y, on each anionic ligand independently can be −1 or −2; alternatively, −1; alternatively, −2; or alternatively, −3. In an embodiment, each anionic ligand, X, can be a monoanionic ligand having a charge, y, of −1. Generally, the charge, y of the anionic ligand, X, is apparent by the identity of the anionic ligand. For example, halides, nitrate, nitrite, bisulfate, halates, cyano, cyanate, thiocyanate, and isothiocyanate have charge, y, of −1, sulfate and sulfite have charge, y, of −2, and phosphate has a charge, y, of −3.

The number of anionic ligands, x1, in the chromium precursor (chromium complex) is a function of the number of chromium atoms, the oxidation state of the chromium atom(s), the charge, y, of the anionic ligand(s), and the charge on the chromium complex. Generally, the number of anionic ligands, x1, in the chromium precursor (or chromium complex) can be an integer from 0 to 7; alternatively, from 0 to 6; alternatively, from 0 to 5; alternatively, from 0 to 4; alternatively, from 0 to 3; alternatively, 1 to 7; alternatively, from 1 to 6; alternatively, from 1 to 5; alternatively, from 1 to 4; alternatively, from 1 to 3; alternatively, from 2 to 5; alternatively, from 2 to 4; alternatively, from 2 to 3; or alternatively, from 3 to 7. In some embodiments, the number of anionic ligands, x1, in the chromium precursor (or chromium complex) can be 0; alternatively, 1; alternatively, 2; alternatively, 3; alternatively, 4; or alternatively, 5, alternatively, 6; or alternatively, 7.

When chromium complex of the chromium precursor is anionic or cationic (e.g., having the formula $[(Cr_{y1}X_{x1}L_l)^m]_q[C^c]_{m1}[A^a]_{m2}$, $[(Cr_{y1}X_{x1}L_l)^m]_q[C^c]_{m1}$, $[(Cr_{y1}X_{x1}L_l)^m]_q[A^a]_{m2}$, $[(CrL_l)^m]_q[A^a]_{m2}$, $[(CrX_xL_l)^m]_q[C^c]_{m1}[A^a]_{m2}$, $[(CrX_xL_l)^m]_q[C^c]_{m1}$, $[(CrX_xL_l)^m]_q[A^a]_{m2}$, $[(Cr_{y1}X_{x1})^m]_q[C^c]_{m1}[A^a]_{m2}$, $[(Cr_{y1}X_{x1})^m]_q[C^c]_{m1}$, $[(Cr_{y1}X_{x1})^m]_q[A^a]_{m2}$, $[(CrX_x)^m]_q[C^c]_{m1}[A^a]_{m2}$, $[(CrX_x)^m]_q[C^c]_{m1}$, and/or $[(CrX_x)^m]_q[A^a]_{m2}$, among others where m≠0), the number of chromium atoms (y1) having the oxidation state x, the number of anionic ligands (A) having charge y, and the charge on the anionic or cationic chromium complex can be related by the equation m=(y*x1)+(x*y1). When the chromium complex of the chromium precursor is neutral (e.g., having the formula $Cr_{y1}X_{x1}L_l$, $CrX_xL_l$, $Cr_{y1}X_{x1}$, and/or $CrX_x$, among others where m=0), the number of chromium atoms (y1) having the oxidation state x and the number of anionic ligands (X) having charge y can be related by the equation x*y1=|y*x1|. In some embodiments when the chromium complex of the chromium precursor is neutral (e.g., having the formula $Cr_{y1}X_{x1}L_l$, $CrX_xL_l$, $Cr_{y1}X_{x1}$, and/or $CrX_x$, among others where m=0), the number of anionic ligands, x1, can be related to the chromium oxidation state (x) and the anionic ligand (X) charge (y) by the relationship that x1=x divided by the greatest common divisor of x and |y|.

In an aspect, each neutral ligand(s) for a chromium precursor (general or specific) independently can be, comprise, or consist essentially of, any neutral ligand that can form a stable or isolatable chromium complex; or alternatively, any combination of neutral ligands that can form a stable or isolatable chromium complex. Suitable neutral ligands include sigma-donor compounds that contain at least one coordinating atom that can coordinate to the chromium atom. In an embodiment, the coordinating atom of the neutral ligand(s) can include, but are not limited to, oxygen, nitrogen, sulfur, phosphorus, or any combination thereof; alternatively, oxygen, nitrogen, sulfur, or any combination thereof; alternatively, oxygen, nitrogen, or any combination thereof; alternatively, oxygen, sulfur, or any combination thereof; alternatively, oxygen; alternatively, nitrogen; alternatively, sulfur; or alternatively, phosphorus. Unless otherwise specified, the coordinating compound can be unsubstituted or can be substituted. Substituent groups are independently described herein and can be utilized, without limitation, to describe a substituted neutral ligand which can be utilized in any chromium precursor and/or chromium complex described herein.

In an aspect, each neutral ligand independently can be, comprise, or consist essentially of, an acyclic heteroatomic compound, or heterocyclic compound; alternatively, an acyclic heteroatomic compound; or alternatively, a heterocyclic compound. In an embodiment, each neutral ligand (cyclic or acyclic) independently can be, comprise, or consist essentially of, an aliphatic heteroatomic compound or a heteroarene; alternatively, an aliphatic heteroatomic compound; or alternatively, a heteroarene. Suitable heteroatoms for each neutral ligand (cyclic or acyclic, and/or aliphatic or aromatic) are described herein and can be utilized without limitation to further describe heteroatomic compound which can be utilized as the neutral ligand.

In an embodiment, each neutral ligand independently can be, comprise, or consist essentially of, an aliphatic acyclic heterocyclic compound, a substituted aliphatic acyclic heterocyclic compound, an aliphatic heterocyclic compound, a substituted aliphatic heterocyclic compound, a heteroarene, or a substituted heteroarene. In some embodiments, each neutral ligand independently can be, comprise, or consist essentially of, an aliphatic acyclic heterocyclic compound or a substituted aliphatic acyclic heterocyclic compound; alternatively, an aliphatic heterocyclic compound or a substituted aliphatic heterocyclic compound; or alternatively, a heteroarene or a substituted heteroarene. In other embodiments, each neutral ligand independently can be, comprise, or consist essentially of, an aliphatic acyclic heterocyclic compound, an aliphatic heterocyclic compound, or a heteroarene; alternatively, an aliphatic acyclic heterocyclic compound; alternatively, an aliphatic heterocyclic compound; or alternatively, a heteroarene. In an embodiment, any aliphatic acyclic heterocyclic compound (substituted or unsubstituted) which can be utilized as the neutral ligand can be, comprise, or consist essentially of, a $C_2$-$C_{60}$ aliphatic acyclic heterocyclic compound; alternatively, a $C_2$-$C_{45}$ aliphatic acyclic heterocyclic compound; alternatively, a $C_2$-$C_{30}$ aliphatic acyclic heterocyclic compound; or alternatively, a $C_2$-$C_{20}$ aliphatic acyclic heterocyclic compound; alternatively, a $C_2$-$C_{10}$ aliphatic acyclic heterocyclic compound; or alternatively, a $C_2$-$C_5$ aliphatic acyclic heterocyclic compound. In an embodiment, any aliphatic heterocyclic compound (substituted or unsubstituted) which can be utilized as the neutral ligand can be, comprise, or consist essentially of, a $C_3$-$C_{60}$ aliphatic heterocyclic compound; alternatively, a $C_3$-$C_{45}$ aliphatic heterocyclic compound; alternatively, a $C_3$-$C_{30}$ aliphatic heterocyclic compound; alternatively, a $C_3$-$C_{20}$ aliphatic heterocyclic compound; alternatively, a $C_3$-$C_{15}$ aliphatic heterocyclic compound; or alternatively, a $C_3$-$C_{10}$ aliphatic heterocyclic compound. In an embodiment, any heteroarene compound (substituted or unsubstituted) which can be utilized as the neutral ligand can be, comprise, or consist essentially of, a $C_4$-$C_{60}$ heteroarene; alternatively, a $C_4$-$C_{45}$ heteroarene; alternatively, a $C_4$-$C_{30}$ heteroarene; alternatively, a $C_4$-$C_{20}$ heteroarene; alternatively, a $C_4$-$C_{15}$ heteroarene; or alternatively, a $C_4$-$C_{10}$ heteroarene. Substituents for a substituted coordinating compound are disclosed herein and can be utilized without limitation to describe a substituted aliphatic acyclic heterocyclic compound, a substituted aliphatic heterocyclic compound, and/or a substituted heteroarene which can be utilized as a neutral ligand.

In an embodiment, each neutral ligand independently can be, but is not limited to, an ether, a thioether, a nitrile, an amine, a phosphine, a phosphite or any combination thereof; alternatively, an ether; alternatively, a thioether; alternatively, a nitrile; alternatively, an amine; alternatively, a phosphine; or alternatively, a phosphite. In some embodiments, each neutral ligand independently can be, but is not limited to, an acyclic ether, a substituted acyclic ether, a cyclic ether, a substituted cyclic ether, an acyclic thioether, a substituted acyclic thioether, a cyclic thioether, a substituted cyclic thioether, an aliphatic nitrile, a substituted aliphatic nitrile, an aromatic nitrile, a substituted aromatic nitrile, an acyclic amine, a substituted acyclic amine, a cyclic amine, a substituted cyclic amine, an acyclic phosphine, a substituted acyclic phosphine, a cyclic phosphine, a substituted cyclic phosphine, an acyclic phosphite, a substituted acyclic phosphite, a cyclic phosphite, a substituted cyclic phosphite, or any combination thereof; alternatively, an acyclic ether, a substituted acyclic ether, an acyclic thioether, a substituted acyclic thioether, an aliphatic nitrile, a substituted aliphatic nitrile, an acyclic amine, a substituted acyclic amine, an acyclic phosphine, a substituted acyclic phosphine, an acyclic phosphite, a substituted acyclic phosphite, or any combination thereof; alternatively, a cyclic ether, a substituted cyclic ether, a cyclic thioether, a substituted cyclic thioether, a cyclic amine, a substituted cyclic amine, a cyclic phosphine, a substituted cyclic phosphine, a cyclic phosphite, a substituted cyclic phosphite, or any combination thereof; alternatively, an acyclic ether, a substituted acyclic ether, a cyclic ether, or a substituted cyclic ether; alternatively, an acyclic thioether, a substituted acyclic thioether, a cyclic thioether, or a substituted cyclic thioether; alternatively, an aliphatic nitrile, a substituted aliphatic nitrile, an aromatic nitrile, or a substituted aromatic nitrile; alternatively, an acyclic amine, a substituted acyclic amine, a cyclic amine, or a substituted cyclic amine; alternatively, an acyclic phosphine, a substituted acyclic phosphine, a cyclic phosphine, or a substituted cyclic phosphine; or alternatively, an acyclic phosphite, a substituted acyclic phosphite, a cyclic phosphite, or a substituted cyclic phosphite. In other embodiments, each neutral ligand independently can be, but is not limited to, an acyclic ether, a cyclic ether, an acyclic thioether, a cyclic thioether, an aliphatic nitrile, an aromatic nitrile, an acyclic amine, a cyclic amine, or any combination thereof; alternatively, an acyclic ether or a substituted acyclic ether; alternatively, a cyclic ether or a substituted cyclic ether; alternatively, an acyclic thioether or a substituted acyclic thioether; alternatively, a cyclic thioether or a substituted cyclic thioether; alternatively, an aliphatic nitrile or a substituted aliphatic nitrile; alternatively, an aromatic nitrile or a substituted aromatic nitrile; alternatively, an acyclic amine or a substituted acyclic amine; alternatively, a cyclic amine or a substituted cyclic amine; alternatively, an acyclic phosphine or a substituted acyclic phosphine; alternatively, a cyclic phosphine or a substituted cyclic phosphine; alternatively, an acyclic phosphite or a substituted acyclic phosphite; alternatively, a cyclic phosphite or a substituted cyclic phosphite; alternatively, an acyclic ether; alternatively, a cyclic ether; alternatively, an acyclic thioether; alternatively, a cyclic thioether; alternatively, an aliphatic nitrile; alternatively, an aromatic nitrile; alternatively, an acyclic amine; alternatively, a cyclic amine; alternatively, an acyclic phosphine; alternatively, a cyclic phosphine; alternatively, an acyclic phosphite; or alternatively, a cyclic phosphite. In an embodiment, the cyclic ether (substituted or unsubstituted), cyclic thioether (substituted or unsubstituted), cyclic amine (substituted or unsubstituted), cyclic phosphine (substituted or unsubstituted), and/or cyclic phosphite (substituted or unsubstituted) can be aliphatic or aromatic; alternatively, aliphatic; or alternatively, aromatic. Substituents (also referred to as non-hydrogen substituents or non-hydrogen substituent groups) are independently disclosed herein and can be utilized without limitation to further describe a substituted ether (acyclic, cyclic, aliphatic or aromatic), a substituted thioether (acyclic, cyclic, aliphatic or aromatic), a substituted nitrile (aliphatic or aromatic), a substituted amine (acyclic, cyclic, aliphatic or aromatic), a substituted phosphine (acyclic, cyclic, aliphatic or aromatic), and/or a substituted phosphite (acyclic, cyclic, aliphatic or aromatic) which can be utilized as a neutral ligand.

In an embodiment, a nitrile utilized as the neutral ligand can have the formula $R^1C\equiv N$. In an embodiment, an ether utilized as the neutral ligand can have the formula $R^2$—O—$R^3$. In an embodiment, a thioether utilized as the neutral ligand can have the formula $R^4$—S—$R^5$. In an embodiment, an amine utilized as the neutral ligand can have the formula $NR^6R^7R^8$, $NHR^6R^7$, or $NH_2R^6$; alternatively, $NR^6R^7R^8$; alternatively, $NHR^6R^7$; or alternatively, $NH_2R^6$. In an embodiment, a phosphine utilized as the neutral ligand can have the formula $PR^9R^{10}R^{11}$, $PHR^9R^{10}$, or $PH_2R^9$; alternatively, $PR^9R^{10}R^{11}$; alternatively, $PHR^9R^{10}$; or alternatively, $PH_2R^9$. In an embodiment, an phosphite utilized as the coordinating compound can have the formula $P(OR^{12})(OR^{13})(OR^{14})$ or $PH(O)(OR^{12})(OR^{13})$; alternatively, $P(OR^{12})(OR^{13})(OR^{14})$; or alternatively, $PH(O)(OR^{12})(OR^{13})$. In an embodiment, each $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$ independently can be a $C_1$-$C_{20}$ organyl group; alternatively, a $C_1$-$C_{10}$ organyl group; or alternatively, a $C_1$-$C_{20}$ organyl group. In some embodiments, each $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$ independently can be an $C_1$-$C_{20}$ hydrocarbyl group or a $C_1$-$C_{20}$ substituted hydrocarbyl group; alternatively, $C_1$-$C_{20}$ hydrocarbyl group; or alternatively, a $C_1$-$C_{20}$ substituted hydrocarbyl group. In other embodiments, each $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$ independently can be an $C_1$-$C_{10}$ hydrocarbyl group or a $C_1$-$C_{10}$ substituted hydrocarbyl group; alternatively, $C_1$-$C_{10}$ hydrocarbyl group; or alternatively, a $C_1$-$C_{10}$ substituted hydrocarbyl group. In yet other embodiments, each $R^1$, $R^2$, $R^3$, $R^4$, $R^5$, $R^6$, $R^7$, $R^8$, $R^9$, $R^{10}$, $R^{11}$, $R^{12}$, $R^{13}$ or $R^{14}$ independently can be an $C_1$-$C_5$ hydrocarbyl group or a $C_1$-$C_5$ substituted hydrocarbyl group; alternatively, $C_1$-$C_5$ hydrocarbyl group; or alternatively, a $C_1$-$C_5$ substituted hydrocarbyl group.

In should be noted that $R^2$ and $R^3$ of the ether having formula $R^2$—O—$R^3$, $R^4$ and $R^5$ having the formula $R^4$—S—$R^5$, any two of $R^6$, $R^7$, and $R^8$ of the amine having the formula $NR^6R^7R^8$ or $NHR^6R^7$, any two of $R^9$, $R^{10}$, and $R^{11}$ of the phosphine having the formula $PR^9R^{10}R^{11}$, or $PHR^9R^{10}$, and/or any two of $R^{12}$, $R^{13}$, and $R^{14}$ of the phosphite having the formula $P(OR^{12})(OR^{13})(OR^{14})$ or $PH(O)(OR^{12})(OR^{13})$ can be joined to form a ring containing the ether oxygen atom, the thioether sulfur atom, the amine nitrogen atom, the phosphine phosphorus atom, or the phosphite phosphorus atom to form a cyclic ether, thioether, amine, phosphine, or phosphite, respectively, as described herein in regards to cyclic ethers, thioethers, amines, phosphines, and phosphites.

In an embodiment, each $R^1$, $R^2$, $R^3$, $R^4$, $R^5$, $R^6$, $R^7$, $R^8$, $R^9$, $R^{10}$, $R^{11}$, $R^{12}$, $R^{13}$ or $R^{14}$ independently can be an alkyl group, a substituted alkyl group, a cycloalkyl group, a substituted cycloalkyl group, an aryl group, a substituted aryl group, an aralkyl group, or a substituted aralkyl group; alternatively, an alkyl group or a substituted alkyl group; alternatively, a cycloalkyl group or a substituted cycloalkyl group; alternatively, an aryl group or a substituted aryl group; alternatively, an aralkyl group, or a substituted aralkyl group; alternatively, an alkyl group, a cycloalkyl group, an aryl group, or an aralkyl group; alternatively, an alkyl group; alternatively, a substituted alkyl group, alternatively, a cycloalkyl group; alternatively, a substituted cycloalkyl group; alternatively, an aryl group; alternatively, a substituted aryl group; alternatively, an aralkyl group; or alternatively, a substituted aralkyl group. Generally, the alkyl groups, substituted alkyl groups, cycloalkyl groups, substituted cycloalkyl groups, aryl groups, a substituted aryl groups, aralkyl groups, and substituted aralkyl groups which can be utilized as $R^1$, $R^2$, $R^3$, $R^4$, $R^5$, $R^6$, $R^7$, $R^8$, $R^9$, $R^{10}$, $R^{11}$, $R^{12}$, $R^{13}$ or $R^{14}$ can have the same number of carbon atoms as organyl group or hydrocarbyl group of which they are a member.

In an embodiment, the alkyl group (substituted or unsubstituted) which can be utilized as $R^1$, $R^2$, $R^3$, $R^4$, $R^5$, $R^6$, $R^7$, $R^8$, $R^9$, $R^{10}$, $R^{11}$, $R^{12}$, $R^{13}$, and/or $R^{14}$ can be a $C_1$-$C_{20}$ alkyl group (substituted or unsubstituted); alternatively, a $C_1$-$C_{10}$ alkyl group (substituted or unsubstituted); or alternatively, a $C_1$-$C_5$ alkyl group (substituted or unsubstituted). In some embodiments, each alkyl group which can be utilized as $R^1$, $R^2$, $R^3$, $R^4$, $R^5$, $R^6$, $R^7$, $R^8$, $R^9$, $R^{10}$, $R^{11}$, $R^{12}$, $R^{13}$, and/or $R^{14}$ independently can be a methyl group, an ethyl group, a propyl group, a butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, an octadecyl group, or a nonadecyl group; or alternatively, a methyl group, an ethyl group, a propyl group, a butyl group, a pentyl group, a hexyl group, a heptyl group, an octyl group, a nonyl group, or a decyl group. In other embodiments, each alkyl group which can be utilized as $R^1$, $R^2$, $R^3$, $R^4$, $R^5$, $R^6$, $R^7$, $R^8$, $R^9$, $R^{10}$, $R^{11}$, $R^{12}$, $R^{13}$, and/or $R^{14}$ independently can be a methyl group, an ethyl group, a n-propyl group, an iso-propyl group, a n-butyl group, an iso-butyl group, a sec-butyl group, a tert-butyl group, an n-pentyl group, an iso-pentyl group, a sec-pentyl group, or a neopentyl group; alternatively, a methyl group, an ethyl group, an iso-propyl group, a tert-butyl group, or a neopentyl group; alternatively, a methyl group; alternatively, an ethyl group; alternatively, a n-propyl group; alternatively, an iso-propyl group; alternatively, a tert-butyl group; or alternatively, a neopentyl group. In an embodiment, each substituent of a substituted alkyl group independently can be a halide or hydrocarboxy group; alternatively, a halide; or alternatively a hydrocarboxy group.

In an embodiment, the cycloalkyl group (substituted or unsubstituted) which can be utilized as $R^1$, $R^2$, $R^3$, $R^4$, $R^5$, $R^6$, $R^7$, $R^8$, $R^9$, $R^{10}$, $R^{11}$, $R^{12}$, $R^{13}$ and/or $R^{14}$ can be a $C_4$-$C_{20}$ cycloalkyl group (substituted or unsubstituted); alternatively, a $C_4$-$C_{15}$ cycloalkyl group (substituted or unsubstituted); or alternatively, a $C_4$-$C_{10}$ cycloalkyl group (substituted or unsubstituted). In some embodiments, each group which can be utilized as $R^1$, $R^2$, $R^3$, $R^4$, $R^5$, $R^6$, $R^7$, $R^8$, $R^9$, $R^{10}$, $R^{11}$, $R^{12}$, $R^{13}$ and/or $R^{14}$ independently can be a cyclobutyl group, a substituted cyclobutyl group, a cyclopentyl group, a substituted cyclopentyl group, a cyclohexyl group, a substituted cyclohexyl group, a cycloheptyl group, a substituted cycloheptyl group, a cyclooctyl group, or a substituted cyclooctyl group; alternatively, a cyclopentyl group, a substituted cyclopentyl group, a cyclohexyl group, or a substituted cyclohexyl group. In other embodiments, each group which can be utilized as $R^1$, $R^2$, $R^3$, $R^4$, $R^5$, $R^6$, $R^7$, $R^8$, $R^9$, $R^{10}$, $R^{11}$, $R^{12}$, $R^{13}$, and/or $R^{14}$ independently can be a cyclobutyl group or a substituted cyclobutyl group; alternatively, a cyclopentyl group or a substituted cyclopentyl group; alternatively, a cyclohexyl group or a substituted cyclohexyl group; alternatively, a cycloheptyl group or a substituted cycloheptyl group; or alternatively, a cyclooctyl group, or a substituted cyclooctyl group; alternatively, a cyclopentyl group; alternatively, a substituted cyclopentyl group; a cyclohexyl group; or alternatively, a substituted cyclohexyl group. In an embodiment, each substituent of a substituted cycloalkyl group independently can be a halide, a hydrocarbyl group, or a hydrocarboxy group; alternatively, a halide or a hydrocarbyl group; alternatively, a halide or a hydrocarboxy group; alternatively, a hydrocarbyl group or a hydrocarboxy group; alternatively, a halide; alternatively, a hydrocarbyl group; or alternatively, a hydrocarboxy group.

In an embodiment, the aryl group (substituted or unsubstituted) which can be utilized as $R^1$, $R^2$, $R^3$, $R^4$, $R^5$, $R^6$, $R^7$, $R^8$, $R^9$, $R^{10}$, $R^{11}$, $R^{12}$, $R^{13}$ and/or $R^{14}$ can be a $C_6$-$C_{20}$ aryl group (substituted or unsubstituted); alternatively, a $C_6$-$C_{15}$ aryl group (substituted or unsubstituted); or alternatively, a $C_6$-$C_{10}$ aryl group (substituted or unsubstituted). In some embodiments, each group which can be utilized as $R^1$, $R^2$, $R^3$, $R^4$, $R^5$, $R^6$, $R^7$, $R^8$, $R^9$, $R^{10}$, $R^{11}$, $R^{12}$, $R^{13}$ and/or $R^{14}$ independently can be a phenyl group, a substituted phenyl group, a naphthyl group, or a substituted naphthyl group; alternatively, a phenyl group or a substituted phenyl group; alternatively, a naphthyl group or a substituted naphthyl group; alternatively, a phenyl group or a naphthyl group; or alternatively, a substituted phenyl group or a substituted naphthyl group. In an embodiment, each substituted phenyl group which can be utilized as $R^1$, $R^2$, $R^3$, $R^4$, $R^5$, $R^6$, $R^7$, $R^8$, $R^9$, $R^{10}$, $R^{11}$, $R^{12}$, $R^{13}$ and/or $R^{14}$ independently can be a 2-substituted phenyl group, a 3-substituted phenyl group, a 4-substituted phenyl group, a 2,4-disubstituted phenyl group, a 2,6-disubstituted phenyl group, 3,5-disubstituted phenyl group, or a 2,4,6-trisubstituted phenyl group. In other embodiments, each substituted phenyl group which can be utilized as $R^1$, $R^2$, $R^3$, $R^4$, $R^5$, $R^6$, $R^7$, $R^8$, $R^9$, $R^{10}$, $R^{11}$, $R^{12}$, $R^{13}$, and/or $R^{14}$ independently can be a 2-substituted phenyl group, a 4-substituted phenyl group, a 2,4-disubstituted phenyl group, or a 2,6-disubstituted phenyl group; alternatively, a 3-substituted phenyl group or a 3,5-disubstituted phenyl group; alternatively, a 2-substituted phenyl group or a 4-substituted phenyl group; alternatively, a 2,4-disubstituted phenyl group or a 2,6-disubstituted phenyl group; alternatively, a 2-substituted phenyl group; alternatively, a 3-substituted phenyl group; alternatively, a 4-substituted phenyl group; alternatively, a 2,4-disubstituted phenyl group; alternatively, a 2,6-disubstituted phenyl group; alternatively, 3,5-disubstituted phenyl group; or alternatively, a 2,4,6-trisubstituted phenyl group. In an embodiment, each substituent of a substituted aryl group independently can be a halide, a hydrocarbyl group, or a hydrocarboxy group; alternatively, a halide or a hydrocarbyl group; alternatively, a halide or a hydrocarboxy group; alternatively, a hydrocarbyl group or a hydrocarboxy group; alternatively, a halide; alternatively, a hydrocarbyl group; or alternatively, a hydrocarboxy group.

In some embodiments, the aralkyl group (substituted or unsubstituted) which can be utilized as $R^1$, $R^2$, $R^3$, $R^4$, $R^5$, $R^6$, $R^7$, $R^8$, $R^9$, $R^{10}$, $R^{11}$, $R^{12}$, $R^{13}$, and/or $R^{14}$ can be a $C_7$-$C_{20}$ aralkyl group (substituted or unsubstituted); alternatively, a $C_7$-$C_{15}$ aralkyl group (substituted or unsubstituted); or alternatively, a $C_7$-$C_{10}$ aralkyl group (substituted or unsubstituted). In some embodiments, each group which can be utilized as $R^1$, $R^2$, $R^3$, $R^4$, $R^5$, $R^6$, $R^7$, $R^8$, $R^9$, $R^{10}$, $R^{11}$, $R^{12}$, $R^{13}$, and/or $R^{14}$ independently can be a benzyl group or a substituted benzyl group; alternatively, a benzyl group, or alternatively, a substituted benzyl group. In an embodiment, each substituent of a substituted aralkyl group independently can be a halide, a hydrocarbyl group, or a hydrocarboxy group; alternatively, a halide or a hydrocarbyl group; alternatively, a halide or a hydrocarboxy group; alternatively, a hydrocarbyl group or a hydrocarboxy group; alternatively, a halide; alternatively, a hydrocarbyl group; or alternatively, a hydrocarboxy group.

Halide, hydrocarbyl group, and hydrocarboxy group substituents (also referred to as non-hydrogen substituents or non-hydrogen substituent groups) are independently disclosed herein. These substituent groups can be utilized without limitation to further describe any substituted $R^1$, $R^2$, $R^3$, $R^4$, $R^5$, $R^6$, $R^7$, $R^8$, $R^9$, $R^{10}$, $R^{11}$, $R^{12}$, $R^{13}$ and/or $R^{14}$ group described herein.

In an embodiment, each ether and/or acyclic ether (substituted or unsubstituted), which can be utilized as the neutral ligand(s) of any chromium complex (general or specific) or chromium precursor (general or specific) described herein, independently can be, comprise, or consist essentially of, a $C_2$-$C_{40}$ ether and/or acyclic ether; alternatively, a $C_2$-$C_{30}$ ether and/or acyclic ether; alternatively, a $C_2$-$C_{20}$ ether and/or acyclic ether; alternatively, a $C_2$-$C_{15}$ ether and/or acyclic ether; or alternatively, a $C_2$-$C_{10}$ ether and/or acyclic ether. In an embodiment, each cyclic ether (substituted or unsubstituted, and/or aliphatic or aromatic), which can be utilized as the neutral ligand(s) of any chromium complex (general or specific) or chromium precursor (general or specific) described herein, independently can be, comprise, or consist essentially of, a $C_3$-$C_{40}$ cyclic ether; alternatively, a $C_4$-$C_{30}$ cyclic ether; alternatively, a $C_4$-$C_{20}$ cyclic ether; alternatively, a $C_4$-$C_{15}$ cyclic ether; or alternatively, a $C_4$-$C_{10}$ cyclic ether.

In an aspect of this disclosure, each neutral ligand(s) of any chromium complex (general or specific) or chromium precursor (general or specific) described herein, independently can be, comprise, or consist essentially of, a dihydrocarbyl ether or a substituted dihydrocarbyl ether; or alternatively, a dihydrocarbyl ether. Hydrocarbyl groups (substituted or substituted) are generally disclosed within the present disclosure (e.g. as a selection for $R^{2c}$ for the monocarboxylate having the formula $^-O_2CR^{2c}$, and/or as a selection for $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$, among other places). These hydrocarbyl groups (substituted or substituted) can be utilized without limitation as hydrocarbyl groups of the dihydrocarbyl ethers (substituted or unsubstituted) which can be utilized as the neutral ligand.

In a non-limiting embodiment, each neutral ligand(s) of any chromium complex (general or specific) or chromium precursor (general or specific) described herein, independently can be, comprise, or consist essentially of, dimethyl ether, diethyl ether, dipropyl ether, dibutyl ether, methyl ethyl ether, methyl propyl ether, methyl butyl ether, or any combination thereof; alternatively, dimethyl ether; alternatively, diethyl ether; alternatively, dipropyl ether; alternatively, dibutyl ether; alternatively, methyl ethyl ether; alternatively, methyl propyl ether; or alternatively, methyl butyl ether. In another non-limiting embodiment, each neutral ligand(s) of any chromium complex (general or specific) or chromium precursor (general or specific) described herein, independently can be, comprise, or consist essentially of, diphenyl ether, a substituted diphenyl ether, ditolyl ether, a substituted ditolyl ether, or any combination thereof; alternatively, diphenyl ether, ditolyl ether, or any combination thereof. In an embodiment, each neutral ligand(s) of any chromium complex (general or specific) or chromium precursor (general or specific) described herein, independently can be, comprise, or consist essentially of, diphenyl ether; alternatively, a substituted diphenyl ether; alternatively, ditolyl ether; or alternatively, a substituted ditolyl ether.

In a non-limiting embodiment, each neutral ligand(s) of any chromium complex (general or specific) or chromium precursor (general or specific) described herein, independently can be, comprise, or consist essentially of, tetrahydrofuran, a substituted tetrahydrofuran, 2,3-dihydrofuran, a substituted 2,3-dihydrofuran, 2,5-dihydrofuran, a substituted 2,5-dihydrofuran, or a combination thereof; alternatively, tetrahydrofuran, 2,3-dihydrofuran, 2,5-dihydrofuran, or a combination thereof; alternatively tetrahydrofuran; alternatively, a substituted tetrahydrofuran; 2,3-dihydrofuran; alternatively, a substituted 2,3-dihydrofuran; alternatively, 2,5-dihydrofuran; or alternatively, a substituted 2,5-dihydrofuran. In another non-limiting embodiment, each neutral ligand(s) of any chromium complex (general or specific) or chromium precursor (general or specific) described herein, independently can be, comprise, or consist essentially of, tetrahydrofuran, a 2-substituted tetrahydrofuran, a 3-substituted tetrahydrofuran, or any combination thereof; alternatively, tetrahydrofuran; alternatively, a 2-substituted tetrahydrofuran; or alternatively, a 3-substituted tetrahydrofuran. In further non-limiting embodiments, each neutral ligand(s) of any chromium complex (general or specific) or chromium precursor (general or specific) described herein, independently can be, comprise, or consist essentially of, tetrahydrofuran, a 2-alkyl substituted tetrahydrofuran, a 3-alkyl substituted tetrahydrofuran, or any combination thereof; alternatively, tetrahydrofuran; alternatively, a 2-alkyl substituted tetrahydrofuran; or alternatively, a 3-alkyl substituted tetrahydrofuran.

In a non-limiting embodiment, each neutral ligand(s) of any chromium complex (general or specific) or chromium precursor (general or specific) described herein, independently can be, comprise, or consist essentially of, furan, a substituted furan, benzofuran, a substituted benzofuran, isobenzofuran, a substituted isobenzofuran, dibenzofuran, a substituted dibenzofuran, or any combination thereof. In another non-limiting embodiment, each neutral ligand(s) of any chromium complex (general or specific) or chromium precursor (general or specific) described herein, independently can be, comprise, or consist essentially of, furan, benzofuran, isobenzofuran, dibenzofuran, or any combination thereof; alternatively, furan; alternatively, a substituted furan; alternatively, benzofuran; alternatively, a substituted benzofuran; alternatively, isobenzofuran; alternatively, a substituted isobenzofuran; alternatively, dibenzofuran; alternatively, a substituted dibenzofuran.

In a non-limiting embodiment, each neutral ligand(s) of any chromium complex (general or specific) or chromium precursor (general or specific) described herein, independently can be, comprise, or consist essentially of, tetrahydrofuran, a substituted tetrahydrofuran, tetrahydropyran, a substituted tetrahydropyran, 3,4-dihydro-2H-pyran, a substituted 3,4-dihydro-2H-pyran, 3,6-dihydro-2H-pyran, a substituted 3,6-dihydro-2H-pyran, 2H-pyran, a substituted 2H-pyran, 4H-pyran, a substituted 4H-pyran, 1,3-dioxane, a substituted 1,3-dioxane, 1,4-dioxane, a substituted 1,4-dioxane, morpholine, a substituted morpholine, an N-substituted morpholine, a substituted N-substituted morpholine, or any combination thereof; alternatively, tetrahydrofuran, tetrahydropyran, 3,4-dihydro-2H-pyran, 3,6-dihydro-2H-pyran, 2H-pyran, 4H-pyran, 1,3-dioxane, 1,4-dioxane, morpholine, an N-substituted morpholine, or any combination thereof. In another non-limiting embodiment, each neutral ligand(s) of any chromium complex (general or specific) or chromium precursor (general or specific) described herein, independently can be, comprise, or consist essentially of, tetrahydrofuran, tetrahydropyran, 1,3-dioxane, 1,4-dioxane, or any combination thereof. In further non-limiting embodiments, each neutral ligand(s) of any chromium complex (general or specific) or chromium precursor (general or specific) described herein, independently can be, comprise, or consist essentially of, tetrahydropyran; alternatively, a substituted tetrahydropyran; alternatively, 3,4-dihydro-2H-pyran; alternatively, a substituted 3,4-dihydro-2H-pyran; alternatively, 3,6-dihydro-2H-pyran; alternatively, a substituted 3,6-dihydro-2H-pyran; alternatively, 2H-pyran; alternatively, a substituted 2H-pyran; alternatively, 4H-pyran; alternatively, a substituted 4H-pyran; alternatively, 1,3-dioxane; alternatively, a substituted 1,3-dioxane; alternatively, 1,4-dioxane; alternatively, a substituted 1,4-dioxane; alternatively, morpholine; alternatively, a substituted morpholine; alternatively, an N-substituted morpholine; or alternatively, a substituted N-substituted morpholine.

General substituents (also referred to as non-hydrogen substituents or non-hydrogen substituent groups) are independently disclosed herein. These substituent groups can be utilized without limitation to further describe any substituted ether, substituted acyclic ether, substituted cyclic ether (aliphatic or aromatic), substituted diphenyl ethers, substituted ditolyl ethers, substituted tetrahydrofurans, alkyl substituted tetrahydrofurans, substituted furans, benzofurans, isobenzofurans, dibenzofurans, substituted tetrahydropyrans, substituted 3,4-dihydro-2H-pyrans, substituted 3,6-dihydro-2H-pyrans, substituted 4H-pyrans, substituted 1,3-dioxanes, substituted 1,4-dioxanes, substituted morpholines, N-hydrocarbyl morpholines, and/or substituted N-hydrocarbyl morpholines which can be utilized as the neutral ligand.

In an embodiment, any thioether and/or acyclic thioether (substituted or unsubstituted), which can be utilized as the neutral ligand, can be, comprise, or consist essentially of, a $C_2$-$C_{40}$ thioether and/or acyclic thioether; alternatively, a $C_2$-$C_{30}$ thioether and/or acyclic thioether; alternatively, a $C_2$-$C_{20}$ thioether and/or acyclic thioether; alternatively, a $C_2$-$C_{15}$ thioether and/or acyclic thioether; or alternatively, a $C_2$-$C_{10}$ thioether and/or acyclic thioether. In an embodiment, any cyclic thioether (substituted or unsubstituted, and/or aliphatic or aromatic), which can be utilized as the neutral ligand, can be, comprise, or consist essentially of, a $C_3$-$C_{40}$ cyclic thioether; alternatively, a $C_4$-$C_{30}$ cyclic thioether; alternatively, a $C_4$-$C_{20}$ cyclic thioether; alternatively, a $C_4$-$C_{15}$ cyclic thioether; or alternatively, a $C_4$-$C_{10}$ cyclic thioether.

In an aspect of this disclosure, each neutral ligand(s) of any chromium complex (general or specific) or chromium precursor (general or specific) described herein, independently can be, comprise, or consist essentially of, a dihydrocarbyl thioether or a substituted dihydrocarbyl thioether; or alternatively, a dihydrocarbyl thioether. Hydrocarbyl groups (substituted or unsubstituted) are generally disclosed within the present disclosure (e.g. as a selection for $R^{2c}$ for the monocarboxylate having the formula $^-O_2CR^{2c}$, and/or as a selection for $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$, among other places). These hydrocarbyl substituent groups (substituted or substituted) can be utilized without limitation as hydrocarbyl groups of the dihydrocarbyl thioethers (substituted or unsubstituted) which can be utilized as the neutral ligand.

In a non-limiting embodiment, each neutral ligand(s) of any chromium complex (general or specific) or chromium precursor (general or specific) described herein, independently can be, comprise, or consist essentially of, dimethyl thioether, diethyl thioether, dipropyl thioether, dibutyl thioether, methyl ethyl thioether, methyl propyl thioether, methyl butyl thioether, or any combination thereof. In another non-limiting embodiment, each neutral ligand(s) of any chromium complex (general or specific) or chromium precursor (general or specific) described herein, independently can be, comprise, or consist essentially of, dimethyl thioether; alternatively, diethyl thioether; alternatively, dipropyl thioether; alternatively, dibutyl thioether; alternatively, methyl ethyl thioether; alternatively, methyl propyl thioether; alternatively, or methyl butyl thioether. In a non-limiting embodiment, each neutral ligand(s) of any chromium complex (general or specific) or chromium precursor (general or specific) described herein, independently can be, comprise, or consist essentially of, diphenyl thioether, a substituted diphenyl thioether, ditolyl thioether, a substituted ditolyl thioether, or any combination thereof; alternatively, diphenyl thioether, ditolyl thioether, or any combination thereof. In an embodiment, each neutral ligand(s) of any chromium complex (general or specific) or chromium precursor (general or specific) described herein, independently can be, comprise, or consist essentially of, diphenyl thioether; alternatively, a substituted diphenyl thioether; alternatively, ditolyl thioether; or alternatively, a substituted ditolyl thioether.

In a non-limiting embodiment, each neutral ligand(s) of any chromium complex (general or specific) or chromium precursor (general or specific) described herein, independently can be, comprise, or consist essentially of, thiophene, a substituted thiophene, benzothiophene, a substituted benzothiophene, or any combination thereof. In another non-limiting embodiment, each neutral ligand(s) of any chromium complex (general or specific) or chromium precursor (general or specific) described herein, independently can be, comprise, or consist essentially of, thiophene, benzothiophene, or any combination thereof; alternatively, thiophene; alternatively, a substituted thiophene; alternatively, benzothiophene; or alternatively, a substituted benzothiophene.

In a non-limiting embodiment, each neutral ligand(s) of any chromium complex (general or specific) or chromium precursor (general or specific) described herein, independently can be, comprise, or consist essentially of, tetrahydrothiophene, a substituted tetrahydrothiophene, thiane, a substituted thiane, or any combination thereof. In another non-limiting embodiment, each neutral ligand(s) of any chromium complex (general or specific) or chromium precursor (general or specific) described herein, independently can be, comprise, or consist essentially of, tetrahydrothiophene, thiane, or a combination thereof; alternatively, tetrahydrothiophene; alternatively, a substituted tetrahydrothiophene; alternatively, thiane; or alternatively, a substituted thiane.

General substituents (also referred to as non-hydrogen substituents or non-hydrogen substituent groups) are independently disclosed herein. These substituent groups can be utilized without limitation to further describe any substituted thioether, substituted acyclic thioether, substituted cyclic thioether, substituted diphenyl thiol ethers, substituted ditolyl thioethers, substituted thiophenes, and/or substituted benzothiophenes which can be utilized as the neutral ligand.

In an embodiment, any nitrile (substituted or unsubstituted), which can be utilized as the neutral ligand, can be, comprise, or consist essentially of, a $C_2$-$C_{20}$ aliphatic nitrile; alternatively, a $C_2$-$C_{15}$ aliphatic nitrile; alternatively, a $C_2$-$C_{10}$ aliphatic nitrile; or alternatively, a $C_2$-$C_5$ aliphatic nitrile. In an embodiment, any nitrile (substituted or unsubstituted), which can be utilized as the neutral ligand, can be, comprise, or consist essentially of, a $C_6$-$C_{20}$ aromatic nitrile; alternatively, a $C_6$-$C_{15}$ aromatic nitrile; or alternatively, a $C_6$-$C_{10}$ aromatic nitrile.

In an aspect of this disclosure, each neutral ligand(s) of any chromium complex (general or specific) or chromium precursor (general or specific) described herein, independently can be, comprise, or consist essentially of, a hydrocarbyl nitrile or a substituted hydrocarbyl nitrile; or alternatively, a hydrocarbyl nitrile. Hydrocarbyl groups (substituted or unsubstituted) are generally disclosed within the present disclosure (e.g. as a selection for $R^{2c}$ for the monocarboxylate having the formula $^-O_2CR^{2c}$, and/or as a selection for $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$, among other places). These hydrocarbyl substituent groups (substituted or substituted) can be utilized without limitation as hydrocarbyl groups of the hydrocarbyl nitrile (substituted or unsubstituted) which can be utilized as the neutral ligand.

In a non-limiting embodiment, each neutral ligand(s) of any chromium complex (general or specific) or chromium precursor (general or specific) described herein, independently can be, comprise, or consist essentially of, acetonitrile, propionitrile, butyronitrile, or any combination thereof. In another non-limiting embodiment, each neutral ligand(s) of any chromium complex (general or specific) or chromium precursor (general or specific) described herein, independently can be, comprise, or consist essentially of, acetonitrile; alternatively, propionitrile; or alternatively, butyronitrile.

In a non-limiting embodiment, each neutral ligand(s) of any chromium complex (general or specific) or chromium precursor (general or specific) described herein, independently can be, comprise, or consist essentially of, benzonitrile, a substituted benzonitrile, or any combination thereof; alternatively, benzonitrile; or alternatively, a substituted benzonitrile. In another non-limiting embodiment, each neutral ligand(s) of any chromium complex (general or specific) or chromium precursor (general or specific) described herein, independently can be, comprise, or consist essentially of, benzonitrile, a 2-substituted benzonitrile, a 3-substituted benzonitrile, a 4-substituted benzonitrile, a 2,4-substituted benzonitrile, a 3,5-disubstituted, a 2,4,6-trisubstituted benzonitrile, or any combination thereof; alternatively, a 2-substituted benzonitrile, a 4-substituted benzonitrile, a 2,4-substituted benzonitrile, a 2,4,6-trisubstituted benzonitrile, or any combination thereof alternatively, a 2-substituted benzonitrile; alternatively, a 3-substituted benzonitrile; alternatively, a 4-substituted benzonitrile; alternatively, a 2,4-substituted benzonitrile; alternatively, a 3,5-disubstituted; or alternatively, a 2,4,6-trisubstituted benzonitrile. In yet other embodiments, each neutral ligand(s) of any chromium complex (general or specific) or chromium precursor (general or specific) described herein, independently can be, comprise, or consist essentially of, benzonitrile, a 2-alkyl benzonitrile, a 3-alkyl benzonitrile, a 4-methylbenzonitrile, a 2,4-alkyl benzonitrile, a 3,5-dialkyl, a 2,4,6-trialkyl benzonitrile, or any combination thereof; alternatively, a 2-alkyl benzonitrile, a 4-alkyl benzonitrile, a 2,4-alkyl benzonitrile, a 2,4,6-trialkyl benzonitrile, or any combination thereof alternatively, a 2-alkyl benzonitrile;

alternatively, a 3-alkyl benzonitrile; alternatively, a 4-alkyl benzonitrile; alternatively, a 2,4-alkyl benzonitrile; alternatively, a 3,5-dialkyl; or alternatively, a 2,4,6-trialkyl benzonitrile.

General substituents (also referred to as non-hydrogen substituents or non-hydrogen substituent groups) are independently disclosed herein. These substituent groups can be utilized without limitation to further describe any substituted aliphatic nitrile, substituted aromatic nitrile, substituted benzonitriles, and/or alkyl substituted benzonitriles which can be utilized as the neutral ligand.

In an embodiment, any amine and/or acyclic amine (substituted or unsubstituted), which can be utilized as the neutral ligand, can be, comprise, or consist essentially of, a $C_1$-$C_{60}$ amine and/or acyclic amine; alternatively, a $C_1$-$C_{45}$ amine and/or acyclic amine; alternatively, a $C_1$-$C_{30}$ amine and/or acyclic amine; alternatively, a $C_1$-$C_{20}$ amine and/or acyclic amine; alternatively, a $C_1$-$C_{15}$ amine and/or acyclic amine; or alternatively, a $C_1$-$C_{10}$ amine and/or acyclic amine. In an embodiment, any cyclic amine (substituted or unsubstituted, and/or aliphatic or aromatic), which can be utilized as the neutral ligand, can be, comprise, or consist essentially of, a $C_3$-$C_{60}$ cyclic amine; alternatively, a $C_3$-$C_{45}$ cyclic amine; alternatively, a $C_3$-$C_{30}$ cyclic amine; alternatively, a $C_4$-$C_{20}$ cyclic amine; or alternatively, a $C_4$-$C_{15}$ cyclic amine.

In an aspect of this disclosure, each neutral ligand(s) of any chromium complex (general or specific) or chromium precursor (general or specific) described herein, independently can be, comprise, or consist essentially of, a hydrocarbylamine, a substituted hydrocarbyl amine, a dihydrocarbylamine, a substituted dihydrocarbylamine, a trihydrocarbylamine, a substituted trihydrocarbylamine, any combination thereof a hydrocarbylamine, a dihydrocarbylamine, a trihydrocarbylamine, or any combination thereof alternatively, a hydrocarbylamine or a substituted hydrocarbylamine; alternatively, a dihydrocarbylamine or a substituted dihydrocarbylamine; alternatively, a trihydrocarbylamine or a substituted trihydrocarbylamine; alternatively, a hydrocarbylamine; alternatively, a substituted hydrocarbylamine; alternatively, a dihydrocarbylamine; alternatively, a substituted dihydrocarbylamine; alternatively, a trihydrocarbylamine; or alternatively, a substituted trihydrocarbylamine Hydrocarbyl groups (substituted or unsubstituted) are generally disclosed within the present disclosure (e.g. as a selection for $R^{2c}$ for the monocarboxylate having the formula $^-O_2CR^{2c}$, and/or as a selection for $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$, among other places). These hydrocarbyl substituent groups (substituted or substituted) can be utilized without limitation as the hydrocarbyl groups of the hydrocarbylamine (substituted or unsubstituted), a dihydrocarbylamine (substituted or unsubstituted), a trihydrocarbylamine (substituted or unsubstituted) which can be utilized as the neutral ligand.

In a non-limiting embodiment, each neutral ligand(s) of any chromium complex (general or specific) or chromium precursor (general or specific) described herein, independently can be, comprise, or consist essentially of, methyl amine, ethyl amine, propyl amine, butyl amine, dimethyl amine, diethyl amine, dipropyl amine, dibutylamine, trimethyl amine, triethyl amine, tripropyl amine, tributyl amine, or any combination thereof. In another non-limiting embodiment, each neutral ligand(s) of any chromium complex (general or specific) or chromium precursor (general or specific) described herein, independently can be, comprise, or consist essentially of, methyl amine, ethyl amine, propyl amine, butyl amine, or any combination thereof; alternatively, dimethyl amine, diethyl amine, dipropyl amine, dibutylamine, or any combination thereof; or alternatively, trimethyl amine, triethyl amine, tripropyl amine, tributyl amine, or any combination thereof. In yet another non-limiting embodiment, each neutral ligand(s) of any chromium complex (general or specific) or chromium precursor (general or specific) described herein, independently can be, comprise, or consist essentially of, methyl amine; alternatively, ethyl amine; alternatively, propyl amine; alternatively, butyl amine; alternatively, dimethyl amine; alternatively, diethyl amine; alternatively, dipropyl amine; alternatively, dibutylamine; alternatively, trimethyl amine; alternatively, triethyl amine; alternatively, tripropyl amine; or alternatively, tributyl amine.

In a non-limiting embodiment, each neutral ligand(s) of any chromium complex (general or specific) or chromium precursor (general or specific) described herein, independently can be, comprise, or consist essentially of, aniline, a substituted aniline, a N-hydrocarbyl aniline, a substituted N-hydrocarbyl aniline, a N,N-dihydrocarbyl aniline, a substituted N,N-dihydrocarbylaniline, diphenylamine, a di(substituted phenyl)amine, a N-hydrocarbyl diphenylamine, a N-hydrocarbyl di(substituted phenyl)amine, triphenylamine, a substituted triphenylamine, or any combination thereof. In another non-limiting embodiment, each neutral ligand(s) of any chromium complex (general or specific) or chromium precursor (general or specific) described herein, independently can be, comprise, or consist essentially of, aniline, a substituted aniline, a N-hydrocarbyl aniline, a substituted N-hydrocarbyl aniline, a N,N-dihydrocarbyl aniline, a substituted N,N-dihydrocarbyl aniline, or any combination thereof; alternatively, diphenylamine, a di(substituted phenyl)amine, a N-hydrocarbyl diphenylamine, a N-hydrocarbyl di(substitute phenyl)amine, or any combination thereof; or alternatively, triphenylamine, a substituted triphenylamine, or any combination thereof. In yet another non-limiting embodiment, each neutral ligand(s) of any chromium complex (general or specific) or chromium precursor (general or specific) described herein, independently can be, comprise, or consist essentially of, aniline; alternatively, a substituted aniline; alternatively, a N-hydrocarbyl aniline; alternatively, a substituted N-hydrocarbyl aniline; alternatively, a N,N-dihydrocarbyl aniline; alternatively, a substituted N,N-dihydrocarbyl aniline; alternatively, diphenylamine; alternatively, a di(substituted phenyl)amine; alternatively, a N-hydrocarbyl diphenylamine; alternatively, a N-hydrocarbyl di(substitute phenyl)amine; alternatively, triphenylamine; or alternatively, a substituted triphenylamine. In some non-limiting embodiments, each neutral ligand(s) of any chromium complex (general or specific) or chromium precursor (general or specific) described herein, independently can be, comprise, or consist essentially of, aniline, tolylamine, xylylamine, diphenylamine, ditolylamine, triphenylamine, or any combination thereof. In other non-limiting embodiments, each coordinating compound can aniline; alternatively, tolylamine; alternatively, xylylamine; alternatively, diphenylamine; alternatively, ditolylamine; or alternatively, triphenylamine.

In a non-limiting embodiment, each neutral ligand(s) of any chromium complex (general or specific) or chromium precursor (general or specific) described herein, independently can be, comprise, or consist essentially of, pyrrole, a substituted pyrrole, indole, a substituted indole, pyridine, a substituted pyridine, quinoline, a substituted quinoline, or any combination thereof. In another non-limiting embodiment, each neutral ligand(s) of any chromium complex (general or specific) or chromium precursor (general or specific) described herein, independently can be, comprise, or consist essentially of, pyrrole, a substituted pyrrole, or any combination thereof; alternatively, indole, a substituted indole, or any combination thereof; alternatively, pyridine, a substituted pyridine, or any combination thereof; or alternatively, quinoline, a substituted quinoline, or any combination thereof; alternatively, pyrrole, indole, pyridine, quinoline, or any combination thereof. In yet another non-limiting embodiment, each neutral ligand(s) of any chromium complex (general or specific) or chromium precursor (general or specific) described herein, independently can be, comprise, or consist essentially of, pyrrole; alternatively, a substituted pyrrole; alternatively, indole; alternatively, a substituted indole; alternatively, pyridine; alternatively, a substituted pyridine; alternatively, quinoline; or alternatively, an substituted quinoline.

General substituents (also referred to as non-hydrogen substituents or non-hydrogen substituent groups) are independently disclosed herein. These substituent groups can be utilized without limitation to further describe any substituted amine, substituted acyclic amine, substituted cyclic amine, N-hydrocarbyl aniline (substituted or unsubstituted), N,N-dihydrocarbyl aniline (substituted or unsubstituted), substituted diphenylamines, substituted triphenylamines, substituted pyrroles, substituted indoles, substituted pyridines, and/or substituted quinolines which can be utilized as the neutral ligand.

In an aspect, the neutral ligand(s) of any chromium complex (general or specific) or chromium precursor (general or specific) described herein, independently can be, comprise, or consist essentially of, a pyrrole compound. Pyrrole compounds are described herein as a component of a catalyst system described herein. These pyrrole compounds can be utilized without limitation as the neutral ligand for any chromium complex (general or specific) or chromium precursor (general or specific) described herein.

In an embodiment, any phosphine and/or acyclic phosphine (substituted or unsubstituted), which can be utilized as the neutral ligand, can be, comprise, or consist essentially of, a $C_3$-$C_{60}$ phosphine and/or acyclic phosphine; alternatively, a $C_3$-$C_{45}$ phosphine and/or acyclic phosphine; alternatively, a $C_3$-$C_{30}$ phosphine and/or acyclic phosphine; alternatively, a $C_3$-$C_{20}$ phosphine and/or acyclic phosphine; or alternatively, a $C_3$-$C_{10}$ phosphine and/or acyclic phosphine. In an embodiment, any cyclic phosphine (substituted or unsubstituted, and/or aliphatic or aromatic), which can be utilized as the neutral ligand, can be, comprise, or consist essentially of, a $C_4$-$C_{60}$ cyclic phosphine; alternatively, a $C_4$-$C_{45}$ cyclic phosphine; alternatively, a $C_4$-$C_{30}$ cyclic phosphine; alternatively, a $C_4$-$C_{20}$ cyclic phosphine; or alternatively, a $C_4$-$C_{15}$ cyclic phosphine.

In an aspect of this disclosure, each neutral ligand(s) of any chromium complex (general or specific) or chromium precursor (general or specific) described herein, independently can be, comprise, or consist essentially of, a hydrocarbylphosphine, a substituted hydrocarbyl phosphine, a dihydrocarbylphosphine, a substituted dihydrocarbylphosphine, a trihydrocarbylphosphine, a substituted trihydrocarbylphosphine, any combination thereof; a hydrocarbylphosphine, a dihydrocarbylphosphine, a trihydrocarbylphosphine, or any combination thereof; alternatively, a hydrocarbylphosphine or a substituted hydrocarbylphosphine; alternatively, a dihydrocarbylphosphine or a substituted dihydro-carbylphosphine; alternatively, a trihydrocarbylphosphine or a substituted trihydrocarbylphosphine; alternatively, a hydrocarbylphosphine; alternatively, a substituted hydrocarbylphosphine; alternatively, a dihydrocarbylphosphine; alternatively, a substituted dihydrocarbylphosphine; alternatively, a trihydrocarbylphosphine; or alternatively, a substituted trihydrocarbylphosphine. Hydrocarbyl groups (substituted or unsubstituted) are generally disclosed within the present disclosure (e.g. as a selection for $R^{2c}$ for the monocarboxylate having the formula $^-O_2CR^{2c}$, and/or as a selection for $R^1$, $R^2$, $R^3$, $R^4$, $R^5$, $R^6$, $R^7$, $R^8$, $R^9$, $R^{10}$, $R^{11}$, $R^{12}$, $R^{13}$ or $R^{14}$, among other places). These hydrocarbyl substituent groups (substituted or substituted) can be utilized without limitation as the hydrocarbyl groups of the hydrocarbylphosphines (substituted or unsubstituted), dihydrocarbylphosphines (substituted or unsubstituted), and/or trihydrocarbylphosphines (substituted or unsubstituted) which can be utilized as the neutral ligand.

In a non-limiting embodiment, each neutral ligand(s) of any chromium complex (general or specific) or chromium precursor (general or specific) described herein, independently can be, comprise, or consist essentially of, trimethylphosphine, triethylphosphine, tripropylphosphine, tributylphosphine, or any combination thereof. In another non-limiting embodiment, each neutral ligand(s) of any chromium complex (general or specific) or chromium precursor (general or specific) described herein, independently can be, comprise, or consist essentially of, trimethylphosphine, triethylphosphine, tripropylphosphine, tributylphosphine, or any combination thereof alternatively, trimethylphosphine; alternatively, triethylphosphine; alternatively, tripropylphosphine; or alternatively, tributylphosphine.

In a non-limiting embodiment, each neutral ligand(s) of any chromium complex (general or specific) or chromium precursor (general or specific) described herein, independently can be, comprise, or consist essentially of, phenylphosphine, a substituted phenylphosphine, diphenylphosphine, a di(substituted phenyl)phosphine, triphenylphosphine, a tri(trisubstituted phenyl)phosphine, or any combination thereof alternatively, phenylphosphine, a substituted phenylphosphine, or any combination thereof alternatively, diphenylphosphine, a di(substituted phenyl)phosphine, or any combination thereof, or alternatively, triphenylphosphine, a tri(trisubstituted phenyl)phosphine, or any combination thereof. In a non-limiting embodiment, each neutral ligand(s) of any chromium complex (general or specific) or chromium precursor (general or specific) described herein, independently can be, comprise, or consist essentially of, phenylphosphine; alternatively, a substituted phenylphosphine; alternatively, diphenylphosphine; alternatively, a di(substituted phenyl)phosphine; alternatively, triphenylphosphine; or alternatively, a tri(substituted phenyl)phosphine.

General substituents (also referred to as non-hydrogen substituents or non-hydrogen substituent groups) are independently disclosed herein. These substituent groups can be utilized without limitation to further describe any substituted phosphine, substituted acyclic phosphine, substituted cyclic phosphine (acyclic or cyclic), substituted phenylphosphine, di(substituted phenyl)phosphine, and/or tri(substituted phenyl)phosphine which can be utilized as the neutral ligand.

In some non-limiting embodiments, each neutral ligand(s) of any chromium complex (general or specific) or chromium precursor (general or specific) described herein, independently can be, comprise, or consist essentially of, phenylphosphine, tolylphosphine, diphenylphosphine, ditolylphosphine, triphenylphosphine, tritolylphosphine, methyldiphenylphosphine, dimethylphenylphosphine, ethyldiphenylphosphine, diethylphenyl phosphine, or any combination thereof. In other non-limiting embodiments each neutral ligand(s) of any chromium complex (general or specific) or chromium precursor (general or specific) described herein, independently can be, comprise, or consist essentially of, phenylphosphine; alternatively, diphenylphosphine; alternatively, triphenylphosphine; alternatively, tolylphosphine; alternatively, ditolylphosphine; alternatively, tritolylphosphine; alternatively, methyldiphenylphosphine; alternatively, dimethylphenylphosphine; alternatively, ethyl-diphenylphosphine; or alternatively, diethylphenylphosphine.

In an embodiment, any phosphite and/or acyclic phosphite (substituted or unsubstituted), which can be utilized as the neutral ligand, can be, comprise, or consist essentially of, a $C_3$-$C_{60}$ phosphite and/or acyclic phosphite; alternatively, a $C_3$-$C_{45}$ phosphite and/or acyclic phosphite; alternatively, a $C_3$-$C_{30}$ phosphite and/or acyclic phosphite; alternatively, a $C_3$-$C_{20}$ phosphite and/or acyclic phosphite; or alternatively, a $C_3$-$C_{10}$ phosphite and/or acyclic phosphite. In an embodiment, any cyclic phosphite (substituted or unsubstituted, and/or aliphatic or aromatic), which can be utilized as the neutral ligand, can be, comprise, or consist essentially of, a $C_3$-$C_{60}$ cyclic phosphite; alternatively, a $C_4$-$C_{45}$ cyclic phosphite; alternatively, a $C_4$-$C_{30}$ cyclic phosphite; alternatively, a $C_4$-$C_{20}$ cyclic phosphite; or alternatively, a $C_4$-$C_{15}$ cyclic phosphite.

According to an aspect of this disclosure, each neutral ligand(s) of any chromium complex (general or specific) or chromium precursor (general or specific) described herein, independently can be, comprise, or consist essentially of, a dihydrocarbylphosphite, a substituted dihydrocarbylphosphite, a trihydrocarbylphosphite, a substituted trihydrocarbylphosphite, or any combination thereof alternatively, a dihydrocarbylphosphite, a trihydrocarbylphosphite, or any combination thereof a dihydrocarbylphosphite or a substituted dihydrocarbylphosphite; alternatively, a trihydrocarbylphosphite or a substituted trihydrocarbylphosphite; alternatively, a dihydrocarbylphosphite; alternatively, a substituted dihydrocarbylphosphite; alternatively, a trihydrocarbylphosphite; or alternatively, a substituted trihydrocarbylphosphite. Hydrocarbyl groups (substituted or unsubstituted) are generally disclosed within the present disclosure (e.g. as a selection for $R^{2c}$ for the monocarboxylate having the formula $^-O_2CR^{2c}$, and/or as a selection for $R^1, R^2, R^3, R^4, R^5, R^6, R^7, R^8, R^9, R^{10}, R^{11}, R^{12}, R^{13}$, or $R^{14}$, among other places). These hydrocarbyl substituent groups (substituted or substituted) can be utilized without limitation as the hydrocarbyl groups of the dihydrocarbylphosphite (substituted or unsubstituted) and/or trihydrocarbylphosphites (substituted or unsubstituted) which can be utilized as the neutral ligand.

In a non-limiting embodiment, each neutral ligand(s) of any chromium complex (general or specific) or chromium precursor (general or specific) described herein, independently can be, comprise, or consist essentially of, trimethylphosphite, triethylphosphite, tripropylphosphite, tributylphosphite, methyldiphenylphosphite, dimethylphenylphosphite, ethyldiphenylphosphite, diethylphenylphosphite, diphenylphosphite, triphenylphosphite, ditolylphosphite, tritolylphosphite, or any combination thereof. In another non-limiting embodiment, each neutral ligand(s) of any chromium complex (general or specific) or chromium precursor (general or specific) described herein, independently can be, comprise, or consist essentially of, trimethylphosphite, triethylphosphite, tripropylphosphite, tributylphosphite, or any combination thereof.

In a non-limiting embodiment, each neutral ligand(s) of any chromium complex (general or specific) or chromium precursor (general or specific) described herein, independently can be, comprise, or consist essentially of, diphenylphosphite, a di(substituted phenyl)phosphite, triphenylphosphite, a tri(substituted phenyl)phosphite, or any combination thereof alternatively, diphenylphosphite, triphenylphosphite, or any combination thereof. In other non-limiting embodiments, each neutral ligand(s) of any chromium complex (general or specific) or chromium precursor (general or specific) described herein, independently can be, comprise, or consist essentially of, diphenylphosphite; alternatively, a di(substituted phenyl)phosphite; alternatively, a triphenylphosphite; or alternatively, a tri(substituted phenyl)phosphite.

General substituents (also referred to as non-hydrogen substituents or non-hydrogen substituent groups) are independently disclosed herein. These substituent groups can be utilized without limitation to further describe any substituted phosphite, substituted acyclic phosphite, and/or substituted cyclic phosphite, di(substituted phenyl)phosphites, and/or tri(substituted phenyl)phosphites which can be utilized as the neutral ligand.

In another non-limiting embodiment, each neutral ligand(s) of any chromium complex (general or specific) or chromium precursor (general or specific) described herein, independently can be, comprise, or consist essentially of, methyldiphenylphosphite, dimethylphenylphosphite, ethyldiphenylphosphite, diethylphenylphosphite, or any combination thereof; alternatively, diphenylphosphite, triphenylphosphite, ditolylphosphite, tritolylphosphite, or any combination thereof; alternatively, triphenylphosphite, tritolylphosphite, or any combination thereof. In yet another non-limiting embodiment, each neutral ligand(s) of any chromium complex (general or specific) or chromium precursor (general or specific) described herein, independently can be, comprise, or consist essentially of, dimethylphenylphosphite; alternatively, ethyldiphenylphosphite; alternatively, diethylphenylphosphite; alternatively, diphenylphosphite; alternatively, triphenylphosphite; alternatively, ditolylphosphite; or alternatively, tritolylphosphite.

According to an aspect of this disclosure, each neutral ligand(s) of any chromium complex (general or specific) or chromium precursor (general or specific) described herein, independently can be, comprise, or consist essentially of, a substituted or unsubstituted azetidine, oxetane, thietane, dioxetane, dithietane, tetrahydropyrrole, dihydropyrrole, pyrrole, indole, isoindole, tetrahydrofuran, dihydrofuran, furan, benzofuran, isobenzofuran, tetrahydrothiophene, dihydrothiophene, thiophene, benzothiophene, isobenzothiophene, imidazolidine, pyrazole, imidazole, oxazolidine, oxazole, isoxazole, thiazolidine, thiazole, isothiazole, benzothiazole, dioxolane, dithiolane, triazole, dithiazole, piperidine, pyridine, tetrahydropyran, dihydropyran, pyran, thiane, piperazine, diazine, oxazine, thiazine, dithiane, dioxane, dioxin, triazine, triazinane, trioxane, oxepin, azepine, thiepin, diazepine, morpholine, quinoline, tetrahydroquinone, bicyclo[3.3.1]tetrasiloxane, or any combination thereof; alternatively, a substituted or unsubstituted azetidine, oxetane, thietane, dioxetane, dithietane, tetrahydropyrrole, tetrahydrofuran, tetrahydrothiophene, imidazolidine, oxazolidine, oxazole, thiazolidine, thiazole, dioxolane, dithiolane, piperidine, tetrahydropyran, pyran, thiane, piperazine, oxazine, thiazine, dithiane, dioxane, dioxin, triazinane, trioxane, azepine, thiepin, diazepine, morpholine, 1,2-thiazole, bicyclo[3.3.1]tetrasiloxane, or any combination thereof; alternatively, a substituted or unsubstituted tetrahydropyrrole, tetrahydrofuran, tetrahydrothiophene, oxazolidine, thiazolidine, dioxolane, dithiolane, dithiazole, piperidine, tetrahydropyran, pyran, thiane, piperazine, dithiane, dioxane, dioxin, trioxane, morpholine, or any combination thereof; alternatively, a substituted or unsubstituted tetrahydrofuran, tetrahydrothiophene, dioxolane, dithiolane, tetrahydropyran, pyran, thiane, dithiane, dioxane, dioxin, trioxane, or any combination thereof; alternatively, tetrahydrofuran, dioxolane, tetrahydropyran, dioxane, trioxane; or any combination thereof; alternatively, a substituted or unsubstituted pyrrole, furan, pyrazole, imidazole, oxazole, isoxazole, thiazole, isothiazole, triazole, pyridine, diazine, triazine, quinoline, or combinations thereof; alternatively, a substituted or unsubstituted pyrrole, furan, imidazole, oxazole, thiazole, triazole, pyridine, diazine, triazine, or combinations thereof; alternatively, furan, oxazole, thiazole, triazole, pyridine, diazine, triazine, or combinations thereof.

According to an aspect of this disclosure, each neutral ligand(s) of any chromium complex (general or specific) or chromium precursor (general or specific) described herein, independently can be, comprise, or consist essentially of, azetidine, oxetane, thietane, dioxetane, dithietane, tetrahydropyrrole, dihydropyrrole, pyrrole, indole, isoindole, tetrahydrofuran, dihydrofuran, furan, benzofuran, isobenzofuran, tetrahydrothiophene, dihydrothiophene, thiophene, benzothiophene, isobenzothiophene, imidazolidine, pyrazole, imidazole, oxazolidine, oxazole, isoxazole, thiazolidine, thiazole, isothiazole, benzothiazole, dioxolane, dithiolane, triazole, dithiazole, piperidine, pyridine, tetrahydropyran, dihydropyran, pyran, thiane, piperazine, diazine, oxazine, thiazine, dithiane, dioxane, dioxin, triazine, triazinane, trioxane, oxepin, azepine, thiepin, diazepine, morpholine, quinoline, tetrahydroquinone, bicyclo[3.3.1]tetrasiloxane, or any combination thereof; alternatively, azetidine, oxetane, thietane, dioxetane, dithietane, tetrahydropyrrole, tetrahydrofuran, tetrahydrothiophene, imidazolidine, oxazolidine, oxazole, thiazolidine, thiazole, dioxolane, dithiolane, piperidine, tetrahydropyran, pyran, thiane, piperazine, oxazine, thiazine, dithiane, dioxane, dioxin, triazinane, trioxane, azepine, thiepin, diazepine, morpholine, 1,2-thiazole, bicyclo[3.3.1]tetrasiloxane, or any combination thereof; alternatively, tetrahydropyrrole, tetrahydrofuran, tetrahydrothiophene, oxazolidine, thiazolidine, dioxolane, dithiolane, dithiazole, piperidine, tetrahydropyran, pyran, thiane, piperazine, dithiane, dioxane, dioxin, trioxane, morpholine, or any combination thereof; alternatively, tetrahydrothiophene, dioxolane, dithiolane, tetrahydropyran, pyran, thiane, dithiane, dioxane, dioxin, trioxane, or any combination thereof; alternatively, tetrahydrofuran, dioxolane, tetrahydropyran, dioxane, trioxane; or any combination thereof; alternatively, pyrrole, furan, pyrazole, imidazole, oxazole, isoxazole, thiazole, isothiazole, triazole, pyridine, diazine, triazine, quinoline, or combinations thereof; alternatively, pyrrole, furan, imidazole, oxazole, thiazole, triazole, pyridine, diazine, triazine, or combinations thereof; alternatively, furan, oxazole, thiazole, triazole, pyridine, diazine, triazine, or combinations thereof.

According to an aspect of this disclosure, each neutral ligand(s) of any chromium complex (general or specific) or chromium precursor (general or specific) described herein, independently can be, comprise, or consist essentially of, a substituted or unsubstituted azetidine, tetrahydropyrrole, dihydropyrrole, pyrrole, indole, isoindole, imidazolidine, pyrazole, imidazole, oxazolidine, oxazole, isoxazole, thiazolidine, thiazole, isothiazole, triazole, benzotriazole, dithiazole, piperidine, pyridine, piperazine, diazine, oxazine, thiazine, triazine, azepine, diazepine, morpholine, quinoline, tetrahydroisoquinoline, or any combination thereof; alternatively, a substituted or unsubstituted tetrahydropyrrole, pyrrole, indole, isoindole, imidazolidine, imidazole, oxazolidine, oxazole, thiazolidine, thiazole, piperidine, pyridine, piperazine, diazine, triazine, morpholine, quinoline, tetrahydroisoquinoline, or any combination thereof; alternatively, a substituted or unsubstituted tetrahydropyrrole, pyrrole, isoindole, imidazole, oxazolidine, oxazole, thiazolidine, thiazole, piperidine, pyridine, piperazine, diazine, triazine, morpholine, quinoline, or any combination thereof; alternatively, a substituted or unsubstituted tetrahydropyrrole, pyrrole, imidazole, oxazole, thiazole, piperidine, pyridine, piperazine, diazine, triazine, morpholine, quinoline, or any combination thereof; alternatively, a substituted or unsubstituted tetrahydropyrrole, pyrrole, piperidine, piperazine, morpholine, quinoline, or any combination thereof; or alternatively, a substituted or unsubstituted imidazole, oxazole, thiazole, pyridine, diazine, triazine, or any combination thereof. In some embodiments, each neutral ligand(s) of any chromium complex (general or specific) or chromium precursor (general or specific) described herein, independently can be, comprise, or consist essentially of, azetidine, tetrahydropyrrole, dihydropyrrole, pyrrole, indole, isoindole, imidazolidine, pyrazole, imidazole, oxazolidine, oxazole, isoxazole, thiazolidine, thiazole, isothiazole, triazole, benzotriazole, dithiazole, piperidine, pyridine, piperazine, diazine, oxazine, thiazine, triazine, azepine, diazepine, morpholine, quinoline, tetrahydroisoquinoline, or any combination thereof; alternatively, tetrahydropyrrole, pyrrole, indole, isoindole, imidazolidine, imidazole, oxazolidine, oxazole, thiazolidine, thiazole, piperidine, pyridine, piperazine, diazine, triazine, morpholine, quinoline, tetrahydroisoquinoline, or any combination thereof; alternatively, tetrahydropyrrole, pyrrole, isoindole, imidazole, oxazolidine, oxazole, thiazolidine, thiazole, piperidine, pyridine, piperazine, diazine, triazine, morpholine, quinoline, or any combination thereof; alternatively, tetrahydropyrrole, pyrrole, imidazole, oxazole, thiazole, piperidine, pyridine, piperazine, diazine, triazine, morpholine, quinoline, or any combination thereof; alternatively, tetrahydropyrrole, pyrrole, piperidine, piperazine, morpholine, quinoline, or any combination thereof; or alternatively, imidazole, oxazole, thiazole, pyridine, diazine, triazine, or any combination thereof.

According to an aspect of this disclosure, each neutral ligand(s) of any chromium complex (general or specific) or chromium precursor (general or specific) described herein, independently can be, comprise, or consist essentially of, a substituted or unsubstituted oxetane, dioxetane, tetrahydrofuran, dihydrofuran, furan, benzofuran, isobenzofuran, oxazolidine, oxazole, isoxazole, dioxolane, tetrahydropyran, dihydropyran, pyran, oxazine, dioxane, dioxin, trioxane, oxepin, morpholine, or bicyclo[3.3.1]tetrasiloxane, or any combination thereof; alternatively, a substituted or unsubstituted oxetane, dioxetane, tetrahydrofuran, furan, isobenzofuran, oxazolidine, oxazole, dioxolane, tetrahydropyran, pyran, dioxane, dioxin, trioxane, morpholine, or any combination thereof; alternatively, a substituted or unsubstituted tetrahydrofuran, oxazole, dioxolane, tetrahydropyran, dioxane, dioxin, trioxane, or any combination thereof; or alternatively, a substituted or unsubstituted tetrahydrofuran, dioxolane, tetrahydropyran, dioxane, trioxane, or any combination thereof. In some embodiments, each neutral ligand(s) of any chromium complex (general or specific) or chromium precursor (general or specific) described herein, independently can be, comprise, or consist essentially of, oxetane, dioxetane, tetrahydrofuran, dihydrofuran, furan, benzofuran, isobenzofuran, oxazolidine, oxazole, isoxazole, dioxolane, tetrahydropyran, dihydropyran, pyran, oxazine, dioxane, dioxin, trioxane, oxepin, morpholine, or bicyclo

[3.3.1]tetrasiloxane, or any combination thereof; alternatively, oxetane, dioxetane, tetrahydrofuran, furan, isobenzofuran, oxazolidine, oxazole, dioxolane, tetrahydropyran, pyran, dioxane, dioxin, trioxane, morpholine, or any combination thereof; alternatively, tetrahydrofuran, oxazole, dioxolane, tetrahydropyran, dioxane, dioxin, trioxane, or any combination thereof; or alternatively, tetrahydrofuran, dioxolane, tetrahydropyran, dioxane, trioxane, or any combination thereof.

According to an aspect of this disclosure, each neutral ligand(s) of any chromium complex (general or specific) or chromium precursor (general or specific) described herein, independently can be, comprise, or consist essentially of, a substituted or unsubstituted thietane, dithietane, tetrahydrothiophene, dihydrothiophene, thiophene, benzothiophene, isobenzothiophene, thiazolidine, thiazole, isothiazole, dithiolane, dithiazole, thiane, thiazine, dithiane, thiepin, or any combination thereof; alternatively, a substituted or unsubstituted thietane, dithietane, tetrahydrothiophene, thiophene, isobenzothiophene, thiazolidine, thiazole, dithiolane, thiane, dithiane, or any combination thereof; or alternatively, a substituted or unsubstituted tetrahydrothiophene, dithiolane, thiane, dithiane, or any combination thereof. In some embodiments, each coordinating compound independently can be, comprise, or consist essentially of, a substituted or unsubstituted substituted or unsubstituted, thietane, dithietane, tetrahydrothiophene, dihydrothiophene, thiophene, benzothiophene, isobenzothiophene, thiazolidine, thiazole, isothiazole, dithiolane, dithiazole, thiane, thiazine, dithiane, thiepin, or any combination thereof; alternatively, thietane, dithietane, tetrahydrothiophene, thiophene, isobenzothiophene, thiazolidine, thiazole, dithiolane, thiane, dithiane, or any combination thereof; or alternatively, tetrahydrothiophene, dithiolane, thiane, dithiane, or any combination thereof.

In some embodiments, each neutral ligand(s) of any chromium complex (general or specific) or chromium precursor (general or specific) described herein, independently can be, comprise, or consist essentially of, azetidine; alternatively, oxetane; alternatively, thietane; alternatively, dioxetane; alternatively, dithietane; alternatively, tetrahydropyrrole; alternatively, dihydropyrrole, alternatively, pyrrole; alternatively, indole; alternatively, isoindole; alternatively, tetrahydrofuran; alternatively, dihydropyrrole; alternatively, furan; alternatively, benzofuran; alternatively, isobenzofuran; alternatively, tetrahydrothiophene; alternatively, dihydrothiophene; alternatively, thiophene; alternatively, benzothiophene; alternatively, isobenzothiophene; alternatively, imidazolidine; alternatively, pyrazole; alternatively, imidazole; alternatively, oxazolidine; alternatively, oxazole; alternatively, isoxazole; alternatively, thiazolidine; alternatively, thiazole; alternatively, benzothiazole; alternatively, isothiazole; alternatively, dioxolane; alternatively, dithiolane; alternatively, triazole; alternatively, dithiazole; alternatively, piperidine; alternatively, pyridine; alternatively, tetrahydropyran; alternatively, dihydropyran; alternatively, pyran; alternatively, thiane; alternatively, piperazine; alternatively, diazine; alternatively, oxazine; alternatively, thiazine; alternatively, dithiane; alternatively, dioxane; alternatively, dioxin; alternatively, triazine; alternatively, triazinane; alternatively, trioxane; alternatively, oxepin; alternatively, azepine; alternatively, thiepin; alternatively, diazepine; alternatively, morpholine; alternatively, quinoline; alternatively, tetrahydroquinone; or alternatively, bicyclo[3.3.1]tetrasiloxane.

According to an aspect of this disclosure, each neutral ligand(s) of any chromium complex (general or specific) or chromium precursor (general or specific) described herein, independently can be, comprise, or consist essentially of, tetrahydrofuran (THF), furan, methyltetrahydrofuran, dihydrofuran, tetrahydropyran, 2,3-dihydropyran, 1,3-dioxane, 1,4-dioxane, morpholine, N-methylmorpholine, acetonitrile, propionitrile, butyronitrile, benzonitrile, pyridine, ammonia ($NH_3$), methyl amine ($NH_2Me$), ethylamine ($NH_2Et$), dimethylamine ($NHMe_2$), diethylamine ($NHEt_2$), trimethylamine ($NMe_3$), triethylamine ($NEt_3$), trimethylphosphine ($PMe_3$), triethylphosphine ($PEt_3$), triphenylphosphine ($PPh_3$), tri-n-butylphosphine ($P(n-Bu)_3$), trimethylphosphite ($P(OMe)_3$), triethylphosphite ($P(OEt)_3$), tri-n-butylphosphite ($P(O-n-Bu)_3$), methyl isocyanide, n-butyl isocyanide, phenyl isocyanide, $SMe_2$, thiophene, or tetrahydrothiophene (THT). In some embodiments, each neutral ligand(s) of any chromium complex (general or specific) or chromium precursor (general or specific) described herein, independently can be, comprise, or consist essentially of, tetrahydrofuran (THF), methyltetrahydrofuran, tetrahydropyran, 1,4-dioxane, acetonitrile, pyridine, ammonia ($NH_3$), trimethylamine ($NMe_3$), triethylamine ($NEt_3$), trimethylphosphine ($PMe_3$), triethylphosphine ($PEt_3$), triphenylphosphine ($PPh_3$), $SMe_2$, or tetrahydrothiophene (THT); alternatively, tetrahydrofuran (THF), methyltetrahydrofuran, tetrahydropyran, or 1,4-dioxane; alternatively, ammonia ($NH_3$), trimethylamine ($NMe_3$), or triethylamine ($NEt_3$); or alternatively, trimethylphosphine ($PMe_3$), triethylphosphine ($PEt_3$), triphenylphosphine ($PPh_3$). In other embodiments, each neutral ligand(s) of any chromium complex (general or specific) or chromium precursor (general or specific) described herein, independently can be, comprise, or consist essentially of, tetrahydrofuran, acetonitrile, pyridine, ammonia, trimethylamine, trimethylphosphine, or triphenyl-phosphine; alternatively, tetrahydrofuran, acetonitrile, pyridine, trimethylamine, trimethylphosphine, or triphenylphosphine; or alternatively, tetrahydrofuran or acetonitrile. In still other embodiments, each coordinating compound independently can be, comprise, or consist essentially of, tetrahydrofuran (THF); alternatively, tetrahydropyran; alternatively, 1,4-dioxane; alternatively, acetonitrile; alternatively, pyridine; alternatively, ammonia ($NH_3$); alternatively, trimethylamine ($NMe_3$); alternatively, triethylamine ($NEt_3$); alternatively, trimethylphosphine ($PMe_3$); alternatively, triethylphosphine ($PEt_3$); alternatively, triphenylphosphine ($PPh_3$); alternatively, $SMe_2$; or alternatively, tetrahydrothiophene (THT). In yet another embodiment, each neutral ligand(s) of any chromium complex (general or specific) or chromium precursor (general or specific) described herein, independently can be, comprise, or consist essentially of, tetrahydrofuran, acetonitrile, pyridine, ammonia, trimethylamine, trimethylphosphine, or triphenyl-phosphine; alternatively, tetrahydrofuran, acetonitrile, pyridine, trimethylamine, trimethylphosphine, or triphenylphosphine; or alternatively, tetrahydrofuran or acetonitrile.

General substituents (also referred to as non-hydrogen substituents or non-hydrogen substituent groups) are independently disclosed herein. These substituent groups can be utilized without limitation to further describe any azetidine, oxetane, thietane, dioxetane, dithietane, tetrahydropyrrole, dihydropyrrole, pyrrole, indole, isoindole, tetrahydrofuran, dihydrofuran, furan, benzofuran, isobenzofuran, tetrahydrothiophene, dihydrothiophene, thiophene, benzothiophene, isobenzothiophene, imidazolidine, pyrazole, imidazole, oxazolidine, oxazole, isoxazole, thiazolidine, thiazole, isothiazole, benzothiazole, dioxolane, dithiolane, triazole, dithiazole, piperidine, pyridine, tetrahydropyran, dihydropyran, pyran, thiane, piperazine, diazine, oxazine, thiazine, dithiane, dioxane, dioxin, triazine, triazinane, trioxane, oxepin, azepine, thiepin, diazepine, morpholine, quinoline, tetrahydroquinone, bicyclo[3.3.1]tetrasiloxane, oxetane, and/or dioxetane which can be utilized as the neutral ligand.

In an aspect, the chromium complex can be, comprise, or consist essentially of, a neutral chromium complex (m equals 0 and in which case the chromium complex is the chromium precursor), a cationic chromium complex (m is a positive number), or an anionic chromium complex (m is a negative number); alternatively, a neutral chromium complex; alternatively, a cationic chromium complex; or alternatively, an anionic chromium complex. In an embodiment, the charge, m, of a cationic chromium complex can be from 1 to 4; alternatively, 1; alternatively, 2, alternatively, 3, or alternatively 4. In an embodiment, the charge, m, of an anionic chromium complex can be from −1 to −4; alternatively, −1; alternatively, −2, alternatively, −3, or alternatively −4.

The chromium complex has been described herein as a component of chromium precursor (or alternatively, as the chromium precursor). Within these descriptions, the chromium complex can have the formula $(Cr_{y1}X_{x1}L_l)^m$, $(CrX_{x1}L_l)^m$, $(CrL_l)^m$, $Cr_{y1}X_{x1}L_l$, $CrX_xL_l$, $(Cr_{y1}X_{x1})^m$, $(CrX_{x1})^m$, $Cr_{y1}X_{x1}$, or $CrX_x$; alternatively, $(Cr_{y1}X_{x1}L_l)^m$, $(CrX_{x1}L_l)^m$, $(CrL_l)^m$, $(Cr_{y1}X_{x1})^m$, or $(CrX_{x1})^m$; alternatively, $(Cr_{y1}X_{x1}L_l)^m$, $(CrX_{x1}L_l)^m$, or $(CrL_l)^m$; alternatively, $(Cr_{y1}X_{x1}L_l)^m$ or $(CrX_{x1}L_l)^m$; alternatively, $(Cr_{y1}X_{x1})^m$ or $(CrX_{x1})^m$; alternatively, $Cr_{y1}X_{x1}L_l$, $CrX_xL_l$, $Cr_{y1}X_{x1}$, or $CrX_x$; alternatively, $Cr_{y1}X_{x1}L_l$ or $CrX_xL_l$; alternatively $Cr_{y1}X_{x1}$ or $CrX_x$; alternatively, $(Cr_{y1}X_{x1}L_l)^m$; alternatively, $(CrX_{x1}L_l)^m$; alternatively, $(CrL_l)^m$; alternatively, $Cr_{y1}X_{x1}L_l$; alternatively, $CrX_xL_l$; alternatively, $(Cr_{y1}X_{x1})^m$; alternatively, $(CrX_{x1})^m$; alternatively, $Cr_{y1}X_{x1}$; or alternatively, $CrX_x$. Generally, the oxidation state of the chromium (x), the number of chromiums (y1) the anionic ligand (X), the charge of the anionic ligand(s) (y), the number of anionic ligands (x1), the neutral ligand (L), the number of neutral ligands (l), and the charge of the chromium complex have been previously described herein and the chromium complex can be described utilizing any compatible combination of these independently described elements which fit the chromium complex features described herein.

In an aspect, the number of number of chromium complex(es) (q) which can be present in the chromium precursor can range from 1 to 3; or alternatively, from 2 to 3. In some embodiments, the number of chromium complex(es) (q) which can be present in the chromium precursor can be 1; alternatively, 2; or alternatively, 3.

In a non-limiting embodiment, the chromium complex can be, comprise, or consist essentially of, a neutral chromium complex, a cationic chromium complex, or an anionic chromium complex; alternatively, a neutral chromium complex; alternatively, a cationic chromium complex; or alternatively, an anionic chromium complex. In some non-limiting embodiments, the chromium complex can be, comprise, or consist essentially of, a neutral chromium(II) complex, a cationic chromium(II) complex, an anionic chromium(II) complex, a neutral chromium(III) complex, a cationic chromium(III) complex, or an anionic chromium (III) complex; a neutral chromium(II) complex, a cationic chromium(II) complex, or an anionic chromium(II) complex; or alternatively, a neutral chromium(III) complex, a cationic chromium(III) complex, or an anionic chromium (III) complex. In other non-limiting embodiments, the chromium complex can be, comprise, or consist essentially of, a neutral chromium(II) complex; alternatively, a cationic chromium(II) complex; alternatively, an anionic chromium (II) complex; alternatively, a neutral chromium (III) complex; alternatively, a cationic chromium (III) complex; or alternatively, an anionic chromium (III) complex.

In an aspect and in any embodiment, the neutral chromium complex (in which case the chromium complex would be the chromium precursor) can have the formula $Cr_{y1}X_{x1}L_l$, $CrX_xL_l$, $Cr_{y1}X_{x1}$, or $CrX_x$; alternatively, $Cr_{y1}X_{x1}L_l$ or $CrX_xL_l$; alternatively, $Cr_{y1}X_{x1}$ or $CrX_x$; alternatively, $Cr_{y1}X_{x1}L_l$; alternatively, $CrX_xL_l$; alternatively, $Cr_{y1}X_{x1}$; or alternatively, $CrX_x$. Generally, the neutral chromium complex can be described using any compatible combination of chromium oxidation state (x) described herein, number of chromium atoms (y1) described herein, anionic ligand (X) described herein, charge of the anionic ligand(s) (y) described herein, number of anionic ligands (x1) described herein, neutral ligand (L) described herein, and number of neutral ligands (l) described herein.

In a non-limiting embodiment, the neutral chromium complex can be, comprise, or consist essentially of, a neutral chromium halide, a neutral chromium halide hydrocarbylnitrile complex, a neutral chromium halide trihydrocarbylamine complex, a neutral chromium halide dihydrocarbylether complex, a neutral chromium halide dihydrocarbylsulfide complex, or a neutral chromium halide trihydrocarbylphosphine complex. In some non-limiting embodiments, the neutral chromium complex can be, comprise, or consist essentially of, a neutral chromium halide trihydrocarbylamine complex, a neutral chromium halide dihydrocarbylether complex, or a neutral chromium halide dihydrocarbylsulfide complex. In some non-limiting embodiments, the neutral chromium complex can be, comprise, or consist essentially of, a neutral chromium halide ammonia complex, a neutral chromium halide tetrahydrofuran complex, or a neutral chromium halide tetrahydrothiophene complex. In yet other non-limiting embodiments, the neutral chromium complex can be, comprise, or consist essentially of, a neutral chromium halide; alternatively, a neutral chromium halide ammonia complex; alternatively, a neutral chromium halide hydrocarbylnitrile complex; alternatively, a neutral chromium halide trihydrocarbylamine complex; alternatively, a neutral chromium halide dihydrocarbylether complex; alternatively, a neutral chromium halide dihydrocarbylsulfide complex; alternatively, a neutral chromium halide tetrahydrofuran complex; alternatively, a neutral chromium halide tetrahydrothiophene complex; or alternatively, a neutral chromium halide trihydrocarbylphosphine complex. Generally, the individual elements of these non-limiting embodiments of the neutral chromium complex are independently described herein and can be utilized in any compatible combination to further describe the neutral chromium complex.

Chromium oxidation states which can be utilized to describe the neutral chromium complexes are independently described herein and can be utilized in any combination to further describe the neutral chromium complexes which can be utilized in any aspect or any embodiment disclosed herein. In a non-limiting embodiment, the neutral chromium complexes which can be utilized in any aspect or any embodiment disclosed herein can include a neutral chromium(II) complex or a neutral chromium(III) complex having any anionic ligand described herein and any neutral ligand described herein; alternatively, a neutral chromium(II) complex having any anionic ligand described herein and any neutral ligand described herein; or alternatively, a neutral chromium(III) complex having any anionic ligand described herein and any neutral ligand described herein. In a non-limiting embodiment, the neutral transition metal complex can be, comprise, or consist essentially of, a neutral chromium(II) complex or a neutral chromium(III) complex; alternatively, a neutral chromium(II) complex; or alternatively, a neutral chromium(III) complex.

In a non-limiting embodiment, the chromium complex which can be utilized in any aspect or any embodiment described herein can be, comprise, or consist essentially of, a neutral chromium(III) halide, a neutral chromium(III) halide hydrocarbylnitrile complex, a neutral chromium(III) halide trihydrocarbylamine complex, a neutral chromium (III) halide dihydrocarbyl ether complex, a neutral chromium(III) halide dihydrocarbylsulfide complex, or a neutral chromium(III) halide trihydrocarbylphosphine complex. In yet other non-limiting embodiments, the neutral chromium complex which can be utilized in any aspect or any embodiment disclosed herein can include a neutral chromium(III) halide; alternatively, a neutral chromium(III) halide tetrahydrofuran complex; alternatively, a neutral chromium(III) halide hydrocarbylnitrile complex; alternatively, a neutral chromium(III) halide trihydrocarbylamine complex; alternatively, a neutral chromium(III) halide dihydrocarbyl ether complex; alternatively, a neutral chromium(III) halide dihydrocarbylsulfide complex; or alternatively, a neutral chromium(III) halide trihydrocarbylphosphine complex. Other general or specific neutral chromium complexes having the formula $M^{\beta}L_{l}$ can be described using aspects and embodiments of the present disclosure. These general and specific neutral chromium complexes are readily apparent and contemplated.

In an aspect, the cationic chromium complex (a chromium complex where m is any positive integer) can have the formula $(Cr_{y1}X_{x1}L_{l})^{m}$, $(CrX_{x1}L_{l})^{m}$, $(CrL_{l})^{m}$, $(Cr_{y1}X_{x1})^{m}$, or $(CrX_{x1})^{m}$; alternatively, $(Cr_{y1}X_{x1}L_{l})^{m}$, $(CrX_{x1}L_{l})^{m}$, $(CrL_{l})^{m}$, $(Cr_{y1}X_{x1})^{m}$, or $(CrX_{x1})^{m}$; alternatively, $(Cr_{y1}X_{x1}L_{l})^{m}$, $(CrX_{x1}L_{l})^{m}$, or $(CrL_{l})^{m}$; alternatively, $(Cr_{y1}X_{x1}L_{l})^{m}$ or $(CrX_{x1}L_{l})^{m}$; alternatively, $(Cr_{y1}X_{x1})^{m}$ or $(CrX_{x1})^{m}$; alternatively, $(Cr_{y1}X_{x1}L_{l})^{m}$; alternatively, $(CrX_{x1}L_{l})^{m}$; alternatively, $(CrL_{l})^{m}$; alternatively, $(Cr_{y1}X_{x1})^{m}$; or alternatively, $(CrX_{x1})^{m}$. Generally, the cationic chromium complex can be described using any compatible combination of the oxidation state of the chromium (x) described herein, number of chromium atoms (y1) described herein, anionic ligand (X) described herein, charge of the anionic ligand(s) (y) described herein, number of anionic ligands (x1) described herein, neutral ligand (L) described herein, and number of neutral ligands (l) described herein, and positive charge of the cationic chromium complex (m) described herein.

In a non-limiting embodiment, the cationic chromium complex can be, comprise, or consist essentially of, a cationic chromium halide, a cationic chromium halide trihydrocarbylamine complex, a cationic chromium halide dihydrocarbylether complex, or a cationic chromium halide dihydrocarbylsulfide complex. In some non-limiting embodiments, the cationic chromium complex can be, comprise, or consist essentially of, a cationic chromium halide trihydrocarbylamine complex, a cationic chromium halide dihydrocarbylether complex, or a cationic chromium halide dihydrocarbylsulfide complex. In other non-limiting embodiments, the cationic chromium complex can be, comprise, or consist essentially of, a cationic chromium halide ammonia complex, a cationic chromium halide tetrahydrofuran complex, or a cationic chromium halide tetrahydrothiophene complex. In yet other non-limiting embodiments, the cationic chromium complex can be, comprise, or consist essentially of, a cationic chromium halide complex; alternatively, a cationic chromium halide ammonia complex; alternatively, a cationic chromium halide trihydrocarbylamine complex; alternatively, a cationic chromium halide dihydrocarbylether complex; alternatively, a cationic chromium halide dihydrocarbylsulfide complex; alternatively, a cationic chromium halide tetrahydrofuran complex; or alternatively, a cationic chromium halide tetrahydrothiophene complex. Generally, the individual elements of these non-limiting embodiments of the cationic chromium complex are independently described herein and can be utilized in any compatible combination to further describe the cationic chromium complex.

Chromium oxidation states which can be utilized to describe the cationic chromium complexes are described herein and can be utilized in any combination to further describe the cationic chromium complexes which can be utilized in any aspect or any embodiment disclosed herein. In a non-limiting embodiment, the cationic chromium can be, comprise, or consist essentially of, a cationic chromium (II) complex or a cationic chromium(III) complex having any anionic ligand described herein and any neutral ligand described herein; alternatively, a cationic chromium(II) complex having any anionic ligand described herein and any neutral ligand described herein; or alternatively, a cationic chromium(III) complex having any anionic ligand described herein and any neutral ligand described herein. In some embodiments, any anionic ligand described herein and any neutral ligand described herein can be utilized to further describe a cationic chromium(II) complex or a cationic chromium(III) complex; alternatively, a cationic chromium (II) complex; or alternatively a cationic chromium(III) complex. In a non-limiting embodiment, the cationic chromium complex can be, comprise, or consist essentially of, a cationic chromium(II) complex or a cationic chromium(III) complex; alternatively, a cationic chromium(II) complex; or alternatively, a cationic chromium(III) complex.

In a non-limiting embodiment, the chromium complex which can be utilized in any aspect or any embodiment described herein can be, comprise, or consist essentially of, a cationic chromium(III) trihydrocarbylamine complex, a cationic chromium(III) dihydrocarbylether complex, or a cationic chromium(III) dihydrocarbylsulfide complex; alternatively, a cationic chromium(III) trihydrocarbylamine complex; alternatively, a cationic chromium(III) dihydrocarbylether complex; or alternatively, a cationic chromium(III) dihydrocarbylsulfide complex. In some non-limiting embodiments, the chromium complex which can be utilized in any aspect or any embodiment described herein can be, comprise, or consist essentially of, a cationic chromium(III) ammonia complex, a cationic chromium(III) tetrahydrofuran complex, or a cationic chromium(III) tetrahydrothiophene complex; alternatively, a cationic chromium(III) ammonia complex; alternatively, a cationic chromium(III) tetrahydrofuran complex; or alternatively, a cationic chromium(III) tetrahydrothiophene complex. In other non-limiting embodiments, the chromium complex which can be utilized in any aspect or any embodiment described herein can be, comprise, or consist essentially of, a cationic chromium(III) halide, a cationic chromium(III) halide trihydrocarbylamine complex, a cationic chromium(III) halide dihydrocarbylether complex, or a cationic chromium(III) halide dihydrocarbylsulfide complex; alternatively, a cationic chromium(III) halide; alternatively, a cationic chromium(III) halide trihydrocarbylamine complex; alternatively, a cationic chromium(III) halide dihydrocarbylether complex; or alternatively, a cationic chromium(III) halide dihydrocarbylsulfide complex. In yet other non-limiting embodiments, the chromium complex which can be utilized in any aspect or any embodiment described herein can be, comprise, or consist essentially of, a cationic chromium(III) halide ammonia complex, a cationic chromium(III) halide tetrahydrofuran complex, or a cationic chromium(III) halide tetrahydrothiophene complex; alternatively, a cationic chromium (III) halide ammonia complex; alternatively, a cationic chromium(III) halide tetrahydrofuran complex; or alternatively, a cationic chromium(III) halide tetrahydrothiophene complex. Other general or specific cationic chromium complexes having the formula $M^B L_l$ can be described using aspects and embodiments of the present disclosure. These general and specific cationic chromium complexes are readily apparent and contemplated.

In an aspect, the anionic chromium complex (a chromium complex where m is a negative integer) can have the formula $(Cr_{y1}X_{x1}L_l)^m$, $(CrX_{x1}L_l)^m$, $(CrL_l)^m$, $(Cr_{y1}X_{x1})^m$, or $(CrX_{x1})^m$; alternatively, $(Cr_{y1}X_{x1}L_l)^m$, $(CrX_{x1}L_l)^m$, $(CrL_l)^m$, $(Cr_{y1}X_{x1})^m$, or $(CrX_{x1})^m$; alternatively, $(Cr_{y1}X_{x1}L_l)^m$, $(CrX_{x1}L_l)^m$, or $(CrL_l)^m$; alternatively, $(Cr_{y1}X_{x1}L_l)^m$ or $(CrX_{x1}L_l)^m$; alternatively, $(Cr_{y1}X_{x1})^m$ or $(CrX_{x1})^m$; alternatively, $(Cr_{y1}X_{x1}L_l)^m$; alternatively, $(CrX_{x1}L_l)^m$; alternatively, $(CrL_l)^m$; alternatively, $(Cr_{y1}X_{x1})^m$; or alternatively, $(CrX_{x1})^m$. Generally, the anionic chromium complex can be described using any compatible combination of the oxidation state of the chromium (x) described herein, number of chromium atoms (y1) described herein, anionic ligand (X) described herein, charge of the anionic ligand(s) (y) described herein, number of anionic ligands (x1) described herein, neutral ligand (L) described herein, and number of neutral ligands (l) described herein, and negative charge of the anionic chromium complex (m) described herein.

In a non-limiting embodiment, the anionic chromium complex can be, comprise, or consist essentially of, an anionic chromium halide or an anionic chromium cyanide complex. In some non-limiting embodiments, the anionic chromium complex can be, comprise, or consist essentially of, an anionic chromium halide; or alternatively, an anionic chromium cyanide complex. Generally, the individual elements of these non-limiting embodiments of the anionic chromium complex are independently described herein and can be utilized in any compatible combination to further describe the anionic chromium complex.

Chromium states which can be utilized to describe the anionic chromium complexes are described herein and can be utilized in any combination to further describe the anionic chromium complexes which can be utilized in any aspect or any embodiment disclosed herein. In a non-limiting embodiment, the anionic chromium can be, comprise, or consist essentially of, an anionic chromium(II) complex or a anionic chromium(III) complex having any anionic ligand described herein and any neutral ligand described herein; alternatively, a anionic chromium(II) complex having any anionic ligand described herein and any neutral ligand described herein; or alternatively, a anionic chromium(III) complex having any anionic ligand described herein and any neutral ligand described herein. In some embodiments, any anionic ligand described herein and any neutral ligand described herein can be utilized to further describe a anionic chromium(II) complex or a anionic chromium(III) complex; alternatively, a anionic chromium(II) complex; or alternatively a anionic chromium(III) complex. In a non-limiting embodiment, the anionic chromium complex can be, comprise, or consist essentially of, an anionic chromium(II) complex or a anionic chromium(III) complex; alternatively, a anionic chromium (II) complex; or alternatively, a anionic chromium(III) complex.

In a non-limiting embodiment, the anionic chromium complex which can be utilized in any aspect or any embodiment disclosed herein can be, comprise, or consist essentially of, an anionic chromium(III) halide complex, or an anionic chromium(III) cyanide complex. In some non-limiting embodiments, the anionic chromium complex which can be utilized in any aspect or any embodiment disclosed herein can be, comprise, or consist essentially of, an anionic chromium(III) halide complex; or alternatively, an anionic chromium(III) cyanide complex. In a non-limiting embodiment, the anionic transition metal complex can be, comprise, or consist essentially of, $(CrCl_4)^{1-}$, $(Cr(CN)_6)^{3-}$; alternatively, $(CrCl_4)^{1-}$; or alternatively, $(Cr(CN)_6)^{3-}$. Other general or specific cationic complexes having the formula $[(M^B)_{y1}X_x]^m$ and or the formula $[M^B X_x]^m$ can be described using aspects and embodiments of the present disclosure. These general and specific anionic chromium complexes are readily apparent and contemplated.

Generally, when the chromium complex has a negative charge (e.g. having the formula $[(Cr_{y1}X_{x1}L_l)^m]_q[C^c]_{m1}[A^a]_{m2}$, $[(Cr_{y1}X_{x1}L_l)^m]_q[C^c]_{m1}$, $[(CrX_xL_l)^m]_q[C^c]_{m1}[A^a]_{m2}$, $[(CrX_xL_l)^m]_q[C^c]_{m1}$, $[(Cr_{y1}X_{x1})^m]_q[C^c]_{m1}[A^a]_{m2}$, $[(Cr_{y1}X_{x1})^m]_q[C^c]_{m1}$, $[(CrX_x)^m]_q[C^c]_{m1}[A^a]_{m2}$, and/or $[(CrX_x)^m]_q[C^c]_{m1}$, among others where m can be negative), the negative charge on the chromium complex can be balanced by a cationic specie(s) to provide a neutral chromium precursor. Generally, the chromium precursor can be described using any compatible combination of chromium oxidation state (x) described herein, number of chromium atoms (y1) described herein, anionic ligand(s) (X) described herein, charge of the anionic ligand(s) (y) described herein, number of anionic ligands (x1) described herein, neutral ligand(s) (L) described herein, number of neutral ligands (l) described herein, charge of the chromium complex(es) (m) described herein, number of anionic metal complexes (q) described herein, cationic species (C) described herein, charge on the cationic specie(s) (c) described herein, and number of cationic specie(s) (m1) described herein.

Generally, when the chromium precursor (general or specific) comprises at least one cationic species, the charge, c, of each cationic species, C, independently can be an integer ranging from 1 to 3 or alternatively, an integer ranging from 1 to 2. In an embodiment, the charge, c, of each cationic species, C, independently can be 1; alternatively, 2; or alternatively, 3. Generally, the charge, c, of the cationic specie, C, is apparent by the identity of the cationic specie.

Generally, the number of cationic species, m1, in the chromium precursor can be an integer ranging from 0 to 5. In an embodiment, m1, in the chromium precursor can be an integer ranging from 0 to 4; alternatively, 0 to 3; alternatively, 0 to 2; alternatively, 1 to 5; alternatively, 1 to 4; alternatively, 1 to 3; or alternatively, 1 to 2. In an embodiment, m1, in the chromium precursor can be 0; alternatively, 1; alternatively, 2; alternatively, 3; alternatively, 4; or alternatively, 5.

The number of cationic species, m1, in the chromium precursor is a function of the charge on the chromium complex(es) (m), the number of chromium complexes (q), the cationic specie(s), and the charge (c) on the cationic specie(s). When the chromium complex is anionic, the number of anionic chromium complex(es) (q) having charge m and the number of cationic specie(s) (C) having charge c can be related by the equation $|m*q|=c*m1$. In some embodiments when the chromium complex is anionic, the number of anionic chromium complex(es), q, can be related to the charge on the anionic chromium complex(es) (m), the cationic specie(s) (C), and the cationic specie charge (c) by the relationship that q=c divided by the greatest common divisor of c and |m|. In some embodiments when the chromium complex is anionic, the number of cationic specie(s) (m1) can be related to charge on the anionic chromium complex(es) (m), the cationic specie(s), and the cationic specie charge (c) by the relationship that m1=|m| divided by the greatest common divisor of c and |m|.

In an aspect, each cationic species, C, which can be utilized in a chromium precursor independently can be, comprise, or consist essentially of, a Group 1 metal cation, a Group 2 metal cation, a tetraorganylammonium cation, or a tetraorganylphosphonium cation. In an embodiment, each cationic species, C, independently can be, comprise, or consist essentially of, a Group 1 metal cation or Group 2 metal cation; alternatively, a tetraorganylammonium cation or a tetraorganylphosphonium cation; alternatively, a Group 1 metal cation; alternatively, a Group 2 metal cation; alternatively, a tetraorganylammonium cation; or alternatively, tetraorganylphosphonium cation. In an aspect, each organyl group of the tetraorganylammonium cation or tetraorganylphosphonium cation independently can be a hydrocarbyl group or a substituted hydrocarbyl group; alternatively, a hydrocarbyl group; or alternatively, a substituted hydrocarbyl group. In some embodiments, the cationic species, C, which can be utilized in a chromium precursor can be, comprise, or consist essentially of, a tetrahydrocarbylammonium cation, or a tetrahydrocarbylphosphonium cation; tetrahydrocarbylammonium cation; or alternatively, a tetrahydrocarbylphosphonium cation. In other embodiments, the cationic species, C, which can be utilized in a chromium precursor can be, comprise, or consist essentially of, a tetraalkylammonium cation, or a tetraalkylphosphonium cation; tetraalkylammonium cation; or alternatively, a tetraalkylphosphonium cation. When the cationic species is a Group 1 metal cation, tetraorganylammonium cation, or a tetraorganylphosphonium cation, the charge, c, on the cationic specie is 1. When the cationic species is a Group 2 metal cation, the charge, c, on the cationic specie is 2.

In an aspect, each Group 1 metal cation which can be utilized as the cationic species independently can be, comprise, or consist essentially of, $Li^+$, $Na^+$, $K^+$, $Rb^+$, or $Cs^+$. In an embodiment, each Group 1 cation which can be utilized as the cationic species independently can be, comprise, or consist essentially of, $Li^+$; alternatively, $Na^+$; alternatively, $K^+$; alternatively, $Rb^+$; or alternatively, $Cs^+$. In an aspect, each Group 2 metal cation which can be utilized as the cationic species independently can be, comprise, or consist essentially of $Be^{2+}$, $Mg^{2+}$, $Ca^{2+}$, $Sr^{2+}$, or $Ba^{2+}$. In an embodiment, each Group 2 cation which can be utilized as the cationic species independently can be, comprise, or consist essentially of, $Be^{2+}$; alternatively, $Mg^{2+}$; alternatively, $Ca^{2+}$; alternatively, $Sr^{2+}$; or alternatively, $Ba^{2+}$.

In an aspect, each tetraorganylammonium cation which can be utilized as the cationic species independently can have the formula $NR^{1b}R^{2b}R^{3b}R^{4b}$. In another aspect, the tetraorganylammonium cation can have the formula $N(R^{5b})_4$. In an aspect, each tetraorganylphosphonium cation which can be utilized as the cationic species independently can have the formula $PR^{1d}R^{2d}R^{3d}R^{4d}$. In another aspect, the tetrahydrocarbylphosphonium cation can have the formula $P(R^{5d})_4$. Within the tetraorganylammonium cation having the formula $NR^{1b}R^{2b}R^{3b}R^{4b}$, the tetraorganylammonium cation having the formula $N(R^{5b})_4$, the tetraorganylphosphonium cation having the formula $PR^{1d}R^{2d}R^{3d}R^{4d}$, and the tetrahydrocarbylphosphonium cation having the formula $P(R^{5d})_4$, $R^{1b}$, $R^{2b}$, $R^{3b}$, $R^{4b}$, $R^{5b}$, $R^{1d}$, $R^{2d}$, $R^{3d}$, $R^{4d}$, and/or $R^{5d}$ independently can be a $C^1$ to $C^{20}$ organyl group; alternatively, $C^1$ to $C^{15}$ organyl group; $C^1$ to $C^{10}$ organyl group; or alternatively, $C^1$ to $C^5$ organyl group. In an embodiment, each organyl group which can be utilized as $R^{1b}$, $R^{2b}$, $R^{3b}$, $R^{4b}$, $R^{5b}$, $R^{1d}$, $R^{2d}$, $R^{3d}$, $R^{4d}$, and/or $R^{5d}$ independently can be a hydrocarbyl group or a substituted hydrocarbyl group; alternatively, a hydrocarbyl group; or alternatively, a substituted hydrocarbyl group. Generally, the hydrocarbyl group and/or substituted hydrocarbyl group which can be utilized as $R^{1b}$, $R^{2b}$, $R^{3b}$, $R^{4b}$, $R^{5b}$, $R^{1d}$, $R^{2d}$, $R^{3d}$, $R^{4d}$, and/or $R^{5d}$ independently can have the same number of carbon atoms as the organyl groups which can be utilized as $R^{1b}$, $R^{2b}$, $R^{3b}$, $R^{4b}$, $R^{5b}$, $R^{1d}$, $R^{2d}$, $R^{3d}$, $R^{4d}$, and/or $R^{5d}$. Hydrocarbyl groups (substituted or unsubstituted) are generally disclosed within the present disclosure (e.g. as a selection for $R^{2c}$ for the monocarboxylate having the formula $^-O_2CR^{2c}$, and/or as a selection for $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$, among other places). These hydrocarbyl groups (substituted or substituted) can be utilized without limitation as hydrocarbyl groups which can be utilized as $R^{1b}$, $R^{2b}$, $R^{3b}$, and $R^{4b}$ (of the tetrahydrocarbylammonium cation having the formula $NR^{1b}R^{2b}R^{3b}R^{4b}$), $R^{1d}$, $R^{2d}$, $R^{3d}$, and $R^{4d}$ (of the tetrahydrocarbylphosphonium cation having the formula $PR^{1d}R^{2d}R^{3d}R^{4d}$), $R^{5b}$ (of the tetrahydrocarbylammonium cation having formula $N(R^{5b})_4$), and $R^{5d}$ (of the tetrahydrocarbylammonium cation having formula $P(R^{5d})_4$).

In a non-limiting embodiment, each cationic species independently can be, comprise, or consist essentially of, tetramethylammonium ($NMe_4^+$), tetraethylammonium ($NEt_4^+$), tetrabutylammonium ($NBu_4^+$), or tetraphenylammonium ($NPh_4^+$). In some non-limiting embodiments, each cationic species can be, comprise, or consist essentially of, tetramethylammonium ($NMe_4^+$), tetraethylammonium ($NEt_4^+$), or tetrabutylammonium ($NBu_4^+$); alternatively, tetramethylammonium ($NMe_4^+$); alternatively, tetraethylammonium ($NEt_4^+$); alternatively, tetrabutylammonium ($NBu_4^+$); or alternatively, tetraphenylammonium ($NPh_4^+$). In other non-limiting embodiments, each cationic species can be, comprise, or consist essentially of, tetramethylphosphonium ($PMe_4^+$), tetraethylphosphonium ($PEt_4^+$), tetrabutylphosphonium ($PBu_4^+$), or tetraphenylphosphonium ($PPh_4^+$). In yet other non-limiting embodiments, each cationic species can be, comprise, or consist essentially of, tetramethylphosphonium ($PMe_4^+$), tetraethylphosphonium ($PEt_4^+$), or tetrabutylphosphonium ($PBu_4^+$); alternatively, tetramethylphosphonium ($PMe_4^+$); alternatively, tetraethylphosphonium ($PEt_4^+$); alternatively, tetrabutylphosphonium ($PBu_4^+$); or alternatively, tetraphenylphosphonium ($PPh_4^+$).

Generally, when the chromium complex has a positive charge (e.g. having the formula $[(Cr_{y1}X_{x1}L_l)^m]_q[C^c]_{m1}[A^a]_{m2}$, $[(Cr_{y1}X_{x1}L_l)^m]_q[A^a]_{m2}$, $[(CrL_l)^m]_q[A^a]_{m2}$, $[(CrX_xL_l)^m]_q[C^c]_{m1}[A^a]_{m2}$, $[(CrX_xL_l)^m]_q[A^a]_{m2}$, $[(Cr_{y1}X_{x1})^m]_q[C^c]_{m1}[A^a]_{m2}$, $[(Cr_{y1}X_{x1})^m]_q[A^a]_{m2}$, $[(CrX_x)^m]_q[C^c]_{m1}[A^a]_{m2}$, and/or $[(CrX_x)^m]_q[A^a]_{m2}$, among others described herein where m can be positive), the positive charge of the chromium complex can be balanced by an anionic specie(s) to provide a neutral chromium precursor. Generally, the chromium precursor can be described using any compatible combination of chromium oxidation state (x) described herein, number of chromium atoms (y1) described herein, anionic ligand(s) (x) described herein, charge of the anionic ligand(s) (y) described herein, number of anionic ligands (x1) described herein, neutral ligand(s) (L) described herein, number of neutral ligands (l) described herein, charge of the chromium complex(es) (m) described herein, number of anionic chromium complexes (q) described herein, cationic specie(s) (C) described herein, change on the anionic specie(s) (a) described herein, and number of anionic specie(s) (m2) described herein.

Generally, when the chromium precursor (general or specific) comprises at least one anionic species, the charge, a, of each cationic species, A, independently can be an integer ranging from −1 to −3 or alternatively, an integer ranging from −1 to −2. In an embodiment, the charge, a, of each cationic species, A, independently can be −1; alternatively, −2; or alternatively, −3. Generally, the charge, a, of the cationic specie, A, is apparent by the identity of the cationic specie.

Generally, the number of anionic species, m2, in the chromium precursor can be an integer ranging from 0 to 5. In an embodiment, m2, in the chromium precursor can be an integer ranging from 0 to 4; alternatively, 0 to 3; alternatively, 0 to 2; alternatively, 1 to 5; alternatively, 1 to 4; alternatively, 1 to 3; or alternatively, 1 to 2. In an embodiment, m2, in the chromium precursor can be 0; alternatively, 1; alternatively, 2; alternatively, 3; alternatively, 4; or alternatively, 5.

The number of anionic specie(s), m2, in the chromium precursor can be a function of the charge on the chromium complex(es) (m), the number of chromium complexes (q), the anionic specie(s), and the charge (a) on the anionic specie(s). When the chromium complex is cationic, the number of cationic chromium complex(es) (q) having charge m and the number of anionic specie(s) (A) having charge a can be related by the equation m*q=|a*m2|. In some embodiments when the chromium complex is cationic, the number of cationic chromium complex(es), q, can be related to the charge on the cationic chromium complex(es) (m), the anionic specie(s) (A), and the anionic specie(s) charge (c) by the relationship that q=|a| divided by the greatest common divisor of |a| and m. In some embodiments when the chromium complex is cationic, the number of anionic specie(s), m2, can be related to the charge on the cationic chromium complex(es) (m), the anionic specie(s) (A), and the anionic specie(s) charge (c) by the relationship that m2=|m| divided by the greatest common divisor of |a| and m.

In an aspect, each anionic species, A, which can be utilized in a chromium precursor independently can be, but is not limited to, halide, hypohalite, halite, halate, perhalate, nitrate, nitrite, sulfate, sulfite, bisulfate, phosphate, cyanide, cyanate, thiocyanate, a hexahalophosphate, a tetrahaloaluminate, a hexahaloaluminate, hexahalosilicate, metaborate, tetraborate, a tetrahaloborate, or a tetraorganylborate. In an embodiment, each anionic species, A, independently can be a halide, nitrate, sulfate, phosphate, cyano, a hexahalophosphate, a tetrahaloborate, or a tetraorganylborate; alternatively, a halide, nitrate, sulfate, or phosphate; alternatively, a halide; alternatively, a hypohalite; alternatively, a halite; alternatively, a halate; alternatively, a perhalate; alternatively, a nitrate; alternatively, a nitrite; alternatively, a sulfate; alternatively, a sulfite; alternatively, a bisulfate; alternatively, a phosphate; alternatively, a phosphite; alternatively, a cyanide; alternatively, a cyanate; alternatively, a thiocyanate; alternatively, a hexahalophosphate; alternatively, a hexahaloaluminate; alternatively, hexahalosilicate; alternatively, a metaborate; alternatively, a tetraborate; alternatively, a tetrahaloborate; or alternatively, a tetraorganylborate. When the anionic species is a halide, a hypohalite, a halite, a halate, perhalate, nitrate, nitrate, bisulfite, cyanide, cyanate, thiocyanate, a tetrahaloaluminate, a hexahalophosphate, metaborate, tetrahaloborate, or a tetraorganylborate, the charge, a, on the anionic specie is −1. When the anionic species is a sulfate, sulfite, hexahalosilicate, or tetraborate, the charge, a, on the anionic specie is −2. When the anionic species is a phosphate, or hexahaloaluminate, the charge, a, on the anionic specie is −3.

In an embodiment, the halide anionic species can be, comprise, or consist essentially of, fluoride, chloride, bromide, or iodide; alternatively, fluoride; alternatively, chloride; alternatively, bromide; or alternatively, iodide. In an embodiment, the hypohalite anionic species can be, comprise, or consist essentially of, hypofluorite, hypochlorite, hypobromite, or hypoiodite; alternatively, hypofluorite; alternatively, hypochlorite; alternatively, hypobromite; or alternatively, hypoiodite. In an embodiment, the halite anionic species can be, comprise, or consist essentially of, fluorite, chlorite, bromite, or iodite; alternatively, fluorite; alternatively, chlorite; alternatively, bromite; or alternatively, iodite. In an embodiment, the halate anionic species can be, comprise, or consist essentially of, fluorate, chlorate, bromate, or iodate; alternatively, fluorate; alternatively, chlorate; alternatively, bromate; or alternatively, iodate. In an embodiment, the perhalate anionic species can be, comprise, or consist essentially of, perfluorate, perchlorate, perbromate, or periodate; alternatively, perfluorate; alternatively, perchlorate; alternatively, perbromate; or alternatively, periodate. In an embodiment, the hexahalophosphate anionic species can be, comprise, or consist essentially of, hexafluorphosphate, hexachlorophosphate, hexabromophosphate, or hexaiodophosphate; alternatively, hexafluorphosphate; alternatively, hexachlorophosphate; alternatively, hexabromophosphate; or alternatively, hexaiodophosphate. In an embodiment, the hexahaloaluminate anionic species can be, comprise, or consist essentially of, hexafluoroaluminate, hexachloroaluminate, hexabromoaluminate, or hexaiodoaluminate; alternatively, hexafluoroaluminate; alternatively, hexachloroaluminate; alternatively, hexabromoaluminate; or alternatively, hexaiodoaluminate. In an embodiment, the hexahalosilicate anionic species can be, comprise, or consist essentially of, hexafluorosilicate, hexachlorosilicate, hexabromosilicate, or hexaiodosilicate; alternatively, hexafluorosilicate; alternatively, hexachlorosilicate; alternatively, hexabromosilicate; or alternatively, hexaiodosilicate. In an embodiment, the tetrahaloborate anionic species can be, comprise, or consist essentially of, tetrafluoroborate, tetrachloroborate, tetrabromoborate, or tetraiodoborate; alternatively, tetrafluoroborate; alternatively, tetrachloroborate; alternatively, tetrabromoborate; or alternatively, or tetraiodoborate.

In an aspect, the tetraorganylborate anion can have the formula $BR^{1g}R^{2g}R^{3g}R^{4g}$. In another aspect, the tetraorganylammonium cation can have the formula $B(R^{5g})_4$. Within the tetraorganylborate anion having the formula $BR^{1g}R^{2g}R^{3g}R^{4g}$ and the tetraorganylborate anion having the formula $B(R^{5g})_4$, $R^{1g}$, $R^{2g}$, $R^{3g}$, $R^{4g}$, and/or $R^{5g}$ independently can be a $C_1$-$C_{20}$ organyl group; alternatively, $C_1$-$C_{15}$ organyl group; $C_1$-$C_{10}$ organyl group; or alternatively, $C_1$-$C_5$ organyl group. In an embodiment, each organyl group which can be utilized as $R^{1g}$, $R^{2g}$, $R^{3g}$, $R^{4g}$, and/or $R^{5g}$ independently can be a hydrocarbyl group or a substituted hydrocarbyl group; alternatively, a hydrocarbyl group; or alternatively, a substituted hydrocarbyl group. Generally, the hydrocarbyl group and/or substituted hydrocarbyl group which can be utilized as $R^{1g}$, $R^{2g}$, $R^{3g}$, $R^{4g}$, and/or $R^{5g}$ independently can have the same number of carbon atoms as the organyl groups which can be utilized as $R^{1g}$, $R^{2g}$, $R^{3g}$, $R^{4g}$, and/or $R^{5g}$. Hydrocarbyl groups (substituted or unsubstituted) are generally disclosed within the present disclosure (e.g. as a selection for $R^{2c}$ for the monocarboxylate having the formula $^-O_2CR^{2c}$, and/or as a selection for $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$, among other places). These hydrocarbyl groups (substituted or substituted) can be utilized without limitation as hydrocarbyl groups which can be utilized as $R^{1g}$, $R^{2g}$, $R^{3g}$, and $R^{4g}$ (of the tetraorganylborate anion having the formula $BR^{1g}R^{2g}R^{3g}R^{4g}$) and $R^{5b}$ (of the tetrahydrocarbylammonium cation having formula $N(R^{5b})_4$), and $R^{5d}$ (of the tetraorganylammonium cation having the formula $B(R^{5g})_4$).

In a non-limiting embodiment, each tetraorganylborate anion which can be utilized as the anionic species independently can be, comprise, or consist essentially of, tetraphenylborate, tetrakis(para-tolyl)borate, tetrakis[3,5-bis(trifluoromethyl)phenyl]borate, or tetrakis(pentafluorophenyl) borate. In some other non-limiting embodiments, each tetraorganylborate anion which can be utilized as the anionic species independently can be, comprise, or consist essentially of, a tetraphenylborate; alternatively, tetrakis(para-tolyl)borate; alternatively, tetrakis[3,5-bis(trifluoromethyl) phenyl]borate; or alternatively, tetrakis(pentafluorophenyl) borate.

In an aspect, the chromium precursor can have the formula $[(Cr_{y1}X_{x1}L_l)^m]_q[C^c]_{m1}[A^a]_{m2}$. The number of chromium atoms having an oxidation state of x (y1), the anionic ligand (X) having a charge of y, the number of anionic ligands having a charge of y (x1), the neutral ligand (L), the number of neutral ligands (l), the charge (m) on the chromium complex $(Cr_{y1}X_{x1}L_l)^m$, the number (q) of chromium complexes $(Cr_{y1}X_{x1}L_l)^m$, the cationic species (C) having charge c, the number of cationic species having charge c (m1), the anionic species (A) having charge a, and the number of anionic species having charge a (m2) are independently described herein. These independent descriptions can be utilized in any compatible manner and/or combination to further describe the chromium precursor having the formula $[(Cr_{y1}X_{x1}L_l)^m]_q[C^c]_{m1}[A^a]_{m2}$. In the aspect where the chromium precursor can have the formula $[(Cr_{y1}X_{x1}L_l)^m]_q[C^c]_{m1}[A^a]_{m2}$, the formula $[(Cr_{y1}X_{x1}L_l)^m]_q[C^c]_{m1}[A^a]_{m2}$ can encompass general chromium precursors having an anionic chromium complex (i.e. m having any value, or any value range, disclosed wherein where m<0, m1 having a value, or range value, disclosed herein where m1>0, and m2=0), having a cationic chromium complex (i.e. m having a any value, or any value range, disclosed wherein where m>0, m1=0, and m2 having any value, or any value range, disclosed herein where m2>0), and/or having a neutral chromium precursor (i.e. m=0, m1=0, and m2=0). General and specific chromium precursors having the formula $[(Cr_{y1}X_{x1}L_l)^m]_q[C^c]_{m1}[A^a]_{m2}$ can be described using aspects and embodiments of the present disclosure. These general and specific chromium precursors are readily apparent and contemplated.

When each X of the chromium precursor having the formula $[(Cr_{y1}X_{x1}L_l)^m]_q[C^c]_{m1}[A^a]_{m2}$ is a monoanionic ligand, the chromium precursor can have the formula $[(CrX_{x1}L_l)^m]_q[C^c]_{m1}[A^a]_{m2}$. In the aspect where the chromium precursor can have the formula $[(CrX_{x1}L_l)^m]_q[C^c]_{m1}[A^a]_{m2}$, the formula $[(CrX_{x1}L_l)^m]_q[C^c]_{m1}[A^a]_{m2}$ can encompass general chromium precursors having an anionic chromium complex (i.e. m having any value, or any value range, disclosed wherein where m<0, m1 having any value, or any value range, disclosed herein where m1>0, and m2=0), having a cationic chromium complex (i.e. m having any value, or any value range, disclosed wherein where m>0, m1=0, and m2 having any value, or any value range, disclosed herein where m2>0), and/or having a neutral chromium precursor (i.e. m=0, m1=0, and m2=0). General and specific chromium precursors having the formula $[(CrX_{x1}L_l)^m]_q[C^c]_{m1}[A^a]_{m2}$ can be described using aspects and embodiments of the present disclosure. These general and specific chromium precursors are readily apparent and contemplated.

In a non-limiting embodiment, the chromium precursor having the formula $[(Cr_{y1}X_{x1}L_l)^m]_q[C^c]_{m1}[A^a]_{m2}$ or the formula $[(CrX_{x1}L_l)^m]_q[C^c]_{m1}[A^a]_{m2}$ can comprise, or consist essentially of, an anionic chromium complex which has a relationship between the anionic chromium complex, the cationic specie(s), and the anionic specie wherein m can have any value (or value range) disclosed herein where m<0, q and c independently can have any value (or value range) disclosed herein where q=c divided by the greatest common divisor of c and |m|, m1 can have any value (or value range) disclosed herein where m1=|m| divided by the greatest common divisor of c and |m|, and m2=0. In another non-limiting embodiment, the chromium precursor having the formula $[(Cr_{y1}X_{x1}L_l)^m]_q[C^c]_{m1}[A^a]_{m2}$ or the formula $[(CrX_{x1}L_l)^m]_q[C^c]_{m1}[A^a]_{m2}$ can comprise, or consist essentially of, a neutral chromium complex which has a relationship between the anionic chromium complex, the cationic specie, and the anionic specie wherein m=0, m1=0 and m2=0. In yet another non-limiting embodiment, the chromium precursor having the formula $[(Cr_{y1}X_{x1}L_l)^m]_q[C^c]_{m1}[A^a]_{m2}$ or the formula $[(CrX_{x1}L_l)^m]_q[C^c]_{m1}[A^a]_{m2}$ can comprise, or consist essentially of, a cationic chromium complex which has a relationship between the cationic chromium complex, the cationic specie, and the anionic specie(s) wherein m can have any value (or value range) disclosed herein where m>0, q and a independently can have any value (or value range) disclosed herein where q=|a| divided by the greatest common divisor of m and |a|, m1=0, and m2 can have any value (or value range) disclosed herein where m2=m divided by the greatest common divisor of m and |a|.

In an aspect, the chromium precursor can have the formula $[(Cr_{y1}X_{x1}L_l)^m]_q[C^c]_{m1}$. The number of chromium atoms having an oxidation state of x (y1), the anionic ligand (X) having a charge of y, the number of anionic ligands having a charge of y (x1), the neutral ligand (L), the number of neutral ligands (l), the charge (m) on the chromium complex $(Cr_{y1}X_{x1}L_l)^m$, the number (q) of chromium complexes $(Cr_{y1}X_{x1}L_l)^m$, the cationic species (C) having charge c, and the number of cationic species having charge c (m1) are independently described herein. These independent descriptions can be utilized in any compatible manner and/or combination to further describe the chromium precursor having the formula $[(Cr_{y1}X_{x1}L_l)^m]_q[C^c]_{m1}$. In the aspect where the chromium precursor can have the formula $[(Cr_{y1}X_{x1}L_l)^m]_q[C^c]_{m1}$, the formula $[(Cr_{y1}X_{x1}L_l)^m]_q[C^c]_{m1}$ can encompass general chromium precursors having an anionic chromium complex (i.e. m having any value, or any value range, disclosed wherein where m<0, m1 having any value, or any value range, disclosed herein where m1>0). In an embodiment, the chromium precursor having the formula $[(Cr_{y1}X_{x1}L_l)^m]_q[C^c]_{m1}$ can encompass general chromium precursors having an anionic chromium complex which has a relationship between the anionic chromium complex and the cationic specie(s) wherein m can have any value (or value range) disclosed herein where m<0, q and c independently can have any value (or value range) disclosed herein, where q=c divided by the greatest common divisor of c and |m|, and m1 can have any value (or value range) disclosed herein where m1=|m| divided by the greatest common divisor of c and |m|. In an embodiment, the chromium precursor having the formula $[(Cr_{y1}X_{x1}L_l)^m]_q[C^c]_{m1}$ can encompass general chromium precursors having an anionic chromium complex wherein m can any value, or any value range, disclosed wherein where m<0 and m=(x*y1)+(y*x1).

As a consequence of the conditions that m<0 and m=(x*y1)+(y*x1), x1 can be any positive integer disclosed herein that satisfies the equation x1>(x*y1)/|y| (using any value of x, y1 and y disclosed herein) and/or y1 can be a positive integer and satisfies the equation y1≤(|y|*x1)/x (using any value of x, x1 and y disclosed herein). In some embodiments, x1 can range from the minimum positive integer that satisfies the equation x1>(x*y1)/|y| (using any value of x, y1 and y disclosed herein) to any value of x1 provided herein that is greater than the minimum positive integer that satisfies the equation x1>(x*y1)/|y| (using any value of x, y1 and y disclosed herein). In some embodiments, y1 can range from any value of y1 disclosed herein to any positive integer that satisfies the equation y1≤ (|y|*x1)/x (using any value of x, x1 and y disclosed herein). Regardless of the values of x1, y1, and m, the number of neutral ligands (l) in the chromium precursor having the formula the $[(Cr_{y1}X_{x1}L_l)^m]_q[C^c]_{m1}$ can be any value, or any value range, disclosed herein. General and specific chromium precursors having the formula $[(Cr_{y1}X_{x1}L_l)^m]_q[C^c]_{m1}$ can be described using aspects and embodiments of the present disclosure. These general and specific chromium precursors are readily apparent and contemplated.

When each X of the chromium precursor having the formula $[(Cr_{y1}X_{x1}L_l)^m]_q[C^c]_{m1}$ is a monoanionic ligand the chromium precursor can have the formula $[(CrX_{x1}L_l)^m]_q[C^c]_{m1}$. In the aspect where the chromium precursor can have the formula $[(CrX_{x1}L_l)^m]_q[C^c]_{m1}$ (where each X is a monoanionic ligand), the formula $[(CrX_{x1}L_l)^m]_q[C^c]_{m1}$ can encompass general chromium precursors having an anionic chromium complex (i.e. m having any value, or any value range, disclosed wherein where m<0, m1 having any value, or any value range, disclosed herein where m1>0). In the aspect where the chromium precursor can have the formula $[(CrX_{x1}L_l)^m]_q[C^c]_{m1}$ (where each X is a monoanionic ligand), the formula $[(CrX_{x1}L_l)^m]_q[C^c]_{m1}$ can encompass general chromium precursors having an anionic chromium complex which has a relationship between the anionic chromium complex and the cationic specie(s) wherein m can have any value (or value range) disclosed herein where m<0, q and c independently can have any value (or value range) disclosed herein, where q=c divided by the greatest common divisor of c and |m|, and m1 can have any value (or value range) disclosed herein where m1=|m| divided by the greatest common divisor of c and |m|. In an embodiment, the chromium precursor having the formula $[(CrX_{x1}L_l)^m]_q[C^c]_{m1}$ (where each X is a monoanionic ligand) can encompass general chromium precursors having an anionic chromium complex wherein m can any value, or any value range, disclosed wherein where m<0 and m=x−x1. As a consequence of the conditions that m<0 and m=x−x1, x1 can be any positive integer disclosed herein that satisfies the equation x1>x (using any value of x disclosed herein). In some embodiments, x1 can range from the minimum positive integer that satisfies the equation x1>x (using any value of x disclosed herein) to any value of x1 provided herein that is greater than the minimum positive integer that satisfies the equation x1>x (using any value of x disclosed herein). Regardless of the values of m or x1, the number of neutral ligands (l) in the chromium precursor having the formula the $[(CrX_{x1}L_l)^m]_q[C^c]_{m1}$ (where each X is a monoanionic ligand) can be any value, or any value range, disclosed herein. General and specific chromium precursors having the formula $[(CrX_{x1}L_l)^m]_q[C^c]_{m1}$ (where each X is a monoanionic ligand) can be described using aspects and embodiments of the present disclosure. These general and specific chromium precursors are readily apparent and contemplated.

In a non-limiting embodiment, the chromium precursor having the formula can be, comprise, or consist essentially of, $Na_3CrCl_6$ or $LiCrCl_4$; alternatively, $Na_3CrCl_6$; or alternatively, $LiCrCl_4$. Other general and specific chromium precursors having the formula $[(Cr_{x1}X_{n1}L_l)^m]_{q1}[C^c]_{m1}$ and/or $[(CrX_{n1}L_l)^m]_{q1}[C^c]_{m1}$ can be described using aspects and embodiments of the present disclosure. These general and specific chromium precursors are readily apparent and contemplated.

In an aspect, the chromium precursor can have the formula $[(Cr_{y1}X_{x1}L_l)^m]_q[A^a]_{m2}$. The number of chromium atoms having an oxidation state of x (y1), the anionic ligand (X) having a charge of y, the number of anionic ligands having a charge of y (x1), the neutral ligand (L), the number of neutral ligands (l), the charge (m) on the chromium complex $(Cr_{y1}X_{x1}L_l)^m$, the number (q) of chromium complexes $(Cr_{y1}X_{x1}L_l)^m$, the anionic species (A) having charge a, and the number of anionic species having charge a (m2) are independently described herein. These independent descriptions can be utilized in any compatible manner and/or combination to further describe the chromium precursor having the formula $[(Cr_{y1}X_{x1}L_l)^m]_q[A^a]_{m2}$. In the aspect where the chromium precursor can have the formula $[(Cr_{y1}X_{x1}L_l)^m]_q[A^a]_{m2}$, the formula $[(Cr_{y1}X_{x1}L_l)^m]_q[A^a]_{m2}$ can encompass general chromium precursors having a cationic chromium complex (i.e. m having any value, or any value range, disclosed wherein where m>0, and m2 having any value, or any value range, disclosed herein where m2>0). In an embodiment, the chromium precursor having the formula $[(Cr_{y1}X_{x1}L_l)^m]_q[A^a]_{m2}$ can encompass general chromium precursors having a cationic chromium complex which has a relationship between the cationic chromium complex and the anionic specie(s) wherein m can have any value (or value range) disclosed herein where m>0, q and a independently can have any value (or value range) disclosed herein where q=|a| divided by the greatest common divisor of m and |a|, and m2 can have any value (or value range) disclosed herein where m2=m divided by the greatest common divisor of m and |a|. In an embodiment, the chromium precursor having the formula $[(Cr_{y1}X_{x1}L_l)^m]_q[A^a]_{m2}$ can encompass general chromium precursors having a cationic chromium complex wherein m can any value, or any value range, disclosed wherein where m>0 and m=(x*y1)+(y*x1). As a consequence of the conditions that m>0 and m=(x*y1)+(y*x1), x1 can be any positive integer disclosed herein that satisfies the equation x1<(x*y1)/|y| (using any value of x, y1 and y disclosed herein) and/or y1 can be a positive integer and satisfies the equation y1≥(|y|*x1)/x (using any value of x, x1 and y disclosed herein). In some embodiments, x1 can range from 0, or any x1 value disclosed herein less than that which satisfies the equation x1<(x*y1)/|y| (using any value of x, y1 and y disclosed herein) to any value of x1 provided herein that satisfies the equation x1<(x*y1)/|y| (using any value of x, y1 and y disclosed herein). In some embodiments, y1 can range from any value of y1 disclosed herein that satisfies the equation y1≥(|y|*x1)/x (using any value of x, x1 and y disclosed herein) to any value disclosed herein that is greater than a value that satisfies the equation y1≥(|y|*x1)/x (using any value of x, x1 and y disclosed herein). Regardless of the values of x1, y1, and m, the number of neutral ligands (l) in the chromium precursor having the formula the $[(Cr_{y1}X_{x1}L_l)^m]_q[A^a]_{m2}$ can be any value, or any value range, disclosed herein. General and specific chromium precursors having the formula $[(Cr_{y1}X_{x1}L_l)^m]_q[A^a]_{m2}$ can be described using aspects and embodiments of the present disclosure. These general and specific chromium precursors are readily apparent and contemplated.

When each X of the chromium precursor having the formula $[(Cr_{y1}X_{x1}L_l)^m]_q[A^a]_{m2}$ is a monoanionic ligand the chromium precursor can have the formula $[(CrX_{x1}L_l)^m]_q[A^a]_{m2}$. In the aspect where the chromium precursor can have the formula $[(CrX_{x1}L_l)^m]_q[A^a]^{m2}$ (where each X is a monoanionic ligand), the formula $[(CrX_{x1}L_l)^m]_q[A^a]_{m2}$ can encompass general chromium precursors having a cationic chromium complex (i.e. m having any value, or any value range, disclosed wherein where m>0, m2 having any value, or any value range, disclosed herein where m2>0). In the aspect where the chromium precursor can have the formula $[(CrX_{x1}L_l)^m]_q[A^a]_{m2}$ (where each X is a monoanionic ligand), the formula $[(CrX_{x1}L_l)^m]_q[A^a]_{m2}$ can encompass general chromium precursors having a cationic chromium complex which has a relationship between the cationic chromium complex and the anionic specie(s) wherein m can have any value (or value range) disclosed herein where m>0, q and a independently can have any value (or value range) disclosed herein, where q=a (the charge of the anionic species) divided by the greatest common divisor of m and |a|, and m2 can have any value (or value range) disclosed herein where m2=m divided by the greatest common divisor of m and |a|. As a consequence of the conditions that m>0 and m=x−x1, x1 can be any positive integer disclosed herein that satisfies the equation x1<x (using any value of x disclosed herein). In some embodiments, x1 can range from 0, or any x1 value disclosed herein less than that which satisfies the equation x1<x (using any value of x disclosed herein) to any value of x1 provided herein that satisfies the equation x1<x (using any value of x, y1 and y disclosed herein). Regardless of the values of x1 and m, the number of neutral ligands (l) in the chromium precursor having the formula the $[(CrX_{x1}L_l)^m]_q[A^a]_{m2}$ (where each X is a monoanionic ligand) can be any value, or any value range, disclosed herein. General and specific chromium precursors having the formula $[(CrX_{x1}L_l)^m]_q[A^a]_{m2}$ (where each X is a monoanionic ligand) can be described using aspects and embodiments of the present disclosure. These general and specific chromium precursors are readily apparent and contemplated. General and specific chromium precursors having the formula $[(Cr_{x1}X_{n1}L_l)^m]_{q2}[A^a]_{m2}$ and/or $[(CrX_{n1}L_l)^m]_q[A^a]_{m2}$ can be described using aspects and embodiments of the present disclosure. These general and specific chromium precursors are readily apparent and contemplated.

In an aspect, the chromium precursor can have the formula $[(CrL_l)^m]_q[A^a]_{m2}$. The chromium oxidation state (x), the neutral ligand (L), the number of neutral ligands (l), the charge (m) on the chromium complex $(CrL_l)^m$, the number (q) of chromium complexes $(CrL_l)^m$, the anionic species (A) having charge a, and the number of anionic species having charge a (m2) are independently described herein. These independent descriptions can be utilized in any compatible manner and/or combination to further describe the chromium precursor having the formula $[(CrL_l)^m]_q[A^a]_{m2}$. In the aspect where the chromium precursor can have the formula $[(CrL_l)^m]_q[A^a]_{m2}$, the formula $[(CrL_l)^m]_q[A^a]_{m2}$ can encompass general chromium precursors having a cationic chromium complex (i.e. m having any value, or any value range, disclosed wherein where m>0, and m2 having any value, or any value range, disclosed herein where m2>0). Generally, the chromium precursor having the formula $[(CrL_l)^m]_q[A^a]_{m2}$ can encompass general chromium precursors having a cationic chromium complex where m=x and the number of cationic chromium complex(es) (q) having charge m (or x) and the number of anionic specie(s) (A) having charge a can be related by the equation m*|a|=*m2| (or x*q=*m2|. In some embodiments when the chromium precursor has the formula $[(CrL_l)^m]_q[A^a]_{m2}$, the number of cationic chromium complex(es), q, can be related to the charge on the cationic chromium complex(es) (m or x), and the anionic specie(s) charge (c) by the relationship q=|a| divided by the greatest common divisor of m (or x) and |a|. In some embodiments when the chromium precursor has the formula $[(CrL_l)^m]_q[A^a]_{m2}$, the number of anionic specie(s), m2, can be related to the charge on the cationic chromium complex(es) (m or x), and the anionic specie(s) charge, c, by the relationship m2=m divided by the greatest common divisor of m and |a|. In an embodiment, the chromium precursor having the formula $[(CrL_l)^m]_q[A^a]_{m2}$ can encompass general chromium precursors having a cationic chromium complex wherein m can any value, or any value range, disclosed wherein where m>0 and m=x. Regardless of the values of m, the number of neutral ligands (l) in the chromium precursor having the formula the $[(CrL_l)^m]_q[A^a]_{m2}$ can be any value, or any value range, disclosed herein. General and specific chromium precursors having the formula $[(CrL_l)^m]_q[A^a]_{m2}$ can be described using aspects and embodiments of the present disclosure. These general and specific chromium precursors are readily apparent and contemplated.

In a non-limiting embodiment, the chromium precursor can be, comprise, or consist essentially of, $[(Cr(NH_3)_5)^{3+}]_q[A^a]_{m2}$ or $[(Cr(NH_3)_6)^{2+}]_q[A^a]_{m2}$; alternatively $[(Cr(NH_3)_6)^{3+}]_q[A^1]_{m2}$; or alliteratively, $[(Cr(NH_3)_6)^{2+}]_q[A^a]_{m2}$. In these non-limiting embodiments, A can be, comprise, or consist essentially of, any anionic species having charge a described herein, q=a (the charge of the anionic species) divided by the largest common divisor of |a| and the charge, m, on the chromium complex $(CrL_l)^m$, and m2 is the charge, m, on the chromium complex $(CrL_l)^m$ divided by the largest common divisor of |a| and the charge, m, on the chromium complex $(CrL_l)^m$. Other general and specific chromium precursors having the formula $[(CrL_l)^n]_{q2}[A^a]_{m2}$ can be described using aspects and embodiments of the present disclosure. These general and specific chromium precursors are readily apparent and contemplated.

In an aspect, the chromium precursor can have the formula $Cr_{y1}X_{x1}L_l$. The number of chromium atoms having an oxidation state of x (y1), the anionic ligand (X) having a charge of y, the number of anionic ligands having a charge of y (x1), the neutral ligand (L), and the number of neutral ligands (l) are independently described herein. These independent descriptions can be utilized in any compatible manner and/or combination to further described the chromium precursor having the formula $Cr_{y1}X_{x1}L_l$. In the aspect where the chromium precursor has the formula $Cr_{y1}X_{x1}L_l$, the formula $Cr_{y1}X_{x1}L_l$ can encompass general chromium precursors which is neutral chromium complexes (i.e. m=0, m1=0, and m2=0). When the chromium precursor has the formula $Cr_{y1}X_{x1}L_l$ the number of chromium atoms (y1) having the oxidation state x and the number of anionic ligands (A) having charge y can be related by the equation x*y1=|y*x1|. In some embodiments when the chromium complex of the chromium precursor has the formula $Cr_{y1}X_{x1}L_l$, the number of chromium(s), y1, can be related to the chromium oxidation state (x) and the anionic ligand (X) charge (y) by the relationship that y1=|y| divided by the largest common divisor of x and |y|. In some embodiments when the chromium complex of the chromium precursor has the formula $Cr_{y1}X_{x1}L_l$, the number of anionic ligands, x1, can be related to the chromium oxidation state (x) and the anionic ligand (X) charge (y) by the relationship that x1=x divided by the largest common divisor of x and |y|. Regardless of the values of x1 and y1, the number of neutral ligands (l) in the chromium precursor having the formula the $Cr_{y1}X_{x1}L_l$ can be any value, or any value range, disclosed herein. General and specific chromium precursors having formula $Cr_{y1}X_{x1}L_l$ can be described using aspects and embodiments of the present disclosure. These general and specific chromium precursors are readily apparent and contemplated.

When each X is a monoanionic ligand, the chromium precursor having the formula the $Cr_{y1}X_{x1}L_l$ is a monoanionic ligand, the chromium precursor can have the formula $CrX_xL_l$. Regardless of the value of x, the number of neutral ligands (l) in the chromium precursor having the formula the $CrX_xL_l$ can have any value, or any value range, disclosed herein. General and specific chromium precursors having formula $CrX_xL_l$ can be described using aspects and embodiments of the present disclosure. These general and specific chromium precursors are readily apparent and contemplated.

In a non-limiting embodiment, the chromium precursor (or chromium complex) which can be utilized in any aspect or any embodiment disclosed herein can be, comprise, or consist essentially of, $CrCl_3(NMe_3)_2$, $CrCl_3(pyridine)_3$, or $CrCl_3(THF)_3$; alternatively, $CrCl_3(NMe_3)_2$; alternatively, $CrCl_3(pyridine)_3$; or alternatively, $CrCl_3(THF)_3$. In another embodiment, the chromium precursor (or chromium complex) which can be utilized in any aspect or any embodiment disclosed herein can be, comprise, or consist essentially of, a neutral chromium(III) halide tetrahydrofuran complex, a neutral chromium(III) halide trihydrocarbylamine complex, or a neutral chromium(III) halide pyridine complex; alternatively, a neutral chromium(III) halide tetrahydrofuran complex; alternatively, a neutral chromium(III) halide trihydrocarbylamine complex; or alternatively, a neutral chromium(III) halide pyridine complex. Other general and specific chromium precursors having the formula $Cr_{y1}X_{x1}L_l$ and/or the formula $CrX_xL_l$ can be described using aspects and embodiments of the present disclosure. These general and specific chromium precursors are readily apparent and contemplated.

In an aspect, the chromium precursors can have the formula $[(Cr_{y1}X_{x1})^m]_q[C^c]_{m1}[A^a]_{m2}$. The number of chromium atoms having an oxidation state of x (y1), the anionic ligand (X) having a charge of y, the number of anionic ligands having a charge of y (x1), the charge (m) on the chromium complex $(Cr_{y1}X_{x1})^m$, the number (q) of chromium complexes $(Cr_{y1}X_{x1})^m$, the cationic species (C) having charge c, the number of cationic species having charge c (m1), the anionic species (A) having charge a, and the number of anionic species having charge a (m2) are independently described herein. These independent descriptions can be utilized in any compatible manner and/or combination to further describe the chromium precursor having the formula $[(Cr_{y1}X_{x1})^m]_q[C^c]_{m1}[A^a]_{m2}$. In the aspect where the chromium precursor can have the formula $[(Cr_{y1}X_{x1})^m]_q[C^c]_{m1}[A^a]_{m2}$, the formula $[(Cr_{y1}X_{x1})^m]_q[C^c]_{m1}[A^a]_{m2}$ can encompass general chromium precursors having an anionic chromium complex (i.e. m having any value, or any value range, disclosed wherein where m<0, m1 having any value, or any value range, disclosed herein where m1>0, and m2=0), having a cationic chromium complex (i.e. m having any value, or any value range, disclosed wherein where m>0, m1=0, and m2 having any value, or any value range, disclosed herein where m2>0), and/or having a neutral chromium precursor (i.e. m=0, m1=0, and m2=0). General and specific chromium precursors having the formula $[(Cr_{y1}X_{x1})^m]_q[C^c]_{m1}[A^a]_{m2}$ can be described using aspects and embodiments of the present disclosure. These general and specific chromium precursors are readily apparent and contemplated.

When each X of the chromium precursor having the formula $[(Cr_{y1}X_{x1})^m]_q[C^c]_{m1}[A^a]_{m2}$ is a monoanionic ligand the chromium precursor can have the formula $[(CrX_{x1})^m]_q[C^c]_{m1}[A^a]_{m2}$. In the aspect where the chromium precursor can have the formula $[(CrX_{x1})^m]_q[C^c]_{m1}[A^a]_{m2}$, the formula $[(CrX_{x1})^m]_q[C^c]_{m1}[A^a]_{m2}$ can encompass general chromium precursors having an anionic chromium complex (i.e. m having any value, or any value range, disclosed wherein where m<0, m1 having any value, or any value range, disclosed herein where m1>0, and m2=0), having a cationic chromium complex (i.e. m having any value, or any value range, disclosed wherein where m>0, m1=0, and m2 having any value, or any value range, disclosed herein where m2>0), and/or having a neutral chromium precursor (i.e. m=0, m1=0, and m2=0). General and specific chromium precursors having the formula $[(CrX_{x1})^m]_q[C^c]_{m1}[A^a]_{m2}$ can be described using aspects and embodiments of the present disclosure. These general and specific chromium precursors are readily apparent and contemplated. In a non-limiting embodiment, the chromium precursor having the formula $[(Cr_{y1}X_{x1})^m]_q[C^c]_{m1}[A^a]_{m2}$ or the formula $[(CrX_{x1})^m]_q[C^c]_{m1}[A^a]_{m2}$ can be, comprise, or consist essentially of, an anionic chromium complex which has a relationship between the anionic chromium complex, the cationic specie(s), and the anionic specie wherein m can have any value (or value range) disclosed herein where m<0, q and c independently can have any value (or value range) disclosed herein where q=c divided by the greatest common divisor of c and |m|, m1 can have any value (or value range) disclosed herein where m1=|m| divided by the greatest common divisor of c and |m|, and m2=0. In another non-limiting embodiment, the chromium precursor having the formula $[(Cr_{y1}X_{x1})^m]_q[C^c]_{m1}[A^a]_{m2}$ or the formula $[(CrX_{x1})^m]_q[C^c]_{m1}[A^a]_{m2}$ can be, comprise, or consist essentially of, a neutral chromium complex which has a relationship between the anionic chromium complex, the cationic specie, and the anionic specie wherein m=0, m1=0 and m2=0. In yet another non-limiting embodiment, the chromium precursor having the formula $[(Cr_{y1}X_{x1})^m]_q[C^c]_{m1}[A^a]_{m2}$ or the formula $[(CrX_{x1})^m]_q[C^c]_{m1}[A^a]_{m2}$ can be, comprise, or consist essentially of, a cationic chromium complex which has a relationship between the cationic chromium complex, the cationic specie, and the anionic specie(s) wherein m can have any value (or value range) disclosed herein where m>0, q and a independently can have any value (or value range) disclosed herein where q=|a| divided by the greatest common divisor of m and |a|, m1=0, and m2 can have any value (or value range) disclosed herein where m2=m divided by the greatest common divisor of m and |a|.

In an aspect, the chromium precursor can have the formula $[(Cr_{y1}X_{x1})^m]_q[C^c]_{m1}$. The number of chromium atoms having an oxidation state of x (y1), the anionic ligand (X) having a charge of y, the number of anionic ligands having a charge of y (x1), the charge (m) on the chromium complex $(Cr_{y1}X_{x1})^m$, the number (q) of chromium complexes $(Cr_{y1}X_{x1})^m$, the cationic species (C) having charge c, and the number of cationic species having charge c (m1) are independently described herein. These independent descriptions can be utilized in any compatible manner and/or combination to further describe the chromium precursor having the formula $[(Cr_{y1}X_{x1})^m]_q[C^c]_{m1}$. In this aspect, the formula $[(Cr_{y1}X_{x1})^m]_q[C^c]_{m1}$ can encompass general chromium precursors having an anionic chromium complex (i.e. m having any value, or any value range, disclosed wherein where m<0, m1 having any value, or any value range, disclosed herein where m1>0). In an embodiment, the chromium precursor having the formula $[(Cr_{y1}X_{x1})^m]_q[C^c]_{m1}$ can encompass general chromium precursors having an anionic chromium complex which has a relationship between the anionic chromium complex and the cationic specie(s) wherein m can have any value (or value range) disclosed herein where m<0, q and c independently can have any value (or value range) disclosed herein, where q=c divided by the greatest common divisor of c and |m|, and m1 can have any value (or value range) disclosed herein where m1=|m| divided by the greatest common divisor of c and |m|. In an embodiment, the chromium precursor having the formula $[(Cr_{y1}X_{x1})^m]_q[C^c]_{m1}$ can encompass general chromium precursors having an anionic chromium complex wherein m can any value, or any value range, disclosed wherein where m<0 and m=(x*y1)+(y*x1). As a consequence of the conditions that m<0 and m=(x*y1)+(y*x1), x1 can be any positive integer disclosed herein that satisfies the equation x1>(x*y1)/|y| (using any value of x, y1 and y disclosed herein) and/or y1 can be a positive integer and satisfies the equation y1≤(|y|*x1)/x (using any value of x, x1 and y disclosed herein). In some embodiments, x1 can range from the minimum positive integer that satisfies the equation x1>(x*y1)/|y| (using any value of x, y1 and y disclosed herein) to any value of x1 provided herein that is greater than the minimum positive integer that satisfies the equation x1>(x*y1)/|y| (using any value of x, y1 and y disclosed herein). In some embodiments, y1 can range from any value of y1 disclosed herein to any positive integer that satisfies the equation y1≤(|y|*x1)/x (using any value of x, x1 and y disclosed herein). General and specific chromium precursors having the formula $[(Cr_{y1}X_{x1})^m]_q[C^c]_{m1}$ can be described using aspects and embodiments of the present disclosure. These general and specific chromium precursors are readily apparent and contemplated.

When each X of the chromium precursor having the formula $[(Cr_{y1}X_{x1})^m]_q[C^c]_{m1}$ is a monoanionic ligand the chromium precursor can have the formula $[(CrX_{x1})^m]_q[C^c]_{m1}$. In the aspect where the chromium precursor can have the formula $[(CrX_{x1})^m]_q[C^c]_{m1}$ (where each X is a monoanionic ligand), the formula $[(CrX_{x1})^m]_q[C^c]_{m1}$ can encompass general chromium precursors having an anionic chromium complex (i.e. m having any value, or any value range, disclosed wherein where m<0, m1 having any value, or any value range, disclosed herein where m1>0). In the aspect where the chromium precursor can have the formula $[(CrX_{x1})^m]_q[C^c]_{m1}$ (where each X is a monoanionic ligand), the formula $[(CrX_{x1})^m]_q[C^c]_{m1}$ can encompass general chromium precursors having an anionic chromium complex which has a relationship between the anionic chromium complex and the cationic specie(s) wherein m can have any value (or value range) disclosed herein where m<0, q and c independently can have any value (or value range) disclosed herein, where q=c divided by the greatest common divisor of c and |m|, and m1 can have any value (or value range) disclosed herein where m1=|m| divided by the greatest common divisor of c and |m|. In an embodiment, the chromium precursor having the formula $[(CrX_{x1})^m]_q[C^c]_{m1}$ (where each X is a monoanionic ligand) can encompass a general chromium precursors having an anionic chromium complex wherein m can be any value, or any value range, disclosed wherein where m<0 and m=x−x1. As a consequence of the conditions that m<0 and m=x−x1, x1 can be any positive integer disclosed herein that satisfies the equation x1>x (using any value of x disclosed herein). In some embodiments, x1 can range from the minimum positive integer that satisfies the equation x1>x (using any value of x disclosed herein) to any value of x1 provided herein that is greater than the minimum positive integer that satisfies the equation x1>x (using any value of x disclosed herein). General and specific chromium precursors having the formula $[(Cr_{y1}X_{x1})^m]_q[C^c]_{m1}$ (where each X is a monoanionic ligand) can be described using aspects and embodiments of the present disclosure. These general and specific chromium precursors are readily apparent and contemplated.

In a non-limiting embodiment, the chromium precursor which can be utilized in any aspect or any embodiment disclosed herein can be, comprise, or consist essentially of, $[C^c]_{m1}[(CrCl_4)^{1-}]_{q1}$ or $[C^c]_{m1}[(Cr(CN)_6)^{3-}]_{q1}$; alternatively, $[C^c]_{m1}[(CrCl_4)^{1-}]_{q1}$; or alternatively, $[C^c]_{m1}[(Cr(CN)_6)^{3-}]_{q1}$. In these non-limiting embodiments, C can be any cationic species having charge c described herein, q=c divided by the largest common divisor of c and |m| (the absolute value of the charge on the anionic chromium complex), and m1=|m| divided by the largest common divisor of c and |m|. Other useful chromium precursors having formula $[(Cr_{x1}X_{n1})^m]_{q1}[C^c]_{m1}$ or $[(CrX_{n1})^m]_{q1}[C^c]_{m1}$ can be described using aspects and embodiments of the present disclosure. These general and specific chromium precursors are readily apparent and contemplated.

In an aspect, the chromium precursor can have the formula $[(Cr_{y1}X_{x1})^m]_q[A^a]_{m2}$. The number of chromium atoms having an oxidation state of x (y1), the anionic ligand (X) having a charge of y, the number of anionic ligands having a charge of y (x1), the charge (m) on the chromium complex $(Cr_{y1}X_{x1})^m$, the number (q) of chromium complexes $(Cr_{y1}X_{x1})^m$, the anionic species (A) having charge a, and the number of anionic species having charge a (m2) are independently described herein. These independent descriptions can be utilized in any compatible manner and/or combination to further describe the chromium precursor having the formula $[(Cr_{y1}X_{x1})^m]_q[A^a]_{m2}$. In the aspect where the chromium precursor can have the formula $[(Cr_{y1}X_{x1})^m]_q[A^a]_{m2}$, the formula $[(Cr_{y1}X_{x1})^m]_q[A^a]_{m2}$ can encompass general chromium precursors having a cationic chromium complex (i.e. m having any value, or any value range, disclosed wherein where m>0, and m2 having any value, or any value range, disclosed herein where m2>0). In an embodiment, the chromium precursor having the formula $[(Cr_{y1}X_{x1})^m]_q[A^a]_{m2}$ can encompass general chromium precursors having a cationic chromium complex which has a relationship between the cationic chromium complex and the anionic specie(s) wherein m can have any value (or value range) disclosed herein where m>0, q and a independently can have any value (or value range) disclosed herein where q=|a| divided by the greatest common divisor of m and |a|, and m2 can have any value (or value range) disclosed herein where m2=m divided by the greatest common divisor of m and |a|. In an embodiment, the chromium precursor having the formula $[(Cr_{y1}X_{x1})^m]_q[A^a]_{m2}$ can encompass general chromium precursors having a cationic chromium complex wherein m can any value, or any value range, disclosed wherein where m>0 and m=(x*y1)+(y*x1). As a consequence of the conditions that m>0 and m=(x*y1)+(y*x1), x1 can be any positive integer disclosed herein that satisfies the equation x1<(x*y1)/|y| (using any value of x, y1 and y disclosed herein) and/or y1 can be a positive integer and satisfies the equation y1≥(|y|*x1)/x (using any value of x, x1 and y disclosed herein). In some embodiments, x1 can range from 0, or any x1 value disclosed herein less than that which satisfies the equation x1<(x*y1)/|y| (using any value of x, y1 and y disclosed herein) to any value of x1 provided herein that satisfies the equation x1<(x*y1)/|y| (using any value of x, y1 and y disclosed herein). In some embodiments, y1 can range from any value of y1 disclosed herein that satisfies the equation y1≥(|y|*x1)/x (using any value of x, x1 and y disclosed herein) to any value disclosed herein that is greater than a value that satisfies the equation y1≥(|y|*x1)/x (using any value of x, x1 and y disclosed herein). General and specific chromium precursors having the formula $[(Cr_{y1}X_{x1})^m]_q[A^a]_{m2}$ can be described using aspects and embodiments of the present disclosure. These general and specific chromium precursors are readily apparent and contemplated.

When each X of the chromium precursors having the formula $[(Cr_{y1}X_{x1})^m]_q[A^a]_{m2}$ is a monoanionic ligand, the chromium precursor can have the formula $[(CrX_{x1})^m]_q[A^a]_{m2}$. In the aspect where the chromium precursor can have the formula $[(CrX_{x1})^m]_q[A^a]_{m2}$ (where each X is a monoanionic ligand), the formula $[(CrX_{x1})^m]_q[A^a]_{m2}$ can encompass general chromium precursors having a cationic chromium complex (i.e. m having any value, or any value range, disclosed wherein where m>0, m2 having any value, or any value range, disclosed herein where m2>0). In the aspect where the chromium precursor can have the formula $[(CrX_{x1})^m]_q[A^a]_{m2}$ (where each X is a monoanionic ligand), the formula $[(CrX_{x1})^m]_q[A^a]_{m2}$ can encompass general transition metal precursors having a cationic transition metal complex which has a relationship between the cationic transition metal complex and the anionic specie(s) wherein m can have any value (or value range) disclosed herein where m>0, q and a independently can have any value (or value range) disclosed herein, where q=|a| divided by the greatest common divisor of m and |a|, and m2 can have any value (or value range) disclosed herein where m2=m divided by the greatest common divisor of m and |a|. In an embodiment, the chromium precursor having the formula $[(CrX_{x1})^m]_q[A^a]_{m2}$ (where each X is a monoanionic ligand) can encompass a general chromium precursors having a cationic chromium complex wherein m can be any value, or any value range, disclosed wherein where m>0 and m=x−x1. As a consequence of the conditions that m>0 and m=x−x1, x1 can be any positive integer disclosed herein that satisfies the equation x1<x (using any value of x disclosed herein). In some embodiments, x1 can range from 0, or any x1 value disclosed herein less than that which satisfies the equation x1<x (using any value of x disclosed herein) to any value of x1 provided herein that satisfies the equation x1<x (using any value of x, y1 and y disclosed herein). General and specific chromium precursors having the formula $[(CrX_{x1})^m]_q[A^a]_{m2}$ (where each X is a monoanionic ligand) can be described using aspects and embodiments of the present disclosure. These general and specific chromium precursors are readily apparent and contemplated.

In an aspect, the chromium precursor can have the formula $Cr_{y1}X_{x1}$. The number of chromium atoms having an oxidation state of x (y1), the anionic ligand (X) having a charge of y, and the number of anionic ligands having a charge of y (x1) are generally and independently described herein. These independent descriptions can be utilized in any compatible manner and/or combination to further described the chromium precursor having the formula $Cr_{y1}X_{x1}$. In the aspect where the chromium precursor has the formula $Cr_{y1}X_{x1}$, the formula $Cr_{y1}X_{x1}$ can encompass a general chromium precursor which is a neutral chromium complex (i.e. m=0, m1=0, and m2=0). When the chromium precursor has the formula $Cr_{y1}X_{x1}$ the number of chromium atoms (y1) having the oxidation state x and the number of anionic ligands (A) having charge y can be related by the equation x*y1=|y*x1|. In some embodiments when the chromium complex of the chromium precursor has the formula $Cr_{y1}X_{x1}$, the number of chromium(s), y1, can be related to the chromium oxidation state (x) and the anionic ligand (X) charge (y) by the relationship that y1=|y| divided by the largest common divisor of x and |y|. In some embodiments when the chromium complex of the chromium precursor has the formula $Cr_{y1}X_{x1}$, the number of anionic ligands, x1, can be related to the chromium oxidation state (x) and the anionic ligand (X) charge (y) by the relationship that x1=x divided by the largest common divisor of x and |y|. General and specific chromium precursors having the formula $Cr_{y1}X_{x1}$ can be described using aspects and embodiments of the present disclosure. These general and specific chromium precursors are readily apparent and contemplated.

When each X of the chromium precursor having the formula $Cr_{y1}X_{x1}$ is a monoanionic ligand, the chromium precursor can have the formula $CrX_x$. General and specific chromium precursors having the formula $CrX_x$ can be described using aspects and embodiments of the present disclosure. These general and specific chromium precursors are readily apparent and contemplated.

In a non-limiting embodiment, the chromium precursor (or chromium complex) which can be utilized in any aspect or any embodiment disclosed herein can be, comprise, or consist essentially of, $CrF_3$, $CrCl_3$, $CrBr_3$, or $CrI_3$; alternatively, $CrF_3$; alternatively, $CrCl_3$; alternatively, $CrBr_3$; or alternatively, $CrI_3$. According to a further aspect, the chromium halide precursors can be, comprise, or consist essentially of, a chromium(III) halide. In one non-limiting aspect, the chromium precursor can be, comprise, or consist essentially of, $CrCl_3$. Other general and specific chromium precursors having the formula $Cr_{y1}X_x$ and/or the formula $CrX_x$ can be described using aspects and embodiments of the present disclosure. These general and specific chromium precursors are readily apparent and contemplated.

In an aspect, the chromium precursor utilized in any aspect or any embodiment disclosed herein can be substantially anhydrous; or alternatively, anhydrous. In some embodiments the chromium precursor can have a water content of less than or equal to 100 ppm; alternatively, less than or equal to 90 ppm; alternatively, less than or equal to 80 ppm; alternatively, less than or equal to 70 ppm; alternatively, less than or equal to 60 ppm; alternatively, less than or equal to 50 ppm; alternatively, less than or equal to 40 ppm; alternatively, less than or equal to 30 ppm; alternatively, less than or equal to 20 ppm; alternatively, less than or equal to 10 ppm; alternatively, less than or equal to 9 ppm; alternatively, less than or equal to 8 ppm; alternatively, less than or equal to 7 ppm; alternatively, less than or equal to 6 ppm; alternatively, less than or equal to 5 ppm; alternatively, less than or equal to 4 ppm; alternatively, less than or equal to 3 ppm; alternatively, less than or equal to 2 ppm; or alternatively, less than or equal to 1 ppm. Generally, the water content of the chromium precursor can be based on the ppm (by weight) of water in the chromium precursor. It should be noted that the water present in the chromium precursor can be in the form of chromium precursor impurities and/or interstitial water in the chromium precursor.

In an aspect, the chromium precursor utilized in any aspect or any embodiment disclosed herein can be substantially acid-free. In some embodiments, the chromium precursor can have an acid content of less than or equal to 1000 ppm; alternatively, less than or equal to 750 ppm; alternatively, less than or equal to 500 ppm; or alternatively, less than or equal to 250 ppm. In other embodiments, the chromium precursor can have an acid content of less than or equal to 100 ppm; alternatively, less than or equal to 90 ppm; alternatively, less than or equal to 80 ppm; alternatively, less than or equal to 70 ppm; alternatively, less than or equal to 60 ppm; alternatively, less than or equal to 50 ppm; alternatively, less than or equal to 40 ppm; alternatively, less than or equal to 30 ppm; alternatively, less than or equal to 20 ppm; alternatively, less than or equal to 10 ppm; alternatively, less than or equal to 9 ppm; alternatively, less than or equal to 8 ppm; alternatively, less than or equal to 7 ppm; alternatively, less than or equal to 6 ppm; alternatively, less than or equal to 5 ppm; alternatively, less than or equal to 4 ppm; alternatively, less than or equal to 3 ppm; alternatively, less than or equal to 2 ppm; or alternatively, less than or equal to 1 ppm. Generally, the acid content of the chromium precursor can be based on the ppm (by weight) of acid in the chromium precursor. It should be noted that the acid present in the chromium precursor can be in the form of chromium precursor impurities and/or interstitial acid in the chromium precursor.

In accordance with an aspect of this disclosure, the method for preparing a chromium carboxylate composition can utilize a Group 1 or Group 2 metal carboxylate; alternatively, a Group 1 metal carboxylate; or alternatively a Group 2 metal carboxylate. Generally, the carboxylate moiety of the Group 1 or Group 2 metal carboxylate can be, comprise, or consist essentially of, a polycarboxylate or a monocarboxylate; alternatively, a polycarboxylate; or alternatively, a monocarboxylate. Carboxylates are independently disclosed herein (e.g., as the carboxylate of the transition or chromium carboxylate). These independent descriptions can be utilized without limitation to further describe the Group 1 or Group 2 metal carboxylate.

In an aspect, the Group 1 or Group 2 metal carboxylate can have the formula $(M^4)_p[(O_2C)_rR^{1c}]_s$ where $M^4$ represents the Group 1 or Group 2 metal, p represents the number of metal atoms in the Group 1 or Group 2 metal carboxylate, $(O_2C)_rR^{1c}$ (which can also be shown with having a $-1$ charge on the carboxylate moiety—i.e. $(^-O_2C)_rR^{1c}$) represents the carboxylate group, r represents the number of carboxylate moieties in the carboxylate group, s represents the number of carboxylate groups in the Group 1 or Group 2 metal carboxylate, and $R^1$ represents the group which links the carboxylate moieties. Generally, the Group 1 or Group 2 metal ($M^4$), the number of Group 1 or Group 2 metal atoms (p), the carboxylate group $((^-O_2C)_rR^{1c})$, the number of carboxylate groups (s), the number of carboxylate moieties in the carboxylate group (r), and the group linking the carboxylate moieties ($R^{1c}$) are independent elements of the Group 1 or Group 2 metal carboxylate having formula $(M^4)_p[(O_2C)_rR^{1c}]_s$, are independently described herein. These independent descriptions of the features of the Group 1 or Group 2 metal carboxylate having the formula $(M^4)_p[(O_2C)_rR^{1c}]_s$ can be utilized in any combination to describe the Group 1 or Group 2 metal carboxylate having formula $(M^4)_p[(O_2C)_rR^{1c}]_s$. In another aspect, the Group 1 Group 2 metal carboxylate can have the formula $M^4(O_2CR^{2c})_s$ where $M^4$ represents the Group 1 or Group 2 metal, $O_2CR^{1c}$ (which can also be shown with having a $-1$ charge on the carboxylate moiety—i.e. $^-O_2CR^{1c}$) represents monocarboxylate group, and s represents the oxidation number of the Group 1 or Group 2 metal. Generally, the Group 1 or Group 2 metal ($M^4$), the monocarboxylate group ($^-O_2CR^{2c}$), the number of monocarboxylate group(s), and $R^{2c}$ are independent elements of the Group 1 or Group 2 metal carboxylate having formula $M^4(O_2CR^{2c})_s$. These independent descriptions of the Group 1 Group 2 metal carboxylate having the formula $M^4(O_2CR^{2c})_s$ can be utilized in any combination to describe the Group 1 or Group 2 metal carboxylate having formula $M^4(O_2CR^{2c})_s$. Carboxylate groups having the formula $(^-O_2C)_rR^{1c}$ and/or $^-O_2CR^{2c}$ are independently disclosed herein (e.g., as the carboxylate of the transition or chromium carboxylate). These independent descriptions can be utilized without limitation to further describe the Group 1 or Group 2 metal carboxylate.

In an aspect, the Group 1 or Group 2 metal of any Group 1 or Group 2 metal carboxylate described herein can be, comprise, or consist essentially of, a Group 1 metal; or alternatively, a Group 2 metal. In an embodiment, the Group 1 metal of any Group 1 metal carboxylate described herein can be, comprise, or consist essentially of, Li, Na, or K; alternatively, Na or K; alternatively, Li; alternatively, Na; or alternatively, K. In an embodiment, the Group 2 metal of any Group 2 metal carboxylate described herein can be, comprise, or consist essentially of, Be, Mg, Ca, Sr, or Ba; alternatively, Ca or Mg; alternatively, Be; alternatively, Mg; alternatively, Ca; alternatively, Sr; or alternatively Ba. Generally, the oxidation state of the Group 1 metal is 1 while the oxidation state of the Group 2 metal is 2.

In a non-limiting embodiment, the Group 1 or Group 2 metal carboxylate can be, comprise, or consist essentially of, a sodium or potassium carboxylate; alternatively, a sodium carboxylate; or alternatively a potassium carboxylate. In some non-limiting embodiments, the Group 1 or Group 2 metal carboxylate can be, comprise, or consist essentially of, sodium or potassium oxalate, sodium or potassium maleate, sodium or potassium succinate, sodium or potassium glutarate, sodium or potassium adipate, sodium or potassium phthalate, sodium or potassium isophthalate, sodium or potassium terephthalate, sodium or potassium citrate, or any combination thereof; alternatively, sodium or potassium maleate, sodium or potassium succinate, sodium or potassium glutarate, sodium or potassium adipate, sodium or potassium phthalate, sodium or potassium isophthalate, sodium or potassium terephthalate, or any combination thereof; alternatively, sodium oxalate, sodium maleate, sodium succinate, sodium glutarate, sodium adipate, sodium phthalate, sodium isophthalate, sodium terephthalate, sodium citrate, or any combination thereof; alternatively, sodium maleate, sodium succinate, sodium glutarate, sodium adipate, sodium phthalate, sodium isophthalate, sodium terephthalate, or any combination thereof; alternatively, potassium oxalate, potassium maleate, potassium succinate, potassium glutarate, potassium adipate, potassium phthalate, potassium isophthalate, potassium terephthalate, potassium citrate, or any combination thereof; or alternatively, potassium maleate, potassium succinate, potassium glutarate, potassium adipate, potassium phthalate, potassium isophthalate, potassium terephthalate, or any combination thereof. In other non-limiting embodiments, the Group 1 or Group 2 metal carboxylate can be, comprise, or consist essentially of, sodium or potassium oxalate; alternatively, sodium or potassium maleate; alternatively, sodium or potassium succinate; alternatively, sodium or potassium glutarate; alternatively, sodium or potassium adipate; alternatively, sodium or potassium phthalate; alternatively, sodium or potassium isophthalate; alternatively, sodium or potassium terephthalate, sodium or potassium citrate; alternatively, sodium oxalate; alternatively, sodium maleate; alternatively, sodium succinate; alternatively, sodium glutarate; alternatively, sodium adipate; alternatively, sodium phthalate; alternatively, sodium isophthalate; alternatively, sodium terephthalate; alternatively, sodium citrate; alternatively, potassium oxalate; alternatively, potassium maleate; alternatively, potassium succinate; alternatively, potassium glutarate; alternatively, potassium adipate;

alternatively, potassium phthalate; alternatively, potassium isophthalate; alternatively, potassium terephthalate; or alternatively, potassium citrate.

In a non-limiting embodiment, the Group 1 or Group 2 metal carboxylate can be, comprise, or consist essentially of, sodium or potassium acetate, sodium or potassium propionate, a sodium or potassium butyrate, a sodium or potassium pentanoate, a sodium or potassium hexanoate, a sodium or potassium heptanoate, a sodium or potassium octanoate, a sodium or potassium nonanoate, a sodium or potassium decanoate, a sodium or potassium undecanoate, a sodium or potassium dodecanoate, a sodium or potassium tridecanoate, a sodium or potassium tetradecanoate, a sodium or potassium pentadecanoate, a sodium or potassium hexadecanoate, a sodium or potassium heptadecanoate, a sodium or potassium octadecanoate, a sodium or potassium icosanoate, a sodium or potassium docosanoate, a sodium or potassium tetracosanoate, sodium or potassium benzoate, a substituted sodium or potassium benzoate, or any combination thereof; alternatively, sodium or potassium propionate, a sodium or potassium butyrate, a sodium or potassium pentanoate, a sodium or potassium hexanoate, a sodium or potassium heptanoate, a sodium or potassium octanoate, a sodium or potassium nonanoate, a sodium or potassium decanoate, a sodium or potassium undecanoate, a sodium or potassium dodecanoate, a sodium or potassium tridecanoate, a sodium or potassium tetradecanoate, a sodium or potassium pentadecanoate, a sodium or potassium hexadecanoate, a sodium or potassium heptadecanoate, a sodium or potassium octadecanoate, a sodium or potassium icosanoate, a sodium or potassium docosanoate, a sodium or potassium tetracosanoate, a sodium or potassium benzoate, a substituted sodium or potassium benzoate, or any combination thereof; alternatively, a sodium or potassium pentanoate, a sodium or potassium hexanoate, a sodium or potassium heptanoate, a sodium or potassium octanoate, a sodium or potassium nonanoate, a sodium or potassium decanoate, a sodium or potassium undecanoate, sodium or potassium dodecanoate, or any combination thereof. In a non-limiting embodiment, the Group 1 or Group 2 metal carboxylate can be, comprise, or consist essentially of, sodium acetate, sodium propionate, a sodium butyrate, a sodium pentanoate, a sodium hexanoate, a sodium heptanoate, a sodium octanoate, a sodium nonanoate, a sodium decanoate, a sodium undecanoate, a sodium dodecanoate, a sodium tridecanoate, a sodium tetradecanoate, a sodium pentadecanoate, a sodium hexadecanoate, a sodium heptadecanoate, a sodium octadecanoate, a sodium icosanoate, a sodium docosanoate, a sodium tetracosane, sodium benzoate, a substituted sodium benzoate, or any combination thereof; alternatively, sodium propionate, a sodium butyrate, a sodium pentanoate, a sodium hexanoate, a sodium heptanoate, a sodium octanoate, a sodium nonanoate, a sodium decanoate, a sodium undecanoate, a sodium dodecanoate, a sodium tridecanoate, a sodium tetradecanoate, a sodium pentadecanoate, a sodium hexadecanoate, a sodium heptadecanoate, a sodium octadecanoate, a sodium icosanoate, a sodium docosanoate, a sodium tetracosanoate, a sodium benzoate, a substituted sodium benzoate, or any combination thereof; alternatively, a sodium pentanoate, a sodium hexanoate, a sodium heptanoate, a sodium octanoate, a sodium nonanoate, a sodium decanoate, a sodium undecanoate, sodium dodecanoate, or any combination thereof. In other non-limiting embodiments, the Group 1 or Group 2 metal carboxylate can be, comprise, or consist essentially of, potassium acetate, potassium propionate, a potassium butyrate, a potassium pentanoate, a potassium hexanoate, a potassium heptanoate, a potassium octanoate, a potassium nonanoate, a potassium decanoate, a potassium undecanoate, a potassium dodecanoate, a potassium tridecanoate, a potassium tetradecanoate, a potassium pentadecanoate, a potassium hexadecanoate, a potassium heptadecanoate, a potassium octadecanoate, a potassium icosanoate, a potassium docosanoate, a potassium tetracosanoate, potassium benzoate, a substituted potassium benzoate, or any combination thereof; alternatively, potassium propionate, a potassium butyrate, a potassium pentanoate, a potassium hexanoate, a potassium heptanoate, a potassium octanoate, a potassium nonanoate, a potassium decanoate, a potassium undecanoate, a potassium dodecanoate, a potassium tridecanoate, a potassium tetradecanoate, a potassium pentadecanoate, a potassium hexadecanoate, a potassium heptadecanoate, a potassium octadecanoate, a potassium icosanoate, a potassium docosanoate, a potassium tetracosanoate, a potassium benzoate, a substituted potassium benzoate, or any combination thereof; alternatively, a potassium pentanoate, a potassium hexanoate, a potassium heptanoate, a potassium octanoate, a potassium nonanoate, a potassium decanoate, a potassium undecanoate, a potassium dodecanoate, or any combination thereof.

In a non-limiting embodiment, the Group 1 or Group 2 metal carboxylate can be, comprise, or consist essentially of, sodium or potassium acetate, sodium or potassium propionate, sodium or potassium n-butyrate, sodium or potassium isobutyrate, sodium or potassium valerate (n-pentanoate), sodium or potassium neo-pentanoate, sodium or potassium capronate (n-hexanoate), sodium or potassium n-heptanoate, sodium or potassium caprylate (n-octanoate), sodium or potassium 2-ethylhexanoate, sodium or potassium n-nonanoate, sodium or potassium caprate (n-decanoate), sodium or potassium n-undecanoate, sodium or potassium laurate (n-dodecanoate), sodium or potassium stearate (n-octadecanoate), sodium or potassium benzoate, or any combination thereof; alternatively, sodium or potassium propionate, sodium or potassium n-butyrate, sodium or potassium isobutyrate, sodium or potassium valerate (n-pentanoate), sodium or potassium neo-pentanoate, sodium or potassium capronate (n-hexanoate), sodium or potassium n-heptanoate, sodium or potassium caprylate (n-octanoate), sodium or potassium 2-ethylhexanoate, sodium or potassium n-nonanoate, sodium or potassium caprate (n-decanoate), sodium or potassium n-undecanoate, sodium or potassium laurate (n-dodecanoate), sodium or potassium stearate (n-octadecanoate), sodium or potassium benzoate, or any combination thereof; alternatively, sodium or potassium valerate (n-pentanoate), sodium or potassium neo-pentanoate, sodium or potassium capronate (n-hexanoate), sodium or potassium n-heptanoate, sodium or potassium caprylate (n-octanoate), sodium or potassium 2-ethylhexanoate, sodium or potassium n-nonanoate, sodium or potassium caprate (n-decanoate), sodium or potassium n-undecanoate, sodium or potassium laurate (n-dodecanoate), or any combination thereof. In some non-limiting embodiments, the Group 1 or Group 2 metal carboxylate can be, comprise, or consist essentially of, sodium acetate, sodium propionate, sodium n-butyrate, sodium isobutyrate, sodium valerate (n-pentanoate), sodium neo-pentanoate, sodium capronate (n-hexanoate), sodium n-heptanoate, sodium caprylate (n-octanoate), sodium 2-ethylhexanoate, sodium n-nonanoate, sodium caprate (n-decanoate), sodium n-undecanoate, sodium laurate (n-dodecanoate), sodium stearate (n-octadecanoate), sodium benzoate, or any combination thereof; alternatively, sodium propionate, sodium n-butyrate, sodium isobutyrate, sodium valerate (n-pentanoate), sodium neo-pentanoate, sodium capronate (n-hexanoate), sodium n-heptanoate, sodium caprylate (n-octanoate), sodium 2-ethylhexanoate, sodium n-nonanoate, sodium caprate (n-decanoate), sodium n-undecanoate, sodium laurate (n-dodecanoate), sodium stearate (n-octadecanoate), sodium benzoate, or any combination thereof; alternatively, sodium valerate (n-pentanoate), sodium neo-pentanoate, sodium capronate (n-hexanoate), sodium n-heptanoate, sodium caprylate (n-octanoate), sodium 2-ethylhexanoate, sodium n-nonanoate, sodium caprate (n-decanoate), sodium n-undecanoate, sodium laurate (n-dodecanoate), or any combination thereof. In other non-limiting embodiments, the Group 1 or Group 2 metal carboxylate can be, comprise, or consist essentially of, potassium acetate, potassium propionate, potassium n-butyrate, potassium isobutyrate, potassium valerate (n-pentanoate), potassium neo-pentanoate, potassium capronate (n-hexanoate), potassium n-heptanoate, potassium caprylate (n-octanoate), potassium 2-ethylhexanoate, potassium n-nonanoate, potassium caprate (n-decanoate), potassium n-undecanoate, potassium laurate (n-dodecanoate), potassium stearate (n-octadecanoate), potassium benzoate, or any combination thereof; alternatively, potassium propionate, potassium n-butyrate, potassium isobutyrate, potassium valerate (n-pentanoate), potassium neo-pentanoate, potassium capronate (n-hexanoate), potassium n-heptanoate, potassium caprylate (n-octanoate), potassium 2-ethylhexanoate, potassium n-nonanoate, potassium caprate (n-decanoate), potassium n-undecanoate, potassium laurate (n-dodecanoate), potassium stearate (n-octadecanoate), potassium benzoate, or any combination thereof; or alternatively, potassium valerate (n-pentanoate), potassium neo-pentanoate, potassium capronate (n-hexanoate), potassium n-heptanoate, potassium caprylate (n-octanoate), potassium 2-ethylhexanoate, potassium n-nonanoate, potassium caprate (n-decanoate), potassium n-undecanoate, potassium laurate (n-dodecanoate), or any combination thereof. In yet other non-limiting embodiments, the Group 1 or Group 2 metal carboxylate can be, comprise, or consist essentially of, sodium acetate; alternatively, sodium propionate; alternatively, sodium n-butyrate; alternatively, sodium isobutyrate; alternatively, sodium valerate (n-pentanoate); alternatively, sodium neo-pentanoate; alternatively, sodium capronate (n-hexanoate); alternatively, sodium n-heptanoate; alternatively, sodium caprylate (n-octanoate); alternatively, sodium 2-ethylhexanoate; alternatively, sodium n-nonanoate; alternatively, sodium caprate (n-decanoate); alternatively, sodium n-undecanoate; alternatively, sodium laurate (n-dodecanoate); alternatively, sodium stearate (n-octadecanoate); alternatively, sodium benzoate; alternatively, potassium acetate; alternatively, potassium propionate; alternatively, potassium n-butyrate; alternatively, potassium isobutyrate; alternatively, potassium valerate (n-pentanoate); alternatively, potassium neo-pentanoate; alternatively, potassium capronate (n-hexanoate); alternatively, potassium n-heptanoate; alternatively, potassium caprylate (n-octanoate); alternatively, potassium 2-ethylhexanoate; alternatively, potassium n-nonanoate; alternatively, potassium caprate (n-decanoate); alternatively, potassium n-undecanoate; alternatively, potassium laurate (n-dodecanoate); alternatively, potassium stearate (n-octadecanoate); or alternatively, potassium benzoate.

In a non-limiting embodiment, the Group 1 or Group 2 metal carboxylate can be, comprise, or consist essentially of, sodium or potassium benzoate, a sodium or potassium methylbenzoate, a sodium or potassium di-methylbenzoate, sodium or potassium naphthenate, or any combination thereof. In some non-limiting embodiments, the Group 1 or Group 2 metal carboxylate can be, comprise, or consist essentially of, sodium benzoate, a sodium methylbenzoate, sodium di-methylbenzoate, sodium naphthenate, or any combination thereof; alternatively, potassium benzoate, a potassium methylbenzoate, a potassium dimethylbenzoate, potassium naphthenate, or any combination thereof. In other non-limiting embodiments, the Group 1 or Group 2 metal carboxylate can be, comprise, or consist essentially of, sodium benzoate; alternatively, a sodium methylbenzoate; alternatively, sodium dimethylbenzoate; alternatively, sodium naphthenate; alternatively, potassium benzoate; alternatively, a potassium methylbenzoate; alternatively, a potassium dimethylbenzoate; or alternatively, potassium naphthenate.

In an aspect, the Group 1 or Group 2 metal carboxylate utilized in any aspect or any embodiment disclosed herein can be substantially anhydrous; or alternatively, anhydrous. In some embodiments the Group 1 or Group 2 metal carboxylate can have a water content of less than or equal to 100 ppm; alternatively, less than or equal to 90 ppm; alternatively, less than or equal to 80 ppm; alternatively, less than or equal to 70 ppm; alternatively, less than or equal to 60 ppm; alternatively, less than or equal to 50 ppm; alternatively, less than or equal to 40 ppm; alternatively, less than or equal to 30 ppm; alternatively, less than or equal to 20 ppm; alternatively, less than or equal to 10 ppm; alternatively, less than or equal to 9 ppm; alternatively, less than or equal to 8 ppm; alternatively, less than or equal to 7 ppm; alternatively, less than or equal to 6 ppm; alternatively, less than or equal to 5 ppm; alternatively, less than or equal to 4 ppm; alternatively, less than or equal to 3 ppm; alternatively, less than or equal to 2 ppm; or alternatively, less than or equal to 1 ppm. Generally, the water content of the Group 1 or Group 2 metal carboxylate can be based on the ppm (by weight) of water in the Group 1 or Group 2 metal carboxylate. It should be noted that the water present in the Group 1 or Group 2 metal carboxylate can be in the form of Group 1 or Group 2 metal carboxylate impurities and/or interstitial water in the Group 1 or Group 2 metal carboxylate.

In an aspect, the Group 1 or Group 2 metal carboxylate utilized in any aspect or any embodiment disclosed herein can be substantially acid-free. In some embodiments, the Group 1 or Group 2 metal carboxylate can have an acid content of less than or equal to 1000 ppm; alternatively, less than or equal to 750 ppm; alternatively, less than or equal to 500 ppm; or alternatively, less than or equal to 250 ppm. In other embodiments, the Group 1 or Group 2 metal carboxylate can have an acid content of less than or equal to 100 ppm; alternatively, less than or equal to 90 ppm; alternatively, less than or equal to 80 ppm; alternatively, less than or equal to 70 ppm; alternatively, less than or equal to 60 ppm; alternatively, less than or equal to 50 ppm; alternatively, less than or equal to 40 ppm; alternatively, less than or equal to 30 ppm; alternatively, less than or equal to 20 ppm; alternatively, less than or equal to 10 ppm; alternatively, less than or equal to 9 ppm; alternatively, less than or equal to 8 ppm; alternatively, less than or equal to 7 ppm; alternatively, less than or equal to 6 ppm; alternatively, less than or equal to 5 ppm; alternatively, less than or equal to 4 ppm; alternatively, less than or equal to 3 ppm; alternatively, less than or equal to 2 ppm; or alternatively, less than or equal to 1 ppm. Generally, the acid content of the Group 1 or Group 2 metal carboxylate can be based on the ppm (by weight) of acid in the Group 1 or Group 2 metal carboxylate. It should be noted that the acid present in the Group 1 or Group 2 metal carboxylate can be in the form of Group 1 or Group 2 metal carboxylate impurities and/or interstitial acid in the Group 1 or Group 2 metal carboxylate.

In an aspect, the solvent that can be utilized in the step of contacting a chromium precursor, a Group 1 or Group 2 metal carboxylate, and a solvent can be, comprise, or consist essentially of, any solvent suitable for the process. In an embodiment, the solvent that can be utilized in the step of contacting a chromium precursor, a Group 1 or Group 2 metal carboxylate, and a solvent can be, comprise, or consist essentially of, aprotic solvent. In some embodiments, the solvent that can be utilized in the step of contacting a chromium precursor, a Group 1 or Group 2 metal carboxylate, and a solvent can be, comprise, or consist essentially of, a non-polar solvent, an aprotic polar solvent, or any combination thereof; alternatively, a combination of a non-polar solvent and an aprotic polar solvent; alternatively, a non-polar solvent; or alternatively, an aprotic polar solvent. Solvents (aprotic, non-polar, and/or aprotic polar) are independently described herein and can be utilized without limitation to further describe the solvent that can be utilized in the step of contacting a chromium precursor, a Group 1 or Group 2 metal carboxylate, and a solvent.

In an embodiment, the non-polar solvent can be, comprise, or consist essentially of, a hydrocarbon, a halogenated hydrocarbon, or any combination thereof; alternatively, a hydrocarbon; or alternatively, a halogenated hydrocarbon. Hydrocarbon solvents and halogenated hydrocarbon solvents are independently described herein and can be utilized without limitation as the solvent in the step of contacting a chromium precursor, a Group 1 or Group 2 metal carboxylate, and a solvent.

In an embodiment, the aprotic polar solvent can be, comprise, or consist essentially of, any compound which can be utilized as the neutral ligand described herein. In some embodiments, the aprotic polar solvent can be, comprise, or consist essentially of, the same compound which is utilized as the neutral ligand of the utilized transition metal precursor. In other embodiments, the aprotic polar solvent can be, comprise, or consist essentially of, a different compound than that which is utilized as the neutral ligand of the utilized transition metal precursor. In aspects and embodiments, where the chromium precursor does not have a neutral ligand, the aprotic polar solvent can be, comprise, or consist essentially of, any compound(s) described herein which could be utilized as a neutral ligand for the transition metal precursor. Compounds which can be utilized as the neutral ligand are independently described herein and can be utilized without limitation as the solvent in the step of contacting a chromium precursor, a Group 1 or Group 2 metal carboxylate, and a solvent.

In an aspect, the solvent utilized in the any aspect or any embodiment disclosed herein can be substantially anhydrous; or alternatively, anhydrous. In some embodiments the solvent can have a water content of less than or equal to 100 ppm; alternatively, less than or equal to 90 ppm; alternatively, less than or equal to 80 ppm; alternatively, less than or equal to 70 ppm; alternatively, less than or equal to 60 ppm; alternatively, less than or equal to 50 ppm; alternatively, less than or equal to 40 ppm; alternatively, less than or equal to 30 ppm; alternatively, less than or equal to 20 ppm; or alternatively, less than or equal to 10 ppm; alternatively, less than or equal to 9 ppm; alternatively, less than or equal to 8 ppm; alternatively, less than or equal to 7 ppm; alternatively, less than or equal to 6 ppm; alternatively, less than or equal to 5 ppm; alternatively, less than or equal to 4 ppm; alternatively, less than or equal to 3 ppm; alternatively, less than or equal to 2 ppm; or alternatively, less than or equal to 1 ppm. Generally, the water content of the solvent can be based on the ppm (by weight) of water in the solvent.

In an aspect, the solvent utilized in any aspect or any embodiment disclosed herein can be substantially acid-free. In some embodiments, the solvent can have an acid content of less than or equal to 1000 ppm; alternatively, less than or equal to 750 ppm; alternatively, less than or equal to 500 ppm; or alternatively, less than or equal to 250 ppm. In other embodiments, the solvent can have an acid content of less than or equal to 100 ppm; alternatively, less than or equal to 90 ppm; alternatively, less than or equal to 80 ppm; alternatively, less than or equal to 70 ppm; alternatively, less than or equal to 60 ppm; alternatively, less than or equal to 50 ppm; alternatively, less than or equal to 40 ppm; alternatively, less than or equal to 30 ppm; alternatively, less than or equal to 20 ppm; alternatively, less than or equal to 10 ppm; alternatively, less than or equal to 9 ppm; alternatively, less than or equal to 8 ppm; alternatively, less than or equal to 7 ppm; alternatively, less than or equal to 6 ppm; alternatively, less than or equal to 5 ppm; alternatively, less than or equal to 4 ppm; alternatively, less than or equal to 3 ppm; alternatively, less than or equal to 2 ppm; or alternatively, less than or equal to 1 ppm. Generally, the acid content of the solvent can be based on the ppm (by weight) of acid in the solvent.

In an aspect, the present disclosure describes a process for preparing a chromium carboxylate composition comprising: contacting 1) a chromium precursor, 2) a Group 1 or Group 2 metal carboxylate, and 3) a solvent to form a chromium carboxylate. In another aspect, the present disclosure describes a process for preparing a chromium carboxylate composition can comprise: contacting 1) a chromium precursor, 2) a Group 1 or Group 2 metal carboxylate, and 3) a solvent to form a solution comprising the chromium carboxylate. In an embodiment, the process for preparing a chromium carboxylate composition can comprise: a) contacting 1) a chromium precursor, 2) a Group 1 or Group 2 metal $C_3$-$C_{25}$ carboxylate, and 3) a solvent to form a chromium $C_3$-$C_{25}$ carboxylate. In some embodiments, the process for preparing a chromium carboxylate composition can comprise: a) contacting 1) a chromium precursor, 2) a Group 1 or Group 2 metal $C_3$-$C_{25}$ carboxylate, and 3) a solvent to form a solution comprising the chromium $C_3$-$C_{25}$ carboxylate. The chromium precursor (e.g. a chromium(III) precursor, among others disclosed herein), the Group 1 or Group 2 metal carboxylate (e.g. a Group 1 or Group 2 metal $C_3$-$C_{25}$ carboxylate, among others disclosed herein), and the solvent are independent elements of the process of preparing a chromium carboxylate composition. The process for preparing a chromium carboxylate can be described using any combination of any aspect or any embodiment of the chromium precursor, Group 1 or Group 2 metal carboxylate described herein, or solvent described herein.

In an aspect, the chromium precursor (general or specific) utilized in the process for producing the chromium carboxylate can be a substantially anhydrous chromium precursor, alternatively, a substantially acid-free chromium precursor; or alternatively, a substantially anhydrous and substantially acid-free chromium precursor. In an embodiment, the chromium precursor (general or specific) utilized in the process for producing the chromium carboxylate can have any chromium precursor water content disclosed herein. In an embodiment, the chromium precursor (general or specific) utilized in the process for producing the chromium carboxylate can have any chromium precursor acid content disclosed herein.

In an aspect, the Group 1 or Group 2 metal carboxylate (general or specific) utilized in the process for producing the chromium carboxylate can be a substantially anhydrous Group 1 or Group 2 metal carboxylate; alternatively, a substantially acid-free Group 1 or Group 2 metal carboxylate; or alternatively, a substantially anhydrous and substantially acid-free Group 1 or Group 2 metal carboxylate. In an embodiment, the Group 1 or Group 2 metal carboxylate (general or specific) utilized in the process for producing the chromium carboxylate can have any Group 1 or Group 2 metal carboxylate water content disclosed herein. In an embodiment, the Group 1 or Group 2 metal carboxylate (general or specific) utilized in the process for producing the chromium carboxylate can have any Group 1 or Group 2 metal carboxylate acid content disclosed herein.

In an aspect, the solvent utilized in the step of contacting the chromium precursor, the Group 1 or Group 2 metal carboxylate, and the solvent can be a substantially anhydrous; alternatively, a substantially acid-free; or alternatively, a substantially anhydrous and substantially acid-free. In an embodiment, the solvent utilized in the process for producing the chromium carboxylate can have any solvent water content disclosed herein. In an embodiment, the solvent utilized in the process for producing the chromium carboxylate can have any solvent acid content disclosed herein.

In an aspect, the chromium precursor, the Group 1 or Group 2 metal carboxylate, and solvent can be contacted under substantially anhydrous conditions; or alternatively, under anhydrous conditions. In another aspect, the chromium carboxylate can be formed under substantially anhydrous conditions; or alternatively, under anhydrous conditions. In an aspect, the chromium precursor, the Group 1 or Group 2 metal carboxylate, and solvent can be contacted under substantially acid-free conditions; or alternatively, under acid-under conditions. In another aspect, the chromium carboxylate can be formed under substantially acid-free conditions; or alternatively, under acid-free conditions. In an embodiment, the each of the chromium precursors, the Group 1 or Group 2 metal carboxylate, and the solvent can independently have any water content disclosed herein for the chromium precursor, the Group 1 or Group 2 metal carboxylate, and the solvent. In an aspect, the chromium precursor, the Group 1 or Group 2 metal carboxylate, and solvent can be contacted under substantially anhydrous and substantially acid-free conditions; or alternatively, under anhydrous and acid-free conditions. In another aspect, the chromium carboxylate can be formed under substantially anhydrous and substantially acid-free conditions; or alternatively, under anhydrous and acid-free conditions. In an aspect, the chromium precursor, the Group 1 or Group 2 metal carboxylate, and solvent can be contacted under substantially acid-free conditions; or alternatively, under acid-under conditions.

In an aspect, the chromium precursor, the Group 1 or Group 2 metal carboxylate, and the solvent can be contacted in any combination or order. In an embodiment, the chromium precursor, the Group 1 or Group 2 metal carboxylate, and the solvent can be contacted simultaneously. In an embodiment, the chromium precursor and the solvent can be contacted to form a mixture, and the mixture subsequently contacted with the Group 1 or Group 2 metal carboxylate; alternatively, the Group 1 or Group 2 metal carboxylate and the solvent can be contacted to form a mixture and the mixture subsequently contacted with the chromium precursor; or alternatively, 1) the chromium precursor and a portion of the solvent can be contacted to form a first mixture, 2) the Group 1 or Group 2 metal carboxylate and a portion of the solvent to form a second mixture, and 3) contacting the first and second mixtures. In some embodiments, the solvent of the first mixture is the same as the solvent of the second mixture. In other embodiments, the solvent of the first mixture and second mixture are different.

In an aspect, the step of contacting the chromium precursor, the Group 1 or Group 2 metal carboxylate, and the solvent is not limited to a specific type of contacting or formation process, a specific reactor, or any particular engineering requirement. In an embodiment, the formation of the chromium carboxylate can occur via a batch process or a continuous process; alternatively, a batch process; or alternatively, a continuous process. In some embodiments, the formation of the chromium carboxylate occur via a batch process in a slurry or mixture comprising, or consisting essentially of, the chromium precursor, the Group 1 or Group 2 metal carboxylate, and the solvent.

In an embodiment, any combination of the chromium precursor, Group 1 or Group 2 metal carboxylate, and solvent can be contacted at a temperature ranging from −40° C. to 200° C.; alternatively, −40° C. to 150° C.; alternatively, −40° C. to 100° C.; alternatively, −20° C. to 80° C.; or alternatively, 0° C. to 60° C. In an embodiment, the chromium precursor (general or specific) can be insoluble in the solvent at the temperature at which the chromium precursor and solvent are contacted; alternatively, partially soluble in the solvent at the temperature at which the chromium precursor and the solvent are contacted; or alternatively, soluble at the temperature at which the chromium precursor and the solvent are contacted. In an embodiment, the Group 1 or Group 2 metal carboxylate (general or specific) can be insoluble in the solvent at the temperature the Group 1 or Group 2 metal carboxylate and solvent are contacted; alternatively, partially soluble in the solvent at the temperature at which the Group 1 or Group 2 metal carboxylate and the solvent are contacted; or alternatively, soluble at the temperature at which the Group 1 or Group 2 metal carboxylate and the solvent are contacted.

In an embodiment, the chromium precursor and the Group 1 or Group 2 metal carboxylate can be contacted at any suitable chromium precursor to carboxylate group equivalent ratio.

In an aspect, the chromium carboxylate can be formed at conditions suitable for forming a chromium carboxylate. Conditions capable of forming the chromium carboxylate can include, temperature, time, pressure, chromium precursor to carboxylate group ratio (molar or equivalent), and/or any combination thereof, among other conditions. These chromium carboxylate formation conditions are independently described herein and can be utilized in any combination to further describe a process for producing a chromium carboxylate composition.

In an aspect, the chromium precursor and the Group 1 or Group 2 metal carboxylate can be contacted at any suitable carboxylate group of the Group 1 or Group 2 metal carboxylate to chromium of the chromium precursor equivalent ratio (i.e. carboxylate group to chromium equivalent ratio). In an embodiment, the carboxylate group to chromium equivalent ratio can fall within a range of carboxylate group to chromium equivalent ratios. In an embodiment, the minimum equivalent ratio for any range of a carboxylate group to chromium equivalent ratio can be 0.95:1; alternatively, 1:1; alternatively, 1.03:1; or alternatively, 1.05:1. In an embodiment, the maximum equivalent ratio for any range of a carboxylate group to chromium equivalent ratio can be 1.3:1; alternatively, 1:25; alternatively, 1.2:1; or alternatively, 1.15:1. In an embodiment, the carboxylate group to chromium equivalent ratio can range from any minimum carboxylate group to chromium equivalent ratio described herein to any maximum chromium carboxylate group to chromium equivalent ratio described herein. In some non-limiting embodiments, the carboxylate group to chromium equivalent ratio can range from 0.95:1 to 1.3:1; alternatively, 1:1 to 1.25:1; alternatively, 1:1 to 1.2:1; alternatively, 1.03:1 to 1.25:1; alternatively, 1.03:1 to 1.2:1; alternatively, 1.05:1 to 1.2:1; or alternatively, 1.05:1 to 1.15:1. Other carboxylate group to chromium equivalent ratio ranges are readily apparent from the present disclosure. In another non-limiting embodiment, the carboxylate group to chromium equivalent ratio can be about 1.1:1. Generally, the chromium in the +x oxidation state contains x equivalents of the transition metal. Generally, the carboxylate having r carboxylate groups contains r equivalents of carboxylate groups.

In an aspect, the chromium precursor and the Group 1 or Group 2 metal carboxylate can be contacted at any suitable carboxylate group of the Group 1 or Group 2 metal carboxylate to chromium of the chromium precursor molar ratio (i.e. carboxylate group to chromium molar ratio). In an embodiment, the carboxylate group to chromium molar ratio can fall within a range of carboxylate group to chromium molar ratios. Generally, the carboxylate group to chromium molar ratio and the carboxylate group to chromium equivalent ratio are related by the oxidation state of the chromium of the chromium precursor in that the number of moles of carboxylate group utilized equals the x*the number of carboxylate groups in the carboxylate group to chromium equivalent ratio. In an embodiment, the minimum molar ratio for any range of a carboxylate group to chromium molar ratio can be 0.95*x:1; alternatively, 1*x:1; alternatively, 1.03*x:1; or alternatively, 1.05*x:1. In an embodiment, the maximum molar ratio for any range of a carboxylate group to chromium molar ratio can be 1.3*x:1; alternatively, 1*x:25; alternatively, 1.2*x:1; or alternatively, 1.15*x:1. In an embodiment, the carboxylate group to chromium molar ratio can range from any minimum carboxylate group to chromium molar ratio described herein to any maximum chromium molar ratio described herein. In some non-limiting embodiments, the carboxylate group to chromium molar ratio can range from 0.95*x:1 to 1.3*x:1; alternatively, 1*x:1 to 1.25*x:1; alternatively, 1*x:1 to 1.2*x:1; alternatively, 1.03*x:1 to 1.25*x:1; alternatively, 1.03*x:1 to 1.2*x:1; alternatively, 1.05*x:1 to 1.2*x:1; or alternatively, 1.05*x:1 to 1.15*x:1. In another non-limiting embodiment, the carboxylate group to chromium equivalent ratio can be about 1.1*x:1. Other carboxylate group to chromium molar ratio ranges are readily apparent from the present disclosure.

In an embodiment, the chromium carboxylate can be formed at a temperature ranging from ranging from −40° C. to 200° C.; alternatively, −40° C. to 150° C.; alternatively, −40° C. to 100° C.; alternatively, −20° C. to 80° C.; or alternatively, 0° C. to 60° C. In an embodiment, the chromium precursor (general or specific) can be insoluble in the solvent at the temperature at which the chromium carboxylate can be formed; alternatively, partially soluble in the solvent at the temperature at which the chromium carboxylate can be formed; or alternatively, soluble at the temperature at which the chromium carboxylate can be formed. In an embodiment, the Group 1 or Group 2 metal carboxylate (general or specific) can be insoluble in the solvent at the temperature at which the chromium carboxylate can be formed; alternatively, partially soluble in the solvent at the temperature at which the chromium carboxylate can be formed; or alternatively, soluble at the temperature at which the chromium carboxylate can be formed. The temperature at which any combination of the chromium precursor, Group 1 or Group 2 metal carboxylate, and solvent can be contacted and the chromium carboxylate formation temperature are independent of each other. It should be noted when the contact temperature and the formation temperature are different, that this does not imply that the formation of the chromium carboxylate cannot begin at the contact temperature or at a temperature between the contact temperature and the formation temperature. The formation temperature just indicates that at some point the formation of a portion of the chromium carboxylate occurs at the prescribed formation temperature. It should be also noted that the chromium precursor, Group 1 or Group 2 metal carboxylate, and solvent can be contacted at one temperature (one at which the formation of the chromium carboxylate can slowly form) and then the chromium carboxylate formed at second temperature (or alternatively, the mixture comprising, consisting essentially of, or consisting of, the chromium precursor, the Group 1 or Group 2 metal carboxylate, and the solvent subjected to second temperature for formation of the chromium carboxylate).

In an aspect, the formation time of the chromium carboxylate (or alternatively, a contact time for chromium precursor, Group 1 or Group 2 metal carboxylate, and solvent) can be at least 0.1 hours; alternatively, at least 0.15 hours; alternatively, at least 0.2 hours; alternatively, at least 0.25 hours; alternatively, at least 0.3 hours; alternatively, at least 0.35 hours; alternatively, at least 0.45, hours; or alternatively, at least 0.5 hours. In an embodiment, the maximum formation time of the chromium carboxylate (or alternatively, a contact time for chromium precursor, Group 1 or Group 2 metal carboxylate, and solvent) can be 168 hours; alternatively, 144 hours; alternatively, 120 hours; alternatively, 96 hours; alternatively, 72 hours; alternatively, 48 hours; alternatively, 36 hours; alternatively, 24 hours; alternatively, 18 hours; alternatively, 15 hours; alternatively, 12 hours; alternatively, 9 hours; alternatively, 8 hours; or alternatively, 7 hours. In some embodiments, a condition capable of forming the chromium(III) halide complex can include a formation time of the chromium carboxylate (or alternatively, a contact time for chromium precursor, Group 1 or Group 2 metal carboxylate, and solvent) that can range from any minimum chromium carboxylate formation time (or alternatively, chromium precursor, Group 1 or Group 2 metal carboxylate, and solvent contact time) disclosed herein to any maximum chromium carboxylate formation time (or alternatively, chromium precursor, Group 1 or Group 2 metal carboxylate, and solvent contact time) described herein. In some non-limiting embodiments, the chromium carboxylate formation time (or alternatively, chromium precursor, Group 1 or Group 2 metal carboxylate, and solvent contact time) can be from 0.1 hours to 168 hours; alternatively, from 0.1 hours to 120 hours; alternatively, from 0.25 hours to 72 hours; alternatively, from 0.4 hours to 36 hours; alternatively, from 0.5 hours to 24 hours; or alternatively, from 0.5 hours to 24 hours. Other chromium carboxylate formation time (or alternatively, chromium precursor, Group 1 or Group 2 metal carboxylate, and solvent contact time) ranges are readily apparent from the present disclosure.

In an aspect, the chromium carboxylate can be formed at any pressure capable of forming the chromium carboxylate. In an embodiment, the conditions capable of forming the chromium carboxylate can include atmospheric pressure (i.e. about 14.7 psi or about 101 kPa). In an embodiment, a condition capable of forming the chromium carboxylate can include subjecting a contact mixture comprising the chromium precursor, the Group 1 or Group 2 metal carboxylate, and the solvent to a pressure greater than atmospheric pressure. In some embodiments, a condition capable of forming the chromium carboxylate can include a pressure of at least atmospheric pressure; alternatively, at least 2 psi (14 kPa) greater than atmospheric pressure; alternatively, least 5 psi (34 kPa) greater than atmospheric pressure; alternatively, least 10 psi (69 kPa) greater than atmospheric pressure; or alternatively, least 15 psi (103 kPa) greater than atmospheric pressure. In some embodiments, a condition capable of forming the chromium carboxylate can include a pressure capable of maintaining the solvent in the liquid state; alternatively, at least 2 psi (14 kPa) greater than the pressure capable of maintaining the solvent in the liquid state; alternatively, at least 5 psi (34 kPa) greater than the pressure capable of maintaining the solvent in the liquid state; alternatively, at least 10 psi (69 kPa) greater than the pressure capable of maintaining the solvent in the liquid state; or alternatively, least at 15 psi (103 kPa) greater than the pressure capable of maintaining the solvent in the liquid state. In other embodiments, a condition capable of forming the chromium carboxylate can include a maximum pressure of 500 psi (3.4 mPa); alternatively, of 400 psi (2.8 mPa); alternatively, of 250 psi (1.7 mPa); alternatively, of 200 psi (1.4 mPa); alternatively, of 150 psi (1.0 mPa); alternatively, of 100 psi (689 kPa); or alternatively, of 50 psi (345 kPa). In yet other embodiments, a condition capable of forming the chromium carboxylate can include a pressure that can range from any minimum chromium carboxylate formation pressure disclosed herein to any maximum chromium carboxylate formation pressure described herein. In some non-limiting embodiments, a condition capable of forming the chromium carboxylate can include a pressure from atmospheric pressure to 500 psi (3.4 mPa); alternatively, at least 2 psi (14 kPa) greater than atmospheric pressure to 500 psi (3.4 mPa); alternatively, at least 5 psi (34 kPa) greater than the pressure capable of maintaining the solvent in the liquid state to 500 psi (3.4 mPa). Other pressure ranges which can be a condition capable of forming the chromium carboxylate are readily apparent from the present disclosure.

In an embodiment, any combination of the chromium precursor, Group 1 or Group 2 metal carboxylate, and solvent can be contacted at and/or the chromium carboxylated can be formed under a substantially dry (or alternatively, dry) atmosphere. In an embodiment, the substantially dry (or alternatively, dry) atmosphere can comprise nitrogen, argon, helium, oxygen, or any combination thereof; or alternatively, nitrogen, argon, helium, or any combination thereof. In some embodiments, the substantially dry atmosphere can be substantially dry nitrogen, substantially dry argon, substantially dry helium, or substantially, dry air; alternatively, substantially dry nitrogen; alternatively, substantially dry argon; alternatively, substantially dry helium; or alternatively, substantially, dry air. In other embodiments, the dry atmosphere can be dry nitrogen, dry argon, dry helium, or dry air; alternatively dry nitrogen; alternatively, dry argon; alternatively, dry helium; or alternatively, dry air. In some embodiments, the chromium precursor, Group 1 or Group 2 metal carboxylate, and solvent can be contacted at and/or the chromium carboxylated can be formed under an atmosphere (any described herein) containing less than or equal to 100 ppm water; alternatively, less than or equal to 90 ppm water; alternatively, less than or equal to 80 ppm water; alternatively, less than or equal to 70 ppm water; alternatively, less than or equal to 60 ppm water; alternatively, less than or equal to 50 ppm water; alternatively, less than or equal to 40 ppm water; alternatively, less than or equal to 30 ppm water; alternatively, less than or equal to 20 ppm water; alternatively, less than or equal to 10 ppm water; alternatively, less than or equal to 9 ppm water; alternatively, less than or equal to 8 ppm water; alternatively, less than or equal to 7 ppm water; alternatively, less than or equal to 6 ppm water; alternatively, less than or equal to 5 ppm water; alternatively, less than or equal to 4 ppm water; alternatively, less than or equal to 3 ppm water; alternatively, less than or equal to 2 ppm water; or alternatively, less than or equal to 1 ppm water. Generally, the amount of water which can be present in the atmosphere is provide on a by weight basis.

In an aspect, the process can further comprise evaporating the solvent to provide the chromium carboxylate composition. In another aspect, the process can comprise evaporating the solvent from the solution comprising the chromium carboxylate to provide the chromium carboxylate composition. In an embodiment, the process can further comprise filtering the solution comprising the chromium carboxylate to produce a filtrate and then evaporating the solvent from the filtrate. In an embodiment, the process can further comprise decanting the solution comprising the chromium carboxylate and evaporating the solvent. Generally, filtering and decanting can be utilized to remove at least a portion of any insoluble particulates present in a solution comprising the chromium carboxylate. Evaporation of the solvent can produce the chromium carboxylate composition. In some embodiments wherein the chromium carboxylate composition is purified by any method described herein, this first chromium carboxylate can be referred to as a crude chromium carboxylate composition. If multiple purification and or isolation steps are performed, the various chromium carboxylate compositions can be distinguished by prefacing the term "chromium carboxylate" with a designation such as first, second, third, an so forth.

In an aspect, a crude chromium carboxylate composition can be purified. In some embodiments, the crude chromium carboxylate composition can be purified by dissolving the chromium carboxylate composition in a solvent, filtering the solution containing the dissolved chromium carboxylate composition to provide a filtrate, and isolating the chromium carboxylate composition from the filtrate by evaporating the solvent. In an embodiment, the solvent utilized to dissolve the chromium carboxylate composition can be, comprise, or consist essentially of, an aprotic solvent; alternatively, an aprotic polar solvent; alternatively, a non-polar solvent; alternatively, a non-coordinating solvent. In another aspect, the chromium carboxylate composition can be purified by contacting the chromium carboxylate composition with a solvent in which the chromium carboxylate composition is substantially insoluble while impurities within the chromium carboxylate composition are soluble and filtering the solution to recover the chromium carboxylate composition. In yet other embodiments, the chromium carboxylate composition can be recrystallized from a solvent. In some embodiments, the solvent utilized in the purification of the chromium carboxylate composition can be, comprise, or consist essentially of, an aprotic solvent; alternatively, an aprotic polar solvent; alternatively, an aprotic non-polar solvent; or alternatively, a non-coordinating solvent. Generally, the chromium carboxylate composition can be purified utilizing one or any combination of the chromium carboxylate composition purification methods described herein.

As utilized in the present specification and claims, the term "substantially insoluble" means that no more than 5 grams of the substance (e.g. chromium carboxylate composition) dissolves in 200 mL of the solvent at the temperature at which the solvent and the chromium carboxylate are contacted. As utilized in the present specification and claims, the term "soluble" means that greater than 80 grams of the substance dissolves in 200 mL of the solvent at the temperature at which the solvent and the chromium carboxylate are contacted. As utilized in the present specification and claims the term "partially soluble" means that from 5 to 80 grams of the substance dissolves in 200 mL of the solvent.

In any embodiment wherein a solvent is evaporated, the evaporation of the solvent can be performed using any method known to one having ordinary skill in the art. In some embodiments, the solvent can be evaporated at ambient temperature (15-35° C.—no applied external heat source). In other embodiments, the solvent can be evaporated with gentle heating (e.g. at a temperature ranging from 25° C. to 100° C.). In further embodiments, the solvent can be evaporated at ambient temperature under reduced pressure. In yet other embodiments, the solvent can be evaporated with gentle heating under reduced pressure. In any aspect or any embodiment wherein the solvent can be evaporated under reduced pressure, the evaporation can be conducted at a pressure less than 600 Torr; alternatively, less than 500 Torr; alternatively, less than 400 Torr; alternatively, less than 300 Torr; alternatively, less than 200 Torr; alternatively, less than 150 torr; alternatively, less than 100 Torr; alternatively, less than 75 Torr; alternatively, less than 50 Torr; alternatively, less than 25 Torr; alternatively less than 20 Torr; alternatively, less than 15; alternatively, less than 10 Torr; alternatively, less than 5 Torr; or alternatively, less than 1 Torr. In an embodiment, the evaporation of the solvent (regardless of how it is performed or in what step of the process it is performed) can be utilized to remove at least 50, 60, 70, 75, 80, 85, 90, 95, 96, 97, 98, or 99 weight percent of the solvent.

In any aspect and any embodiment disclosed herein, the process for preparing any chromium carboxylate composition described herein can include a step for reducing the Group 1 or Group 2 metal content in the chromium carboxylate composition. In any aspect or any embodiment described herein, the Group 1 or Group 2 metal content of the chromium carboxylate composition can be reduced by contacting the chromium carboxylate composition with a hydrocarbylsilyl halide. In some aspects and embodiments, the Group 1 or Group 2 metal content of the chromium carboxylate composition can be reduced by contacting the chromium carboxylate composition with an alkylsilyl halide. In some embodiments, the chromium carboxylate composition and the hydrocarbylsilyl halide (or alkylsilyl halide) can be contacted in a solvent. In an embodiment, the solvent in which the chromium carboxylate composition and the hydrocarbylsilyl halide can be contacted can be, comprise, or consist essentially of, an aprotic solvent; alternatively, an aprotic polar solvent; alternatively, a non-polar solvent; or alternatively, a non-coordinating solvent. Solvents are described herein and the appropriate classes (or specific solvents) which meet the requirements for the contacting of the chromium carboxylate composition and hydrocarbylsilyl halide (or alkylsilyl halide) can be utilized without limitation. After contacting the chromium carboxylate composition and the hydrocarbylsilyl halide (or alkylsilyl halide), the formed solution can be filtered to remove a formed Group 1 or Group 2 metal halide salt. After removing the Group 1 or Group 2 metal salt, the chromium carboxylate composition can then be isolated and optionally purified. Methods for isolating and/or purifying the chromium carboxylate composition are described herein. Generally, the method for reducing the Group 1 or Group 2 metal content in the chromium carboxylate composition can be utilized with any general or specific chromium carboxylate composition described herein (e.g. a chromium(III) carboxylate composition).

In an embodiment, the hydrocarbylsilyl halide can be, comprise, or consist essentially of, a hydrocarbylsilyl trihalide, a dihydrocarbylsilyl dihalide, a trihydrocarbylsilyl halide, or any combination thereof; alternatively, a hydrocarbylsilyl trihalide; alternatively, a dihydrocarbylsilyl dihalide; or alternatively, a trihydrocarbylsilyl halide. In some embodiments, the hydrocarbylsilyl halide can be, comprise, or consist essentially of, an alkylsilyl trihalide, a dialkylsilyl dihalide, a trialkylsilyl halide, or any combination thereof; alternatively, an alkylsilyl trihalide; alternatively, a dialkylsilyl dihalide; or alternatively, a trialkylsilyl halide. Hydrocarbyl groups, alkyl groups, and halides have been described herein as substituent groups for substituted cycloalkyl groups, substituted aromatic groups, substituted aryl group, and substituted aralkyl groups (among other groups). These hydrocarbyl groups, alkyl groups, and halides can be utilized without limitation as the hydrocarbyl groups, alkyl groups, halides for any hydrocarbylsilyl halide or alkylsilyl halide described herein. In a non-limiting embodiment, the hydrocarbylsilyl halide can be, comprise, or consist essentially of, trimethylchlorosilane.

When the process for preparing a chromium carboxylate composition has multiple steps which can utilize a solvent, the solvent utilized in each particular step can be distinguished from one another by the use of the designations first, second, third, and so forth, prefacing the term (or phrase utilizing the term) "solvent."

Properties of the chromium carboxylate composition are described herein and can be utilized without limitation to describe the process for preparing the chromium carboxylate composition and the chromium carboxylate composition produced by the process.

In a non-limiting aspect, this disclosure provides for a process for preparing a chromium(III) carboxylate composition. The process for preparing the chromium(III) carboxylate composition can comprise: contacting 1) a chromium (III) precursor, 2) a Group 1 or Group 2 metal carboxylate, and 3) a solvent to form a chromium(III) carboxylate. In another embodiment, the process for preparing a chromium (III) carboxylate composition can comprise: contacting 1) a chromium(III) precursor, 2) a Group 1 or Group 2 metal carboxylate, and 3) a solvent to form a solution comprising the chromium(III) carboxylate. In other embodiments, the process for making a chromium(III) carboxylate composition can comprise: a) contacting 1) a chromium(III) precursor, 2) a Group 1 or Group 2 metal $C_3$-$C_{25}$ carboxylate, and solvent to form a chromium(III) $C_3$-$C_{25}$ carboxylate. In some embodiments, the process for making a chromium(III) carboxylate composition can comprise: a) contacting 1) a chromium(III) precursor, 2) a Group 1 or Group 2 metal $C_3$-$C_{25}$ carboxylate, and solvent to form a solution comprising the chromium(III) $C_3$-$C_{25}$ carboxylate. The chromium (III) precursor, Group 1 or Group 2 metal carboxylate (e.g. a Group 1 or Group 2 metal $C_3$-$C_{25}$ carboxylate), and the solvent are independent elements of the process of making a chromium(III) carboxylate composition and the process for making a chromium(III) carboxylate can be described using any Group 1 or Group 2 metal carboxylate described herein, chromium(III) precursor described herein, chromium (III) carboxylate described herein, and/or solvent described herein. The process for preparing a chromium(III) carboxylate composition can be described using any combination of any aspect or any embodiment of the chromium(III) precursor, Group 1 or Group 2 metal carboxylate described herein, and/or solvent described herein. Processes for preparing other chromium carboxylate compositions are readily apparent, and contemplated, on the basis of the present disclosure.

In an embodiment, the chromium(III) precursor (general or specific) utilized in the process for producing the chromium(III) carboxylate (general or specific) can have any water content disclosed herein for the chromium precursor (including substantially anhydrous and anhydrous) and/or any acid content disclosed herein for the chromium precursor (including substantially acid-free, and acid-free). In another embodiment, the Group 1 or Group 2 metal carboxylate (general or specific) utilized in the process for producing the chromium(III) carboxylate (general or specific) can have any water content disclosed herein for the Group 1 or Group 2 metal carboxylate (including substantially anhydrous and anhydrous) and/or any acid content disclosed herein for the Group 1 or Group 2 metal carboxylate (including substantially acid-free, and acid-free). In yet another embodiment, the solvent utilized in the process for producing the chromium(III) carboxylate, can have any water content disclosed herein for the solvent (including substantially anhydrous and anhydrous) and/or any acid content disclosed herein for the solvent (including substantially acid-free, and acid-free). In an embodiment, the combining of the chromium(III) precursor (general or specific) and a Group 1 or Group 2 metal carboxylate (general or specific) can occur under any combination method and/or conditions, form any mixture and/or solution as described herein for the combining of the chromium precursor, Group 1 or Group 2 metal carboxylate, and solvent. In yet other embodiments, the chromium(III) carboxylate can be formed under any condition described herein for forming a chromium carboxylate. In a non-limiting embodiment, the chromium(III) precursor and the Group 1 or Group 2 metal carboxylate can be contacted at a carboxylate group to chromium(III) molar ratio ranging from range from 2.85:1 to 3.9:1; alternatively, 3:1 to 3.75:1; alternatively, 3:1 to 3.6:1; alternatively, 3.09:1 to 3.75:1; alternatively, 3.09:1 to 3.6:1; alternatively, 3.15:1 to 3.6:1; or alternatively, 3.15:1 to 3.45:1. Other aspects and embodiments of the process for preparing a chromium carboxylate can also be applied, without limitation, to the process for preparing a chromium (III) carboxylate composition.

In an aspect, a chromium(III) carboxylate composition can be purified. In some embodiments, the chromium(III) carboxylate composition can be purified by dissolving the chromium(III) carboxylate in a solvent, filtering the solution containing the dissolved chromium(III) carboxylate to provide a filtrate, and isolating the purified chromium(III) carboxylate composition from the filtrate by evaporating the solvent. In an embodiment, the solvent utilized to dissolve the chromium(III) carboxylate composition can be, comprise, or consist essentially of, an aprotic solvent; alternatively, an aprotic polar solvent; alternatively, a non-polar solvent; or alternatively, a non-coordinating solvent. In some embodiments, the chromium(III) carboxylate composition can be purified by contacting the chromium(III) carboxylate composition with a solvent in which the chromium(III) metal carboxylate composition is substantially insoluble while impurities within the chromium(III) carboxylate composition are soluble and filtering the solution to recover the chromium(III) carboxylate composition. In yet other embodiments, the chromium(III) carboxylate composition can be recrystallized from a solvent. In some embodiments, the solvent utilized in the purification of the chromium(III) carboxylate composition can be, comprise, or consist essentially of, an aprotic solvent; alternatively, an aprotic polar solvent; alternatively, a non-polar solvent; or alternatively, a non-coordinating solvent. Generally, the chromium(III) carboxylate composition can be purified utilizing one or any combination of the chromium(III) carboxylate composition purification methods described herein.

Various aspect and embodiments described herein refer to non-hydrogen substituents such as halogen (or halo, halide), hydrocarbyl, hydrocarboxy, alkyl, and/or alkoxy substituents, among others. The non-hydrogen substituents of any aspect or any embodiment calling for a substituent can be a halide, a $C_1$ to $C_{10}$ hydrocarbyl group, or a $C_1$ to $C_{10}$ hydrocarboxy group; alternatively, a halide or a $C_1$ to $C_{10}$ hydrocarbyl group; alternatively, a halide or a $C_1$ to $C_{10}$ hydrocarboxy group; alternatively, a $C_1$ to $C_{10}$ hydrocarbyl group or a $C_1$ to $C_{10}$ hydrocarboxy group; alternatively, a halide; alternatively, a $C_1$ to $C_{10}$ hydrocarbyl group; or alternatively, a $C_1$ to $C_{10}$ hydrocarboxy group. In other embodiments, the non-hydrogen substituents of any aspect or any embodiment calling for a substituent can be a halide, a $C_1$ to $C_5$ hydrocarbyl group, or a $C_1$ to $C_5$ hydrocarboxy group; alternatively, a halide or a $C_1$ to $C_5$ hydrocarbyl group; alternatively, a halide or a $C_1$ to $C_5$ hydrocarboxy group; alternatively, a $C_1$ to $C_5$ hydrocarbyl group or a $C_1$ to $C_5$ hydrocarboxy group; alternatively, a halide; alternatively, a $C_1$ to $C_5$ hydrocarbyl group; or alternatively, a $C_1$ to $C_5$ hydrocarboxy group.

In an embodiment, any halide substituent of any aspect or any embodiment calling for a substituent can be a fluoride, chloride, bromide, or iodide; alternatively, a fluoride or chloride. In some embodiments, any halide substituent of any aspect or any embodiment calling for a substituent can be a fluoride; alternatively, a chloride; alternatively, a bromide; or alternatively, an iodide.

In an embodiment, any hydrocarbyl substituent can be an alkyl group, an aryl group, or an aralkyl group; alternatively, an alkyl group; alternatively, an aryl group; or alternatively, an aralkyl group. Generally, the alkyl substituent group(s), the aryl substituent group(s), and/or an aralkyl substituent group(s) can have the same number of carbon atoms of the hydrocarbyl substituent group disclosed herein. In an embodiment, any alkyl substituent of any aspect or any embodiment calling for a substituent can be a methyl group, an ethyl group, an n-propyl group, an isopropyl group, an n-butyl group, a sec-butyl group, an isobutyl group, a tert-butyl group, an n-pentyl group, a 2-pentyl group, a 3-pentyl group, a 2-methyl-1-butyl group, a tert-pentyl group, a 3-methyl-1-butyl group, a 3-methyl-2-butyl group, or a neo-pentyl group; alternatively, a methyl group, an ethyl group, an isopropyl group, a tert-butyl group, or a neo-pentyl group; alternatively, a methyl group; alternatively, an ethyl group; alternatively, an isopropyl group; alternatively, a tert-butyl group; or alternatively, a neo-pentyl group. In an embodiment, any aryl substituent of any aspect or any embodiment calling for a substituent can be phenyl group, a tolyl group, a xylyl group, or a 2,4,6-trimethylphenyl group; alternatively, a phenyl group; alternatively, a tolyl group; alternatively, a xylyl group; or alternatively, a 2,4,6-trimethylphenyl group. In an embodiment, any aralkyl substituent of any aspect or any embodiment calling for a substituent can be benzyl group or an ethylphenyl group (2-phenyleth-1-yl or 1-phenyleth-1-yl); alternatively, a benzyl group; alternatively, an ethylphenyl group; alternatively, a 2-phenyleth-1-yl group; or alternatively, a 1-phenyleth-1-yl group.

In an embodiment, any hydrocarboxy substituent of any aspect or any embodiment calling for a substituent can be an alkoxy group, an aryloxy group, or an aralkoxy group; alternatively, an alkoxy group; alternatively, an aryloxy group, or an aralkoxy group. Generally, the alkoxy substituent group(s), the aroxy substituent group(s), and/or an aralkoxy substituent group(s) can have the same number of carbon atoms of the hydrocarboxy substituent group disclosed herein. In an embodiment, any alkoxy substituent of any aspect or any embodiment calling for a substituent can be a methoxy group, an ethoxy group, an n-propoxy group, an isopropoxy group, an n-butoxy group, a sec-butoxy group, an isobutoxy group, a tert-butoxy group, an n-pentoxy group, a 2-pentoxy group, a 3-pentoxy group, a 2-methyl-1-butoxy group, a tert-pentoxy group, a 3-methyl-1-butoxy group, a 3-methyl-2-butoxy group, or a neo-pentoxy group; alternatively, a methoxy group, an ethoxy group, an isopropoxy group, a tert-butoxy group, or a neo-pentoxy group; alternatively, a methoxy group; alternatively, an ethoxy group; alternatively, an isopropoxy group; alternatively, a tert-butoxy group; or alternatively, a neo-pentoxy group. In an embodiment, any aryloxy substituent of any aspect or any embodiment calling for a substituent can be phenoxy group, a toloxy group, a xyloxy group, or a 2,4,6-trimethylphenoxy group; alternatively, a phenoxy group; alternatively, a toloxy group; alternatively, a xyloxy group; or alternatively, a 2,4,6-trimethylphenoxy group. In an embodiment, any aralkoxy substituent of any aspect or any embodiment calling for a substituent can be benzoxy group.

The methods described herein can utilize one or more solvents. Non-limiting examples of solvents which can be utilized in aspects and/or embodiments of the present disclosure include without limitation hydrocarbons, halogenated hydrocarbons, ethers, thioethers, nitriles, amines, phosphines, phosphites, carbonates, esters, ketones, aldehydes, alcohols, or any combination thereof; alternatively, hydrocarbons, halogenated hydrocarbons, ethers, thioethers, nitriles, amines, phosphines, phosphites, or any combination thereof. In some aspects and/or embodiments, a method can call for a polar solvent; or alternatively, a non-polar solvent. Polar solvents which can be utilized include without limitation ethers, thioethers, nitriles, amines, phosphines, phosphites, carbonates, esters, ketones, aldehydes, alcohols, or any combination thereof; alternatively, ethers, thioethers, nitriles, amines, phosphines, phosphites, or any combination thereof alternatively, ethers; alternatively, thioethers; alternatively, nitriles; alternatively, amines; alternatively, phosphines; or alternatively, and phosphites. In some aspects and embodiments, a method can call for a non-polar solvent. Non-polar solvents include without limitation hydrocarbons, halogenated hydrocarbons, or any combination thereof; alternatively, a hydrocarbon; or alternatively, a halogenated hydrocarbon. In other aspects and/or embodiments, the various process steps, isolation steps, and/or purification steps in the process of making the transition metal carboxylate composition can utilize an aprotic solvent. Aprotic solvents which can be utilized in various aspects and/or embodiments of the present disclosure can include hydrocarbons, halogenated hydrocarbons, ethers, thioethers, esters, ketones, aldehydes, nitriles, and any combination thereof; alternatively, hydrocarbons, halogenated hydrocarbons, ethers, thioethers, nitriles, and any combination thereof; alternatively, hydrocarbons, halogenated hydrocarbons, any combination thereof; alternatively, ethers, esters, ketones, aldehydes, nitriles, and any combination thereof; alternatively, ethers, nitriles, and thereof; alternatively, hydrocarbons; alternatively, halogenated hydrocarbons; alternatively, ethers; alternatively, esters; alternatively, thioethers, alternatively, ketones; alternatively, aldehydes; or alternatively, nitriles. In some aspects and/or embodiments, the various process steps, isolation steps, and/or purification steps in the process of making the transition metal carboxylate composition can utilize an aprotic polar solvent. Aprotic polar solvents which can be utilized include ethers, thioethers, esters, ketones, aldehydes, nitriles, and any combination thereof; alternatively, ethers, thioethers, nitriles and any combination thereof; alternatively, esters, ketones, aldehydes and mixtures thereof; alternatively, ethers; alternatively, thioethers, alternatively, esters; alternatively, ketones; alternatively, aldehydes; or alternatively, nitriles. In some aspects, the aprotic polar solvent can be, comprise, or consist essentially of, any neutral ligand (or combination of neutral ligands) disclosed herein. In some aspects and/or embodiments, the various process steps, isolation steps, and/or purification steps in the process of making the transition metal carboxylate composition can utilize a non-polar solvent. Non-polar solvents which can be utilized in various aspects and/or embodiments of the present disclosure can include hydrocarbons, halogenated hydrocarbons, or any combination thereof; alternatively, hydrocarbons; or alternatively, a halogenated hydrocarbons. In other aspects and/or embodiments, the various process steps, isolation steps, and/or purification steps in the process of making the transition metal carboxylate composition can utilize a coordinating solvent. Coordinating solvents which can be utilized in various aspects and/or embodiments of the present disclosure can include ethers, esters, ketones, aldehydes, nitriles, or mixtures thereof; alternatively, ethers, nitriles, or mixtures thereof; alternatively, ethers; alternatively, esters; alternatively, ketones; alternatively, aldehydes; or alternatively, nitriles. In some aspects, the coordinating solvent can be, comprise, or consist essentially of, any neutral ligand (or combination of neutral ligands) disclosed herein. In other aspects and/or embodiments, the various process steps, isolation steps, and/or purification steps in the process of making the transition metal carboxylate composition can utilize a non-coordinating solvent. Non-coordinating solvents which can be utilized in various aspects and/or embodiments of the present disclosure can include hydrocarbons, halogenated hydrocarbons, or mixture thereof; alternatively, hydrocarbons; alternatively, halogenated hydrocarbons.

Ethers, thioethers, nitriles, amines, phosphines, and phosphites are described herein. These ethers, nitriles, amines, phosphines, and phosphites can be utilized without limitation as a member of a particular solvent class described herein.

Hydrocarbons and halogenated hydrocarbons which can include aliphatic hydrocarbons, aromatic hydrocarbons, petroleum distillates, halogenated aliphatic hydrocarbons, halogenated aromatic hydrocarbons, or combinations thereof; or alternatively aliphatic hydrocarbons, aromatic hydrocarbons, halogenated aliphatic hydrocarbons, halogenated aromatic hydrocarbons, and combinations thereof. In some embodiments, hydrocarbons and halogenated hydrocarbons can include aliphatic hydrocarbons; alternatively, aromatic hydrocarbons; alternatively, halogenated aliphatic hydrocarbons; or alternatively, halogenated aromatic hydrocarbons.

Aliphatic hydrocarbons which can be useful as a general solvent, a non-polar solvent, and/or a non-coordinating solvent include $C_4$ to $C_{20}$ aliphatic hydrocarbons; alternatively $C_4$ to $C_{15}$ aliphatic hydrocarbons; or alternatively, $C_5$ to $C_{10}$ aliphatic hydrocarbons. Aliphatic hydrocarbons can be cyclic or acyclic and/or can be linear or branched, unless otherwise specified. Non-limiting examples of suitable acyclic aliphatic hydrocarbon solvents which can be utilized as a general solvent, a non-polar solvent, and/or a non-coordinating solvent include iso-butane, n-butane, butane (n-butane or a mixture of linear and branched $C_4$ acyclic aliphatic hydrocarbons), pentane (n-pentane or a mixture of linear and branched $C_5$ acyclic aliphatic hydrocarbons), hexane (n-hexane or mixture of linear and branched $C_6$ acyclic aliphatic hydrocarbons), heptane (n-heptane or mixture of linear and branched $C_7$ acyclic aliphatic hydrocarbons), octane (n-octane or a mixture of linear and branched $C_8$ acyclic aliphatic hydrocarbons), and any combination thereof; alternatively, iso-butane, n-butane, butane (n-butane or a mixture of linear and branched $C_4$ acyclic aliphatic hydrocarbons), pentane (n-pentane or a mixture of linear and branched $C_5$ acyclic aliphatic hydrocarbons), hexane (n-hexane or mixture of linear and branched $C_6$ acyclic aliphatic hydrocarbons), heptane (n-heptane or mixture of linear and branched $C_7$ acyclic aliphatic hydrocarbons), octane (n-octane or a mixture of linear and branched $C_8$ acyclic aliphatic hydrocarbons), and any combination thereof; alternatively, iso-butane, n-butane, butane (n-butane or a mixture of linear and branched $C_4$ acyclic aliphatic hydrocarbons), pentane (n-pentane or a mixture of linear and branched $C_5$ acyclic aliphatic hydrocarbons), hexane (n-hexane or mixture of linear and branched $C_6$ acyclic aliphatic hydrocarbons), heptane (n-heptane or mixture of linear and branched $C_7$ acyclic aliphatic hydrocarbons), octane (n-octane or a mixture of linear and branched $C_8$ acyclic aliphatic hydrocarbons), and any combination thereof; alternatively, iso-butane; alternatively, n-butane; alternatively, butane (n-butane or a mixture of linear and branched $C_4$ acyclic aliphatic hydrocarbons); alternatively, pentane (n-pentane or a mixture of linear and branched $C_5$ acyclic aliphatic hydrocarbons); alternatively, hexane (n-hexane or mixture of linear and branched $C_6$ acyclic aliphatic hydrocarbons); alternatively, heptane (n-heptane or mixture of linear and branched $C_7$ acyclic aliphatic hydrocarbons); or alternatively, octane (n-octane or a mixture of linear and branched $C_8$ acyclic aliphatic hydrocarbons). Non-limiting examples, of suitable cyclic aliphatic hydrocarbon solvents which can be utilized as the non-coordinating solvent, include cyclohexane, methyl cyclohexane, and any combination thereof; alternatively cyclohexane; or alternatively, methylcyclohexane.

Aromatic hydrocarbons which can be useful as a general solvent, a non-polar solvent, and/or a non-coordinating solvent include $C_6$ to $C_{20}$ aromatic hydrocarbons; or alternatively, $C_6$ to $C_{10}$ aromatic hydrocarbons. Non-limiting examples of suitable aromatic hydrocarbons which can be utilized as a general solvent, a non-polar solvent, and/or a non-coordinating solvent include benzene, toluene, xylene (including ortho-xylene, meta-xylene, para-xylene, or mixtures thereof), and ethylbenzene, or any combination thereof; alternatively, benzene; alternatively, toluene; alternatively, xylene (including ortho-xylene, meta-xylene, para-xylene or mixtures thereof); or alternatively, ethylbenzene.

Halogenated aliphatic hydrocarbons which can be utilized as a general solvent, a non-polar solvent, and/or a non-coordinating solvent can include $C_1$ to $C_{15}$ halogenated aliphatic hydrocarbons; alternatively, $C_1$ to $C_{10}$ halogenated aliphatic hydrocarbons; or alternatively, $C_1$ to $C_5$ halogenated aliphatic hydrocarbons. The halogenated aliphatic hydrocarbons can be cyclic or acyclic and/or can be linear or branched, unless otherwise specified. Non-limiting examples of suitable halogenated aliphatic hydrocarbons which can be utilized as a general solvent, a non-polar solvent, and/or a non-coordinating solvent can include methylene chloride, chloroform, carbon tetrachloride, dichloroethane, trichloroethane, or any combination thereof; alternatively, methylene chloride, chloroform, dichloroethane, trichloroethane, or any combinations thereof; alternatively, methylene chloride; alternatively, chloroform; alternatively, carbon tetrachloride; alternatively, dichloroethane; or alternatively, trichloroethane. Halogenated aromatic hydrocarbons which can be utilized as a general solvent, a non-polar solvent, and/or a non-coordinating solvent can include $C_6$ to $C_{20}$ halogenated aromatic hydrocarbons; or alternatively, $C_6$ to $C_{10}$ halogenated aromatic hydrocarbons. Non-limiting examples of suitable halogenated aromatic hydrocarbons which can be utilized as a general solvent, a non-polar solvent, and/or a non-coordinating solvent can include chlorobenzene, dichlorobenzene, or any combination thereof; alternatively chlorobenzene; or alternatively, dichlorobenzene.

Ethers, thioethers, carbonates, esters, ketones, aldehydes, or alcohols which can be useful as a solvent can be, comprise, or consist essentially of, $C_2$ to $C_{20}$ ethers, $C_2$ to $C_{20}$ thioethers, $C_2$ to $C_{20}$ carbonates, $C_2$ to $C_{20}$ esters, $C_2$ to $C_{20}$ ketones, $C_2$ to $C_{20}$ aldehydes, or $C_2$ to $C_{20}$ alcohols; alternatively, $C_2$ to $C_{20}$ ethers, $C_2$ to $C_{20}$ thioethers or $C_2$ to $C_{20}$ carbonates; alternatively, $C_2$ to $C_{20}$ ethers; alternatively, $C_2$ to $C_{20}$ thioethers; alternatively, $C_2$ to $C_{20}$ carbonates; alternatively, $C_2$ to $C_{20}$ esters; alternatively, $C_2$ to $C_{20}$ ketones; alternatively, $C_2$ to $C_{20}$ aldehydes; or alternatively, $C_2$ to $C_{20}$ alcohols. In some embodiments, a useful solvent can be, comprise, or consist essentially of, $C_2$ to $C_{10}$ ethers, $C_2$ to $C_{10}$ thioethers, $C_2$ to $C_{10}$ carbonates, $C_2$ to $C_{10}$ esters, $C_2$ to $C_{10}$ ketones, $C_2$ to $C_{10}$ aldehydes, or $C_2$ to $C_{10}$ alcohols; alternatively, $C_2$ to $C_{10}$ ethers, $C_2$ to $C_{10}$ thioethers, or $C_2$ to $C_{10}$ carbonates; alternatively, $C_2$ to $C_{20}$ ethers; alternatively, $C_2$ to $C_{10}$ thioethers; alternatively, $C_2$ to $C_{20}$ carbonates; alternatively, $C_2$ to $C_{20}$ esters; alternatively, $C_2$ to $C_{20}$ ketones; alternatively, $C_2$ to $C_{20}$ aldehydes; or alternatively, $C_2$ to $C_{20}$ alcohols. Suitable ether solvents can be cyclic or acyclic. Non-limiting examples of suitable ethers which can be useful as a solvent include dimethyl ether, diethyl ether, methyl ethyl ether, monoethers or diethers of glycols (e.g., dimethyl glycol ether), furan, substituted furans, dihydrofuran, substituted dihydrofurans, tetrahydrofuran (THF), substituted tetrahydrofurans, tetrahydropyran, substituted tetrahydropyrans, 1,3-dioxane, substituted 1,3-dioxanes, 1,4-dioxane, substituted 1,4-dioxanes, or mixtures thereof; alternatively, dimethyl ether, diethyl ether, methyl ethyl ether, monoethers or diethers of glycols (e.g., dimethyl glycol ether), or mixtures thereof; alternatively, furan, substituted furans, dihydrofuran, substituted dihydrofurans, tetrahydrofuran (THF), substituted tetrahydrofurans, tetrahydropyran, substituted tetrahydropyrans, 1,3-dioxane, substituted 1,3-dioxanes, 1,4-dioxane, substituted 1,4-dioxanes, or mixtures thereof; alternatively, dimethyl ether, diethyl ether, methyl ethyl ether, or mixtures thereof; alternatively, monoethers or diethers of glycols (e.g., dimethyl glycol ether); alternatively, tetrahydrofuran (THF), substituted tetrahydrofurans, tetrahydropyran, substituted tetrahydropyrans, 1,3-dioxane, substituted 1,3-dioxanes, 1,4-dioxane, substituted 1,4-dioxanes, or mixtures thereof; alternatively, tetrahydrofuran (THF), tetrahydropyran, 1,3-dioxane, 1,4-dioxane, or mixtures thereof; or alternatively, tetrahydrofuran. In an embodiment, each substituent of a substituted furan, substituted dihydrofuran, substituted tetrahydrofuran, substituted tetrahydropyran, substituted 1,3-dioxane, or substituted 1,4-dioxane, can be a $C_1$ to $C_5$ alkyl group. $C_1$ to $C_5$ alkyl substituent groups are disclosed herein and can be utilized without limitation of further describe the substituted tetrahydrofurans, substituted dihydrofurans, substituted furans, substituted 1,3-dioxanes, or substituted 1,4 dioxanes which can be utilized as the polar aprotic solvent. Non-limiting examples of suitable carbonates which can be utilized as a solvent include ethylene carbonate, propylene carbonate, diethyl carbonate, diethyl carbonate, glycerol carbonate, and combinations thereof. Non-limiting examples of suitable esters which can be utilized as a solvent include ethyl acetate, propyl acetate, butyl acetate, isobutyl isobutyrate, and combinations thereof. Non-limiting examples of suitable ketones which can be utilized as a solvent include acetone, ethyl methyl ketone, methyl isobutyl ketone, and combinations thereof. Non-limiting examples of suitable alcohols which can be utilized as a solvent can be, comprise, or consist essentially of, methanol, ethanol, propanol, isopropanol, n-butanol, isobutanol, pentanol, hexanol, heptanol, octanol, benzyl alcohol, phenol, cyclohexanol, and the like, or combinations thereof.

Nitriles which can be utilized as a solvent include $C_2$ to $C_{12}$ nitriles; alternatively, $C_2$ to $C_{10}$ nitriles; or alternatively, $C_2$ to $C_8$ nitriles. Generally, the nitriles which can be utilized as a solvent can be cyclic or acyclic, linear or branched, and/or aliphatic or aromatic. Non-limiting examples of nitriles which can be utilized as a solvent include, but are not limited to, acetonitrile, propionitrile, butyronitrile, benzonitrile, or any combination thereof; alternatively, acetonitrile, propionitrile, butyronitrile, or any combination thereof. In some embodiments, the solvent can be, comprise, or consist essentially of, acetonitrile.

In an aspect, the solvent in which the transition metal precursor and the Group 1 or Group 2 carboxylate are contacted, if utilized, can be, comprise, or consist essentially of, any neutral ligand described herein. In some embodiments wherein the transition metal precursor contains a neutral ligand, the solvent in which the transition metal precursor and the Group 1 or Group 2 carboxylate are contacted, if utilized, can be, comprise, or consist essentially of, any neutral ligand present in the transition metal precursor. In other embodiments, wherein the transition metal precursor contains a neutral ligand, the solvent in which the transition metal precursor and the Group 1 or Group 2 carboxylate are contacted, if utilized, can be different than any neutral ligand present in the transition metal precursor. Neutral ligands are described herein and these neutral ligands can be utilized without limitation as the solvent, if utilized, for contacting the transition metal precursor and the Group 1 or Group 2 carboxylate.

In a non-limiting embodiment, the polar aprotic solvent can be, comprise, or consist essentially of, monoethers or diethers of glycols (e.g., dimethyl glycol ether), furan, substituted furans, dihydrofuran, substituted dihydrofurans, tetrahydrofuran (THF), substituted tetrahydrofurans, tetrahydropyran, substituted tetrahydropyrans, 1,3-dioxane, substituted 1,3-dioxanes, 1,4-dioxane, substituted 1,4-dioxanes, or mixtures thereof. In an embodiment, each substituent of a substituted furan, substituted dihydrofuran, substituted tetrahydrofuran, substituted tetrahydropyran, substituted 1,3-dioxane, or substituted 1,4-dioxane, can be a $C_1$ to $C_5$ alkyl group. $C_1$ to $C_5$ alkyl substituent groups are disclosed herein and can be utilized without limitation of further describe the substituted tetrahydrofurans, substituted dihydrofurans, substituted furans, substituted 1,3-dioxanes, or substituted 1,4 dioxanes which can be utilized as the polar aprotic solvent. In an embodiment, the polar aprotic solvent can be, comprise, or consist essentially of, tetrahydrofuran (THF), furan, 2-methyltetrahydrofuran, 3-methyltetrahydrofuran, dihydrofuran, pyran, tetrahydropyran, 2,3-dihydropyran, 1,3-dioxane, 1,4-dioxane, morpholine, N-methylmorpholine, dimethyl ether, diethyl ether, methyl ethyl ether, methyl phenyl ether, methyl t-butyl ether, diisopropyl ether, di-n-butyl ether, 1,2-dimethoxyethane, bis(2-methoxyethyl) ether, or any combination thereof. In some embodiments, the polar aprotic solvent can be, comprise, or consist essentially of, tetrahydrofuran (THF), furan, 2-methyltetrahydrofuran, 3-methyltetrahydrofuran, dihydrofuran, pyran, tetrahydropyran, 2,3-dihydropyran, 1,3-dioxane, 1,4-dioxane, dimethyl ether, diethyl ether, methyl ethyl ether, methyl phenyl ether, methyl t-butyl ether, diisopropyl ether, di-n-butyl ether, 1,2-dimethoxyethane, bis(2-methoxyethyl)ether, or any combination thereof; alternatively, tetrahydrofuran (THF), furan, 2-methyltetrahydrofuran, 3-methyltetrahydrofuran, dihydrofuran, pyran, tetrahydropyran, 2,3-dihydropyran, 1,3-dioxane, 1,4-dioxane, or any combination thereof; alternatively, dimethyl ether, diethyl ether, methyl ethyl ether, methyl phenyl ether, methyl t-butyl ether, diisopropyl ether, di-n-butyl ether, 1,2-dimethoxyethane, bis(2-methoxyethyl)ether, or any combination thereof. In other embodiments, the polar aprotic solvent can be, comprise, or consist essentially of, tetrahydrofuran (THF), 2-methyltetrahydrofuran, 3-methyltetrahydrofuran, tetrahydropyran, 1,3-dioxane, 1,4-dioxane, or any combination thereof. In other embodiments, the polar aprotic solvent can be, comprise, or consist essentially of, tetrahydrofuran (THF).

Similarly, examples of suitable nitriles that can be utilized as the polar aprotic solvent include, but are not limited to, a $C_2$ to $C_{20}$ alkyl nitrile, or a $C_7$ to $C_{20}$ aryl nitrile or any combination thereof. Further in this aspect and in any embodiment, suitable nitriles which can be utilized as the coordinating first solvent include $C_2$ to $C_{12}$ nitriles; alternatively, $C_2$ to $C_{10}$ nitriles; or alternatively, $C_2$ to $C_8$ nitriles. Suitable nitrile solvents which can be utilized as the coordinating first solvent can be cyclic or acyclic, linear or branched, aliphatic or aromatic. Non-limiting examples of suitable nitriles which can be useful as a polar aprotic first solvent include, but are not limited to, acetonitrile, propionitrile, butyronitrile, benzonitrile, or any combination thereof; alternatively, acetonitrile, propionitrile, butyronitrile, or any combination thereof. In some embodiments, the solvent can be, comprise, or consist essentially of, acetonitrile.

In a further aspect, thioethers that can be utilized as a solvent can be, comprise, or consist essentially of, a $C_2$ to $C_{20}$ dialkyl thioether, a $C_2$ to $C_{20}$ dialkyl thioether, a $C_4$ to $C_5$ cyclic thioether, or any combination thereof. In some embodiments, a thioether which can be utilized as a solvent can be, comprise, or consist essentially of, thiophene, 2-methylthiophene, 3-methylthiophene, tetrahydrothiophene, or any combination thereof.

For the purpose of any U.S. national stage filing from this application, all publications and patents mentioned in this disclosure are incorporated herein by reference in their entireties, for the purpose of describing and disclosing the constructs and methodologies described in those publications, which might be used in connection with the methods of this disclosure. Any publications and patents discussed above and throughout the text are provided solely for their disclosure prior to the filing date of the present application. Nothing herein is to be construed as an admission that the inventors are not entitled to antedate such disclosure by virtue of prior invention.

Unless indicated otherwise, when a range of any type is disclosed or claimed, for example a range of molar ratios, temperatures, and the like, it is intended to disclose or claim individually each possible number that such a range could reasonably encompass, including any sub-ranges encompassed therein. When describing a range of measurements such as molar ratios, every possible number that such a range could reasonably encompass can, for example, refer to values within the range with one significant digit more than is present in the end points of a range. In this example, a molar ratio between 1.03:1 and 1.12:1 includes individually molar ratios of 1.03:1, 1.04:1, 1.05:1, 1.06:1, 1.07:1, 1.08:1, 1.09:1, 1.10:1, 1.11:1, and 1.12:1. Applicants' intent is that these two methods of describing the range are interchangeable. Moreover, when a range of values is disclosed or claimed, which Applicants intend to reflect individually each possible number that such a range could reasonably encompass, Applicants also intend for the disclosure of a range to reflect, and be interchangeable with, disclosing any and all sub-ranges and combinations of sub-ranges encompassed therein. When describing a range in which the end points of the range have different numbers of significant digits, for example, a molar ratio from 1:1 to 1.2:1, every possible number that such a range could reasonably encompass can, for example, refer to values within the range with one significant digit more than is present in the end point of a range having the greatest number of significant digits, in this case 1.2:1. In this example, a molar ratio from 1:1 to 1.2:1 includes individually molar ratios of 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, and 1.20, all relative to 1, and any and all sub-ranges and combinations of sub-ranges encompassed therein. Accordingly, Applicants reserve the right to proviso out or exclude any individual members of any such group, including any sub-ranges or combinations of sub-ranges within the group, if for any reason Applicants choose to claim less than the full measure of the disclosure, for example, to account for a reference that Applicants are unaware of at the time of the filing of the application.

In any application before the United States Patent and Trademark Office, the Abstract of this application is provided for the purpose of satisfying the requirements of 37 C.F.R. § 1.72 and the purpose stated in 37 C.F.R. § 1.72(b) "to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Moreover, any headings that can be employed herein are also not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

For any particular compound disclosed herein, the general structure presented is also intended to encompass all conformational isomers and stereoisomers that can arise from a particular set of substituents, unless indicated otherwise. Thus, the general structure encompasses all structural isomer (e.g., a reference to a propyl group includes n-propyl and iso-propyl, or e.g., a reference to diazole include 1,2-diazole and 1,3-diazole), enantiomers, diastereomers, and other optical isomers whether in enantiomeric or racemic forms, as well as mixtures of stereoisomers, as the context permits or requires, unless specifically indicated otherwise. For any particular formula that is presented, any general formula presented also encompasses all conformational isomers, regioisomers, and stereoisomers that can arise from a particular set of substituents. Moreover and unless otherwise specified, the disclosure of a general compound or structure that can encompass more than one regioisomer is intended to encompass all possible regioisomers within such a general disclosure. For example, by the disclosure of L can be, comprise, or consist essentially of, diazepine, a diazepine, or diazepines, it is intended to reflect that L can be, comprise, or consist essentially of, 1,2-diazepine, 1,3-diazepine, or 1,4-diazepine.

The present disclosure is further illustrated by the following examples, which are not to be construed in any way as imposing limitations upon the scope thereof. On the contrary, it is to be clearly understood that resort can be had to various other aspects, embodiments, modifications, and equivalents thereof which, after reading the description herein, can suggest themselves to one of ordinary skill in the art without departing from the spirit of the present invention or the scope of the appended claims.

The data and descriptions provided in the following examples are given to show particular aspects and embodiments of the compounds, catalyst systems, and olefin oligomerization and/or olefin polymerization methods disclosed, and to demonstrate a number of the practices and advantages thereof. The examples are given as a more detailed demonstration of some of the aspects and embodiments described herein and are not intended to limit the disclosure or claims in any manner.

EXAMPLES

Preparation and Analysis of Chromium(III) 2-Ethylhexanoate Compositions

Unless specified otherwise, all reactions were performed under an inert and at least substantially dry atmosphere. All glassware was dried in an oven at 100° C. for 4 hr and brought into an inert and at least substantially dry atmosphere glovebox (drybox) while warm.

The starting material $CrCl_3(THF)_3$ was purchased from Aldrich Chemical Company and dried further as described herein. The 2-ethylhexanoic acid was purchased from Aldrich and used without further purification. All solvents were purchased from Aldrich as anhydrous grade and were stored over freshly activated 5 Å molecular sieves.

Example 1

A round bottom flask (250 mL) was charged with a stir bar, sodium hydroxide (13.87 g, 0.347 mol) and methanol (200 mL) under ambient conditions. 2-Ethylhexanoic acid (50.00 g, 0.347 mol) was added dropwise to the stirred solution over 30 min. The solvent was then removed by rotary evaporation producing a white, tacky solid. This white solid was then heated at 185° C. and a pressure less that 25 ton for 18 hr, yielding anhydrous sodium 2-ethylhexanoate as a hard, white solid (97% isolated yield). Anhydrous sodium 2-ethylhexanoate is very hygroscopic and was handled under an inert and substantially dry atmosphere.

Example 2

Commercially available $CrCl_3(THF)_3$ obtained from Aldrich contained significant amounts of water; therefore, further drying was used to provide anhydrous $CrCl_3(THF)_3$ as follows. A round bottom flask (50 mL) was charged with a stir bar, $CrCl_3(THF)_3$ (8 g) and THF (25 mL). Trimethylsilylchloride (8 mL) was added dropwise to the vigorously stirring solution. The mixture was allowed to stir overnight. The purple solid was collected by filtration, washed once with pentane (50 mL) and dried under dynamic vacuum to afford the product (93% yield). The anhydrous CrCl$_3$(THF)$_3$ was a fine, pink-purple powder, while the damp material is a darker purple, clumpy solid.

Example 3

Figure 9:
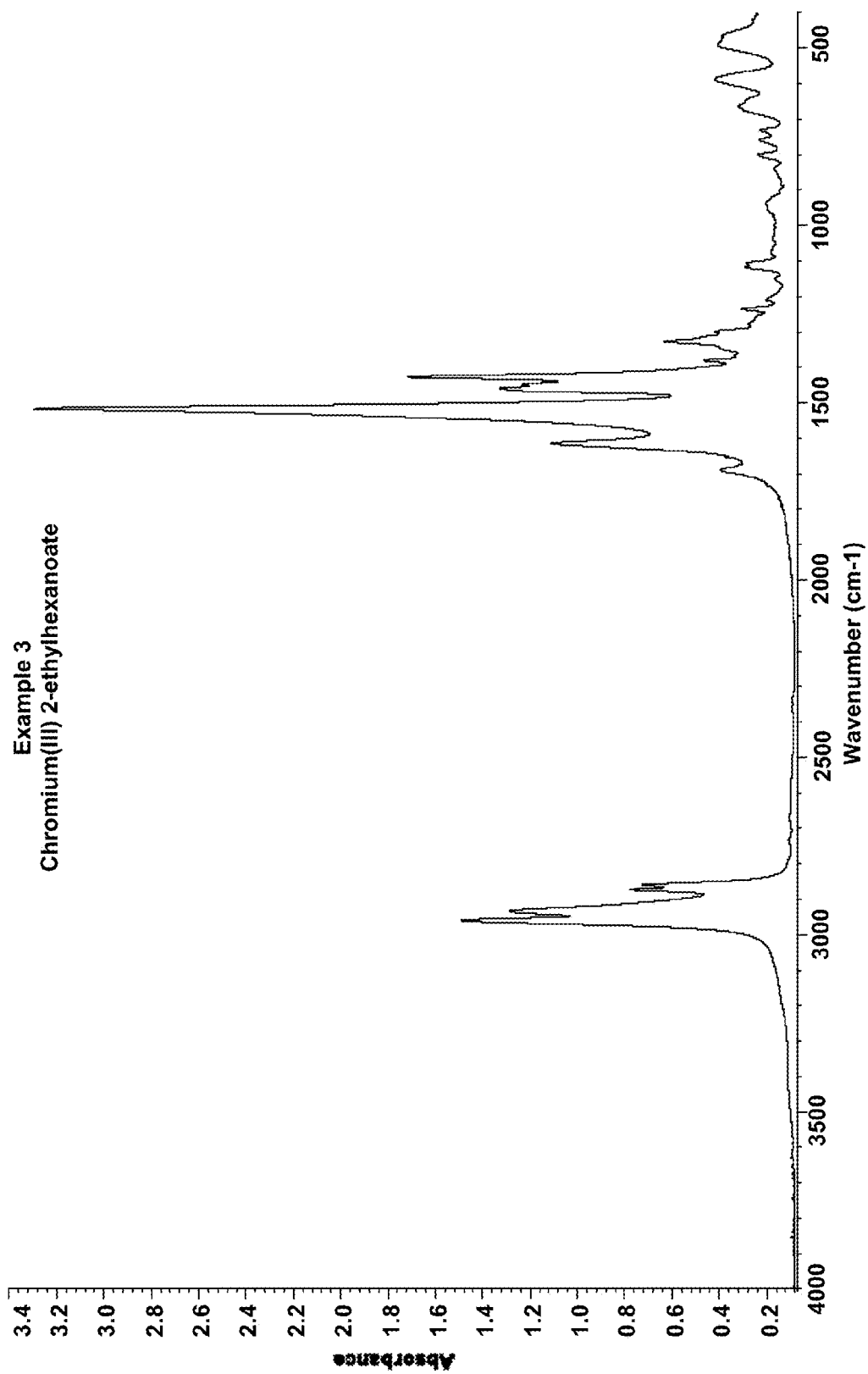
FIG. 9 provides an IR spectrum for a chromium(III) 2-ethylhexanoate produced according to the methods disclosed herein wherein the sodium 2-ethylhexanoate to CrCl$_3$(THF)$_3$ molar ratio was approximately 3:1.
Figure 10:
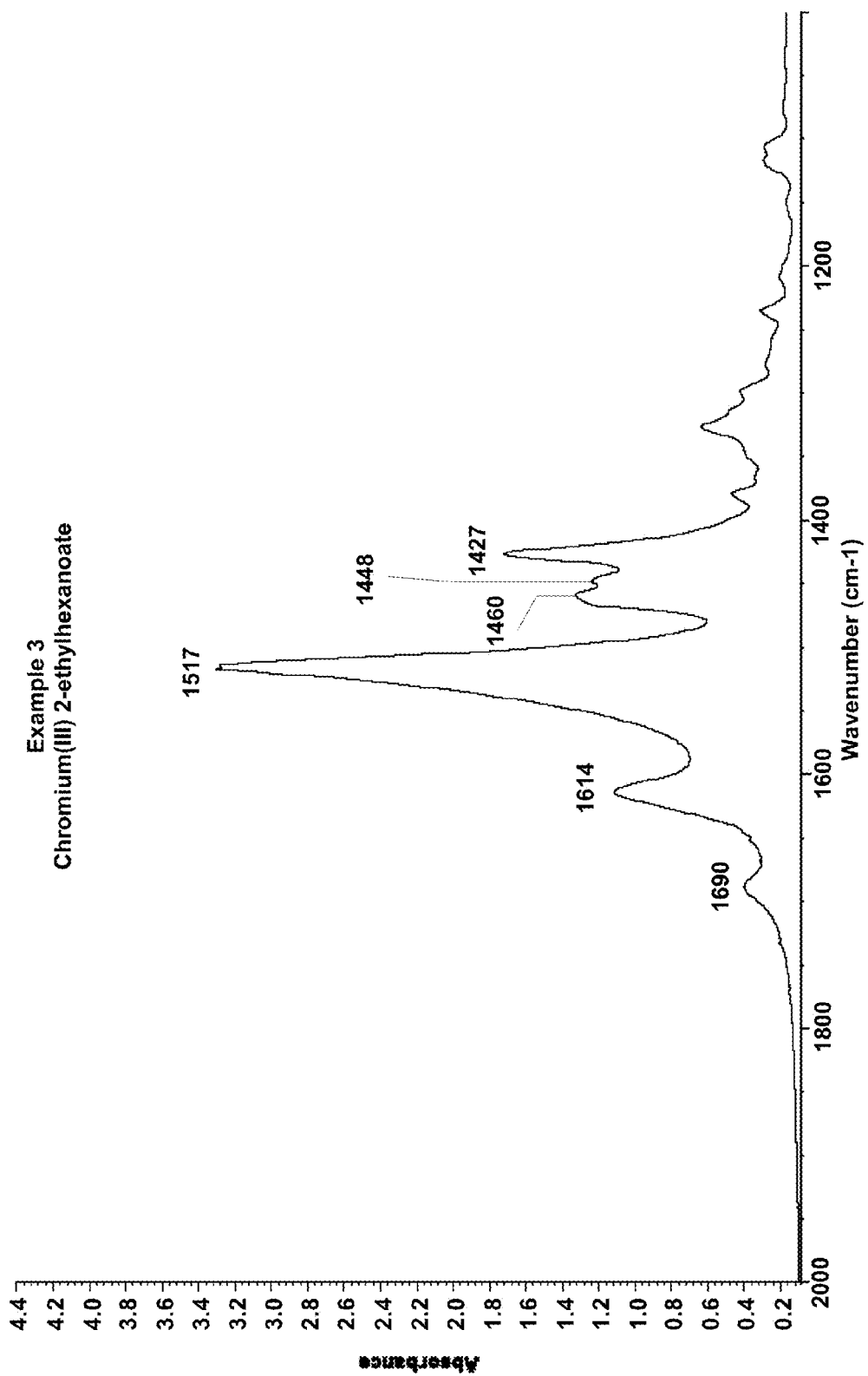
FIG. 10 provides an expanded section, 2000 cm$^{-1}$ to 1000 cm$^{-1}$, of the IR spectrum for a chromium(III) 2-ethylhexanoate produced according to the methods disclosed herein wherein the sodium 2-ethylhexanoate to CrCl$_3$(THF)$_3$ molar ratio was approximately 3:1.

A round bottom flask (1 L) was charged with CrCl$_3$(THF)$_3$ (21.01 g, 0.0561 mol), anhydrous sodium 2-ethylhexanoate (27.99 g, 0.168 mol) and THF (250 mL). The reaction was allowed to stir at 23° C. for 96 hr, and the solvent was removed to yield a green tar-like material. The solid was heated at 30° C. under vacuum for 2 hr then extracted into pentane (600 mL) and filtered through Celite® filter aid. The solution was very viscous making it difficult to filter. A large amount of green solid remained undissolved after filtration. The solvent was removed producing a green film (5.1 g). FIG. 9 provides an IR spectrum for the chromium(III) 2-ethylhexanoate produced using a sodium 2-ethyl hexanoate to CrCl$_3$(THF)$_3$ molar ratio of approximately 3. FIG. 10 provides an expanded section, 2000 cm$^{-1}$ to 1000 cm$^{-1}$, of the IR spectrum for the chromium(III) 2-ethylhexanoate produced using the sodium 2-ethyl hexanoate to CrCl$_3$(THF)$_3$ molar ratio of approximately 3. The infrared peak height and various infrared peak height ratios are provide in Table 1.

Example 4

Figure 11:
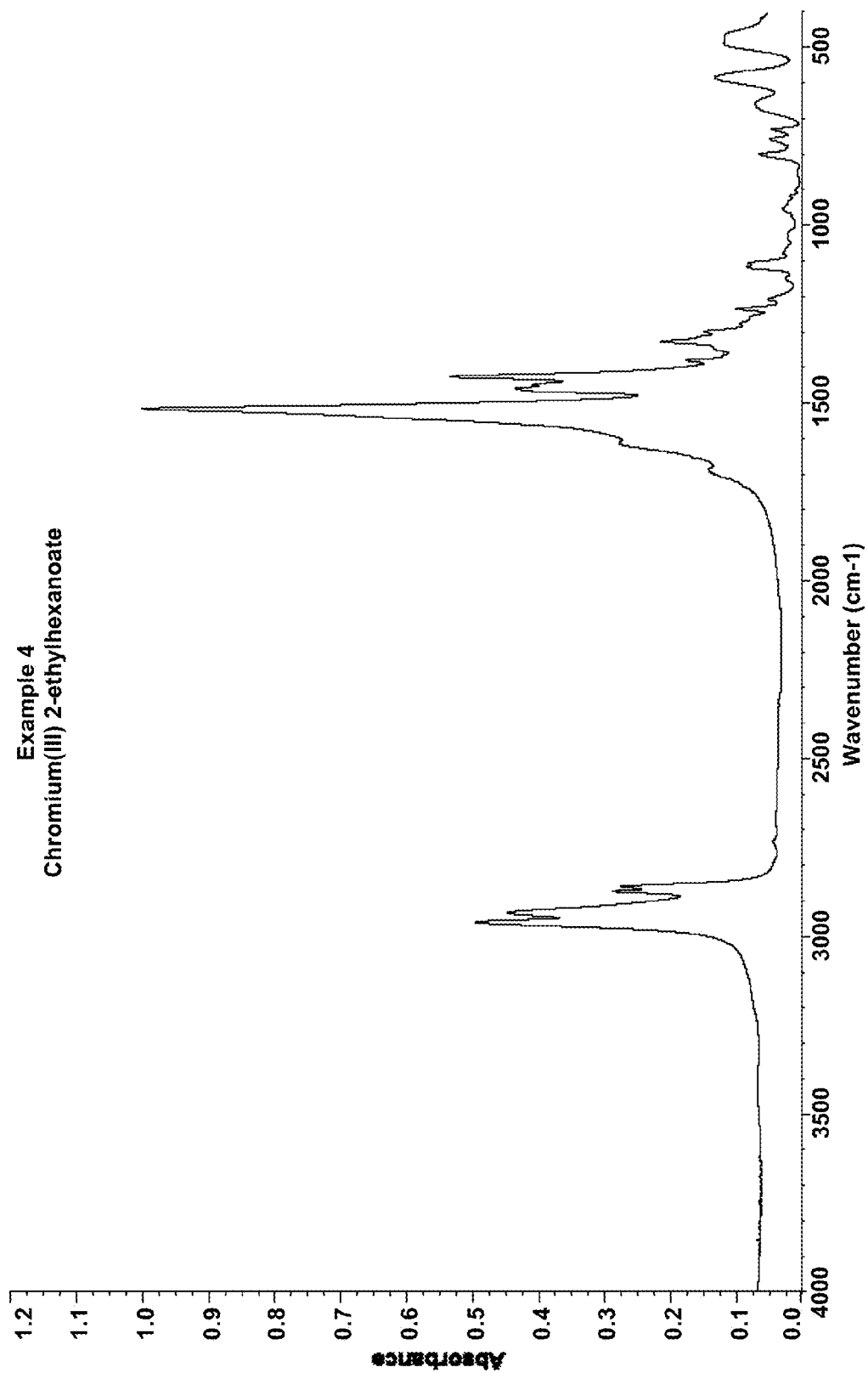
FIG. 11 provides an IR spectrum for a chromium(III) 2-ethylhexanoate produced according to the methods disclosed herein wherein the sodium 2-ethylhexanoate to CrCl$_3$(THF)$_3$ molar ratio was approximately 3.1:1.
Figure 12:
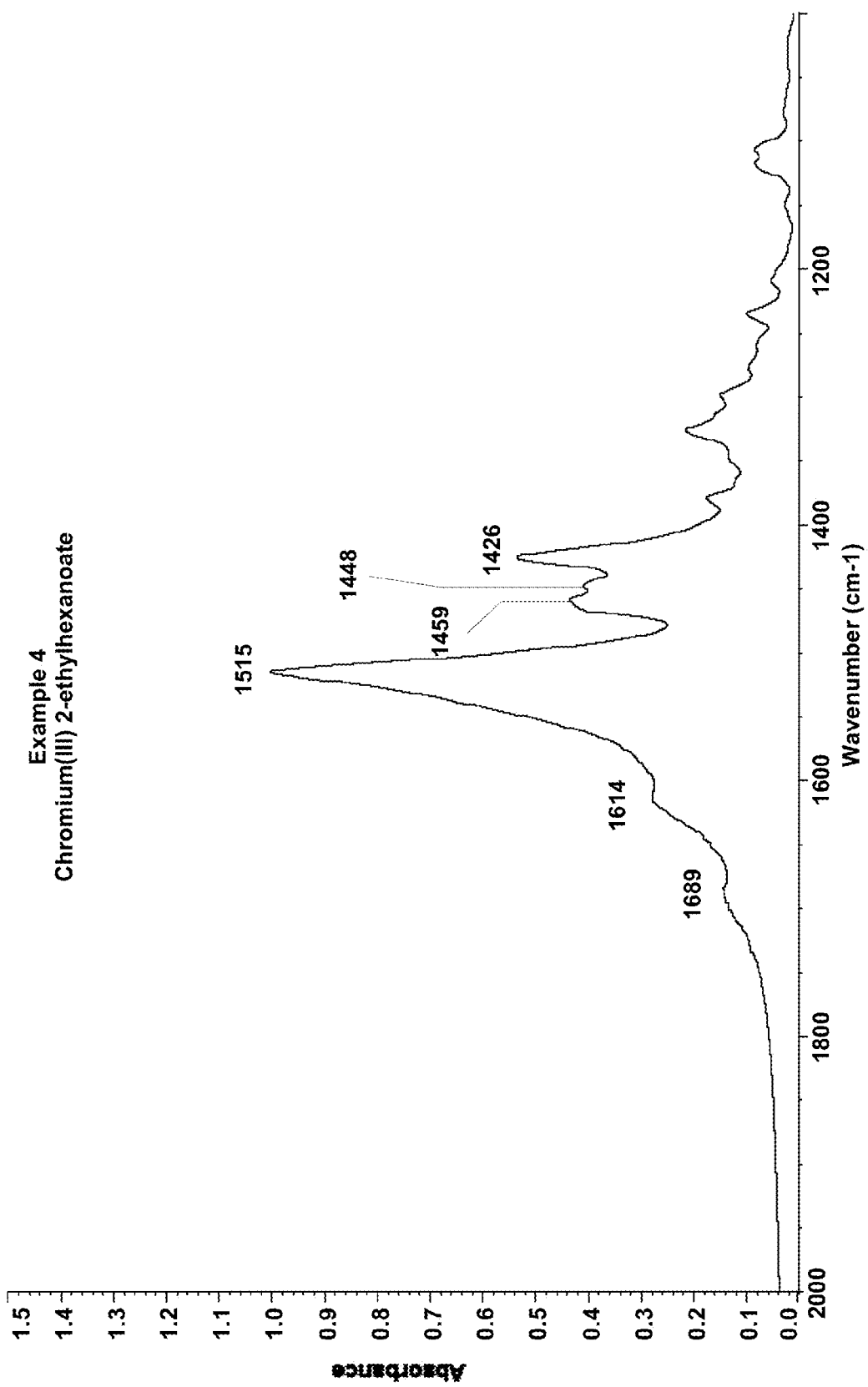
FIG. 12 provides an expanded section, 2000 cm$^{-1}$ to 1000 cm$^{-1}$, of the IR spectrum for a chromium(III) 2-ethylhexanoate produced according to the methods disclosed herein wherein the sodium 2-ethylhexanoate to CrCl$_3$(THF)$_3$ molar ratio was approximately 3.1.

A round bottom flask (500 mL) was charged with CrCl$_3$(THF)$_3$ (7.27 g, 0.0194 mol) and THF (100 mL). A solution of anhydrous sodium 2-ethylhexanoate (10.00 g, 0.0602 mol) in THF (60 mL) was added to the heterogeneous CrCl$_3$(THF)$_3$ solution while stirring. The reaction mixture was allowed to stir at 25° C. for 24 hr, after which time the solvent was removed to yield a green tacky solid. This green solid was then heated at 35° C. under vacuum for 2 hr, after which the product was extracted into cyclohexane (400 mL) and filtered through Celite® filter aid. The solvent was removed from the filtrate under vacuum producing a green tacky solid (7.1 g). FIG. 11 provides an IR spectrum for the chromium(III) 2-ethylhexanoate produced using the sodium 2-ethyl hexanoate to CrCl$_3$(THF)$_3$ molar ratio of approximately 3.1. FIG. 12 provides an expanded section, 2000 cm$^{-1}$ to 1000 cm$^{-1}$, of the IR spectrum for the chromium(III) 2-ethylhexanoate produced using the sodium 2-ethyl hexanoate to CrCl$_3$(THF)$_3$ molar ratio of approximately 3.1. The infrared peak height and various infrared peak height ratios are provide in Table 1.

Example 5

Figure 13:
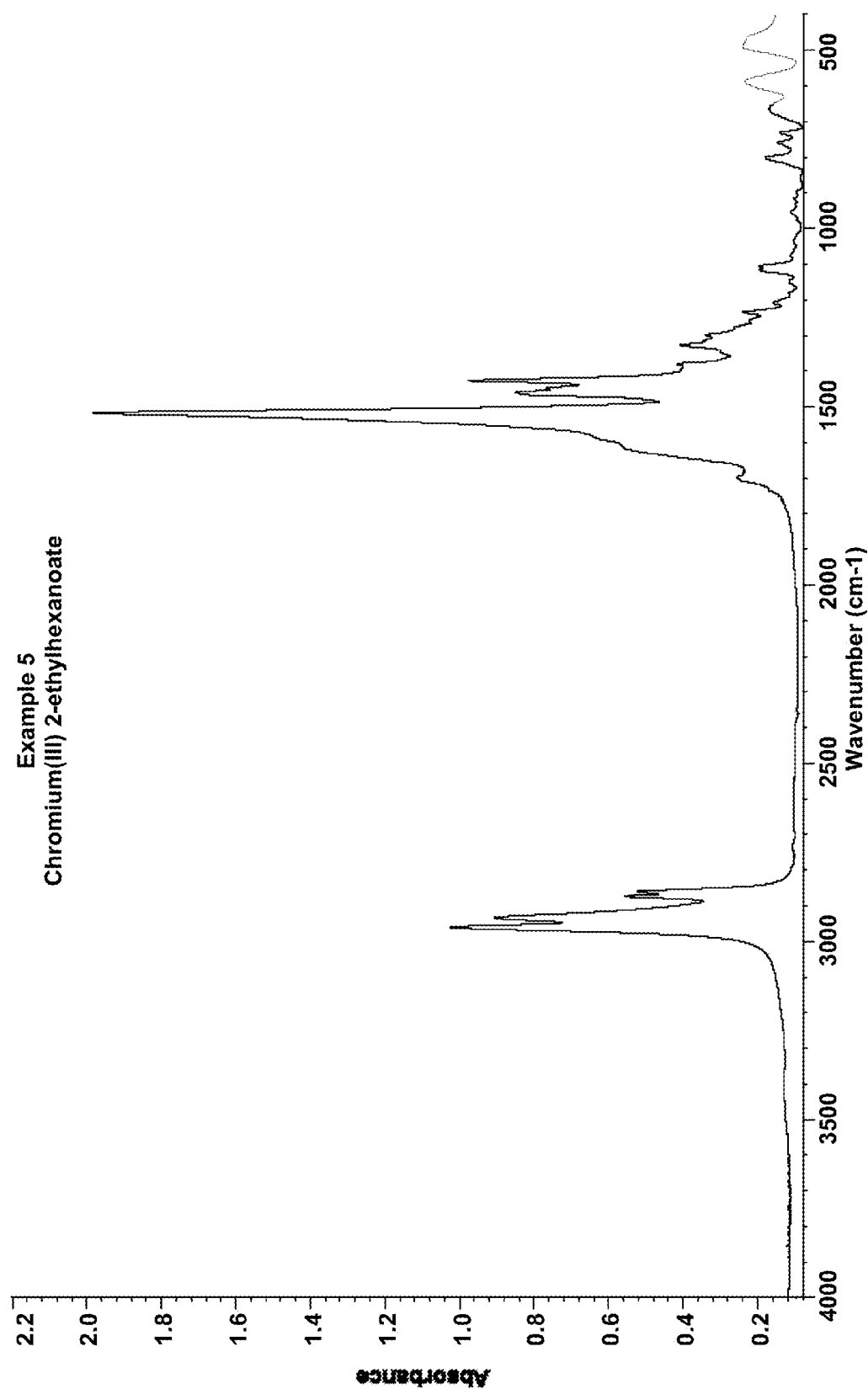
FIG. 13 provides an IR spectrum for chromium(III) 2-ethylhexanoate produced according to the methods disclosed herein wherein the sodium 2-ethylhexanoate to CrCl$_3$(THF)$_3$ molar ratio was approximately 3.3:1.
Figure 14:
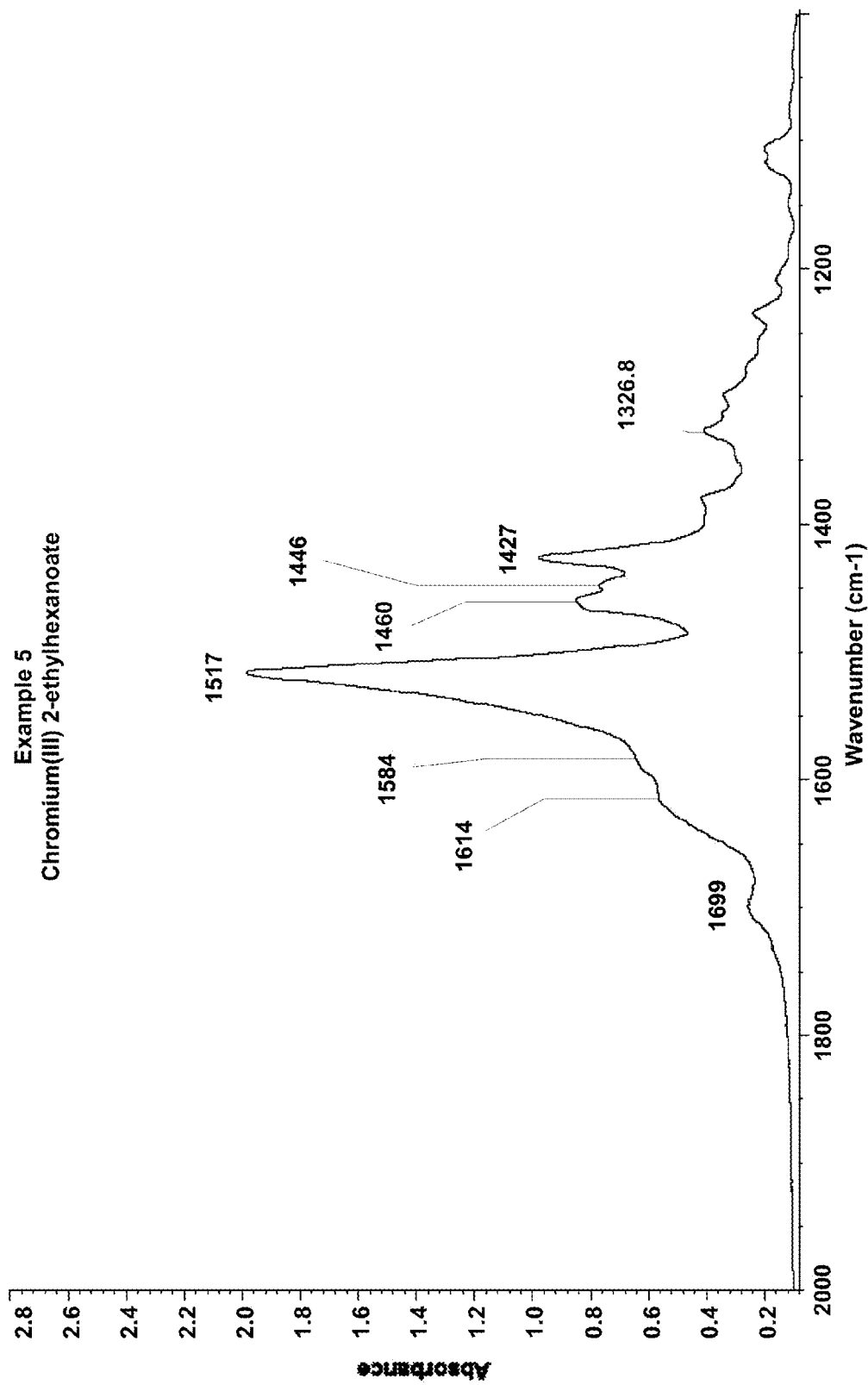
FIG. 14 provides an expanded section, 2000 cm$^{-1}$ to 1000 cm$^{-1}$, of the IR spectrum for a chromium(III) 2-ethylhexanoate produced according to the methods disclosed herein wherein the sodium 2-ethylhexanoate to CrCl$_3$(THF)$_3$ molar ratio was approximately 3.3:1.

A round bottom flask (500 mL) was charged with CrCl$_3$(THF)$_3$ (20.10 g, 0.0537 mol). A solution of anhydrous sodium 2-ethylhexanoate (29.42 g, 0.177 mol) in THF (250 mL) was added to the solid CrCl$_3$(THF)$_3$ while stirring. The reaction mixture was allowed to stir at 23° C. for 72 hr, after which time the solvent was removed to yield a green tacky solid. This green solid was than heated at 30° C. under vacuum for 2 hr, after which the product was extracted into pentane (500 mL) and filtered through Celite®. The solvent was removed from the filtrate under vacuum producing a green tacky solid (24.5 g). FIG. 13 provides an IR spectrum for the chromium(III) 2-ethylhexanoate produced using a sodium 2-ethylhexanoate to CrCl$_3$(THF)$_3$ molar ratio of approximately 3.3. FIG. 14 provides an expanded section, 2000 cm$^{-1}$ to 1000 cm$^{-1}$, of the IR spectrum for the chromium(III) 2-ethylhexanoate produced using the sodium 2-ethylhexanoate to CrCl$_3$(THF)$_3$ molar ratio of approximately 3.3. The infrared peak height and various infrared peak height ratios are provide in Table 1.

Example 6

Sodium Removal

Method A—Me$_3$SiCl method. A 20 mL vial was charged with the product of EXAMPLE 5 (0.373 g, approximately 0.68 mmol) and 10 mL of cyclohexane. The vial was then shaken vigorously to dissolve the chromium complex, resulting in a viscous solution. Me$_3$SiCl (0.030 g, 0.28 mmol) was then added to the solution and a white precipitate formed immediately. The reaction mixture was allowed to stand overnight, over which time a green gel had formed that settled out, leaving behind a very light green solution.

Method B)—2-Ethylhexanoic acid method. A 20 mL vial was charged with CrCl$_3$(THF)$_3$ (1.00 g, 2.67 mmol), sodium 2-ethylhexanoate (1.340 g, 8.06 mmol), 2-ethylhexanoic acid (0.116 g, 0.80 mmol) and THF (15 mL). The mixture was stirred for 3 days, over which time a red-violet solution and a white solid formed. The solvent was removed under vacuum and the product was extracted with cyclohexane, filtered through Celite® filter aid, and dried under vacuum to produce a blue-green oil. ICP-OES: Cr, 11.85 wt. %; Na, 0.02 wt. %.

Figure 15:
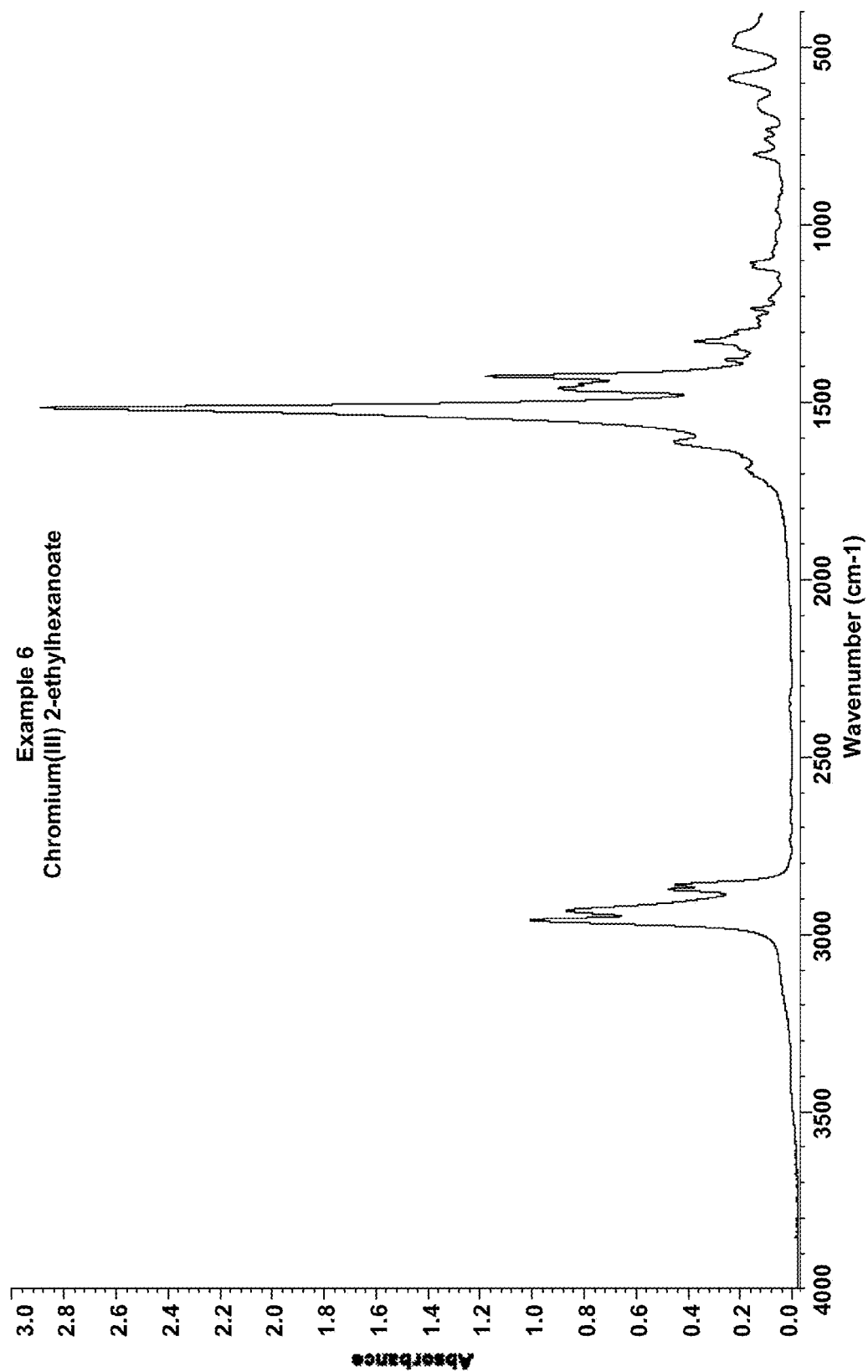
FIG. 15 provides an IR spectrum for the substantially sodium free chromium(III) 2-ethylhexanoate produced according to the methods disclosed herein wherein the sodium 2-ethylhexanoate to CrCl$_3$(THF)$_3$ molar ratio was approximately 3.3:1.
Figure 16:
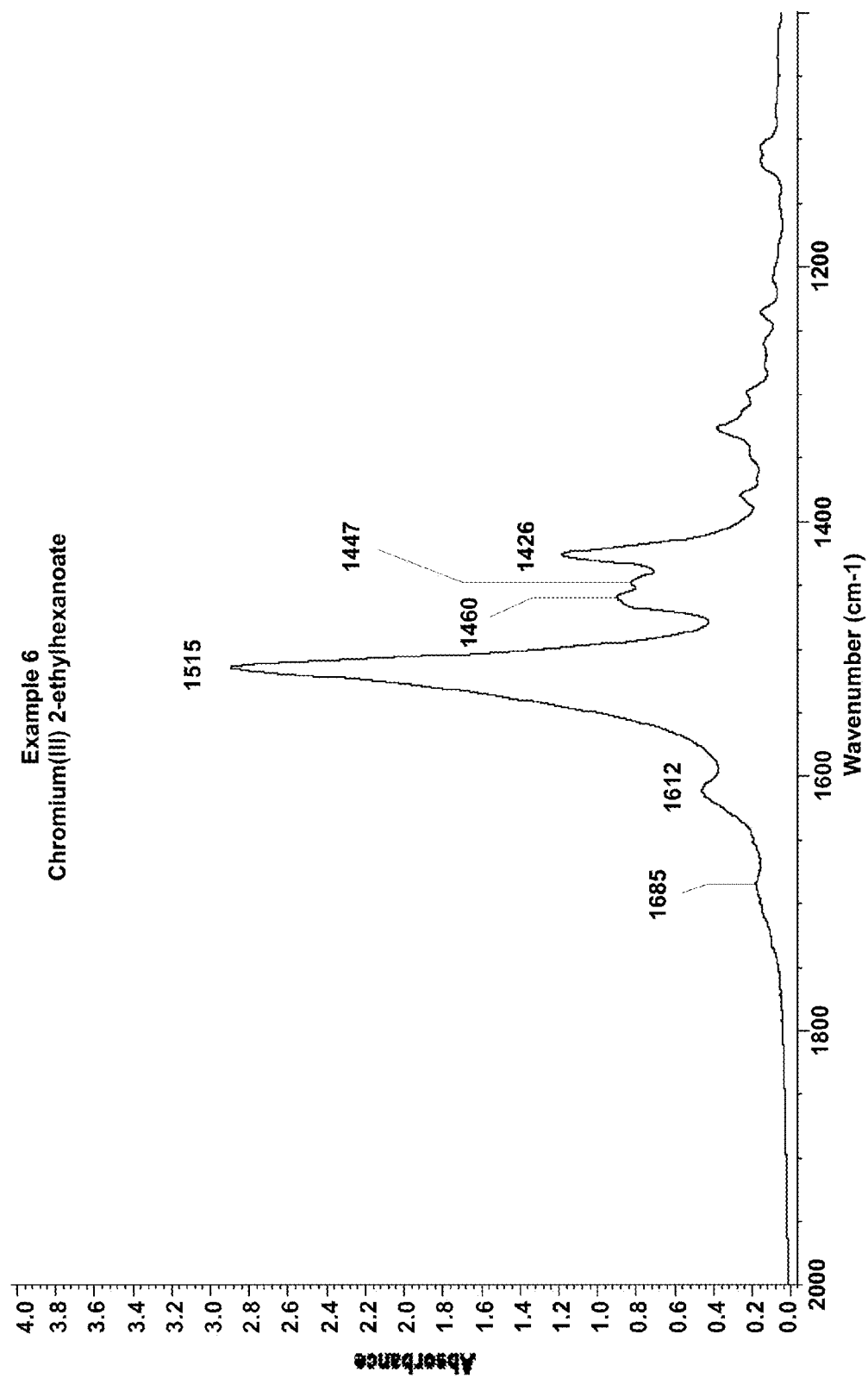
FIG. 16 provides an expanded section, 2000 cm$^{-1}$ to 1000 cm$^{-1}$, of the IR spectrum for the substantially sodium free chromium(III) 2-ethylhexanoate produced according to the methods disclosed herein wherein the sodium 2-ethylhexanoate to CrCl$_3$(THF)$_3$ molar ratio was approximately 3.3:1.

FIG. 15 provides an IR spectrum for the sodium-free chromium(III) 2-ethylhexanoate produced using Method A on the chromium(III) 2-ethylhexanoate produced using the sodium 2-ethylhexanoate to CrCl$_3$(THF)$_3$ molar ratio of approximately 3.3 (EXAMPLE 5). FIG. 16 provides an expanded section, 2000 cm$^{-1}$ to 1000 cm$^{-1}$, of the IR spectrum for the sodium free chromium(III) 2-ethylhexanoate produced using the sodium 2-ethylhexanoate to CrCl$_3$(THF)$_3$ molar ratio of approximately 3.3 (EXAMPLE 5). The infrared peak height and various infrared peak height ratios are provide in Table 1.

Example 7

Figure 17:
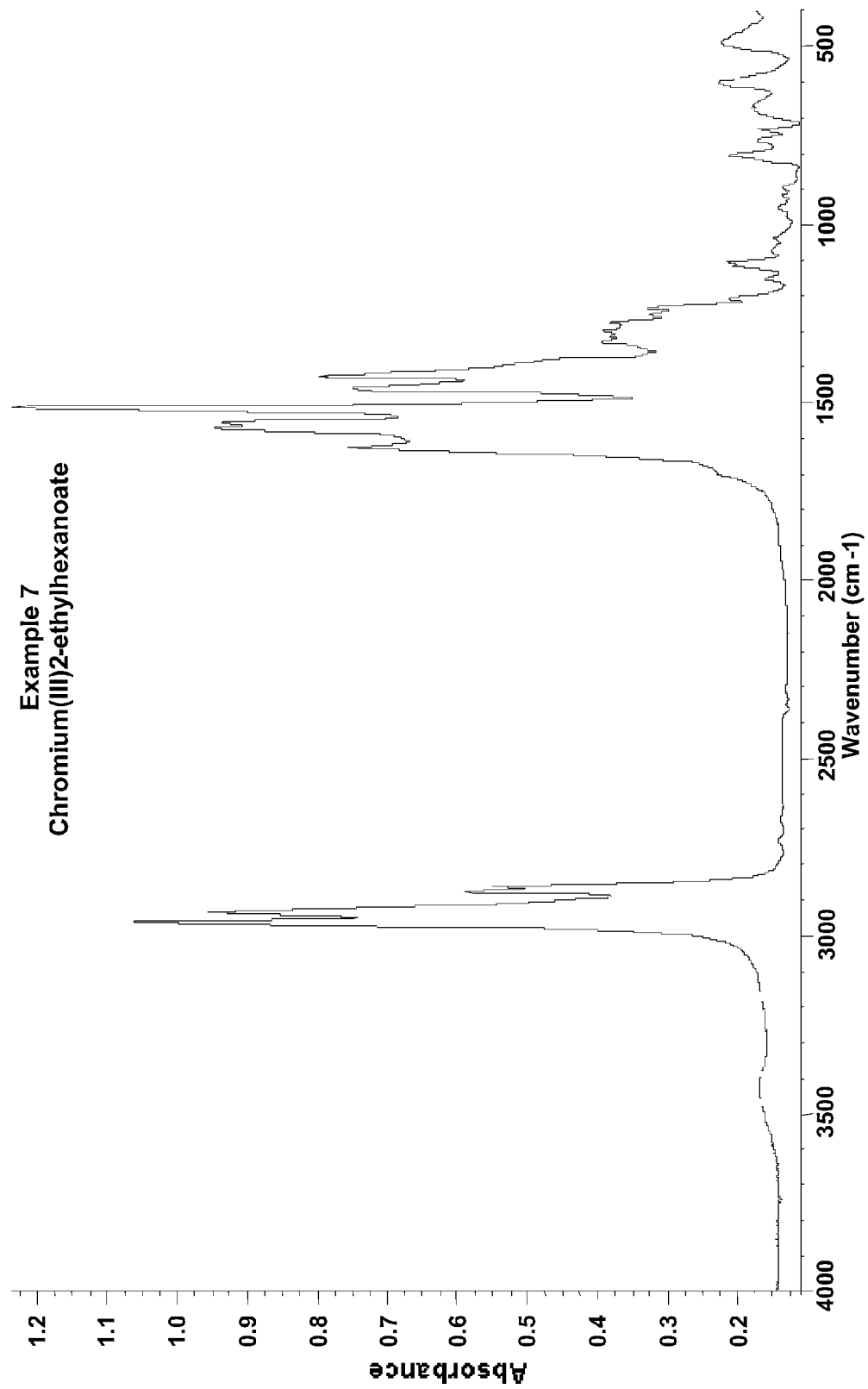
FIG. 17 provides an IR spectrum for the chromium(III) 2-ethylhexanoate produced according to the methods disclosed herein wherein the sodium 2-ethylhexanoate to CrCl$_3$ (THF)$_3$ molar ratio was approximately 4:1.
Figure 18:
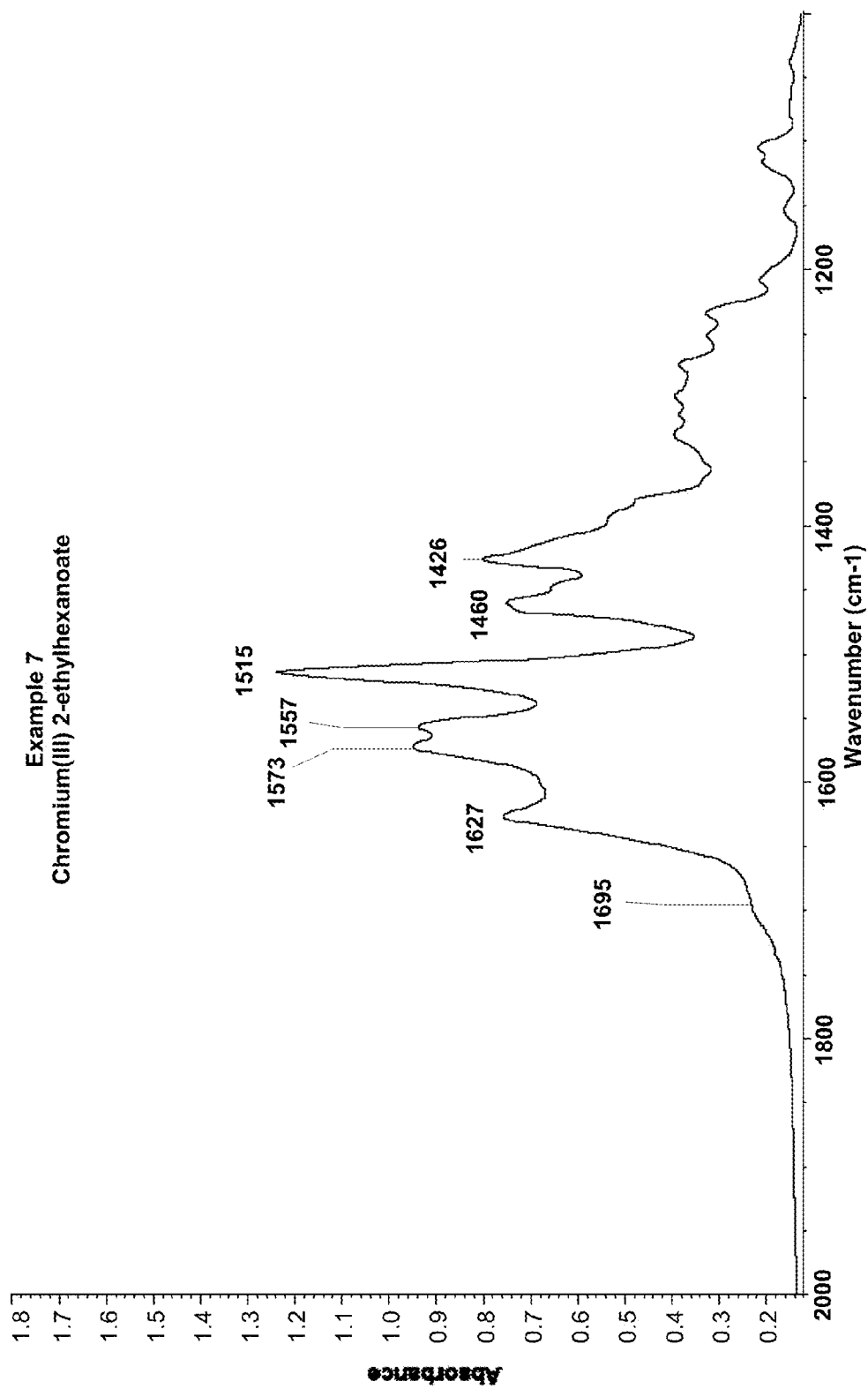
FIG. 18 provides an expanded section, 2000 cm$^{-1}$ to 1000 cm$^{-1}$, of the IR spectrum for the chromium(III) 2-ethylhexanoate produced according to the methods disclosed herein wherein the sodium 2-ethylhexanoate to CrCl$_3$ (THF)$_3$ molar ratio was approximately 4:1.

A round bottom flask (500 mL) was charged with CrCl$_3$(THF)$_3$ (19.00 g, 0.0507 mol). A solution of anhydrous sodium 2-ethylhexanoate (34.00 g, 0.205 mol) in THF (200 mL) was added to the solid CrCl$_3$(THF)$_3$ while stirring. This reaction mixture was allowed to stir at 23° C. for 60 hr, after which time the solvent was removed to yield a green foamy solid. This solid was heated at 30° C. under vacuum for 2 hr, then extracted into pentane (200 mL) and filtered through Celite® filter aid twice. The solvent was removed from the filtrate under vacuum to provide a green film (27.9 g). FIG. 17 provides an IR spectrum for this chromium(III) 2-ethylhexanoate produced using the sodium 2-ethylhexanoate to CrCl$_3$(THF)$_3$ molar ratio of approximately 4. FIG. 18 provides an expanded section, 2000 cm$^{-1}$ to 1000 cm$^{-1}$, of the IR spectrum for this chromium(III) 2-ethylhexanoate produced using the sodium 2-ethylhexanoate to CrCl$_3$(THF)$_3$ molar ratio of approximately 4. The infrared peak height and various infrared peak height ratios are provide in Table 1.

Infrared Analysis

Two commercially available chromium(III) 2-ethylhexanoate samples and the four chromium(III) 2-ethylhexanoate samples produced in Example 3-7 were analyzed using infrared analysis. The first commercially available chromium(III) 2-ethylhexanoate sample and the four chromium(III) 2-ethylhexanoate samples were prepared for IR analysis using the following procedure. In a drybox, 5 mg of the sample and 500 mg of anhydrous KBr were extensively ground together by mortar and pestle. A 10-mm KBr sample pellet was then formed by placing 100 mg of the extensively ground sample in a Spectra-Tech Econo-Press Kit. The sample was then transferred to the IR via an airtight receptacle. The IR spectrum was then acquired under a nitrogen purge. Background spectra using pure KBr pellets were collected prior to collecting the desired spectra.

The second commercially available chromium(III) 2-ethylhexanoate sample was manufactured using mineral spirits as the diluent. A couple of drops of the second commercially available chromium(III) 2-ethylhexanoate sample were then placed between two salt KBr plates and transferred to the IR via an airtight receptacle. The IR spectrum was then acquired under a nitrogen purge.

The IR spectra were obtained using a Nicolet® Magna-IR 560 Fourier Transform Infrared spectrometer with a Class 2, 1 mW HeNe laser source, KBr beamsplitter and DTGS detector. A typical experiment encompassed 64 scans (1-4 $cm^{-1}$ resolution) with the background scans collected after the sample scans. The spectra were analyzed using OMNIC® 7.4 software from Thermo Fisher Scientific Inc.

TABLE 1

Raw infrared baseline peak heights.

| Material | $1685 \pm 20\ cm^{-1}$ | $1616 \pm 20\ cm^{-1}$ | $1579 \pm 15\ cm^{-1}$ | $1549 \pm 15\ cm^{-1}$ | $1516 \pm 15\ cm^{-1}$ | $1460 \pm 10\ cm^{-1}$ | $1447 \pm 10\ cm^{-1}$ | $1429 \pm 15\ cm^{-1}$ |
|---|---|---|---|---|---|---|---|---|
| First Commercial Source Chromium(III) 2-ethylhexanoate | 0.31 | 1.03 | — | 0.58 | — | 0.73 | — | 0.95 |
| Second Commercial Source Chromium(III) 2-ethylhexanoate | 3.14 | 3.31 | — | 3.36 | — | 3.38 | — | 3.64 |
| Chromium(III) 2-ethylhexanoate of Example 3 | 0.39 | 1.10 | — | — | 3.22 | 1.19 | 1.23 | 1.71 |
| Chromium(III) 2-ethylhexanoate of Example 4 | 0.14 | 0.27 | — | — | 1.00 | 0.43 | 0.41 | 0.53 |
| Chromium(III) 2-ethylhexanoate of Example 5 | 0.25 | 0.56 | 0.63 | — | 1.97 | 0.84 | 0.76 | 0.97 |
| Chromium(III) 2-ethylhexanoate of Example 6 | 0.17 | 0.45 | — | — | 2.89 | 0.86 | 0.81 | 1.17 |
| Chromium(III) 2-ethylhexanoate of Example 7 | 0.23 | 0.75 | 0.94 | 0.93 | 1.24 | 0.75 | — | 0.80 |

TABLE 2

Infrared peak ratios using raw infrared baseline peak heights at the indicated average wavelengths.

| Material | $1516 \pm 15\ cm^{-1}/1429 \pm 15\ cm^{-1}$ | $1516 \pm 15\ cm^{-1}/1616 \pm 20\ cm^{-1}$ | $1516 \pm 15\ cm^{-1}/1685 \pm 20\ cm^{-1}$ | $1429 \pm 15\ cm^{-1}/1685 \pm 20\ cm^{-1}$ | $1616 \pm 20\ cm^{-1}/1429 \pm 15\ cm^{-1}$ |
|---|---|---|---|---|---|
| First Commercial Source Chromium(III) 2-ethylhexanoate | 0:1 | 0:1 | 0:1 | 3.1:1 | 1.09:1 |
| Second Commercial Source Chromium(III) 2-ethylhexanoate | 0:1 | 0:1 | 0:1 | 1.15:1 | 0.91:1 |
| Chromium(III) 2-ethylhexanoate of Example 3 | 1.8:1 | 2.9:1 | 8.3:1 | 4.4:1 | 0.64:1 |
| Chromium(III) 2-ethylhexanoate of Example 4 | 1.8:1 | 3.7:1 | 7.2:1 | 3.8:1 | 0.51:1 |
| Chromium(III) 2-ethylhexanoate of Example 5 | 2.0:1 | 3.6:1 | 7.9:1 | 3.9:1 | 0.57:1 |
| Chromium(III) 2-ethylhexanoate of Example 6 | 2.5:1 | 6.5:1 | 17.2:1 | 6.9:1 | 0.38:1 |
| Chromium(III) 2-ethylhexanoate of Example 7 | 1.5:1 | 1.6:1 | 5.4:1 | 3.4:1 | 0.95:1 |

TABLE 3

Drawn infrared baseline (1850 cm$^{-1}$ to 1170 cm$^{-1}$) peak heights.

| Material | 1685 ± 20 cm$^{-1}$ | 1616 ± 20 cm$^{-1}$ | 1579 ± 15 cm$^{-1}$ | 1549 ± 15 cm$^{-1}$ | 1516 ± 15 cm$^{-1}$ | 1460 ± 10 cm$^{-1}$ | 1447 ± 10 cm$^{-1}$ | 1429 ± 15 cm$^{-1}$ |
|---|---|---|---|---|---|---|---|---|
| First Commercial Source Chromium(III) 2-ethylhexanoate | 0.22 | 0.93 | — | 0.49 | — | 0.63 | — | 0.84 |
| Second Commercial Source Chromium(III) 2-ethylhexanoate | 3.01 | 3.12 | — | 3.19 | — | 3.20 | — | 3.46 |
| Chromium(III) 2-ethylhexanoate of Example 3 | 0.28 | 0.99 | — | — | 3.11 | 1.19 | 1.11 | 1.59 |
| Chromium(III) 2-ethylhexanoate of Example 4 | 0.10 | 0.24 | — | — | 0.97 | 0.41 | 0.38 | 0.51 |
| Chromium(III) 2-ethylhexanoate of Example 5 | 0.15 | 0.46 | 0.54 | — | 1.88 | 0.75 | 0.67 | 0.88 |
| Chromium(III) 2-ethylhexanoate of Example 6 | 0.15 | 0.42 | — | — | 2.86 | 0.86 | 0.79 | 1.14 |
| Chromium(III) 2-ethylhexanoate of Example 7 | 0.09 | 0.62 | 0.81 | 0.80 | 1.10 | 0.61 | — | 0.66 |

TABLE 4

Infrared peak ratios using drawn infrared baseline peak heights at the indicated average wavelengths.

| Material | 1516 ± 15 cm$^{-1}$/ 1429 ± 15 cm$^{-1}$ | 1516 ± 15 cm$^{-1}$/ 1616 ± 20 cm$^{-1}$ | 1516 ± 15 cm$^{-1}$/ 1685 ± 20 cm$^{-1}$ | 1429 ± 15 cm$^{-1}$/ 1685 ± 20 cm$^{-1}$ | 1616 ± 20 cm$^{-1}$/ 1429 ± 15 cm$^{-1}$ |
|---|---|---|---|---|---|
| First Commercial Source Chromium(III) 2-ethylhexanoate | 0:1 | 0:1 | 0:1 | 3.9:1 | 1.11:1 |
| Second Commercial Source Chromium(III) 2-ethylhexanoate | 0:1 | 0:1 | 0:1 | 1.15:1 | 0.90:1 |
| Chromium(III) 2-ethylhexanoate of Example 3 | 2.0:1 | 3.2:1 | 11.3:1 | 5.8:1 | 0.62:1 |
| Chromium(III) 2-ethylhexanoate of Example 4 | 1.9:1 | 4.0:1 | 9.6:1 | 5.0:1 | 0.47:1 |
| Chromium(III) 2-ethylhexanoate of Example 5 | 2.1:1 | 4.1:1 | 12.4:1 | 5.8:1 | 0.52:1 |
| Chromium(III) 2-ethylhexanoate of Example 6 | 2.5:1 | 1.8:1 | 12.1:1 | 7.8:1 | 0.37:1 |
| Chromium(III) 2-ethylhexanoate of Example 7 | 1.6:1 | 0.56:1 |  | 7.3:1 | 0.93:1 |

High Energy X-Ray Diffraction Analysis

The first commercially available chromium(III) 2-ethylhexanoate composition, the chromium(III) 2-ethylhexanoate composition produced using the procedure of Example 5, and the chromium(III) 2-ethylhexanoate composition as produced according to R. T. Hart Jr., N. A. Eckert, J. K. Ngala, A. F. Polley, C. J. Benmore, A. Clark, S. Macha, Presentation CATL 20, The 237th ACS National Meeting, Salt Lake City, Utah, Mar. 23, 2009, (hereafter "the Hart chromium(III) 2-ethylhexanoate composition") were analyzed using high energy X-ray diffraction. The high energy X-ray diffraction data was collected at station 11-ID-C of the Advanced Photon Source at Argonne National Laboratory using a monochromatic X-ray beam of 115 keV having an oval beam profile with a major axis of 15 μm and a minor axis of 1.5 μm was used to illuminate a 3 mm thick sample approximately 1130 mm from the detector. In this particular instance, a sufficient amount of sample (0.1 mg to 100 mg) to provide a 3 mm path length was placed in a 5 mm O.D. Pyrex® tube having 1 mm thick walls. Once the sample was placed in the Pyrex® tube, the Pyrex® tube was then evacuated, backfilled with $N_2$, and then flame sealed. The high energy X-ray diffraction pattern for the sample contained in the Pyrex® tube was then obtained by impinging the monochromatic X-ray beam of 115 keV (having an oval beam profile with a major axis of 15 μm and a minor axis of 1.5 of μm) upon the sample at a temperature of 298° K. The resulting diffraction pattern was collected on a MAR345 image plate (a 345 mm diameter image plate) at approximately 1130 millimeters from the sample. The angle between the X-ray beam source and the image plate was 180 degrees and a beamstop lined up with the center of the image plate between the sample and the image plate. Typically, the image plate is exposed for 0.5 seconds. Generally, the exposure time can be adjusted to obtain a balance between signal to noise ratio (longer exposure time provide improved signal to noise ratios) and image plate saturation (shorter exposure times reduced image plate detector saturation). Sample to detector distance, beam energy and detector orientation were determined using an external reference scan of $CeO_2$ powder. Background diffractions of an identical empty Pyrex® tube and air were also collected on MAR345 image plates to provide environment and background corrections, respectively, for the sample analysis. High energy X-ray diffraction image manipulations and data analysis was performed using FIT2D (Hammersley, A. P.; Svensson, S. O.; Hanfland, M.; Fitch, A. N.; Häusermann, D. High Pressure Res. 1996, 14, 235-248) version 12.077 (Apr. 5, 2005—Internal Report (1998), ESRF98HA01T, FIT2D V9. 129 Reference Manual V3. 1; A.P. Hammersley) and PDFgetX2 (Qiu, X.; Thompson, J. W.; Billinge, S. J. L. J. Appl. Crystallogr. 2004, 37, 678).

The raw sample image (sample contained in a Pyrex® tube), environment image (empty Pyrex® tube), and background image (air) were corrected for alignment, orientation and sample to detector distance using Fit2D and were then converted to momentum space intensity histograms, I(Q), by radially summing the corrected data images (using standard corrections for multiple scattering, X-ray polarization using PDFgetX2 (version 1) as shown in B Tomberli, C J Benmore, P A Egelstaff, J Neuefeind and V Honkimäki. 2000 J. Phys.: Condens. Matter, 12, 2597). The environment and the background momentum space intensity histograms were then subtracted from the raw sample momentum space intensity histogram within PDFgetX2 to provide a pure sample momentum space intensity histogram. The pure sample momentum space intensity histogram, I(Q), was then converted to a Structure function, S(Q) which was then converted to the pair distribution function, G(r), by the Fourier transformation of the Structure function, $$G(r) = 4\pi r[\rho(r) - \rho_0] = \left(\frac{2}{\pi}\right)\int_{Q=0}^{Qmax} Q[S(Q)-1]\sin(Qr)\,dQ$$

(where $Q = 4\pi \sin(\theta)/\lambda$, $\rho(r)$ is the local density, and $\rho_0$ is the average density) up to $Q_{max} = 25$ Å$^{-1}$ within PDFgetX2. The pair distribution function, G(r) was then normalized to provide the reduced pair distribution function, g(r) where $g(r) = G(r)/\rho_0$. The data points (r,g(r)) are referred to herein as the high energy X-Ray diffraction g(r) data points. Table 5 provides the high energy X-ray diffraction g(r) data points (from 1 angstrom to 6 angstroms) for a chromium(III) 2-ethylhexanoate composition prepared according to the procedure of Example 5, the Hart chromium(III) 2-ethylhexanoate composition, and the first commercially available chromium(III) 2-ethylhexanoate composition. FIG. 17 provides a plot of g(r) versus r (from 1 angstrom to 6 angstroms) for the chromium(III) 2-ethylhexanoate composition prepared according to the procedure of Example 5 and the first commercially available chromium(III) 2-ethylhexanoate composition. FIG. 18 provides a plot of g(r) versus r (from 1 angstrom to 6 angstroms) for the chromium(III) 2-ethylhexanoate composition prepared according to the procedure of Example 5 and the Hart chromium(III) 2-ethylhexanoate composition. It can be clearly seen that the chromium(III) 2-ethylhexanoate composition prepared according to the procedure of Example 5 is significantly different from the first commercially available chromium(III) 2-ethylhexanoate composition and the Hart chromium(III) 2-ethylhexanoate composition.

TABLE 5

Chromium(III) 2-ethylhexanoate g(r) data points

| r (Å) | g(r) Exam. 5 Sample | g(r) Hart | g(r) 1$^{st}$ Comm. Sample |
|---|---|---|---|
| 1.00 | 0.0000 | 0.0000 | 0.0000 |
| 1.01 | 0.0000 | 0.0000 | 0.0000 |
| 1.02 | 0.0000 | 0.0000 | 0.0000 |
| 1.03 | 0.0000 | 0.0000 | 0.0000 |
| 1.04 | 0.0000 | 0.0000 | 0.0000 |
| 1.05 | 0.0000 | 0.0000 | 0.0000 |
| 1.06 | 0.0000 | 0.0000 | 0.0000 |
| 1.07 | 0.0000 | 0.0000 | 0.0000 |
| 1.08 | 0.0000 | 0.0000 | 0.0000 |
| 1.09 | 0.0000 | 0.0000 | 0.0000 |
| 1.10 | 0.0000 | 0.0000 | 0.0000 |
| 1.11 | 0.0000 | 0.0000 | 0.0000 |
| 1.12 | 0.0000 | 0.0000 | 0.0000 |
| 1.13 | 0.0000 | 0.0000 | 0.0000 |
| 1.14 | 0.2350 | 0.0000 | 0.0000 |
| 1.15 | 0.6456 | 0.0000 | 0.0000 |
| 1.16 | 1.0192 | 0.0000 | 0.0000 |
| 1.17 | 1.3413 | 0.0000 | 0.0000 |
| 1.18 | 1.6002 | 0.0000 | 0.0000 |
| 1.19 | 1.7877 | 0.0000 | 0.0000 |
| 1.20 | 1.8988 | 0.0000 | 0.0000 |
| 1.21 | 1.9323 | 0.0000 | 0.0000 |
| 1.22 | 1.8907 | 0.0000 | 0.0000 |
| 1.23 | 1.7796 | 0.0000 | 0.0000 |
| 1.24 | 1.6077 | −0.1367 | 1.0345 |
| 1.25 | 1.3862 | −0.2256 | 1.0295 |
| 1.26 | 1.1282 | −0.2610 | 1.0428 |
| 1.27 | 0.8482 | −0.2467 | 1.0705 |
| 1.28 | 0.5613 | −0.1877 | 1.1088 |
| 1.29 | 0.2825 | −0.0903 | 1.1534 |
| 1.30 | 0.0260 | 0.0382 | 1.2004 |
| 1.31 | −0.1949 | 0.1901 | 1.2460 |
| 1.32 | −0.3690 | 0.3574 | 1.2867 |
| 1.33 | −0.4872 | 0.5324 | 1.3200 |
| 1.34 | −0.5431 | 0.7077 | 1.3438 |
| 1.35 | −0.5326 | 0.8769 | 1.3570 |
| 1.36 | −0.4549 | 1.0343 | 1.3593 |
| 1.37 | −0.3115 | 1.1755 | 1.3510 |
| 1.38 | −0.1067 | 1.2974 | 1.3336 |
| 1.39 | 0.1530 | 1.3980 | 1.3087 |
| 1.40 | 0.4590 | 1.4768 | 1.2786 |
| 1.41 | 0.8012 | 1.5342 | 1.2461 |
| 1.42 | 1.1684 | 1.5720 | 1.2140 |
| 1.43 | 1.5487 | 1.5928 | 1.1850 |
| 1.44 | 1.9300 | 1.5997 | 1.1617 |
| 1.45 | 2.3005 | 1.5967 | 1.1462 |
| 1.46 | 2.6491 | 1.5876 | 1.1402 |
| 1.47 | 2.9657 | 1.5764 | 1.1448 |
| 1.48 | 3.2415 | 1.5668 | 1.1602 |
| 1.49 | 3.4694 | 1.5621 | 1.1860 |
| 1.50 | 3.6440 | 1.5650 | 1.2208 |
| 1.51 | 3.7615 | 1.5773 | 1.2629 |
| 1.52 | 3.8202 | 1.6000 | 1.3095 |
| 1.53 | 3.8201 | 1.6330 | 1.3576 |
| 1.54 | 3.7628 | 1.6756 | 1.4039 |
| 1.55 | 3.6514 | 1.7259 | 1.4445 |
| 1.56 | 3.4903 | 1.7815 | 1.4760 |
| 1.57 | 3.2850 | 1.8391 | 1.4948 |
| 1.58 | 3.0418 | 1.8951 | 1.4980 |
| 1.59 | 2.7675 | 1.9456 | 1.4831 |
| 1.60 | 2.4696 | 1.9866 | 1.4484 |
| 1.61 | 2.1553 | 2.0144 | 1.3930 |
| 1.62 | 1.8323 | 2.0256 | 1.3170 |
| 1.63 | 1.5077 | 2.0175 | 1.2215 |
| 1.64 | 1.1884 | 1.9881 | 1.1087 |
| 1.65 | 0.8812 | 1.9367 | 0.9817 |
| 1.66 | 0.5920 | 1.8633 | 0.8445 |
| 1.67 | 0.3264 | 1.7692 | 0.7021 |
| 1.68 | 0.0895 | 1.6570 | 0.5598 |

TABLE 5-continued

Chromium(III) 2-ethylhexanoate g(r) data points

| r (Å) | g(r) Exam. 5 Sample | g(r) Hart | g(r) 1st Comm. Sample |
|---|---|---|---|
| 1.69 | −0.1141 | 1.5304 | 0.4237 |
| 1.70 | −0.2807 | 1.3942 | 0.2998 |
| 1.71 | −0.4068 | 1.2539 | 0.1944 |
| 1.72 | −0.4895 | 1.1161 | 0.1135 |
| 1.73 | −0.5267 | 0.9878 | 0.0625 |
| 1.74 | −0.5166 | 0.8762 | 0.0464 |
| 1.75 | −0.4583 | 0.7886 | 0.0691 |
| 1.76 | −0.3513 | 0.7321 | 0.1335 |
| 1.77 | −0.1959 | 0.7131 | 0.2415 |
| 1.78 | 0.0069 | 0.7373 | 0.3935 |
| 1.79 | 0.2553 | 0.8093 | 0.5888 |
| 1.80 | 0.5467 | 0.9321 | 0.8254 |
| 1.81 | 0.8775 | 1.1077 | 1.0997 |
| 1.82 | 1.2436 | 1.3360 | 1.4072 |
| 1.83 | 1.6396 | 1.6155 | 1.7425 |
| 1.84 | 2.0596 | 1.9428 | 2.0988 |
| 1.85 | 2.4967 | 2.3128 | 2.4691 |
| 1.86 | 2.9436 | 2.7190 | 2.8457 |
| 1.87 | 3.3923 | 3.1533 | 3.2206 |
| 1.88 | 3.8343 | 3.6063 | 3.5858 |
| 1.89 | 4.2612 | 4.0677 | 3.9337 |
| 1.90 | 4.6644 | 4.5268 | 4.2569 |
| 1.91 | 5.0354 | 4.9721 | 4.5488 |
| 1.92 | 5.3665 | 5.3925 | 4.8036 |
| 1.93 | 5.6504 | 5.7769 | 5.0164 |
| 1.94 | 5.8807 | 6.1153 | 5.1834 |
| 1.95 | 6.0524 | 6.3983 | 5.3022 |
| 1.96 | 6.1615 | 6.6181 | 5.3714 |
| 1.97 | 6.2055 | 6.7685 | 5.3907 |
| 1.98 | 6.1833 | 6.8448 | 5.3614 |
| 1.99 | 6.0957 | 6.8445 | 5.2855 |
| 2.00 | 5.9447 | 6.7671 | 5.1661 |
| 2.01 | 5.7341 | 6.6140 | 5.0074 |
| 2.02 | 5.4688 | 6.3888 | 4.8141 |
| 2.03 | 5.1554 | 6.0969 | 4.5915 |
| 2.04 | 4.8012 | 5.7455 | 4.3452 |
| 2.05 | 4.4146 | 5.3432 | 4.0813 |
| 2.06 | 4.0043 | 4.9000 | 3.8056 |
| 2.07 | 3.5797 | 4.4270 | 3.5240 |
| 2.08 | 3.1500 | 3.9355 | 3.2419 |
| 2.09 | 2.7241 | 3.4375 | 2.9644 |
| 2.10 | 2.3107 | 2.9447 | 2.6962 |
| 2.11 | 1.9174 | 2.4684 | 2.4413 |
| 2.12 | 1.5511 | 2.0191 | 2.2028 |
| 2.13 | 1.2175 | 1.6064 | 1.9834 |
| 2.14 | 0.9210 | 1.2384 | 1.7849 |
| 2.15 | 0.6648 | 0.9217 | 1.6085 |
| 2.16 | 0.4507 | 0.6612 | 1.4547 |
| 2.17 | 0.2791 | 0.4600 | 1.3234 |
| 2.18 | 0.1492 | 0.3193 | 1.2137 |
| 2.19 | 0.0592 | 0.2385 | 1.1246 |
| 2.20 | 0.0062 | 0.2151 | 1.0545 |
| 2.21 | −0.0136 | 0.2452 | 1.0015 |
| 2.22 | −0.0044 | 0.3233 | 0.9636 |
| 2.23 | 0.0291 | 0.4426 | 0.9385 |
| 2.24 | 0.0819 | 0.5954 | 0.9241 |
| 2.25 | 0.1492 | 0.7734 | 0.9182 |
| 2.26 | 0.2262 | 0.9678 | 0.9187 |
| 2.27 | 0.3087 | 1.1697 | 0.9237 |
| 2.28 | 0.3928 | 1.3705 | 0.9315 |
| 2.29 | 0.4753 | 1.5621 | 0.9407 |
| 2.30 | 0.5537 | 1.7370 | 0.9500 |
| 2.31 | 0.6260 | 1.8889 | 0.9584 |
| 2.32 | 0.6911 | 2.0123 | 0.9653 |
| 2.33 | 0.7485 | 2.1034 | 0.9702 |
| 2.34 | 0.7982 | 2.1594 | 0.9727 |
| 2.35 | 0.8409 | 2.1792 | 0.9728 |
| 2.36 | 0.8773 | 2.1628 | 0.9706 |
| 2.37 | 0.9088 | 2.1118 | 0.9662 |
| 2.38 | 0.9368 | 2.0287 | 0.9599 |
| 2.39 | 0.9625 | 1.9172 | 0.9520 |
| 2.40 | 0.9873 | 1.7820 | 0.9428 |
| 2.41 | 1.0123 | 1.6282 | 0.9326 |
| 2.42 | 1.0383 | 1.4615 | 0.9219 |
| 2.43 | 1.0658 | 1.2879 | 0.9107 |
| 2.44 | 1.0949 | 1.1130 | 0.8993 |
| 2.45 | 1.1254 | 0.9425 | 0.8879 |
| 2.46 | 1.1566 | 0.7815 | 0.8764 |
| 2.47 | 1.1878 | 0.6345 | 0.8648 |
| 2.48 | 1.2176 | 0.5053 | 0.8532 |
| 2.49 | 1.2447 | 0.3965 | 0.8413 |
| 2.50 | 1.2676 | 0.3101 | 0.8290 |
| 2.51 | 1.2848 | 0.2470 | 0.8162 |
| 2.52 | 1.2947 | 0.2069 | 0.8027 |
| 2.53 | 1.2962 | 0.1889 | 0.7883 |
| 2.54 | 1.2880 | 0.1909 | 0.7730 |
| 2.55 | 1.2695 | 0.2105 | 0.7566 |
| 2.56 | 1.2401 | 0.2442 | 0.7391 |
| 2.57 | 1.1998 | 0.2886 | 0.7207 |
| 2.58 | 1.1488 | 0.3396 | 0.7015 |
| 2.59 | 1.0878 | 0.3934 | 0.6816 |
| 2.60 | 1.0180 | 0.4462 | 0.6615 |
| 2.61 | 0.9406 | 0.4943 | 0.6415 |
| 2.62 | 0.8572 | 0.5349 | 0.6221 |
| 2.63 | 0.7698 | 0.5654 | 0.6039 |
| 2.64 | 0.6802 | 0.5841 | 0.5873 |
| 2.65 | 0.5905 | 0.5900 | 0.5732 |
| 2.66 | 0.5026 | 0.5831 | 0.5620 |
| 2.67 | 0.4186 | 0.5640 | 0.5544 |
| 2.68 | 0.3402 | 0.5342 | 0.5511 |
| 2.69 | 0.2690 | 0.4959 | 0.5526 |
| 2.70 | 0.2063 | 0.4521 | 0.5594 |
| 2.71 | 0.1532 | 0.4062 | 0.5719 |
| 2.72 | 0.1105 | 0.3620 | 0.5904 |
| 2.73 | 0.0787 | 0.3234 | 0.6151 |
| 2.74 | 0.0581 | 0.2945 | 0.6460 |
| 2.75 | 0.0486 | 0.2793 | 0.6830 |
| 2.76 | 0.0500 | 0.2815 | 0.7259 |
| 2.77 | 0.0619 | 0.3041 | 0.7741 |
| 2.78 | 0.0836 | 0.3497 | 0.8272 |
| 2.79 | 0.1145 | 0.4203 | 0.8843 |
| 2.80 | 0.1538 | 0.5168 | 0.9448 |
| 2.81 | 0.2007 | 0.6394 | 1.0075 |
| 2.82 | 0.2544 | 0.7874 | 1.0714 |
| 2.83 | 0.3141 | 0.9589 | 1.1354 |
| 2.84 | 0.3790 | 1.1515 | 1.1983 |
| 2.85 | 0.4483 | 1.3618 | 1.2590 |
| 2.86 | 0.5214 | 1.5857 | 1.3163 |
| 2.87 | 0.5974 | 1.8185 | 1.3692 |
| 2.88 | 0.6758 | 2.0551 | 1.4167 |
| 2.89 | 0.7558 | 2.2902 | 1.4578 |
| 2.90 | 0.8367 | 2.5182 | 1.4921 |
| 2.91 | 0.9178 | 2.7337 | 1.5188 |
| 2.92 | 0.9982 | 2.9316 | 1.5378 |
| 2.93 | 1.0769 | 3.1073 | 1.5489 |
| 2.94 | 1.1532 | 3.2564 | 1.5523 |
| 2.95 | 1.2259 | 3.3757 | 1.5483 |
| 2.96 | 1.2940 | 3.4625 | 1.5377 |
| 2.97 | 1.3563 | 3.5151 | 1.5211 |
| 2.98 | 1.4119 | 3.5327 | 1.4995 |
| 2.99 | 1.4595 | 3.5156 | 1.4743 |
| 3.00 | 1.4982 | 3.4649 | 1.4466 |
| 3.01 | 1.5271 | 3.3827 | 1.4179 |
| 3.02 | 1.5454 | 3.2719 | 1.3897 |
| 3.03 | 1.5526 | 3.1362 | 1.3635 |
| 3.04 | 1.5484 | 2.9797 | 1.3407 |
| 3.05 | 1.5326 | 2.8072 | 1.3228 |
| 3.06 | 1.5056 | 2.6237 | 1.3111 |
| 3.07 | 1.4679 | 2.4343 | 1.3067 |
| 3.08 | 1.4201 | 2.2442 | 1.3106 |
| 3.09 | 1.3636 | 2.0581 | 1.3234 |
| 3.10 | 1.2995 | 1.8808 | 1.3457 |
| 3.11 | 1.2296 | 1.7163 | 1.3778 |
| 3.12 | 1.1555 | 1.5681 | 1.4194 |
| 3.13 | 1.0791 | 1.4391 | 1.4704 |
| 3.14 | 1.0024 | 1.3314 | 1.5301 |
| 3.15 | 0.9273 | 1.2463 | 1.5977 |
| 3.16 | 0.8556 | 1.1842 | 1.6720 |

TABLE 5-continued

Chromium(III) 2-ethylhexanoate g(r) data points

| r (Å) | g(r) Exam. 5 Sample | g(r) Hart | g(r) 1st Comm. Sample |
|---|---|---|---|
| 3.17 | 0.7892 | 1.1449 | 1.7517 |
| 3.18 | 0.7294 | 1.1274 | 1.8354 |
| 3.19 | 0.6775 | 1.1299 | 1.9214 |
| 3.20 | 0.6346 | 1.1501 | 2.0079 |
| 3.21 | 0.6011 | 1.1853 | 2.0933 |
| 3.22 | 0.5775 | 1.2324 | 2.1757 |
| 3.23 | 0.5637 | 1.2879 | 2.2534 |
| 3.24 | 0.5592 | 1.3483 | 2.3247 |
| 3.25 | 0.5632 | 1.4102 | 2.3880 |
| 3.26 | 0.5750 | 1.4703 | 2.4419 |
| 3.27 | 0.5931 | 1.5254 | 2.4852 |
| 3.28 | 0.6163 | 1.5729 | 2.5170 |
| 3.29 | 0.6430 | 1.6104 | 2.5363 |
| 3.30 | 0.6717 | 1.6362 | 2.5427 |
| 3.31 | 0.7011 | 1.6489 | 2.5359 |
| 3.32 | 0.7296 | 1.6480 | 2.5158 |
| 3.33 | 0.7561 | 1.6331 | 2.4826 |
| 3.34 | 0.7796 | 1.6047 | 2.4366 |
| 3.35 | 0.7993 | 1.5637 | 2.3786 |
| 3.36 | 0.8148 | 1.5112 | 2.3092 |
| 3.37 | 0.8258 | 1.4489 | 2.2295 |
| 3.38 | 0.8323 | 1.3787 | 2.1406 |
| 3.39 | 0.8348 | 1.3026 | 2.0436 |
| 3.40 | 0.8338 | 1.2228 | 1.9398 |
| 3.41 | 0.8301 | 1.1413 | 1.8306 |
| 3.42 | 0.8245 | 1.0602 | 1.7173 |
| 3.43 | 0.8180 | 0.9813 | 1.6012 |
| 3.44 | 0.8116 | 0.9063 | 1.4837 |
| 3.45 | 0.8063 | 0.8364 | 1.3660 |
| 3.46 | 0.8031 | 0.7726 | 1.2493 |
| 3.47 | 0.8025 | 0.7155 | 1.1347 |
| 3.48 | 0.8052 | 0.6653 | 1.0233 |
| 3.49 | 0.8115 | 0.6220 | 0.9159 |
| 3.50 | 0.8216 | 0.5850 | 0.8135 |
| 3.51 | 0.8351 | 0.5538 | 0.7166 |
| 3.52 | 0.8519 | 0.5274 | 0.6259 |
| 3.53 | 0.8712 | 0.5046 | 0.5418 |
| 3.54 | 0.8922 | 0.4843 | 0.4648 |
| 3.55 | 0.9140 | 0.4653 | 0.3951 |
| 3.56 | 0.9354 | 0.4463 | 0.3328 |
| 3.57 | 0.9555 | 0.4263 | 0.2781 |
| 3.58 | 0.9731 | 0.4044 | 0.2308 |
| 3.59 | 0.9872 | 0.3799 | 0.1910 |
| 3.60 | 0.9968 | 0.3525 | 0.1585 |
| 3.61 | 1.0013 | 0.3218 | 0.1329 |
| 3.62 | 1.0000 | 0.2882 | 0.1140 |
| 3.63 | 0.9928 | 0.2521 | 0.1015 |
| 3.64 | 0.9797 | 0.2143 | 0.0949 |
| 3.65 | 0.9608 | 0.1757 | 0.0938 |
| 3.66 | 0.9368 | 0.1376 | 0.0976 |
| 3.67 | 0.9083 | 0.1014 | 0.1060 |
| 3.68 | 0.8764 | 0.0685 | 0.1182 |
| 3.69 | 0.8422 | 0.0405 | 0.1338 |
| 3.70 | 0.8070 | 0.0188 | 0.1522 |
| 3.71 | 0.7720 | 0.0047 | 0.1728 |
| 3.72 | 0.7386 | −0.0005 | 0.1952 |
| 3.73 | 0.7081 | 0.0041 | 0.2186 |
| 3.74 | 0.6814 | 0.0192 | 0.2427 |
| 3.75 | 0.6597 | 0.0451 | 0.2669 |
| 3.76 | 0.6435 | 0.0818 | 0.2908 |
| 3.77 | 0.6334 | 0.1289 | 0.3139 |
| 3.78 | 0.6296 | 0.1856 | 0.3360 |
| 3.79 | 0.6318 | 0.2510 | 0.3567 |
| 3.80 | 0.6398 | 0.3236 | 0.3757 |
| 3.81 | 0.6528 | 0.4017 | 0.3929 |
| 3.82 | 0.6700 | 0.4834 | 0.4082 |
| 3.83 | 0.6902 | 0.5667 | 0.4213 |
| 3.84 | 0.7121 | 0.6495 | 0.4325 |
| 3.85 | 0.7345 | 0.7295 | 0.4415 |
| 3.86 | 0.7560 | 0.8048 | 0.4487 |
| 3.87 | 0.7752 | 0.8734 | 0.4540 |
| 3.88 | 0.7910 | 0.9336 | 0.4576 |
| 3.89 | 0.8022 | 0.9840 | 0.4598 |
| 3.90 | 0.8081 | 1.0235 | 0.4608 |
| 3.91 | 0.8080 | 1.0514 | 0.4609 |
| 3.92 | 0.8018 | 1.0674 | 0.4602 |
| 3.93 | 0.7895 | 1.0715 | 0.4591 |
| 3.94 | 0.7715 | 1.0643 | 0.4579 |
| 3.95 | 0.7484 | 1.0468 | 0.4568 |
| 3.96 | 0.7213 | 1.0201 | 0.4561 |
| 3.97 | 0.6913 | 0.9859 | 0.4561 |
| 3.98 | 0.6600 | 0.9461 | 0.4570 |
| 3.99 | 0.6290 | 0.9026 | 0.4590 |
| 4.00 | 0.5999 | 0.8578 | 0.4625 |
| 4.01 | 0.5745 | 0.8137 | 0.4675 |
| 4.02 | 0.5545 | 0.7726 | 0.4743 |
| 4.03 | 0.5414 | 0.7365 | 0.4831 |
| 4.04 | 0.5366 | 0.7073 | 0.4939 |
| 4.05 | 0.5413 | 0.6866 | 0.5070 |
| 4.06 | 0.5562 | 0.6757 | 0.5224 |
| 4.07 | 0.5819 | 0.6755 | 0.5402 |
| 4.08 | 0.6186 | 0.6865 | 0.5606 |
| 4.09 | 0.6661 | 0.7090 | 0.5835 |
| 4.10 | 0.7237 | 0.7426 | 0.6090 |
| 4.11 | 0.7906 | 0.7866 | 0.6370 |
| 4.12 | 0.8656 | 0.8401 | 0.6677 |
| 4.13 | 0.9471 | 0.9015 | 0.7008 |
| 4.14 | 1.0334 | 0.9694 | 0.7364 |
| 4.15 | 1.1227 | 1.0418 | 0.7742 |
| 4.16 | 1.2128 | 1.1166 | 0.8142 |
| 4.17 | 1.3018 | 1.1919 | 0.8562 |
| 4.18 | 1.3877 | 1.2655 | 0.8998 |
| 4.19 | 1.4685 | 1.3355 | 0.9450 |
| 4.20 | 1.5426 | 1.3999 | 0.9913 |
| 4.21 | 1.6085 | 1.4572 | 1.0384 |
| 4.22 | 1.6649 | 1.5061 | 1.0860 |
| 4.23 | 1.7110 | 1.5454 | 1.1336 |
| 4.24 | 1.7459 | 1.5745 | 1.1810 |
| 4.25 | 1.7697 | 1.5931 | 1.2277 |
| 4.26 | 1.7822 | 1.6012 | 1.2732 |
| 4.27 | 1.7839 | 1.5993 | 1.3172 |
| 4.28 | 1.7754 | 1.5881 | 1.3593 |
| 4.29 | 1.7578 | 1.5688 | 1.3991 |
| 4.30 | 1.7323 | 1.5427 | 1.4362 |
| 4.31 | 1.7001 | 1.5114 | 1.4704 |
| 4.32 | 1.6628 | 1.4765 | 1.5013 |
| 4.33 | 1.6218 | 1.4399 | 1.5288 |
| 4.34 | 1.5789 | 1.4033 | 1.5527 |
| 4.35 | 1.5353 | 1.3686 | 1.5729 |
| 4.36 | 1.4927 | 1.3372 | 1.5894 |
| 4.37 | 1.4522 | 1.3107 | 1.6021 |
| 4.38 | 1.4149 | 1.2903 | 1.6112 |
| 4.39 | 1.3818 | 1.2769 | 1.6169 |
| 4.40 | 1.3535 | 1.2710 | 1.6192 |
| 4.41 | 1.3304 | 1.2731 | 1.6185 |
| 4.42 | 1.3128 | 1.2829 | 1.6152 |
| 4.43 | 1.3006 | 1.3002 | 1.6094 |
| 4.44 | 1.2937 | 1.3242 | 1.6016 |
| 4.45 | 1.2916 | 1.3541 | 1.5921 |
| 4.46 | 1.2938 | 1.3885 | 1.5815 |
| 4.47 | 1.2997 | 1.4262 | 1.5700 |
| 4.48 | 1.3085 | 1.4655 | 1.5580 |
| 4.49 | 1.3193 | 1.5050 | 1.5460 |
| 4.50 | 1.3316 | 1.5430 | 1.5343 |
| 4.51 | 1.3444 | 1.5779 | 1.5233 |
| 4.52 | 1.3572 | 1.6084 | 1.5131 |
| 4.53 | 1.3692 | 1.6332 | 1.5041 |
| 4.54 | 1.3801 | 1.6513 | 1.4965 |
| 4.55 | 1.3895 | 1.6618 | 1.4905 |
| 4.56 | 1.3972 | 1.6644 | 1.4860 |
| 4.57 | 1.4030 | 1.6587 | 1.4833 |
| 4.58 | 1.4070 | 1.6449 | 1.4824 |
| 4.59 | 1.4094 | 1.6234 | 1.4831 |
| 4.60 | 1.4104 | 1.5948 | 1.4854 |
| 4.61 | 1.4104 | 1.5602 | 1.4892 |
| 4.62 | 1.4097 | 1.5206 | 1.4943 |
| 4.63 | 1.4088 | 1.4775 | 1.5007 |
| 4.64 | 1.4082 | 1.4322 | 1.5080 |

TABLE 5-continued

Chromium(III) 2-ethylhexanoate g(r) data points

| r (Å) | g(r) Exam. 5 Sample | g(r) Hart | g(r) 1st Comm. Sample |
|---|---|---|---|
| 4.65 | 1.4081 | 1.3862 | 1.5160 |
| 4.66 | 1.4091 | 1.3411 | 1.5246 |
| 4.67 | 1.4113 | 1.2983 | 1.5334 |
| 4.68 | 1.4151 | 1.2593 | 1.5422 |
| 4.69 | 1.4205 | 1.2251 | 1.5508 |
| 4.70 | 1.4277 | 1.1968 | 1.5590 |
| 4.71 | 1.4364 | 1.1752 | 1.5666 |
| 4.72 | 1.4466 | 1.1609 | 1.5733 |
| 4.73 | 1.4580 | 1.1540 | 1.5789 |
| 4.74 | 1.4702 | 1.1545 | 1.5834 |
| 4.75 | 1.4829 | 1.1622 | 1.5867 |
| 4.76 | 1.4957 | 1.1765 | 1.5886 |
| 4.77 | 1.5080 | 1.1965 | 1.5890 |
| 4.78 | 1.5194 | 1.2213 | 1.5880 |
| 4.79 | 1.5295 | 1.2498 | 1.5855 |
| 4.80 | 1.5379 | 1.2807 | 1.5816 |
| 4.81 | 1.5443 | 1.3126 | 1.5763 |
| 4.82 | 1.5484 | 1.3442 | 1.5698 |
| 4.83 | 1.5500 | 1.3743 | 1.5621 |
| 4.84 | 1.5490 | 1.4015 | 1.5533 |
| 4.85 | 1.5456 | 1.4249 | 1.5437 |
| 4.86 | 1.5397 | 1.4436 | 1.5332 |
| 4.87 | 1.5317 | 1.4567 | 1.5222 |
| 4.88 | 1.5218 | 1.4639 | 1.5107 |
| 4.89 | 1.5105 | 1.4649 | 1.4990 |
| 4.90 | 1.4980 | 1.4596 | 1.4871 |
| 4.91 | 1.4849 | 1.4484 | 1.4753 |
| 4.92 | 1.4716 | 1.4317 | 1.4636 |
| 4.93 | 1.4586 | 1.4101 | 1.4523 |
| 4.94 | 1.4464 | 1.3845 | 1.4413 |
| 4.95 | 1.4352 | 1.3559 | 1.4307 |
| 4.96 | 1.4256 | 1.3253 | 1.4207 |
| 4.97 | 1.4176 | 1.2940 | 1.4113 |
| 4.98 | 1.4116 | 1.2629 | 1.4025 |
| 4.99 | 1.4075 | 1.2333 | 1.3942 |
| 5.00 | 1.4055 | 1.2061 | 1.3866 |
| 5.01 | 1.4054 | 1.1823 | 1.3794 |
| 5.02 | 1.4070 | 1.1627 | 1.3728 |
| 5.03 | 1.4103 | 1.1478 | 1.3666 |
| 5.04 | 1.4148 | 1.1381 | 1.3607 |
| 5.05 | 1.4202 | 1.1338 | 1.3552 |
| 5.06 | 1.4263 | 1.1348 | 1.3498 |
| 5.07 | 1.4325 | 1.1410 | 1.3445 |
| 5.08 | 1.4387 | 1.1519 | 1.3393 |
| 5.09 | 1.4444 | 1.1671 | 1.3341 |
| 5.10 | 1.4494 | 1.1858 | 1.3288 |
| 5.11 | 1.4534 | 1.2071 | 1.3234 |
| 5.12 | 1.4562 | 1.2303 | 1.3178 |
| 5.13 | 1.4578 | 1.2543 | 1.3120 |
| 5.14 | 1.4580 | 1.2783 | 1.3059 |
| 5.15 | 1.4569 | 1.3013 | 1.2997 |
| 5.16 | 1.4547 | 1.3225 | 1.2932 |
| 5.17 | 1.4514 | 1.3412 | 1.2865 |
| 5.18 | 1.4472 | 1.3568 | 1.2796 |
| 5.19 | 1.4424 | 1.3689 | 1.2726 |
| 5.20 | 1.4372 | 1.3771 | 1.2654 |
| 5.21 | 1.4319 | 1.3814 | 1.2580 |
| 5.22 | 1.4268 | 1.3818 | 1.2506 |
| 5.23 | 1.4221 | 1.3786 | 1.2431 |
| 5.24 | 1.4181 | 1.3720 | 1.2355 |
| 5.25 | 1.4149 | 1.3627 | 1.2279 |
| 5.26 | 1.4127 | 1.3511 | 1.2203 |
| 5.27 | 1.4116 | 1.3381 | 1.2126 |
| 5.28 | 1.4115 | 1.3243 | 1.2049 |
| 5.29 | 1.4126 | 1.3104 | 1.1972 |
| 5.30 | 1.4147 | 1.2972 | 1.1895 |
| 5.31 | 1.4176 | 1.2853 | 1.1818 |
| 5.32 | 1.4213 | 1.2754 | 1.1740 |
| 5.33 | 1.4256 | 1.2679 | 1.1662 |
| 5.34 | 1.4303 | 1.2631 | 1.1583 |
| 5.35 | 1.4351 | 1.2613 | 1.1504 |
| 5.36 | 1.4399 | 1.2625 | 1.1424 |
| 5.37 | 1.4445 | 1.2667 | 1.1344 |
| 5.38 | 1.4486 | 1.2736 | 1.1264 |
| 5.39 | 1.4523 | 1.2828 | 1.1184 |
| 5.40 | 1.4552 | 1.2939 | 1.1103 |
| 5.41 | 1.4575 | 1.3063 | 1.1023 |
| 5.42 | 1.4590 | 1.3193 | 1.0943 |
| 5.43 | 1.4598 | 1.3323 | 1.0863 |
| 5.44 | 1.4600 | 1.3444 | 1.0784 |
| 5.45 | 1.4594 | 1.3551 | 1.0706 |
| 5.46 | 1.4583 | 1.3637 | 1.0629 |
| 5.47 | 1.4568 | 1.3695 | 1.0552 |
| 5.48 | 1.4549 | 1.3722 | 1.0476 |
| 5.49 | 1.4527 | 1.3713 | 1.0401 |
| 5.50 | 1.4503 | 1.3667 | 1.0327 |
| 5.51 | 1.4476 | 1.3583 | 1.0252 |
| 5.52 | 1.4448 | 1.3462 | 1.0178 |
| 5.53 | 1.4418 | 1.3305 | 1.0103 |
| 5.54 | 1.4384 | 1.3117 | 1.0027 |
| 5.55 | 1.4346 | 1.2903 | 0.9950 |
| 5.56 | 1.4303 | 1.2668 | 0.9872 |
| 5.57 | 1.4253 | 1.2420 | 0.9792 |
| 5.58 | 1.4193 | 1.2165 | 0.9711 |
| 5.59 | 1.4122 | 1.1911 | 0.9628 |
| 5.60 | 1.4038 | 1.1667 | 0.9543 |
| 5.61 | 1.3938 | 1.1438 | 0.9458 |
| 5.62 | 1.3822 | 1.1233 | 0.9372 |
| 5.63 | 1.3686 | 1.1056 | 0.9287 |
| 5.64 | 1.3532 | 1.0912 | 0.9203 |
| 5.65 | 1.3357 | 1.0805 | 0.9123 |
| 5.66 | 1.3162 | 1.0736 | 0.9046 |
| 5.67 | 1.2948 | 1.0705 | 0.8976 |
| 5.68 | 1.2717 | 1.0712 | 0.8913 |
| 5.69 | 1.2470 | 1.0753 | 0.8859 |
| 5.70 | 1.2210 | 1.0825 | 0.8815 |
| 5.71 | 1.1941 | 1.0922 | 0.8784 |
| 5.72 | 1.1665 | 1.1037 | 0.8767 |
| 5.73 | 1.1387 | 1.1165 | 0.8764 |
| 5.74 | 1.1112 | 1.1296 | 0.8777 |
| 5.75 | 1.0843 | 1.1424 | 0.8806 |
| 5.76 | 1.0584 | 1.1540 | 0.8851 |
| 5.77 | 1.0340 | 1.1638 | 0.8913 |
| 5.78 | 1.0115 | 1.1710 | 0.8989 |
| 5.79 | 0.9911 | 1.1751 | 0.9079 |
| 5.80 | 0.9730 | 1.1756 | 0.9182 |
| 5.81 | 0.9576 | 1.1722 | 0.9295 |
| 5.82 | 0.9449 | 1.1649 | 0.9415 |
| 5.83 | 0.9349 | 1.1534 | 0.9541 |
| 5.84 | 0.9277 | 1.1381 | 0.9668 |
| 5.85 | 0.9231 | 1.1191 | 0.9795 |
| 5.86 | 0.9210 | 1.0970 | 0.9918 |
| 5.87 | 0.9211 | 1.0722 | 1.0033 |
| 5.88 | 0.9232 | 1.0455 | 1.0137 |
| 5.89 | 0.9270 | 1.0176 | 1.0229 |
| 5.90 | 0.9322 | 0.9893 | 1.0306 |
| 5.91 | 0.9384 | 0.9613 | 1.0365 |
| 5.92 | 0.9453 | 0.9346 | 1.0406 |
| 5.93 | 0.9525 | 0.9098 | 1.0428 |
| 5.94 | 0.9599 | 0.8877 | 1.0430 |
| 5.95 | 0.9670 | 0.8689 | 1.0413 |
| 5.96 | 0.9736 | 0.8539 | 1.0378 |
| 5.97 | 0.9796 | 0.8431 | 1.0327 |
| 5.98 | 0.9848 | 0.8368 | 1.0262 |
| 5.99 | 0.9892 | 0.8350 | 1.0186 |
| 6.00 | 0.9925 | 0.8377 | 1.0102 |

A vacuum phase mononuclear chromium(III) acetate model was constructed heuristically based on the strong correlations in the experimental radial distribution function of the chromium(III) 2-ethyl hexanoate produced according to Example 5. The initial mononuclear chromium(III) acetate structure was built using a reasonable chromium-oxygen bond distance obtained from the high-energy X-ray diffraction of the chromium(III) 2-ethylhexanoate sample produced by the method in Example 5 and the carbon-oxygen, carbon-carbon, and carbon-hydrogen bond distances of the acetate anion published in *Nature* 205, 694-695 (13 Feb. 1965). It should be noted that all three high energy X-ray diffraction analyzed chromium(III) 2-ethylhexanoate compositions provide nearly the same chromium-oxygen bond distance (within 0.05 of an Angstrom). Consequently, without being limited to theory, it was believed that this was a good initial starting point for the chromium-oxygen bond distance on which to construct a gas phase mononuclear chromium(III) acetate model. The initial model was then optimized using SemiChem/GaussView (version 3.0) by varying the chromium-oxygen bond distance and the oxygen-chromium-oxygen-carbon dihedral angle while imposing $D_{3h}$ symmetry on the 10 central atoms. Table 6 provides the atomic coordinates of the optimized chromium(III) acetate model obtained from SemiChem/GaussView.

TABLE 6

Atomic Coordinates for an Optimized Chromium(III) Acetate Model

| Atom | X | Y | Z |
| --- | --- | --- | --- |
| Cr | 0 | 0 | 0 |
| C1 | 1.843475 | −0.40852 | −1.43058 |
| O1 | 0.738585 | −1.038881 | −1.567619 |
| O2 | 1.90289 | 0.461636 | −0.494039 |
| C2 | 3.026757 | −0.697968 | −2.303537 |
| H1 | 3.586188 | 0.221029 | −2.49448 |
| H2 | 2.70492 | −1.158746 | −3.239287 |
| H3 | 3.689716 | −1.395002 | −1.777323 |
| O3 | −0.772555 | 1.631901 | −0.909192 |
| O4 | −0.481341 | 1.511899 | 1.249048 |
| C4 | −1.400219 | 3.584765 | 0.389991 |
| C3 | −0.872192 | 2.190556 | 0.236797 |
| H4 | −1.932477 | 3.891686 | −0.511821 |
| H5 | −2.054935 | 3.640368 | 1.263653 |
| H6 | −0.55862 | 4.266381 | 0.559197 |
| O5 | 0.288007 | −1.521043 | 1.29563 |
| O6 | −1.664703 | −1.059059 | 0.43961 |
| C5 | −0.959016 | −1.79628 | 1.210803 |
| C6 | −1.568434 | −2.912588 | 2.003767 |
| H7 | −2.492313 | −3.252317 | 1.531746 |
| H8 | −1.803373 | −2.543365 | 3.009177 |
| H9 | −0.856348 | −3.735188 | 2.102561 |

PDFFit as implemented in PDFgui was then used to then calculate the pair distribution functions of the optimized mononuclear chromium(III) model (Proffen, T.; Billinge, S. J. L. J. Appl. Crystallogr. 1999, 32, 572-575). Table 7 provides the calculated high energy X-ray diffraction d(r) data points for the optimized chromium(III) acetate model. It should be noted that the utilized procedure generates a radial distribution function, d(r), and it is the d(r) data points that are presented in Table 7. To compare the calculated high energy X-ray diffraction d(r) data of the optimized mononuclear chromium(III) acetate model to high energy X-ray diffraction g(r) data of a chromium carboxylate sample, the d(r) data points must to converted to g(r) data. The relationship between high energy X-ray diffraction d(r) data generated by PDFgui and high energy X-ray diffraction g(r) data points is $g(r)=(d(r)/(4\pi *r*\rho_0))+1$.

TABLE 7

Chromium(III) Acetate Model d(r) data points.

| r (Å) | d(r) Cr(OAc)$_3$ |
| --- | --- |
| 1.00 | 0.5453 |
| 1.01 | 0.5422 |
| 1.02 | 0.5399 |
| 1.03 | 0.5410 |
| 1.04 | 0.5472 |
| 1.05 | 0.5602 |
| 1.06 | 0.5804 |
| 1.07 | 0.6076 |
| 1.08 | 0.6408 |
| 1.09 | 0.6779 |
| 1.10 | 0.7163 |
| 1.11 | 0.7525 |
| 1.12 | 0.7828 |
| 1.13 | 0.8031 |
| 1.14 | 0.8097 |
| 1.15 | 0.7992 |
| 1.16 | 0.7688 |
| 1.17 | 0.7167 |
| 1.18 | 0.6426 |
| 1.19 | 0.5471 |
| 1.20 | 0.4326 |
| 1.21 | 0.3030 |
| 1.22 | 0.1634 |
| 1.23 | 0.0203 |
| 1.24 | −0.1186 |
| 1.25 | −0.2453 |
| 1.26 | −0.3511 |
| 1.27 | −0.4275 |
| 1.28 | −0.4667 |
| 1.29 | −0.4615 |
| 1.30 | −0.4065 |
| 1.31 | −0.2978 |
| 1.32 | −0.1335 |
| 1.33 | 0.0860 |
| 1.34 | 0.3580 |
| 1.35 | 0.6774 |
| 1.36 | 1.0370 |
| 1.37 | 1.4275 |
| 1.38 | 1.8382 |
| 1.39 | 2.2570 |
| 1.40 | 2.6713 |
| 1.41 | 3.0681 |
| 1.42 | 3.4351 |
| 1.43 | 3.7607 |
| 1.44 | 4.0350 |
| 1.45 | 4.2496 |
| 1.46 | 4.3988 |
| 1.47 | 4.4791 |
| 1.48 | 4.4897 |
| 1.49 | 4.4324 |
| 1.50 | 4.3115 |
| 1.51 | 4.1335 |
| 1.52 | 3.9069 |
| 1.53 | 3.6413 |
| 1.54 | 3.3474 |
| 1.55 | 3.0365 |
| 1.56 | 2.7193 |
| 1.57 | 2.4060 |
| 1.58 | 2.1056 |
| 1.59 | 1.8254 |
| 1.60 | 1.5710 |
| 1.61 | 1.3458 |
| 1.62 | 1.1510 |
| 1.63 | 0.9860 |
| 1.64 | 0.8483 |
| 1.65 | 0.7338 |
| 1.66 | 0.6373 |
| 1.67 | 0.5531 |
| 1.68 | 0.4753 |
| 1.69 | 0.3984 |
| 1.70 | 0.3181 |
| 1.71 | 0.2311 |
| 1.72 | 0.1362 |
| 1.73 | 0.0340 |
| 1.74 | −0.0726 |
| 1.75 | −0.1785 |
| 1.76 | −0.2768 |

TABLE 7-continued

Chromium(III) Acetate Model d(r) data points.

| r (Å) | d(r) Cr(OAc)$_3$ |
|---|---|
| 1.77 | −0.3587 |
| 1.78 | −0.4140 |
| 1.79 | −0.4318 |
| 1.80 | −0.4009 |
| 1.81 | −0.3107 |
| 1.82 | −0.1514 |
| 1.83 | 0.0847 |
| 1.84 | 0.4032 |
| 1.85 | 0.8068 |
| 1.86 | 1.2950 |
| 1.87 | 1.8637 |
| 1.88 | 2.5055 |
| 1.89 | 3.2093 |
| 1.90 | 3.9610 |
| 1.91 | 4.7434 |
| 1.92 | 5.5374 |
| 1.93 | 6.3223 |
| 1.94 | 7.0765 |
| 1.95 | 7.7785 |
| 1.96 | 8.4079 |
| 1.97 | 8.9459 |
| 1.98 | 9.3763 |
| 1.99 | 9.6860 |
| 2.00 | 9.8656 |
| 2.01 | 9.9099 |
| 2.02 | 9.8180 |
| 2.03 | 9.5935 |
| 2.04 | 9.2438 |
| 2.05 | 8.7805 |
| 2.06 | 8.2185 |
| 2.07 | 7.5755 |
| 2.08 | 6.8712 |
| 2.09 | 6.1266 |
| 2.10 | 5.3630 |
| 2.11 | 4.6014 |
| 2.12 | 3.8618 |
| 2.13 | 3.1619 |
| 2.14 | 2.5174 |
| 2.15 | 1.9409 |
| 2.16 | 1.4416 |
| 2.17 | 1.0255 |
| 2.18 | 0.6952 |
| 2.19 | 0.4499 |
| 2.20 | 0.2860 |
| 2.21 | 0.1971 |
| 2.22 | 0.1749 |
| 2.23 | 0.2097 |
| 2.24 | 0.2905 |
| 2.25 | 0.4061 |
| 2.26 | 0.5457 |
| 2.27 | 0.6990 |
| 2.28 | 0.8569 |
| 2.29 | 1.0116 |
| 2.30 | 1.1572 |
| 2.31 | 1.2895 |
| 2.32 | 1.4062 |
| 2.33 | 1.5065 |
| 2.34 | 1.5913 |
| 2.35 | 1.6626 |
| 2.36 | 1.7233 |
| 2.37 | 1.7772 |
| 2.38 | 1.8279 |
| 2.39 | 1.8792 |
| 2.40 | 1.9342 |
| 2.41 | 1.9958 |
| 2.42 | 2.0655 |
| 2.43 | 2.1442 |
| 2.44 | 2.2315 |
| 2.45 | 2.3264 |
| 2.46 | 2.4266 |
| 2.47 | 2.5293 |
| 2.48 | 2.6311 |
| 2.49 | 2.7284 |
| 2.50 | 2.8175 |
| 2.51 | 2.8947 |
| 2.52 | 2.9571 |
| 2.53 | 3.0020 |
| 2.54 | 3.0276 |
| 2.55 | 3.0330 |
| 2.56 | 3.0181 |
| 2.57 | 2.9836 |
| 2.58 | 2.9309 |
| 2.59 | 2.8622 |
| 2.60 | 2.7799 |
| 2.61 | 2.6870 |
| 2.62 | 2.5863 |
| 2.63 | 2.4808 |
| 2.64 | 2.3731 |
| 2.65 | 2.2654 |
| 2.66 | 2.1594 |
| 2.67 | 2.0563 |
| 2.68 | 1.9569 |
| 2.69 | 1.8611 |
| 2.70 | 1.7688 |
| 2.71 | 1.6794 |
| 2.72 | 1.5922 |
| 2.73 | 1.5065 |
| 2.74 | 1.4218 |
| 2.75 | 1.3379 |
| 2.76 | 1.2552 |
| 2.77 | 1.1744 |
| 2.78 | 1.0972 |
| 2.79 | 1.0256 |
| 2.80 | 0.9622 |
| 2.81 | 0.9102 |
| 2.82 | 0.8730 |
| 2.83 | 0.8541 |
| 2.84 | 0.8569 |
| 2.85 | 0.8843 |
| 2.86 | 0.9389 |
| 2.87 | 1.0222 |
| 2.88 | 1.1346 |
| 2.89 | 1.2757 |
| 2.90 | 1.4433 |
| 2.91 | 1.6342 |
| 2.92 | 1.8438 |
| 2.93 | 2.0664 |
| 2.94 | 2.2953 |
| 2.95 | 2.5227 |
| 2.96 | 2.7409 |
| 2.97 | 2.9416 |
| 2.98 | 3.1168 |
| 2.99 | 3.2592 |
| 3.00 | 3.3622 |
| 3.01 | 3.4207 |
| 3.02 | 3.4307 |
| 3.03 | 3.3903 |
| 3.04 | 3.2990 |
| 3.05 | 3.1585 |
| 3.06 | 2.9720 |
| 3.07 | 2.7446 |
| 3.08 | 2.4828 |
| 3.09 | 2.1944 |
| 3.10 | 1.8880 |
| 3.11 | 1.5728 |
| 3.12 | 1.2581 |
| 3.13 | 0.9530 |
| 3.14 | 0.6660 |
| 3.15 | 0.4047 |
| 3.16 | 0.1754 |
| 3.17 | −0.0168 |
| 3.18 | −0.1686 |
| 3.19 | −0.2782 |
| 3.20 | −0.3456 |
| 3.21 | −0.3721 |
| 3.22 | −0.3606 |
| 3.23 | −0.3149 |
| 3.24 | −0.2400 |
| 3.25 | −0.1415 |
| 3.26 | −0.0251 |

TABLE 7-continued

Chromium(III) Acetate Model d(r) data points.

| r (Å) | d(r) Cr(OAc)$_3$ |
|---|---|
| 3.27 | 0.1032 |
| 3.28 | 0.2378 |
| 3.29 | 0.3735 |
| 3.30 | 0.5058 |
| 3.31 | 0.6310 |
| 3.32 | 0.7464 |
| 3.33 | 0.8500 |
| 3.34 | 0.9409 |
| 3.35 | 1.0190 |
| 3.36 | 1.0848 |
| 3.37 | 1.1392 |
| 3.38 | 1.1838 |
| 3.39 | 1.2200 |
| 3.40 | 1.2494 |
| 3.41 | 1.2732 |
| 3.42 | 1.2926 |
| 3.43 | 1.3080 |
| 3.44 | 1.3196 |
| 3.45 | 1.3270 |
| 3.46 | 1.3294 |
| 3.47 | 1.3257 |
| 3.48 | 1.3145 |
| 3.49 | 1.2942 |
| 3.50 | 1.2634 |
| 3.51 | 1.2207 |
| 3.52 | 1.1653 |
| 3.53 | 1.0967 |
| 3.54 | 1.0151 |
| 3.55 | 0.9211 |
| 3.56 | 0.8162 |
| 3.57 | 0.7025 |
| 3.58 | 0.5825 |
| 3.59 | 0.4595 |
| 3.60 | 0.3367 |
| 3.61 | 0.2177 |
| 3.62 | 0.1060 |
| 3.63 | 0.0049 |
| 3.64 | −0.0826 |
| 3.65 | −0.1545 |
| 3.66 | −0.2089 |
| 3.67 | −0.2452 |
| 3.68 | −0.2633 |
| 3.69 | −0.2641 |
| 3.70 | −0.2493 |
| 3.71 | −0.2210 |
| 3.72 | −0.1823 |
| 3.73 | −0.1361 |
| 3.74 | −0.0860 |
| 3.75 | −0.0350 |
| 3.76 | 0.0138 |
| 3.77 | 0.0580 |
| 3.78 | 0.0958 |
| 3.79 | 0.1261 |
| 3.80 | 0.1488 |
| 3.81 | 0.1646 |
| 3.82 | 0.1753 |
| 3.83 | 0.1832 |
| 3.84 | 0.1916 |
| 3.85 | 0.2041 |
| 3.86 | 0.2246 |
| 3.87 | 0.2571 |
| 3.88 | 0.3053 |
| 3.89 | 0.3725 |
| 3.90 | 0.4613 |
| 3.91 | 0.5734 |
| 3.92 | 0.7094 |
| 3.93 | 0.8688 |
| 3.94 | 1.0499 |
| 3.95 | 1.2498 |
| 3.96 | 1.4643 |
| 3.97 | 1.6885 |
| 3.98 | 1.9166 |
| 3.99 | 2.1422 |
| 4.00 | 2.3588 |
| 4.01 | 2.5597 |
| 4.02 | 2.7387 |
| 4.03 | 2.8901 |
| 4.04 | 3.0090 |
| 4.05 | 3.0916 |
| 4.06 | 3.1355 |
| 4.07 | 3.1392 |
| 4.08 | 3.1031 |
| 4.09 | 3.0286 |
| 4.10 | 2.9184 |
| 4.11 | 2.7766 |
| 4.12 | 2.6079 |
| 4.13 | 2.4179 |
| 4.14 | 2.2126 |
| 4.15 | 1.9984 |
| 4.16 | 1.7814 |
| 4.17 | 1.5674 |
| 4.18 | 1.3618 |
| 4.19 | 1.1692 |
| 4.20 | 0.9932 |
| 4.21 | 0.8366 |
| 4.22 | 0.7012 |
| 4.23 | 0.5878 |
| 4.24 | 0.4961 |
| 4.25 | 0.4253 |
| 4.26 | 0.3738 |
| 4.27 | 0.3392 |
| 4.28 | 0.3193 |
| 4.29 | 0.3113 |
| 4.30 | 0.3126 |
| 4.31 | 0.3207 |
| 4.32 | 0.3335 |
| 4.33 | 0.3492 |
| 4.34 | 0.3664 |
| 4.35 | 0.3843 |
| 4.36 | 0.4024 |
| 4.37 | 0.4206 |
| 4.38 | 0.4391 |
| 4.39 | 0.4584 |
| 4.40 | 0.4790 |
| 4.41 | 0.5015 |
| 4.42 | 0.5261 |
| 4.43 | 0.5531 |
| 4.44 | 0.5824 |
| 4.45 | 0.6134 |
| 4.46 | 0.6455 |
| 4.47 | 0.6775 |
| 4.48 | 0.7081 |
| 4.49 | 0.7356 |
| 4.50 | 0.7586 |
| 4.51 | 0.7753 |
| 4.52 | 0.7843 |
| 4.53 | 0.7844 |
| 4.54 | 0.7749 |
| 4.55 | 0.7554 |
| 4.56 | 0.7260 |
| 4.57 | 0.6877 |
| 4.58 | 0.6417 |
| 4.59 | 0.5900 |
| 4.60 | 0.5349 |
| 4.61 | 0.4792 |
| 4.62 | 0.4257 |
| 4.63 | 0.3776 |
| 4.64 | 0.3376 |
| 4.65 | 0.3084 |
| 4.66 | 0.2923 |
| 4.67 | 0.2909 |
| 4.68 | 0.3053 |
| 4.69 | 0.3356 |
| 4.70 | 0.3812 |
| 4.71 | 0.4408 |
| 4.72 | 0.5123 |
| 4.73 | 0.5927 |
| 4.74 | 0.6789 |
| 4.75 | 0.7670 |
| 4.76 | 0.8531 |

TABLE 7-continued

Chromium(III) Acetate Model d(r) data points.

| r (Å) | d(r) Cr(OAc)$_3$ |
|---|---|
| 4.77 | 0.9330 |
| 4.78 | 1.0031 |
| 4.79 | 1.0599 |
| 4.80 | 1.1004 |
| 4.81 | 1.1223 |
| 4.82 | 1.1242 |
| 4.83 | 1.1055 |
| 4.84 | 1.0664 |
| 4.85 | 1.0082 |
| 4.86 | 0.9327 |
| 4.87 | 0.8425 |
| 4.88 | 0.7411 |
| 4.89 | 0.6319 |
| 4.90 | 0.5189 |
| 4.91 | 0.4059 |
| 4.92 | 0.2967 |
| 4.93 | 0.1948 |
| 4.94 | 0.1030 |
| 4.95 | 0.0237 |
| 4.96 | −0.0414 |
| 4.97 | −0.0913 |
| 4.98 | −0.1261 |
| 4.99 | −0.1460 |
| 5.00 | −0.1524 |
| 5.01 | −0.1470 |
| 5.02 | −0.1319 |
| 5.03 | −0.1095 |
| 5.04 | −0.0824 |
| 5.05 | −0.0531 |
| 5.06 | −0.0239 |
| 5.07 | 0.0030 |
| 5.08 | 0.0261 |
| 5.09 | 0.0440 |
| 5.10 | 0.0561 |
| 5.11 | 0.0621 |
| 5.12 | 0.0623 |
| 5.13 | 0.0574 |
| 5.14 | 0.0483 |
| 5.15 | 0.0364 |
| 5.16 | 0.0230 |
| 5.17 | 0.0096 |
| 5.18 | −0.0026 |
| 5.19 | −0.0125 |
| 5.20 | −0.0191 |
| 5.21 | −0.0220 |
| 5.22 | −0.0210 |
| 5.23 | −0.0162 |
| 5.24 | −0.0082 |
| 5.25 | 0.0021 |
| 5.26 | 0.0137 |
| 5.27 | 0.0255 |
| 5.28 | 0.0362 |
| 5.29 | 0.0447 |
| 5.30 | 0.0500 |
| 5.31 | 0.0514 |
| 5.32 | 0.0486 |
| 5.33 | 0.0414 |
| 5.34 | 0.0303 |
| 5.35 | 0.0160 |
| 5.36 | −0.0002 |
| 5.37 | −0.0170 |
| 5.38 | −0.0325 |
| 5.39 | −0.0449 |
| 5.40 | −0.0524 |
| 5.41 | −0.0531 |
| 5.42 | −0.0455 |
| 5.43 | −0.0282 |
| 5.44 | −0.0003 |
| 5.45 | 0.0387 |
| 5.46 | 0.0886 |
| 5.47 | 0.1488 |
| 5.48 | 0.2184 |
| 5.49 | 0.2957 |
| 5.5 | 0.3787 |
| 5.51 | 0.4652 |
| 5.52 | 0.5528 |
| 5.53 | 0.6388 |
| 5.54 | 0.7207 |
| 5.55 | 0.7963 |
| 5.56 | 0.8635 |
| 5.57 | 0.9207 |
| 5.58 | 0.9666 |
| 5.59 | 1.0005 |
| 5.60 | 1.0223 |
| 5.61 | 1.0322 |
| 5.62 | 1.0313 |
| 5.63 | 1.0205 |
| 5.64 | 1.0017 |
| 5.65 | 0.9764 |
| 5.66 | 0.9468 |
| 5.67 | 0.9145 |
| 5.68 | 0.8816 |
| 5.69 | 0.8495 |
| 5.70 | 0.8196 |
| 5.71 | 0.7927 |
| 5.72 | 0.7695 |
| 5.73 | 0.7499 |
| 5.74 | 0.7338 |
| 5.75 | 0.7204 |
| 5.76 | 0.7087 |
| 5.77 | 0.6977 |
| 5.78 | 0.6859 |
| 5.79 | 0.6720 |
| 5.80 | 0.6548 |
| 5.81 | 0.6333 |
| 5.82 | 0.6065 |
| 5.83 | 0.5739 |
| 5.84 | 0.5356 |
| 5.85 | 0.4916 |
| 5.86 | 0.4427 |
| 5.87 | 0.3900 |
| 5.88 | 0.3346 |
| 5.89 | 0.2783 |
| 5.9 | 0.2227 |
| 5.91 | 0.1695 |
| 5.92 | 0.1204 |
| 5.93 | 0.0771 |
| 5.94 | 0.0407 |
| 5.95 | 0.0123 |
| 5.96 | −0.0076 |
| 5.97 | −0.0187 |
| 5.98 | −0.0214 |
| 5.99 | −0.0164 |
| 6.00 | −0.0046 |

The high energy X-ray diffraction g(r) data points of the chromium(III) 2-ethylhexanoate composition prepared according to the procedure of Example 5, the Hart chromium (III) 2-ethylhexanoate composition, and the first commercially available chromium(III) 2-ethylhexanoate composition were compared to the calculated high energy X-ray diffraction data points of the mononuclear chromium(III) acetate model to determine how well these chromium(III) 2-ethylhexanoate compositions compared to a mononuclear chromium(III) 2-ethylhexanoate via a model of a mononuclear chromium(III) acetate. The comparisons were performed by separately optimizing the fit between each chromium(III) 2-ethylhexanoate composition and the chromium (III) acetate model over the desired range of r values and calculating the goodness of fit test value, $R^2$, via the equation $R^2=1-(SS_{err}/SS_{tot})$ for the same range of r as described herein Each optimization fit was performed by 1) converting the calculated high energy X-ray diffraction d(r) data points for the mononuclear chromium(III) acetate model to calculated high energy X-ray diffraction g(r)data points for the mononuclear chromium(III) acetate model and scaling the calculated high energy X-ray diffraction g(r)data points to the high energy X-ray diffraction data points of the chromium(III) 2-ethylhexanoate composition using the equation g(r)=((((d(r)/(4π*r*ρ$_0$))+1)*fac)+C) and 2) minimizing the sum of the squared differences between the calculated high energy X-ray diffraction g(r) data points for the mononuclear chromium(III) acetate model and the high energy X-ray diffraction g(r) data points of the chromium(III) 2-ethylhexanoate composition using rho, fac, and C as scaling and optimization variables under the constraint that the scaled and optimized calculated high energy X-ray diffraction g(r) data point for the mononuclear chromium(III) acetate model g(r) data point at r=1.79 Angstroms is equal to 0. Within this procedure, g(r)=(d(r)/(4π*r*ρ$_0$)) converts the radial distribution d(r) data points of the optimized mononuclear chromium(III) acetate model presented Table 6 to g(r) data points which can be compared to the high energy X-ray diffraction g(r) data points obtained by experiment for the tested chromium(III) 2-ethylhexanoate compositions, and fac and C are scaling factors to allow for an optimum fit between the calculated high energy X-ray diffraction data points of the mononuclear chromium(III) acetate model to the high energy X-ray diffraction data points of the chromium(III) 2-ethylhexanoate compositions. The optimization operations were performed using the Solver function within the Microsoft® Excel spreadsheet program but can be performed using other programs capable of solving for the minimum sum of squared differences using ρ$_0$, fac, and C as variables in the scaling function under a constraint that the mononuclear chromium(III) acetate model g(r) data point (resulting from the scaling operation) at r=1.79 Angstroms equals 0.

The following procedure provides the steps utilized to create the Microsoft® Excel worksheet to optimize the fit between the high energy X-ray diffraction g(r) data points of the chromium(III) 2-ethylhexanoate composition of Example 5 and the calculated high energy X-ray diffraction d(r) data points of the chromium(III) acetate model over an r value range of 1.3 to 4.0. Within a clean Microsoft® Excel worksheet:

1. The values of r from 1.00 to 6.00 separated by the interval of 0.01 were placed into cells A10-A510 in ascending order.
2. The corresponding values of d(r) for each r value of the calculated high energy X-ray diffraction d(r) data points of the chromium(III) acetate model from Table 7 were placed into cells B10-B510.
3. The corresponding values of g(r) for each r value of the high energy X-ray diffraction g(r) data point of one of the chromium 2-ethylhexanoate sample of Example 5 were placed in cells C10-C510.
4. A non-zero initial guess for ρ$_0$, a non-zero initial guess for the optimization constant fac, and an initial guess for the optimization constant C were placed in cells D4, D5, and D6, respectively.
5. The formula =((($B10/(4*PI( )*$A10*$D$4))+1)*$D$5)+$D$6 was placed into cell D10 and then referentially copied into cells D11-D510 (i.e., when referentially copied, the formula in D510 was =((($B510/(4*PI( )$A510*SD$4))+1)*$D$5)+$D$6).
6. The formula =SUM(E10:E510) was placed into cell E8.
7. The formula =(C40-D40)^2 was placed in cell E40 and referentially copied into cells E41-E310 (i.e., when referentially copied, the formula in E310 was =(C310-D310)^2) and ensuring that cells E10-E39 and E311-E510 were blank.
8. The optimization between the high energy X-ray diffraction g(r) data points of the chromium(III) 2-ethylhexanoate composition of Example 5 and the calculated high energy X-ray diffraction d(r) data points of the chromium(III) acetate model was then performed by:
   a. Opening the Solver routine in Microsoft® Excel;
   b. Inputting E8 the Solver routine box labeled "Set Target Cell";
   c. Selecting the target cell to equal to a minimum value;
   d. Inputting cells D4, D5, and D6 ($D$4:$D$6) into the Solver routine box labeled "By Changing Cells";
   e. Inputting the constraint that cell $D$89=0 into the Solver routine box labeled "Subject to the Constraints";
   f. Clicking the solve box and then clicking the OK button if Solver routine successfully converged to a solution (while ensuring that the keep solution radio button was selected).

It should be noted that these steps created a worksheet that includes data points and utilize general formulas, relational formulas, and procedures that can allow the worksheet to be adapted to optimizing the fit between the high energy X-ray diffraction g(r) data points of the chromium(III) 2-ethylhexanoate composition of Example 6 and the calculated high energy X-ray diffraction d(r) data points of the chromium (III) acetate model over other r values ranges.

When performing the procedure to optimize the fit between the high energy X-ray diffraction g(r) data points of the chromium(III) 2-ethylhexanoate composition of Example 5 and the calculated high energy X-ray diffraction d(r) data points of the chromium(III) acetate model and utilizing initial values of ρ$_0$=0.1, fac=0.1, and C=0, the Solver routine converged to a solution having ρ$_0$=0.0101, fac=0.1410, and C=0.1266 (rounded to four decimal places), and a minimized sum of the squared differences between the calculated high energy X-ray diffraction g(r) data points for the mononuclear chromium(III) acetate model and the high energy X-ray diffraction g(r) data points of the chromium (III) 2-ethylhexanoate composition of Example 5 equal to (rounded to four decimal places) 136.5504. It should be noted that there can be multiple converge solutions for the values of ρ$_0$, fac, and C which can provide the same minimized sum of the squared differences between the calculated high energy X-ray diffraction g(r) data points for the mononuclear chromium(III) acetate model and the high energy X-ray diffraction g(r) data points of the chromium (III) 2-ethylhexanoate composition. Often the difference in the converged values of ρ$_0$, fac, and C can be the selection of the initial values for ρ$_0$, fac, and C. For example, a minimized sum of the squared differences between the calculated high energy X-ray diffraction g(r) data points for the mononuclear chromium(III) acetate model and the high energy X-ray diffraction g(r) data points of the chromium (III) 2-ethylhexanoate composition of Example 5 of 136.5487 (rounded to four decimal places) can be obtained utilizing initial values of ρ$_0$=0.1, fac=0.1, and C=0.1 (which converge to provide values of to a solution having ρ$_0$=0.0203, fac=0.2828, and C=−0.0152, rounded to four decimal places) or utilizing initial values of $\rho_0=0.2$, fac=0.2, and C=0 (which converge to provide values of to a solution having $\rho_0=0.0230$, fac=0.3207, and C=−0.0531, rounded to four decimal places). Consequently, the initial values of $\rho_0$, fac, and C, and the converged values of $\rho_0$, fac, and C are not particularly important as long as the true minimized sum of the squared differences between the calculated high energy X-ray diffraction g(r) data points for the mononuclear chromium(III) acetate model and the high energy X-ray diffraction g(r) data points of the chromium(III) 2-ethylhexanoate composition is obtained.

The goodness of fit test value was then calculated by applying the equation $$R^2 = 1 - (SS_{err}/SS_{tot})$$

where $SS_{err} = \Sigma_{r(int)}^{r(fin)}(\text{comp } g(r) - \text{model } g(r))^2$ and $SS_{tot} = \Sigma_{r(int)}^{r(fin)}(\text{comp } g(r) - \text{mean of model } g(r))^2$ where r(int) is the initial r value of g(r) over which the goodness of fit is to be calculates and r(fin) is the final r value of g(r) over which the goodness of fit is to be calculated. Generally, the goodness of fit test can be applied over the same range of r values as the optimization between the chromium(III) carboxylate composition and the chromium(III) acetate model. However, in some instances, it can be desirable to perform the goodness of fit test over a subset of the r values over which optimization between the chromium(III) carboxylate composition and the chromium(III) acetate model was performed.

The following procedure provides the steps utilized to extend the Microsoft® Excel worksheet utilized to optimize the fit between the high energy X-ray diffraction g(r) data points of the chromium(III) 2-ethylhexanoate composition of Example 5 and the calculated high energy X-ray diffraction d(r) data points of the chromium(III) acetate model over an r value range of 1.3 to 4.0 to include the formulas to calculate the goodness of fit test value, $R^2$, between the optimized fit between the high energy X-ray diffraction g(r) data points of the chromium(III) 2-ethylhexanoate composition of Example 5 and the calculated high energy X-ray diffraction d(r) data points of the chromium(III) acetate model over an r value range of 1.3 to 4.0. The procedure builds upon the Microsoft® Excel worksheet utilized to optimize the fit between the high energy X-ray diffraction g(r) data points of the chromium(III) 2-ethylhexanoate composition of Example 5 and the calculated high energy X-ray diffraction d(r) data points of the chromium(III) acetate model over an r value range of 1.3 to 4.0. It should be noted the steps to create the worksheet include data points and utilize general formulas, relational formulas, and procedures to allow the worksheet to be easily adapted to calculate the goodness of fit between the optimized fit between the high energy X-ray diffraction g(r) data points of the chromium (III) 2-ethylhexanoate composition of Example 5 and the calculated high energy X-ray diffraction d(r) data points of the chromium(III) acetate model over other r values ranges.

Within Microsoft® Excel worksheet created to optimize the fit between the high energy X-ray diffraction g(r) data points of the chromium(III) 2-ethylhexanoate composition of Example 5 and the calculated high energy X-ray diffraction d(r) data points of the chromium(III) acetate model over an r value range of 1.3 to 4.0:

1. The formula =SUM(F10:F510) was place into cell F8.
2. The number 1 into cells F40 to F310 (the cells corresponding the r value range over which the goodness of fit is to be calculated—all other cells over the range of F10 to F510 are blank).
3. The formula =SUM(G10:G510) was placed into cell G8.
4. The =(C40-D40)^2 was placed into cell G40 and was then referentially copied into cells G41-G310 (i.e. when referentially copied, the formula in G310 was =(C310-D310)^2).
5. The formula =SUM(H10:H510) was placed into cell H8.
6. The formula =C40 was placed into cell H40 and was then referentially copied into cells H41-H310 (i.e., when referentially copied, the formula in H310 was =C310).
7. The formula =SUM(I10:I510) was placed into cell I8.
8. The formula =(H40-(H$8/F$8))^2 was placed into cell I40 and was then referentially copied into cells I41-I310 (i.e., when referentially copied, the formula in I31 was =(H311-(H$8/F$8))^2).
9. The formula =1-(G8/I8) was placed into cell I4 and provides the goodness of fit test value.

It should be noted that these steps created a worksheet that includes data points and utilize general formulas, relational formulas, and procedures that would allow the worksheet to be adapted to calculating the goodness of fit test value between the optimized fit between the high energy X-ray diffraction g(r) data points of the chromium(III) 2-ethylhexanoate composition of Example 5 and the calculated high energy X-ray diffraction d(r) data points of the chromium (III) acetate model over other r values ranges by selecting the appropriate cell references and formulas.

Figure 19:
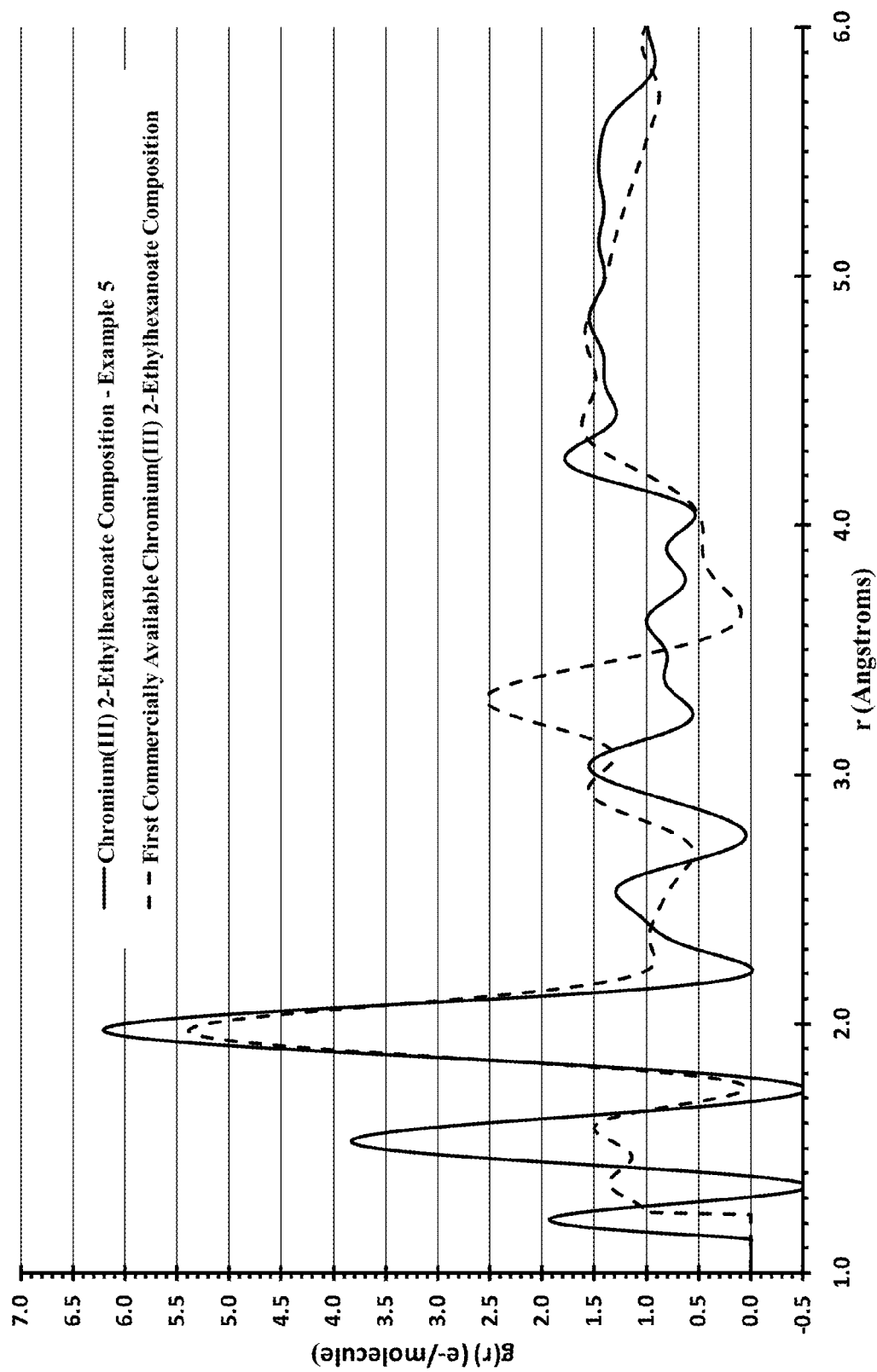
FIG. 19 provides a comparison between the high energy X-ray diffraction g(r) data points of a chromium(III) 2-ethyl hexanoate composition prepared according to the procedures described herein and the high energy X-ray diffraction g(r) data points of a first commercially available chromium (III) 2-ethyl hexanoate composition.
Figure 20:
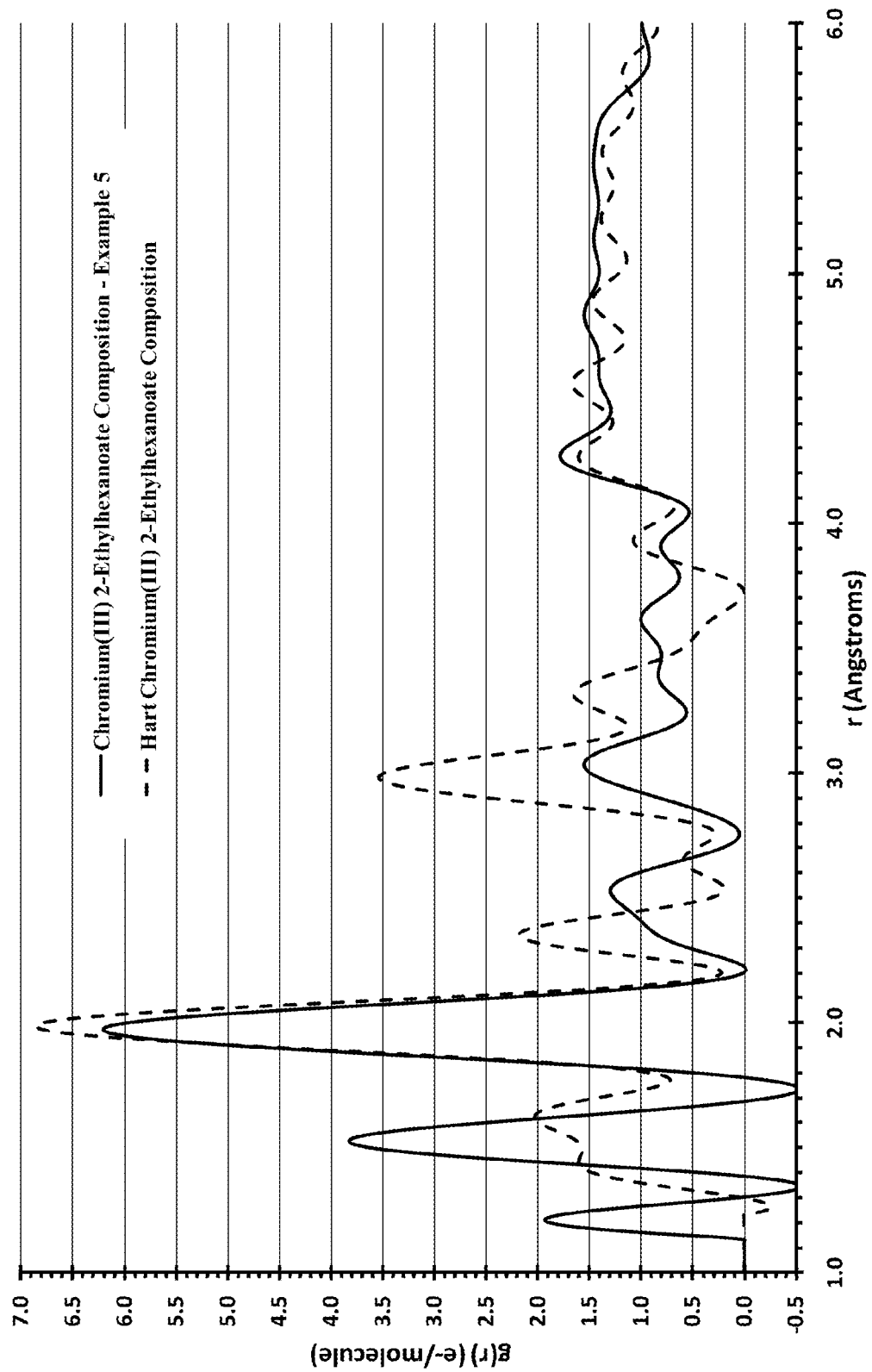
FIG. 20 provides a comparison between the high energy X-ray diffraction g(r) data points of a chromium(III) 2-ethyl hexanoate composition prepared according to the procedures described herein and the high energy X-ray diffraction g(r) data points of a literature reported chromium(III) 2-ethyl hexanoate composition.
Figure 21:
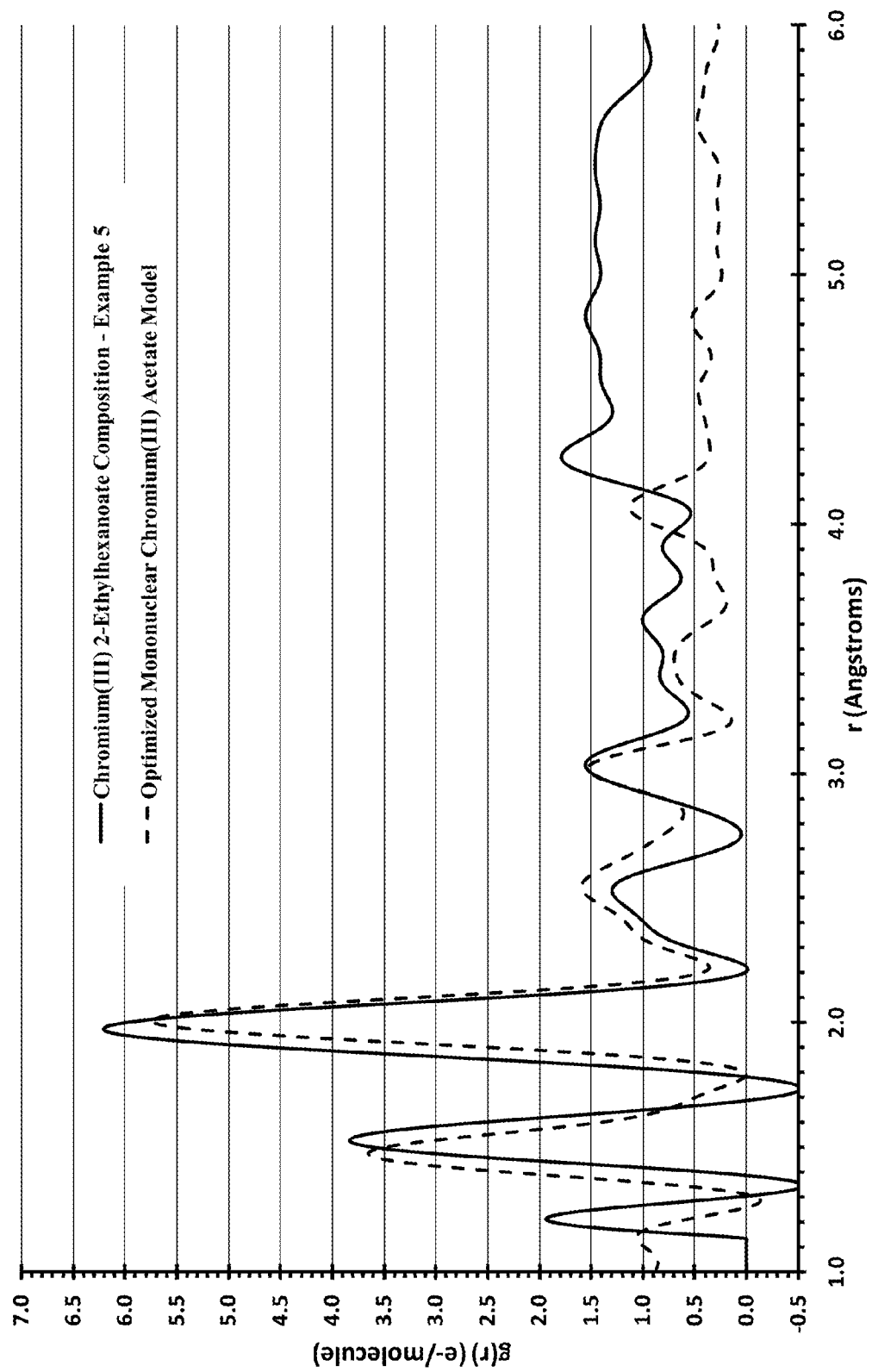
FIG. 21 provides a comparison between the high energy X-ray diffraction g(r) data points of a chromium(III) 2-ethyl hexanoate composition prepared according to the procedures described herein and an optimized calculated high energy X-ray diffraction g(r) data points of a theoretical mononuclear chromium(III) acetate model.
Figure 22:
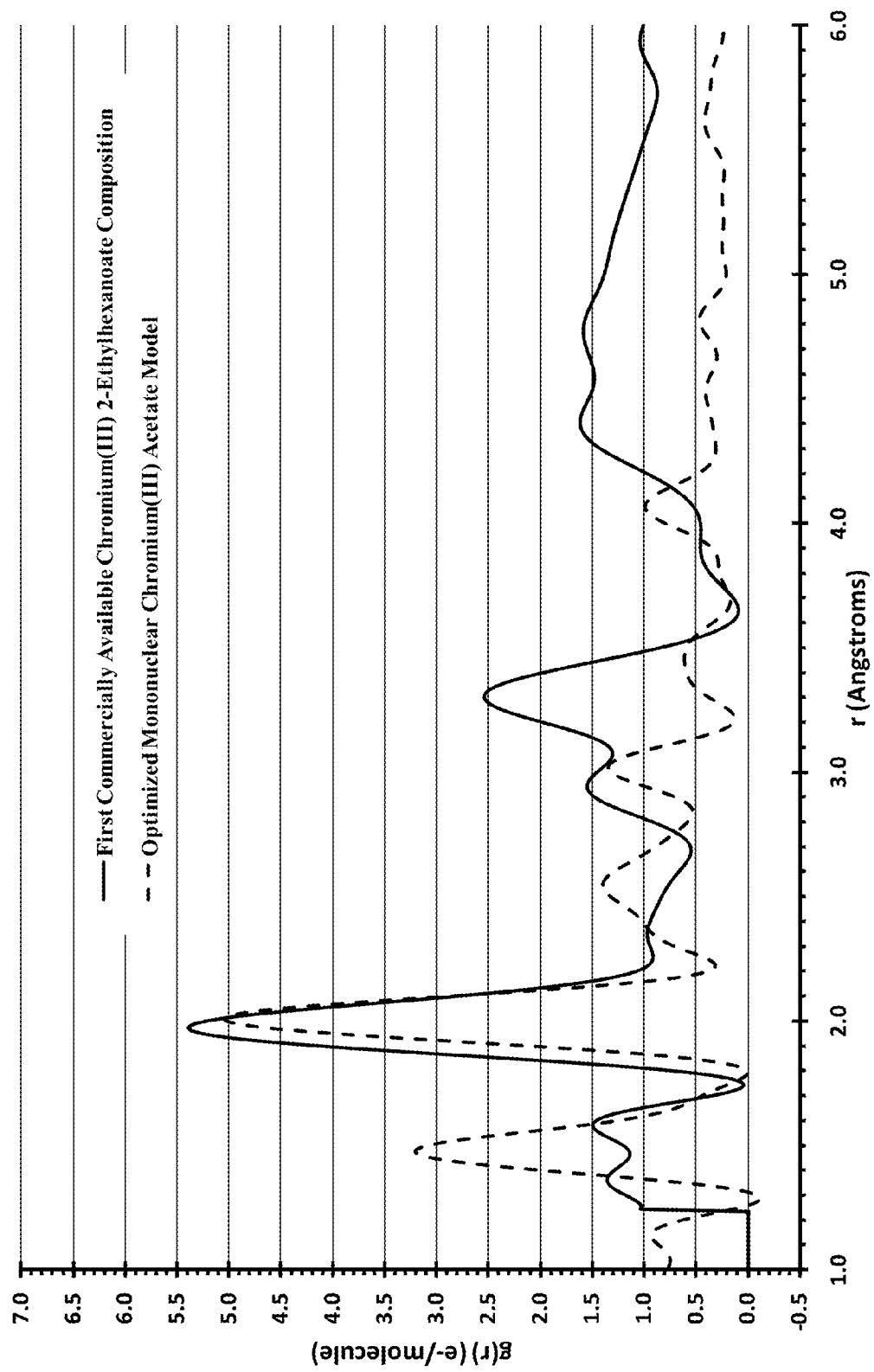
FIG. 22 provides a comparison between the high energy X-ray diffraction g(r) data points of a commercially available chromium(III) 2-ethyl hexanoate composition and an optimized calculated high energy X-ray diffraction g(r) data points of a theoretical mononuclear chromium(III) acetate model.
Figure 23:
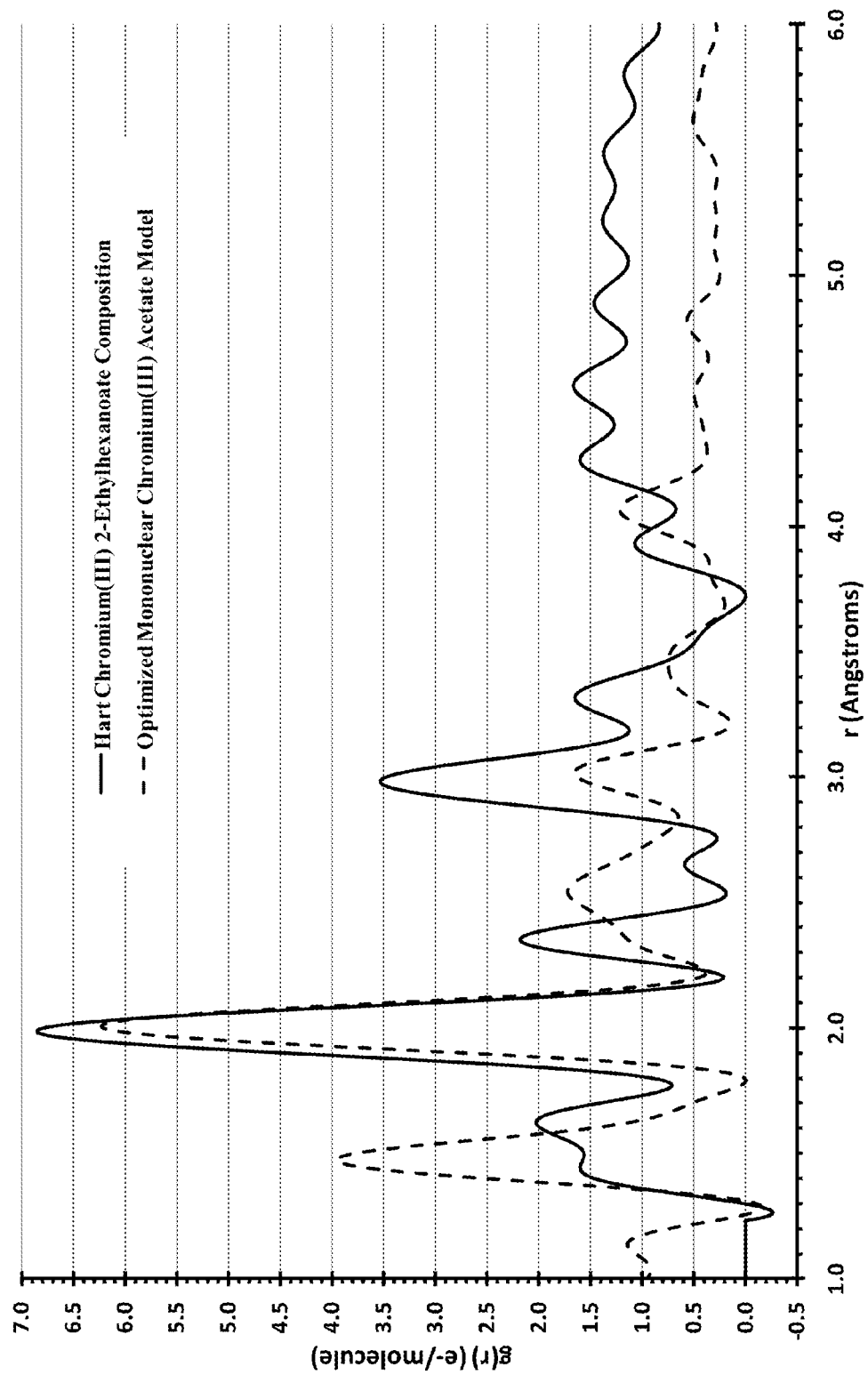
FIG. 23 provides a comparison between the high energy X-ray diffraction g(r) data points of a literature prepared chromium(III) 2-ethylhexanoate composition and an optimized calculated high energy X-ray diffraction g(r) data points of a theoretical mononuclear chromium(III) acetate model.

Table 8 provides the goodness of fit test values for comparing the high energy X-ray diffraction g(r) data points of the chromium(III) 2-ethylhexanoate composition prepared according to the procedure of Example 5, the high energy X-ray diffraction of the first commercially available chromium(III) 2-ethylhexanoate composition, and the Hart chromium(III) 2-ethylhexanoate composition to a calculated high energy X-ray diffraction g(r) points of a mononuclear chromium(III) acetate model for various ranges of r. In each instance, the optimization was performed between the indicated chromium(III) 2-ethylhexanoate and the calculated and high energy X-ray diffraction d(r) points of the mononuclear chromium(III) acetate model in Table 7 over the identical r value range as the r values for the goodness of fit test values. FIGS. 18, 19, and 20, provide plots comparing the high energy X-ray diffraction g(r) data of the chromium (III) 2-ethylhexanoate composition prepare according to the procedure of Example 5, the first commercially available chromium(III) 2-ethylhexanoate composition, and an aqueous metathesis produced sample of chromium(III) acetate to the calculated high energy X-ray diffraction g(r) data of the mononuclear chromium(III) acetate model (optimized over the r value range of 1.3 to 4.0 Angstroms) described herein. The goodness of fit test values and FIGS. 18, 19, and 20 show that the chromium(III) 2-ethylhexanoate composition prepared according to the procedure of Example 5 more closely resembles a mononuclear chromium(III) carboxylate (via comparison to a mononuclear chromium(III) acetate model) than the first commercially available chromium(III) 2-ethylhexanoate composition and the aqueous metathesis produced sample of chromium(III) acetate.

TABLE 8

Goodness of fit test values for comparison of the high energy X-ray diffraction g(r) data points of three the chromium(III) 2-ethylhexanoate compositions to a calculated high energy X-ray diffraction g(r) points of a mononuclear chromium(III) acetate model for various ranges of r.

|  | Chromium(III) 2-Ethyl-hexanoate Composition of Example 5 | 1$^{st}$ Commercially Available Chromium(III) 2-Ethyl-hexanoate Composition | Hart Chromium(III) 2-ethylhexanoate |
|---|---|---|---|
| 1.3 to 3.0 | 0.761 | 0.585 | 0.570 |
| 1.3 to 3.1 | 0.760 | 0.582 | 0.542 |
| 1.3 to 3.2 | 0.757 | 0.517 | 0.531 |
| 1.3 to 3.3 | 0.758 | 0.365 | 0.506 |
| 1.3 to 3.4 | 0.759 | 0.266 | 0.492 |
| 1.3 to 3.5 | 0.760 | 0.250 | 0.501 |
| 1.3 to 3.6 | 0.757 | 0.284 | 0.517 |
| 1.3 to 3.7 | 0.749 | 0.326 | 0.538 |
| 1.3 to 3.8 | 0.747 | 0.354 | 0.556 |
| 1.3 to 3.9 | 0.746 | 0.371 | 0.559 |
| 1.3 to 4.0 | 0.746 | 0.385 | 0.559 |

Olefin Oligomerizations

Catalyst System Preparation for Batch Ethylene Oligomerizations

Catalyst system solutions for the batch ethylene oligomerizations were prepared in a drybox free of oxygen and moisture. The molar ratio of triethylaluminum (TEA) to diethylaluminum chloride (DEAC) to 2,5-dimethylpyrrole (DMP) to chromium (Cr) were varied to achieve the desired TEA:DEAC:DMP:Cr ratio.

Anhydrous, degassed ethylbenzene was added to a dry vial. To this vial was added neat triethylaluminum (TEA) and neat diethylaluminum chloride (DEAC) in amounts which would lead to the desired catalyst component ratios at a catalyst system chromium concentration of 5.0 mg Cr/mL. The vial contents were mixed and allowed to stand for 15 minutes. 2,5-Dimethylpyrrole (in an amount which would lead to the desired catalyst component ratios at a catalyst system chromium concentration of 5.0 mg Cr/mL) was then slowly added to the vial and as gas evolution was observed in most cases. The chromium(III) 2-ethylhexanoate composition of choice was first diluted to an approximately 7 wt % Cr in ethylbenzene and then the diluted chromium(III) 2-ethylhexanoate composition was added slowly to the alkylaluminum/pyrrole solution with stirring to produce the catalyst system solution. The catalyst system solution was then diluted to a concentration of 5.0 mg Cr/mL with the appropriate amount of ethylbenzene. Prior to charging the catalyst system to the selective ethylene oligomerization reactor, 0.5 mL of the ethylbenzene diluted catalyst solution (2.5 mg Cr) was diluted with 24.5 mL cyclohexane to aid in catalyst system handling and selective ethylene oligomerization reactor charging.

Catalyst System Preparation for Continuous Ethylene Oligomerizations

The catalyst systems for the continuous ethylene oligomerizations were prepared in a dry box having a controlled helium blanket keeping it free of oxygen and moisture. The molar ratio of triethylaluminum (TEA) to Diethylaluminum chloride (DEAC) to 2,5-dimethylpyrrole (DMP) to chromium (Cr) were varied to achieve the desired TEA:DEAC:DMP:Cr ratio.

Anhydrous degassed ethylbenzene (15.85 g) was added to a dry 100 mL volumetric flask. To the flask was added neat triethylaluminum (TEA) and neat diethylaluminum chloride (DEAC) in an amount which would lead to the desired catalyst component ratios when adding 4.76 g chromium (III) 2-ethylhexanoate (at a later step) similar to the first commercially available chromium(III) 2-ethylhexanoate and mixed. 2,5-Dimethylpyrrole was then added to the flask in an amount which would lead to the desired catalyst component ratios when adding 4.76 g chromium(III) 2-ethylhexanoate (at a later step) similar to the first commercially available chromium(III) 2-ethylhexanoate. Chromium (III) 2-ethylhexanoate similar to the first commercially available chromium(III) 2-ethylhexanoate (4.76 g) was dissolved in ethylbenzene (2.38 g). The solution of chromium (III) 2-ethylhexanoate similar to the first commercially available chromium(III) 2-ethylhexanoate (4.76 g) was dissolved in 2.38 g ethylbenzene was then added to the 100 mL volumetric flask. The volume was brought to 100 mL with ethylbenzene and the solution stored under an inert atmosphere.

Batch Selective Ethylene Oligomerization Procedure

Under nitrogen atmosphere, a 1 liter autoclave reactor (316 SS) was prepared and dried by charging a solution of triethylaluminum (2 g) in cyclohexane (400 mL) to the autoclave reactor and stirring the solution vigorously for 18 hours. The contents of the reactor were then discharged through the autoclave reactor's bottom value. Dry cyclohexane (400 mL) was then charged to the reactor stirred for a brief period and then discharged through the autoclave reactor's bottom valve leaving a nitrogen atmosphere in the autoclave.

A catalyst system solution (25 mL) was transferred to a stainless steel (316 SS) charge cylinder (50 mL) in an inert atmosphere drybox. The catalyst system charge cylinder was then removed from the inert atmosphere drybox. Cyclohexane (200 mL) was then charged to the previously prepared and dried autoclave reactor. The contents of the catalyst system charge cylinder were then charged to the autoclave reactor along with additional cyclohexane (200 mL). The autoclave reactor was then heated to 60° C. and charged to 50 psig with hydrogen. The autoclave reactor was then heated to 109° C. and the autoclave reactor atmosphere was vented to 50 psig. The autoclave reactor's air-driven stir impeller was activated and the oligomerization initiated by slow addition of ethylene over 10 minutes to the desired operating pressure. The oligomerization reaction temperature was brought to and maintained at the desired temperature by the appropriate use of an external electrical heating mantle and internal steam-fed coils. Ethylene was continuously fed, on-demand, to maintain the desired operating pressure.

Upon oligomerization completion, the autoclave reactor contents were discharged through the autoclave reactor's bottom into a vessel containing the catalyst system kill agent (n-octanol, 2 mL). The product was then isolated, weighed, and analyzed by GC-FID.

Example 8

Batch ethylene oligomerization experiments were conducted according to the batch selective ethylene oligomerization procedure described herein to examine the effect that the pyrrole:chromium molar ratio within an olefin trimerization catalyst system composed of triethylaluminum/diethylaluminum chloride/2,5-dimethylpyrrole/chromium(III) 2-ethylhexanoate (TEA/DEAC/DMP/Cr(EH)$_3$) had upon an olefin trimerization catalyst system utilizing chromium(III) 2-ethylhexanoate prepared according to the procedure of Example 5 (Runs 101-103).

In runs 101-103, the DMP:Cr molar ratio was varied for the olefin trimerization catalyst system utilizing a chromium (III) 2-ethylhexanoate prepared according the procedure utilized in Example 5. These batch selective ethylene oligomerization runs were performed at 115° C., 600-800 psig ethylene pressure with ethylene uptake on demand, 50 psig H$_2$, and a 30 minute reactor residence time. The catalyst systems were prepared according to the catalyst system for batch ethylene oligomerizations procedure described herein to provide a 25 mL of solution containing 2.5 mg chromium and the catalyst system component ratios provided in Table 9. Table 9 provides the catalyst system productivity, C$_6$ selectivity, and amount of 1-hexene in the C$_6$ fraction of the trimerization product for Runs 101-103.

In runs 201-205, the DMP:Cr molar ratio was varied for the olefin trimerization catalyst system utilizing chromium(III) 2-ethylhexanoate similar to that of the first commercially available chromium(III) 2-ethylhexanoate. The oligomerization reactions were preformed in a 1 liter continuous reactor operating at 115° C., 800 psig, a reactor chromium concentration of 2.75 ppm, and a solvent/ethylene ratio of 2.10. The feed rates were controlled using separate controls for each feed component. In particular, the olefin trimerization runs 201-205 were performed with an ethylene feed rate of 497 g/hr, a hydrogen feed rate of 0.5 L/hr, and an average residence time of

TABLE 9

Ethylene Oligomerization Catalyst System Productivity as a Function of DMP:Cr Molar Ratio

| Run | TEA:DEAC:DMP:Cr Molar Ratio | Al:Cr Molar Ratio | DMP:Cr Molar Ratio | Cr Productivity (g 1-C$_6^=$/g Cr) | C$_6$ Selectivity (wt. %) | C$_6$ Purity (wt. %) |
|---|---|---|---|---|---|---|
| 101 | 9:6:3:1 | 15:1 | 3.0:1 | 33,700 | 94.3 | 99.2 |
| 102 | 9:6:0.9:1 | 15:1 | 0.9:1 | 37,600 | 94.2 | 99.3 |
| 103 | 9:6:0.5:1 | 15:1 | 0.5:1 | 42,800 | 94.2 | 99.2 |

The data from the batch ethylene oligomerizations using the olefin trimerization catalyst system containing the chromium(III) 2-ethylhexanoate prepared according to Example 5 produces an olefin trimerization catalyst system having the highest productivity (as g 1-C$_6^=$/g Cr) at a pyrrole:chromium molar ratio that is around 0.5:1. However, it should be noted that the productivity (as g 1-C$_6^=$/g Cr) at pyrrole:chromium molar ratio that is around 1:1 is acceptable and could be 21 minutes. Online samples of the continuous ethylene trimerization were collected via liquid sampling valves (manufactured by Valco) and fed to an online gas chromatograph for analysis to determine Cr productivity, C$_6$ selectivity, and C$_6$ purity. Table 10 provides the catalyst system productivity, C$_6$ selectivity, and amount of 1-hexene in the C$_6$ fraction of the trimerization product for Runs 201-205.

TABLE 10

Ethylene Oligomerization Catalyst System Productivity as a Function of DMP:Cr Molar Ratio

| Run | TEA:DEAC:DMP:Cr Molar Ratio | Al:Cr Molar Ratio | DMP:Cr Molar Ratio | Cr Productivity (g 1-C$_6^=$/g Cr) | C$_6$ Selectivity (wt. %) | C$_6$ Purity (wt. %) |
|---|---|---|---|---|---|---|
| 201 | 11:8:1.5:1 | 19:1 | 1.5:1 | 40,959 | 96.3 | 99.06 |
| 202 | 11:8:2.25:1 | 19:1 | 2.25:1 | 59,537 | 95.6 | 99.54 |
| 203 | 11:8:3:1 | 19:1 | 3:1 | 80,097 | 91.0 | 99.24 |
| 204 | 11:8:3.75:1 | 19:1 | 3.75:1 | 66,171 | 95.3 | 99.48 |
| 205 | 11:8:4.5:1 | 19:1 | 4.5:1 | 80,462 | 91.5 | 99.25 | utilized if other factors indicate that it would be preferred (e.g., due to 1-hexene selectivity, undesired polymer product, oligomerization condition sensitivity, among other considerations).

Example 9

Continuous ethylene oligomerization experiments were conducted to examine the effect that the pyrrole:chromium molar ratio within an olefin trimerization catalyst system composed of triethylaluminum/diethylaluminum chloride/2, 5-dimethylpyrrole/chromium(III) 2-ethylhexanoate (TEA/DEAC/DMP/Cr(EH)$_3$) using chromium(III) 2-ethylhexanoate similar to that of the first commercially available chromium(III) 2-ethylhexanoate.

The data from the continuous ethylene oligomerizations using the olefin trimerization catalyst system containing chromium(III) 2-ethylhexanoate similar to the first commercial chromium(III) 2-ethylhexanoate sample produces an olefin trimerization catalyst system having the highest productivity (as g 1-C$_6^=$/g Cr) at pyrrole:chromium molar ratio of 3:1 or greater. It should be especially noted that the olefin trimerization catalyst system productivity (as g 1-C$_6^=$/g Cr) drops off significantly as the pyrrole:chromium molar ratio is reduced from 3:1 to 1.5:1.

FIG. 1 shows graphically how the olefin trimerization catalyst system highest productivity (as g 1-C$_6^=$/g Cr) responds to the pyrrole:chromium molar ratio for the batch ethylene oligomerization runs utilizing the chromium(III) 2-ethylhexanoate produced according to the method of Example 5 and the continuous ethylene oligomerizations utilizing chromium(III) 2-ethylhexanoate similar to the first commercial chromium(III) 2-ethylhexanoate sample. In this graph the change in productivity is shown as a percent increase or a percent increase as compared to the comparable experiment where the pyrrole:chromium molar was 3:1. This graphic clearly shows that the olefin trimerization catalyst system utilizing the two different chromium(III) 2-ethylhexanoate samples have catalyst productivities which respond differently to the pyrrole:chromium molar ratio of the olefin trimerization catalyst system. This information clearly indicates that there is a fundamental difference between the two chromium(III) 2-ethylhexanoate samples.

Example 10

Batch ethylene oligomerization experiments were conducted according to the batch ethylene oligomerization procedure described herein to examine the effect that the aluminum:chromium molar ratio within the olefin trimerization catalyst system composed of triethylaluminum/diethylaluminum chloride/2,5-dimethylpyrrole/chromium(III) 2-ethylhexanoate (TEA/DEAC/DMP/Cr(EH)$_3$) had upon an olefin trimerization catalyst system utilizing chromium(III) 2-ethylhexanoate prepared according to the procedure of Example 5 (Runs 301-304).

In runs 301-304, the aluminum:chromium molar ratio was varied for the olefin trimerization catalyst system utilizing a chromium(III) 2-ethylhexanoate prepared according to the procedure of Example 5. These batch ethylene oligomerization runs were performed at 115° C., 600-800 psig ethylene pressure with ethylene uptake on demand, 50 psig H$_2$, and a 30 minute reactor residence time. The catalyst system were prepared according to the catalyst system for batch ethylene oligomerizations procedure described herein to provide a 25 mL of solution containing 2.5 mg chromium and the catalyst system component ratios provided in Table 11. Table 11 provides the catalyst system productivity, C$_6$ selectivity, and amount of 1-hexene in the C$_6$ fraction of the trimerization product for Runs 301-303.

TABLE 11

Ethylene Oligomerization Catalyst System Productivity

| Run | TEA:DEAC:DMP:Cr Molar Ratio | Al:Cr Molar Ratio | Cr Productivity (g 1-C$_6$$^=$/g Cr) | C$_6$ Selectivity wt. % | C$_6$ Purity wt. % |
|---|---|---|---|---|---|
| 301 | 12:8:3:1 | 20:1 | 39,400 | 93.2 | 98.8 |
| 302 | 11.5:7.8:3:1 | 19.3:1 | 41,400 | 93.8 | 99.2 |
| 303 | 8.5:5.8:3:1 | 14.3:1 | 43,100 | 93.7 | 99.3 |
| 304 | 6.0:4.0:3:1 | 10:1 | 24,900 | 93.8 | 99.5 |

In Runs 301-304, the productivity change (%) reported in Table 1 is relative to a standard activation, having a 12:8:3:1 molar ratio of TEA:DEAC:DMP:Cr(EH)$_3$. In each run, the dimethylpyrrole (DMP) to chromium molar ratio was maintained at 3:1, and only the TEA:DEAC:Cr(EH)$_3$ ratio was varied.

The data from the batch ethylene oligomerizations using the olefin trimerization catalyst system containing the chromium(III) 2-ethylhexanoate prepared according to Example 5 produces an olefin trimerization catalyst system having the highest productivity (as g 1-C$_6$$^=$/g Cr) at an aluminum:chromium molar ratio around 14.3:1.

Example 11

Continuous ethylene oligomerization experiments were conducted to examine the effect that the aluminum:chromium molar ratio within an olefin trimerization catalyst system composed of triethylaluminum/diethylaluminum chloride/2,5-dimethylpyrrole/chromium(III) 2-ethylhexanoate (TEA/DEAC/DMP/Cr(EH)$_3$) using chromium(III) 2-ethylhexanoate similar to that of the first commercially available chromium(III) 2-ethylhexanoate.

The selective 1-hexene catalyst system was prepared by combining conventional Cr(EH)$_3$ diluted in a small amount of ethylbenzene (EB), 2,5-dimethylpyrrole (DMP), and a mixture of triethylaluminum (TEA) and diethylaluminum chloride (DEAC) in ethylbenzene solvent. Several catalysts were prepared with different aluminum:chromium molar ratio and then tested in a continuous ethylene oligomerization reactor system under identical conditions. All of the catalysts were prepared in ethylbenzene at chromium concentration of 5 mg/mL.

In runs 401-405, the Al:Cr molar ratio was varied for the olefin trimerization catalyst system utilizing chromium(III) 2-ethylhexanoate similar to that of the first commercially available chromium(III) 2-ethylhexanoate. The oligomerization reactions were preformed in a 1 liter continuous reactor operating at 115° C., 800 psig, a reactor chromium concentration of 2.75 ppm, a solvent/ethylene ratio of 2.10. The feed rates were controlled using separate controls for each feed component. In particular, the olefin trimerization runs 401-405 were performed with an ethylene feed rate of 497 g/hr, a hydrogen feed rate of 0.5 L/hr, and an average residence time or 21 minutes. Online samples of the continuous ethylene trimerization were collected via liquid sampling valves (manufactured by Valco) and fed to an online gas chromatograph for analysis to determine Cr productivity, C$_6$ selectivity, and C$_6$ purity. Table 12 provides the catalyst system productivity, C$_6$ selectivity, and amount of 1-hexene in the C$_6$ fraction of the trimerization product for Runs 401-403.

TABLE 12

Ethylene Oligomerization Catalyst System Productivity

| Run | TEA:DEAC:DMP:Cr Molar Ratio | Al:Cr Molar Ratio | Cr Productivity (g 1-C$_6$$^=$/g Cr) | C$_6$ Selectivity wt. % | C$_6$ Purity wt. % |
|---|---|---|---|---|---|
| 401 | 5.5:4:3:1 | 9.5:1 | na | na | na |
| 402 | 8.25:6:3:1 | 14.25:1 | 45,721 | 95.7 | 98.89 |
| 403 | 9.9:7.2:3:1 | 17.1:1 | 69,686 | 94.8 | 99.54 |
| 404 | 11:8:3:1 | 19:1 | 80,097 | 91.0 | 99.24 |
| 405 | 12.1:8.8:3:1 | 20.9:1 | 77,173 | 92.4 | 99.5 |

The olefin trimerization catalyst system prepared using an aluminum:chromium molar ratio of 9.5 produced a large amount of undesirable precipitate and was not tested in the continuous ethylene oligomerization reactor. The results of the remaining four continuous ethylene oligomerizations indicate that optimum productivity occurs around an aluminum:chromium molar ratio around 19:1 based upon the chromium and aluminum productivity data.

Figure 2:
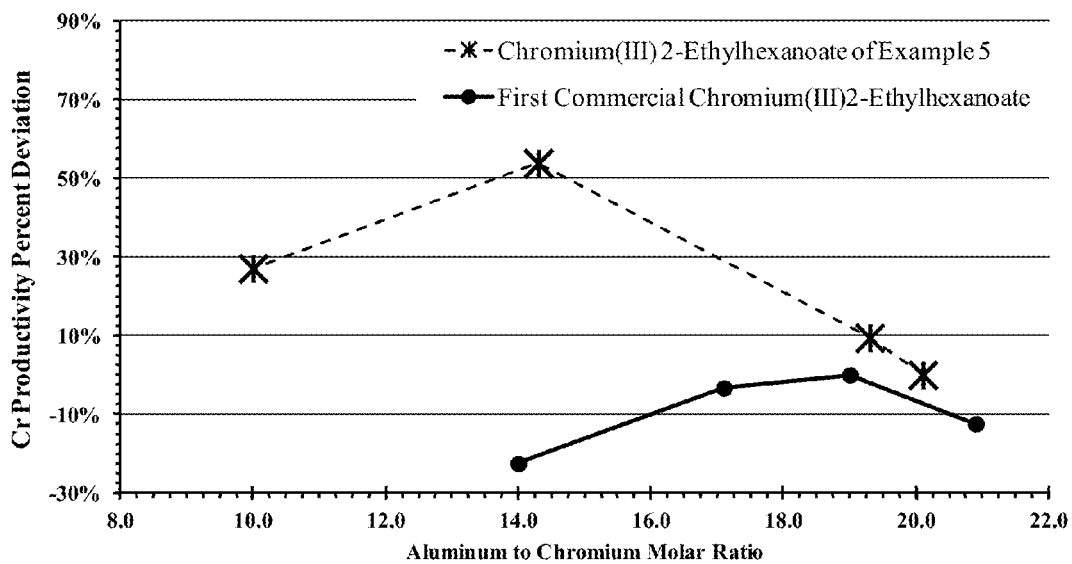
FIG. 2 presents a plot of the percent deviation of the mole percent triethyl aluminum (TEA) and diethylaluminum chloride (DEAC) combination from the standard mole percent for the TEA/DEAC combination, versus the percent difference in the resulting 1-hexene productivity, illustrating the change in ethylene oligomerization catalytic performance of a conventional tris(2-ethylhexanoate)chromium(III) [Cr(EH)$_3$] based catalyst system, in which the TEA/DEAC molar ratio was held constant at 11:8

FIG. 2 shows graphically how the olefin trimerization catalyst system highest productivity (as g 1-C$_6$$^=$/g Cr) responds to the aluminum:chromium molar ratio for the batch ethylene oligomerization runs utilizing the chromium (III) 2-ethylhexanoate produced according the method of Example 5 and the continuous ethylene oligomerizations utilizing chromium(III) 2-ethylhexanoate similar to the first commercial chromium(III) 2-ethylhexanoate sample. In this graph the change in productivity is shown as a percent increase or a percent increase as compared to the comparable experiment where the: chromium molar was approximately 19:1. This graphic clearly shows that the olefin trimerization catalyst systems utilizing the two different chromium(III) 2-ethylhexanoate samples have catalyst productivities which respond differently to the aluminum:chromium molar ratio of the olefin trimerization catalyst system. This information clearly indicates that there is a fundamental difference between the two chromium(III) 2-ethylhexanoate samples.

We claim:

1. A composition comprising:
   a) a chromium(III) $C_3$-$C_{25}$ carboxylate composition
      i) having a KBr pellet infrared spectrum with a $\upsilon_{asym}$ ($CO_2$) infrared absorbance peak within 110 cm$^{-1}$ of the $\upsilon_{sym}$ ($CO_2$) infrared peak and having an infrared absorbance peak height ratio of a $\upsilon_{asym}$ ($CO_2$) infrared absorbance peak at 1516±15 cm$^{-1}$ to infrared absorbance peak located at 700±50 cm$^{-1}$ greater than or equal to 3:1,
      ii) having a goodness of fit test value, $R^2$, of at least 0.6 when comparing high-energy X-ray diffraction g(r) data points of the chromium(III) $C_3$-$C_{25}$ carboxylate composition to calculated high energy X-ray diffraction g(r) data points of a theoretical model of mononuclear chromium(III) acetate over an r range from 1.3 Angstroms to 4 Angstroms, wherein atomic coordinates of the theoretical model of mononuclear chromium(III) acetate have been optimized to the following values

| Atom | X | Y | Z |
| --- | --- | --- | --- |
| Cr | 0 | 0 | 0 |
| C1 | 1.843475 | −0.40852 | −1.43058 |
| O1 | 0.738585 | −1.038$81 | −1.567619 |
| O2 | 1.90289 | 0.461636 | −0.494039 |
| C2 | 3.026757 | −0.697968 | −2.303537 |
| H1 | 3.586188 | 0.221029 | −2.49448 |
| H2 | 2.70492 | −1.158746 | −3.239287 |
| H3 | 3.689716 | −1.395002 | −1.777323 |
| O3 | −0.772555 | 1.631901 | −0.909192 |
| O4 | 0.481341 | 1.511899 | 1.249048 |
| C4. | −1.400219 | 3.584765 | 0.389991 |
| C3 | −0.872192 | 2.190556 | 0.236797 |
| H4 | −1.932477 | 3.891686 | −0.511821 |
| H5 | −2.054935 | 3.640368 | 1.263653 |
| H6 | 0.55862 | 4.266381 | 0.559197 |
| O5 | 0.288007 | −1.521043 | 1.29563 |
| O6 | −1.664703 | −1.059059 | 0.43961 |
| C5 | −0.959016 | −1.79628 | 1.210803 |
| C6 | −1.568434 | −2.912588 | 2.003767 |
| H7 | −2.492313 | −3.252317 | 1.531746 |
| H8 | −1.803373 | −2.543365 | 3.009177 |
| H9 | −0.856348 | −3.735188 | 2.102561 | and wherein $R^2=1-(SS_{err}/SS_{tot})$ where $S_{err}$ is a calculated high energy X-ray diffraction g(r) data points for a theoretical model of the mononuclear chromium carboxylate and $S_{tot}$ is a summation of the squares of the differences between a high energy X-ray diffraction g(r) data points of the chromium carboxylate composition and a mean of the high energy X-ray diffraction g(r) data points of the chromium carboxylate composition, or
   iii) produced by a process comprising
      contacting under substantially anhydrous and substantially acid-free conditions
         1) a chromium(III) precursor having a formula $CrX_3L_l$ where each X independently is a halide, each L independently is a $C_2$-$C_{10}$ ether, a $C_2$-$C_{10}$ thioether, a $C_2$-$C_5$ nitrile, a $C_1$-$C_{30}$ amine, or a $C_3$-$C_{30}$ phosphine, or any combination thereof, and l ranges from 0 to 7,
         2) a Group 1 or Group 2 metal $C_3$-$C_{25}$ carboxylate, and
         3) a first solvent,
      wherein the chromium(III) $C_3$-$C_{25}$ carboxylate composition produced by the process has a KBr pellet infrared spectrum having a $\upsilon_{asym}$ ($CO_2$) infrared absorbance peak at 1516±15 cm$^{-1}$ and the $\upsilon_{asym}$ ($CO_2$) infrared absorbance peak is within 110 cm$^{-1}$ of the $\upsilon_{sym}$ ($CO_2$) infrared peak;
   b) a pyrrole compound; and
   c) a metal hydrocarbyl compound.

2. The composition of claim 1, wherein the $C_3$-$C_{25}$ carboxylate has a formula $(^-O_2C)_rR^{1c}$ where r is an integer from 1 to 4 and $R^{1c}$ is a hydrocarbon group or a substituted hydrocarbon group.

3. The composition of claim 1, wherein the $C_3$-$C_{25}$ carboxylate has a formula $^-O_2CR^{2c}$ where $R^{2c}$ is a hydrocarbyl group or a substituted hydrocarbyl group.

4. The composition of claim 1, wherein the $C_3$-$C_{25}$ carboxylate comprises a propionate, a butyrate, a pentanoate, a hexanoate, a heptanoate, an octanoate, a nonanoate, a decanoate, an undecanoate, a dodecanoate, a tridecanoate, a tetradecanoate, a pentadecanoate, a hexadecanoate, a heptadecanoate, an octadecanoate, or any combination thereof.

5. The composition of claim 1, wherein the $C_3$-$C_{25}$ carboxylate comprises 2-ethylhexanoate.

6. The composition of claim 1, wherein the pyrrole compound has formula P1

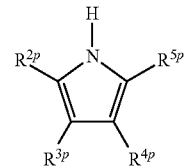

where $R^{2p}$, $R^{3p}$, $R^{4p}$, and $R^{5p}$ independently are hydrogen atoms or $C_1$-$C_{30}$ organyl groups.

7. The composition of claim 1, wherein the pyrrole compound has formula P5

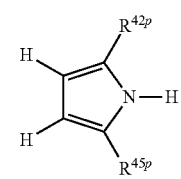

where $R^{42p}$ and $R^{4p}$ independently are $C_1$-$C_{18}$ hydrocarbyl groups.

8. The composition of claim 1, wherein the pyrrole compound comprises 2,5-dimethylpyrrole, 2-methyl-5-ethylpyrrole, 2,5-diethylpyrrole, 2,5-dipropylpyrrole, 2,5-dibutylpyrrole, 2,4-dimethylpyrrole, 2,4-diethylpyrrrole, 2,4-dipropylpyrrole, 2,4-dibutylpyrrole, 3,4-dimethylpyrrole, 3,4-diethylpyrrrole, 3,4-dipropylpyrrole, 3,4-dibutylpyrrole, 2,3,4-trimethylpyrrole, 3-ethyl-2,4-dimethylpyrrole, 2,3,5-trimethylpyrrole; 2,3,4,5-tetramethylpyrrole, 2,3,4,5-tetraethylpyrrole, or any combination thereof.

9. The composition of claim 1, wherein the pyrrole compound comprises 2,5-dimethylpyrrole.

10. The composition of claim 1, wherein the metal hydrocarbyl compound comprises a Group 1, 2, 11, 12, 13, or 14 metal hydrocarbyl compound.

11. The composition of claim 1, wherein the metal hydrocarbyl compound comprises a trialkylaluminum, a dialkylaluminum halide, an alkylaluminum dihalide, an alkyl aluminum sesquihalide, or any combination thereof.

12. The composition of claim 1, wherein the metal hydrocarbyl compound comprises triethylaluminum and diethylaluminum chloride.

13. The composition of claim 1 further comprising a halogen containing compound.

14. The composition of claim 13, wherein the halogen containing compound comprises a Group 3, a Group 4, a Group 5, a Group 6 excluding Cr, a Group 13, a Group 14, or a Group 15 halogen containing compound.

15. The composition of claim 13, wherein the halogen containing compound comprises a Group 3 metal halide, a Group 4 metal halide, a Group 5 metal halide, a Group 6 excluding Cr metal halide, a Group 13 metal halide, a Group 14 metal halide, a Group 15 metal halide, or any combination thereof.

16. The composition of claim 15, wherein the halogen containing compound comprises an inorganic metal halide, a hydrocarbyl metal halide, or any combination thereof.

17. The composition of claim 13, wherein the halogen containing compound comprises a $C_1$-$C_{15}$ halogenated hydrocarbon.

18. The composition of claim 11, wherein the chromium to aluminum molar ratio ranges from 1:1 to 1:100.

19. The composition of claim 1, wherein the pyrrole compound to chromium molar ratio ranges from 0.3:1 to 10:1.

20. The composition of claim 1, wherein
a) the $C_3$-$C_{25}$ carboxylate of the chromium(III) $C_3$-$C_{25}$ carboxylate where comprises a propionate, a butyrate, a pentanoate, a hexanoate, a heptanoate, an octanoate, a nonanoate, a decanoate, an undecanoate, a dodecanoate, a tridecanoate, a tetradecanoate, a pentadecanoate, a hexadecanoate, a heptadecanoate, an octadecanoate, or any combination thereof;
b) the pyrrole compound comprises 2,5-dimethylpyrrole, 2-methyl-5-ethylpyrrole, 2,5-diethylpyrrrole, 2,5-dipropylpyrrole, 2,5-dibutylpyrrole, 2,4-dimethylpyrrole, 2,4-diethylpyrrole, 2,4-dipropylpyrrole, 2,4-dibutylpyrrole, 3,4-dimethylpyrrole, 3,4-diethylpyrrrole, 3,4-dipropylpyrrole, 3,4-dibutylpyrrole, 2,3,4-trimethylpyrrole 3-ethyl-2,4-dimethylpyrrole, 2,3,5-trimethylpyrrole, 2,3,4,5-tetramethylpyrrole, 2,3,4,5-tetraethylpyrrole, or any combination thereof;
c) the metal hydrocarbyl compound comprises a trialkylalumium, a dialkyl aluminum halide, an alkyl metal dihalide, an alkyl aluminum sesquichloride, or any combination thereof;
d) the chromium to aluminum molar ratio ranges from 1:5 to 1:17; and
e) the pyrrole compound to chromium molar ratio ranges from 0.3:1 to 2:1.

21. A process to prepare a catalyst composition of claim 1, the process comprising contacting
a) a chromium(III) $C_3$-$C_{25}$ carboxylate composition
   i) having a KBr pellet infrared spectrum with a $\upsilon_{asym}$ ($CO_2$) infrared absorbance peak within 110 cm$^{-1}$ of the $\upsilon_{sym}$ ($CO_2$) infrared absorbance peak and having an infrared absorbance peak height ratio of a $\upsilon_{asym}$ ($CO_2$) infrared absorbance peak at 1516±15 cm$^{-1}$ to infrared absorbance peak located at 700±50 cm$^{-1}$ greater than or equal to 3:1,
   ii) having a goodness of fit test value, $R^2$, of at least 0.6 when comparing high-energy X-ray diffraction g(r) data points of the chromium(III) $C_3$-$C_{25}$ carboxylate composition to calculated high energy X-ray diffraction g(r) data points of a theoretical model of mononuclear chromium(III) acetate over an r range from 1.3 Angstroms to 4 Angstroms, wherein atomic coordinates of the theoretical model of mononuclear chromium(III) acetate have been optimized to the following values

| Atom | X | Y | Z |
|---|---|---|---|
| Cr | 0 | 0 | 0 |
| C1 | 1.843475 | −0.40852 | −1.43058 |
| O1 | 0.738585 | −1.038881 | −1.567619 |
| O2 | 1.90289 | 0.361636 | −0.494039 |
| C2 | 3.026757 | −0.697968 | −2.303537 |
| H1 | 1.586188 | 0.221029 | −2.49448 |
| H2 | 2.70492 | −1.158746 | −3.239287 |
| H3 | 3.689716 | −1.395002 | −1.777323 |
| O3 | −0.772555 | 1.631901 | −0.909192 |
| O4 | −0.381341 | 1.511899 | 1.249048 |
| C4 | −1.400219 | 3.584765 | 0.389991 |
| C3 | −0.872192 | 2.190556 | 0.236797 |
| H4 | −1.932477 | 3.891686 | −0.511821 |
| H5 | −2.054935 | 3.640368 | 1.263653 |
| H6 | −0.55862 | 4.266381 | 0.559197 |
| O5 | 0.288007 | −1.521043 | 1.29563 |
| O6 | −1.664703 | −1.059059 | 0.43961 |
| C5 | −0.959016 | −1.79628 | 1.210803 |
| C6 | −1.568434 | −2.912588 | 2.003767 |
| H7 | −2.492313 | −3.252317 | 1.531746 |
| H8 | −1.803373 | −2.543365 | 3.009177 |
| H9 | −0.856348 | −3.735188 | 2.102561 | and wherein $R^2=1-(SS_{err}/SS_{tot})$ where $S_{err}$ is a calculated high energy X-ray diffraction g(r) data points for a theoretical model of the mononuclear chromium carboxylate and $S_{tot}$ is a summation of the squares of the differences between a high energy X-ray diffraction g(r) data points of the chromium carboxylate composition and a mean of the high energy X-ray diffraction g(r) data points of the chromium carboxylate composition, or
   iii) produced by a process comprising
      contacting under substantially anhydrous and substantially acid-free conditions
      1) a chromium(III) precursor having a formula $CrX_3L_l$ where each X independently is a halide, each L independently is a $C_2$-$C_{10}$ ether, a $C_2$-$C_{10}$ thioether, a $C_2$-$C_5$ nitrile, a $C_1$-$C_{30}$ amine, or a $C_3$-$C_{30}$ phosphine, or any combination thereof, and l ranges from 0 to 7,
      2) a Group 1 or Group 2 metal $C_3$-$C_{25}$ carboxylate, and
      3) a first solvent,
      wherein the chromium(III) $C_3$-$C_{25}$ carboxylate composition produced by the process has a KBr pellet infrared spectrum having a $\upsilon_{asym}$ ($CO_2$) infrared absorbance peak at 1516±15 cm$^{-1}$ and the $\upsilon_{asym}$ ($CO_2$) infrared absorbance peak is within 110 cm$^{-1}$ of the $\upsilon_{sym}$ ($CO_2$) infrared peak;
b) a pyrrole compound; and
c) a metal hydrocarbyl compound.

22. The process of claim 21, wherein the two or more of a) the chromium(III) $C_3$-$C_{25}$ carboxylate composition, b) pyrrole compound, c) metal hydrocarbyl compound, and d)

optional halogen containing compound are contacted in the presence of an unsaturated organic compound.

23. The process of claim 22, wherein the unsaturated organic compound comprises a $C_2$ to $C_{20}$ unsaturated aliphatic hydrocarbon, a $C_6$ to $C_{20}$ arene, or any combination thereof.

24. The process of claim 22, wherein the unsaturated organic compound comprises benzene, toluene, xylene, ethylbenzene, isopropylbenzene, 1,3,5-trimethylbenzene, hexamethylbenzene, or any combination thereof.

25. The process of claim 21, wherein the chromium(III) $C_3$-$C_{25}$ carboxylate composition, the pyrrole compound, and the metal hydrocarbyl compound are contacted simultaneously.

26. The process of claim 21, wherein the chromium carboxylate composition or a composition comprising the chromium carboxylate composition and the pyrrole compound is added to a composition comprising the metal hydrocarbyl compound.

27. The process of claim 21, comprising contacting the pyrrole compound and the metal hydrocarbyl compound to form a pyrrole/metal hydrocarbyl compound mixture and contacting the pyrrole compound/metal hydrocarbyl compound mixture with the chromium(III) $C_3$-$C_{25}$ carboxylate composition.

28. The process of claim 21, wherein the catalyst system further comprises a composition containing the halogen containing compound.

29. The process of claim 21, wherein the catalyst system further comprises a halogen containing compound and wherein the halogen containing compound comprises an inorganic metal halide, a hydrocarbyl metal halide, a halogenated hydrocarbon, or any combination thereof.

30. The process of claim 21, wherein the catalyst system further comprises a halogen containing compound and wherein the halogen containing compound comprises a metal halide.

31. The process of claim 30, comprising contacting the chromium(III) $C_3$-$C_{25}$ carboxylate composition with at least one of the pyrrole compound or the metal halide prior to contacting the chromium(III) $C_3$-$C_{25}$ carboxylate composition with the metal hydrocarbyl compound.

32. The process of claim 30, comprising contacting the metal hydrocarbyl compound with at least one of the pyrrole compound or the metal halide prior to contacting the chromium(III) $C_3$-$C_{25}$ carboxylate composition with a metal hydrocarbyl compound.

33. The process of claim 21, wherein the catalyst system further comprises a halogen containing compound and wherein a composition containing the halogen containing compound comprises (i) an inorganic metal halide, (ii) a hydrocarbyl metal halide, (iii) mixture of an inorganic metal halide and a non-halide metal hydrocarbyl compound, or (iv) a mixture of a hydrocarbyl metal halide and a non-halide metal hydrocarbyl compound.

34. The process of claim 33, wherein the chromium(III) $C_3$-$C_{25}$ carboxylate composition, the pyrrole compound, or a composition comprising the chromium(III) $C_3$-$C_{25}$ carboxylate composition and the pyrrole compound are contacted with a non-halide metal hydrocarbyl compound prior to contacting the composition containing the halogen containing compound.

35. The process of claim 29, wherein the chromium(III) $C_3$-$C_{25}$ carboxylate composition and the pyrrole compound are contacted prior to contacting the pyrrole compound or the chromium(III) $C_3$-$C_{25}$ carboxylate composition with the composition containing the halogen containing compound.

36. The process of claim 29, wherein (1) the pyrrole compound, the composition containing the halogen containing compound, and, optionally, the chromium(III) $C_3$-$C_{25}$ carboxylate composition are contacted to form a mixture and (2) the mixture is contacted with a non-halide metal hydrocarbyl compound.

37. The process of claim 21, comprising (1) contacting the pyrrole compound, the metal hydrocarbyl compound, and optionally the halogen containing compound to form a mixture, and (2) contacting the mixture with the chromium (III) $C_3$-$C_{25}$ carboxylate composition.

38. A process for trimerizing an olefin in the presence of a catalyst system:
   the catalyst system comprising;
   1) a chromium(III) $C_3$-$C_{25}$ carboxylate composition that is
      i) characterized as having a KBr pellet infrared spectrum with a $\upsilon_{asym}$ ($CO_2$) peak infrared absorbance peak within 110 $cm^{-1}$ of the $\upsilon_{sym}$ ($CO_2$) infrared absorbance peak and having an infrared absorbance peak height ratio of a $\upsilon_{asym}$ ($CO_2$) infrared absorbance peak at 1516±15 $cm^{-1}$ to infrared absorbance peak located at 700±50 $cm^{-1}$ greater than or equal to 3:1,
      ii) characterized as having a goodness of fit test value, $R^2$, of at least 0.6 when comparing high-energy X-ray diffraction g(r) data points of the chromium(III) $C_3$-$C_{25}$ carboxylate composition to calculated high energy X-ray diffraction g(r) data points of a theoretical model of mononuclear chromium(III) acetate over an r range from 1.3 Angstroms to 4 Angstroms, wherein atomic coordinates of the theoretical model of mononuclear chromium(III) acetate have been optimized to the following values

| Atom | X | Y | Z |
|---|---|---|---|
| Cr | 0 | 0 | 0 |
| C1 | 1.843475 | −0.40852 | −1.43058 |
| O1 | 0.738585 | −1.038881 | −1.567619 |
| O2 | 1.90289 | 0.461636 | −0.494039 |
| C2 | 3.026757 | −0.697968 | −2.303537 |
| H1 | 3.586188 | 0.221029 | −2.49448 |
| H2 | 2.70492 | −1.158746 | −3.239287 |
| H3 | 3.689716 | −1.395002 | −1.777323 |
| O3 | −0.772555 | 1.631901 | −0.909192 |
| O4 | −0.481341 | 1.511899 | 1.249048 |
| C4 | −1.400219 | 3.584765 | 0.389991 |
| C3 | −0.872192 | 2.190556 | 0.236797 |
| H4 | −1.932477 | 3.891686 | −0.511821 |
| H5 | −2.054935 | 3.640368 | 1.263653 |
| H6 | −0.55862 | 4.266381 | 0.559197 |
| O5 | 0.288007 | −1.521043 | 1.29563 |
| O6 | −1.664703 | −1.059059 | 0.43961 |
| C5 | −0.959016 | −1.79628 | 1.210803 |
| C6 | −1.568434 | −2.912588 | 2.003767 |
| H7 | −2.492313 | −3.252317 | 1.531746 |
| H8 | −1.803373 | −2.543365 | 3.009177 |
| H9 | −0.856348 | −3.735188 | 2.10.2561 | and wherein $R^2=1-(SS_{err}/SS_{tot})$ where $S_{err}$ is a calculated high energy X-ray diffraction g(r) data points for a theoretical model of the mononuclear chromium carboxylate and $S_{tot}$ is a summation of the squares of the differences between a high energy X-ray diffraction g(r) data points of the chromium carboxylate composition and a mean of the high energy X-ray diffraction g(r) data points of the chromium carboxylate composition, or iii) produced by a process comprising
contacting under substantially anhydrous and substantially acid-free conditions
(1) a chromium(III) precursor having a formula $CrX_3L_l$ where each X independently is a halide, each L independently is a $C_2$-$C_{10}$ ether, a $C_2$-$C_{10}$ thioether, a $C_2$-$C_5$ nitrile, a $C_1$-$C_{30}$ amine, or a $C_3$-$C_{30}$ phosphine, or any combination thereof, and l ranges from 0 to 7,
(2) a Group 1 or Group 2 metal $C_3$-$C_{25}$ carboxylate, and
(3) a first solvent,
wherein the chromium(III) $C_3$-$C_{25}$ carboxylate composition produced by the process has a KBr pellet infrared spectrum having a $v_{asym}$ ($CO_2$) infrared absorbance peak at 1516±15 $cm^{-1}$ and the $v_{asym}$ ($CO_2$) infrared absorbance peak is within 110 $cm^{-1}$ of the $v_{sym}$ ($CO_2$) infrared peak;
2) a pyrrole compound; and
3) a metal hydrocarbyl compound; and
the process comprising contacting an olefin comprising ethylene, the chromium(III) $C_3$-$C_{25}$ carboxylate composition, the pyrrole compound, and the metal hydrocarbyl compound to produce a trimerization product.

39. The process of claim 38, wherein the process comprises:
a) contacting the chromium(III) $C_3$-$C_{25}$ carboxylate composition, the pyrrole compound, and the metal hydrocarbyl compound to form the catalyst system;
b) contacting the catalyst system with the olefin; and
c) producing an olefin trimerization product under trimerization conditions.

40. The process of claim 38, wherein the chromium(III) $C_3$-$C_{25}$ carboxylate composition and the metal hydrocarbyl compound are not contacted prior to contacting the olefin.

41. The process of claim 38, wherein the chromium(III) $C_3$-$C_{25}$ carboxylate composition and the metal hydrocarbyl compound are not contacted prior to contacting either the metal hydrocarbyl compound or the chromium(III) $C_3$-$C_{25}$ carboxylate contacting the olefin.

42. The process of claim 38, wherein the olefin comprises ethylene and the chromium(III) $C_3$-$C_{25}$ carboxylate composition and the metal hydrocarbyl compound substantially simultaneously contact ethylene.

43. The process of claim 38, wherein the olefin comprises ethylene and the chromium(III) $C_3$-$C_{25}$ carboxylate composition is contacted with the pyrrole compound to form a chromium(III) $C_3$-$C_{25}$ carboxylate composition/pyrrole mixture prior to contacting the chromium(III) $C_3$-$C_{25}$ carboxylate composition with ethylene.

44. The process of claim 38, wherein the olefin comprises ethylene and the metal hydrocarbyl compound is contacted with the pyrrole compound to form a metal-pyrrole mixture prior to contacting the metal hydrocarbyl compound with the olefin.

45. The process of claim 38, wherein the catalyst system further comprises a composition containing the halogen containing compound.

46. The process of claim 45, wherein the halogen containing compound comprises an inorganic metal halide, a hydrocarbyl metal halide, a halogenated hydrocarbon, or any combination thereof.

47. The process of claim 38, wherein the trimerization conditions comprise the presence of a hydrocarbon solvent.

48. The process of claim 38, wherein the olefin comprises ethylene and the trimerization conditions comprise an ethylene partial pressure ranging from 20 psi to 2500 psi.

49. The process of claim 48, wherein the trimerization conditions further comprise at least one of i) a temperature ranging from 60° to about 200° C., ii) a hydrogen partial pressure ranging from 2 psi to 100 psi, or iii) any combination thereof.

50. The process of claim 38, wherein the catalyst system is deactivated by treating a reactor effluent with a deactivating agent.

51. The process of claim 50, wherein the deactivating agent comprises i) an alcohol, ii) an amine, or iii) any combination thereof.

52. The process of claim 50, wherein the olefin comprises ethylene and the trimerization product comprises at least 90 weight percent trimerization products having 6 carbon atoms per molecule.

53. The process of claim 50, wherein the olefin comprises ethylene and the trimerization product having 6 carbon atoms per molecule comprises at least 98.5 weight percent 1-hexene.

* * * * *